US007108895B2

(12) United States Patent
Yokokouji et al.

(10) Patent No.: US 7,108,895 B2
(45) Date of Patent: Sep. 19, 2006

(54) LIQUID CRYSTAL COMPOSITION CONTAINING AN OPTICALLY ACTIVE COMPOUND AND LIQUID CRYSTAL ELECTRO-OPTICAL ELEMENT

(75) Inventors: Osamu Yokokouji, Kanagawa (JP); Tamon Tachibana, Kanagawa (JP); Masaki Oiwa, Kanagawa (JP); Kanetaka Shimizu, Kanagawa (JP); Takeshi Koike, Kanagawa (JP)

(73) Assignee: Seimi Chemical Co., Ltd., Chigasaki (JP)

( * ) Notice: Subject to any disclaimer, the term of this patent is extended or adjusted under 35 U.S.C. 154(b) by 166 days.

(21) Appl. No.: 10/470,733

(22) PCT Filed: Feb. 8, 2002

(86) PCT No.: PCT/JP02/01095

§ 371 (c)(1),
(2), (4) Date: Aug. 8, 2003

(87) PCT Pub. No.: WO02/062921

PCT Pub. Date: Aug. 15, 2002

(65) Prior Publication Data

US 2004/0079922 A1 Apr. 29, 2004

(30) Foreign Application Priority Data

Feb. 8, 2001 (JP) ............................ 2001-032682
Oct. 12, 2001 (JP) ............................ 2001-315739
Dec. 7, 2001 (JP) ............................ 2001-373886

(51) Int. Cl.
*C09K 19/52* (2006.01)

(52) U.S. Cl. .................................. 428/1.1; 252/299.01

(58) Field of Classification Search ................. 428/1.1; 252/299.5, 299.63, 299.66, 299.67, 299.01
See application file for complete search history.

(56) References Cited

U.S. PATENT DOCUMENTS

| | | | | |
|---|---|---|---|---|
| 4,754,051 | A * | 6/1988 | Sasaki et al. | 560/8 |
| 5,209,867 | A | 5/1993 | Koden et al. | |
| 6,551,670 | B1 * | 4/2003 | Tahara et al. | 428/1.3 |
| 2002/0134966 | A1 * | 9/2002 | Tahara et al. | 252/299.61 |

FOREIGN PATENT DOCUMENTS

| | | |
|---|---|---|
| EP | 217354 | 9/1986 |
| EP | 0 311 329 A2 | 4/1989 |
| EP | 0 315 193 A2 | 5/1989 |
| JP | 5-170679 | 7/1993 |
| JP | 8-245960 | 9/1996 |
| JP | 10-251185 | 9/1998 |
| JP | 11-255675 | 9/1999 |
| JP | 2002-80413 | 3/2002 |
| WO | 95/14067 | 5/1995 |

OTHER PUBLICATIONS

English translation by computer for JP 11-255675, http://www4.ipdl.ncipi.go.jp/Tokujitu/PAJdetail.ipdl?N0000=60&N0120=01&N2001=2&N3001=H11-255675.*

English translation by computer for JP 10-251185, http:/www4.ipdl.ncipi.go.jp/Tokujitu/PAJdetail.ipdl?N0000=60&N0120=01&N2001=2N3001=H10-251185.*

English abstract for JP-2002/080413, 1996.*

English abstract for JP 08/245960, 2002.*

Patent Abstracts of Japan, JP 01-316348, Dec. 21, 1989 (corr. US 5,209,867).

Patent Abstracts of Japan, JP 02-036152, Feb. 6, 1990 (corr. US 5,209,867).

* cited by examiner

*Primary Examiner*—Shean C. Wu
(74) *Attorney, Agent, or Firm*—Oblon, Spivak, McClelland, Maier & Neustadt, P.C.

(57) ABSTRACT

It is to provide a liquid crystal composition containing at least one type of optically active compounds of the following formulae (1) to (4), and a liquid crystal electro-optical element excellent in display quality. In each formula, C* is asymmetric carbon, and the respective symbols are as defined in description $$R^1\text{-}A^1\text{-}C^*HX\text{—}Y\text{-}A^2\text{-}(Z^1\text{-}A^3)_m\text{-}C{\equiv}C\text{-}A^4\text{-}(Z^2\text{-}A^5)_n\text{-}R^2 \quad (1)$$

$$R^1\text{-}A^1\text{-}C^*HX^1\text{—}Y^1\text{-}A^2\text{-}Z^1\text{-}A^3\text{-}Z^2\text{-}A^4\text{-}R^2 \quad (2)$$

$$R^5\text{-}Pn\text{-}C^*HX^2\text{—}CH_2\text{-}A^6\text{-}Y^2\text{-}A^7\text{-}R^6 \quad (3)$$

(4)

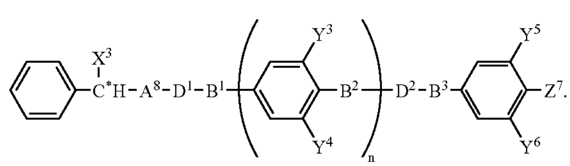

11 Claims, No Drawings

LIQUID CRYSTAL COMPOSITION CONTAINING AN OPTICALLY ACTIVE COMPOUND AND LIQUID CRYSTAL ELECTRO-OPTICAL ELEMENT

TECHNICAL FIELD

The present invention relates to a liquid crystal composition containing a novel optically active compound, and a liquid crystal electro-optical element employing the liquid crystal composition.

BACKGROUND ART

Liquid crystal electro-optical elements are used for various applications such as not only display devises for office automation equipment, but also measuring devices, automotive instruments, display devices for home electric appliance, clocks and desk-top calculators.

A liquid crystal electro-optical element has such a structure that a pair of substrates, at least one of the substrates having a transparent electrode, an intermediate protective film and a liquid crystal alignment film formed on its surface, is disposed with a certain distance, and a liquid crystal material is enclosed between the substrates, and it functions as an optical switching element by applying a voltage from the electrode to the liquid crystal material to change the alignment state of the liquid crystal material thereby to change its optical properties.

For twisted nematic (TN) and super twisted nematic (STN) liquid crystal electro-optical elements, a liquid crystal composition having a small amount of an optically active compound (chiral agent) added thereto is employed to achieve uniform twist alignment.

Optically active compounds widely used at present may, for example, be a compound of the following formula (CN), a compound of the following formula (CB-15) and a compound of the following formula (R-811). Further, a liquid crystal composition having an optically active compound added thereto is employed also for a reflective cholesteric (chiral nematic) liquid crystal element.

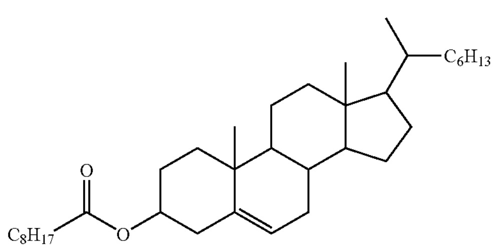

CN

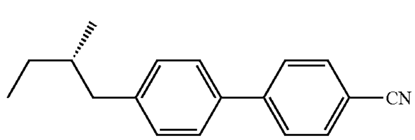

CB-15

-continued

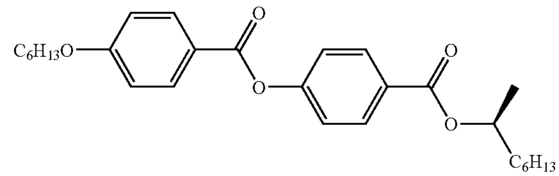

R-811

However, a cholesteric liquid crystal (chiral nematic liquid crystal) composition has a high viscosity, and thus it has such problems as a low speed of response and a high driving voltage, since a large amount of the optically active compound is added thereto. There is a corelation between the driving voltage of a liquid crystal element and the dielectric anisotropy (Δ∈) of a liquid crystal composition, and a liquid crystal composition having a high dielectric anisotropy can be driven at a low driving voltage. In order to make a reflective cholesteric (chiral nematic) liquid crystal element be driven at a low voltage, an optically active compound having a high dielectric anisotropy as well as a nematic liquid crystal composition having a high dielectric anisotropy has been required.

The applicant has proposed an optically active compound having a low viscosity and a high helical twisting power in JP-A-11-255675. However, the helical twisting power of the optically active compounds as specifically disclosed in JP-A-11-255675 is insufficient particularly for a reflective cholesteric (chiral nematic) liquid crystal element, and thus a higher helical twisting power is required, and further, optically active compounds having a high dielectric anisotropy which have not been realized in JP-A-11-255675 are required.

The helical pitch length induced when an optically active compound is added to a liquid crystal composition is determined by the helical twisting power characteristic to the compound. The smaller the helical twisting power of an optically active compound, the longer the helical pitch length induced, and the addition amount has to be increased to shorten the helical pitch length. In general, if the addition amount of the optically active compound is increased, performances as a liquid crystal material tend to decrease, as compared with before addition and problems are caused such as an increase in the viscosity, a decrease in the speed of response, an increase in the driving voltage, a decrease in the isotropic phase transition temperature and a reduction of the temperature range at which a specific phase such as a nematic phase or a cholesteric phase is shown. Thus, an optically active compound having a high helical twisting power has been required.

In order to overcome such objects, JP-A-10-251185 proposes optically active compounds having a low viscosity and a high helical twisting power.

In recent years, attention has been paid to a reflective cholesteric liquid crystal element employing a cholesteric liquid crystal composition having a large amount (at a level of from 10 to 30 wt %) of an optically active compound added to a nematic liquid crystal composition, and utilizing such a phenomenon that the cholesteric liquid crystal selectively reflects light having a wavelength equal to the product of the average reflective index of the liquid crystal material and the helical pitch length. The reflective cholesteric liquid crystal element has a high efficiency of light since no deflecting plate or color filter is required, and a higher brightness can be obtained when a liquid crystal composition having a higher reflective index anisotropy (Δn) is employed. Further, a voltage has to be applied only when the changeover of display (writing) since the display state is maintained (memory properties), whereby the element consumes only a low electric power. However, since a large amount of an optically active compound is added, the cholesteric liquid crystal composition has a high viscosity, whereby there are problems such as a low speed of response and a high driving voltage. In order to overcome such problems, an optically active compound which has a helical twisting power higher than that of the optically active compounds as disclosed in JP-A-10-251185, and which provides an aimed helical pitch length even by addition in a small amount, has been required.

Further, many of practicable liquid crystal compositions are prepared by mixing at least one compound having a nematic phase in the vicinity of room temperature and at least one compound having a nematic phase in a temperature region higher than room temperature. Further, in recent years, along with diversification of products to which liquid crystal electro-optical elements are applied, a liquid crystal composition having an increased operating temperature range to the high temperature side has been required, and accordingly, particularly a liquid crystal composition having a high transition temperature from the liquid crystal phase to the isotropic phase [hereinafter referred to as clear point (Tc)] has been required.

Accordingly, an optically active compound which, when added to a liquid crystal composition, does not lower the clear point (Tc) of the liquid crystal composition has been required.

It is an object of the present invention to provide a liquid crystal composition which contains a novel optically active compound having a high helical twisting power, having a high dielectric anisotropy (Δ∈) and providing excellent performances also as a chiral agent, and which can be driven at a low voltage, and a liquid crystal element employing the liquid crystal composition, particularly a STN or cholesteric (chiral nematic) liquid crystal element.

DISCLOSURE OF THE INVENTION

Under these circumstances, the present invention has been accomplished to overcome the above problems, and provides a liquid crystal composition containing at least one type of an optically active compound selected from the group consisting of compounds of the following formulae (1), (2), (3) and (4) (in each formula, C* is asymmetric carbon):

$$R^1\text{-}A^1\text{-}C^*HX^1\text{—}Y^1\text{-}A^2\text{-}(Z^1\text{-}A^3)_m\text{-}C{\equiv}C\text{-}A^4\text{-}(Z^2\text{-}A^5)_n\text{-}R^2 \quad (1)$$

wherein $A^1$ is a non-substituted 1,4-phenylene group, a 1,4-phenylene group substituted with at least one halogen atom or a non-substituted 2,6-naphthylene group, each of $A^2$, $A^3$, $A^4$ and $A^5$ which are independent of one another, is a non-substituted 1,4-phenylene group, a 1,4-phenylene group substituted with at least one halogen atom or a non-substituted trans-1,4-cyclohexylene group, each of $R^1$ and $R^2$ which are independent of each other, is a $C_{1-10}$ aliphatic hydrocarbon group, a $C_{1-10}$ aliphatic hydrocarbon group substituted with at least one halogen atom, a hydrogen atom, a halogen atom or a cyano group, provided that in a case of a $C_{1-10}$ aliphatic hydrocarbon group or a $C_{1-10}$ aliphatic hydrocarbon group substituted with at least one halogen atom, an ethereal oxygen atom (—O—) and/or an ester linkage (—COO— and/or —OCO—) may be inserted in the carbon-carbon linkage in the group or the carbon-carbon linkage connecting the group and the ring, $X^1$ is —F, —$CH_3$, —$CH_2F$, —$CHF_2$ or —$CF_3$, $Y^1$ is —$CH_2$—, —CO—, —$CH_2CH_2$—, —COO—, —$CH_2CO$—, —$COCH_2$—, —$CH_2O$—, —$CH_2CH_2CH_2$—, —$CH_2COO$—, —$COOCH_2$—, —$CH_2CH_2CO$—, —$CH_2COCH_2$—, —$COCH_2CH_2$—, —$CH_2CH_2O$— or —$CH_2OCH_2$—, each of $Z^1$ and $Z^2$ which are independent of each other, is —COO—, —OCO—, —$CH_2O$—, —$OCH_2$—, —$CH_2CH_2$—, —C≡C—, —CF═CF— or a single bond, and each of m and n which are independent of each other, is 0 or 1:

$$R^1\text{-}A^1\text{-}C^*HX^1\text{—}Y^1\text{-}A^2\text{-}Z^1\text{-}A^3\text{-}Z^2\text{-}A^4\text{-}R^2 \quad (2)$$

wherein $R^1$, $R^2$, $A^1$, $A^2$, $A^3$, $A^4$, $X^1$, $Y^1$, $Z^1$ and $Z^2$ are as defined for the formula (1), provided that when $A^2$ is a non-substituted 1,4-phenylene group or a 1,4-phenylene group having at least one halogen atom, both $A^3$ and $A^4$ are trans-1,4-cyclohexylene groups, and $Z^1$ is a single bond, $Z^2$ is —COO—, —OCO—, —$CH_2O$—, —$OCH_2$—, —CF═CF— or a single bond:

$$R^5\text{-Pn-}C^*HX^2\text{—}CH_2\text{-}A^6\text{-}Y^2\text{-}A^7\text{-}R^6 \quad (3)$$

wherein $R^5$ is a hydrogen atom, a $C_{1-10}$ alkyl group or a $C_{1-10}$ alkoxy group, $R^6$ is a $C_{1-10}$ monovalent aliphatic hydrocarbon group in which an oxygen atom may be inserted in the carbon-carbon linkage, and of which at least one hydrogen atom may be substituted with a fluorine atom, or a hydrogen atom, a halogen atom or a cyano group (provided that in a case of an aliphatic hydrocarbon group, it may contain an asymmetric carbon atom), Pn is a 1,4-phenylene group of which at least one hydrogen atom may be substituted with a halogen atom, each of $A^6$ and $A^7$ which are independent of each other, is a non-substituted trans-1,4-cyclohexylene group or a 1,4-phenylene group of which at least one hydrogen atom may be substituted with a halogen atom, $X^2$ is a fluorine atom, a methyl group or a trifluoromethyl group, and $Y^2$ is a C(O)O group or a OC(O) group:

(4)

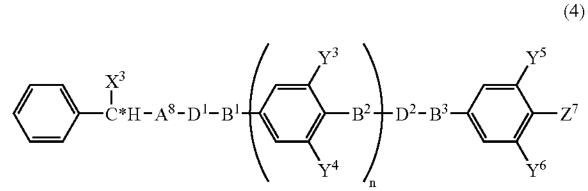

wherein $A^8$ is $CH_2$— or CO—, each of $B^1$, $B^2$ and $B^3$ which are independent of one another, is —COO—, —OCO—, —$CH_2CH_2$—, —$CH_2O$—, —$OCH_2$—, —CF═CF—, —$CF_2O$— or a single bond, each of $D^1$ and $D^2$ which are independent of each other, is a non-substituted 1,4-phenylene group, a non-substituted trans-1,4-cyclohexylene group or a single bond, $X^3$ is —$CH_3$, —$CHF_2$, —$CH_2F$, —$CF_3$ or a fluorine atom, each of $Y^3$, $Y^4$, $Y^5$ and $Y^6$ which are independent of one another, is a fluorine atom or a hydrogen atom, provided that one of $Y^3$, $Y^4$, $Y^5$ and $Y^6$ is a fluorine atom, $Z^7$ is —CN, —$CF_3$, —$OCF_3$, —$SF_5$ or a fluorine atom, and n is 0 or 1.

BEST MODE FOR CARRYING OUT THE INVENTION

Explanation Regarding the Optically Active Compound of the Above Formula (1)

The optically active compounds of the formula (1) are acetylene derivative type liquid crystalline compounds and at the same time, are useful as an optically active compound to be added to a liquid crystal composition. Namely, they have a high helical twisting power and provide a short helical pitch length induced and at the same time, they have a high Δn, an extremely high Tc and further a low viscosity. Further, they are chemically stable, and are excellent in compatibility with another compound such as another liquid crystal or non-liquid crystal compound.

Accordingly, the addition amount of the optically active acetylene derivative compound is small when it is added to a liquid crystal composition, and thus substantially no increase in the viscosity, decrease in the speed of response, increase in the driving voltage or reduction of the operating temperature range will be caused. At the same time, substantially no decrease in Tc of the liquid crystal composition will be caused, and accordingly a liquid crystal electro-optical element can be driven even at a high temperature range. Particularly, such an optically active acetylene derivative compound having the above properties is extremely effective when used for a cholesteric liquid crystal composition to which addition of a large amount of an optically active compound is required, and which is usually considered to have a low speed of response and a high driving voltage, and a liquid crystal display element having brightness and a high contrast can be obtained.

Among the optically active acetylene derivative compounds of the above formula (1), the following compounds are preferred. In each formula, a carbon atom with a symbol * represents asymmetric carbon, and its absolute configuration may be either R or S. $R^1$, $R^2$, $X^1$, $Y^1$, $Z^1$ and $Z^2$ are as defined for the formula (1). The steric configuration of the 1,4-cyclohexylene group in each formula is trans-form.

The symbol (Hal) in each formula represents that the compound is not substituted or substituted with at least one halogen atom, and in a case where the compound is substituted with at least two halogen atoms, these halogen atoms may be the same or different. In order to represent the substituted position in a case where the compound is substituted with at least one halogen atom, the substituted position is defined as follows for convenience sake.

$A^1$

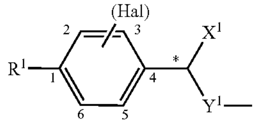

-continued $A^2$

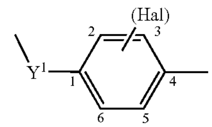

$A^3$

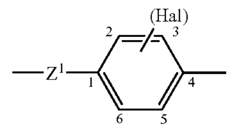

$A^4$

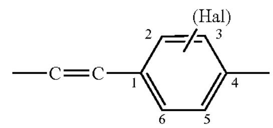

$A^5$

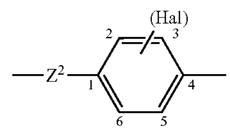

Examples of a tricyclic compound having three rings of the present invention are as follows. Here, a 2,6-naphthylene group is counted as one ring.

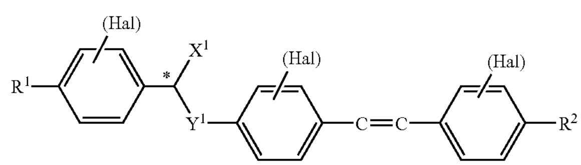

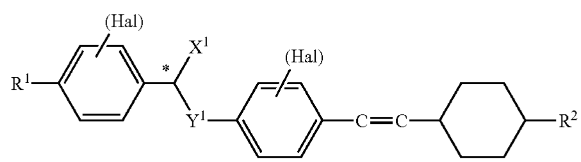

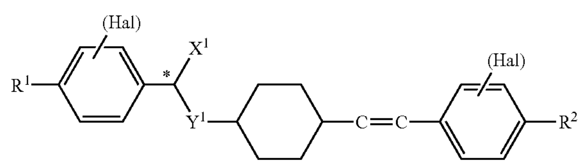

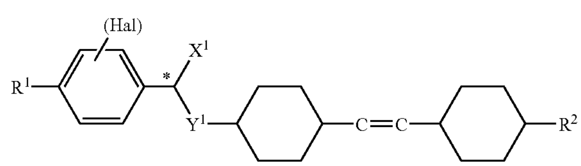

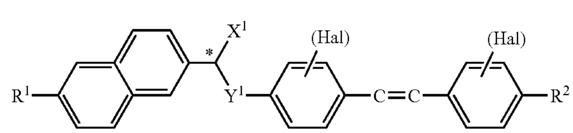

-continued
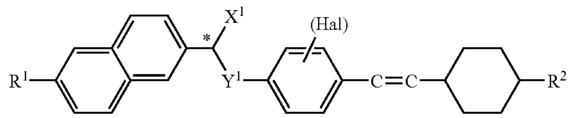
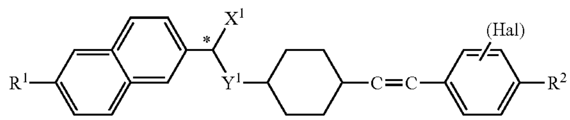
-continued
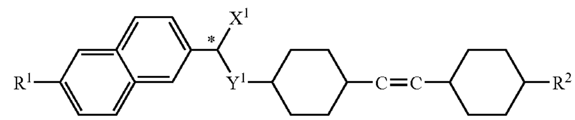
Examples of a tetracyclic compound having four rings of the present invention are as follows.
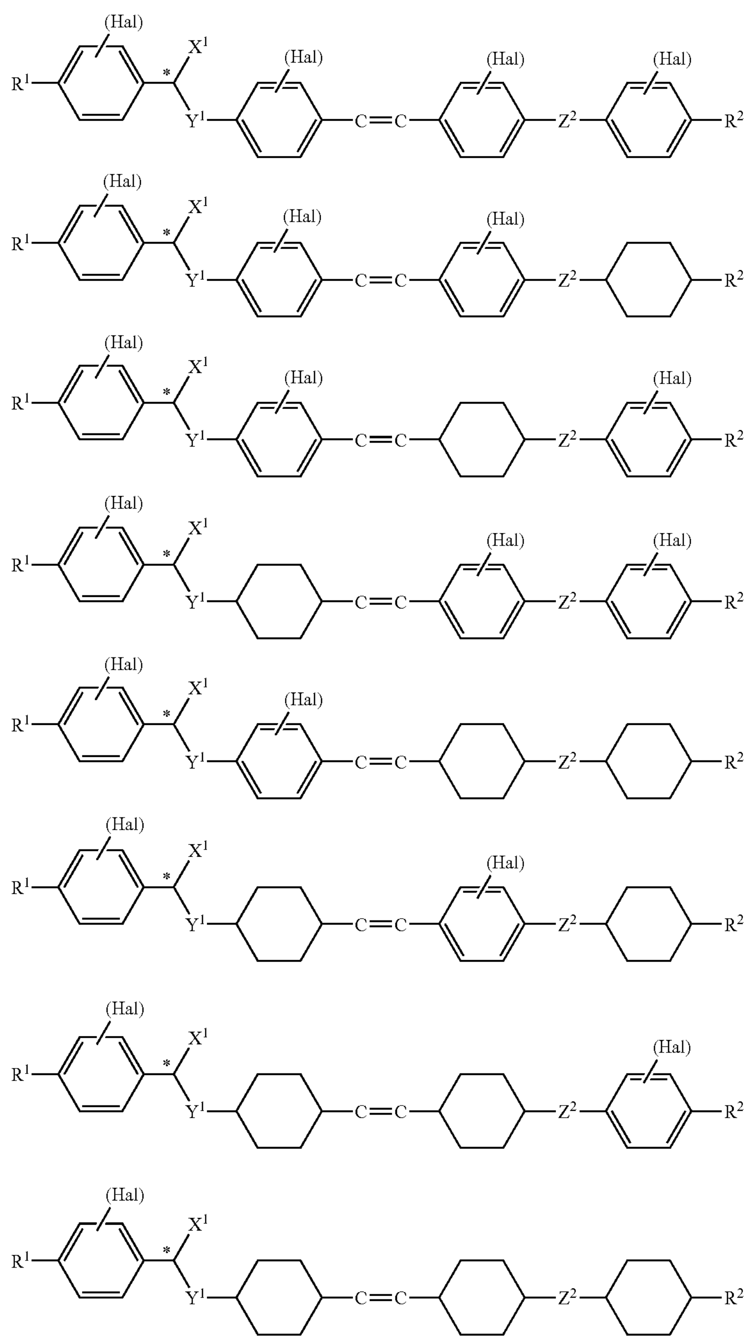

-continued
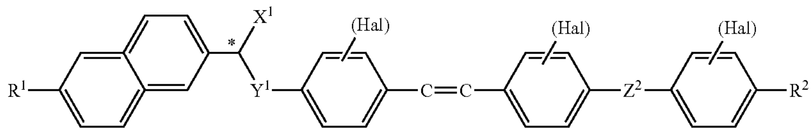
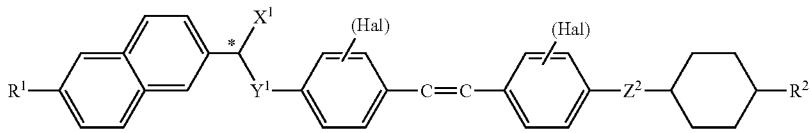
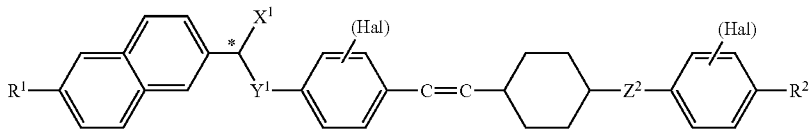
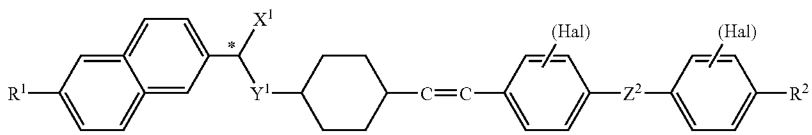
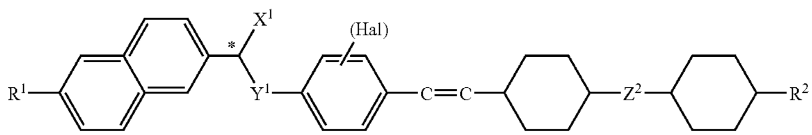
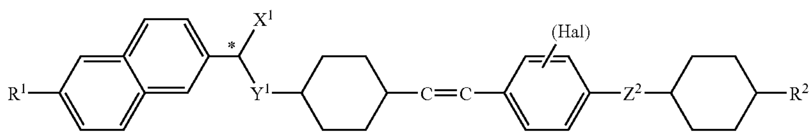
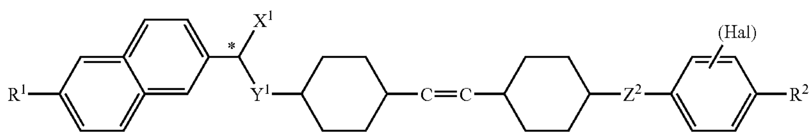
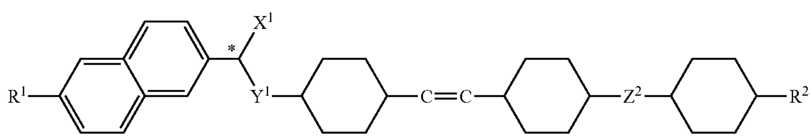
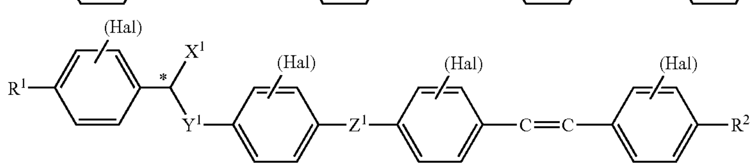
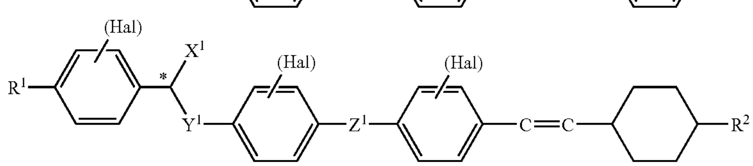
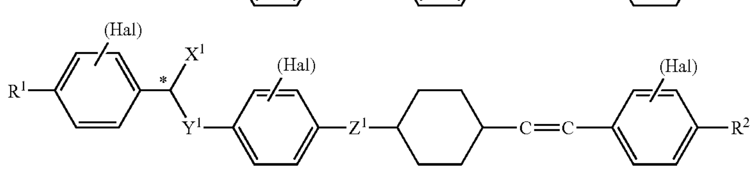
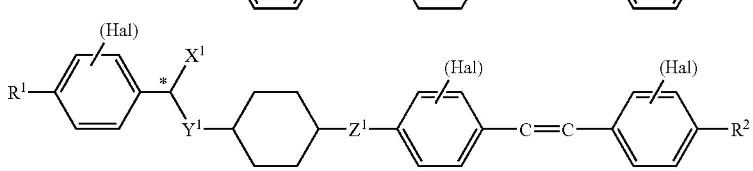

-continued
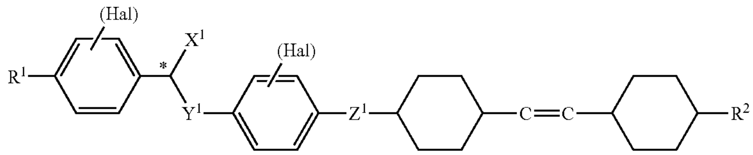
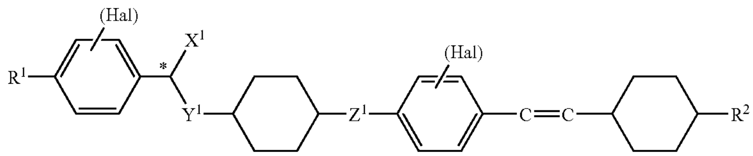
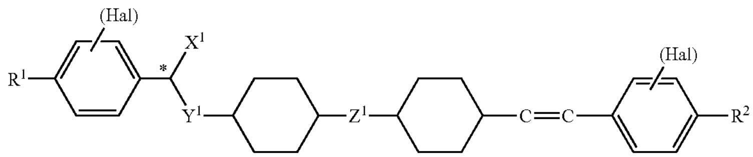
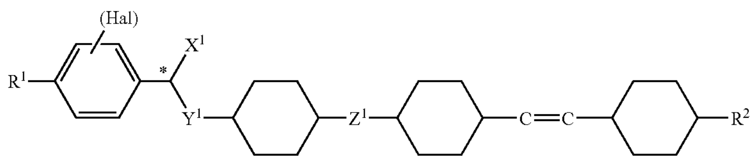
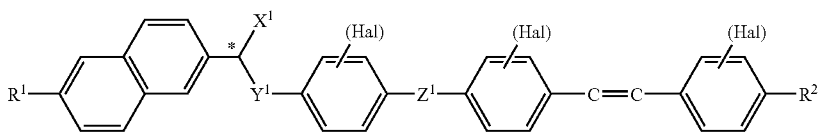
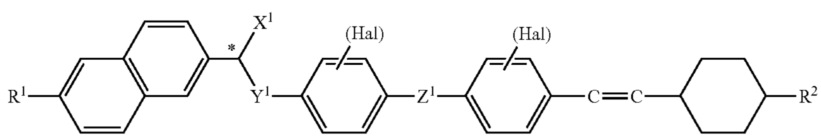
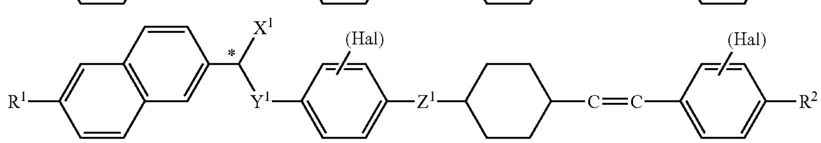
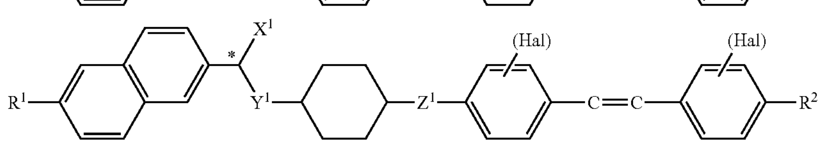
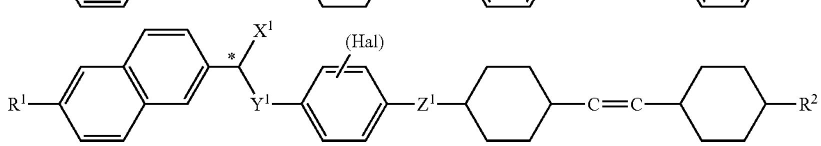
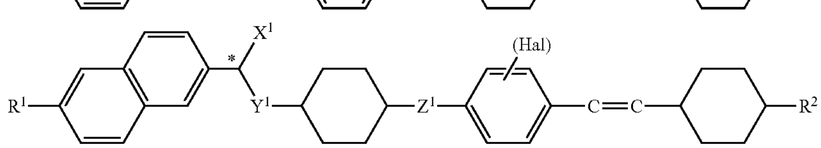
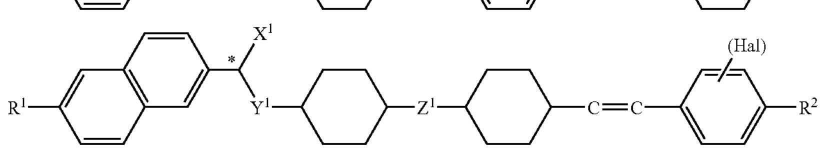
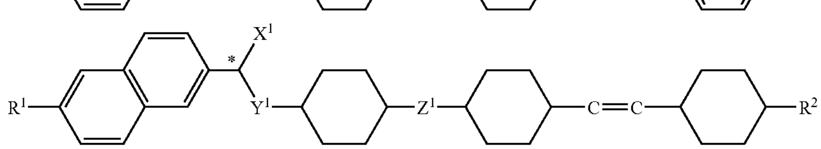

Examples of a pentacyclic compound having five rings of the present invention are as follows.
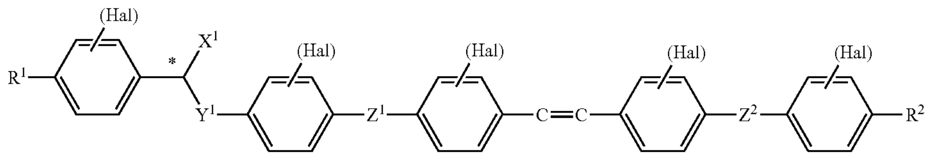
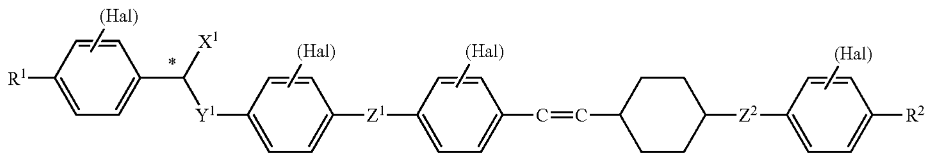
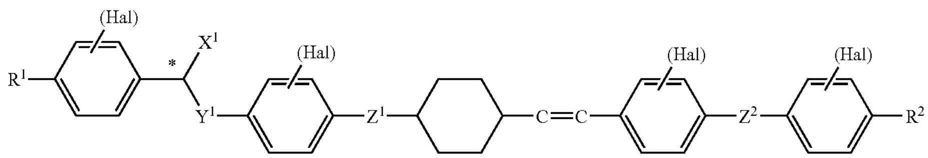
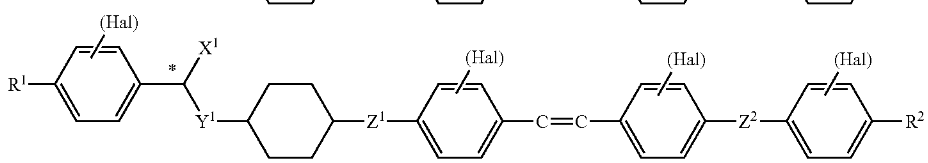
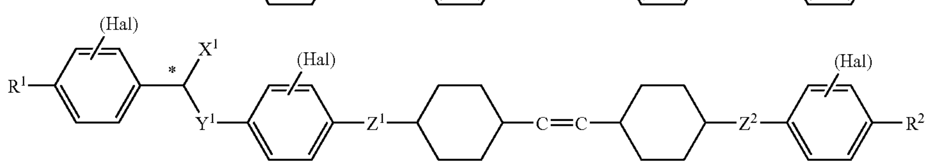
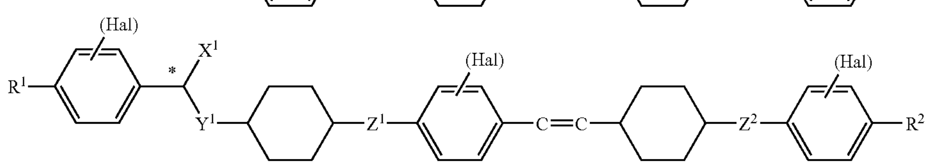
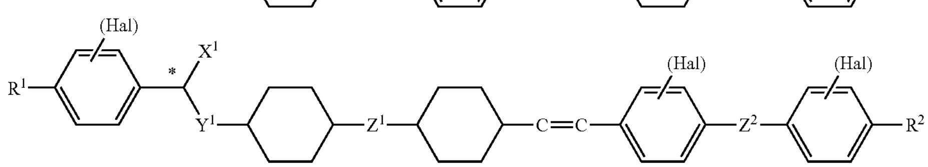
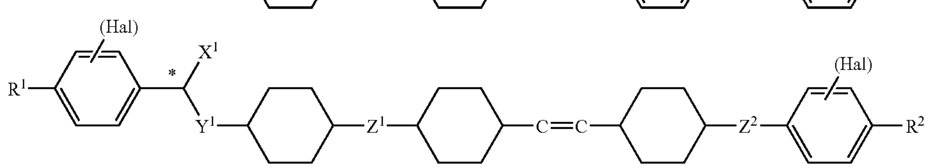
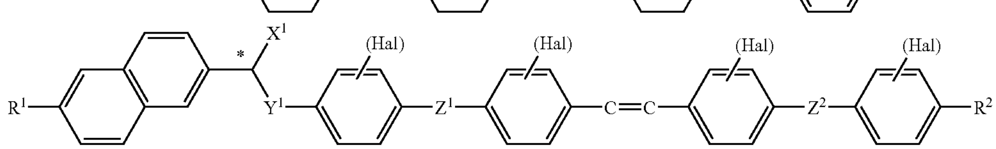
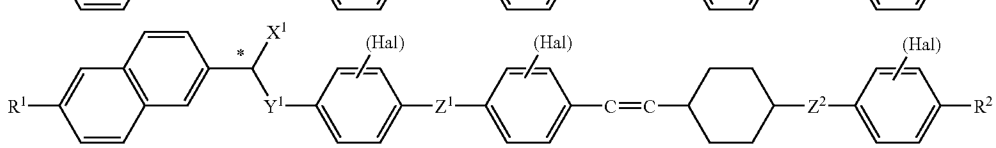
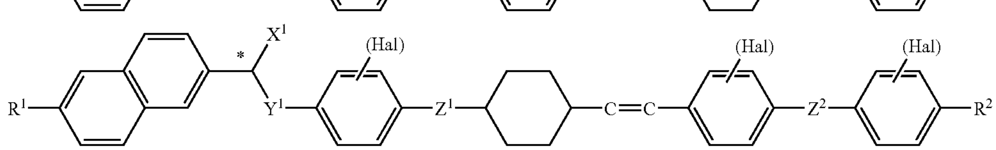

-continued
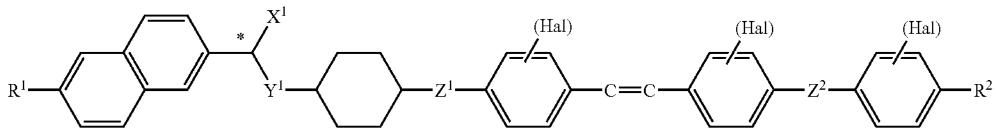
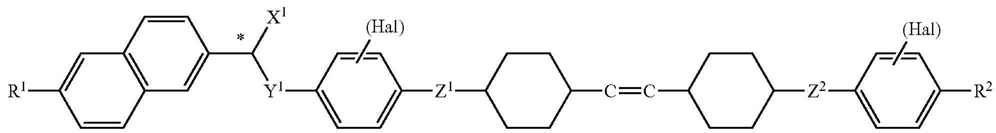
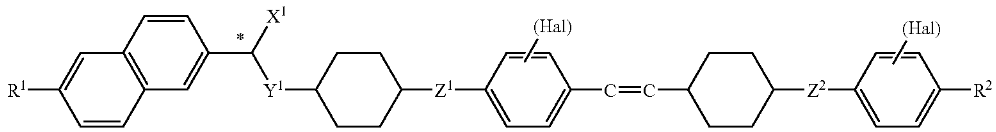
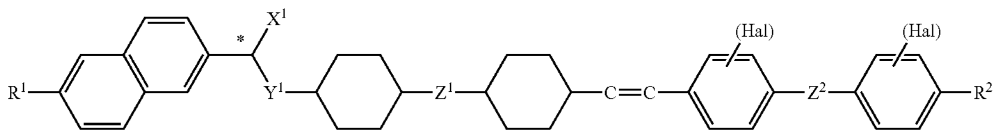
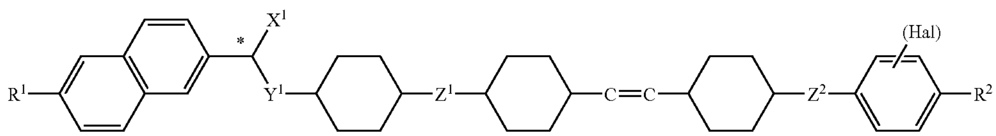
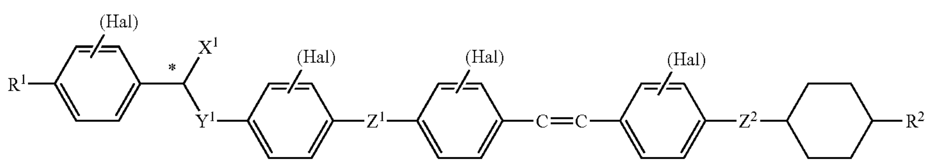
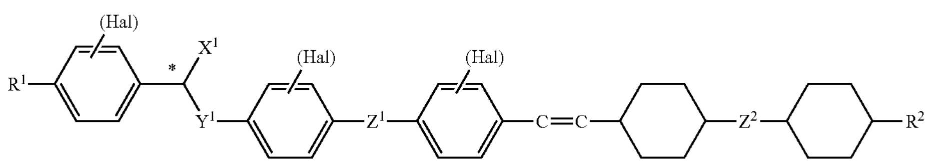
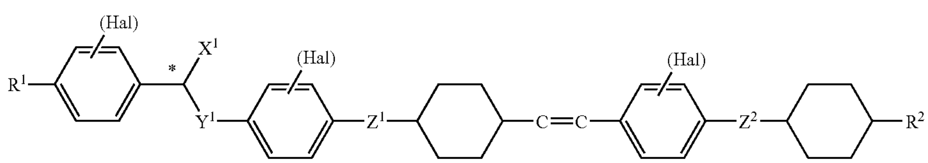
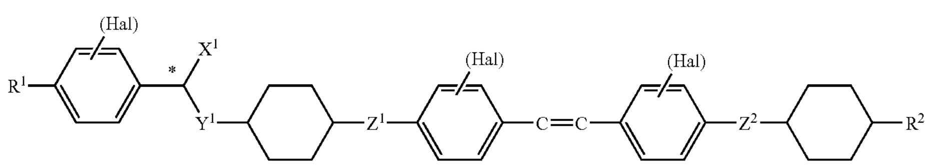
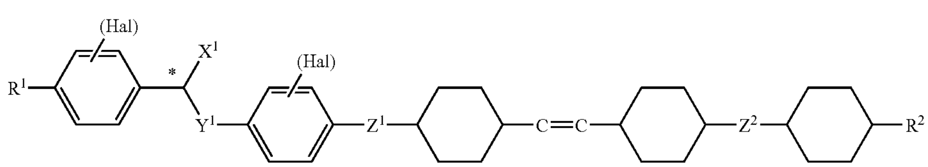
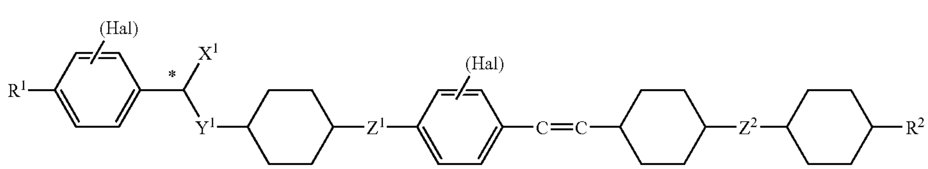

-continued

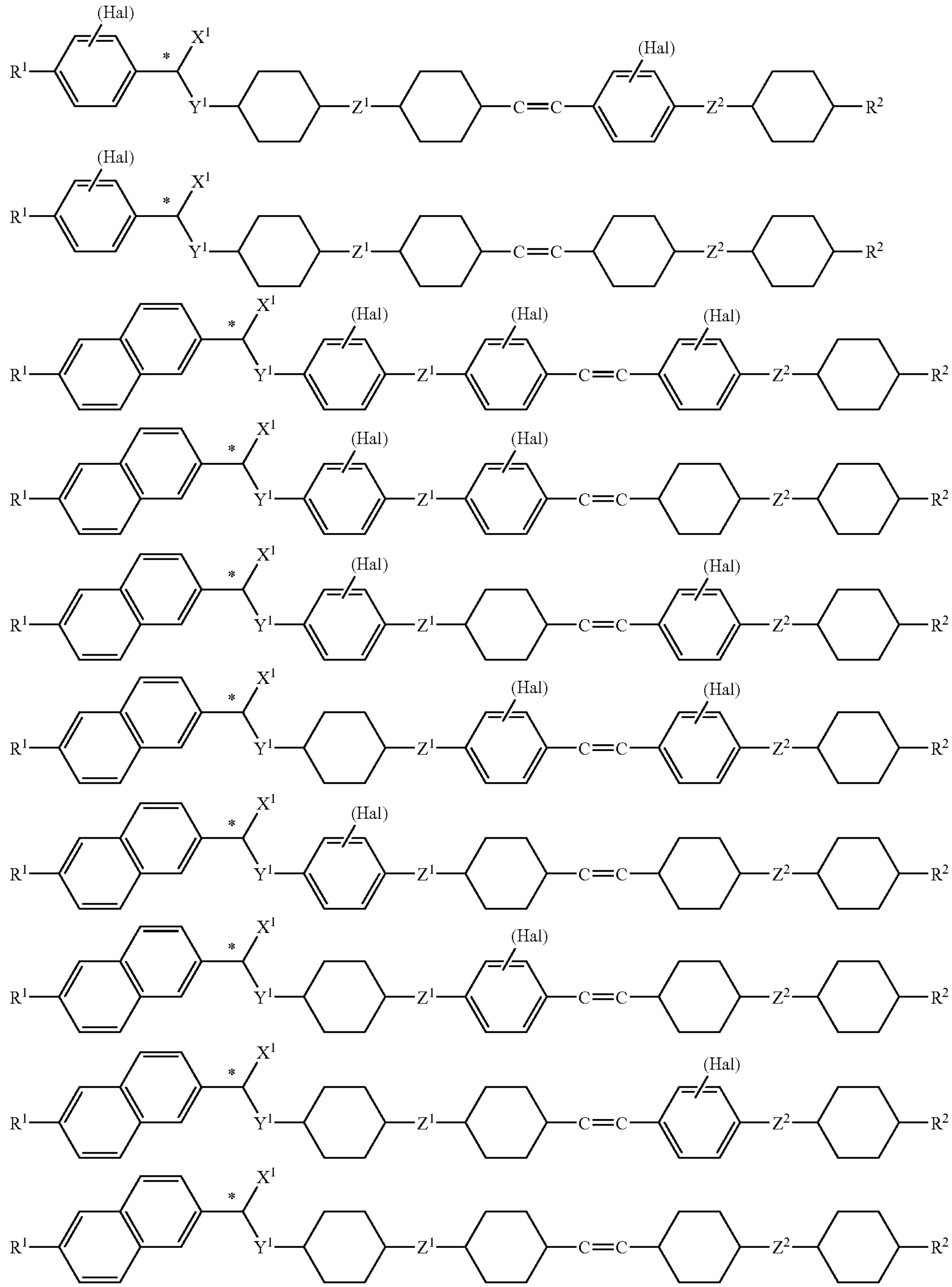

These compounds of the present invention have a high helical twisting power and at the same time, have a high Δn, an extremely high Tc and a low viscosity. Further, they are chemically stable, and are excellent in compatibility with another compound such as another liquid crystal or non-liquid crystal compound.

Among the optically active acetylene derivative compounds of the present invention, particularly tricyclic ones have a low viscosity even though they have a high Tc, and can be used for a liquid crystal composition which increases the speed of response of a liquid crystal electro-optical element, and tetracyclic and pentacyclic ones have an extremely high Tc, and can be used for a liquid crystal composition having a high upper limit of temperature at which a liquid crystal electro-optical element is used.

In a case of producing a liquid crystal composition having a particularly high positive dielectric anisotropy so as to decrease the driving voltage of a liquid crystal electro-optical element, a compound having a high dielectric anisotropy is employed. Such an object can be achieved by the compound of the present invention wherein either one of $R^1$ and $R^2$ is a halogen atom or a cyano group, and/or $A^1$, $A^2$, $A^3$, $A^4$ and/or $A^5$ is a 1,4-phenylene group substituted with one or two halogen atom(s). In such a case, in a case where $R^1$ is a halogen atom or a cyano group, $A^1$, $A^2$, $A^3$, $A^4$ and/or $A^5$ is preferably a 1,4-phenylene group substituted with a halogen atom at the 2- and/or 6-position(s), and in a case where $R^2$ is a halogen atom or a cyano group, $A^1$, $A^2$, $A^3$, $A^4$ and/or $A^5$ is preferably a 1,4-phenylene group substituted with a halogen atom at the 3- and/or 5-position(s).

For a liquid crystal composition employed for a liquid crystal optical element which is driven by application of an electric field in parallel with the long axis direction of molecules of a liquid crystalline compound, a liquid crystal compound having a negative dielectric anisotropy is employed. Such a liquid crystal compound having a negative dielectric anisotropy can be achieved by the compound of the present invention wherein $A^1$, $A^2$, $A^3$, $A^4$ and/or $A^5$ is a 1,4-phenylene group substituted with one or two halogen atom(s) at the 2- and/or 3-position(s).

For a liquid crystal electro-optical element, various types of liquid crystal compounds are mixed and used. Thus, the liquid crystalline compound is required to have favorable compatibility with another liquid crystalline compound. The compounds of the present invention are excellent in compatibility with another compound such as another liquid crystal or non-liquid crystal compound, and a compound wherein $A^1$, $A^2$, $A^3$, $A^4$ and/or $A^5$ is a 1,4-phenylene group substituted with a halogen atom has a particularly improved compatibility. In this case, preferred is a compound wherein $A^2$ and/or $A^3$ is a 1,4-phenylene group substituted with at least one halogen atom at the 3- and/or 5-position(s), or $A^4$ and/or $A^5$ is a 1,4-phenylene group substituted with at least one halogen atom at the 2- and/or 6-position(s), which has a low viscosity.

The helical pitch length induced when an optically active compound is added to a liquid crystal composition is determined by the helical twisting power characteristic to the compound. Thus, in addition to reduce the addition amount, a high helical twisting power is required. The compounds of the present invention have a high helical twisting power, and the helical twisting power becomes higher when $A^1$ and/or $A^2$ is a 1,4-phenylene group substituted with at least one halogen atom. In such a case, $A^1$ is preferably a 1,4-phenylene group substituted with at least halogen atom at the 3- and/or 5-position(s), and $A^2$ is preferably a 1,4-phenylene group substituted with at least one halogen atom at the 2- and/or 6-position(s).

In a case where $A^1$, $A^2$, $A^3$, $A^4$ and/or $A^5$ is substituted with at least one halogen atom, the halogen atom is preferably a chlorine atom and/or a fluorine atom, particularly preferably from 1 to 3 fluorine atom(s).

The halogen atom as each of $R^1$ and $R^2$ is preferably a chlorine atom, a bromine atom or a fluorine atom, particularly preferably a chlorine atom or a fluorine atom.

The $C_{1-10}$ aliphatic hydrocarbon group as each of $R^1$ and $R^2$ may have either linear structure or branched structure. The aliphatic hydrocarbon group is preferably an alkyl group, an alkenyl group or an alkynyl group. The $C_{1-10}$ alkyl group may, for example, be a methyl group, an ethyl group, a propyl group, a butyl group, a pentyl group, a hexyl group, a heptyl group, an octyl group, a nonyl group, a decyl group, an isobutyl group or a 1-methyl-heptyl group. In a case of a $C_{2-10}$ alkenyl group, the carbon-carbon double bond in the group is preferably a trans bond, and particularly preferred is a 3-butenyl group or a 3-trans-pentenyl group. The $C_{1-10}$ aliphatic hydrocarbon group substituted with at least one halogen atom is a group having at least one hydrogen atom in the above aliphatic hydrocarbon group substituted with a halogen atom. The halogen atom is preferably a chlorine atom or a fluorine atom, particularly preferably a fluorine atom.

In a case where each of $R^1$ and $R^2$ is a $C_{1-10}$ aliphatic hydrocarbon group or a $C_{1-10}$ aliphatic hydrocarbon group substituted with at least one halogen atom, an ethereal oxygen atom (—O—) and/or an ester linkage (—COO— and/or —OCO—) may be inserted in the carbon-carbon linkage in the group or in the carbon-carbon linkage connecting the group and the ring. The group having an ethereal oxygen atom and/or an ester linkage inserted thereinto may, for example, be an alkoxy group, an alkoxyalkyl group, an alkoxyalkoxy group, a fluoroalkoxy group, a fluoroalkoxyalkyl group, a perfluoroalkoxyalkyl group, an alkoxycarbonyl group or an alkyl carbonyloxy group.

The alkoxy group may, for example, be a methoxy group, an ethoxy group, a propoxy group, a butoxy group, a pentyloxy group, a hexyloxy group, a heptyloxy group, an octyloxy group, a nonyloxy group, a decyloxy group, an isobutoxy group or a 1-methyl-heptyloxy group. The alkoxyalkyl group may, for example, be a 2-methoxyethyl group, a 2-ethoxyethyl group, a 2-propoxyethyl group, a 2-butoxyethyl group, a 2-pentyloxyethyl group, a 2-isobutoxyethyl group, a 2-(1-methyl-heptyloxy)ethyl group, a 4-methoxybutyl group, a 4-ethoxybutyl group, a 4-propoxybutyl group, a 4-butoxybutyl group or a 4-pentyloxybutyl group. The alkoxyalkoxy group may, for example, be a 2-methoxyethoxy group, a 2-ethoxyethoxy group, a 2-propoxyethoxy group, a 2-butoxyethoxy group, a 2-pentyloxyethoxy group, a 2-isobutoxyethoxy group, a 2-(1-methyl-heptyloxy)ethoxy group, a 4-methoxybutoxy group, a 4-ethoxybutoxy group, a 4-propoxybutoxy group, a 4-butoxybutoxy group or a 4-pentyloxybutoxy group.

In a case where the $C_{1-10}$ aliphatic hydrocarbon group or the $C_{1-10}$ aliphatic hydrocarbon group substituted with at least one halogen atom has a branched structure, an asymmetric carbon atom may be contained in such a group, and the asymmetric carbon atom preferably has e.g. a fluorine atom, a chlorine atom, a methyl group or a trifluoromethyl group bonded thereto.

$R^1$ is preferably a hydrogen atom in view of availability of the material. $X^1$ is preferably —F, —$CH_3$ or —$CF_3$ in view of easiness of production. $Y^1$ is preferably —$CH_2$— or —CO— in view of a high helical twisting power. Each of $Z^1$ and $Z^2$ which are independent of each other, is preferably —COO—, —OCO—, —$CH_2CH_2$—, —C≡C—, —CF═CF— or a single bond.

In a case where a liquid crystal composition is formed by employing the optically active acetylene derivative compound of the present invention, usually at least one type thereof is incorporated in another liquid crystal compound and/or non-liquid crystal compound (hereinafter sometimes another liquid crystal compound and non-liquid crystal compound will generically be referred to as another compound). In such a case, the amount of the optically active acetylene derivative compound of the present invention in the liquid crystal composition optionally varies depending upon e.g. the application, the purpose of use and the type of another compound, but in a usual case, it is preferably from about 0.1 to about 50 parts by mass, particularly preferably from 0.1 to 20 parts by mass in 100 parts by mass of the liquid crystal composition.

Another compound for formation of the above liquid crystal composition optionally varies depending upon the application or characteristics required, but usually preferred is one comprising a liquid crystal compound and a component having a structure similar to the liquid crystal compound as the main components and an additive component as the case requires.

As another compound to be contained in the liquid crystal composition containing the optically active acetylene derivative compound of the present invention, the following examples may be mentioned. In the following formulae, Ph represents a 1,4-phenylene group, Cy represents a trans-1,4-cyclohexylene group, $PhF_2CN$ represents a 3,5-difluoro-4-cyanophenyl group, and each of $R^3$ and $R^4$ represents a group such as an alkyl group, an alkenyl group, an alkynyl group, an alkoxy group, a is halogen atom or a cyano group. $R^3$ and $R^4$ may be the same or different. $X^1$ represents F or a methyl group.

$R^3$-Cy-Cy-$R^4$
$R^3$-Cy-Ph-$R^4$
$R^3$-Cy-$PhF_2CN$
$R^3$-Ph-Ph-$R^4$
$R^3$-Ph-C≡C-Ph-$R^4$
$R^3$-Cy-COO-Ph-$R^4$
$R^3$-Cy-COO-$PhF_2CN$
$R^3$-Ph-COO-Ph-$R^4$
$R^3$-Ph-COO-$PhF_2CN$
$R^3$-Cy-CH═CH-Ph-$R^4$
$R^3$-Ph-CH═CH-Ph-$R^4$
$R^3$-Ph-CF═CF-Ph-$R^4$
$R^3$-Cy-CF═CF-Ph-$R^4$
$R^3$-Cy-CF═CF-Cy-$R^4$
$R^3$-Cy-Ph-CF═CF-Ph-$R^4$
$R^3$-Cy-Ph-CF═CF-Cy-$R^4$
$R^3$-Ph-Cy-CF═CF-Cy-$R^4$
$R^3$-Cy-Cy-CF═CF-Ph-$R^4$
$R^3$-Ph-Ph-CF═CF-Ph-$R^4$
$R^3$-Cy-$CH_2CH_2$-Ph-$R^4$
$R^3$-Cy-Ph-$CH_2CH_2$-Ph-$R^4$
$R^3$-Cy-Ph-$CH_2CH_2$-Cy-$R^4$
$R^3$-Cy-Cy-$CH_2CH_2$-Ph-$R^4$
$R^3$-Ph-$CH_2CH_2$-Ph-$R^4$
$R^3$-Ph-Ph-$CH_2CH_2$-Ph-$R^4$
$R^3$-Ph-Ph-$CH_2CH_2$-Cy-$R^4$
$R^3$-Cy-Ph-Ph-$R^4$
$R^3$-Cy-Ph-$PhF_2CN$
$R^3$-Cy-Ph-C≡C-Ph-$R^4$
$R^3$-Cy-Ph-C≡C-Ph $F_2CN$
$R^3$-Cy-Ph-C≡C-Ph-Cy-$R^4$
$R^3$-Cy-$CH_2CH_2$-Ph-C≡C-Ph-$R^4$
$R^3$-Cy-$CH_2CH_2$-Ph-C≡C-Ph-Cy-$R^4$
$R^3$-Cy-Ph-Ph-Cy-$R^4$
$R^3$-Ph-Ph-Ph-$R^4$
$R^3$-Ph-Ph-C≡C-Ph-$R^4$
$R^3$-Ph-$CH_2CH_2$-Ph-C≡C-Ph-$R^4$
$R^3$-Ph-$CH_2CH_2$-Ph-C≡C-Ph-Cy-$R^4$
$R^3$-Cy-COO-Ph-Ph-$R^4$
$R^3$-Cy-COO-Ph-$PhF_2CN$
$R^3$-Cy-Ph-COO-Ph-$R^4$
$R^3$-Cy-Ph-COO-$PhF_2CN$
$R^3$-Cy-COO-Ph-COO-Ph-$R^4$
$R^3$-Cy-COO-Ph-COO-$PhF_2CN$
$R^3$-Ph-COO-Ph-COO-Ph-$R^4$
$R^3$-Ph-COO-Ph-OCO-Ph-$R^4$
$R^3$-Cy-$CH_2CH_2$-$PhF_2CN$
$R^3$-Ph-$CH_2CH_2$-$PhF_2CN$
$R^3$-Ph-Cy-$CH_2CH_2$-$PhF_2CN$
$R^3$-Cy-Ph-$CH_2CH_2$-$PhF_2CN$
$R^3$-Cy-Cy-$CH_2CH_2$-$PhF_2CN$
$R^3$-Ph-C*$HX^1$—$CH_2$-Ph-$R^4$
$R^3$-Ph-C*$HX^1$—$CH_2$-Cy-$R^4$
$R^3$-Ph-C*$HX^1$—$CH_2$-Ph-Cy-$R^4$
$R^3$-Ph-C*$HX^1$—$CH_2$-Cy-Ph-$R^4$
$R^3$-Ph-C*$HX^1$—$CH_2$-Ph-Ph-$R^4$

These compounds are mentioned as examples, and a hydrogen atom present in the ring structure or the terminal group of these compounds may be substituted with e.g. a halogen atom, a cyano group or a methyl group. Further, the cyclohexane ring or the benzene ring may be changed to another 6-membered ring or a 5-membered ring such as a pyrimidine ring or a dioxane ring, and the binding group between rings may be changed to another bivalent binding group, and various compounds may be selected depending upon the desired performances. Further, as the optically active acetylene derivative compounds of the present invention are compounds excellent in compatibility with another compound, their concentration in the liquid crystal composition can be freely adjusted from the low concentration to the high concentration.

The liquid crystal composition containing the optically active acetylene derivative compound of the present invention is sandwiched between substrates provided with an electrode by e.g. injection into a liquid crystal cell, and may be employed as a liquid crystal electro-optical element of various modes such as twisted nematic mode, guest/host mode, dynamic scattering mode, phase change mode, DAP mode, two-frequency driving mode, ferroelectric liquid crystal display mode and reflective cholesteric liquid crystal display mode.

As a process for producing the liquid crystal electro-optical element, preferably the following process may be mentioned. Namely, on a substrate of e.g. plastic or glass, an undercoat layer of e.g. $SiO_2$ or $Al_2O_3$ or a color filter layer is formed as the case requires, an electrode of e.g. $In_2O_3$—$SnO_2$ (ITO) or $SnO_2$ is formed thereon, followed by patterning, and then an overcoat layer of e.g. polyimide, polyamide, $SiO_2$ or $Al_2O_3$ is formed thereon as the case requires, followed by alignment treatment, and a sealing material is printed thereon, and such substrated are disposed so that the electrode sides face each other and the periphery is sealed, and the sealing material is cured to form an empty cell.

To this empty cell, the liquid crystal composition containing the optically active acetylene derivative compound of the present invention is injected, and the inlet is sealed with a sealing compound to constitute a liquid crystal cell. On this liquid crystal cell, as the case requires, e.g. a deflecting plate, a color deflecting plate, a light source, a color filter, a semipermeable reflecting plate, a reflecting plate, an optical waveguide or an ultraviolet cut filter is laminated, e.g. characters or figures are printed, or a non-glare treatment is carried out as the case requires.

The optically active acetylene derivative compounds of the present invention can easily be produced industrially preferably in accordance with the following process.

First, the compound (1) wherein when m=0, each of $A^2$ and $A^4$ is a non-substituted 1,4-phenylene group or a 1,4-phenylene group substituted with at least one halogen atom, or the compound (1) wherein when m=1, each of $A^3$ and $A^4$ which are independent of each other, is a non-substituted 1,4-phenylene group or a 1,4-phenylene group substituted with at least one halogen atom, may be produced in accordance with the following process.

$$R^1-A^1-C^*HX^1-Y^1-A^2-(Z^1-A^3)_m-Cl$$
(1-2)

$\downarrow$ 1) Mg, EtMgBr/THF $\downarrow$ 2) $I_2$/THF $$R^1-A^1-C^*HX^1-Y^1-A^2-(Z^1-A^3)_m-I$$
(1-3)

$\downarrow$ $HC{\equiv}C-A^4-(Z^2-A^5)_n-R^2$ (1-4)

$\downarrow$ Pd $(PPh_3)_4$, CuI/$Et_3N$ $$R^1-A^1-C^*HX^1-Y^1-A^2-(Z^1-A^3)_m-C{\equiv}C-A^4-(Z^2-A^5)_n-R^2$$
(1)

Namely, a compound of the formula (1-2) produced by a method as disclosed in JP-A-10-251185 or JP-A-11-255675 is formed into a Grignard reagent with magnesium in the presence of ethyl magnesium bromide. Then, iodine is acted thereon to obtain a compound of the formula (1-3). The obtained compound of the formula (1-3) is reacted with a compound of the formula (1-4) in triethylamine in the presence of tetrakis(triphenylphosphine)palladium and copper(I) iodide to obtain the optically active acetylene derivative compound.

The compound of the formula (1-4) may be produced, for example, by the following process.

$$I-A^4-(Z^2-A^5)_n-R^2$$
(1-5)

$\downarrow$ $HO(CH_3)_2CC{\equiv}CH$ $\downarrow$ $Pd(PPh_3)_4$, CuI/$Et_3N$ $$HO(CH_3)_2CC{\equiv}C-A^4-(Z^2-A^5)_n-R^2$$
(1-6)

$\downarrow$ NaH/$Et_3N$ $$HC{\equiv}C-A^4-(Z^2-A^5)_n-R^2$$
(1-4)

Namely, a compound of the formula (1-5) is reacted with 3-methyl-1-butyn-3-ol in triethylamine in the presence of tetrakis(triphenylphosphine)palladium and copper(I) iodide to obtain a compound of the formula (1-6). Sodium hydride is acted on the obtained compound of the formula (1-6) in triethylamine to obtain the compound of the formula (1-4).

The compounds of the present invention can also be produced easily in accordance with the following process.

$$R^1-A^1-C^*HX^1-Y^1-A^2-(Z^1-A^3)_m-Br$$
(1-2')

$\downarrow$ $HC{\equiv}C-A^4-(Z^2-A^5)_n-R^2$ (1-4)

$\downarrow$ Pd $(PPh_3)_4$, CuI/$Et_3N$

-continued $$R^1-A^1-C^*HX^1-Y^1-A^2-(Z^1-A^3)_m-C{\equiv}C-A^4-(Z^2-A^5)_n-R^2$$
(1)

Namely, a compound of the formula (1-2') is reacted with the compound of the formula (4) in triethylamine in the presence of tetrakis(triphenylphosphine)palladium and copper(I) iodide to obtain the compound of the present invention.

The compound (1) wherein when m=0, $A^2$ and/or $A^4$ is a trans-1,4-cyclohexylene group, or the compound of the formula (1) wherein when m=1, $A^3$ and/or $A^4$ is a trans-1,4-cyclohexylene group, may easily be produced preferably in accordance with the following process.

$$R^1-A^1-C^*HX^1-Y^1-A^2-(Z^1-A^3)_m-CHBr-PPh_3Br$$
(1-7)

$\downarrow$ $OHC-A^4-(Z^2-A^5)_n-R^2$ (1-8)/t-BuOK $$R^1-A^1-C^*HX^1-Y^1-A^2-(Z^1-A^3)_m-CBr{=}CH-A^4-(Z^2-A^5)_n-R^2$$
(1-9)

$\downarrow$ t-BuOK $$R^1-A^1-C^*HX^1-Y^1-A^2-(Z^1-A^3)_m-C{\equiv}C-A^4-(Z^2-A^5)_n-R^2$$
(1)

Namely, a phosphonium salt of the formula (1-7) and an aldehyde of the formula (1-8) are reacted in a proper solvent in the presence of a base such as potassium t-butoxide to obtain a vinyl halide derivative of the formula (1-9). The obtained compound of the formula (1-8) is subjected to a dehydrohalogenation reaction in a proper solvent in the presence of a base such as potassium t-butoxide to obtain the optically active acetylene derivative compound.

Needless to say, these production processes are mentioned as examples, and other various production processes can also be employed.

Explanation Regarding the Optically Active Compound of the Above Formula (2)

The optically active compounds of the formula (2) have excellent characteristics such as a low viscosity and a high helical twisting power although they have a tetracyclic structure and have an extremely high clear point (Tc) due to direct binding of the asymmetric carbon atom C* and the ring group $A^1$. Further, the optically active compounds (2) are chemically stable, and are excellent in compatibility with another liquid crystal or non-liquid crystal compound.

As the optically active compounds (2) of the present invention, specifically the following compounds are preferred. In each formula, the carbon atom with a symbol * represents an asymmetric carbon atom, and its absolute configuration may be either R or S. $R^1$, $R^2$, $X^1$, $Y^1$, $Z^1$ and $Z^2$ are as defined for the formula (2). The steric configuration of the 1,4-cyclohexylene group in each formula is trans-form. In each formula, the symbol (Hal) represents that the compound is not substituted or substituted with at least one halogen atom, and in a case where the compound is substituted with at least two halogen atoms, these halogen atoms may be the same or different. In a case where the compound is substituted with at least one halogen atom, in order to represent the substituted position, the substituted position is defined as follows for convenience sake.

-continued
A1
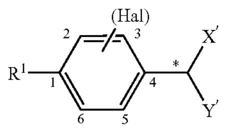
A2
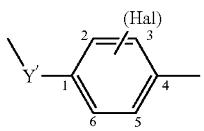
A3
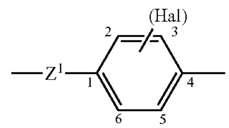
A4
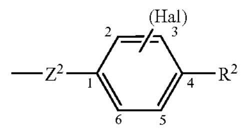
As examples of the compounds, the following may be preferably mentioned.
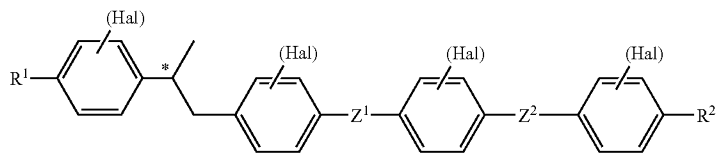
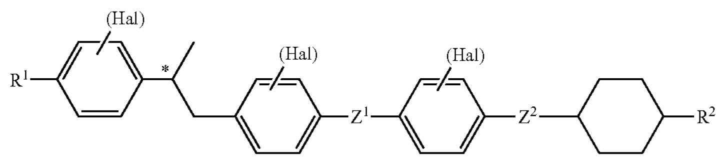
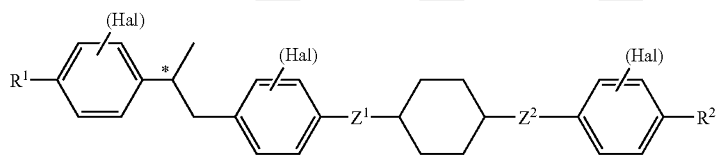
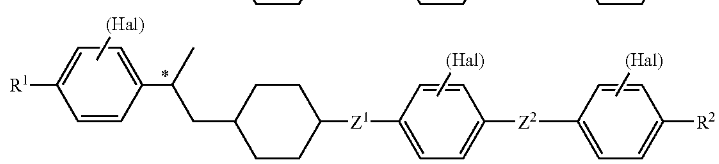
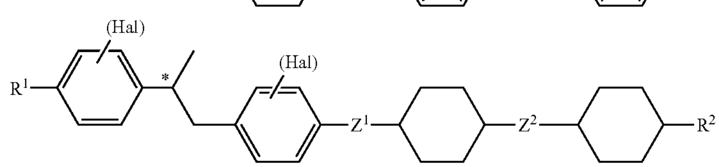
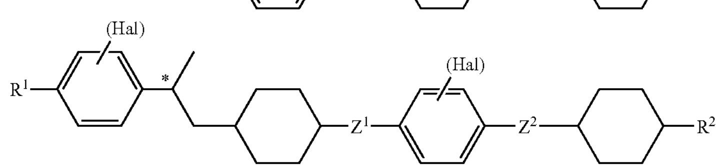
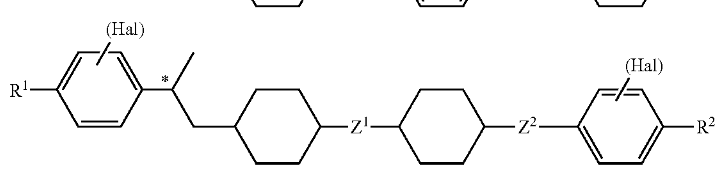
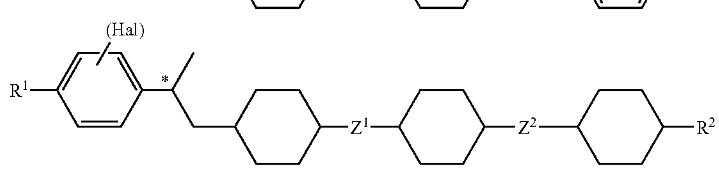

-continued

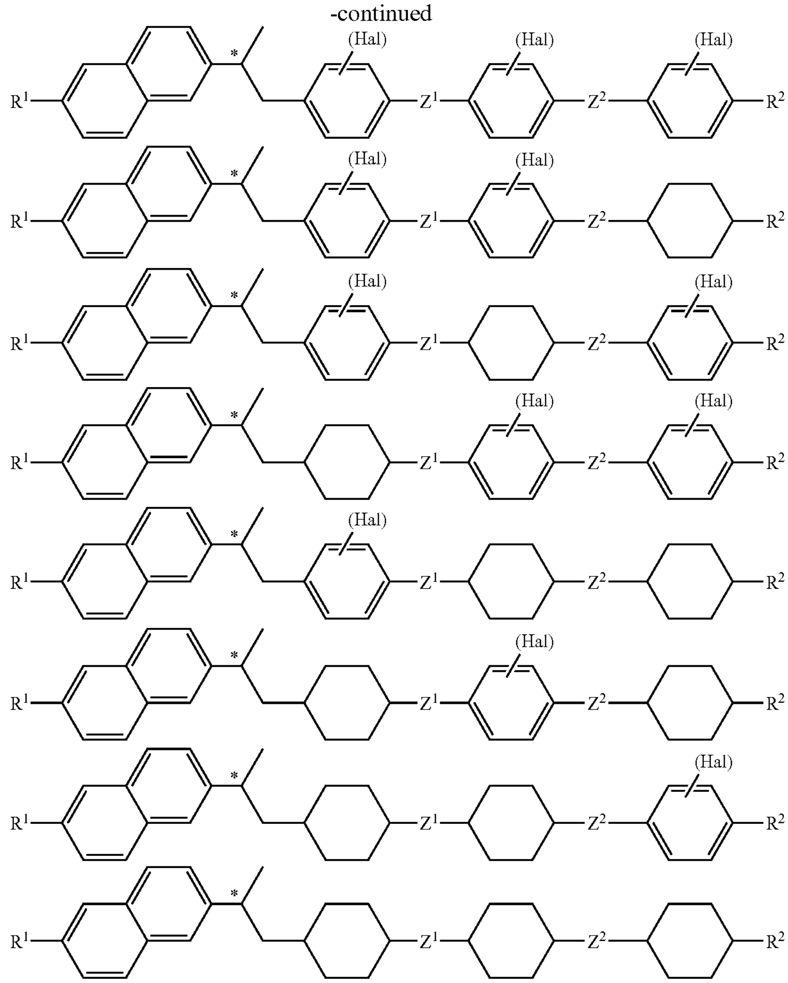

These optically active compounds of t he present invention have a high helical twisting power and at the same time, have an extremely high clear point (Tc) and a low viscosity. Further, they are chemically stable, and are excellent in compatibility with another compound such as another liquid crystal or non-liquid crystal compound.

In a case where a liquid crystal composition having a particularly high positive dielectric anisotropy is produced so as to decrease the driving voltage of the liquid crystal electro-optical element, a compound having a high dielectric anisotropy is employed. Such an object may be achieved by a compound wherein either one of $R^1$ and $R^2$ is a halogen atom or a cyano group, and/or at least one of $A^1$, $A^2$, $A^3$ or $A^4$ is a 1,4-phenylene group having one or two halogen atom(s). In such a case, in a case where $R^1$ is a halogen atom or a cyano group, at least one of $A^1$, $A^2$, $A^3$ and $A^4$ is preferably a 1,4-phenylene group having a halogen atom at the 2- and/or 6-position(s), and in a case where $R^2$ is a halogen atom or a cyano group, at least one of $A^1$, $A^2$, $A^3$ and $A^4$ is preferably a 1,4-phenylene group having a halogen atom at the 3- and/or 5-position(s).

For a liquid crystal composition employed for a liquid crystal electro-optical element which is driven by applying an electric field in parallel with the molecular long axis direction of a liquid crystal compound, a compound having a negative dielectric anisotropy is employed. The compound having a negative dielectric anisotropy may be achieved by a compound wherein at least one of $A^1$, $A^2$, $A^3$ and $A^4$ is a 1,4-phenylene group having a halogen atom at the 2- and/or 3-position(s).

For a liquid crystal composition employed for a liquid crystal electro-optical element, several types of liquid crystalline or non-liquid crystalline compounds are mixed. Thus, the optically active compound is required to have good compatibility with another liquid crystalline or non-liquid crystalline compounds. The optically active compounds (2) of the present invention are excellent in compatibility with another liquid crystalline or non-liquid crystalline compound, and compatibility will more improve with a compound wherein at least one of $A^1$, $A^2$, $A^3$ and $A^4$ is a 1,4-phenylene group having a halogen atom.

The helical pitch length induced when the optically active compound is added to the liquid crystal composition is determined by the helical twisting power characteristic to the compound. As described above, addition of a large amount of the optically active compound decreases performances of the liquid crystal material, and thus the optically active compound is required to have a high helical twisting power to decrease the addition amount.

The optically active compounds (2) of the present invention have a high helical twisting power, and the helical twisting power can be made higher by employing a compound wherein $A^1$ and/or $A^2$ is a 1,4-phenylene group having at least one halogen atom. In such a case, $A^1$ is preferably a 1,4-phenylene group having a halogen atom at the 3- and/or 5-position(s), and $A^2$ is preferably a 1,4-phenylene group having a halogen atom at the 2- and/or 6-position(s).

In a case where each of $A^1$, $A^2$, $A^3$ and $A^4$ has at least one halogen atom(s), the halogen atom is preferably a chlorine atom and/or a fluorine atom, particularly preferably from 1 to 3 fluorine atom(s).

In a case where each of $R^1$ and $R^2$ is a halogen atom, preferred is a chlorine atom, a bromine atom or a fluorine atom, particularly preferred is a chlorine atom or a fluorine atom.

Each of $R^1$ and $R^2$ which are independent of each other, is a hydrogen atom, a $C_{1-10}$ aliphatic hydrocarbon group or a $C_{1-10}$ aliphatic hydrocarbon group having at least one halogen atom, and $R^1$ is preferably a hydrogen atom in view of a high helical twisting power and availability of the material.

The $C_{1-10}$ aliphatic hydrocarbon group as each of $R^1$ and $R^2$ may have a linear structure or a branched structure. The aliphatic hydrocarbon group is preferably an alkyl group, an alkenyl group or an alkynyl group. The $C_{1-10}$ alkyl group may, for example, be a methyl group, an ethyl group, a propyl group, a butyl group, a pentyl group, a hexyl group, a heptyl group, an octyl group, a nonyl group, a decyl group, an isobutyl group or a 1-methyl-heptyl group. The $C_{1-10}$ alkenyl group is preferably one wherein the carbon-carbon double bond is a trans-bond, particularly preferably a 3-butenyl group or a 3-trans-pentenyl group.

The $C_{1-10}$ aliphatic hydrocarbon group having at least one halogen atom may be a group having at least one hydrogen atom in the above aliphatic hydrocarbon group substituted with a halogen atom. The halogen atom is preferably a chlorine atom and/or a fluorine atom, particularly preferably a fluorine atom.

In a case where each of $R^1$ and $R^2$ is a $C_{1-10}$ aliphatic hydrocarbon group or a $C_{1-10}$ aliphatic hydrocarbon group having at least one halogen atom, an ethereal oxygen atom (—O—) and/or an ester linkage (—COO— and/or —OCO—) may be inserted in the carbon-carbon linkage in the group and/or in the carbon-carbon linkage connecting the group and the ring. The group having an ethereal oxygen atom and/or ester linkage inserted thereinto may, for example, be an alkoxy group, an alkoxyalkyl group, an alkoxyalkoxy group, a fluoroalkoxy group, a fluoroalkoxyalkyl group, a perfluoroalkoxyalkyl group, an alkoxycarbonyl group or an alkylcarbonyloxy group.

The alkoxy group may, for example, be a methoxy group, an ethoxy group, a propoxy group, a butoxy group, a pentyloxy group, a hexyloxy group, a heptyloxy group, an octyloxy group, a nonyloxy group, a decyloxy group, an isobutoxy group or a 1-methyl-heptyloxy group.

The alkoxyalkyl group may, for example, be a 2-methoxyethyl group, a 2-ethoxyethyl group, a 2-propoxyethyl group, a 2-butoxyethyl group, a 2-pentyloxyethyl group, a 2-isobutoxyethyl group, a 2-(1-methyl-heptyloxy)ethyl group, a 4-methoxybutyl group, a 4-ethoxybutyl group, a 4-propoxybutyl group, a 4-butoxybutyl group or a 4-pentyloxybutyl group.

The alkoxyalkoxy group may, for example, be a 2-methoxyethoxy group, a 2-ethoxyethoxy group, a 2-propoxyethoxy group, a 2-butoxyethoxy group, a 2-pentyloxyethoxy group, a 2-isobutoxyethoxy group, a 2-(1-methyl-heptyloxy) ethoxy group, a 4-methoxybutoxy group, a 4-ethoxybutoxy group, a 4-propoxybutoxy group, a 4-butoxybutoxy group or a 4-pentyloxybutoxy group.

In a case where the $C_{1-10}$ aliphatic hydrocarbon group or the $C_{1-10}$ aliphatic hydrocarbon group having at least one halogen atom has a branched structure, an asymmetric carbon atom may be contained in such a group, and the asymmetric carbon atom preferably has e.g. a fluorine atom, a chlorine atom, a methyl group or a trifluoromethyl group bonded thereto.

$X^1$ is preferably —F, —$CH_3$ or —$CF_3$ in view of easiness of synthesis, and $Y^1$ is preferably —$CH_2$— or —CO— since a particularly high helical twisting power will be obtained.

Each of $Z^1$ and $Z^2$ which are independent of each other, is preferably —COO—, —OCO—, —$CH_2CH_2$—, —CF=CF— or a single bond.

Among these optically active compounds (2), (a) an optically active compound wherein $A^1$ is a non-substituted 1,4-phenylene group or a 1,4-phenylene group having from 1 to 2 fluorine atom(s), X is —$CH_3$ and Y is —$CH_2$— is one of particularly preferred embodiments since it has a particularly low viscosity and a high helical twisting power.

Further, in addition to (a), (b) an optically active compound wherein each of $A^2$, $A^3$ and $A^4$ which are independent of one another, is a non-substituted 1,4-phenylene group, a 1,4-phenylene group having from 1 to 2 fluorine atom(s) or a non-substituted trans-1,4-cyclohexylene group, and each of $Z^1$ and $Z^2$ which are independent of each other, is —COO—, —$CH_2CH_2$— or a single bond, is one of particularly preferred embodiments since it has a low viscosity and high helical twisting power.

Further, in addition to (a) and (b), (c) an optically active compound wherein $A^4$ is a 1,4-phenylene group having from 1 to 2 fluorine atom(s), and $R^2$ is a cyano group, is one of particularly preferred embodiments since it has a high positive dielectric anisotropy, and it is thereby effective to decrease the driving voltage of a liquid crystal electro-optical element.

Further, in addition to (a) and (b), an optically active compound wherein $A^2$ is a 1,4-phenylene group having from 1 to 2 fluorine atom(s) is one of particularly preferred embodiments since it has a particularly high helical twisting power.

Here, of the optically active compounds (1) of the present invention, a case where each of $A^1$ and $A^2$ is a non-substituted 1,4-phenylene group, each of $A^3$ and $A^4$ is a non-substituted trans-1,4-cyclohexylene group, each of $Z^1$ and $Z^2$ is a single bond, $X^1$ is $CH_3$, $Y^1$ is —$CH_2$—, and each of $R^1$ and $R^2$ is a $C_{1-10}$ alkyl group, an alkoxy group, an alkenyl group or a hydrogen atom, and a case where $A^1$ is a non-substituted 1,4-phenylene group, each of $A^2$, $A^3$ and $A^4$ is a non-substituted trans-1,4-cyclohexylene group, each of $Z^1$ and $Z^2$ is a single bond, $X^1$ is —$CH_3$, $Y^1$ is —$CH_2$—, and each of $R^1$ and $R^2$ is a $C_{1-10}$ alkyl group, an alkoxy group, an alkenyl group or a hydrogen atom, are preferably excluded.

Such optically active compounds (2) are chemically stable, and excellent in compatibility with another liquid crystalline or non-liquid crystalline compound, and accordingly they can be mixed with such a compound to obtain a liquid crystal composition, and it can further raise the clear point (Tc) without increasing the viscosity of the liquid crystal composition. Accordingly, the liquid crystal composition is a composition excellent for production of a liquid crystal electro-optical element which has a high speed of response and a wide range of operating temperature.

In order to obtain a liquid crystal composition, usually at least one type of the optically active compound (2) of the present invention is incorporated in another liquid crystalline compound and/or non-liquid crystalline compound (hereinafter sometimes another liquid crystalline compound and non-liquid crystalline compound will generically be referred to as another compound). The amount of the optically active compound (2) in the liquid crystal composition optionally varies depending upon e.g. the application, the purpose of use and the type of another compound, but in a usual case, it is preferably from 0.1 to 50 parts by mass, particularly preferably from 0.1 to 20 parts by mass in 100 parts by mass of the liquid crystal composition.

Another compound to be used to obtain the liquid crystal composition optionally varies depending upon e.g. the application or the performances required, but usually preferred is one comprising a liquid crystalline compound and a component having a structure similar to that of the liquid crystalline compound as the main components and an additive component as the case requires.

With respect to the liquid crystal composition containing the optically active compound (2), examples of another compound contained in the composition are as follows. In the following formulae, Ph represents a 1,4-phenylene group, Cy represents a trans-1,4-cyclohexylene group, $PhF_2CN$ represents a 3,5-difluoro-4-cyanophenyl group, and each of $R^3$ and $R^4$ represents a group such as an alkyl group, an alkenyl group, an alkynyl group, an alkoxy group, a halogen atom or a cyano group. $R^3$ and $R^4$ may be the same or different. $X^1$ represents F or a methyl group.

$R^3$-Cy-Cy-$R^4$
$R^3$-Cy-Ph-$R^4$
$R^3$-Cy-$PhF_2CN$
$R^3$-Ph-Ph-$R^4$
$R^3$-Ph-C≡C-Ph-$R^4$
$R^3$-Cy-COO-Ph-$R^4$
$R^3$-Cy-COO-$PhF_2CN$
$R^3$-Ph-COO-Ph-$R^4$
$R^3$-Ph-COO-$PhF_2CN$
$R^3$-Cy-CH═CH-Ph-$R^4$
$R^3$-Ph-CH═CH-Ph-$R^4$
$R^3$-Ph-CF═CF-Ph-$R^4$
$R^3$-Cy-CF═CF-Ph-$R^4$
$R^3$-Cy-CF═CF-Cy-$R^4$
$R^3$-Cy-Ph-CF═CF-Ph-$R^4$
$R^3$-Cy-Ph-CF═CF-Cy-$R^4$
$R^3$-Ph-Cy-CF═CF-Cy-$R^4$
$R^3$-Cy-Cy-CF═CF-Ph-$R^4$
$R^3$-Ph-Ph-CF═CF-Ph-$R^4$
$R^3$-Cy-$CH_2CH_2$-Ph-$R^4$
$R^3$-Cy-Ph-$CH_2CH_2$-Ph-$R^4$
$R^3$-Cy-Ph-$CH_2CH_2$-Cy-$R^4$
$R^3$-Cy-Cy-$CH_2CH_2$-Ph-$R^4$
$R^3$-Ph-$CH_2CH_2$-Ph-$R^4$
$R^3$-Ph-Ph-$CH_2CH_2$-Ph-$R^4$
$R^3$-Ph-Ph-$CH_2CH_2$-Cy-$R^4$
$R^3$-Cy-Ph-Ph-$R^4$
$R^3$-Cy-Ph-$PhF_2CN$
$R^3$-Cy-Ph-C≡C-Ph-$R^4$
$R^3$-Cy-Ph-C≡C-$PhF_2CN$
$R^3$-Cy-Ph-C≡C-Ph-Cy-$R^4$
$R^3$-Cy-$CH_2CH_2$-Ph-C≡C-Ph-$R^4$
$R^3$-Cy-$CH_2CH_2$-Ph-C≡C-Ph-Cy-$R^4$
$R^3$-Cy-Ph-Ph-Cy-$R^4$
$R^3$-Ph-Ph-Ph-$R^4$
$R^3$-Ph-Ph-C≡C-Ph-$R^4$
$R^3$-Ph-$CH_2CH_2$-Ph-C≡C-Ph-$R^4$
$R^3$-Ph-$CH_2CH_2$-Ph-C≡C-Ph-Cy-Ry
$R^3$-Cy-COO-Ph-Ph-$R^4$
$R^3$-Cy-COO-Ph-$PhF_2CN$
$R^3$-Cy-Ph-COO-Ph-$R^4$
$R^3$-Cy-Ph-COO-$PhF_2CN$
$R^3$-Cy-COO-Ph-COO-Ph-$R^4$
$R^3$-Cy-COO-Ph-COO-$PhF_2CN$
$R^3$-Ph-COO-Ph-COO-Ph-$R^4$
$R^3$-Ph-COO-Ph-OCO-Ph-$R^4$
$R^3$-Cy-$CH_2CH_2$-$PhF_2CN$
$R^3$-Ph-$CH_2CH_2$-$PhF_2CN$
$R^3$-Ph-Cy-$CH_2CH_2$-$PhF_2CN$
$R^3$-Cy-Ph-$CH_2CH_2$-$PhF_2CN$
$R^3$-Cy-Cy-$CH_2CH_2$-$PhF_2CN$
$R^3$-Ph-C*$HX^1$—$CH_2$-Ph-$R^4$
$R^3$-Ph-C*$HX^1$—$CH_2$-Cy-$R^4$
$R^3$-Ph-C*$HX^1$—$CH_2$-Ph-Cy-$R^4$
$R^3$-Ph-C*$HX^1$—$CH_2$-Cy-Ph-$R^4$
$R^3$-Ph-C*$HX^1$—$CH_2$-Ph-Ph-$R^4$

These compounds are mentioned as examples, and a hydrogen atom in the ring structure or the terminal group $R^3$ or $R^4$ in these compounds may be substituted with e.g. a halogen atom, a cyano group or a methyl group. Further, the trans-1,4-cyclohexylene group or the 1,4-phenylene group may be substituted with another 6-membered ring or 5-membered ring such as a pyrimidine ring or a dioxane ring, and the binding group between rings may be substituted with e.g. another bivalent binding group, and various compounds may be selected depending upon the required performances. Further, the optically active compounds (2) are excellent in compatibility with another compound, whereby the concentration of the optically active compound (2) in the liquid crystal composition can be freely adjusted from the low concentration to the high concentration.

Such a liquid crystal composition of the present invention may be sandwiched between substrates provided with an electrode by e.g. injection into a liquid crystal cell, and may be employed as a liquid crystal electro-optical element of various modes such as twisted nematic mode, guest/host mode, dynamic scattering mode, phase change mode, DAP mode, two-frequency driving mode, ferroelectric liquid crystal display mode and reflective cholesteric liquid crystal display mode.

As a process for producing a liquid crystal electro-optical element, basically the following process may be mentioned. Namely, on a substrate of e.g. plastic or glass, an undercoat layer of e.g. $SiO_2$ or $Al_2O_3$ or a color filter layer is formed as the case requires, an electrode of e.g. $In_2O_3$—$SnO_2$ (ITO) or $SnO_2$ is formed thereon, followed by patterning, and then an overcoat layer of e.g. polyimide, polyamide, $SiO_2$ or $Al_2O_3$ is formed as the case requires, followed by alignment treatment, and a sealing material is printed thereon, and such substrates are disposed so that the electrode sides face each other and the periphery is sealed, and the sealing agent is cured to form an empty cell.

The liquid crystal composition of the present invention is injected into this empty cell, and the inlet is sealed with a sealing compound to constitute a liquid crystal cell. On the liquid crystal cell, as the case requires, e.g. a deflecting plate, a color deflecting plate, a light source, a color filter, a semipermeable reflecting plate, a reflecting plate, an optical waveguide or an ultraviolet cut filter may be laminated, e.g. characters or figures are printed, or a nonglare treatment is carried out, to produce a liquid crystal electro-optical element.

Since the optically active compounds (2) of the present invention has a high helical twisting power, a liquid crystal composition having an aimed helical pitch can be obtained by addition of a small amount to the liquid crystal composition as compared with a conventional optically active compound.

Thus, when the liquid crystal composition is employed to obtain a TN or STN liquid crystal electro-optical element, uniform, twist alignment can be achieved, and when it is employed to obtain a reflective cholesteric liquid crystal electro-optical element, an aimed reflection wavelength can be obtained.

The liquid crystal composition containing the optically active compound (2) of the present invention can be used also as a liquid crystal electro-optical element of various modes such as an active matrix element, a polymer dispersion liquid crystal element, a GH liquid crystal element employing a polychromatic colorant and a ferroelectric liquid crystal element. Further, it may also be used for applications other than for display, such as a dimmer element, a dimmer window, an optical shutter, a polarization exchange element, a varifocal lens, an optical color filter, a colored film, an optical recording element and a temperature indicator.

The optically active compounds (2) of the present invention can easily be produced industrially in accordance with the following process. In easy formula, C*, $A^1$, $A^2$, $A^3$, $A^4$, $R^1$, $R^2$, $Z^1$, $Z^2$, $X^1$ and $Y^1$ are as defined above.

[Process 1]

In a case where $Y^1$ is —CO—, —$CH_2$CO— or —$CH_2CH_2$CO—, and each of $Z^1$ and $Z^2$ is not —COO— or —OCO—

$$R^1—A^1—C^*HX^1—(CH_2)_k—COOH \quad (2\text{-}1)$$

$$\downarrow SOCl_2$$

$$R^1—A^1—C^*HX^1—(CH_2)_k—COCl \quad (2\text{-}3)$$

$$\downarrow AlCl_3,\ H—A^2—Z^1—A^3—Z^2—A^4—R^2 \quad (2\text{-}4)$$

$$R^1—A^1—C^*HX^1—Y^1—A^2—Z^1—A^3—Z^2—A^4—R^2 \quad (2)$$

An optically active carboxylic acid (2-1) is subjected to acid chloridation with e.g. thionyl chloride to obtain an acid chloride (2-3), which is subjected to Friedel-Crafts reaction with a benzene derivative (2-4) in the presence of a Lewis acid such as aluminum chloride to obtain an aimed compound (2). In each reaction, the optical purity of the optically active compound of each formula is maintained. In each of the formulae (2-2) and (2-3), k is 0, 1 or 2.

[Process 2]

In a case where $Y^1$ is —CO$CH_2$—, —$CH_2$CO$CH_2$— or —CO$CH_2CH_2$—, and each of $Z^1$ and $Z^2$ is not —COO— or —OCO—

$$R^1—A^1—C^*HX^1—(CH_2)_k—COCl \quad (2\text{-}3)$$

$$\downarrow Fe\,(acac)_3$$

$$\downarrow BrMg—(CH_2)_l—A^2—Z^1—A^3—Z^2—A^4—R^2 \quad (2\text{-}5)$$

-continued $$R^1—A^1—C^*HX^1—Y^1—A^2—Z^1—A^3—Z^2—A^4—R^2 \quad (2)$$

An acid chloride (2-3) is reacted with a Grignard reagent (2-5) in the presence of an organic metal catalyst such as iron(III) acetylacetonate to obtain an aimed compound (2). In each reaction, the optical purity of the optically active compound of each formula is maintained. In the formula (2-3), k is 0 or 1, and in the formula (2-5), l is 1 or 2, and k+l is at most 2.

[Process 3]

In a case where $Y^1$ is —$CH_2$CO—, —$CH_2CH_2$CO— or —$CH_2$CO$CH_2$—, and each of $Z^1$ and $Z^2$ is not —COO— or —OCO—

$$R^1—A^1—C^*HX^1—(CH_2)_k—Br \quad (2\text{-}6)$$

$$\downarrow Mg$$

$$R^1—A^1—C^*HX^1—(CH_2)_k—MgBr \quad (2\text{-}7)$$

$$\downarrow Fe\,(acac)_3,$$

$$\downarrow ClCO—(CH_2)_l—A^2—Z^1—A^3—Z^2—A^4—R^2 \quad (2\text{-}8)$$

$$R^1—A^1—C^*HX^1—Y^1—A^2—Z^1—A^3—Z^2—A^4—R^2 \quad (2)$$

An optically active bromide (2-6) is formed into a Grignard reagent (2-7) with magnesium, which is reacted with an acid chloride (2-8) in the presence of an organic metal catalyst such as iron(III) acetylacetonate to obtain an aimed compound (2). In each reaction, the optical purity of the optically active compound of each formula is maintained. In each of the formulae (2-6) and (2-7), k is 1 or 2, and in the formula (2-8), l is 0 or 1, and k+l is at most 2.

[Process 4]

In a case where $Y^1$ is —$CH_2$—, —$CH_2CH_2$— or —$CH_2CH_2CH_2$—, and each of $Z^1$ and $Z^2$ is not —COO— or —OCO—

$$R^1—A^1—C^*HX^1—(CH_2)_k—CO—(CH_2)_l—A^2—Z^1—A^3—Z^2—A^4—R^2 \quad (2\text{-}9)$$

$$\downarrow$$

$$\downarrow Et_3SiH,\ CF_3COOH$$

$$R^1—A^1—C^*HX^1—Y^1—A^2—Z^1—A^3—Z^2—A^4—R^2 \quad (2)$$

A ketone compound (2-9) is reduced with a reducing agent such as triethylsilane in the presence of trifluoroacetic acid to obtain an aimed compound (2). The optical purity of the optical active compound of each formula is maintained. In the formula (9), each of k and l is 0, 1 or 2, and k+l is at most 2.

[Process 5]

In a case where $Z^1$ is —COO—

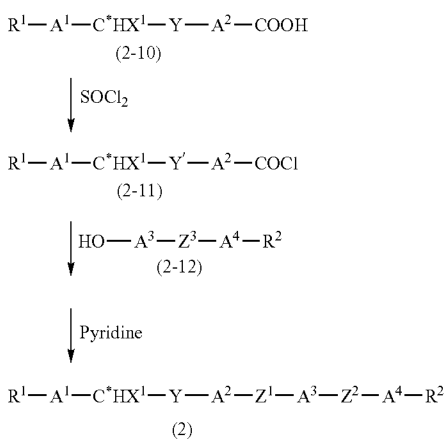

[Process 6]

In a case where $Z^2$ is —COO—

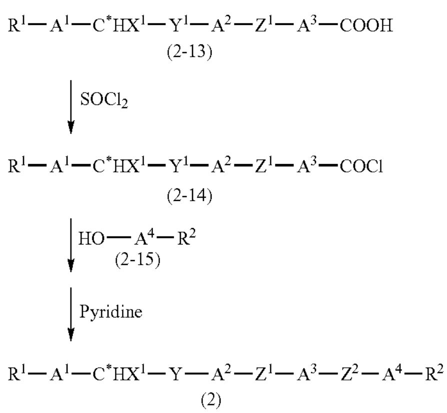

[Process 7]

In a case where $Z^1$ is —OCO—

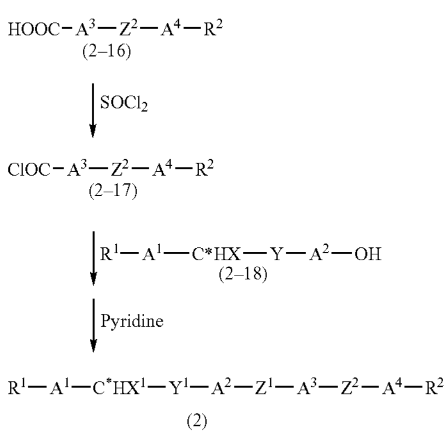

[Process 8]

In a case where $Z^2$ is —OCO—

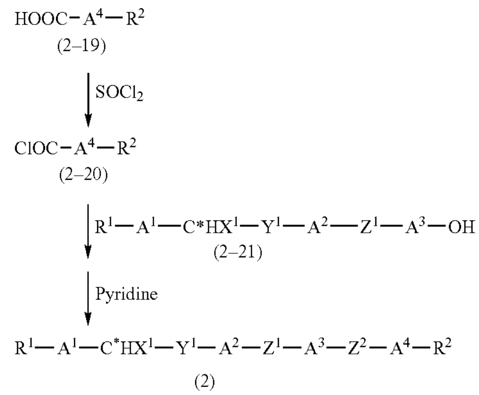

In each of Processes 5, 6, 7 and 8, a corresponding carboxylic acid is subjected to acid chloridation with e.g. thionyl chloride to obtain an acid chloride, which is reacted with phenol or an alcohol in the presence of pyridine to obtain an aimed compound (1).

[Process 9]

In a case where $A^2$ is a non-substituted trans-1,4-cyclohexylene group

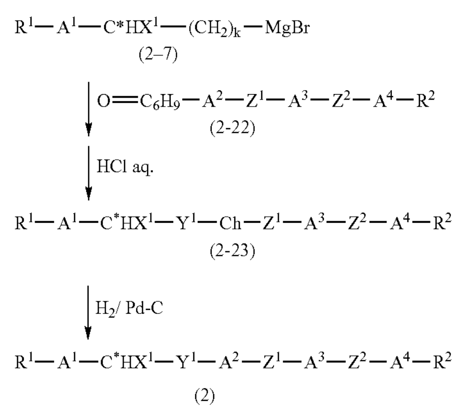

A Grignard reagent (2-7) is reacted with a cyclohexanone derivative (2-22) and refluxed in hydrochloric acid for dehydration to obtain a cyclohexane compound (2-23), which is subjected to hydrogenation in the presence of a palladium carbon catalyst to obtain an aimed compound (2). Ch represents a 1,4-cyclohexenylene group, and $O{=}C_6H_9$— represents a 4-oxocyclohexyl group. In each reaction, the optical purity of the optically active compound of each formula is maintained.

The above processes are processes which can maintain the absolute configuration of the material, and thus the material compound may optionally be changed depending upon the absolute configuration of the aimed optically active compound (2). Such production processes are mentioned only as examples, and various production processes may be employed.

Explanation Regarding the Optically Active Compound of the Above Formula (3)

The optically active compounds of the formula (3) are optically active compounds containing an asymmetric carbon atom (C*) in their structures. In the present specification, the following symbols have the following meanings.

Ph: a non-substituted 1,4-phenylene group, $Ph^F$: a monofluoro-1,4-phenylene group (the position of the fluorine atom is not particularly limited), $Ph^{2F}$: a difluoro-1,4-phenylene group (the positions of the fluorine atoms are not particularly limited). Further, the substituted or non-substituted 1,4-phenylene group and the non-substituted trans-1,4-cyclohexylene group will generically be referred to as "ring group".

Of the compound of the formula (3), the absolute configuration of the group bonded to the asymmetric carbon atom may be either R or S.

In the compound (3), $R^5$ is preferably a hydrogen atom, a $C_{1-10}$ alkyl group or a $C_{1-10}$ alkoxy group. $R^5$ is preferably a hydrogen atom, a $C_{1-3}$ alkyl group or a methoxy group, particularly preferably a hydrogen atom.

$R^6$ may be a $C_{1-10}$ monovalent aliphatic hydrocarbon group which may have an oxygen atom inserted in the carbon-carbon linkage, and of which at least one hydrogen atom may be substituted with a fluorine atom (hereinafter "$C_{1-10}$ monovalent aliphatic hydrocarbon group which may have an oxygen atom inserted in the carbon-carbon linkage, and of which at least one hydrogen atom may be substituted with a fluorine atom" will sometimes be referred to as "Ra group"), a hydrogen atom, a halogen atom or a cyano group.

In a case where $R^6$ is an Ra group, the Ra group may be an alkyl group containing no saturated group, or one containing an unsaturated group such as an alkenyl group, an alkapolyenyl group, an alkynyl group or an alkapolyynyl group.

$R^6$ is preferably a hydrogen atom, a halogen atom, a $C_{1-10}$ alkyl group, a $C_{2-10}$ alkenyl group (in a case where the alkenyl group may be a cis-alkenyl group or a trans-alkenyl group, a trans-alkenyl group is more preferred), a $C_{2-10}$ alkynyl group or a $C_{1-10}$ alkoxy group. Particularly preferred is a hydrogen atom, a fluorine atom, a $C_{1-8}$ alkyl group or a $C_{1-8}$ alkoxy group. The Ra group preferably has a linear structure.

Further, the Ra group may contain an asymmetric carbon atom. The alkyl group containing an asymmetric carbon atom as Ra may, for example, be $CH_3CH_2)_4$—C*H($CH_3$)—, $CH_3(CH_2)_5$—C*H($CH_3$)—, $CH_3CH_2$—C*H($CH_3$)—$CH_2$— or H. The alkoxy group containing an asymmetric carbon atom may, for example, be $CH_3(CH_2)_5$—C*H($CH_3$)O— or $CH_3(CH_2)_4$—C*H($CH_3$)O—. The absolute configuration of the group which is bonded to the asymmetric carbon atom is not particularly limited.

Further, Ra in a case of an alkenyl group is preferably a trans-3-pentenyl group or a 3-butenyl group.

As Ra, a polyfluoroalkyl group such as a perfluoroalkyl group or a polyfluoro(alkoxyalkyl) group is also preferred, and a trifluoromethyl group, a trifluoromethoxy group or a 2,2,2-trifluoroethoxy group may, for example, be mentioned.

Further, as Ra, an alkoxyalkyl group is also preferred, and an ethoxymethyl group may, for example, be mentioned.

In the compound (3), Pn is a 1,4-phenylene group of which at least one hydrogen atom may be substituted with a halogen atom. As Pn, a non-substituted 1,4-phenylene group is preferred.

Each of $A^6$ and $A^7$ which may be the same or different, is preferably a non-substituted 1,4-phenylene group or a non-substituted trans-1,4-cyclohexylene group.

In a case where each of $A^6$ and $A^7$ is a 1,4-phenylene group of which at least one hydrogen atom is substituted with a halogen atom, the halogen atom is preferably a fluorine atom, and particularly preferred is a monofluoro-1,4-phenylene group or a difluoro-1,4-phenylene group. The position substituted with a halogen atom is not particularly limited.

$X^2$ is preferably a fluorine atom, a methyl group or a trifluoromethyl group, particularly preferably a methyl group.

$Y^2$ represents a —C(O)O— group (carbonyloxy group) or a —OC(O)— group (oxycarbonyl group).

Now, the compounds (3) of the present invention will be explained below. The part corresponding to —C*HX— will sometimes be referred to simply as —CHX—, and the absolute configuration of the group which is bonded to the asymmetric carbon atom is not particularly limited unless otherwise specified. In the following explanation, an alkyl group such as $C_3H_7$— or $C_6H_{13}$— represents a linear alkyl group. Each of $Pn^1$ and $Pn^2$ which are independent of each other, is a 1,4-phenylene group of which at least one hydrogen atom may be substituted with a halogen atom, and Cy is a non-substituted trans-1,4-cyclohexylene group.

Among the above compounds (3), the following compounds of the formulae 5 to 8 are preferably mentioned.

$R^5$-Pn-C*H$X^2$$CH_2$-$Pn^1$-$Y^2$-$Pn^2$-$R^6$ Formula 5

$R^5$-Pn-C*H$X^2$—$CH_2$-$Pn^1$-$Y^2$-Cy-$R^6$ Formula 6

$R^5$-Pn-C*H$X^2$—$CH_2$-Cy-$Y^2$-$Pn^2$-$R^6$ Formula 7

$R^5$-Pn-C*H$X^2$—$CH_2$-Cy-$Y^2$-Cy-$R^6$ Formula 8

Further, the following compounds of the formulae 9 and 10 may also be preferably mentioned.

H-Pn-C*H($CH^3$)—$CH_2$-$Pn^1$-$Y^2$$Pn^2$-$R^6$ Formula 9

H-Pn-C*H($CH_3$)—$CH_2$-$Pn^1$-$Y^2$-Cy-$R^6$ Formula 10

As the compound of the formula 5, the following compounds of the formulae 5A-1 to 5C-2 may be preferably mentioned.

$R^5$-Ph-CH($CH_3$)—$CH_2$-Ph-C(O)O-$Pn^2$-$R^6$ Formula 5A-1

$R^5$-Ph-CHF—$CH_2$-Ph-C(O)O-$Pn^2$-$R^6$ Formula 5B-1

$R^5$-Ph-CH($CF_3$)—$CH_2$-Ph-C(O)O-$Pn^2$-$R^6$ Formula 5C-1

$R^5$-Ph-CH($CH_3$)—$CH_2$-Ph-OC(O)-$Pn^2$-$R^6$ Formula 5A-2

$R^5$-Ph-CHF—$CH_2$-Ph-OC(O)-$Pn^2$-$R^6$ Formula 5B-2

$R^5$-Ph-CH($CF_3$)—$CH_2$-Ph-OC(O)-$Pn^2$-$R^6$ Formula 5C-2

As the compound of the formula 6, the following compounds of the formulae 6A-1 to 6C-2 may be preferably mentioned.

$R^5$-Ph-CH($CH_3$)—$CH_2$-Ph-C(O)O-Cy-$R^6$ Formula 6A-1

$R^5$-Ph-CHF—$CH_2$-Ph-C(O)O-Cy-$R^6$ Formula 6B-1

$R^5$-Ph-CH($CF_3$)—$CH_2$-Ph-C(O)O-Cy-$R^6$ Formula 6C-1

$R^5$-Ph-CH($CH_3$)—$CH_2$-Ph-OC(O)-Cy-$R^6$ Formula 6A-2

$R^5$-Ph-CHF—$CH_2$-Ph-OC(O)-Cy-$R^6$ Formula 6B-2

$R^5$-Ph-CH($CF_3$)—$CH_2$-Ph-OC(O)-Cy-$R^6$ Formula 6C-2

As the compound of the formula 7, the following compounds of the formulae 7A-1 to 7C-2 may be preferably mentioned.

$R^5$-Ph-CH($CH_3$)—$CH_2$-Cy-C(O)O-$Pn^2$-$R^6$ Formula 7A-1

$R^5$-Ph-CHF—$CH_2$Cy-C(O)O-$Pn^2$-$R^6$ Formula 7B-1

$R^5$-Ph-CH($CF_3$)—$CH_2$-Cy-C(O)O-$Pn^2$-$R^6$ Formula 7C-1

$R^5$-Ph-CH($CH_3$)—$CH_2$-Cy-OC(O)-$Pn^2$-$R^6$ Formula 7A-2

$R^5$-Ph-CHF—$CH_2$-Cy-OC(O)-$Pn^2$-$R^6$ Formula 7B-2

$R^5$-Ph-CH($CF_3$)—$CH_2$-Cy-OC(O)-$Pn^2$-$R^6$ Formula 7C-2

As the compound of the formula 8, the following compounds of the formulae 8A-1 to 8C-2 may be preferably mentioned.

$R^5$-Ph-CH($CH_3$)—$CH_2$-Cy-C(O)O-Cy-$R^6$ Formula 8A-1

$R^5$-Ph-CHF—$CH_2$-Cy-C(O)O-Cy-$R^6$ Formula 8B-1

$R^5$-Ph-CH($CF_3$)—$CH_2$-Cy-C(O)O-Cy-$R^6$ Formula 8C-1

$R^5$-Ph-CH($CH_3$)—$CH_2$-Cy-OC(O)-Cy-$R^6$ Formula 8A-2

$R^5$-Ph-CHF—$CH_2$-Cy-OC(O)-Cy-$R^6$ Formula 8B-2

$R^5$-Ph-CH($CF_3$)—$CH_2$-Cy-OC(O)-Cy-$R^6$ Formula 8C-2

As specific examples of the compound of the formula 5A-1, the following compounds may be preferably mentioned.

H-Ph-CH($CH_3$)—$CH_2$-Ph-C(O)O-Ph-H,
H-Ph-CH($CH_3$)—$CH_2$-Ph-C(O)O-Ph-$OCH_3$,
H-Ph-CH($CH_3$)—$CH_2$-Ph-C(O)O-Ph-$OC_6H_{13}$,
H-Ph-CH($CH_3$)—$CH_2$-Ph-C(O)O-Ph-OCH($CH_3$)$C_6H_{13}$,
H-Ph-CH($CH_3$)—$CH_2$-Ph-C(O)O-Ph-$C_4H_9$,
H-Ph-CH($CH_3$)—$CH_2$-Ph-C(O)O-Ph-$CH_2$CH($CH_3$)$CH_2CH_3$,
$CH_3$-Ph-CH($CH_3$)—$CH_2$-Ph-C(O)O-Ph-$CH_3$,
$C_2H_5$-Ph-CH($CH_3$)—$CH_2$-Ph-C(O)O-Ph-$C_2H_5$,
$C_3H_7$-Ph-CH($CH_3$)—$CH_2$-Ph-C(O)O-Ph-$C_3H_7$,
$CH_3$-Ph-CH($CH_3$)—$CH_2$-Ph-C(O)O-Ph-$OCH_3$,
$CH_3O$-Ph-CH($CH_3$)—$CH_2$-Ph-C(O)O-Ph-$C_3H_7$,
$CH_3O$-Ph-CH($CH_3$)—$CH_2$-Ph-C(O)O-Ph-$OC_6H_{13}$,
H-Ph-CH($CH_3$)—$CH_2$-Ph-C(O)O-Ph-$CH_2OC_2H_5$,
H-Ph-CH($CH_3$)—$CH_2$-Ph-C(O)O-Ph-$CH_2CH_2CH$═$CHCH_3$.
H-Ph-CH($CH_3$)—$CH_2$-Ph-C(O)O-Ph-C≡$CCH_3$,
H-Ph-CH($CH_3$)—$CH_2$-Ph-C(O)O-Ph-$CF_3$.
H-Ph-CH($CH_3$)—$CH_2$-Ph-C(O)O-Ph-$OCF_3$,
H-Ph-CH($CH_3$)—$CH_2$-Ph-C(O)O-Ph-$OCH_2CF_3$,
H-Ph-CH($CH_3$)—$CH_2$-Ph-C(O)O-Ph-F,
H-Ph-CH($CH_3$)—$CH_2$-Ph-C(O)O-Ph-Cl,
H-Ph-CH($CH_3$)—$CH_2$-Ph-C(O)O-Ph-CN,
H-Ph-CH($CH_3$)—$CH_2$-Ph-C(O)O-$Ph^F$-F,
H-Ph-CH($CH_3$)—$CH_2$-Ph-C(O)O-$Ph^{2F}$-F.

As specific examples of the compound of the formula 5A-2, the following compounds may be preferably mentioned.

H-Ph-CH($CH_3$)—$CH_2$-Ph-OC(O)-Ph-H,
H-Ph-CH($CH_3$)—$CH_2$-Ph-OC(O)-Ph-$OCH_3$,
H-Ph-CH($CH_3$)—$CH_2$-Ph-OC(O)-Ph-$OC_6H_{13}$,
H-Ph-CH($CH_3$)—$CH_2$-Ph-OC(O)-Ph-OCH($CH_3$)$C_6H_{13}$,
H-Ph-CH($CH_3$)—$CH_2$-Ph-OC(O)-Ph-$C_4H_9$,
H-Ph-CH($CH_3$)—$CH_2$-Ph-OC(O)-Ph-$CH_2$CH($CH_3$)$CH_2CH_3$,
$CH_3$-Ph-CH($CH_3$)—$CH_2$-Ph-OC(O)-Ph-$CH_3$,
$C_2H_5$-Ph-CH($CH_3$)—$CH_2$-Ph-OC(O)-Ph-$C_2H_5$.
$C_3H_7$-Ph-CH($CH_3$)—$CH_2$-Ph-OC(O)-Ph-$C_3H_7$,
$CH_3$-Ph-CH($CH_3$)—$CH_2$-Ph-OC(O)-Ph-$OCH_3$,
$CH_3O$-Ph-CH($CH_3$)—$CH_2$-Ph-OC(O)-Ph-$C_3H_7$,
$CH_3O$-Ph-CH($CH_3$)—$CH_2$-Ph-OC(O)-Ph-$OC_6H_{13}$,
H-Ph-CH($CH_3$)—$CH_2$-Ph-OC(O)-Ph-$CH_2OC_2H_5$,
H-Ph-CH($CH_3$)—$CH_2$-Ph-OC(O)-Ph-$CH_2CH_2CH$═$CHCH_3$,
H-Ph-CH($CH_3$)—$CH_2$-Ph-OC(O)-Ph-C≡$CCH_3$,
H-Ph-CH($CH_3$)—$CH_2$-Ph-OC(O)-Ph-$CF_3$,
H-Ph-CH($CH_3$)—$CH_2$-Ph-OC(O)-Ph-$OCF_3$,
H-Ph-CH($CH_3$)—$CH_2$-Ph-OC(O)-Ph-$OCH_2CF_3$,
H-Ph-CH($CH_3$)—$CH_2$-Ph-OC(O)-Ph-F,
H-Ph-CH($CH_3$)—$CH_2$-Ph-OC(O)-Ph-Cl,
H-Ph-CH($CH_3$)—$CH_2$-Ph-OC(O)-Ph-CN,
H-Ph-CH($CH_3$)—$CH_2$-Ph-OC(O)-$Ph^F$-F,
H-Ph-CH($CH_3$)—$CH_2$-Ph-OC(O)-$Ph^{2F}$-F.

As specific examples of the compound of the formula 5B-1, the following compounds may be preferably mentioned.

H-Ph-CHF—$CH_2$-Ph-C(O)O-Ph-H,
H-Ph-CHF—$CH_2$-Ph-C(O)O-Ph-$OCH_3$,
H-Ph-CHF—$CH_2$-Ph-C(O)O-Ph-$OC_6H_{13}$,
H-Ph-CHF—$CH_2$-Ph-C(O)O-Ph-OCH($CH_3$)$C_6H_{13}$,
H-Ph-CHF—$CH_2$-Ph-C(O)O-Ph-$C_4H_9$,
H-Ph-CHF—$CH_2$-Ph-C(O)O-Ph-$CH_2$CH($CH_3$)$CH_2CH_3$.
$CH_3$-Ph-CHF—$CH_2$-Ph-C(O)O-Ph-$CH_3$,
$C_2H_5$-Ph-CHF—$CH_2$-Ph-C(O)O-Ph-$C_2H_5$,
$C_3H_7$-Ph-CHF—$CH_2$-Ph-C(O)O-Ph-$C_3H_7$,
$CH_3$-Ph-CHF—$CH^2$-Ph-C(O)O-Ph-$OCH_3$,
$CH_3O$-Ph-CHF—$CH_2$-Ph-C(O)O-Ph-$C_3H_7$,
$CH_3O$-Ph-CHF—$CH_2$-Ph-C(O)O-Ph-$OC_6H_{13}$,
H-Ph-CHF—$CH_2$-Ph-C(O)O-Ph-$CH_2OC_2H_5$,
H-Ph-CHF—$CH_2$-Ph-C(O)O-Ph-$CH_2CH_2CH$═$CHCH_3$,
H-Ph-CHF—$CH_2$-Ph-C(O)O-Ph-C≡$CCH_3$,
H-Ph-CHF—$CH_2$-Ph-C(O)O-Ph-$CF_3$,
H-Ph-CHF—$CH_2$-Ph-C(O)O-Ph-$OCF_3$,
H-Ph-CHF—$CH_2$-Ph-C(O)O-Ph-$OCH_2CF_3$,
H-Ph-CHF—$CH_2$-Ph-C(O)O-Ph-F,
H-Ph-CHF—$CH_2$-Ph-C(O)O-Ph-Cl,
H-Ph-CHF—$CH_2$-Ph-C(O)O-Ph-CN,
H-Ph-CHF—$CH_2$-Ph-C(O)O-$Ph^F$-F,
H-Ph-CHF—CH2-Ph-C(O)O-$Ph^{2F}$-F.

As specific examples of the compound of the formula 5B-2, the following compounds may be preferably mentioned.

H-Ph-CHF—$CH_2$-Ph-OC(O)-Ph-H,
H-Ph-CHF—$CH_2$-Ph-OC(O)-Ph-$OCH_3$.
H-Ph-CHF—$CH_2$-Ph-OC(O)-Ph-$OC_6H_{13}$,
H-Ph-CHF—$CH_2$-Ph-OC(O)-Ph-OCH($CH_3$)$C_6H_{13}$,
H-Ph-CHF—$CH_2$-Ph-OC(O)-Ph-$C_4H_9$,
H-Ph-CHF—$CH_2$-Ph-OC(O)-Ph-$CH_2$CH($CH_3$)$CH_2CH_3$,
$CH_3$-Ph-CHF—$CH_2$-Ph-OC(O)-Ph-$CH_3$,
$C_2H_5$-Ph-CHF—$CH_2$-Ph-OC(O)-Ph-$C_2H_5$,
$C^3H_7$-Ph-CHF—$CH_2$-Ph-OC(O)-Ph-$C_3H_7$,
$CH_3$-Ph-CHF—$CH_2$-Ph-OC(O)-Ph-$OCH_3$,
$CH_3O$-Ph-CHF—$CH_2$-Ph-OC(O)-Ph-$C_3H_7$,
$CH_3O$-Ph-CHF—$CH_2$-Ph-OC(O)-Ph-$OC_6H_{13}$,
H-Ph-CHF—$CH_2$-Ph-OC(O)-Ph-$CH_2OC_2H_5$,
H-Ph-CHF—$CH_2$-Ph-OC(O)-Ph-$CH_2CH_2CH$═$CHCH_3$,
H-Ph-CHF—$CH_2$-Ph-OC(O)-Ph-C≡$CCH_3$,
H-Ph-CHF—$CH_2$-Ph-OC(O)-Ph-$CF_3$,
H-Ph-CHF—$CH_2$-Ph-OC(O)-Ph-$OCF_3$,
H-Ph-CHF—$CH_2$-Ph-OC(O)-Ph-$OCH_2CF_3$,
H-Ph-CHF—$CH_2$-Ph-OC(O)-Ph-F,
H-Ph-CHF—$CH_2$-Ph-OC(O)-Ph-Cl,
H-Ph-CHF—$CH_2$-Ph-OC(O)-Ph-CN,

H-Ph-CHF—$CH_2$-Ph-OC(O)-$Ph^F$-F,

H-Ph-CHF—$CH_2$-Ph-OC(O)-$Ph^{2F}$-F.

As specific examples of the compound of the formula 5C-1, the following compounds may be preferably mentioned.

H-Ph-CH($CF_3$)—$CH_2$-Ph-C(O)O-Ph-H,
H-Ph-CH($CF_3$)—$CH_2$-Ph-C(O)O-Ph-$OCH_3$,
H-Ph-CH($CF_3$)—$CH_2$-Ph-C(O)O-Ph-$OC_6H_{13}$,
H-Ph-CH($CF_3$)—$CH_2$-Ph-C(O)O-Ph-OCH($CH_3$)$C_6H_{13}$,
H-Ph-CH($CF_3$)—$CH_2$-Ph-C(O)O-Ph-$C_4H_9$,
H-Ph-CH($CF_3$)—$CH_2$-Ph-C(O)O-Ph-$CH_2$CH($CH_3$)$CH_2CH_3$,
$CH_3$-Ph-CH($CF_3$)—$CH_2$-Ph-C(O)O-Ph-$CH_3$,
$C_2H_5$-Ph-CH($CF_3$)—$CH_2$-Ph-C(O)O-Ph-$C_2H_5$,
$C_3H_7$-Ph-CH($CF_3$)—$CH_2$-Ph-C(O)O-Ph-$C_3H_7$,
$CH_3$-Ph-CH($CF_3$)—$CH_2$-Ph-C(O)O-Ph-$OCH_3$,
$CH_3$O-Ph-CH($CF_3$)—$CH_2$-Ph-C(O)O-Ph-$C_3H_7$,
$CH_3$O-Ph-CH($CF_3$)—$CH_2$-Ph-C(O)O-Ph-$OC_6H_{13}$,
H-Ph-CH($CF_3$)—$CH_2$-Ph-C(O)O-Ph-$CH_2OC_2H_5$,
H-Ph-CH($CF_3$)—$CH_2$-Ph-C(O)O-Ph-$CH_2CH_2CH$═$CHCH_3$,
H-Ph-CH($CF_3$)—$CH_2$-Ph-C(O)O-Ph-C≡$CCH_3$,
H-Ph-CH($CF_3$)—$CH_2$-Ph-C(O)O-Ph-$CF_3$,
H-Ph-CH($CF_3$)—$CH_2$-Ph-C(O)O-Ph-$OCF_3$,
H-Ph-CH($CF_3$)—$CH_2$-Ph-C(O)O-Ph-$OCH_2CF_3$,
H-Ph-CH($CF_3$)—$CH_2$-Ph-C(O)O-Ph-F,
H-Ph-CH($CF_3$)—$CH_2$-Ph-C(O)O-Ph-Cl,
H-Ph-CH($CF_3$)—$CH_2$-Ph-C(O)O-Ph-CN,
H-Ph-CH($CF_3$)—$CH_2$-Ph-C(O)O-$Ph^F$-F,
H-Ph-CH($CF_3$)—$CH_2$-Ph-C(O)O-$Ph^{2F}$-F.

As specific examples of the compound of the formula 5C-2, the following compounds may be preferably mentioned.

H-Ph-CH($CF_3$)—$CH_2$-Ph-OC(O)-Ph-H,
H-Ph-CH($CF_3$)—$CH_2$-Ph-OC(O)-Ph-$OCH_3$,
H-Ph-OH($CF_3$)—$CH_2$-Ph-OC(O)-Ph-$OC_6H_{13}$,
H-Ph-CH($CF_3$)—$CH_2$-Ph-OC(O)-Ph-OCH($CH_3$)$C_6H_{13}$,
H-Ph-CH($CF_3$)—$CH_2$-Ph-OC(O)-Ph-$C_4H_9$,
H-Ph-CH($CF_3$)—$CH_2$-Ph-OC(O)-Ph-$CH_2$CH($CH_3$)$CH_2CH_3$,
$CH_3$-Ph-CH($CF_3$)—$CH_2$-Ph-OC(O)-Ph-$CH_3$,
$C_2H_5$-Ph-CH($CF_3$)—$CH_2$-Ph-OC(O)-Ph-$C_2H_5$,
$C_3H_7$-Ph-CH($CF_3$)—$CH_2$-Ph-OC(O)-Ph-$C_3H_7$,
$CH_3$-Ph-CH($CF_3$)—$CH_2$-Ph-OC(O)-Ph-$OCH_3$,
$CH_3$O-Ph-CH($CF_3$)—$CH_2$-Ph-OC(O)-Ph-$C_3H_7$,
$CH_3$O-Ph-CH($CF_3$)—$CH_2$-Ph-OC(O)-Ph-$OC_6H_{13}$,
H-Ph-CH($CF_3$)—$CH_2$-Ph-OC(O)-Ph-$CH_2OC_2H_5$,
H-Ph-CH($CF_3$)—$CH_2$-Ph-OC(O)-Ph-$CH_2CH_2CH$═$CHCH_3$,
H-Ph-CH($CF_3$)—$CH_2$-Ph-OC(O)-Ph-CO≡$CCH_3$,
H-Ph-CH($CF_3$)—$CH_2$-Ph-OC(O)-Ph-$CF_3$,
H-Ph-CH($CF_3$)—$CH_2$-Ph-OC(O)-Ph-$OCF_3$,
H-Ph-CH($CF_3$)—$CH_2$-Ph-OC(O)-Ph-$OCH_2CF_3$,
H-Ph-CH($CF_3$)—$CH_2$-Ph-OC(O)-Ph-F,
H-Ph-CH($CF_3$)—$CH_2$-Ph-OC(O)-Ph-Cl,
H-Ph-CH($CF_3$)—$CH_2$-Ph-OC(O)-Ph-CN,
H-Ph-CH($CF_3$)—$CH_2$-Ph-OC(O)-$Ph^F$-F,
H-Ph-CH($CF_3$)—$CH_2$-Ph-OC(O)-$Ph^{2F}$-F.

As specific examples of the compound of the formula 6A-1, the following compounds may be preferably mentioned.

H-Ph-CH($CH_3$)—$CH_2$-Ph-C(O)O-Cy-H,
H-Ph-CH($CH_3$)—$CH_2$-Ph-C(O)O-Cy-$C_3H_7$,
H-Ph-CH($CH_3$)—$CH_2$-Ph-C(O)O-Cy-$CH_3$CH($CH_3$)$CH_2CH_3$,
H-Ph-CH($CH_3$)—$CH_2$-Ph-C(O)O-Cy-$OCH_3$,
H-Ph-CH($CH_3$)—$CH_2$-Ph-C(O)O-Cy-OCH($CH_3$)$C_6H_{13}$, $CH_3$-Ph-CH($CH_3$)—$CH_2$-Ph-C(O)O-Cy-$CH_3$,
$C_2H_5$-Ph-CH($CH_3$)—$CH_2$-Ph-C(O)O-Cy-$C_2H_5$,
$C_3H_7$-Ph-CH($CH_3$)—$CH_2$-Ph-C(O)O-Cy-$C_3H_7$,
$CH_3$-Ph-CH($CH_3$)—$CH_2$-Ph-C(O)O-Cy-$OCH_3$,
$CH_3$O-Ph-CH($CH_3$)—$CH_2$-Ph-C(O)O-Cy-$C_3H_7$,
H-Ph-CH($CH_3$)—$CH_2$-Ph-C(O)O-Cy-$CH_2OC_2H_5$,
H-Ph-CH($CH_3$)—$CH_2$-Ph-C(O)O-Cy-$CH_2CH_2CH$═$CHCH_3$,
H-Ph-CH($CH_3$)—$CH_2$-Ph-C(O)O-Cy-C≡$CCH_3$,
H-Ph-CH($CH_3$)—$CH_2$-Ph-C(O)O-Cy-$CF_3$,
H-Ph-CH($CH_3$)—$CH_2$-Ph-C(O)O-Cy-$OCF_3$.

As specific examples of the compound of the formula 6A-2, the following compounds may be preferably mentioned.

H-Ph-CH($CH_3$)—$CH_2$-Ph-OC(O)-Cy-H,
H-Ph-CH($CH_3$)—$CH_2$-Ph-OC(O)-Cy-$C_3H_7$,
H-Ph-CH($CH_3$)—$CH_2$-Ph-OC(O)-Cy-$CH_2$CH($CH_3$)$CH_2CH_3$,
H-Ph-CH($CH_3$)—$CH_2$-Ph-OC(O)-Cy-$OCH_3$,
H-Ph-CH($CH_3$)—$CH_2$-Ph-OC(O)-Cy-OCH($CH_2$)$C_6H_{13}$,
$CH_3$-Ph-CH($CH_3$)—$CH_2$-Ph-OC(O)-Cy-$CH_3$,
$C_2H_5$-Ph-CH($CH_3$)—$CH_2$-Ph-OC(O)-Cy-$C_2H_5$,
$C_3H_7$-Ph-CH($CH_3$)—$CH_2$-Ph-OC(O)-Cy-$C_3H_7$,
$CH_3$-Ph-CH($CH_3$)—$CH_2$-Ph-OC(O)-Cy-$OCH_3$,
$CH_3$O-Ph-CH($CH_3$)—$CH_2$-Ph-OC(O)-Cy-$C_3H_7$,
H-Ph-CH($CH_3$)—$CH_2$-Ph-OC(O)-Cy-$CH_2OC_2H_5$,
H-Ph-CH($CH_3$)—$CH_2$-Ph-OC(O)-Cy-$CH_2CH_2CH$═$CHCH_3$,
H-Ph-CH($CH_3$)—$CH_2$-Ph-OC(O)-Cy-C≡$CCH_3$,
H-Ph-CH($CH_3$)—$CH_2$-Ph-OC(O)-Cy-$CF_3$,
H-Ph-CH($CH_3$)—$CH_2$-Ph-OC(O)-Cy-$OCF_3$.

As specific examples of the compound of the formula 6B-1, the following compounds may be preferably mentioned.

H-Ph-CHF—$CH_2$-Ph-C(O)O-Cy-H,
H-Ph-CHF—$CH_2$-Ph-C(O)O-Cy-$C_3H_7$,
H-Ph-CHF—$CH_2$-Ph-C(O)O-Cy-$CH_2$CH($CH_3$)$CH_2CH_3$,
H-Ph-CHF—$CH_2$-Ph-C(O)O-Cy-$OCH_3$,
H-Ph-CHF—$CH_2$-Ph-C(O)O-Cy-OCH($CH_3$)$C_6H_{13}$,
$CH_3$-Ph-CHF—$CH_2$-Ph-C(O)O-Cy-$CH_3$,
$C_2H_5$-Ph-CHF—$CH_2$-Ph-C(O)O-Cy-$C_2H_5$,
$C_3H_7$-Ph-CHF—$CH_2$-Ph-C(O)O-Cy-$C_3H_7$,
$CH_3$-Ph-CHF—$CH_2$-Ph-C(O)O-Cy-$OCH_3$,
$CH_3$O-Ph-CHF—$CH_2$-Ph-C(O)O-Cy-$C_3H_7$,
H-Ph-CHF—$CH_2$-Ph-C(O)O-Cy-$CH_2OC_2H_5$,
H-Ph-CHF—$CH_2$-Ph-C(O)O-Cy-$CH_2CH_2CH$═$CHCH_3$,
H-Ph-CHF—$CH_2$-Ph-C(O)O-Cy-C≡$CCH_3$,
H-Ph-CHF—$CH_2$-Ph-C(O)O-Cy-$CF_3$,
H-Ph-CHF—$CH_2$-Ph-C(O)O-Cy-$OCF_3$.

As specific examples of the compound of the formula 6B-2, the following compounds may be preferably mentioned.

H-Ph-CHF—$CH_2$-Ph-OC(O)-Cy-H,
H-Ph-CHF—$CH_2$-Ph-OC(O)-Cy-$C_3H_7$,
H-Ph-CHF—$CH_2$-Ph-OC(O)-Cy-$CH_2$CH($CH_3$)$CH_2CH_3$,
H-Ph-CHF—$CH_2$-Ph-OC(O)-Cy-$OCH_3$,
H-Ph-CHF—$CH_2$-Ph-OC(O)-Cy-OCH($CH_3$)$C_6H_{13}$,
$CH_3$-Ph-CHF—$CH_2$-Ph-OC(O)-Cy-$CH_3$,
$C_2H_5$-Ph-CHF—$CH_2$-Ph-OC(O)-Cy-$C_2H_5$,
$C_3H_7$-Ph-CHF—$CH_2$-Ph-OC(O)-Cy-$C_3H_7$,
$CH_3$-Ph-CHF—$CH_2$-Ph-OC(O)-Cy-$OCH_3$,
$CH_3$O-Ph-CHF—$CH_2$-Ph-OC(O)-Cy-$C_3H_7$,
H-Ph-CHF—$CH_2$-Ph-OC(O)-Cy-$CH_2OC_2H_5$.
H-Ph-CHF—$CH_2$-Ph-OC(O)-Cy-$CH_2CH_2CH$═$CHCH_3$,
H-Ph-CHF—$CH_2$-Ph-OC(O)-Cy-C≡$CCH_3$,
H-Ph-CHF—$CH_2$-Ph-OC(O)-Cy-$CF_3$,
H-Ph-CHF—$CH_2$-Ph-OC(O)-Cy-$OCF_3$.

As specific examples of the compound of the formula 6C-1, the following compounds may be preferably mentioned.

H-Ph-CH($CF_3$)—$CH_2$-Ph-C(O)O-Cy-H,
H-Ph-CH($CF_3$)—$CH_2$-Ph-C(O)O-Cy-$C_3H_7$,
H-Ph-CH($CF_3$)—$CH_2$-Ph-C(O)O-Cy-$CH_2CH(CH_3)CH_2CH_3$,
H-Ph-CH($CF_3$)—$CH_2$-Ph-C(O)O-Cy-$OCH_3$,
H-Ph-CH($CF_3$)—$CH_2$-Ph-C(O)O-Cy-$OCH(CH_3)C_6H_{13}$,
$CH_3$-Ph-CH($CF_3$)—$CH_2$-Ph-C(O)O-Cy-$CH_3$,
$C_2H_5$-Ph-CH($CF_3$)—$CH_2$-Ph-C(O)O-Cy-$C_2H_5$,
$C_3H_7$-Ph-CH($CF_3$)—$CH_2$-Ph-C(O)O-Cy-$C_3H_7$,
$CH_3$-Ph-CH($CF_3$)—$CH_2$-Ph-C(O)O-Cy-$OCH_3$,
$CH_3O$-Ph-CH($CF_3$)—$CH_2$-Ph-C(O)O-Cy-$C_3H_7$,
H-Ph-CH($CF_3$)—$CH_2$-Ph-C(O)O-Cy-$CH_2OC_2H_5$,
H-Ph-CH($CF_3$)—$CH_2$-Ph-C(O)O-Cy-$CH_2CH_2CH{=}CHCH_3$,
H-Ph-CH($CF_3$)—$CH_2$-Ph-C(O)O-Cy-$C{\equiv}CCH_3$,
H-Ph-CH($CF_3$)—$CH_2$-Ph-C(O)O-Cy-$CF_3$,
H-Ph-CH($CF_3$)—$CH_2$-Ph-C(O)O-Cy-$OCF_3$.

As specific examples of the compound of the formula 6C-2, the following compounds may be preferably mentioned.

H-Ph-CH($CF_3$)—$CH_2$-Ph-OC(O)-Cy-H,
H-Ph-CH($CF_3$)—$CH_2$-Ph-OC(O)-Cy-$C_3H_7$,
H-Ph-CH($CF_3$)—$CH_2$-Ph-OC(O)-Cy-$CH_2CH(CH_3)CH_2CH_3$,
H-Ph-CH($CF_3$)—$CH_2$-Ph-OC(O)-Cy-$OCH_3$,
H-Ph-CH($CF_3$)—$CH_2$-Ph-OC(O)-Cy-$OCH(CH_3)C_6H_{13}$,
$CH_3$-Ph-CH($CF_3$)—$CH_2$-Ph-OC(O)-Cy-$CH_3$,
$C_2H_5$-Ph-CH($CF_3$)—$CH_2$-Ph-OC(O)-Cy-$C_2H_5$,
$C_3H_7$-Ph-CH($CF_3$)—$CH_2$-Ph-OC(O)-Cy-$C_3H_7$,
$CH_3$-Ph-CH($CF_3$)—$CH_2$-Ph-OC(O)-Cy-$OCH_3$,
$CH_3O$-Ph-CH($CF_3$)—$CH_2$-Ph-OC(O)-Cy-$C_3H_7$,
H-Ph-CH($CF_3$)—$CH_2$-Ph-OC(O)-Cy-$CH_2OC_2H_5$.
H-Ph-CH($CF_3$)—$CH_2$-Ph-OC(O)-Cy-$CH_2CH_2CH{=}CHCH_3$,
H-Ph-CH($CF_3$)—$CH_2$-Ph-OC(O)-Cy-$C{\equiv}CCH_3$,
H-Ph-CH($CF_3$)—$CH_2$-Ph-OC(O)-Cy-$CF_3$,
H-Ph-CH($CF_3$)—$CH_2$-Ph-OC(O)-Cy-$OCF_3$.

As specific examples of the compound of the formula 7A-1, the following compounds may be preferably mentioned.

H-Ph-CH($CH_3$)—$CH_2$-Cy-C(O)O-Ph-H,
H-Ph-CH($CH_3$)—$CH_2$-Cy-C(O)O-Ph-$OCH_3$,
H-Ph-CH($CH_3$)—$CH_2$-Cy-C(O)O-Ph-$OC_6H_{13}$,
H-Ph-CH($CH_3$)—$CH_2$-Cy-C(O)O-Ph-$OCH(CH_3)C_6H_{13}$,
H-Ph-CH($CH_3$)—$CH_2$-Cy-C(O)O-Ph-$C_4H_9$,
H-Ph-CH($CH_3$)—$CH_2$-Cy-C(O)O-Ph-$CH_2CH(CH_3)CH_2CH_3$,
$CH_3$-Ph-CH($CH_3$)—$CH_2$-Cy-C(O)O-Ph-$CH_3$,
$C_2H_5$-Ph-CH($CH_3$)—$CH_2$-Cy-C(O)O-Ph-$C_2H_5$,
$C_3H_7$-Ph-CH($CH_3$)—$CH_2$-Cy-C(O)O-Ph-$C_3H_7$,
$CH_3$-Ph-CH($CH_3$)—$CH_2$-Cy-C(O)O-Ph-$OCH_3$,
$CH_3O$-Ph-CH($CH_3$)—$CH_2$-Cy-C(O)O-Ph-$C_3H_7$,
$CH_3O$-Ph-CH($CH_3$)—$CH_2$-Cy-C(O)O-Ph-$OC_6H_{13}$,
H-Ph-CH($CH_3$)—$CH_2$-Cy-C(O)O-Ph-$CH_2OC_2H_5$,
H-Ph-CH($CH_3$)—$CH_2$-Cy-C(O)O-Ph-$CH_2CH_2CH{=}CHCH_3$,
H-Ph-CH($CH_3$)—$CH_2$-Cy-C(O)O-Ph-$C{\equiv}CCH_3$,
H-Ph-CH($CH_3$)—$CH_2$-Cy-C(O)O-Ph-$CF_3$,
H-Ph-CH($CH_3$)—$CH_2$-Cy-C(O)O-Ph-$OCF_3$,
H-Ph-CH($CH_3$)—$CH_2$-Cy-C(O)O-Ph-$OCH_2CF_3$,
H-Ph-CH($CH_3$)—$CH_2$-Cy-C(O)O-Ph-F,
H-Ph-CH($CH_3$)—$CH_2$-Cy-C(O)O-Ph-Cl,
H-Ph-CH($CH_3$)—$CH_2$-Cy-C(O)O-Ph-CN,
H-Ph-CH($CH_3$)—$CH_2$-Cy-C(O)O-$Ph^F$-F,
H-Ph-CH($CH_3$)—$CH_2$-Cy-C(O)O-$Ph^{2F}$-F.

As specific examples of the compound of the formula 7A-2, the following compounds may be preferably mentioned.

H-Ph-CH($CH_3$)—$CH_2$-Cy-OC(O)-Ph-H,
H-Ph-CH($CH_3$)—$CH_2$-Cy-OC(O)-Ph-$OCH_3$,
H-Ph-CH($CH_3$)—$CH_2$-Cy-OC(O)-Ph-$OC_6H_{13}$,
H-Ph-CH($CH_3$)—$CH_2$-Cy-OC(O)-Ph-$OCH(CH_3)C_6H_{13}$,
H-Ph-CH($CH_3$)—$CH_2$-Cy-OC(O)-Ph-$C_4H_9$,
H-Ph-CH($CH_3$)—$CH_2$-Cy-OC(O)-Ph-$CH_2CH(CH_3)CH_2CH_3$,
$CH_3$-Ph-CH($CH_3$)—$CH_2$-Cy-OC(O)-Ph-$CH_3$,
$C_2H_5$-Ph-CH($CH_3$)—$CH_2$-Cy-OC(O)-Ph-$C_2H_5$,
$C_3H_7$-Ph-CH($CH_3$)—$CH_2$-Cy-OC(O)-Ph-$C_3H_7$,
$CH_3$-Ph-CH($CH_3$)—$CH_2$-Cy-OC(O)-Ph-$OCH_3$,
$CH_3O$-Ph-CH($CH_3$)—$CH_2$-Cy-OC(O)-Ph-$C_3H_7$,
$CH_3O$-Ph-CH($CH_3$)—$CH_2$-Cy-OC(O)-Ph-$OC_6H_{13}$,
H-Ph-CH($CH_3$)—$CH_2$-Cy-OC(O)-Ph-$CH_2OC_2H_5$.
H-Ph-CH($CH_3$)—$CH_2$-Cy-OC(O)-Ph-$CH_2CH_2CH{=}CHCH_3$,
H-Ph-CH($CH_3$)—$CH_2$-Cy-OC(O)-Ph-$C{\equiv}CCH_3$,
H-Ph-CH($CH_3$)—$CH_2$-Cy-OC(O)-Ph-$CF_3$,
H-Ph-CH($CH_3$)—$CH_2$-Cy-OC(O)-Ph-$OCF_3$,
H-Ph-CH($CH_3$)—$CH_2$-Cy-OC(O)-Ph-$OCH_2CF_3$,
H-Ph-CH($CH_3$)—$CH_2$-Cy-OC(O)-Ph-F,
H-Ph-CH($CH_3$)—$CH_2$-Cy-OC(O)-Ph-Cl,
H-Ph-CH($CH_3$)—$CH_2$-Cy-OC(O)-Ph-CN,
H-Ph-CH($CH_3$)—$CH_2$-Cy-OC(O)-$Ph^F$-F,
H-Ph-CH($CH_3$)—$CH_2$-Cy-OC(O)-$Ph^{2F}$-F.

As specific examples of the compound of the formula 7B-1, the following compounds may be preferably mentioned.

H-Ph-CHF—$CH_2$-Cy-C(O)O-Ph-H,
H-Ph-CHF—$CH_2$-Cy-C(O)O-Ph-$OCH_3$,
H-Ph-CHF—$CH_2$-Cy-C(O)O-Ph-$OC_6H_{13}$,
H-Ph-CHF—$CH_2$-Cy-C(O)O-Ph-$OCH(CH_3)C_6H_{13}$,
H-Ph-CHF—$CH_2$-Cy-C(O)O-Ph-$C_4H_9$,
H-Ph-CHF—$CH_2$-Cy-C(O)O-Ph-$CH_2CH(CH_3)CH_2CH_3$,
$CH_3$-Ph-CHF—$CH_2$-Cy-C(O)O-Ph-$CH_3$,
$C_2H_5$-Ph-CHF—$CH_2$-Cy-C(O)O-Ph-$C_2H_5$,
$C_3H_7$-Ph-CHF—$CH_2$-Cy-C(O)O-Ph-$C_3H_7$,
$CH_3$-Ph-CHF—$CH_2$-Cy-C(O)O-Ph-$OCH_3$,
$CH_3O$-Ph-CHF—$CH_2$-Cy-C(O)O-Ph-$C_3H_7$,
$CH_3O$-Ph-CHF—$CH_2$-Cy-C(O)O-Ph-$OC_6H_{13}$,
H-Ph-CHF—$CH_2$-Cy-C(O)O-Ph-$CH_2OC_2H_5$,
H-Ph-CHF—$CH_2$-Cy-C(O)O-Ph-$CH_2CH_2CH{=}CHCH_3$,
H-Ph-CHF—$CH_2$-Cy-C(O)O-Ph-$C{\equiv}CCH_3$,
H-Ph-CHF—$CH_2$-Cy-C(O)O-Ph-$CF_3$,
H-Ph-CHF—$CH_2$-Cy-C(O)O-Ph-$OCF_3$,
H-Ph-CHF—$CH_2$-Cy-C(O)O-Ph-$OCH_2CF_3$,
H-Ph-CHF—$CH_2$-Cy-C(O)O-Ph-F,
H-Ph-CHF—$CH_2$-Cy-C(O)O-Ph-Cl,
H-Ph-CHF—$CH_2$-Cy-C(O)O-Ph-CN,
H-Ph-CHF—$CH_2$-Cy-C(O)O-$Ph^F$-F,
H-Ph-CHF—$CH_2$-Cy-C(O)O-$Ph^{2F}$-F.

As specific examples of the compound of the formula 7B-2, the following compounds may be preferably mentioned.

H-Ph-CHF—$CH_2$-Cy-OC(O)-Ph-H,
H-Ph-CHF—$CH_2$-Cy-OC(O)-Ph-$OCH_3$,
H-Ph-CHF—$CH_2$-Cy-OC(O)-Ph-$OC_6H_{13}$,
H-Ph-CHF—$CH_2$-Cy-OC(O)-Ph-$OCH(CH_3)C_6H_{13}$,
H-Ph-CHF—$CH_2$-Cy-OC(O)-Ph-$C_4H_9$,
H-Ph-CHF—$CH_2$-Cy-OC(O)-Ph-$CH_2CH(CH_3)CH_2CH_3$,
$CH_3$-Ph-CHF—$CH_2$-Cy-OC(O)-Ph-$CH_3$.
$C_2H_5$-Ph-CHF—$CH_2$-Cy-OC(O)-Ph-$C_2H_5$, $C_3H_7$-Ph-CHF—$CH_2$-Cy-OC(O)-Ph-$C_3H_7$,
$CH_3$-Ph-CHF—$CH_2$-Cy-OC(O)-Ph-$OCH_3$,
$CH_3O$-Ph-CHF—$CH_2$-Cy-OC(O)-Ph-$C_3H_7$,
$CH_3O$-Ph-CHF—$CH_2$-Cy-OC(O)— Ph-$OC_6H_{13}$,
H-Ph-CHF—CH2-Cy-OC(O)-Ph-$CH_2OC_2H_5$,
H-Ph-CHF—$CH_2$-Cy-OC(O)-Ph-$CH_2CH_2CH$=$CHCH_3$,
H-Ph-CHF—$CH_2$-Cy-OC(O)-Ph-C≡$CCH_3$,
H-Ph-CHF—$CH_2$-Cy-OC(O)-Ph-$CF_3$,
H-Ph-CHF—$CH_2$-Cy-OC(O)-Ph-$OCF_3$,
H-Ph-CHF—$CH_2$-Cy-OC(O)-Ph-$OCH_2CF_3$,
H-Ph-CHF—$CH_2$-Cy-OC(O)-Ph-F,
H-Ph-CHF—$CH_2$-Cy-OC(O)-Ph-Cl,
H-Ph-CHF—$CH_2$-Cy-OC(O)-Ph-CN,
H-Ph-CHF—$CH_2$-Cy-OC(O)-$Ph^F$-F,
H-Ph-CHF—$CH_2$-Cy-OC(O)-$Ph^{2F}$-F.

As specific examples of the compound of the formula 7C-1, the following compounds may be preferably mentioned.

H-Ph-CH($CF_3$)—$CH_2$-Cy-C(O)O-Ph-H,
H-Ph-CH($CF_3$)—$CH_2$-Cy-C(O)O-Ph-$OCH_3$,
H-Ph-CH($CF_3$)—$CH_2$-Cy-C(O)O-Ph-$OC_6H_{13}$,
H-Ph-CH($CF_3$)—$CH_2$-Cy-C(O)O-Ph-OCH($CH_3$)$C_6H_{13}$,
H-Ph-CH($CF_3$)—$CH_2$-Cy-C(O)O-Ph-$C_4H_9$,
H-Ph-CH($CF_3$)—$CH_2$-Cy-C(O)O-Ph-$CH_2CH(CH_3)$ $CH_2CH_3$,
$CH_3$-Ph-CH($CF_3$)—$CH_2$-Cy-C(O)O-Ph-$CH_3$,
$C_2H_5$-Ph-CH($CF_3$)—$CH_2$-Cy-C(O)O-Ph-$C_2H_5$,
$C_3H_7$-Ph-CH($CF_3$)—$CH_2$-Cy-C(O)O-Ph-$C_3H_7$,
$CH_3$-Ph-CH($CF_3$)—$CH_2$-Cy-C(O)O-Ph-$OCH_3$,
$CH_3O$-Ph-CH($CF_3$)—$CH_2$-Cy-C(O)O-Ph-$C_3H_7$,
$CH_3O$-Ph-CH($CF_3$)—$CH_2$-Cy-C(O)O-Ph-$OC_6H_{13}$,
H-Ph-CH($CF_3$)—$CH_2$-Cy-C(O)O-Ph-$CH_2OC_2H_5$,
H-Ph-CH($CF_3$)—$CH_2$-Cy-C(O)O-Ph- $CH_2CH_2CH$=$CHCH_3$,
H-Ph-CH($CF_3$)—$CH_2$-Cy-C(O)O-Ph-CO≡$CCH_3$,
H-Ph-CH($CF_3$)—$CH_2$-Cy-C(O)O-Ph-$CF_3$,
H-Ph-CH($CF_3$)—$CH_2$-Cy-C(O)O-Ph-$OCF_3$,
H-Ph-CH($CF_3$)—$CH_2$-Cy-C(O)O-Ph-$OCH_2CF_3$,
H-Ph-CH($CF_3$)—$CH_2$-Cy-C(O)O-Ph-F,
H-Ph-CH($CF_3$)—$CH_2$-Cy-C(O)O-Ph-Cl,
H-Ph-CH($CF_3$)—$CH_2$-Cy-C(O)O-Ph-CN,
H-Ph-CH($CF_3$)—$CH_2$-Cy-C(O)O-$Ph^F$-F,
H-Ph-CH($CF_3$)—$CH_2$-Cy-C(O)O-$Ph^{2F}$-F.

As specific examples of the compound of the formula 7C-2, the following compounds may be preferably mentioned.

H-Ph-CH($CF_3$)—$CH_2$-Cy-OC(O)-Ph-H,
H-Ph-CH($CF_3$)—$CH_2$-Cy-OC(O)-Ph-$OCH_3$,
H-Ph-CH($CF_3$)—$CH_2$-Cy-OC(O)-Ph-$OC_6H_{13}$,
H-Ph-CH($CF_3$)—$CH_2$-Cy-OC(O)-Ph-OCH($CH_3$)$C_6H_{13}$,
H-Ph-CH($CF_3$)—$CH_2$-Cy-OC(O)-Ph-$C_4H_9$,
H-Ph-CH($CF_3$)—$CH_2$-Cy-OC(O)-Ph-$CH_2CH(CH_3)$ $CH_2CH_3$,
$CH_3$-Ph-CH($CF_3$)—$CH_2$-Cy-OC(O)-Ph-$CH_3$,
$C_2H_5$-Ph-CH($CF_3$)—$CH_2$-Cy-OC(O)-Ph-$C_2H_5$,
$C_3H_7$-Ph-CH($CF_3$)—$CH_2$-Cy-OC(O)-Ph-$C_3H_7$,
$CH_3$-Ph-CH($CF_3$)—$CH_2$-Cy-OC(O)-Ph-$OCH_3$,
$CH_3O$-Ph-CH($CF_3$)—$CH_2$-Cy-OC(O)-Ph-$C_3H_7$,
$CH_3O$-Ph-CH($CF_3$)—$CH_2$-Cy-OC(O)-Ph-$OC_6H_{13}$,
H-Ph-CH($CF_3$)—$CH_2$-Cy-OC(O)-Ph-$CH_2OC_2H_5$,
H-Ph-CH($CF_3$)—$CH_2$-Cy-OC(O)-Ph- $CH_2CH_2CH$=$CHCH_3$,
H-Ph-CH($CF_3$)—$CH_2$-Cy-OC(O)-Ph-C≡$CCH_3$,
H-Ph-CH($CF_3$)—$CH_2$-Cy-OC(O)-Ph-$CF_3$,
H-Ph-CH($CF_3$)—$CH_2$-Cy-OC(O)-Ph-$OCF_3$,
H-Ph-CH($CF_3$)—$CH_2$-Cy-OC(O)-Ph-$OCH_2CF_3$.
H-Ph-CH($CF_3$)—$CH_2$-Cy-OC(O)-Ph-F,
H-Ph-CH($CF_3$)—$CH_2$-Cy-OC(O)-Ph-Cl,
H-Ph-CH($CF_3$)—$CH_2$-Cy-OC(O)-Ph-CN,
H-Ph-CH($CF_3$)—$CH_2$-Cy-OC(O)-$Ph^F$-F,
H-Ph-CH($CF_3$)—$CH_2$-Cy-OC(O)-$Ph^{2F}$-F.

As specific examples of the compound of the formula 8A-1, the following compounds may be preferably mentioned.

H-Ph-CH($CH_3$)—$CH_2$-Cy-C(O)O-Cy-H,
H-Ph-CH($CH_3$)—$CH_2$-Cy-C(O)O-Cy-$C_3H_7$,
H-Ph-CH($CH_3$)—$CH_2$-Cy-C(O)O-Cy-$CH_2CH(CH_3)$ $CH_2CH_3$,
H-Ph-CH($CH_3$)—$CH_2$-Cy-C(O)O-Cy-$OCH_3$,
H-Ph-CH($CH_3$)—$CH_2$-Cy-C(O)O-Cy-OCH($CH_3$)$C_6H_{13}$,
$CH_3$-Ph-CH($CH_3$)—$CH_2$-Cy-C(O)O-Cy-$CH_3$,
$C_2H_5$-Ph-CH($CH_3$)—$CH_2$-Cy-C(O)O-Cy-$C_2H_5$,
$C_3H_7$-Ph-CH($CH_3$)—$CH_2$-Cy-C(O)O-Cy-$C_3H_7$,
$CH_3$-Ph-CH($CH_3$)—$CH_2$-Cy-C(O)O-Cy-$OCH_3$,
$CH_3O$-Ph-CH($CH_3$)—$CH_2$-Cy-C(O)O-Cy-$C_3H_7$,
H-Ph-CH($CH_3$)—$CH_2$-Cy-C(O)O-Cy-$CH_2OC_2H_5$,
H-Ph-CH($CH_3$)—$CH_2$-Cy-C(O)O-Cy- $CH_2CH_2CH$=$CHCH_3$,
H-Ph-CH($CH_3$)—$CH_2$-Cy-C(O)O-Cy-C≡$CCH_3$,
H-Ph-CH($CH_3$)—$CH_2$-Cy-C(O)O-Cy-$CF_3$,
H-Ph-CH($CH_3$)—$CH_2$-Cy-C(O)O-Cy-$OCF_3$.

As specific examples of the compound of the formula 8A-2, the following compounds may be preferably mentioned.

H-Ph-CH($CH_3$)—$CH_2$-Cy-OC(O)-Cy-H,
H-Ph-CH($CH_3$)—$CH_2$-Cy-OC(O)-Cy-$C_3H_7$,
H-Ph-CH($CH_3$)—$CH_2$-Cy-OC(O)-Cy-$CH_2CH(CH_3)$ $CH_2CH_3$,
H-Ph-CH($CH_3$)—$CH_2$-Cy-OC(O)-Cy-$OCH_3$,
H-Ph-CH($CH_3$)—$CH_2$-Cy-OC(O)-Cy-OCH($CH_3$)$C_6H_{13}$,
$CH_3$-Ph-CH($CH_3$)—$CH_2$-Cy-OC(O)-Cy-$CH_3$,
$C_2H_5$-Ph-CH($CH_3$)—$CH_2$-Cy-OC(O)-Cy-$C_2H_5$,
$C^3H_7$-Ph-CH($CH_3$)—$CH_2$-Cy-OC(O)-Cy-$C_3H_7$,
$CH_3$-Ph-CH($CH_3$)—$CH_2$-Cy-OC(O)-Cy-$OCH_3$,
$CH_3O$-Ph-CH($CH_3$)—$CH_2$-Cy-OC(O)-Cy-$C_3H_7$,
H-Ph-CH($CH_3$)—$CH_2$-Cy-OC(O)-Cy-$CH_2OC_2H_5$,
H-Ph-CH($CH_3$)—$CH_2$-Cy-OC(O)-Cy- $CH_2CH_2CH$=$CHCH_3$,
H-Ph-CH($CH_3$)—$CH_2$-Cy-OC(O)-Cy-C≡$CCH_3$,
H-Ph-CH($CH_3$)—$CH_2$-Cy-OC(O)-Cy-$CF_3$,
H-Ph-CH($CH_3$)—$CH_2$-Cy-OC(O)-Cy-$OCF^3$.

As specific examples of the compound of the formula 8B-1, the following compounds may be preferably mentioned.

H-Ph-CHF—$CH_2$-Cy-C(O)O-Cy-H,
H-Ph-CHF—$CH_2$-Cy-C(O)O-Cy-$C_3H_7$,
H-Ph-CHF—$CH_2$-Cy-C(O)O-Cy-$CH_2CH(CH_3)$ $CH_2CH_3$,
H-Ph-CHF—$CH_2$-Cy-C(O)O-Cy-$OCH_3$,
H-Ph-CHF—$CH_2$-Cy-C(O)O-Cy-OCH($CH_3$)$C_6H_3$,
$CH_3$-Ph-CHF—$CH_2$-Cy-C(O)O-Cy-$CH_3$,
$C_2H_5$-Ph-CHF—$CH_2$-Cy-C(O)O-Cy-$C_2H_5$,
$C_3H_7$-Ph-CHF—$CH_2$-Cy-C(O)O-Cy-$C_3H_7$,
$CH_3$-Ph-CHF—$CH_2$-Cy-C(O)O-Cy-$OCH_3$,
$CH_3O$-Ph-CHF—$CH_2$-Cy-C(O)O-Cy-$C_3H_7$,
H-Ph-CHF—$CH_2$-Cy-C(O)O-Cy-$CH_2OC_2H_5$,
H-Ph-CHF—$CH_2$-Cy-C(O)O-Cy-$CH_2CH_2CH$=$CHCH_3$,
H-Ph-CHF—$CH_2$-Cy-C(O)O-Cy-C≡$CCH_3$,
H-Ph-CHF—$CH_2$-Cy-C(O)O-Cy-$CF_3$,
H-Ph-CHF—$CH_2$-Cy-C(O)O-Cy-$OCF_3$.

As specific examples of the compound of the formula 8B-2, the following compounds may be preferably mentioned.

H-Ph-CHF—CH$_2$-Cy-OC(O)-Cy-H,
H-Ph-CHF—CH$_2$-Cy-OC(O)-Cy-C$_3$H$_7$,
H-Ph-CHF—CH$_2$-Cy-OC(O)-Cy-CH$_2$CH(CH$_3$)CH$_2$CH$_3$,
H-Ph-CHF—CH$_2$-Cy-OC(O)-Cy-OCH$_3$,
H-Ph-CHF—CH$_2$-Cy-OC(O)-Cy-OCH(CH$_3$)C$_6$H$_{13}$,
CH$_3$-Ph-CHF—CH$_2$-Cy-OC(O)-Cy-CH$_3$,
C$_2$H$_5$-Ph-CHF—CH$_2$-Cy-OC(O)-Cy-C$_2$H$_5$,
C$_3$H$_7$-Ph-CHF—CH$_2$-Cy-OC(O)-Cy-C$_3$H$_7$,
CH$_3$-Ph-CHF—CH$_2$-Cy-OC(O)-Cy-OCH$_3$,
CH$_3$O-Ph-CHF—CH$_2$-Cy-OC(O)-Cy-C$_3$H$_7$,
H-Ph-CHF—CH$_2$-Cy-OC(O)-Cy-CH$_2$OC$_2$H$_5$,
H-Ph-CHF—CH$_2$-Cy-OC(O)-Cy-CH$_2$CH$_2$CH═CHCH$_3$,
H-Ph-CHF—CH$_2$-Cy-OC(O)-Cy-C≡CCH$_3$,
H-Ph-CHF—CH$_2$-Cy-OC(O)-Cy-CF$_3$,
H-Ph-CHF—CH$_2$-Cy-OC(O)-Cy-OCF$_3$.

As specific examples of the compound of the formula 8C-1, the following compounds may be preferably mentioned.

H-Ph-CH(CF$_3$)—CH$_2$-Cy-C(O)O-Cy-H,
H-Ph-CH(CF$_3$)—CH$_2$-Cy-C(O)O-Cy-C$_3$H$_7$,
H-Ph-CH(CF$_3$)—CH$_2$-Cy-C(O)O-Cy-CH$_2$CH(CH$_3$)CH$_2$CH$_3$,
H-Ph-CH(CF$_3$)—CH$_2$-Cy-C(O)O-Cy-OCH$_3$,
H-Ph-CH(CF$_3$)—CH$_2$-Cy-C(O)O-Cy-OCH(CH$_3$)C$_6$H$_{13}$,
CH$_3$-Ph-CH(CF$_3$)—CH$_2$-Cy-C(O)O-Cy-CH$_3$,
C$_2$H$_5$-Ph-CH(CF$_3$)—CH$_2$-Cy-C(O)O-Cy-C$_2$H$_5$,
C$_3$H$_7$-Ph-CH(CF$_3$)—CH$_2$-Cy-C(O)O-Cy-C$_3$H$_7$,
CH$_3$-Ph-CH(CF$_3$)—CH$_2$-Cy-C(O)O-Cy-OCH$_3$,
CH$_3$O-Ph-CH(CF$_3$)—CH$_2$-Cy-C(O)O-Cy-C$_3$H$_7$,
H-Ph-CH(CF$_3$)—CH$_2$-Cy-C(O)O-Cy-CH$_2$OC$_2$H$_5$.
H-Ph-CH(CF$_3$)—CH$_2$-Cy-C(O)O-Cy-CH$_2$CH$_2$CH═CHCH$_3$,
H-Ph-CH(CF$_3$)—CH$_2$-Cy-C(O)O-Cy-C≡CCH$_3$,
H-Ph-CH(CF$_3$)—CH$_2$-Cy-C(O)O-Cy-CF$_3$,
H-Ph-CH(CF$_3$)—CH$_2$-Cy-C(O)O-Cy-OCF$_3$.

As specific examples of the compound of the formula 8C-2, the following compounds may be preferably mentioned.

H-Ph-CH(CF$_3$)—CH$_2$-Cy-OC(O)-Cy-H,
H-Ph-CH(CF$_3$)—CH$_2$-Cy-OC(O)-Cy-C$_3$H$_7$,
H-Ph-CH(CF$_3$)—CH$_2$-Cy-OC(O)-Cy-CH$_2$CH(CH$_3$)CH$_2$CH$_3$,
H-Ph-CH(CF$_3$)—CH$_2$-Cy-OC(O)-Cy-OCH$_3$,
H-Ph-CH(CF$_3$)—CH$_2$-Cy-OC(O)-Cy-OCH(CH$_3$)C$_6$H$_{13}$,
CH$_3$-Ph-CH(CF$_3$)—CH$_2$-Cy-OC(O)-Cy-CH$_3$,
C$_2$H$_5$-Ph-CH(CF$_3$)—CH$_2$-Cy-OC(O)-Cy-C$_2$H$_5$,
C$_3$H$_7$-Ph-CH(CF$_3$)—CH$_2$-Cy-OC(O)-Cy-C$_3$H$_7$,
CH$_3$-Ph-CH(CF$_3$)—CH$_2$-Cy-OC(O)-Cy-OCH$_3$,
CH$_3$O-Ph-CH(CF$_3$)—CH$_2$-Cy-OC(O)-Cy-C$_3$H$_7$,
H-Ph-CH(CF$_3$)—CH$_2$-Cy-OC(O)-Cy-CH$_2$OC$_2$H$_5$,
H-Ph-CH(CF$_3$)—CH$_2$-Cy-OC(O)-Cy-CH$_2$CH$_2$CH═CHCH$_3$,
H-Ph-CH(CF$_3$)—CH$_2$-Cy-OC(O)-Cy-C≡CCH$_3$,
H-Ph-CH(CF$_3$)—CH$_2$-Cy-OC(O)-Cy-CF$_3$,
H-Ph-CH(CF$_3$)—CH$_2$-Cy-OC(O)-Cy-OCF$_3$.

The compounds of the formula 3 of the present invention are novel compounds. A compound wherein A$^6$ is a 1,4-phenylene group of which at least one hydrogen atom may be substituted with a halogen atom, and Y$^2$ is a C(O)O group, may be produced by the following process.

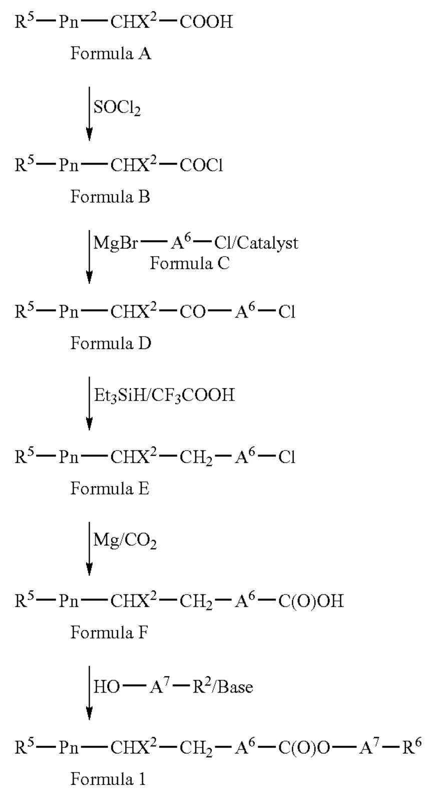

An optically active carboxylic acid (formula A) is subjected to acid chloridation with thionyl chloride to obtain an acid chloride (formula B), which is reacted with a Grignard reagent (formula C) which is a chlorobenzene derivative in the presence of a catalyst to obtain a ketone derivative (formula D). Then, it is reduced with triethylsilane in the presence of trifluoroacetic acid to obtain a chlorobenzene derivative (formula E) which is formed into a Grignard reagent with Mg, which is reacted with carbon dioxide to obtain a benzoic acid derivative (formula F), which is finally reacted with a phenol derivative or a cyclohexanol derivative in the presence of a base to obtain an aimed compound (formula 3). In each reaction, the optical purity of the optically active compound of each formula is maintained.

Further, a compound wherein A$^6$ is a 1,4-phenylene group of which at least one hydrogen atom may be substituted with a halogen atom, and Y$^2$ is a OC(O) group, may be produced by the following process.

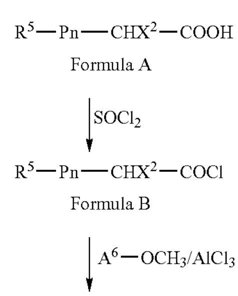

-continued

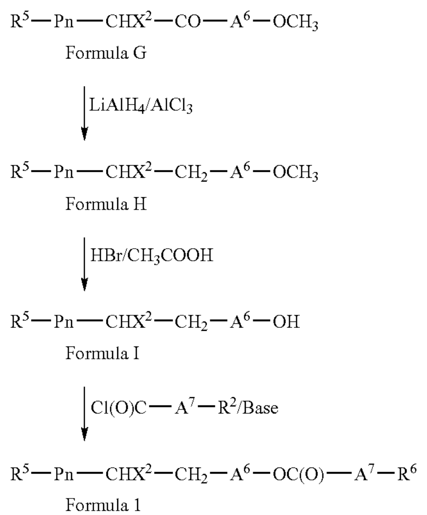

An optically active carboxylic acid (formula A) is subjected to acid chloridation with thionyl chloride to obtain an acid chloride (formula B), which is reacted with an anisole derivative in the presence of aluminum chloride to obtain a ketone derivative (formula G). Then, it is reduced with lithium aluminum hydride in the presence of aluminum chloride to obtain an anisole derivative (formula H), which is reacted with bromic acid in the presence of acetic acid to obtain a phenol derivative (formula 3), which is finally reacted with an acid chloride derivative in the presence of a base to obtain an aimed compound (formula 3). In each reaction, the optical purity of the optically active compound of each formula is maintained.

Further, a compound wherein $A^6$ is a non-substituted trans-1,4-cyclohexylene group and Y is a OC(O) group, may be produced by the following process. In the following explanation, Ch represents a 1,4-cyclohexenylene group, and O═$C_6H_9$— represents a 4-oxocyclohexyl group.

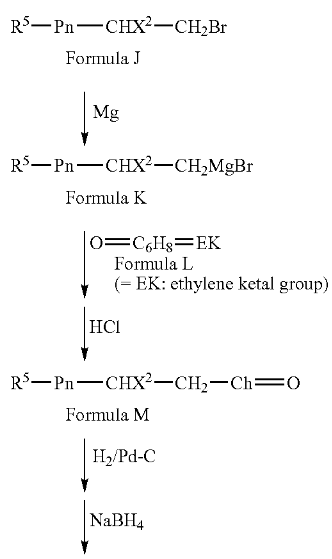

-continued

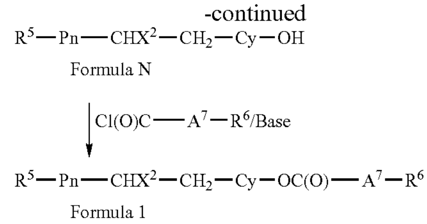

An optically active boron compound (formula J) is formed into a Grignard reagent (formula K) with metal magnesium, which is reacted with a cyclohexanone derivative (formula L) and dehydrated with hydrochloric acid to obtain a cyclohexene compound (formula M), which is subjected to dehydration reaction in the presence of a palladium carbon catalyst and reduced with sodium borohydride to obtain an alcohol derivative (formula N), which is reacted with an acid chloride compound in the presence of a base to obtain an aimed compound (formula 3). In each reaction, the optical purity of the optically active compound of each formula is maintained.

Further, a compound wherein $A^6$ is a non-substituted trans-1,4-cyclohexylene group and $Y^2$ is a C(O)O group, may be produced by the following process.

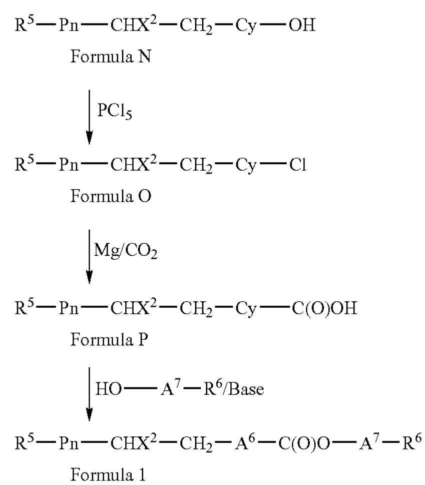

An alcohol derivative (formula N) is chlorinated (formula O) with phosphorus pentachloride, and formed into a Grignard reagent with Mg, which is reacted with carbon dioxide to obtain a carboxylic acid derivative, which is finally reacted with a phenol derivative in the presence of a base to obtain an aimed compound (formula 3). In each reaction, the optical purity of the optically active compound of each formula is maintained.

At least one type of the compound (formula 1) is incorporated in another liquid crystal material or other liquid crystal material and non-liquid crystal material (hereinafter other liquid crystal material and non-liquid crystal material will generically be referred to as "another material") to obtain a liquid crystal composition.

In a case where the compound (formula 1) is incorporated in another material to obtain a liquid crystal composition, as the amount of the compound (formula 1), it is preferably contained in an amount of from 0.1 to 40 parts by mass (the total amount in a case where at least two types of the compounds (formula 1) are incorporated), more preferably from 1 to 20 parts by mass, in 100 parts by mass of the liquid crystal composition.

In a case where at least two types of the compounds (formula 3) are incorporated in another material, the absolute configurations of the asymmetric carbon atoms in said two types of the compounds (formula 3) may be the same or different.

As another material, the following compounds may be exemplified. Each of $R^C$ and $R^D$ which are independent of each other, is an alkyl group, an alkoxy group, a halogen atom or a cyano group, and at least one hydrogen atom in each of $R^C$ and $R^D$ may be substituted with e.g. a halogen atom or a cyano group. Each of $Z^3$, $Z^4$, $Z^5$ and $Z^6$ which are independent of one another, is a ring structure such as a 5-membered ring or a 6-membered ring such as a cyclohexane ring, a benzene ring, a dioxane ring or a pyridine ring, and may be non-substituted or substituted. Further, the binding group between rings may be another binding group. They may optionally be changed depending upon the required performances.

$R^C$-$Z^3Z^4R^D$,
$R^C$-$Z^3$-COO-$Z^4$-$R^D$,
$R^C$-$Z^3$-C≡C-$Z^4$-$R^D$,
$R^C$-$Z^3$-$CH_2CH_2$-$Z^4$-$R^D$,
$R^C$-$Z^3$-$Z^4$-$Z^5$-$R^D$,
$R^C$-$Z^3$-COO-$Z^4$-$Z^5$-$R^D$,
$R^C$-$Z^3$-$Z^4$4COO-$Z^5$-$R^D$,
$R^C$-$Z^3$-COO-$Z^4$-COO-$Z^5$-$R^D$,
$R^C$-$Z^3$-$CH_2CH_2$-$Z^4$-C≡C-$Z^5$-$R^D$,
$R^C$-$Z^3$-$Z^4$-$Z^5$-$Z^6$-$R^D$.

The liquid crystal composition containing the compound (formula 3) of the present invention is sandwiched between substrates provided with an electrode by e.g. a method of injecting it into a liquid crystal cell to constitute a liquid crystal element. The liquid crystal element may be used by various modes of TN mode, STN mode, guest/host (GH) mode, dynamic scattering mode, phase change mode, DAP mode, two-frequency driving mode, ferroelectric liquid crystal display mode and reflective cholesteric mode. Particularly, the liquid crystal composition of the present invention is preferably employed for a STN liquid crystal electric display element and reflective cholesteric electric display element.

Now, specific examples of the constitution and production process of the liquid crystal element will be explained below.

On a substrate of e.g. plastic or glass, an undercoat layer of e.g. $SiO_2$ or $Al_2O_3$ or a color filter layer is formed as the case requires, an electrode of e.g. $In_2O_3$—$SnO_2$ (ITO) or $SnO_2$ is formed thereon, followed by patterning, and an overcoat layer of e.g. polyimide, polyamide, $SiO_2$ or $Al_2O_3$ is formed as the case requires, followed by alignment treatment, and a sealing material is printed thereon, and such substrates are disposed so that the electrode sides face each other and the periphery is sealed, and the sealing material is cured to form an empty cell.

To this empty cell, the liquid crystal composition containing the compound of the present invention is injected, and the inlet is sealed with a sealing compound to constitute a liquid crystal cell. To this liquid crystal cell, as the case requires, e.g. a deflecting plate, a color deflecting plate, a light source, a color filter, a semipermeable reflecting plate, a reflecting plate, an optical waveguide or an ultraviolet cut filter is laminated, e.g. characters or figures are printed, or a nonglare treatment is carried out, to obtain a liquid crystal device.

The above explanation is only to exemplify basic constitution and production process of a liquid crystal element, and various constitutions such as a two-layer liquid crystal cell comprising a substrate employing a two-layer electrode and two liquid crystal layers formed thereon, and an active matrix element employing an active matrix substrate having an active element formed thereon such as TFT or MIM may be employed.

The compound (formula 3) has a short helical pitch length and a low viscosity as compared with conventionally employed optically active compounds. Since the compound (formula 3) has a short helical pitch length, a liquid crystal composition which provides, when used for a TN or STN or reflective cholesteric liquid crystal display element, an element having a uniform twist alignment, can be obtained, by addition of a small amount of the compound (formula 3) to the liquid crystal composition as compared with conventional optically active compounds. Thus, the viscosity of the liquid crystal composition having the compound (formula 1) added thereto can be lowered as compared with conventional one since the addition amount of the compound (formula 3) is small and the viscosity of the compound is low as compared with conventional one. Thus, a liquid crystal element having a high speed of response can be obtained by employing the liquid crystal composition.

The obtained element is suitable as a STN liquid crystal electric display element with a high twist angle which draws an attention in recent Years, or a reflective cholesteric electric display element. Further, it may also be used for e.g. a GH liquid crystal element employing a polychromatic colorant or a ferroelectric liquid crystal electric display element.

Explanation Regarding the Optically Active Compound of the Above Formula (4)

The compounds of the formula (4) are optically active compounds containing asymmetric carbon (C*) in their structures. The absolute configuration of the group which is bonded to the asymmetric carbon may be either R or S.

In the compounds (4), $A^8$ is —$CH_2$— or —CO—. Particularly, —$CH_2$— is preferred in view of stability and reliability of the compound.

Each of $B^1$, $B^2$ and $B^3$ which are independent of one another, is —COO—, —OCO—, —$CH_2CH_2$—, —$CH_2O$—, —$OCH_2$—, —CF═CF—, —$CF_2O$— or a single bond. Among them, —COO— is preferred in view of the degree of the dielectric anisotropy, and a single bond is particularly preferred in view of stability and reliability of the compound.

Each of $D^1$ and $D^2$ which are independent of each other, is non-substituted 1,4-phenyl group, a non-substituted trans-1,4-cyclohexylene group or a single bond. Among them, a single bond is particularly preferred in view of low viscosity.

$X^3$ is —$CH_3$, —$CHF_2$, —$CH_2F$, —$CF_3$ or a fluorine atom. Among them, —$CH_3$ is particularly preferred in view of the degree of the helical twisting power.

Each of $Y^3$, $Y^4$, $Y^5$ and $Y^6$ which are independent of one another, is a fluorine atom or a hydrogen atom. Here, one of $Y^3$, $Y^4$, $Y^5$ and $Y^6$ is a fluorine atom. Particularly, at least one of $Y^5$ and $Y^6$ is a fluorine atom in view of the degree of the dielectric anisotropy, and particularly preferably both $Y^5$ and $Y^6$ are fluorine atoms.

$Z^7$ is —CN, —$CF_3$, —$OCF_3$, —$SF_5$ or a fluorine atom. Among them, a fluorine atom or —$CF_3$ is preferred in view of stability and reliability of the compound, and —CN is particularly preferred in view of the degree of the dielectric anisotropy.

n is 0 or 1. It is preferably 1 in view of the degree of the dielectric anisotropy.

One or at least two types of the optically active compound (4) of the present invention may be employed as the liquid crystal material. In a case where at least two types of the compounds (4) are employed, it is preferred to combine ones having the same helical directions induced when added to the liquid crystal composition.

Now, specific examples of the optically active compound (4) of the present invention will be explained below. In the present specification, -Cy- represents a non-substituted trans-1,4-cyclohexylene group, -Ph- represents a non-substituted 1,4-phenylene group, -Ph$^{F}$- represents a 2-fluoro-1,4-phenylene group (Formula (4-5)), and -Ph$^{FF}$- represents a 2,6-difluoro-1,4-phenylene group (formula (4-6)). In the formulae (4-5) and (4-6), the side close to Z is taken as the 1-position, and the position of the fluorine substituent is as shown in the following formulae. These formulae will generically be referred to as "ring group". In the formula (4), the number of the ring group is preferably from 2 to 5, and it is preferably 3 or 4 in view of the phase transition temperature and a low viscosity, particularly preferably 3.

(4-6)

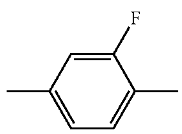

(4-5)

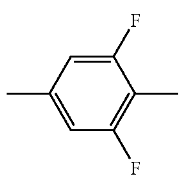

Now, specific examples of the compound of the formula (4) are classified by the number of ring groups and the type of $Z^3$, and exemplified below. In the present specification, the asymmetric carbon atom will sometimes be referred to simply as C.

Specific Examples of the Compound Wherein the Number of Ring Groups is 3

As preferred specific examples of the compound wherein Z=CN, the following compounds may be mentioned.

H-Ph-CH($CH_3$)—$CH_2$-Ph-Ph$^{F}$-CN
H-Ph-CH($CH_3$)—$CH_2$-Ph$^{F}$-Ph-CN
H-Ph-CH($CH_3$)—$CH_2$-Ph-Ph$^{FF}$-CN
H-Ph-CH($CH_3$)—$CH_2$-Ph$^{FF}$-Ph-CN
H-Ph-CH($CH_3$)—$CH_2$-Ph$^{F}$-Ph$^{F}$-CN
H-Ph-CH($CH_3$)—$CH_2$-Ph$^{F}$-Ph$^{FF}$-CN
H-Ph-CH($CH_3$)—$CH_2$-Ph$^{FF}$-Ph$^{F}$-CN
H-Ph-CH($CH_3$)—$CH_2$-Ph$^{FF}$-Ph$^{FF}$-CN
H-Ph-CH($CF_3$)—$CH_2$-Ph-Ph$^{FF}$-CN
H-Ph-CHF-$CH_2$-Ph-Ph$^{FF}$-CN
H-Ph-CH($CH_3$)—CO-Ph-Ph$^{FF}$-CN
H-Ph-CH($CF_3$)—CO-Ph-Ph$^{FF}$-CN
H-Ph-CH($CH_3$)—$CH_2$-Ph-COO-Ph$^{F}$-CN
H-Ph-CH($CH_3$)—$CH_2$-Ph$^{F}$-COO-Ph-CN
H-Ph-CH($CH_3$)—$CH_2$-Ph-COO-Ph$^{FF}$-CN
H-Ph-CH($CH_3$)—$CH_2$-Ph$^{FF}$-COO-PH-CN
H-Ph-CH($CH_3$)—$CH_2$-Ph$^{F}$-COO-Ph$^{F}$-CN
H-Ph-CH($CH_3$)—$CH_2$-Ph$^{F}$-COO-Ph$^{FF}$-CN
H-Ph-CH($CH_3$)—$CH_2$-Ph$^{FF}$-COO-Ph$^{F}$-CN
H-Ph-CH($CH_3$)—$CH_2$-Ph$^{FF}$-COO-Ph$^{FF}$-CN
H-Ph-CH($CF_3$)—$CH_2$-Ph-COO-Ph$^{FF}$-CN
H-Ph-CHF—$CH_2$-Ph-COO-Ph$^{FF}$-CN
H-Ph-CH($CH_3$)—CO-Ph-COO-Ph$^{FF}$-CN
H-Ph-CH($CF_3$)—CO-Ph-COO-Ph$^{FF}$-CN
H-Ph-CH($CH_3$)—$CH_2$-Ph-OCO-Ph$^{F}$-CN
H-Ph-CH($CH_3$)—$CH_2$-Ph$^{F}$-OCO-Ph-CN
H-Ph-CH($CH_3$)—$CH_2$-Ph-OCO-Ph$^{FF}$-CN
H-Ph-CH($CH_3$)—$CH_2$-Ph$^{FF}$-OCO-PH-CN
H-Ph-CH($CH_3$)—$CH_2$-Ph$^{F}$-OCO-Ph$^{F}$-CN
H-Ph-CH($CH_3$)—$CH_2$-Ph$^{F}$-OCO-Ph$^{FF}$-CN
H-Ph-CH($CH_3$)—$CH_2$-Ph$^{FF}$-OCO-Ph$^{F}$-CN
H-Ph-CH($CH_3$)—$CH_2$-Ph$^{FF}$-OCO-Ph$^{FF}$-CN
H-Ph-CH($CF_3$)—$CH_2$-Ph-OCO-Ph$^{FF}$-CN
H-Ph-CHF—$CH_2$-Ph-OCO-Ph$^{FF}$-CN
H-PH-CH($CH_3$)—CO-Ph-OCO-Ph$^{FF}$-CN
H-Ph-CH($CF_3$)—CO-Ph-OCO-Ph$^{FF}$-CN
H-Ph-CH($CH_3$)—$CH_2$-Ph-$CH_2CH_2$-Ph$^{F}$-CN
H-Ph-CH($CH_3$)—$CH_2$-Ph$^{F}$-$CH_2CH_2$-Ph-CN
H-Ph-CH($CH_3$)—$CH_2$-Ph-$CH_2CH_2$-Ph$^{FF}$-CN
H-Ph-CH($CH_3$)—$CH_2$-Ph$^{FF}$-$CH_2CH_2$-Ph-CN
H-Ph-CH($CH_3$)—$CH_2$-Ph$^{F}$-$CH_2CH_2$-Ph$^{F}$-CN
H-Ph-CH($CH_3$)—$CH_2$-Ph$^{F}$-$CH_2CH_2$-Ph$^{FF}$-CN
H-Ph-CH($CH_3$)—$CH_2$-Ph$^{FF}$-$CH_2CH_2$-Ph$^{F}$-CN
H-Ph-CH($CH_3$)—$CH_2$-Ph$^{FF}$-$CH_2CH_2$-Ph$^{FF}$-CN
H-Ph-CH($CF_3$)—$CH_2$-Ph-$CH_2CH_2$-Ph$^{FF}$-CN
H-Ph-CHF—$CH_2$-Ph-$CH_2CH_2$-Ph$^{FF}$-CN
H-Ph-CH($CH_3$)—CO-Ph-$CH_2CH_2$-Ph$^{FF}$-CN
H-Ph-CH($CF_3$)—CO-Ph-$CH_2CH_2$-Ph$^{FF}$-CN
H-Ph-CH($CH_3$)—$CH_2$-Ph-$CH_2O$-Ph$^{F}$-CN
H-Ph-CH($CH_3$)—$CH_2$-Ph$^{F}$-$CH_2O$-Ph-CN
H-Ph-CH($CH_3$)—$CH_2$-Ph-$CH_2O$-Ph$^{FF}$-CN
H-Ph-CH($CH_3$)—$CH_2$-Ph$^{FF}$-$CH_2O$-Ph-CN
H-Ph-CH($CH_3$)—$CH_2$-Ph$^{F}$-$CH_2O$-Ph$^{F}$-CN
H-Ph-CH($CH_3$)—$CH_2$-Ph-$CH_2O$-Ph$^{FF}$-CN
H-Ph-CH($CH_3$)—$CH_2$-Ph$^{FF}$-$CH_2O$-Ph$^{F}$-CN
H-Ph-CH($CH_3$)—$CH_2$-Ph$^{FF}$-$CH_2O$-Ph$^{FF}$-CN
H-Ph-CH($CF_3$)—$CH_2$-Ph-$CH_2O$-Ph$^{FF}$-CN
H-Ph-CHF—$CH_2$-Ph-$CH_2O$-Ph$^{FF}$-CN
H-Ph-CH($CH_3$)—CO-Ph-$CH_2O$-Ph$^{FF}$-CN
H-Ph-CH($CF_3$)—CO-Ph-$CH_2O$-Ph$^{FF}$-CN
H-Ph-CH($CH_3$)—$CH_2$-Ph-$OCH_2$-Ph$^{F}$-CN
H-Ph-CH($CH_3$)—$CH_2$-Ph$^{F}$-$OCH_2$-Ph-CN
H-Ph-CH($CH_3$)—$CH_2$-Ph-$OCH_2$-Ph$^{FF}$-CN
H-Ph-CH($CH_3$)—$CH_2$-Ph$^{FF}$-$OCH_2$-Ph-CN
H-Ph-CH($CH_3$)—$CH_2$-Ph$^{F}$-$OCH_2$-Ph$^{F}$-CN
H-Ph-CH($CH_3$)—$CH_2$-Ph$^{F}$-$OCH_2$-Ph$^{FF}$-CN
H-Ph-CH($CH_3$)—$CH_2$-Ph$^{FF}$-$OCH_2$-Ph$^{F}$-CN
H-Ph-CH($CH_3$)—$CH_2$-Ph$^{FF}$-$OCH_2$-Ph$^{FF}$-CN
H-Ph-CH($CF_3$)—$CH_2$-Ph-$OCH_2$-Ph$^{FF}$-CN
H-Ph-CHF—$CH_2$-Ph-$OCH_2$-Ph$^{FF}$-CN
H-Ph-CH($CH_3$)—CO-Ph-$OCH_2$-Ph$^{FF}$-CN
H-Ph-CH($CF_3$)—CO-Ph-$OCH_2$-Ph$^{FF}$-CN
H-Ph-CH($CH_3$)—$CH_2$-Ph-CF═CF-Ph$^{F}$-CN
H-Ph-CH($CH_3$)—$CH_2$-Ph$^{F}$-CF═CF-Ph-CN
H-Ph-CH($CH_3$)—$CH_2$-Ph-CF═CF-Ph$^{FF}$-CN
H-Ph-CH($CH_3$)—$CH_2$-Ph$^{FF}$-CF═CF-Ph-CN
H-Ph-CH($CH_3$)—$CH_2$-Ph$^{F}$-CF═CF-Ph$^{F}$-CN
H-PH-CH($CH_3$)—$CH_2$-Ph$^{F}$-CF═CF-PH$^{FF}$-CN
H-Ph-CH($CH_3$)—$CH_2$-Ph$^{FF}$-CF═CF-Ph$^{F}$-CN
H-Ph-CH($CH_3$)—$CH_2$-Ph$^{FF}$-CF═CF-Ph$^{FF}$-CN
H-Ph-CH($CF_3$)—$CH_2$-Ph-CF═CF-Ph$^{FF}$-CN
H-Ph-CHF—$CH_2$-Ph-CF═CF-Ph$^{FF}$-CN
H-Ph-CH($CH_3$)—CO-Ph-CF═CF-Ph$^{FF}$-CN
H-Ph-CH($CF_3$)—CO-Ph-CF═CF-Ph$^{FF}$-CN
H-Ph-CH($CH_3$)—$CH_2$-Ph-$CF_2O$-Ph$^{F}$-CN
H-Ph-CH($CH_3$)—$CH_2$-Ph$^{F}$-$CF_2O$-Ph-CN

H-Ph-CH(CH$_3$)—CH$_2$-Ph-CF$_2$O-Ph$^{FF}$-CN
H-Ph-CH(CH$_3$)—CH$_2$-Ph$^{FF}$-CF$_2$O-Ph-CN
H-Ph-CH(CH$_3$)—CH$_2$-Ph$^{F}$-CF$_2$O-Ph$^{F}$-CN
H-Ph-CH(CH$_3$)—CH$_2$-Ph$^{F}$-CF$_2$O-Ph$^{FF}$-CN
H-Ph-CH(CH$_3$)—CH$_2$-Ph$^{FF}$-CF$_2$O-Ph$^{F}$-CN
H-Ph-CH(CH$_3$)—CH$_2$-Ph$^{FF}$-CF$_2$O-Ph$^{FF}$-CN
H-Ph-CH(CF$_3$)—CH$_2$-Ph-CF$_2$O-Ph$^{FF}$-CN
H-Ph-CHF—CH$_2$-Ph-CF$_2$O-Ph$^{FF}$-CN
H-Ph-CH(CH$_3$)—CO-Ph-CF$_2$O-Ph$^{FF}$-CN
H-Ph-CH(CF$_3$)—CO-Ph-CF$_2$O-Ph$^{FF}$-CN

As preferred specific examples of the compound wherein Z=CF$_3$, the following compounds may be mentioned.

H-Ph-CH(CH$_3$)—CH$_2$-Ph-Ph$^{F}$-CF$_3$
H-Ph-CH(CH$_3$)—CH$_2$-Ph$^{F}$-Ph-CF$_3$
H-Ph-CH(CH$_3$)—CH$_2$-Ph-Ph$^{FF}$-CF$_3$
H-Ph-CH(CH$_3$)—CH$_2$-Ph$^{FF}$-Ph-CF$_3$
H-Ph-CH(CH$_3$)—CH$_2$-Ph$^{F}$-Ph$^{F}$-CF$_3$
H-Ph-OH(CH$_3$)—OH$_2$-Ph$_F$-Ph$^{FF}$-CF$_3$
H-Ph-CH(CH$_3$)—CH$_2$-Ph$^{FF}$-Ph$^{F}$-CF$_3$
H-Ph-CH(CH$_3$)—CH$_2$-Ph$^{FF}$-Ph$^{FF}$-CF$_3$
H-Ph-CH(CF$_3$)—CH$_2$-Ph-Ph$^{FF}$-CF$_3$
H-PH-CHF—CH$_2$-Ph-Ph$^{FF}$-CF$_3$
H-Ph-CH(CH$_3$)—CO-Ph-Ph$^{FF}$-CF$_3$
H-Ph-CH(CF$_3$)—CO-Ph-Ph$^{FF}$-CF$_3$
H-Ph-CH(CH$_3$)—CH$_2$-Ph-COO-Ph$^{F}$-CF$_3$
H-Ph-CH(CH$_3$)—CH$_2$-Ph$^{F}$-COO-Ph-CF$_3$
H-Ph-CH(CH$_3$)—CH$_2$-Ph-COO-Ph$^{FF}$-CF$_3$
H-Ph-CH(CH$_3$)—CH$_2$-Ph$^{FF}$-COO-Ph-CF$_3$
H-Ph-CH(CH$_3$)—CH$_2$-Ph$^{F}$-COO-Ph$^{F}$-CF$_3$
H-Ph-CH(CH$_3$)—CH$_2$-Ph$^{F}$-COO-Ph$^{FF}$-CF$_3$
H-Ph-CH(CH$_3$)—CH$_2$-Ph$^{FF}$-COO-Ph$^{F}$-CF$_3$
H-Ph-CH(CH$_3$)—CH$_2$-Ph$^{FF}$-COO-Ph$^{FF}$-CF$_3$
H-PH-CH(CH$_3$)—CH$_2$-Ph-COO-Ph$^{FF}$-CF$_3$
H-Ph-CHF—CH$_2$-Ph-COO-Ph$^{FF}$-CF$_3$
H-Ph-CH(CH$_3$)—CO-Ph-COO-Ph$^{FF}$-CF$_3$
H-Ph-CH(CF$_3$)—CO-Ph-COO-Ph$^{FF}$-CF$_3$
H-Ph-CH(CH$_3$)—CH$_2$-Ph-OCO-Ph$^{F}$-CF$_3$
H-Ph-CH(CH$_3$)—CH$_2$-Ph$^{F}$-OCO-Ph-CF$_3$
H-PH-CH(CH$_3$)—CH$_2$-Ph-OCO-Ph$^{FF}$-CF$_3$
H-Ph-CH(CH$_3$)—CH$_2$-Ph$^{FF}$-OCO-Ph-CF$_3$
H-Ph-CH(CH$_3$)—CH$_2$-Ph$^{F}$-OCO-Ph$^{F}$-CF$_3$
H-Ph-CH(CH$_3$)—CH$_2$-Ph$^{F}$-OCO-Ph$^{FF}$-CF$_3$
H-Ph-CH(CH$_3$)—CH$_2$-Ph$^{FF}$-OCO-Ph$^{F}$-CF$_3$
H-PH-CH(CH$_3$)—CH$_2$-Ph$^{FF}$-OCO-Ph$^{FF}$-CF$_3$
H-Ph-CH(CF$_3$)—CH-Ph-OCO-Ph$^{FF}$-CF$_3$
H-Ph-CHF—CH$_2$-Ph-OCO-Ph$^{FF}$-CF$_3$
H-Ph-CH(CH$_3$)—CO-Ph-OCO-Ph$^{FF}$-CF$_3$
H-Ph-CH(CF$_3$)—CO-Ph-OCO-Ph$^{FF}$-CF$_3$
H-Ph-CH(CH$_3$)—CH$_2$-Ph-CH$_2$CH$_2$-Ph$^{F}$-CF$_3$
H-Ph-CH(CH$_3$)—CH$_2$-Ph$^{F}$-CH$_2$CH$_2$-Ph-CF$_3$
H-Ph-CH(CH$_3$)—CH$_2$-Ph-CH$_2$CH$_2$-Ph$^{FF}$-CF$_3$
H-Ph-CH(CH$_3$)—CH$_2$-Ph$_{FF}$-CH$_2$CH$_2$-Ph-CF$_3$
H-Ph-CH(CH$_3$)—CH$_2$-Ph$^{F}$-CH$_2$CH$_2$-Ph$^{F}$-CF$_3$
H-Ph-CH(CH$_3$)—CH$_2$-Ph$^{F}$-CH$_2$CH$_2$-Ph$^{FF}$-CF$_3$
H-Ph-CH(CH$_3$)—CH$_2$-Ph$^{FF}$-CH$_2$CH$_2$-Ph$^{F}$-CF$_3$
H-Ph-CH(CH$_3$)—CH$_2$-Ph$^{FF}$-CH$_2$CH$_2$-Ph$^{FF}$-CF$_3$
H-Ph-CH(CF$_3$)—CH$_2$-Ph-CH$_2$CH$_2$-Ph$^{FF}$-CF$_3$
H-Ph-CHF—CH$_2$-Ph-CH$_2$CH$_2$-Ph$^{FF}$-CF$_3$
H-Ph-CH(CH$_3$)—CO-Ph-CH$_2$CH$_2$-Ph$^{FF}$-CF$_3$
H-Ph-CH(CF$_3$)—CO-Ph-CH$_2$CH$_2$-Ph$^{FF}$-CF$_3$
H-Ph-CH(CH$_3$)—CH$_2$-Ph-CH$_2$O-Ph$^{F}$-CF$_3$
H-Ph-CH(CH$_3$)—CH$_2$-Ph$^{F}$-CH$_2$O-Ph-CF$_3$
H-Ph-CH(CH$_3$)—CH$_2$-Ph-CH$_2$O-Ph$^{FF}$-CF$_3$
H-Ph-CH(CH$_3$)—CH$_2$-Ph$^{FF}$-CH$_2$O-Ph-CF$_3$
H-Ph-CH(CH$_3$)—CH$_2$-Ph$^{F}$-CH$_2$O-Ph$^{F}$-CF$_3$
H-Ph-CH(CH$_3$)—CH$_2$-Ph$^{F}$-CH$_2$O-Ph$^{FF}$-CF$_3$
H-Ph-CH(CH$_3$)—CH$_2$-Ph$^{FF}$-CH$_2$O-Ph$^{F}$-CF$_3$
H-Ph-CH(CH$_3$)—CH$_2$-Ph$^{FF}$-CH$_2$O-Ph$^{FF}$-CF$_3$
H-Ph-CH(CF$_3$)—CH$_2$-Ph-CH$_2$O-Ph$^{FF}$-CF$_3$
H-Ph-CHF—CH$_2$-Ph-CH$_2$O-Ph$^{FF}$-CF$_3$
H-Ph-CH(CH$_3$)—CO-Ph-CH$_2$O-Ph$^{FF}$-CF$_3$
H-Ph-CH(CF$_3$)—CO-Ph-CH$_2$O-Ph$^{FF}$-CF$_3$
H-Ph-CH(CH$_3$)—CH$_2$-Ph-OCH$_2$-Ph$^{F}$-CF$_3$
H-Ph-CH(CH$_3$)—CH$_2$-Ph$^{F}$-OCH$_2$-Ph-CF$_3$
H-Ph-CH(CH$_3$)—CH$_2$-Ph-OCH$_2$-Ph$^{FF}$-CF$_3$
H-Ph-CH(CH$_3$)—CH$_2$-Ph$^{FF}$-OCH$_2$-Ph-CF$_3$
H-Ph-CH(CH$_3$)—CH$_2$-Ph$^{F}$-OCH$_2$-Ph$^{F}$-CF$_3$
H-Ph-CH(CH$_3$)—CH$_2$-Ph$^{F}$-OCH$_2$-Ph$^{FF}$-CF$_3$
H-Ph-CH(CH$_3$)—CH$_2$-Ph$^{FF}$-OCH$_2$-Ph$^{F}$-CF$_3$
H-Ph-CH(CH$_3$)—CH$_2$-Ph$^{FF}$-OCH$_2$-Ph$^{FF}$-CF$_3$
H-Ph-CH(CF$_3$)—CH$_2$-Ph-OCH$_2$-Ph$^{FF}$-CF$_3$
H-Ph-CHF—CH$_2$-Ph-OCH$_2$-Ph$^{FF}$-CF$_3$
H-Ph-CH(CH$_3$)—CO-Ph-OCH$_2$-Ph$^{FF}$-CF$_3$
H-Ph-CH(CF$_3$)—CO-Ph-OCH$_2$-Ph$^{FF}$-CF$_3$
H-Ph-CH(CH$_3$)—CH$_2$-Ph-CF═CF-Ph-CF$_3$
H-Ph-CH(CH$_3$)—CH$_2$-Ph$^{F}$-CF═CF-Ph-CF$_3$
H-Ph-CH(CH$_3$)—CH$_2$-Ph-CF═CF-Ph$^{FF}$-CF$_3$
H-Ph-CH(CH$_3$)—CH$_2$-Ph$^{FF}$-CF═CF-Ph-CF$_3$
H-Ph-CH(CH$_3$)—CH$_2$-Ph$^{F}$-CF═CF-Ph$^{F}$-CF$_3$
H-Ph-CH(CH$_3$)—CH$_2$-Ph$^{F}$-CF═CF-Ph$^{FF}$-CF$_3$
H-Ph-CH(CH$_3$)—CH$_2$-Ph$^{FF}$-CF═CF-Ph$^{F}$-CF$_3$
H-Ph-CH(CH$_3$)—CH$_2$-Ph$^{FF}$-CF═CF-Ph$^{FF}$-CF$_3$
H-Ph-CH(CF$_3$)—CH$_2$-Ph-CF═CF-Ph$^{FF}$-CF$_3$
H-Ph-CHF—CH$_2$-Ph-CF═CF-Ph$^{FF}$-CF$_3$
H-Ph-CH(CH$_3$)—CO-Ph-CF═CF-Ph$^{FF}$-CF$_3$
H-Ph-CH(CF$_3$)—CO-Ph-CF═CF-Ph$^{FF}$-CF$_3$
H-Ph-CH(CH$_3$)—CH$_2$-Ph-CF$_2$O-Ph$^{F}$-CF$_3$
H-Ph-CH(CH$_3$)—CH$_2$-Ph$^{F}$-CF$_2$O-Ph-CF$_3$
H-Ph-CH(CH$_3$)—CH$_2$-Ph-CF$_2$O-Ph$^{FF}$-CF$_3$
H-Ph-CH(CH$_3$)—CH$_2$-Ph$^{FF}$-CF$_2$O-Ph-CF$_3$
H-Ph-CH(CH$_3$)—CH$_2$-Ph$^{F}$-CF$_2$O-Ph$^{F}$-CF$_3$
H-Ph-CH(CH$_3$)—CH$_2$-Ph$^{F}$-CF$_2$O-Ph$^{FF}$-CF$_3$
H-Ph-CH(CH$_3$)—CH$_2$-Ph$^{FF}$-CF$_2$O-Ph$^{F}$-CF$_3$
H-Ph-CH(CH$_3$)—CH$_2$-Ph$^{FF}$-CF$_2$O-Ph$^{FF}$-CF$_3$
H-Ph-CH(CF$_3$)—CH$_2$-Ph-CF$_2$O-Ph$^{FF}$-CF$_3$
H-Ph-CHF-CH$_2$-Ph-CF$_2$O-Ph$^{FF}$-CF$_3$
H-Ph-CH(CH$_3$)—CO-Ph-CF$_2$O-Ph$^{FF}$-CF$_3$
H-Ph-CH(CF$_3$)—CO-Ph-CF$_2$O-Ph$^{FF}$-CF$_3$

As preferred specific examples of the compound wherein $Z^7$=OCF$_3$, the following compounds may be mentioned.

H-Ph-CH(CH$_3$)—CH$_2$-Ph-Ph$^{F}$-OCF$_3$
H-Ph-CH(CH$_3$)—CH$_2$-Ph$^{F}$-Ph-OCF$_3$
H-Ph-CH(CH$_3$)—CH$_2$-Ph-Ph$^{FF}$-OCF$_3$
H-Ph-CH(CH$_3$)—CH$_2$-Ph$^{FF}$-Ph-OCF$_3$
H-Ph-CH(CH$_3$)—CH$_2$-Ph$^{F}$-Ph$^{F}$-OCF$_3$
H-Ph-CH(CH$_3$)—CH$_2$-Ph$^{F}$-Ph$^{FF}$-OCF$_3$
H-Ph-CH(CH$_3$)—CH$_2$-Ph$^{FF}$-Ph$^{F}$-OCF$_3$
H-Ph-CH(CH$_3$)—CH$_2$-Ph$^{FF}$-Ph$^{FF}$-OCF$_3$
H-Ph-CH(CF$_3$)—CH$_2$-Ph-Ph$^{FF}$-OCF$_3$
H-Ph-CHF—CH$_2$-Ph-Ph$^{FF}$-OCF$_3$
H-Ph-CH(CH$_3$)—CO-Ph-Ph$^{FF}$-OCF$_3$
H-Ph-CH(CF$_3$)—CO-Ph-Ph$^{FF}$-OCF$_3$
H-Ph-CH(CH$_3$)—CH$_2$-Ph-COO-Ph$^{F}$-OCF$_3$
H-Ph-CH(CH$_3$)—CH$_2$-Ph$^{F}$-COO-Ph-OCF$_3$
H-Ph-CH(CH$_3$)—CH$_2$-Ph-COO-Ph$^{FF}$-OCF$_3$
H-Ph-CH(CH$_3$)—CH$_2$-Ph$^{FF}$-COO-Ph-OCF$_3$
H-Ph-CH(CH$_3$)—CH$_2$-Ph$^{F}$-COO-Ph$^{F}$-OCF$_3$
H-Ph-CH(CH$_3$)—CH$_2$-Ph$^{F}$-COO-Ph$^{FF}$-OCF$_3$
H-Ph-CH(CH$_3$)—CH$_2$-Ph$^{FF}$-COO-Ph$^{F}$-OCF$_3$
H-Ph-CH(CH$_3$)—CH$_2$-Ph$^{FF}$-COO-Ph$^{FF}$-OCF$_3$
H-Ph-CH(CF$_3$)—CH$_2$-Ph-COO-Ph$^{FF}$-OCF$_3$
H-Ph-CHF—CH$_2$-Ph-COO-Ph$^{FF}$-OCF$_3$
H-Ph-CH(CH$_3$)—CO-PH-COO-Ph$_{FF}$-OCF$_3$
H-Ph-CH(CF$_3$)—CO-Ph-COO-Ph$^{FF}$-OCF$_3$

H-Ph-CH($CH_3$)—$CH_2$-Ph-OCO-$Ph^F$-$OCF_3$
H-Ph-CH($CH_3$)—$CH_2$-$Ph^F$-OCO-Ph-$OCF_3$
H-Ph-CH($CH_3$)—$CH_2$-Ph-OCO-$Ph^{FF}$-$OCF_3$
H-Ph-CH($CH_3$)—$CH_2$-$Ph^{FF}$-OCO-Ph-$OCF_3$
H-Ph-CH($CH_3$)—$CH_2$-$Ph^F$-OCO-$P^F$-$OCF_3$
H-Ph-CH($CH_3$)—$CH_2$-$Ph^F$-OCO-$Ph^{FF}$-$OCF_3$
H-Ph-CH($CH_3$)—$CH_2$-$Ph^{FF}$-OCO-$Ph^F$-$OCF_3$
H-Ph-CH($CH_3$)—$CH_2$-$Ph^{FF}$-OCO-$Ph^{FF}$-$OCF_3$
H-Ph-CH($CF_3$)—$CH_2$-Ph-OCO-$Ph^{FF}$-$OCF_3$
H-Ph-CHF—$CH_2$-Ph-OCO-$Ph^{FF}$-$OCF_3$
H-Ph-CH($CH_3$)—CO-Ph-OCO-$Ph^{FF}$-$OCF_3$
H-Ph-CH($CF_3$)—CO-Ph-OCO-$Ph^{FF}$-$OCF_3$
H-Ph-CH($CH_3$)—$CH_2$-Ph-$CH_2CH_2$-$Ph^F$-$OCF_3$
H-Ph-CH($CH_3$)—$CH_2$-$Ph^F$-$CH_2CH_2$-Ph-$OCF_3$
H-Ph-CH($CH_3$)—$CH_2$-Ph-$CH_2CH_2$-$Ph^{FF}$-$OCF_3$
H-Ph-CH($CH_3$)—$CH_2$-$Ph^{FF}$-$CH_2CH_2$-Ph-$OCF_3$
H-Ph-CH($CH_3$)—$CH_2$-$Ph^F$-$CH_2CH_2$-$Ph^F$-$OCF_3$
H-Ph-CH($CH_3$)—$CH_2$-$Ph^F$-$CH_2CH_2$-$Ph^{FF}$-$OCF_3$
H-Ph-CH($CH_3$)—$CH_2$-$Ph^{FF}$-$CH_2CH_2$-$Ph^F$-$OCF_3$
H-Ph-CH($CH_3$)—$CH_2$-$Ph^{FF}$-$CH_2CH_2$-$Ph_{FF}$-$OCF_3$
H-Ph-CH($CF_3$)—$CH_2$-Ph-$CH_2CH_2$-$Ph^{FF}$-$OCF_3$
H-Ph-CHF—$CH_2$-Ph-$CH_2CH_2$-$Ph^{FF}$-$OCF_3$
H-Ph-CH($CH_3$)—CO-Ph-$CH_2CH_2$-$Ph^{FF}$-$OCF_3$
H-Ph-CH($CF_3$)—CO-Ph-$CH_2CH_2$-$Ph^{FF}$-$OCF_3$
H-Ph-CH($CH_3$)—$CH_2$-Ph-$CH_2O$-$Ph^F$-$OCF_3$
H-Ph-CH($CH_3$)—$CH_2$-$Ph^F$-$CH_2O$-Ph-$OCF_3$
H-Ph-CH($CH_3$)—$CH_2$-Ph-$CH_2O$-$Ph^{FF}$-$OCF_3$
H-Ph-CH($CH_3$)—$CH_2$-$Ph^{FF}$-$CH_2O$-Ph-$OCF_3$
H-Ph-CH($CH_3$)—$CH_2$-$Ph^F$-$CH_2O$-$Ph^F$-$OCF_3$
H-Ph-CH($CH_3$)—$CH_2$-$Ph^F$-$CH_2O$-$Ph^{FF}$-$OCF_3$
H-Ph-CH($CH_3$)—$CH_2$-$Ph^{FF}$-$CH_2O$-$Ph^F$-$OCF_3$
H-Ph-CH($CH_3$)—$CH_2$-$Ph^{FF}$-$CH_2O$-$Ph^{FF}$-$OCF_3$
H-Ph-CH($CF_3$)—$CH_2$-Ph-$CH_2O$-$Ph^{FF}$-$OCF_3$
H-Ph-CHF—$CH_2$-Ph-$CH_2O$-$Ph^{FF}$-$OCF_3$
H-Ph-CH($CH_3$)—CO-Ph-$CH_2O$-$Ph^{FF}$-$OCF_3$
H-Ph-CH($CF_3$)—CO-Ph-$CH_2O$-$Ph^{FF}$-$OCF_3$
H-Ph-CH($CH_3$)—$CH_2$-Ph-$OCH_2$-$Ph^F$-$OCF_3$
H-Ph-CH($CH_3$)—$CH_2$-$Ph^F$-$OCH_2$-Ph-$OCF_3$
H-Ph-CH($CH_3$)—$CH_2$-Ph-$OCH_2$-$Ph^{FF}$-$OCF_3$
H-Ph-CH($CH_3$)—$CH_2$-$Ph^{FF}$-$OCH_2$-Ph-$OCF_3$
H-Ph-CH($CH_3$)—$CH_2$-$Ph^F$-$OCH_2$-$Ph^F$-$OCF_3$
H-Ph-CH($CH_3$)—$CH_2$-$Ph^F$-$OCH_2$-$Ph^{FF}$-$OCF_3$
H-Ph-CH($CH_3$)—$CH_2$-$Ph^{FF}$-$OCH_2$-$Ph^F$-$OCF_3$
H-Ph-CH($CH_3$)—$CH_2$-$Ph^{FF}$-$OCH_2$-$Ph^{FF}$-$OCF_3$
H-Ph-CH($CF_3$)—$CH_2$-Ph-$OCH_2$-$Ph^{FF}$-$OCF_3$
H-PH-CHF—$CH_2$-Ph-$OCH_2$-$Ph^{FF}$-$OCF_3$
H-Ph-CH($CH_3$)—CO-Ph-$OCH_2$-$Ph^{FF}$-$OCF_3$
H-Ph-CH($CF_3$)—CO-Ph-$OCH_2$-$Ph^{FF}$-$OCF_3$
H-Ph-CH($CH_3$)—$CH_2$-Ph-CF═CF-$Ph^F$-$OCF_3$
H-Ph-CH($CH_3$)—$CH_2$-Ph-CF═CF-Ph-$OCF_3$
H-Ph-CH($CH_3$)—$CH_2$-Ph-CF═CF-$Ph^{FF}$-$OCF_3$
H-Ph-CH($CH_3$)—$CH_2$-$Ph^{FF}$-CF═CF-Ph-$OCF_3$
H-Ph-CH($CH_3$)—$CH_2$-$Ph^F$-CF═CF-$PH^F$-$OCF_3$
H-Ph-CH($CH_3$)—$CH_2$-$Ph^F$-CF═CF-$Ph^{FF}$-$OCF_3$
H-Ph-CH($CH_3$)—$CH_2$-$Ph^{FF}$-CF═CF-$Ph^F$-$OCF_3$
H-Ph-CH($CH_3$)—$CH_2$-$Ph^{FF}$-CF═CF-$Ph^{FF}$-$OCF_3$
H-Ph-CH($CF_3$)—$CH_2$-Ph-CF═CF-$Ph^{FF}$-$OCF_3$
H-Ph-CHF—$CH_2$-Ph-CF═CF-$Ph^{FF}$-$OCF_3$
H-Ph-CH($CH_3$)—CO-Ph-CF═CF-$Ph^{FF}$-$OCF_3$
H-Ph-CH($CF_3$)—CO-Ph-CF═CF-$Ph^{FF}$-$OCF_3$
H-Ph-CH($CH_3$)—$CH_2$-Ph-$CF_2$-$Ph^F$-$OCF_3$
H-Ph-CH($CH_3$)—$CH_2$-Ph-$CF_2O$-Ph-$OCF_3$
H-Ph-CH($CH_3$)—$CH_2$-Ph-$CF_2O$-$Ph^{FF}$-$OCF_3$
H-Ph-CH($CH_3$)—$CH_2$-$Ph^{FF}$-$CF_2O$-Ph-$OCF_3$
H-PH-CH($CH_3$)—$CH_2$-$Ph^F$-$CF_2O$-$Ph^F$-$OCF_3$
H-Ph-CH($CH_3$)—$CH_2$-$Ph^F$-$CF_2O$-$Ph^{FF}$-$OCF_3$
H-Ph-CH($CH_3$)—$CH_2$-$Ph^{FF}$-$CF_2O$-$Ph^F$-$OCF_3$
H-Ph-CH($CH_3$)—$CH_2$-$Ph^{FF}$-$CF_2O$-$Ph^{FF}$-$OCF_3$
H-Ph-CH($CF_3$)—$CH_2$-Ph-$CF_2O$-$Ph^{FF}$-$OCF_3$
H-Ph-CHF—$CH_2$-Ph-$CF_2O$-$Ph^{FF}$-$OCF_3$
H-Ph-CH($CH_3$)—CO-Ph-$CF_2O$-$Ph^{FF}$-$OCF_3$
H-Ph-CH($CF_3$)—CO-Ph-$CF_2O$-$Ph^{FF}$-$OCF_3$

As preferred specific examples of the compound wherein $Z^7$=$SF_5$, the following compounds may be mentioned.

H-Ph-CH($CH_3$)—$CH_2$-Ph-$Ph^F$-$SF_5$
H-Ph-CH($CH_3$)—$CH_2$-$Ph^F$-Ph-$SF_5$
H-Ph-CH($CH_3$)—$CH_2$-Ph-$Ph^{FF}$-$SF_5$
H-Ph-CH($CH_3$)—$CH_2$-$Ph^{FF}$-Ph-$SF_5$
H-Ph-CH($CH_3$)—$CH_2$-$Ph^F$-$Ph^F$-$SF_5$
H-Ph-CH($CH_3$)—$CH_2$-$Ph^F$-$Ph^{FF}$-$SF_5$
H-Ph-CH($CH_3$)—$CH_2$-$Ph^{FF}$-$Ph_F$-$SF_5$
H-Ph-CH($CH_3$)—$CH_2$-$Ph^{FF}$-$Ph_{FF}$-$SF_5$
H-Ph-CH($CF_3$)—$CH_2$-Ph-$Ph^{FF}$-$SF_5$
H-Ph-CHF—$CH_2$-Ph-$Ph^{FF}$-$SF_5$
H-Ph-CH($CH_3$)—CO-Ph-$Ph^{FF}$-$SF_5$
H-Ph-CH($CF_3$)—CO-Ph-$Ph^{FF}$-$SF_5$
H-Ph-CH($CH_3$)—$CH_2$-Ph-COO-$Ph^F$-$SF_5$
H-Ph-CH($CH_3$)—$CH_2$-$Ph^F$-COO-Ph-$SF_5$
H-Ph-CH($CH_3$)—$CH_2$-Ph-COO-$Ph^{FF}$-$SF_5$
H-Ph-CH($CH_3$)—$CH_2$-$Ph^{FF}$-COO-Ph-$SF_5$
H-Ph-CH($CH_3$)—$CH_2$-$Ph^F$-COO-$Ph^F$-$SF_5$
H-Ph-CH($CH_3$)—$CH_2$-$Ph^F$-COO-$Ph^{FF}$-$SF_5$
H-Ph-CH($CH_3$)—$CH_2$-$Ph^{FF}$-COO-$Ph^F$-$SF_5$
H-Ph-CH($CH_3$)—$CH_2$-$Ph^{FF}$-COO-$Ph^{FF}$-$SF_5$
H-Ph-CH($CF_3$)—$CH_2$-Ph-COO-$Ph^{FF}$-$SF_5$
H-Ph-CHF—$CH_2$-Ph-COO-$Ph^{FF}$-$SF_5$
H-Ph-CH($CH_3$)—CO-Ph-COO-$Ph^{FF}$-$SF_5$
H-Ph-CH($CF_3$)—CO-PH-COO-$Ph^{FF}$-$SF_5$
H-Ph-CH($CH_3$)—$CH_2$-Ph-OCO-$Ph^F$-$SF_5$
H-Ph-CH($CH_3$)—$CH_2$-$Ph^F$-OCO-Ph-$SF_5$
H-Ph-CH($CH_3$)—$CH_2$-PH-OCO-$Ph^{FF}$-$SF_5$
H-Ph-CH($CH_3$)—$CH_2$-$Ph^{FF}$-OCO-Ph-$SF_5$
H-Ph-CH($CH_3$)—$CH_2$-$Ph^F$-OCO-$Ph^F$-$SF_5$
H-Ph-CH($CH_3$)—$CH_2$-$Ph^F$-OCO-$Ph^{FF}$-$SF_5$
H-Ph-CH($CH_3$)—$CH_2$-$Ph^{FF}$-OCO-$Ph^F$-$SF_5$
H-Ph-CH($CH_3$)—$CH_2$-$Ph^{FF}$-OCO-$Ph^{FF}$-$SF_5$
H-Ph-CH($CF_3$)—$CH_2$-Ph-OCO-$Ph^{FF}$-$SF_5$
H-Ph-CHF—$CH_2$-Ph-OCO-$Ph^{FF}$-$SF_5$
H-Ph-CH($CH_3$)—CO-Ph-OCO-$Ph^{FF}$-$SF_5$
H-Ph-CH($CF_3$)—CO-Ph-OCO-$Ph^{FF}$-$SF_5$
H-Ph-CH($CH_3$)—$CH_2$-Ph-$CH_2CH_2$-$Ph^F$-$SF_5$
H-Ph-CH($CH_3$)—$CH_2$-$Ph^F$-$CH_2CH_2$-Ph-$SF_5$
H-Ph-CH($CH_3$)—$CH_2$-Ph-$CH_2CH_2$-$Ph^{FF}$-$SF_5$
H-Ph-CH($CH_3$)—$CH_2$-$Ph^{FF}$-$CH_2CH_2$-Ph-$SF_5$
H-Ph-CH($CH_3$)—$CH_2$-$Ph^F$-$CH_2CH_2$-$Ph^F$-$SF_5$
H-Ph-CH($CH_3$)—$CH_2$-$Ph^F$-$CH_2CH_2$-$Ph^{FF}$-$SF_5$
H-Ph-CH($CH_3$)—$CH_2$-$Ph^{FF}$-$CH_2CH_2$-$Ph^F$-$SF_5$
H-Ph-CH($CH_3$)—$CH_2$-$Ph^{FF}$-$CH_2CH_2$-$Ph^{FF}$-$SF_5$
H-Ph-CH($CF_3$)—$CH_2$-Ph-$CH_2CH_2$-$Ph^{FF}$-$SF_5$
H-Ph-CHF—$CH_2$-Ph-$CH_2CH_2$-$Ph^{FF}$-$SF_5$
H-Ph-CH($CH_3$)—CO-Ph-$CH_2CH_2$-$Ph^{FF}$-$SF_5$
H-Ph-CH($CF_3$)—CO-Ph-$CH_2CH_2$-$Ph_{FF}$-$SF_5$
H-Ph-CH($CH_3$)—$CH_2$-Ph-$CH_2O$-$Ph^F$-$SF_5$
H-Ph-CH($CH_3$)—$CH_2$-$Ph^F$-$CH_2O$-Ph-$SF_5$
H-Ph-CH($CH_3$)—$CH_2$-Ph-$CH_2O$-$Ph^{FF}$-$SF_5$
H-Ph-CH($CH_3$)—$CH_2$-$Ph^{FF}$-$CH_2$-Ph-$SF_5$
H-Ph-CH($CH_3$)—$CH_2$-$Ph^F$-$CH_2O$-$Ph^F$-$SF_5$
H-Ph-CH($CH_3$)—$CH_2$-$Ph^F$-$CH_2O$-$Ph^{FF}$-$SF_5$
H-Ph-CH($CH_3$)—$CH_2$-$Ph_{FF}$-$CH_2O$-$Ph^F$-$SF_5$
H-Ph-CH($CH_3$)—$CH_2$-$Ph^{FF}$-$CH_2O$-$Ph^{FF}$-$SF_5$
H-Ph-CH($CF_3$)—$CH_2$-Ph-$CH_2O$-$Ph^{FF}$-$SF_5$
H-Ph-CHF—$CH_2$-Ph-$CH_2O$-$Ph^{FF}$-$SF_5$
H-Ph-CH($CH_3$)—CO-Ph-$CH_2O$-$Ph^{FF}$-$SF_5$
H-Ph-CH($CF_3$)—CO-Ph-$CH_2O$-$Ph^{FF}$-$SF_5$

H-Ph-CH($CH_3$)—$CH_2$-Ph-$OCH_2$-$Ph^F$-$SF_5$
H-Ph-CH($CH_3$)—$CH_2$-$Ph^F$-$OCH_2$-Ph-$SF_5$
H-Ph-CH($CH_3$)—$CH_2$-Ph-$OCH_2$-$Ph^{FF}$-$SF_5$
H-Ph-CH($CH_3$)—$CH_2$-$Ph^{FF}$-$OCH_2$-Ph-$SF_5$
H-Ph-CH($CH_3$)—$CH_2$-$Ph^F$-$OCH_2$-$Ph^F$-$SF_5$
H-Ph-CH($CH_3$)—$CH_2$-$Ph^F$-$OCH_2$-$Ph^{FF}$-$SF_5$
H-Ph-CH($CH_3$)—$CH_2$-$Ph^{FF}$-$OCH_2$-$Ph^F$-$SF_5$
H-Ph-CH($CH_3$)—$CH_2$-$Ph^{FF}$-$OCH_2$-$Ph^{FF}$-$SF_5$
H-Ph-CH($CF_3$)—$CH_2$-Ph-$OCH_2$-$Ph^{FF}$-$SF_5$
H-Ph-CHF—$CH_2$-Ph-$OCH_2$-$Ph^{FF}$-$SF_5$
H-Ph-CH($CH_3$)—CO-Ph-$OCH_2$-$Ph^{FF}$-$SF_5$
H-Ph-CH($CF_3$)—CO-Ph-$OCH_2$-$Ph^{FF}$-$SF_5$
H-Ph-CH($CH_3$)—$CH_2$-Ph-CF═CF-$Ph^F$-$SF_5$
H-Ph-CH($CH_3$)—$CH_2$-$Ph^F$-CF═CF-Ph-$SF_5$
H-Ph-CH($CH_3$)—$CH_2$-Ph-CF═CF-$Ph^{FF}$-$SF_5$
H-Ph-CH($CH_3$)—$CH_2$-$Ph^{FF}$-CF═CF-Ph-$SF_5$
H-Ph-CH($CH_3$)—$CH_2$-$Ph^F$-CF═CF-$Ph^F$-$SF_5$
H-Ph-CH($CH_3$)—$CH_2$-$Ph^F$-CF═CF-$PH^{FF}$-$SF_5$
H-Ph-CH($CH_3$)—$CH_2$-$Ph^{FF}$-CF═CF-$Ph^F$-$SF_5$
H-Ph-CH($CH_3$)—$CH_2$-$Ph^{FF}$-CF═CF-$PH^{FF}$-$SF_5$
H-Ph-CH($CF_3$)—$CH_2$-Ph-CF═CF-$Ph^{FF}$-$SF_5$
H-Ph-CHF—$CH_2$-Ph-CF═CF-$Ph^{FF}$-$SF_5$
H-Ph-CH($CH_3$)—CO-Ph-CF═CF-$Ph^{FF}$-$SF_5$
H-Ph-CH($CF_3$)—CO-Ph-CF═CF-$Ph^{FF}$-$SF_5$
H-Ph-CH($CH_3$)—$CH_2$-Ph-$CF_2O$-$Ph^F$-$SF_5$
H-Ph-CH($CH_3$)—$CH_2$-$Ph^F$-$CF_2O$-Ph-$SF_5$
H-Ph-CH($CH_3$)—$CH_2$-Ph-$CF_2O$-$Ph^{FF}$-$SF_5$
H-Ph-CH($CH_3$)—$CH_2$-$Ph^{FF}$-$CF_2O$-Ph-$SF_5$
H-Ph-CH($CH_3$)—$CH_2$-$Ph^F$-$CF_2O$-$Ph^F$-$SF_5$
H-Ph-CH($CH_3$)—$CH_2$-$Ph^F$-$CF_2O$-$Ph^{FF}$-$SF_5$
H-Ph-CH($CH_3$)—$CH_2$-$Ph^{FF}$-$CF_2O$-$Ph^F$-$SF_5$
H-Ph-CH($CH_3$)—$CH_2$-$Ph^{FF}$-$CF_2$-$Ph^{FF}$-$SF_5$
H-Ph-CH($CF_3$)—$CH_2$-Ph-$CF_2O$-$Ph^{FF}$-$SF_5$
H-Ph-CHF—$CH_2$-Ph-$CF_2O$-$Ph^{FF}$-$SF_5$
H-Ph-CH($CH_3$)—CO-Ph-$CF_2O$-$Ph^{FF}$-$SF_5$
H-Ph-CH($CF_3$)—CO-Ph-$CF_2O$-$Ph^{FF}$-$SF_5$

As preferred specific examples of the compound wherein $Z^7$=F, the following compounds may be mentioned.

H-Ph-CH($CH_3$)—$CH_2$-Ph-$Ph^F$-F
H-Ph-CH($CH_3$)—$CH_2$-$Ph^F$-Ph-F
H-Ph-CH($CH_3$)—$CH_2$-Ph-$Ph^{FF}$-F
H-Ph-CH($CH_3$)—$CH_2$-$Ph^{FF}$-Ph-F
H-Ph-CH($CH_3$)—$CH_2$-$Ph^F$-$Ph^F$-F
H-Ph-CH($CH_3$)—$CH_2$-$Ph^F$-$Ph^{FF}$-F
H-Ph-CH($CH_3$)—$CH_2$-$Ph^{FF}$-$Ph^F$-F
H-Ph-CH($CH_3$)—$CH_2$-$Ph^{FF}$-$Ph^{FF}$-F
H-Ph-CH($CF_3$)—$CH_2$-Ph-$Ph^{FF}$-F
H-Ph-CHF—$CH_2$-Ph-$Ph^{FF}$-F
H-Ph-CH($CH_3$)—CO-Ph-$Ph^{FF}$-F
H-Ph-CH($CF_3$)—CO-Ph-$Ph^{FF}$-F
H-Ph-CH($CH_3$)—$CH_2$-Ph-COO-$Ph^F$-F
H-Ph-CH($CH_3$)—$CH_2$-$Ph^F$-COO-Ph-F
H-Ph-CH($CH_3$)—$CH_2$-Ph-COO-$Ph^{FF}$-F
H-Ph-CH($CH_3$)—$CH_2$-$Ph^{FF}$-COO-Ph-F
H-Ph-CH($CH_3$)—$CH_2$-$Ph^F$-COO-$Ph^F$-F
H-Ph-CH($CH_3$)—$CH_2$-$Ph^F$-COO-$Ph^{FF}$-F
H-Ph-CH($CH_3$)—$CH_2$-$Ph^{FF}$-COO-$Ph^F$-F
H-Ph-CH($CH_3$)—$CH_2$-$Ph^{FF}$-COO-$Ph^{FF}$-F
H-Ph-CH($CF_3$)—$CH_2$-Ph-COO-$Ph^{FF}$-F
H-Ph-CHF—$CH_2$-Ph-COO-$Ph^{FF}$-F
H-Ph-CH($CH_3$)—CO-Ph-COO-$Ph^{FF}$-F
H-Ph-CH($CF_3$)—CO-Ph-COO-$Ph^{FF}$-F
H-Ph-CH($CH_3$)—$CH_2$-Ph-OCO-$Ph^F$-F
H-Ph-CH($CH_3$)—$CH_2$-$Ph^F$-OCO-Ph-F
H-Ph-CH($CH_3$)—$CH_2$-Ph-OCO-$Ph^{FF}$-F
H-Ph-CH($CH_3$)—$CH_2$-$Ph^{FF}$-OCO-Ph-F
H-Ph-CH($CH_3$)—$CH_2$-$Ph^F$-OCO-$Ph^F$-F
H-Ph-CH($CH_3$)—$CH_2$-$Ph^F$-OCO-$Ph^{FF}$-F
H-Ph-CH($CH_3$)—$CH_2$-$Ph^{FF}$-OCO-$Ph^F$-F
H-Ph-CH($CH_3$)—$CH_2$-$Ph^{FF}$-OCO-$Ph^{FF}$-F
H-Ph-CH($CF_3$)—$CH_2$-Ph-OCO-$Ph^{FF}$-F
H-Ph-CHF—$CH_2$-Ph-OCO-$Ph^{FF}$-F
H-Ph-CH($CH_3$)—CO-Ph-OCO-$Ph^{FF}$-F
H-Ph-CH($CF_3$)—CO-Ph-OCO-$Ph^{FF}$-F
H-Ph-CH($CH_3$)—$CH_2$-Ph-$CH_2CH_2$-$Ph^F$-F
H-Ph-CH($CH_3$)—$CH_2$-$Ph^F$-$CH_2CH_2$-Ph-F
H-Ph-CH($CH_3$)—$CH_2$-Ph-$CH_2CH_2$-$Ph^{FF}$-F
H-Ph-CH($CH_3$)—$CH_2$-$Ph^{FF}$-$CH_2CH_2$-Ph-F
H-Ph-CH($CH_3$)—$CH_2$-$Ph^F$-$CH_2CH_2$-$Ph^F$-F
H-Ph-CH($CH_3$)—$CH_2$-$Ph^F$-$CH_2CH_2$-$Ph^{FF}$-$F_3$
H-Ph-CH($CH_3$)—$CH_2$-$Ph^{FF}$-$CH_2CH_2$-$Ph^F$-F
H-Ph-CH($CH_3$)—$CH_2$-$Ph^{FF}$-$CH_2CH_2$-$Ph^{FF}$-F
H-Ph-CH($CF_3$)—$CH_2$-Ph-$CH_2CH_2$-$Ph^{FF}$-F
H-Ph-CHF—$CH_2$-Ph-$CH_2CH_2$-$Ph^{FF}$-F
H-Ph-CH($CH_3$)—CO-Ph-$CH_2CH_2$-$Ph^{FF}$-F
H-Ph-CH($CF_3$)—CO-Ph-$CH_2CH_2$-$Ph^{FF}$-F
H-Ph-CH($CH_3$)—$CH_2$-Ph-$CH_2O$-$Ph^F$-F
H-Ph-CH($CH_3$)—$CH_2$-$Ph^F$-$CH_2O$-Ph-F
H-Ph-CH($CH_3$)—$CH_2$-Ph-$CH_2O$-$Ph^{FF}$-F
H-Ph-CH($CH_3$)—$CH_2$-$Ph^{FF}$-$CH_2O$-Ph-F
H-Ph-CH($CH_3$)—$CH_2$-$Ph^F$-$CH_2O$-$Ph^F$-F
H-Ph-CH($CH_3$)—$CH_2$-$Ph^F$-$CH_2O$-$Ph^{FF}$-F
H-Ph-CH($CH_3$)—$CH_2$-$Ph^{FF}$-$CH_2O$-$Ph^F$-F
H-Ph-CH($CH_3$)—$CH_2$-$Ph^{FF}$-$CH_2O$-$Ph^{FF}$-F
H-Ph-CH($CF_3$)—$CH_2$-Ph-$CH_2O$-$Ph^{FF}$-F
H-Ph-CHF—$CH_2$-Ph-$CH_2O$-$Ph^{FF}$-F
H-Ph-CH($CH_3$)—CO-Ph-$CH_2O$-$Ph^{FF}$-F
H-Ph-CH($CF_3$)—CO-Ph-$CH_2O$-$Ph^{FF}$-F
H-Ph-CH($CH_3$)—$CH_2$-Ph-$OCH_2$-$Ph^F$-F
H-Ph-CH($CH_3$)—$CH_2$-$Ph^F$-$OCH_2$-Ph-F
H-Ph-CH($CH_3$)—$CH_2$-Ph-$OCH_2$-$Ph^{FF}$-F
H-Ph-CH($CH_3$)—$CH_2$-$Ph^{FF}$-$OCH_2$-Ph-F
H-Ph-CH($CH_3$)—$CH_2$-$Ph^F$-$OCH_2$-$Ph^F$-F
H-Ph-CH($CH_3$)—$CH_2$-$Ph^F$-$OCH_2$-$Ph^{FF}$-F
H-Ph-CH($CH_3$)—$CH_2$-$Ph^{FF}$-$OCH_2$-$Ph^F$-F
H-Ph-CH($CH_3$)—$CH_2$-$Ph^{FF}$-$OCH_2$-$Ph^{FF}$-F
H-Ph-CH($CF_3$)—$CH_2$-Ph-$OCH_2$-$Ph^{FF}$-F
H-Ph-CHF—$CH_2$-Ph-$OCH_2$-$Ph^{FF}$-F
H-Ph-CH($CH_3$)—CO-Ph-$OCH_2$-$Ph^{FF}$-F
H-Ph-CH($CF_3$)—CO-Ph-$OCH_2$-$Ph^{FF}$-F
H-Ph-CH($CH_3$)—$CH_2$-Ph-CF═CF-$Ph^F$-F
H-Ph-CH($CH_3$)—$CH_2$-$Ph^F$-CF═CF-Ph-F
H-Ph-CH($CH_3$)—$CH_2$-Ph-CF═CF-$Ph^{FF}$-F
H-Ph-CH($CH_3$)—$CH_2$-$Ph^{FF}$-CF═CF-Ph-F
H-Ph-CH($CH_3$)—$CH_2$-$Ph^F$-CF═CF-$Ph^F$-F
H-Ph-CH($CH_3$)—$CH_2$-$Ph^F$-CF═CF-$Ph^{FF}$-F
H-Ph-CH($CH_3$)—$CH_2$-$Ph^{FF}$-CF═CF-$Ph^F$-F
H-Ph-CH($CH_3$)—$CH_2$-$Ph^{FF}$-CF═CF-$Ph^{FF}$-F
H-Ph-CH($CF_3$)—$CH_2$-Ph-CF═CF-$Ph^{FF}$-F
H-Ph-CHF—$CH_2$-Ph-CF═CF-$Ph^{FF}$-F
H-Ph-CH($CH_3$)—CO-Ph-CF═CF-$Ph^{FF}$-F
H-Ph-CH($CF_3$)—CO-Ph-CF═CF-$Ph^{FF}$-F
H-Ph-CH($CH_3$)—$CH_2$-Ph-$CF_2O$-$Ph^F$-F
H-Ph-CH($CH_3$)—$CH_2$-$Ph^F$-$CF_2O$-Ph-F
H-Ph-CH($CH_3$)—$CH_2$-Ph-$CF_2O$-$Ph^{FF}$-F
H-Ph-CH($CH_3$)—$CH_2$-$Ph^{FF}$-$CF_2O$-Ph-F
H-PH-CH($CH_3$)—$CH_2$-$Ph^F$-$CF_2O$-$Ph^F$-F
H-Ph-CH($CH_3$)—$CH_2$-$Ph^F$-$CF_2O$-$Ph^{FF}$-F
H-Ph-CH($CH_3$)—$CH_2$-$Ph^{FF}$-$CF_2O$-$Ph^F$-F
H-Ph-CH($CH_3$)—$CH_2$-$Ph^{FF}$-$CF_2O$-$Ph^{FF}$-F
H-Ph-CH($CF_3$)—$CH_2$-Ph-$CF_2O$-$Ph^{FF}$-F
H-Ph-CHF—$CH_2$-Ph-$CF_2O$-$Ph^{FF}$-F
H-Ph-CH($CH_3$)—CO-Ph-$CF_2O$-$Ph^{FF}$-F
H-Ph-CH($CF_3$)—CO-Ph-$CF_2O$-$Ph^{FF}$-F

Specific Examples of the Compound wherein the Number of Ring Groups is 4

As preferred specific examples of the compound wherein $Z^7$=CN, the following compounds may be mentioned.

H-Ph-CH(CH$_3$)—CH$_2$-Ph-Ph$^{FF}$-Ph$^{FF}$-CN
H-Ph-CH(CH$_3$)—CH$_2$-Ph$^{F}$-Ph-Ph$^{FF}$-CN
H-Ph-CH(CH$_3$)—CH$_2$-Cy-Ph$^{FF}$-Ph$^{F}$-CN
H-Ph-CH(CH$_3$)—CH$_2$-Ph$^{FF}$-Cy-Ph$^{FF}$-CN
H-Ph-CH(CH$_3$)—CH$_2$-Cy-Cy-Ph$^{FF}$-CN
H-Ph-CH(CF$_3$)—CH$_2$-Ph$^{FF}$-Ph-Ph$^{FF}$-CN
H-Ph-CHF—CH$_2$-Ph$^{FF}$-Ph-Ph$^{FF}$-CN
H-Ph-CH(CH$_3$)—CO—CH$_2$-Ph$^{FF}$-Ph-Ph$^{FF}$-CN
H-Ph-CH(CH$_3$)—CH$_2$-Ph-Ph$^{FF}$-COO-Ph$^{FF}$-CN
H-Ph-CH(CH$_3$)—CH$_2$-Cy-COO-Ph$^{FF}$-Ph$^{F}$-CN
H-Ph-CH(CH$_3$)—CH$_2$-Ph$^{FF}$-COO-Cy-Ph$^{FF}$-CN
H-Ph-CH(CH$_3$)—CH$_2$-Cy-Cy-COO-Ph$^{FF}$-CN
H-Ph-CH(CH$_3$)—CH$_2$-Cy-COO-Cy-Ph$^{FF}$-CN
H-Ph-CH(CH$_3$)—CH$_2$-Ph-Ph$^{FF}$-OCO-Ph$^{FF}$-CN
H-Ph-CH(CH$_3$)—CH$_2$-Cy-OCO-Ph$^{FF}$-Ph$^{F}$-CN
H-Ph-CH(CH$_3$)—CH$_2$-Ph$^{FF}$-OCO-Cy-Ph$^{FF}$-CN
H-Ph-CH(CH$_3$)—CH$_2$-Cy-Cy-OCO-Ph$^{FF}$-CN
H-Ph-CH(CH$_3$)—CH$_2$-Cy-OCO-Cy-Ph$^{FF}$-CN
H-Ph-CH(CH$_3$)—CH$_2$-Ph-Ph$^{FF}$-CH$_2$CH$_2$-Ph$^{FF}$-CN
H-Ph-CH(CH$_3$)—CH$_2$-Cy-CH$_2$CH$_2$-Ph$^{FF}$-Ph$^{F}$-CN
H-Ph-CH(CH$_3$)—CH$_2$-Ph$^{FF}$-CH$_2$CH$_2$-Cy-Ph$^{FF}$-CN
H-Ph-CH(CH$_3$)—CH$_2$-Cy-Cy-CH$_2$CH$_2$-Ph$^{FF}$-CN
H-Ph-CH(CH$_3$)—CH$_2$-Cy-CH$_2$CH$_2$-Cy-Ph$^{FF}$-CN
H-Ph-CH(CH$_3$)—CH$_2$-Ph-CH$_2$CH$_2$-Ph$^{FF}$-COO-Ph$^{FF}$-CN
H-Ph-CH(CH$_3$)—CH$_2$-Cy-CH$_2$CH$_2$-Ph$^{FF}$-COO-Ph$^{F}$-CN
H-Ph-CH(CH$_3$)—CH$_2$-Ph$^{FF}$-CH$_2$CH$_2$-Cy-COO-Ph$^{FF}$-CN
H-Ph-CH(CH$_3$)—CH$_2$-Cy-CH$_2$CH$_2$-Cy-COO-Ph$^{FF}$-CN
H-Ph-CH(CH$_3$)—CH$_2$-Ph-COO-Ph$^{FF}$-CH$_2$CH$_2$-Ph$^{FF}$-CN
H-Ph-CH(CH$_3$)—CH$_2$-Cy-COO-Ph$^{FF}$-CH$_2$CH$_2$-Ph$^{F}$-CN
H-Ph-CH(CH$_3$)—CH$_2$-Ph$^{FF}$-COO-Cy-CH$_2$CH$_2$-Ph$^{FF}$-CN
H-Ph-CH(CH$_3$)—CH$_2$-Cy-COO-Cy-CH$_2$CH$_2$-Ph$^{FF}$-CN
H-Ph-CH(CH$_3$)—CH$_2$-Ph-OCO-Ph$^{FF}$-CH$_2$CH$_2$-Ph$^{FF}$-CN
H-Ph-CH(CH$_3$)—CH$_2$-Cy-OCO-Ph$^{FF}$-CH$_2$CH$_2$-Ph$^{F}$-CN
H-Ph-CH(CH$_3$)—CH$_2$-Ph$^{FF}$-OCO-Cy-CH$_2$CH$_2$-Ph$^{FF}$-CN
H-Ph-CH(CH$_3$)—CH$_2$-Cy-OCO-Cy-CH$_2$CH$_2$-Ph$^{FF}$-CN

As preferred specific examples of the compound wherein $Z^7$=CF$_3$, the following compounds may be mentioned.

H-Ph-CH(CH$_3$)—CH$_2$-Ph-Ph$^{FF}$-Ph$^{FF}$-CF$_3$
H-PH-CH(CH$_3$)—CH$_2$-Ph$^{F}$-Ph-Ph$^{FF}$-CF$_3$
H-Ph-CH(CH$_3$)—CH$_2$-Cy-Ph$^{FF}$-Ph$^{F}$-CF$_3$
H-Ph-CH(CH$_3$)—CH$_2$-Ph$^{FF}$-Cy-Ph$^{FF}$-CF$_3$
H-Ph-CH(CH$_3$)—CH$_2$-Cy-Cy-Ph$^{FF}$-CF$_3$
H-Ph-CH(CF$_3$)—CH$_2$-Ph$^{FF}$-Ph-Ph$^{FF}$-CF$_3$
H-Ph-CHF—CH$_2$-Ph$^{FF}$-Ph-Ph$^{FF}$-CF$_3$
H-Ph-CH(CH$_3$)—CO—CH$_2$-Ph$^{FF}$-Ph-Ph$^{FF}$-CF$_3$
H-Ph-CH(CH$_3$)—CH$_2$-Ph-Ph$^{FF}$-COO-Ph$^{FF}$-CF$_3$
H-Ph-CH(CH$_3$)—CH$_2$-Cy-COO-Ph$^{FF}$-Ph$^{F}$-CF$_3$
H-Ph-CH(CH$_3$)—CH$_2$-Ph$^{FF}$-COO-Cy-Ph$^{FF}$-CF$_3$
H-Ph-CH(CH$_3$)—CH$_2$-Cy-Cy-COO-Ph$^{FF}$-CF$_3$
H-Ph-CH(CH$_3$)—CH$_2$-Cy-COO-Cy-Ph$^{FF}$-CF$_3$
H-Ph-CH(CH$_3$)—CH$_2$-Ph-Ph$^{FF}$-OCO-Ph$^{FF}$-CF$_3$
H-Ph-CH(CH$_3$)—CH$_2$-Cy-OCO-Ph$^{FF}$-Ph$^{F}$-CF$_3$
H-Ph-CH(CH$_3$)—CH$_2$-Ph$^{FF}$-OCO-Cy-Ph$^{FF}$-CF$_3$
H-Ph-CH(CH$_3$)—CH$_2$-Cy-Cy-OCO-Ph$^{FF}$-CF$_3$
H-Ph-CH(CH$_3$)—CH$_2$-Cy-OCO-Cy-Ph$^{FF}$-CF$_3$
H-Ph-CH(CH$_3$)—CH$_2$-Ph-Ph$^{FF}$-CH$_2$CH$_2$-Ph$^{FF}$-CF$_3$
H-Ph-CH(CH$_3$)—CH$_2$-Cy-CH$_2$CH$_2$-Ph$^{FF}$-Ph$^{F}$-CF$_3$
H-Ph-CH(CH$_3$)—CH$_2$-Ph$^{FF}$-CH$_2$CH$_2$-Cy-Ph$^{FF}$-CF$_3$
H-Ph-CH(CH$_3$)—CH$_2$-Cy-Cy-CH$_2$CH$_2$-Ph$^{FF}$-CF$_3$
H-Ph-CH(CH$_3$)—CH$_2$-Cy-CH$_2$CH$_2$-Cy-Ph$^{FF}$-CF$_3$
H-Ph-CH(CH$_3$)—CH$_2$-Ph-CH$_2$CH$_2$-Ph$^{FF}$-COO-Ph$^{FF}$-CF$_3$
H-Ph-CH(CH$_3$)—CH$_2$-Cy-CH$_2$CH$_2$-Ph$^{FF}$-COO-Ph$^{F}$-CF$_3$
H-Ph-CH(CH$_3$)—CH$_2$-Ph$^{FF}$-CH$_2$CH$_2$-Cy-COO-Ph$^{FF}$-CF$_3$
H-Ph-CH(CH$_3$)—CH$_2$-Cy-CH$_2$CH$_2$-Cy-COO-Ph$^{FF}$-CF$_3$
H-Ph-CH(CH$_3$)—CH$_2$-Ph-COO-Ph$^{FF}$-CH$_2$CH$_2$-Ph$^{FF}$-CF$_3$
H-Ph-CH(CH$_3$)—CH$_2$-Cy-COO-Ph$^{FF}$-CH$_2$CH$_2$-Ph$^{F}$-CF$_3$
H-Ph-CH(CH$_3$)—CH$_2$-Ph$^{FF}$-COO-Cy-CH$_2$CH$_2$-Ph$^{FF}$-CF$_3$
H-Ph-CH(CH$_3$)—CH$_2$-Cy-COO-Cy-CH$_2$CH$_2$-Ph$^{FF}$-CF$_3$
H-Ph-CH(CH$_3$)—CH$_2$-Ph-OCO-Ph$^{FF}$-CH$_2$CH$_2$-Ph$^{FF}$-CF$_3$
H-Ph-CH(CH$_3$)—CH$_2$-Cy-OCO-Ph$^{FF}$-CH$_2$CH$_2$-Ph$^{F}$-CF$_3$
H-Ph-CH(CH$_3$)—CH$_2$-Ph$^{FF}$-OCO-Cy-CH$_2$CH$_2$-Ph$^{FF}$-CF$_3$
H-Ph-CH(CH$_3$)—CH$_2$-Cy-OCO-Cy-CH$_2$CH$_2$-Ph$^{FF}$-CF$_3$

As preferred specific examples of the compound wherein $Z^7$=OCF$_3$, the following compounds may be mentioned.

H-Ph-CH(CH$_3$)—CH$_2$-Ph-Ph$^{FF}$-Ph$^{FF}$-OCF$_3$
H-Ph-CH(CH$_3$)—CH$_2$-Ph$^{F}$-Ph-Ph$^{FF}$-OCF$_3$
H-Ph-CH(CH$_3$)—CH$_2$-Cy-Ph$^{FF}$-Ph$^{F}$-OCF$_3$
H-Ph-CH(CH$_3$)—CH$_2$-Ph$^{FF}$-Cy-Ph$^{FF}$-OCF$_3$
H-Ph-CH(CH$_3$)—CH$_2$-Cy-Cy-Ph$^{FF}$-OCF$_3$
H-Ph-CH(CF$_3$)—CH$_2$-Ph$^{FF}$-Ph-Ph$^{FF}$-OCF$_3$
H-Ph-CHF—CH$_2$-Ph$^{FF}$-Ph-Ph$^{FF}$-OCF$_3$
H-Ph-CH(CH$_3$)—CO—CH$_2$-Ph$^{FF}$-Ph-Ph$^{FF}$-OCF$_3$
H-Ph-CH(CH$_3$)—CH$_2$-Ph-Ph$^{FF}$-COO-Ph$^{FF}$-OCF$_3$
H-Ph-CH(CH$_3$)—CH$_2$-Cy-COO-Ph$^{FF}$-Ph$^{F}$-OCF$_3$
H-Ph-CH(CH$_3$)—CH$_2$-Ph$^{FF}$-COO-Cy-Ph$^{FF}$-OCF$_3$
H-Ph-CH(CH$_3$)—CH$_2$-Cy-Cy-COO-Ph$^{FF}$-OCF$_3$
H-Ph-CH(CH$_3$)—CH$_2$-Cy-COO-Cy-Ph$^{FF}$-OCF$_3$
H-Ph-CH(CH$_3$)—CH$_2$-Ph-Ph$^{FF}$-OCO-Ph$^{FF}$-OCF$_3$
H-Ph-CH(CH$_3$)—CH$_2$-Cy-OCO-Ph$^{FF}$-Ph$^{F}$-OCF$_3$
H-Ph-CH(CH$_3$)—CH$_2$-Ph$^{FF}$-OCO-Cy-Ph$^{FF}$-OCF$_3$
H-Ph-CH(CH$_3$)—CH$_2$-Cy-Cy-OCO-Ph$^{FF}$-OCF$_3$
H-Ph-CH(CH$_3$)—CH$_2$-Cy-OCO-Cy-Ph$^{FF}$-OCF$_3$
H-Ph-CH(CH$_3$)—CH$_2$-Ph-Ph$^{FF}$-CH$_2$CH$_2$-Ph$^{FF}$-OCF$_3$
H-Ph-CH(CH$_3$)—CH$_2$-Cy-CH$_2$CH$_2$-Ph$^{FF}$-Ph$^{F}$-OCF$_3$
H-Ph-CH(CH$_3$)—CH$_2$-Ph$^{FF}$-CH$_2$CH$_2$-Cy-Ph$^{FF}$-OCF$_3$
H-Ph-CH(CH$_3$)—CH$_2$-Cy-Cy-CH$_2$CH$_2$-Ph$^{FF}$-OCF$_3$
H-Ph-CH(CH$_3$)—CH$_2$-Cy-CH$_2$CH$_2$-Cy-Ph$^{FF}$-OCF$_3$
H-Ph-CH(CH$_3$)—CH$_2$-Ph-CH$_2$CH$_2$-Ph$^{FF}$-COO-Ph$^{FF}$-OCF$_3$
H-Ph-CH(CH$_3$)—CH$_2$-Cy-CH$_2$CH$_2$-Ph$^{FF}$-COO-Ph$^{F}$-OCF$_3$
H-Ph-CH(CH$_3$)—CH$_2$-Ph$^{FF}$-CH$_2$CH$_2$-Cy-COO-Ph$^{FF}$-OCF$_3$
H-Ph-OH(CH$_3$)—CH$_2$-Cy-CH$_2$CH$_2$-Cy-COO-Ph$^{FF}$-OCF$_3$
H-Ph-OH(CH$_3$)—CH$_2$-Ph-COO-Ph$^{FF}$-CH$_2$CH$_2$-Ph$^{FF}$-OCF$_3$
H-Ph-CH(CH$_3$)—CH$_2$-Cy-COO-Ph$^{FF}$-CH$_2$CH$_2$-Ph$^{F}$-OCF$_3$
H-Ph-CH(CH$_3$)—CH$_2$-Ph$^{FF}$-COO-Cy-CH$_2$CH$_2$-Ph$^{FF}$-OCF$_3$
H-Ph-CH(CH$_3$)—CH$_2$-Cy-COO-Cy-CH$_2$CH$_2$-Ph$^{FF}$-OCF$_3$
H-Ph-CH(CH$_3$)—CH$_2$-Ph-OCO-Ph$^{FF}$-CH$_2$CH$_2$-Ph$^{FF}$-OCF$_3$
H-Ph-CH(CH$_3$)—CH$_2$-Cy-OCO-Ph$^{FF}$-CH$_2$CH$_2$-Ph$^{F}$-OCF$_3$
H-Ph-CH(CH$_3$)—CH$_2$-Ph$^{FF}$-OCO-Cy-CH$_2$CH$_2$-Ph$^{FF}$-OCF$_3$
H-Ph-CH(CH$_3$)—CH$_2$-Cy-OCO-Cy-CH$_2$CH$_2$-Ph$^{FF}$-OCF$_3$

As preferred specific examples of the compound wherein $Z^7$=F, the following compounds may be mentioned.

H-Ph-CH(CH$_3$)—CH$_2$-Ph-Ph$^{FF}$-Ph$^{FF}$-F
H-Ph-CH(CH$_3$)—OH$_2$-Ph$^{F}$-Ph-Ph$^{FF}$-F
H-Ph-CH(CH$_3$)—CH$_2$-Cy-Ph$^{FF}$-Ph$^{F}$-F
H-Ph-CH(CH$_3$)—CH$_2$-Ph$^{FF}$-Cy-Ph$^{FF}$-F
H-PH-CH(CH$_3$)—CH$_2$-Cy-Cy-Ph$^{FF}$-F
H-Ph-CH(CF$_3$)—CH$_2$-Ph$^{FF}$-Ph-Ph$^{FF}$-F
H-Ph-CHF—CH$_2$-Ph$^{FF}$-Ph-Ph$^{FF}$-F
H-PH-CH(CH$_3$)—CO—CH$_2$-Ph$^{FF}$-Ph-Ph$^{FF}$-F
H-PH-CH(CH$_3$)—CH$_2$-Ph-Ph$^{FF}$-OCO-Ph$^{FF}$-F
H-Ph-CH(CH$_3$)—CH$_2$-Cy-COO-Ph$^{FF}$-Ph$^{F}$-F
H-Ph-CH(CH$_3$)—CH$_2$-Ph$^{FF}$-COO-Cy-Ph$^{FF}$-F
H-Ph-CH(CH$_3$)—CH$_2$-Cy-Cy-COO-Ph$^{FF}$-F
H-Ph-CH(CH$_3$)—CH$_2$-Cy-COO-Cy-Ph$^{FF}$-F

H-Ph-CH($CH_3$)—$CH_2$-Ph-Ph$^{FF}$-OCO-Ph$^{FF}$-F
H-Ph-CH($CH_3$)—$CH_2$-Cy-OCO-Ph$^{FF}$-Ph$^{F}$-F
H-Ph-CH($CH_3$)—$CH_2$-Ph$^{FF}$-OCO-Cy-Ph$^{FF}$-F
H-Ph-CH($CH_3$)—$CH_2$-Cy-Cy-OCO-Ph$^{FF}$-F
H-Ph-CH($CH_3$)—$CH_2$-Cy-OCO-Cy-Ph$^{FF}$-F
H-Ph-CH($CH_3$)—$CH_2$-Ph-Ph$^{FF}$-$CH_2CH_2$-Ph$^{FF}$-F
H-Ph-CH($CH_3$)—$CH_2$-Cy-$CH_2CH_2$-Ph$^{FF}$-Ph$^{F}$-F
H-Ph-CH($CH_3$)—$CH_2$-Ph$^{FF}$-$CH_2CH_2$-Cy-Ph$^{FF}$-F
H-Ph-CH($CH_3$)—$CH_2$-Cy-Cy-$CH_2CH_2$-Ph$^{FF}$-F
H-Ph-CH($CH_3$)—$CH_2$-Cy-$CH_2CH_2$-Cy-Ph$^{FF}$-F
H-Ph-CH($CH_3$)—$CH_2$-Ph-$CH_2CH_2$-Ph$^{FF}$-COO-Ph$^{FF}$-F
H-Ph-CH($CH_3$)—$CH_2$-Cy-$CH_2CH_2$-Ph$^{FF}$-COO-Ph$^{F}$-F
H-Ph-CH($CH_3$)—$CH_2$-Ph$^{FF}$-$CH_2CH_2$-Cy-COO-Ph$^{FF}$-F
H-Ph-CH($CH_3$)—$CH_2$-Cy-$CH_2CH_2$-Cy-COO-Ph$^{FF}$-F
H-Ph-CH($CH_3$)—$CH_2$-Ph-COO-Ph$^{FF}$-$CH_2CH_2$-Ph$^{FF}$-F
H-Ph-CH($CH_3$)—$CH_2$-Cy-COO-Ph$^{FF}$-$CH_2CH_2$-Ph$^{F}$-F
H-PH-CH($CH_3$)—$CH_2$-Ph$^{FF}$-COO-Cy-$CH_2CH_2$-Ph$^{FF}$-F
H-Ph-CH($CH_3$)—$CH_2$-Cy-COO-Cy-$CH_2CH_2$-Ph$^{FF}$-F
H-Ph-CH($CH_3$)—$CH_2$-Ph-OCO-Ph$^{FF}$-$CH_2CH_2$-Ph$^{FF}$-F
H-Ph-CH($CH_3$)—$CH_2$-Cy-OCO-Ph$^{FF}$-$CH_2CH_2$-Ph$^{F}$-F
H-Ph-CH($CH_3$)—$CH_2$-Ph$^{FF}$-OCO-Cy-$CH_2CH_2$-Ph$^{FF}$-F
H-Ph-CH($CH_3$)—$CH_2$-Cy-OCO-Cy-$CH_2CH_2$-Ph$^{FF}$-F

As preferred specific examples of the compound wherein $Z^7$=$SF_5$, the following compounds may be mentioned.

H-Ph-CH($CH_3$)—$CH_2$-Ph-Ph$^{FF}$-Ph$^{FF}$-$SF_5$
H-PH-CH($CH_3$)—$CH_2$-Ph$^{F}$-Ph-Ph$^{FF}$-$SF_5$
H-Ph-CH($CH_3$)—$CH_2$-Cy-Ph$^{FF}$-Ph$^{F}$-$SF_5$
H-Ph-CH($CH_3$)—$CH_2$-Ph$^{FF}$-Cy-Ph$^{FF}$-$SF_5$
H-Ph-CH($CH_3$)—$CH_2$-Cy-Cy-Ph$^{FF}$-$SF_5$
H-Ph-CH($CF_3$)—$CH_2$-Ph$^{FF}$-Ph-Ph$^{FF}$-$SF_5$
H-Ph-CHF—$CH_2$-Ph$^{FF}$-Ph-Ph$^{FF}$-$SF_5$
H-Ph-CH($CH_3$)—CO—$CH_2$-Ph$^{FF}$-Ph-Ph$^{FF}$-$SF_5$
H-Ph-CH($CH_3$)—$CH_2$-Ph-Ph$^{FF}$-COO-Ph$^{FF}$-$SF_5$
H-Ph-CH($CH_3$)—$CH_2$-Cy-COO-Ph$^{FF}$-Ph$^{F}$-$SF_5$
H-Ph-CH($CH_3$)—$CH_2$-Ph$^{FF}$-COO-Cy-Ph$^{FF}$-$SF_5$
H-Ph-CH($CH_3$)—$CH_2$-Cy-Cy-COO-Ph$^{FF}$-$SF_5$
H-Ph-CH($CH_3$)—$CH_2$-Cy-COO-Cy-Ph$^{FF}$-$SF_5$
H-Ph-CH($CH_3$)—$CH_2$-Ph-Ph$^{FF}$-OCO-Ph$^{FF}$-$SF_5$
H-Ph-CH($CH_3$)—$CH_2$-Cy-OCO-Ph$^{FF}$-Ph$^{F}$-$SF_5$
H-Ph-CH($CH_3$)—$CH_2$-Ph$^{FF}$-OCO-Cy-Ph$^{FF}$-$SF_5$
H-Ph-CH($CH_3$)—$CH_2$-Cy-Cy-OCO-Ph$^{FF}$-$SF_5$
H-Ph-CH($CH_3$)—$CH_2$-Cy-OCO-Cy-Ph$^{FF}$-$SF_5$
H-Ph-CH($CH_3$)—$CH_2$-Ph-Ph$^{FF}$-$CH_2CH_2$-Ph$^{FF}$-$SF_5$
H-Ph-CH($CH_3$)—$CH_2$-Cy-$CH_2CH_2$-Ph$^{FF}$-Ph$^{F}$-$SF_5$
H-Ph-CH($CH_3$)—$CH_2$-Ph$^{FF}$-$CH_2CH_2$-Cy-Ph$^{FF}$-$SF_5$
H-Ph-CH($CH_3$)—$CH_2$-Cy-Cy-$CH_2CH_2$-Ph$^{FF}$-$SF_5$
H-Ph-CH($CH_3$)—$CH_2$-Cy-$CH_2CH_2$-Cy-Ph$^{FF}$-$SF_5$
H-Ph-CH($CH_3$)—$CH_2$-Ph-$CH_2CH_2$-Ph$^{FF}$-COO-Ph$^{FF}$-$SF_5$
H-Ph-CH($CH_3$)—$CH_2$-Cy-$CH_2CH_2$-Ph$^{FF}$-COO-Ph$^{F}$-$SF_5$
H-Ph-CH($CH_3$)—$CH_2$-Ph$^{FF}$-$CH_2CH_2$-Cy-COO-Ph$^{FF}$-$SF_5$
H-Ph-CH($CH_3$)—$CH_2$-Cy-$CH_2CH_2$-Cy-COO-Ph$^{FF}$-$SF_5$
H-Ph-CH($CH_3$)—$CH_2$-Ph-COO-Ph$^{FF}$-$CH_2CH_2$-Ph$^{FF}$-$SF_5$
H-Ph-CH($CH_3$)—$CH_2$-Cy-COO-Ph$^{FF}$-$CH_2CH_2$-Ph$^{F}$-$SF_5$
H-Ph-CH($CH_3$)—$CH_2$-Ph$^{FF}$-COO-Cy-$CH_2CH_2$-Ph$^{FF}$-$SF_5$
H-Ph-CH($CH_3$)—$CH_2$-Cy-COO-Cy-$CH_2CH_2$-Ph$^{FF}$-$SF_5$
H-Ph-CH($CH_3$)—$CH_2$-Ph-OCO-Ph$^{FF}$-$CH_2CH_2$-Ph$^{FF}$-$SF_5$
H-Ph-CH($CH_3$)—$CH_2$-Cy-OCO-Ph$^{FF}$-$CH_2CH_2$-Ph$^{F}$-$SF_5$
H-Ph-CH($CH_3$)—$CH_2$-Ph$^{FF}$-OCO-Cy-$CH_2CH_2$-Ph$^{FF}$-$SF_5$
H-Ph-CH($CH_3$)—$CH_2$-Cy-OCO-Cy-$CH_2CH_2$-Ph$^{FF}$-$SF_5$

Explanation of Production Process

The optically active compounds (4) of the present invention are novel compounds, and may be produced in accordance with the following process for example. The following production process is a preferred example, and other various production processes may be employed as the case requires. In the following explanation, -Ph'- represents the formula (4-7), and -Ph"- represents the formula (4-8).

(4-8)

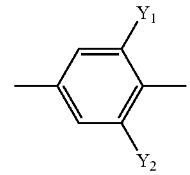

(4-7)

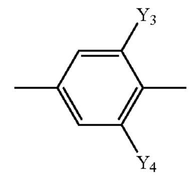

[Process 10]

In a case where $A^8$ is $CH_2$, each of $B^1$, $B^2$, $D^1$ and $D^2$ is a single bond, and $B^3$ is —COO—

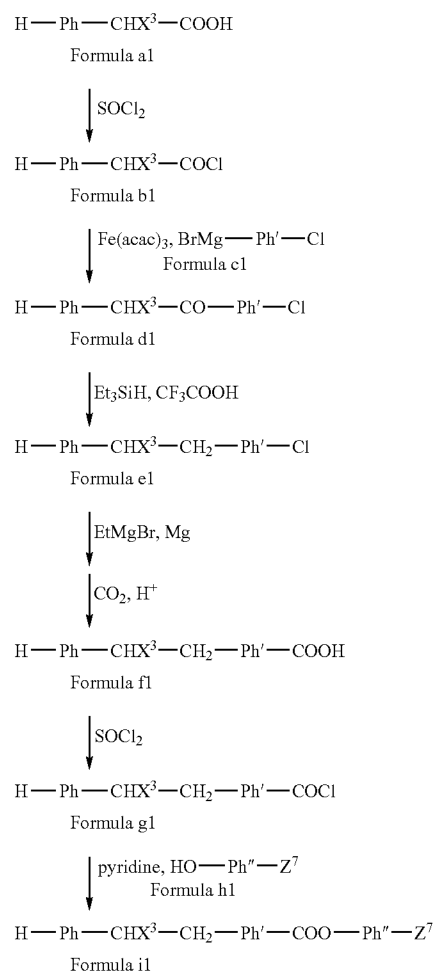

An optically active carboxylic acid (formula a1) is subjected to acid chloridation with e.g. thionyl chloride to obtain an acid chloride (formula b1), which is reacted with a Grignard reagent (formula c1) in the presence of an organic metal catalyst such as iron(III) acetylacetonate [Fe$(acac)_3$] to obtain a ketone (formula d1). The ketone (formula d1) is reduced with a reducing agent such as triethylsilane in the presence of trifluoroacetic acid to obtain a compound (formula e1). The compound (formula e1) is formed into a Grignard reagent with magnesium in the presence of ethyl magnesium bromide, which is reacted with carbon dioxide and then hydrolyzed with an acid to obtain a carboxylic acid (formula f1), which is subjected to acid chloridation with e.g. thionyl chloride to obtain an acid chloride (formula g1), which is further reacted with a compound (formula h1) in the presence of e.g. pyridine to obtain an aimed optically active compound (formula i1).

[Process 11]

In a case where $A^8$ is $CH_2$, each of $B^1$, $B^2$, $B^3$, $D^1$ and $D^2$ is a single bond, and $Z_3$ is —CN

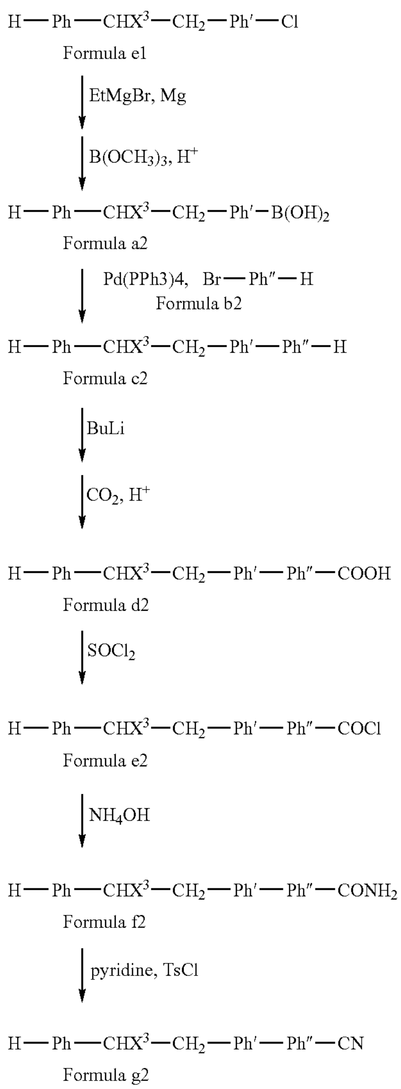

A compound (formula e1) is formed into a Grignard reagent with magnesium in the presence of ethyl magnesium bromide, which is reacted with trimethylborate and then hydrolyzed with an acid to obtain a compound (formula a2), which is reacted with a compound (formula b2) in the presence of an organic metal catalyst such as $Pd(PPh_3)_4$ to obtain a compound (formula c2). The compound (formula c2) is subjected to lithiation with butyllithium and reacted with carbon dioxide, and then hydrolyzed with an acid to obtain a carboxylic acid (formula d2). The carboxylic acid (formula d2) is subjected to acid chloridation with e.g. thionyl chloride to obtain an acid chloride (formula e2), which is reacted with ammonia water to obtain an amide (formula f2), which is further subjected to dehydration with e.g. p-toluenesulfonyl chloride in the presence of e.g. pyridine to obtain an aimed optically active compound (formula g2).

[Process 12]

In a case where $A^8$ is —$CH_2$—, each of $B^1$, $B^2$, $D^1$ and $D^2$ is a single bond, and $B^3$ is —OCO—

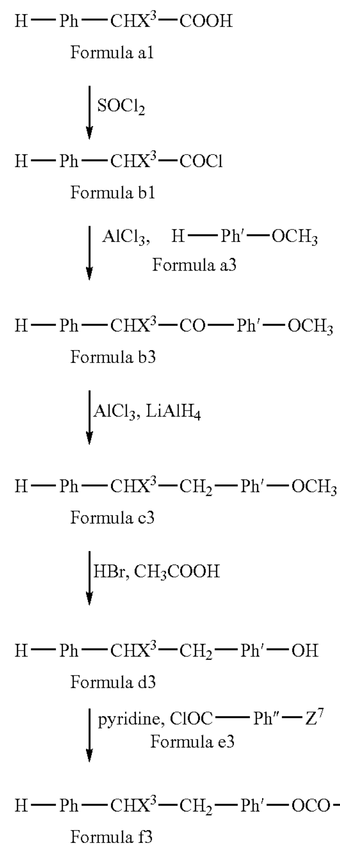

An optically active carboxylic acid (formula a1) is subjected to acid chloridation with e.g. thionyl chloride to obtain an acid chloride (formula b1), which is subjected to Friedel-Crafts reaction with a compound (formula a3) in the presence of a Lewis acid such as aluminum chloride to obtain a ketone (formula b3). The ketone (formula b3) is reduced with a reducing agent such as lithium aluminum hydride in the presence of a Lewis acid such as aluminum chloride to obtain a compound (formula c3). The compound (formula c3) is treated with e.g. hydrobromic acid in the presence of acetic acid to obtain a compound (formula d3), which is reacted with an acid chloride (formula e3) in the presence of e.g. pyridine to obtain an aimed optically active compound (formula f3).

[Process 13]

In a case where $A^8$ is $CH_2$, each of $B^1$, $B^2$, $D^1$ and $D^2$ is a single bond, and $B^3$ is —CF═CF—

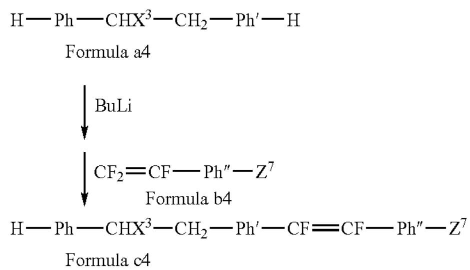

A compound (formula a4) is subjected to lithiation with butyllithium and reacted with a compound (formula b4) to obtain an aimed optically active compound (formula c4).

[Process 14]

In a case where $A^8$ is —$CH_2$—, each of $B^1$, $B^2$, $D^1$ and $D^2$ is a single bond, and $B^3$ is —$CF_2O$—

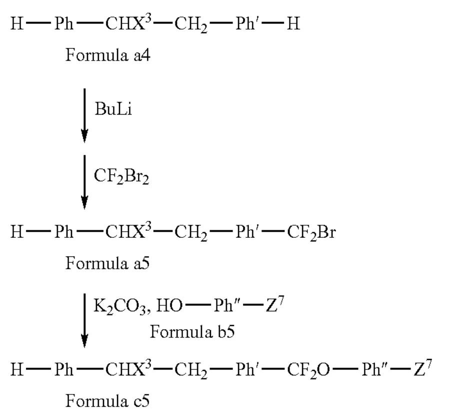

A compound (formula a4) is subjected to lithiation with butyllithium, and reacted with dibromodifluoromethane to obtain a compound (formula a5), which is reacted with a compound (formula b5) in the presence of e.g. potassium carbonate to obtain an aimed optically active compound (formula c5).

In the above process, in each reaction, the optical purity of the optically active compound of each formula is maintained. Either process is a process which can maintain the absolute configuration of the material, and accordingly the material compound may optionally be changed depending upon the absolute configuration of the aimed optically active compound (4).

It is preferred that one type or at least two types of the optically active compound (4) of the present invention is incorporated in another liquid crystal material and/or non-liquid crystal material (hereinafter other liquid crystal material and non-liquid crystal material will generically be referred to as "another material") to obtain a liquid crystal composition.

In a case where the optically active compound (4) is incorporated in another material to obtain a liquid crystal composition, it is preferred that many types of the optically active compounds (4) are incorporated, and in such a case, the amount of one type of the optically active compound (4) is preferably from 0.1 to 10 parts by mass per 100 parts by mass of another material, and in a case where a plurality of the optically active compounds (4) are incorporated, their total amount is preferably from 0.1 to 50 parts by weight per 100 parts by mass of another material.

As another material, preferably the following compounds may be exemplified. In the following formulae, each of $R^A$ and $R^B$ which are independent of each other, is an alkyl group, an alkoxy group, a halogen atom or a cyano group, Cy is a trans-1,4-hexylene group, and $Ph^A$ is a non-substituted or substituted 1,4-phenylene group.

$R^A$-Cy-Cy-$R^B$
$R^A$-Cy-$Ph^A$-$R^B$
$R^A$-$Ph^A$-$Ph^A$-$R^B$
$R^A$-Cy-COO-$Ph^A$-$R^B$
$R^A$-$Ph^A$-COO-$Ph^A$-$R^B$
$R^A$-$Ph^A$-C≡C-$Ph^A$-$R^B$
$R^A$-Cy-$CH_2CH_2$-$Ph^A$-C≡C-$Ph^A$-$R^B$
$R^A$-Cy-$CH_2CH_2$-$Ph^A$-$R^B$
$R^A$-$Ph^A$-$CH_2CH_2$-$Ph^A$-$R^B$
$R^A$-Cy-Cy-$Ph^A$-$R^B$
$R^A$-Cy-$Ph^A$-$Ph^A$-$R^B$
$R^A$-Cy-$Ph^A$-$Ph^A$-Cy-$R^B$
$R^A$-$Ph^A$-$Ph^A$-$Ph^A$-$R^B$
$R^A$-Cy-COO-$Ph^A$-$Ph^A$-$R^B$
$R^A$-Cy-$Ph^A$-COO-$Ph^A$-$R^B$
$R^A$-Cy-COO-$Ph^A$-COO-$Ph^A$-$R^B$
$R^A$-$Ph^A$-COO-$Ph^A$-COO-$Ph^A$-$R^B$
$R^A$-$Ph^A$-COO-$Ph^A$-OCO-$Ph^A$-$R^B$

The above compounds are mentioned as preferred examples of another material, and the ring structure of the above compounds may be substituted with another 6-membered ring such as a cyclohexane ring or a benzene ring, or another heterocyclic ring such as a pyridine ring or a dioxane ring, the terminal hydrogen atom of the compounds may be substituted with e.g. a halogen atom, a cyano group or a methyl group, and the binding group between rings may be changed to another binding group. They may optionally be changed depending upon the required performances.

The liquid crystal composition containing the optically active compound (4) of the present invention is sandwiched between substrates provided with an electrode by e.g. a method of injecting it into a liquid crystal cell to constitute a liquid crystal element. As the process for producing a liquid crystal element, basically the following process may be mentioned. Namely, on a substrate of e.g. plastic or glass, an undercoat layer of e.g. $SiO_2$ or $Al_2O_3$ or a color filter layer is formed as the case requires, an electrode of e.g. $In_2O_3$—$SnO_2$ (ITO) or $SnO_2$ is provided, followed by patterning, and an overcoat layer of e.g. polyimide, polyamide, $SiO_2$ or $Al_2O_3$ is formed as the case requires, followed by alignment treatment, and a sealing material is printed thereon, and such substrates are disposed so that the electrode sides face each other and the periphery is sealed, and the sealing agent is cured to form an empty cell.

To this empty cell, the liquid crystal composition containing the optically active compound (4) of the present invention is injected, and the inlet is sealed with a sealing compound to constitute a liquid crystal cell. On this liquid crystal cell, as the case requires, e.g. a deflecting plate, a color deflecting plate, a light source, a color filter, a semi-permeable reflecting plate, a reflecting plate, an optical waveguide or an ultraviolet cut filter is laminated, e.g. characters or figures are printed, or a nonglare treatment is carried out, to produce a liquid crystal element.

The optically active compound (4) of the present invention has a high helical twisting power, and accordingly a liquid crystal composition having an aimed helical pitch can be obtained by addition of a small amount to the liquid crystal composition as compared with a conventional optically active compound. Further, at the same time, the optically active compound (4) has a high dielectric anisotropy (Δ∈), and thus when this is added to the liquid crystal composition, the liquid crystal composition having a high Δ∈ as compared with a case where a conventional optically active compound is employed can be obtained, and driving at a low driving voltage as compared with a case where a conventional optically active compound is employed can be achieved.

When the liquid crystal composition containing the optically active compound (4) is employed to obtain a TN or STN liquid crystal display element, uniform twist alignment can be achieved, and when it is employed to obtain a reflective cholesteric liquid crystal element, an aimed reflection wavelength can be obtained. Further, the liquid crystal composition containing the optically active compound (4) may also be employed by various modes such as an active matrix element, a polymer dispersion liquid crystal element, a GH liquid crystal element employing a polychromatic colorant, and a ferroelectric liquid crystal element. Further, it may also be employed for applications other than for display, such as a dimmer element, a dimmer window, an optical shutter, a polarization exchange element, an optical color filter, a colored film, an optical recording element or a temperature indicator.

Now, the present invention will be explained more specifically with reference to Examples.

EXAMPLE 1-1

Preparation of (R)-1-[4-[2-(4-chloro-2-fluorophenyl)ethinyl]phenyl]-2-phenylpropane

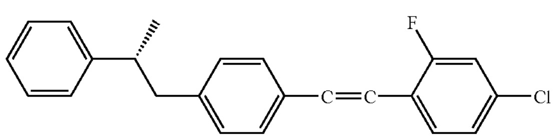

35 ml of tetrahydrofuran (THF) was added to 11.6 g (0.48 mol) of magnesium, and a solution having 23.6 g (0.22 mol) of ethyl bromide dissolved in 70 ml of THF was dropwise added thereto over a period of 1 hour at room temperature with stirring, followed by stirring for 1 hour. A solution having 50.0 g (0.22 mol) of (R)-2-phenyl-1-(4-chlorophenyl)propane dissolved in 50 ml of THF was dropwise added thereto over a period of 30 minutes at room temperature, followed by stirring under reflux for 5 hours. After the mixture was cooled to room temperature, 250 ml of THF was added thereto, and the mixture was further cooled to −30° C. A solution having 112 g (0.44 mol) of iodine dissolved in 300 ml of THF was dropwise added thereto at −30° C. over a period of 30 minutes, followed by stirring for 1 hour. The temperature was raised to 0° C., and 120 ml of 4M hydrochloric acid was dropwise added thereto, followed by stirring for 10 minutes. After extraction with toluene from the reaction liquid, washing with water and drying were carried out to obtain 69.8 g of (R)-2-phenyl-1-(4-iodophenyl)propane (GC purity: 95.2%, 0.22 mol).

Then, 32.5 g (0.21 mol) of 2-fluoro-4-chlorophenylacetylene and 69.8 g of the above prepared (R)-2-phenyl-1-(4-iodophenyl)propane (GC purity: 95.2%, 0.22 mol) were dissolved in 380 ml of triethylamine, and 4.85 g (4.2 mmol) of tetrakis(triphenylphosphine)palladium and 1.2 g (6.3 mmol) of iron(II) iodide were added thereto, followed by stirring at 80° C. for 2 hours.

Then, 3 L of water was added to the reaction liquid, and after extraction with toluene, washing with water and drying were carried out, purification by silica gel column chromatography was carried out, and recrystallization from ethanol was carried out twice to obtain 46.8 g (0.13 mol) of aimed (R)-1-[4-[2-(4-chloro-2-fluorophenyl)ethinyl]phenyl]-2-phenylpropane.

Melting point: 62.1° C. $^1$H-NMR($CDCl_3$, TMS): δ 1.19(d, 3H, J=6.6 Hz, —$CH_3$), 2.68–2.95(m, 3H, Benzylic-H), 6.92–7.35(m, 12H, Aromatic-H) $^{19}$F-NMR($CDCl_3$, $CFCl_3$): δ −107.60–−107.66(m)

The following compounds were obtained by a similar process.

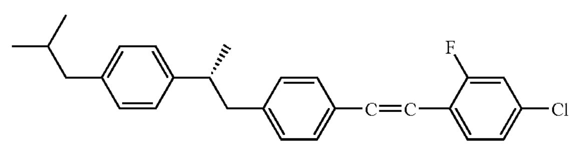

Melting point: 86.5° C. $^1$H-NMR($CDCl_3$, TMS): δ 0.89(d, 6H, J=6.6 Hz, iBu's-$CH_3$×2), 1.23(d, 3H, J=6.6 Hz, —$CH_3$), 1.84(tq, 1H, J=7.1 Hz, 6.6 Hz, iBu's=CH—), 2.43(d, 2H, J=7.1 Hz, iBu's-$CH_2$—), 2.73–3.00(m, 3H, Benzylic-H), 7.01–7.45(m, 11H, Aromatic-H) $^{19}$F-NMR($CDCl_3$, $CFCl_3$): δ −107.92–−107.95(m)

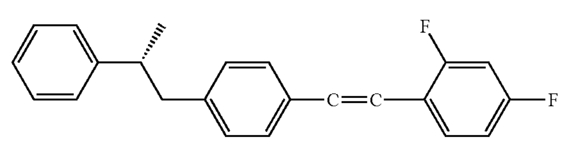

Melting point: 60.6° C. $^1$H-NMR($CDCl_3$, TMS): δ 1.19(d, 3H, J=6.2 Hz, —$CH_3$), 2.69–2.96(m, 3H, Benzylic-H), 6.93–7.29(m, 12H, Aromatic-H) $^{19}$F-NMR($CDCl_3$, $CFCl_3$): δ −136.47(m, 1F), −137.46(m, 1F)

Further, the following compounds are obtained by a process similar to the above.

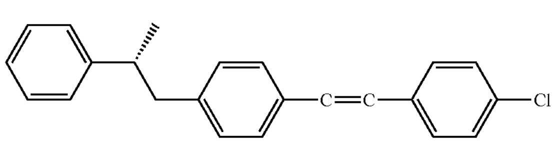

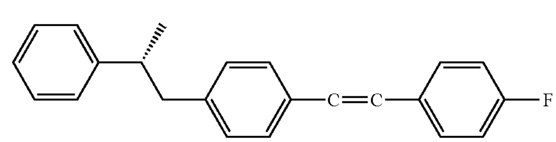

-continued
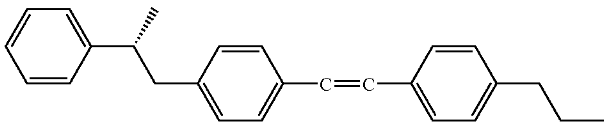
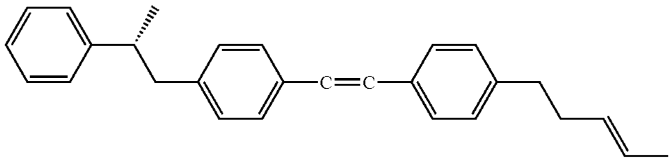
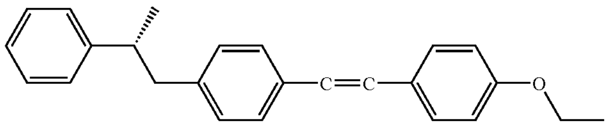
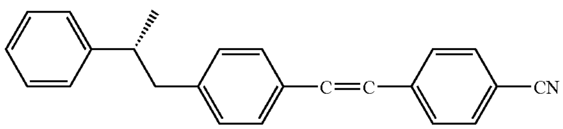
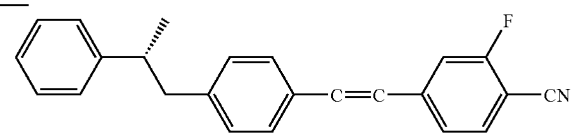
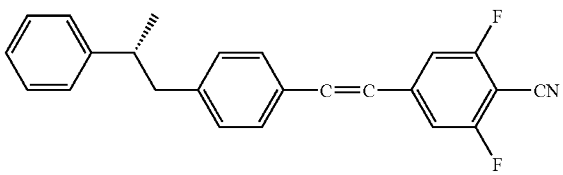
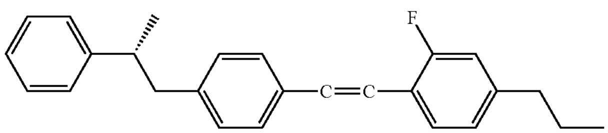
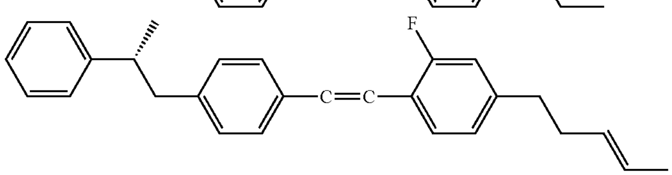
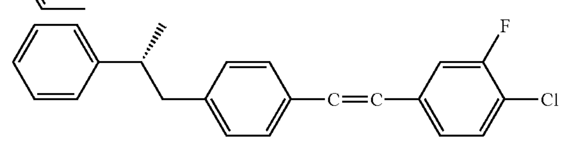
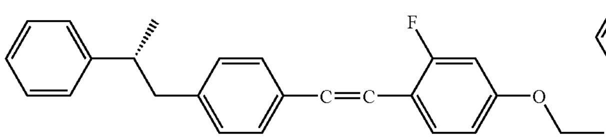
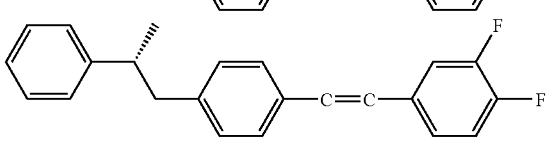
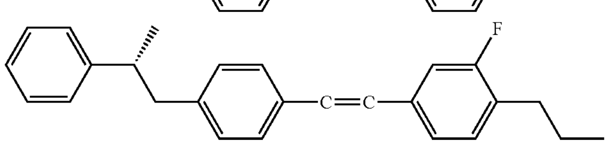
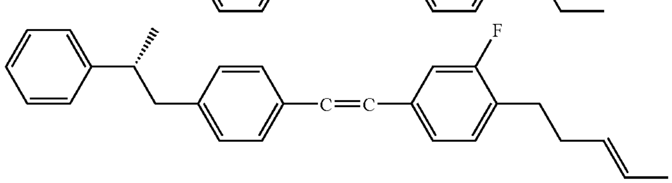
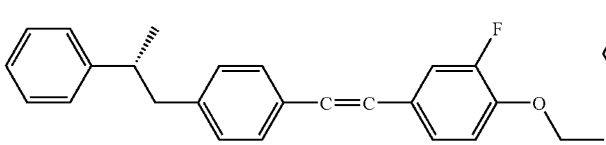
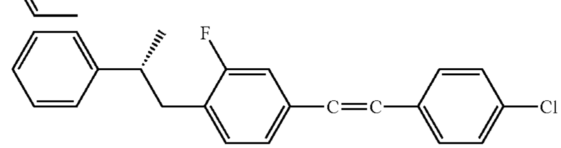

-continued
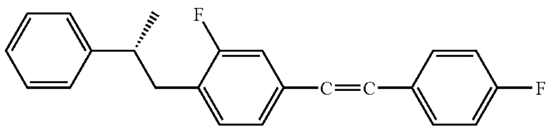
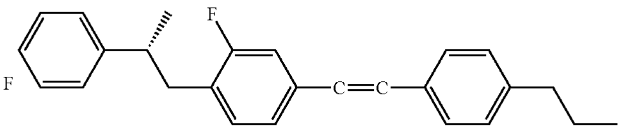
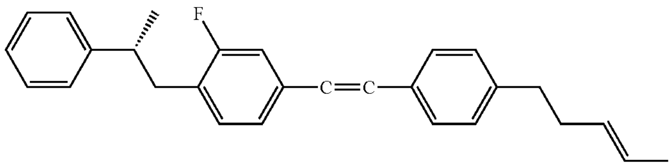
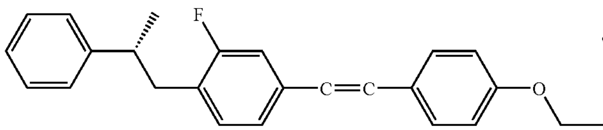
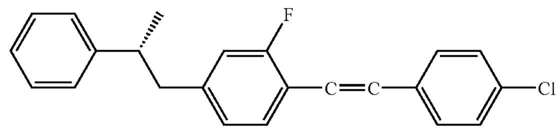
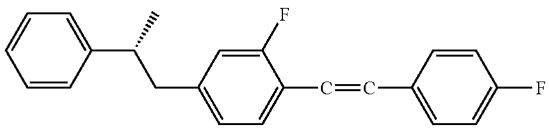
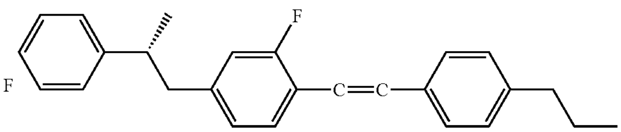
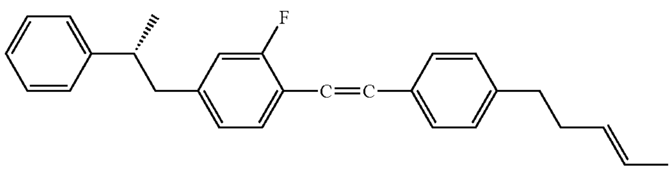
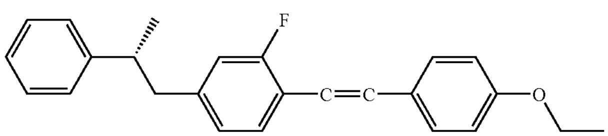
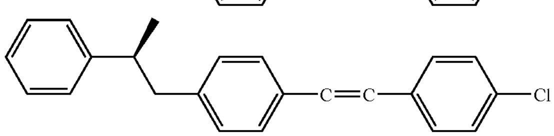
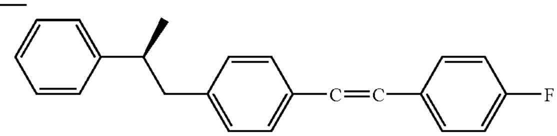
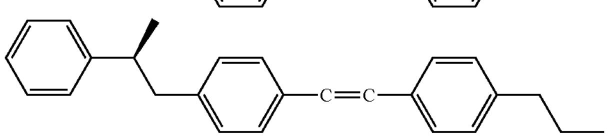
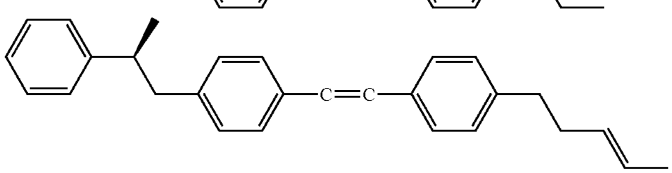
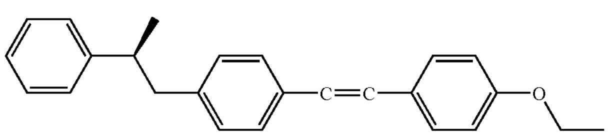
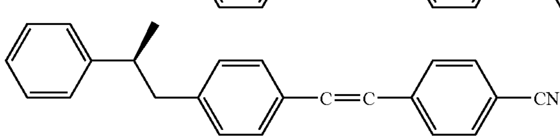
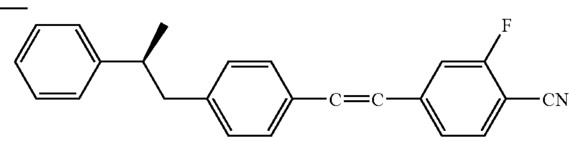
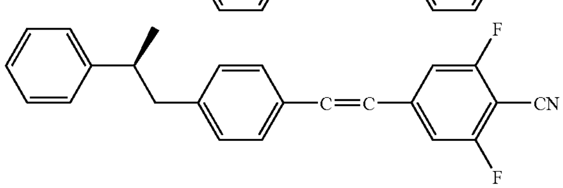

-continued
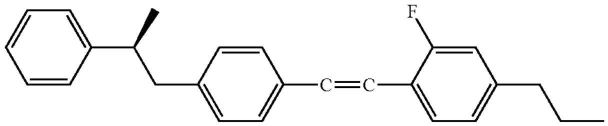
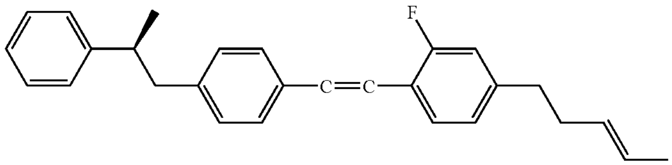
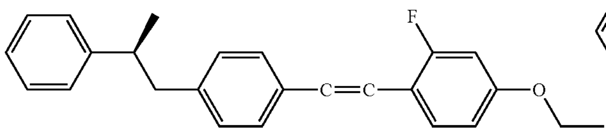
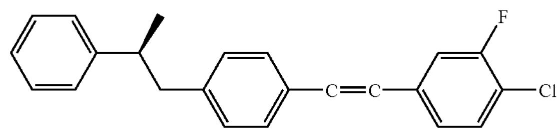
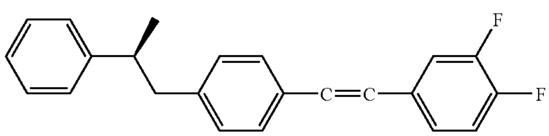
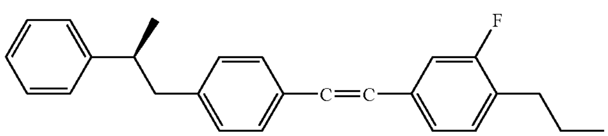
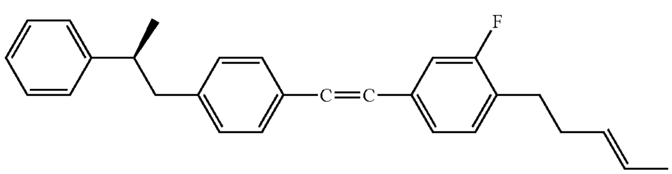
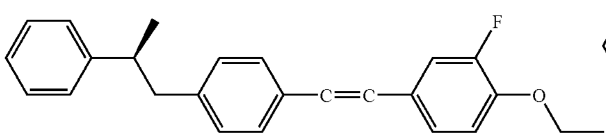
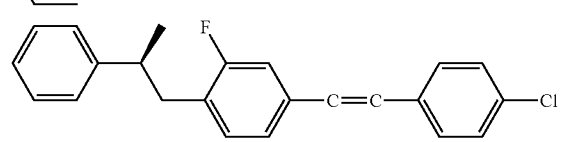
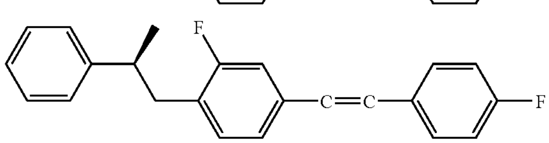
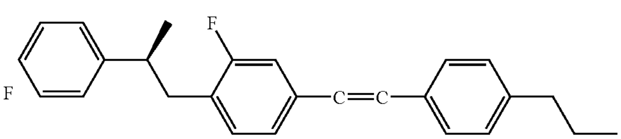
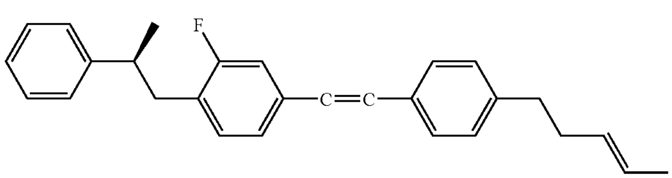
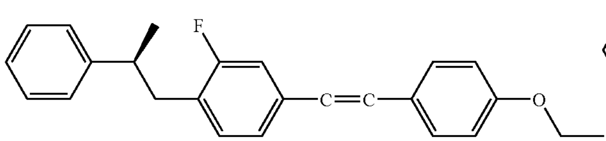
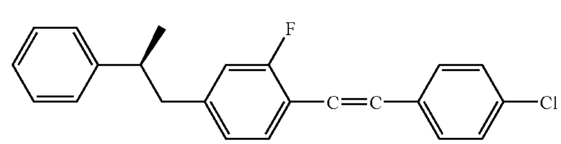
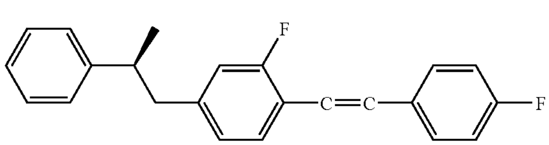
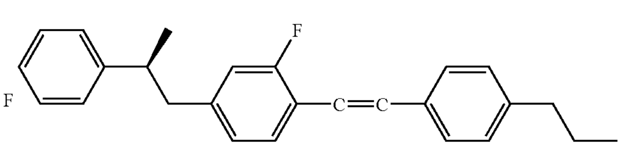

-continued
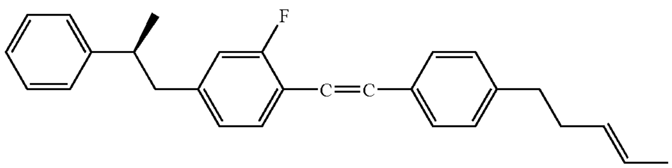
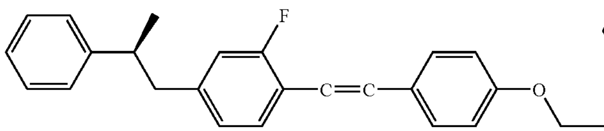
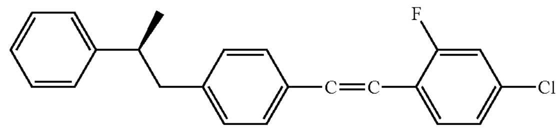
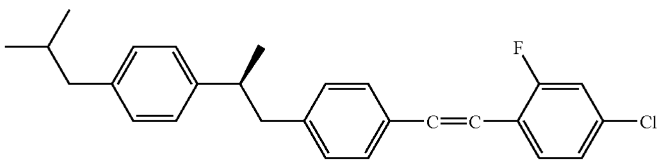
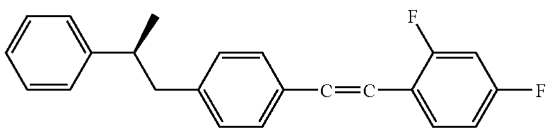
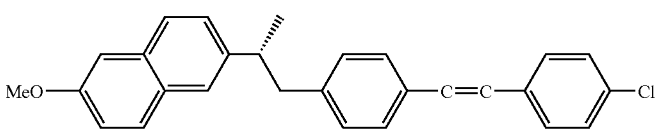
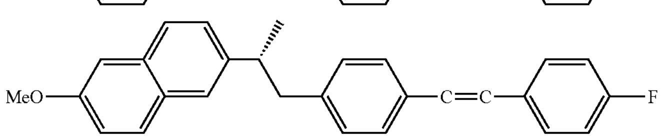
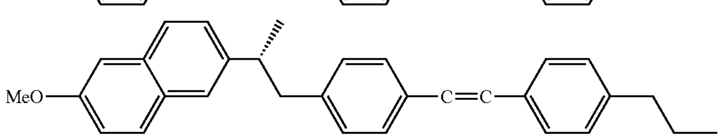
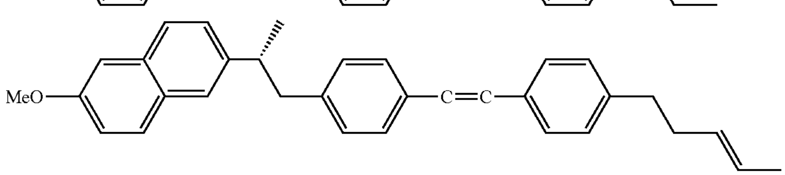
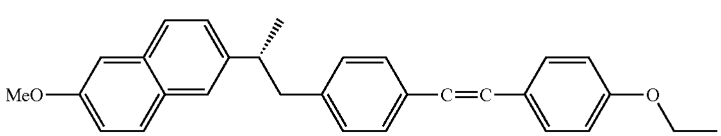
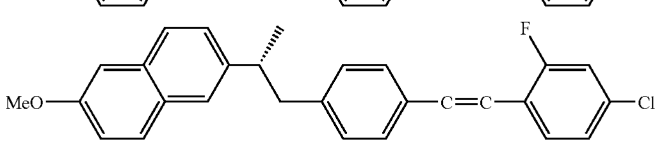
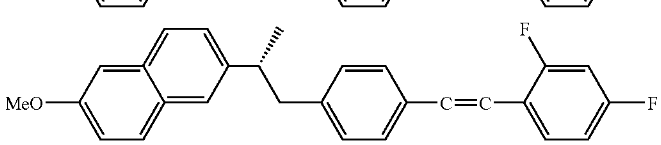
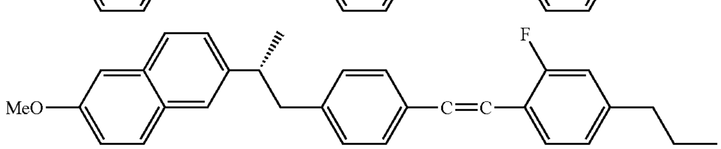

-continued
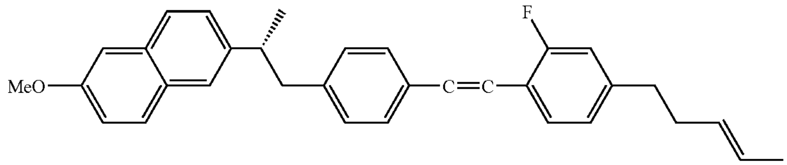
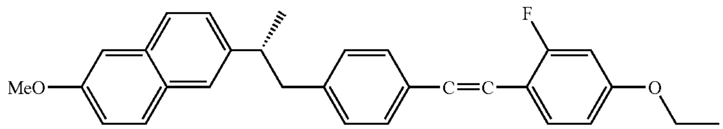
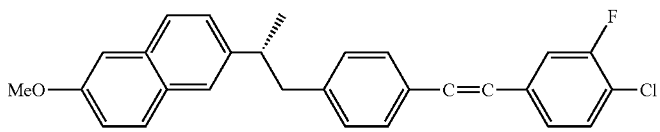
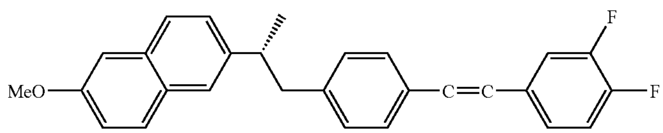
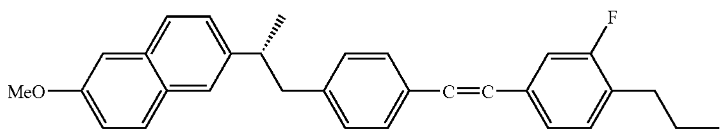
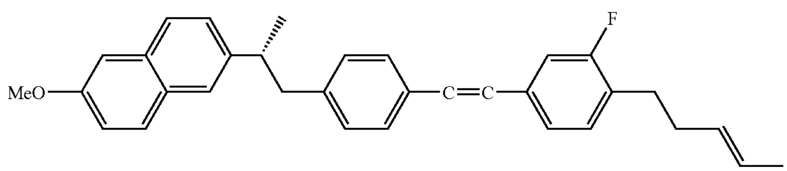
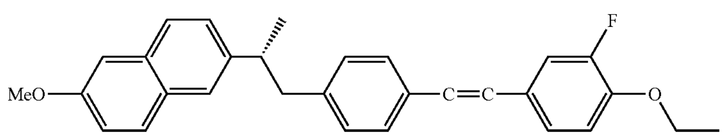
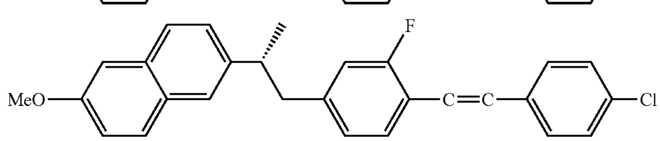
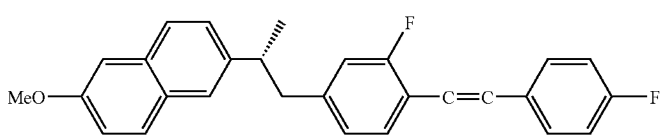
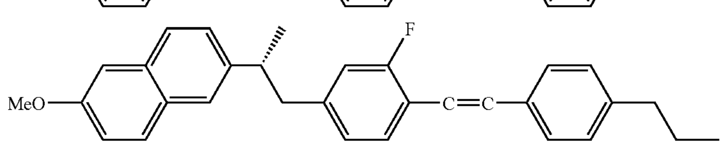
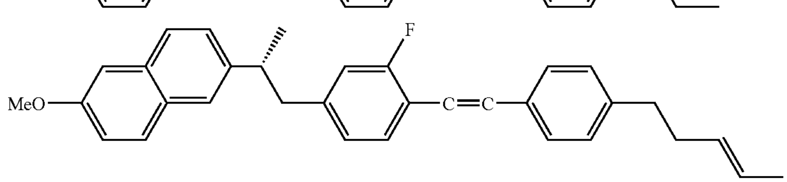
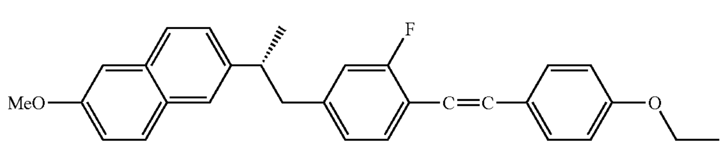

-continued
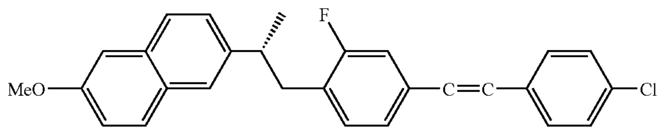
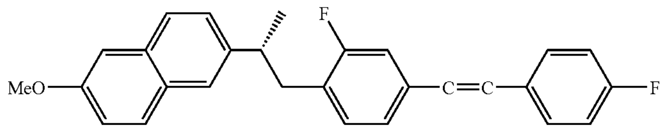
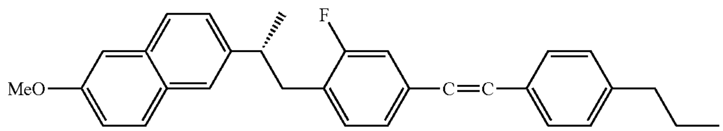
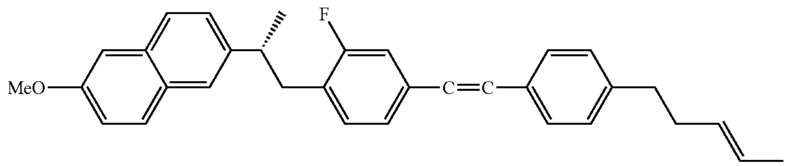
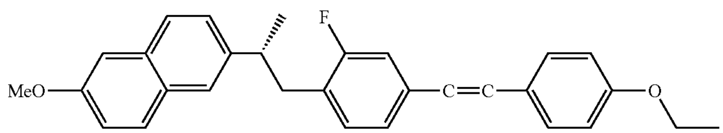
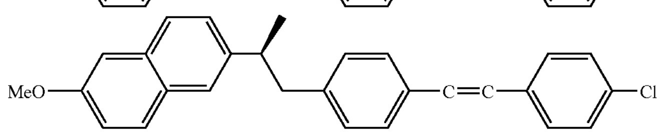
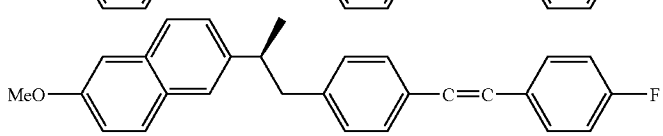
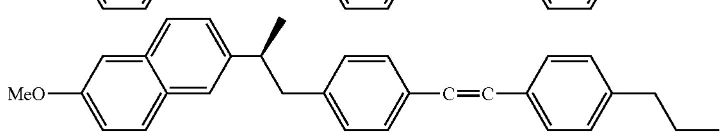
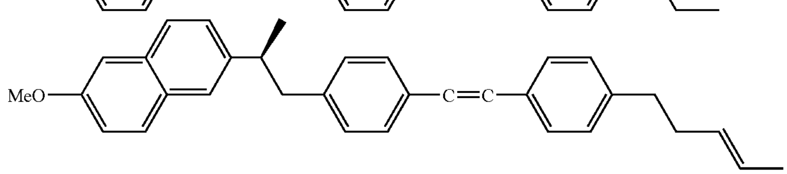
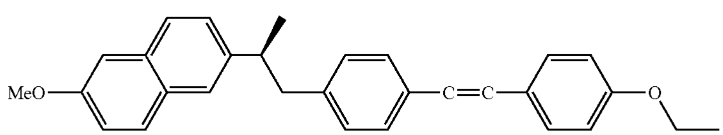
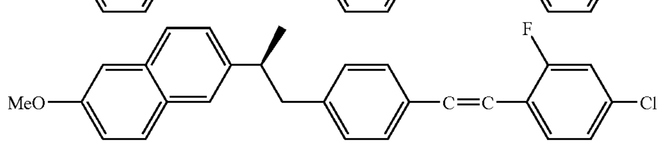
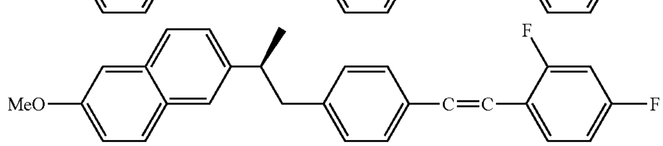
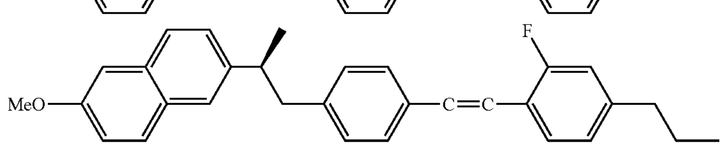

-continued
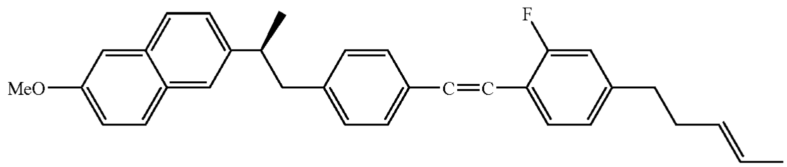
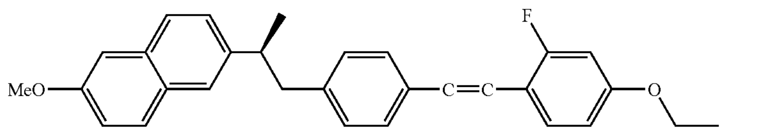
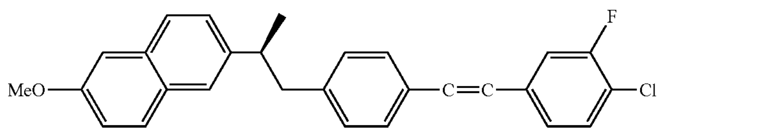
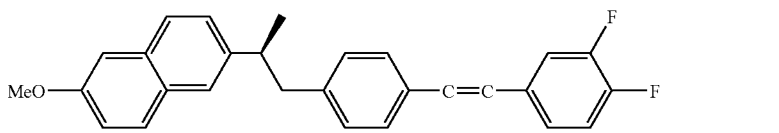
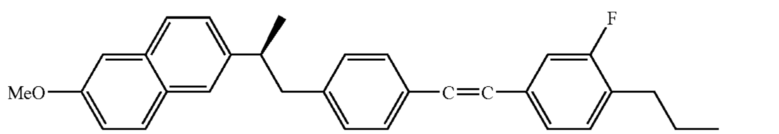
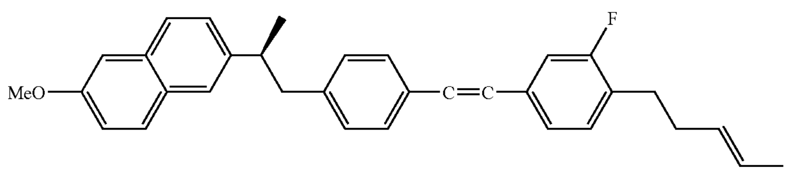
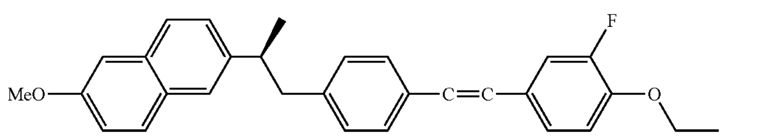
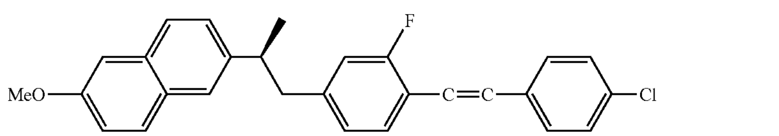
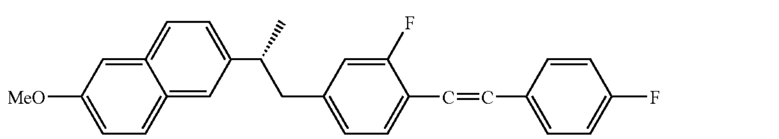
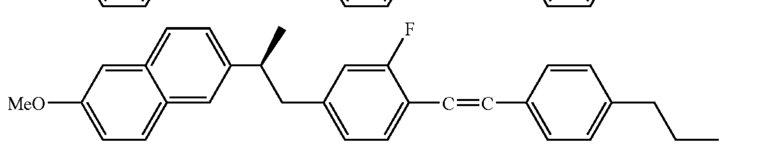
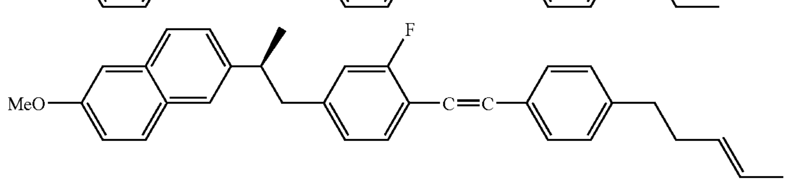
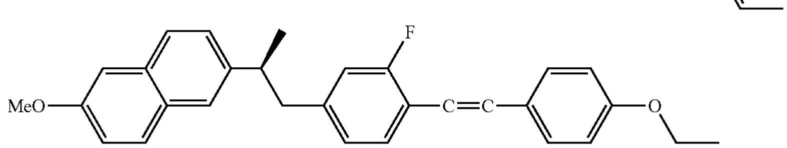

-continued
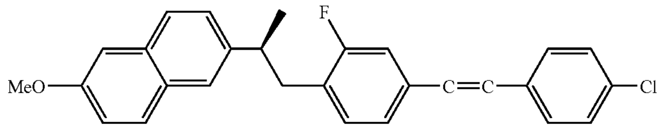
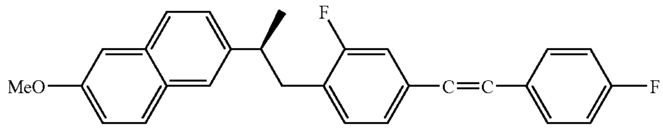
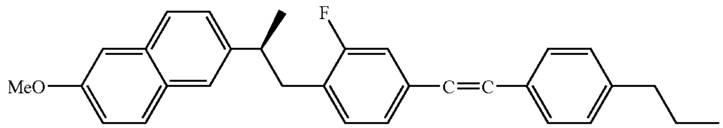
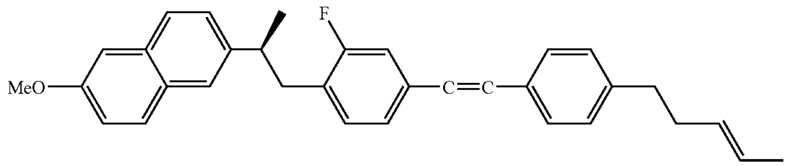
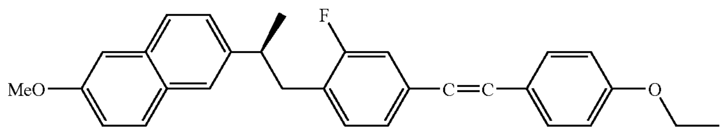
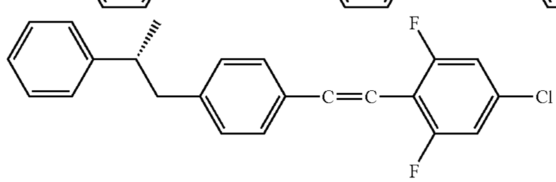
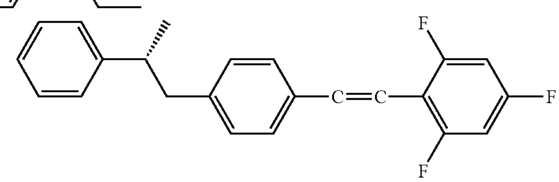
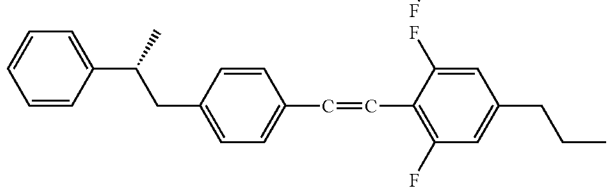
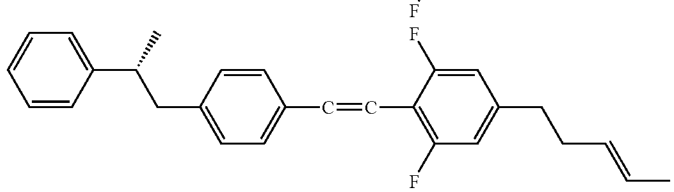
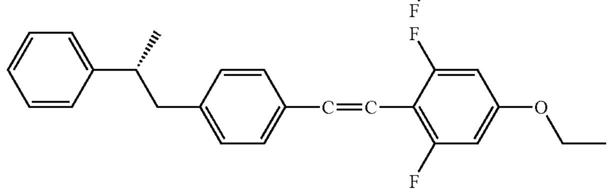
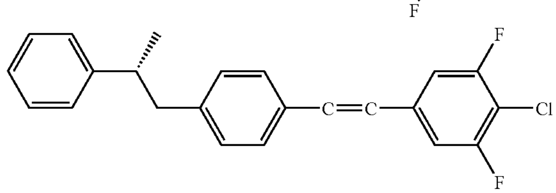
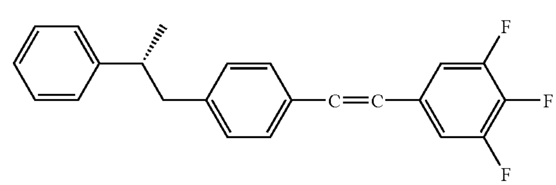
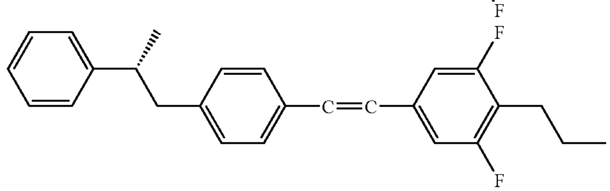

-continued
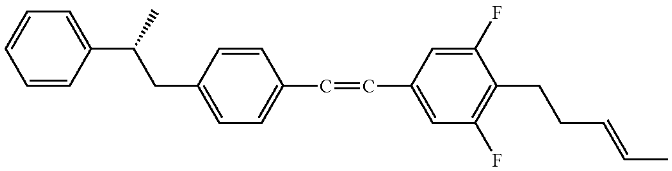
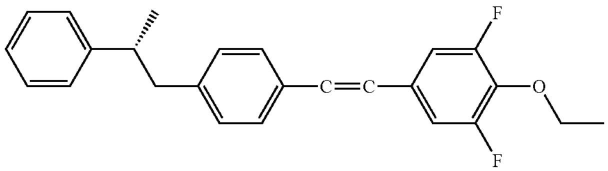
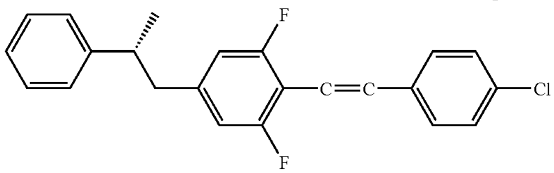
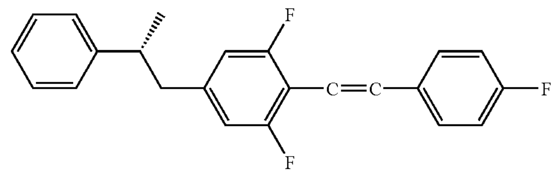
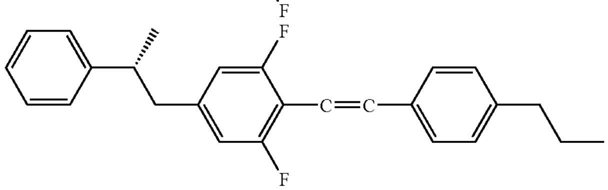
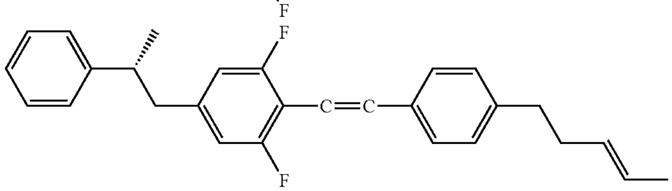
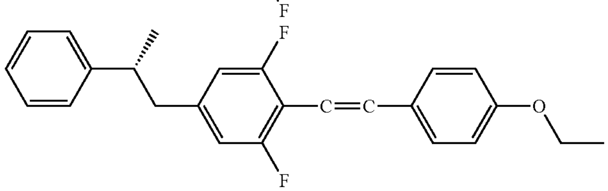
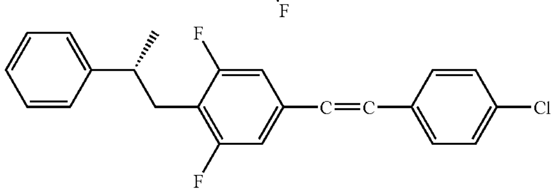
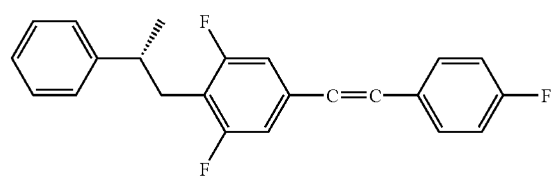
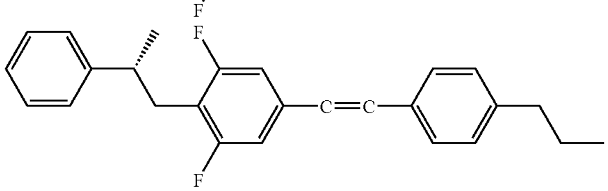
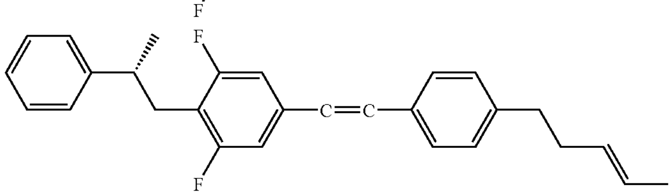
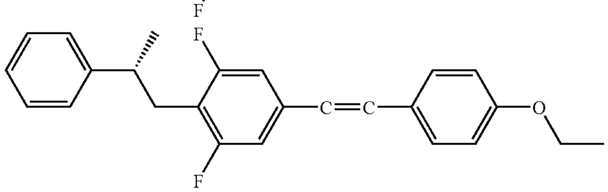

-continued
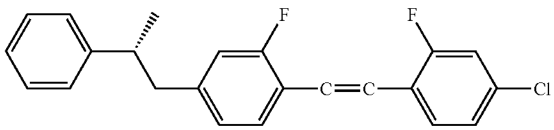
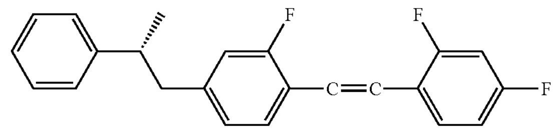
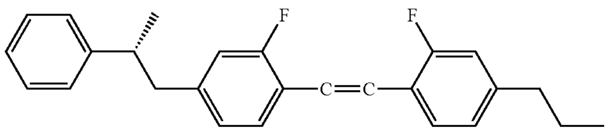
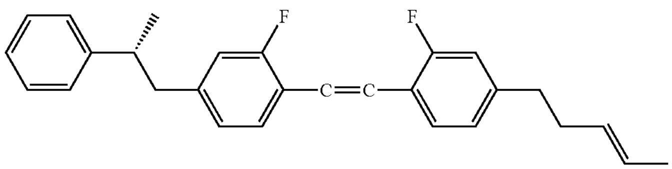
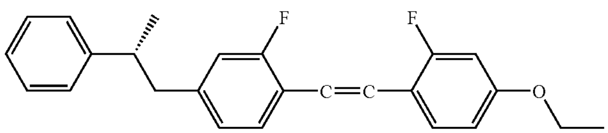
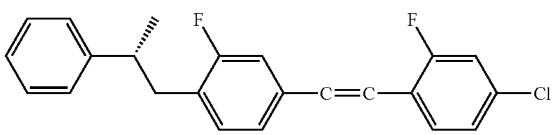
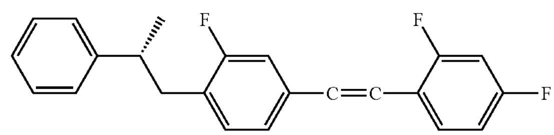
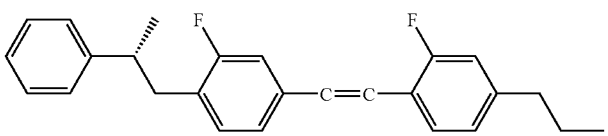
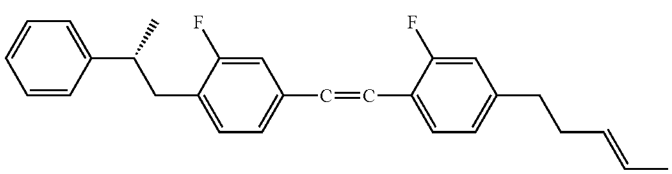
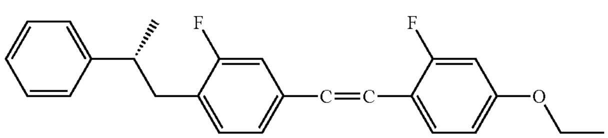
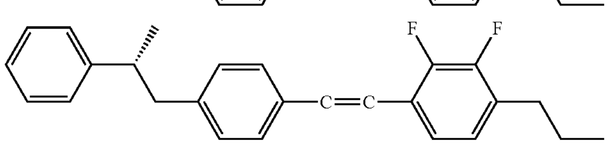
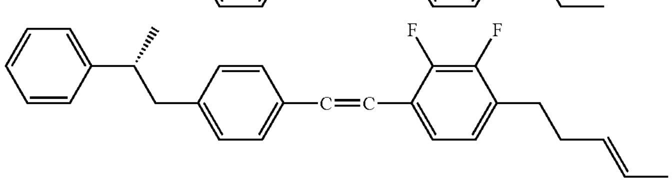
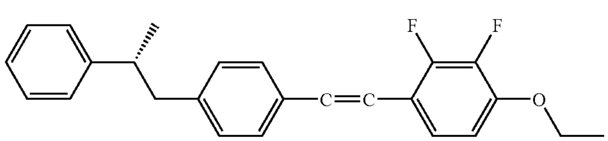
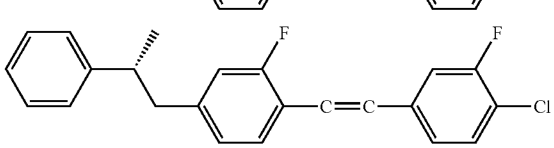
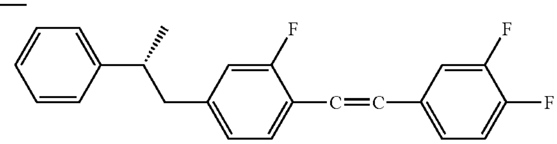

-continued
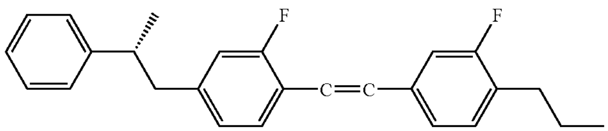
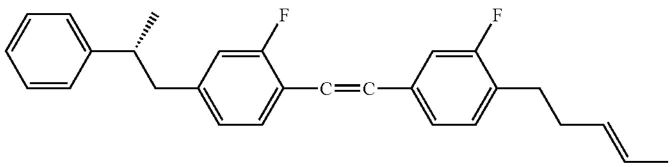
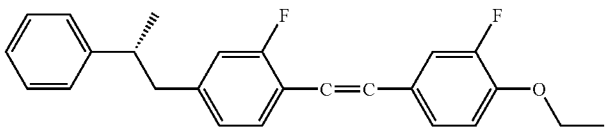
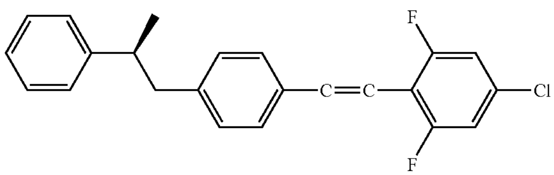
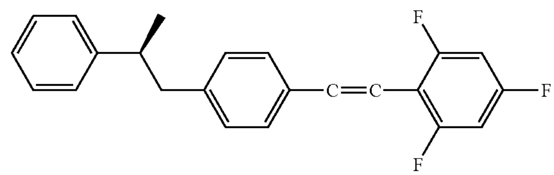
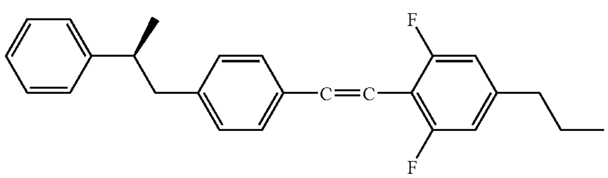
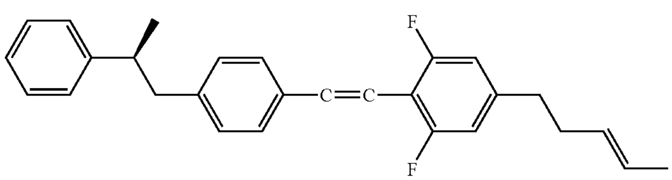
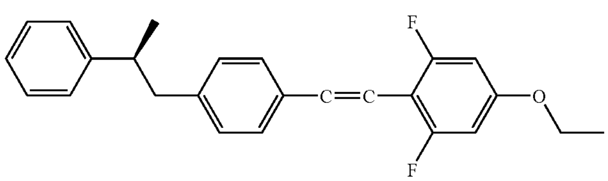
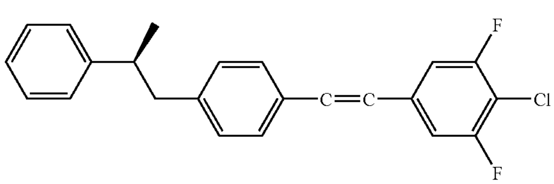
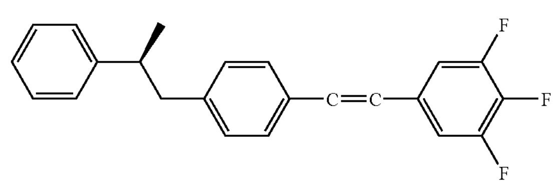
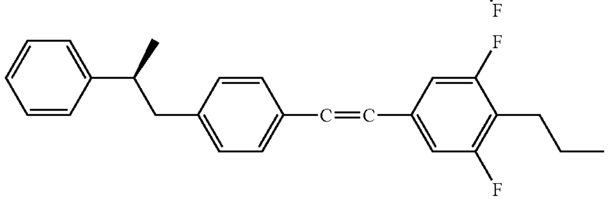
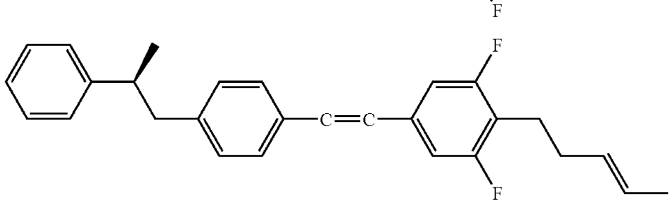

-continued
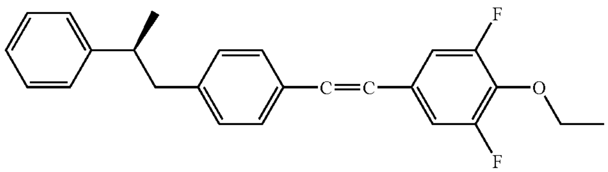
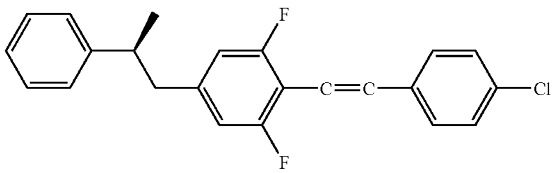
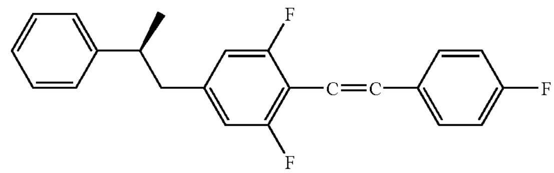
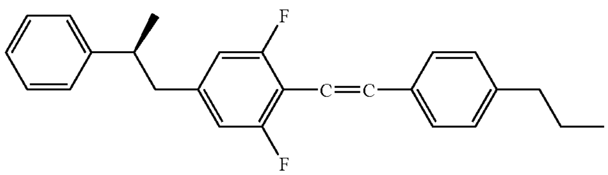
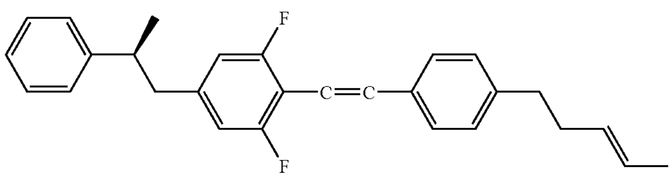
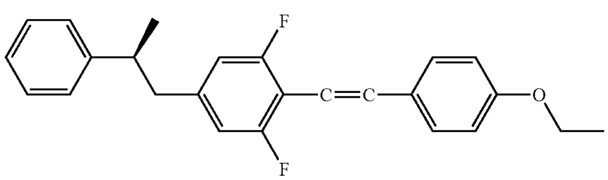
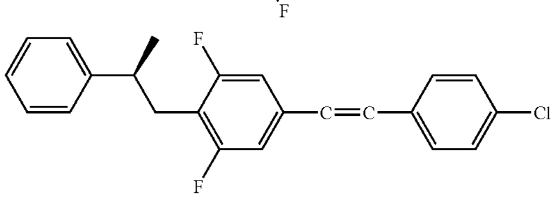
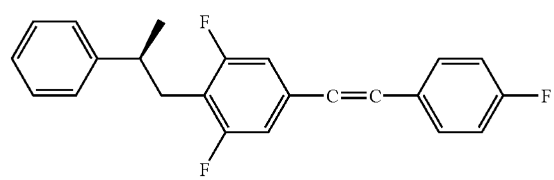
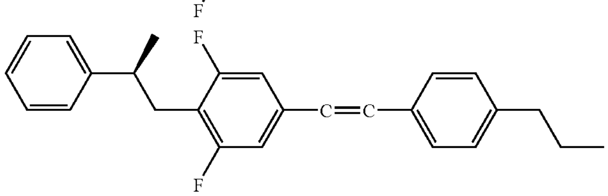
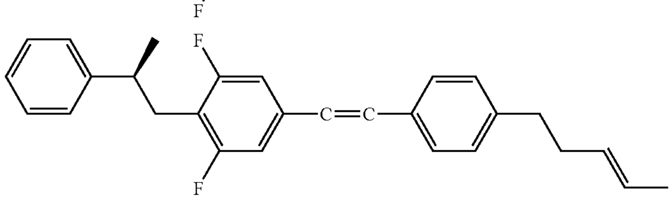
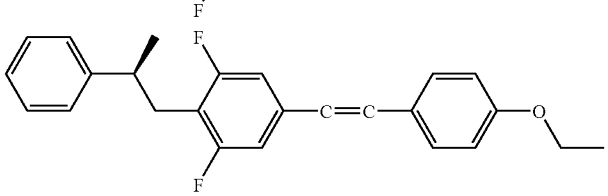
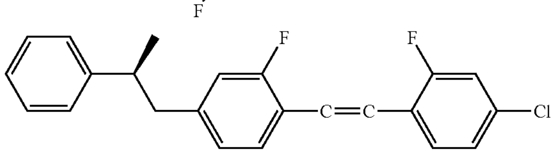
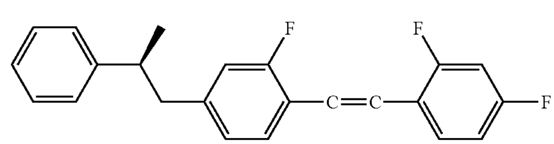

-continued
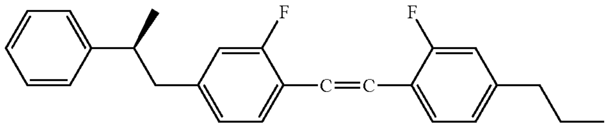
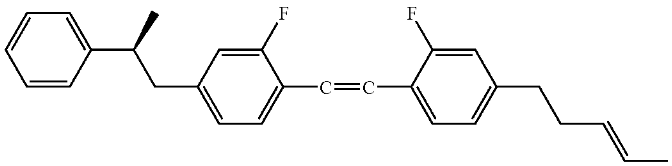
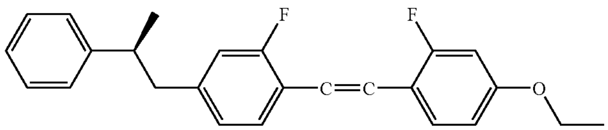
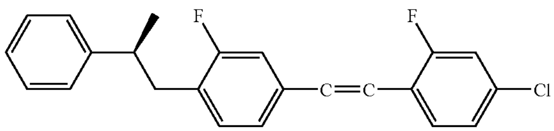
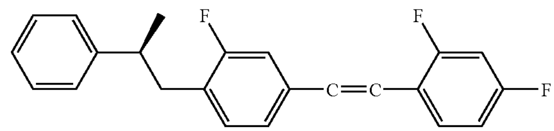
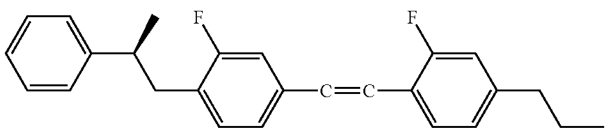
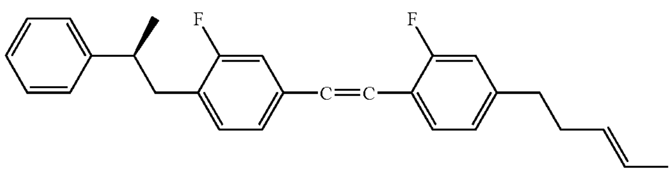
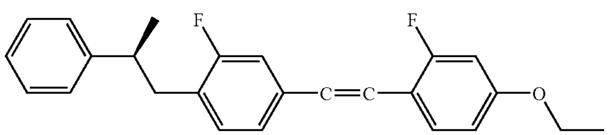
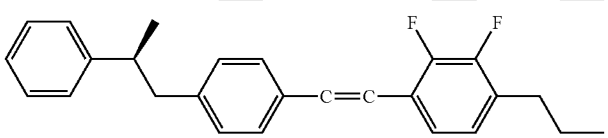
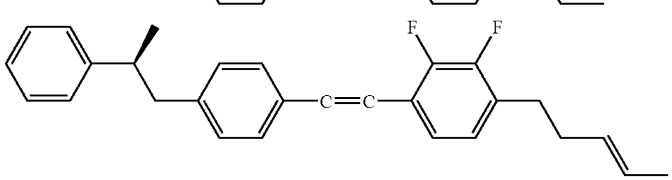
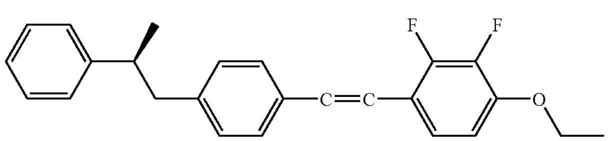
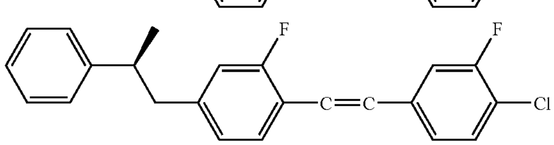
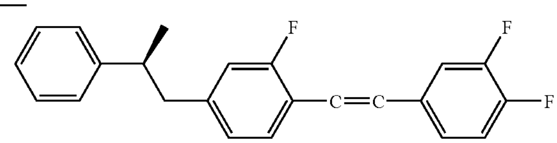
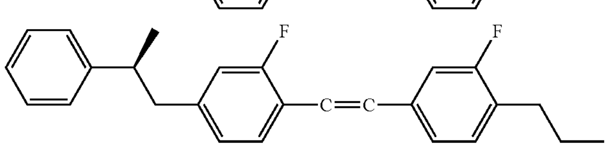

-continued
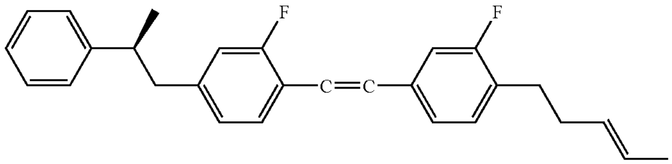
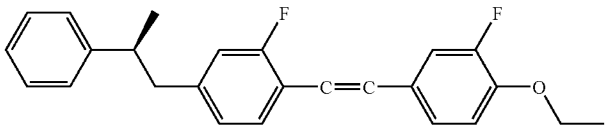
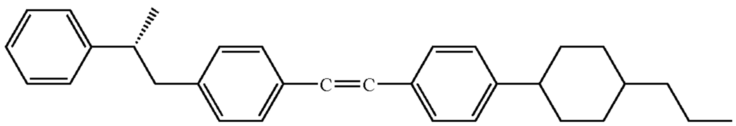
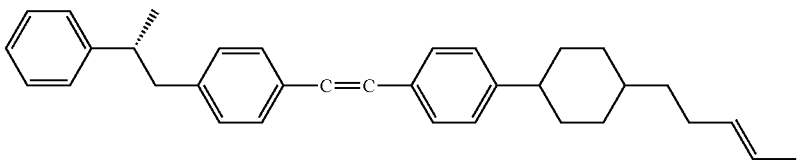
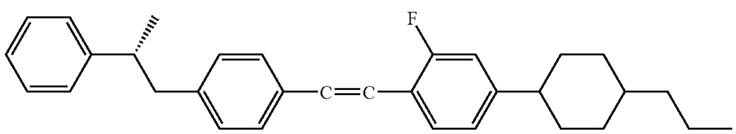
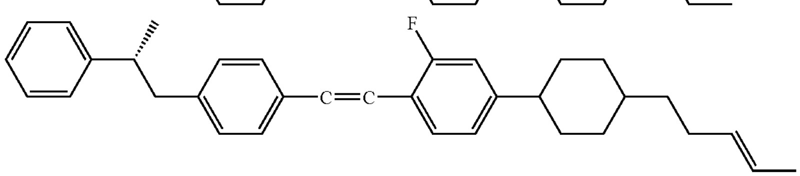
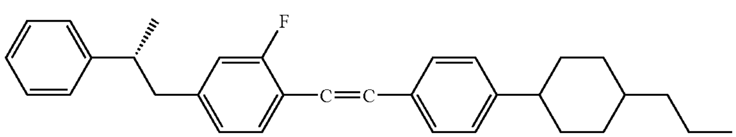
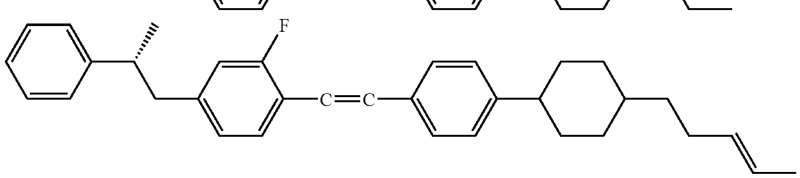
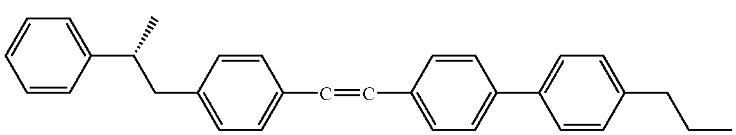
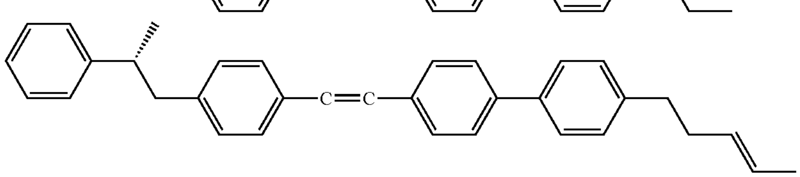
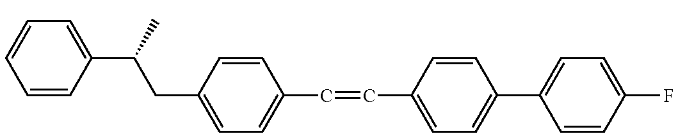
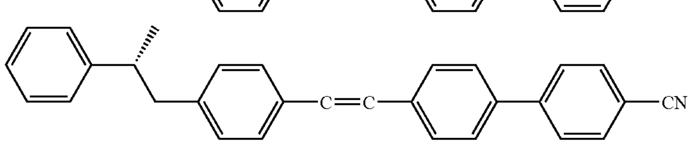

-continued
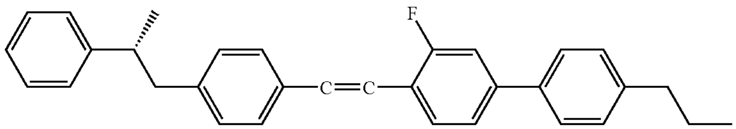
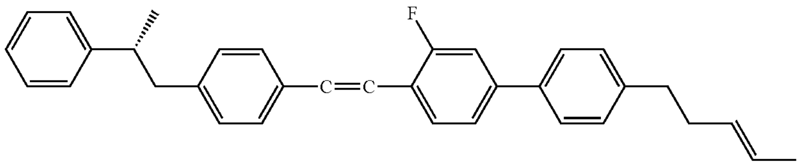
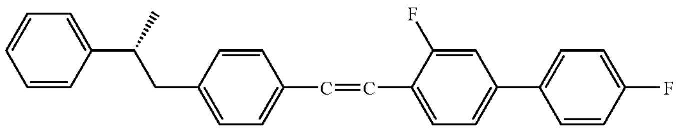
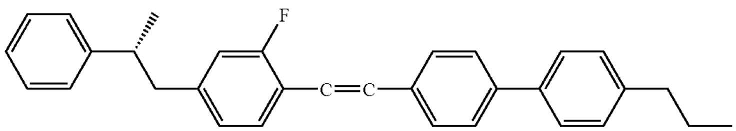
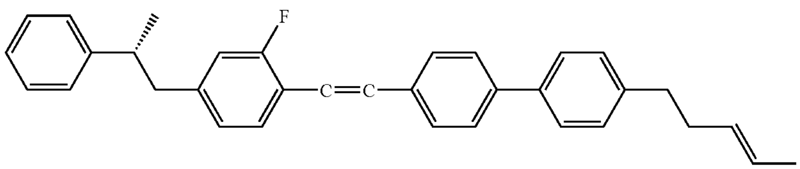
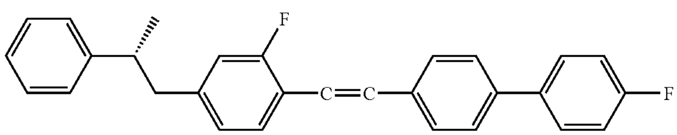
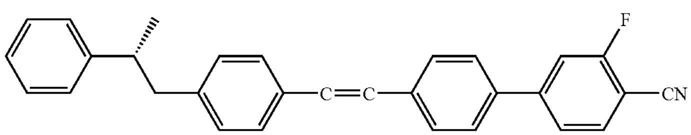
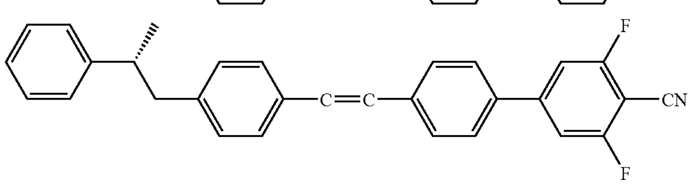
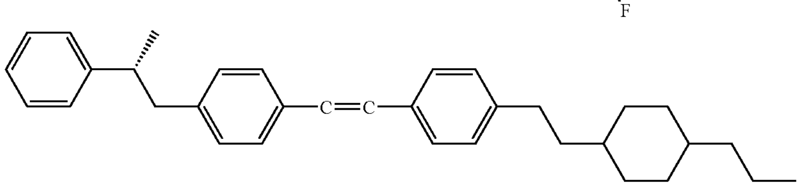
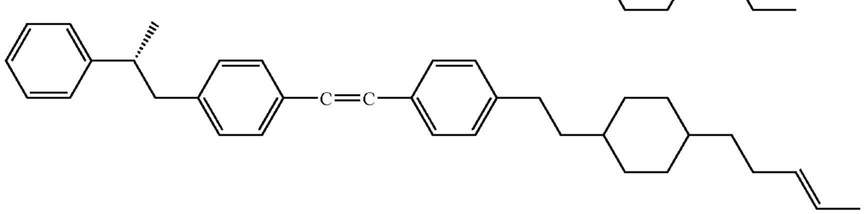
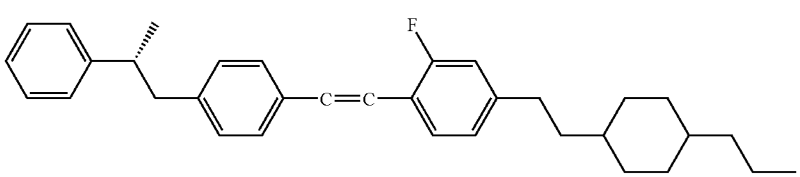

-continued
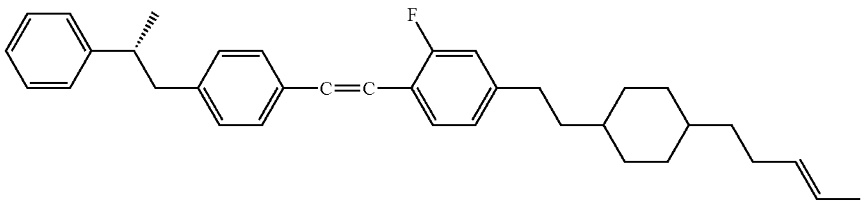
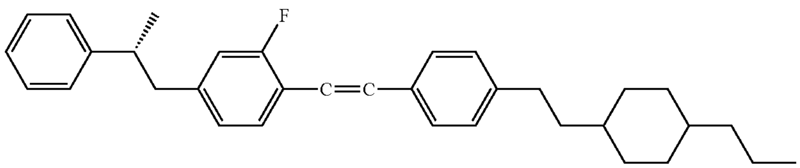
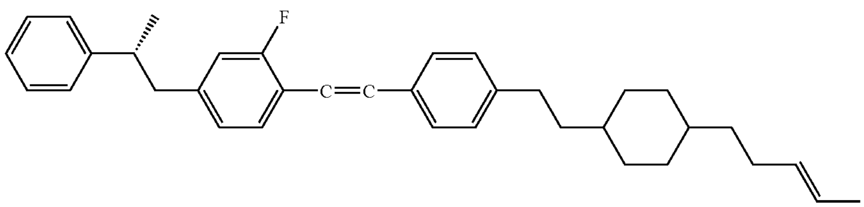
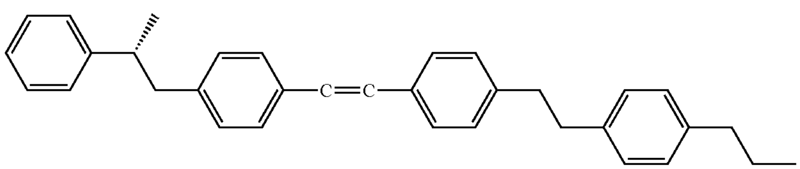
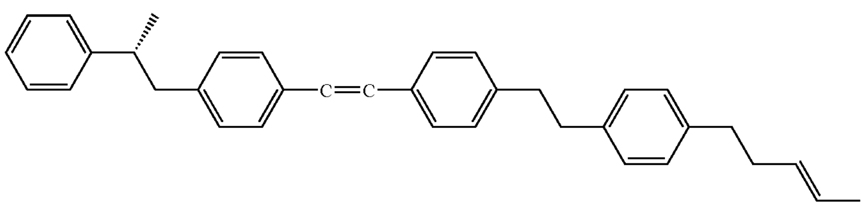
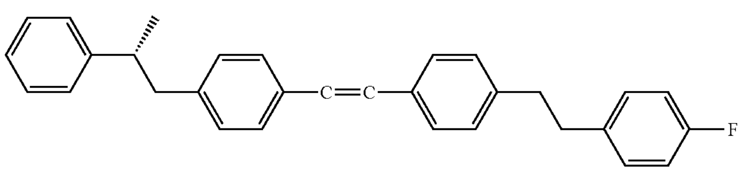
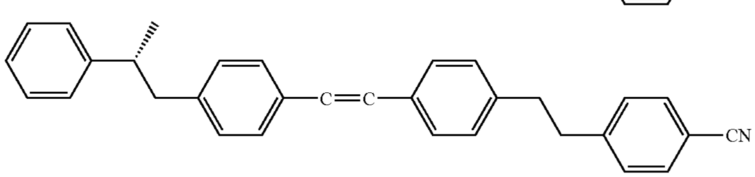
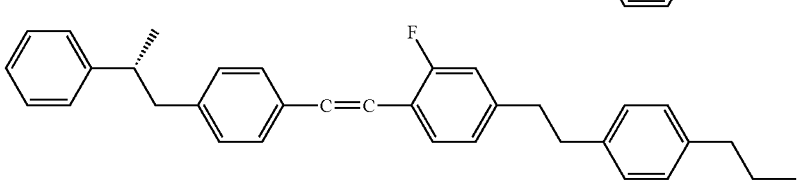
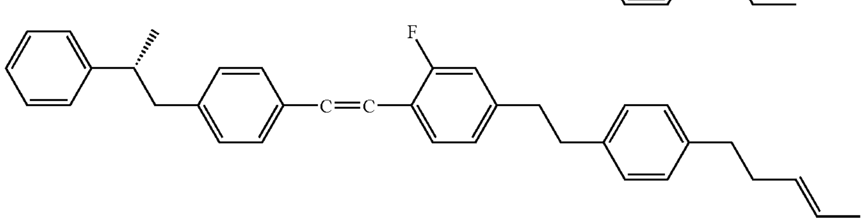

-continued
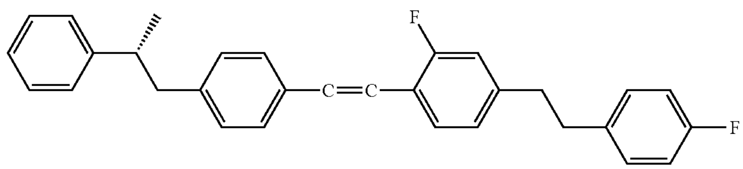
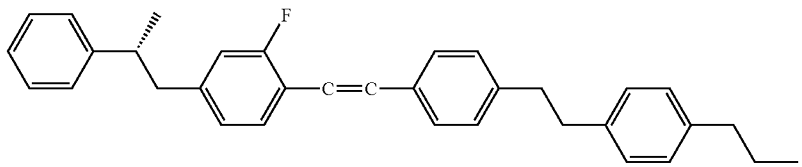
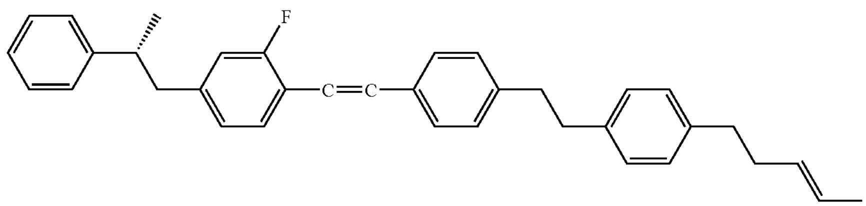
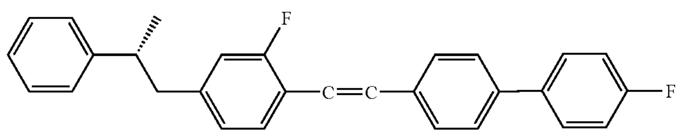
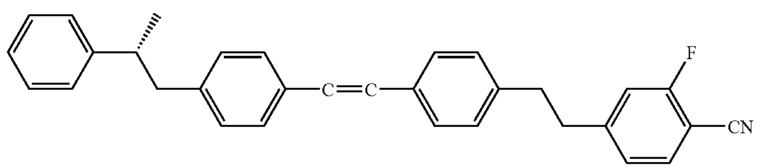
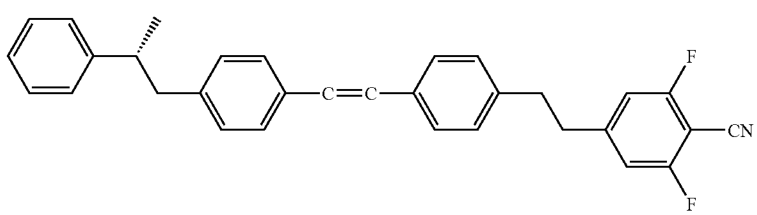
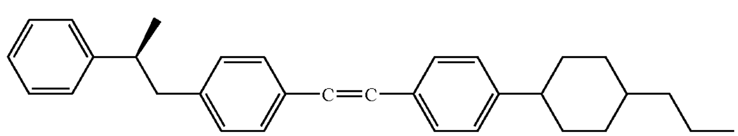
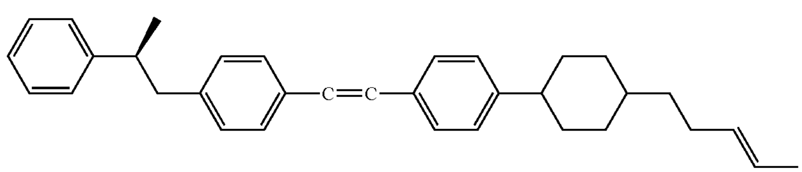
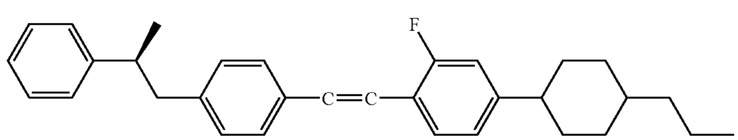
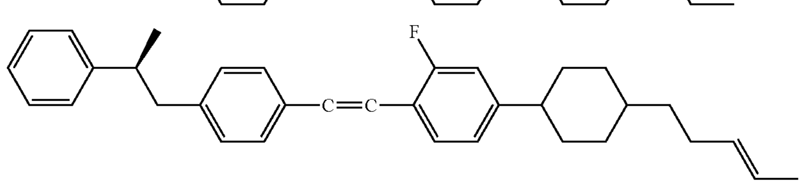

-continued
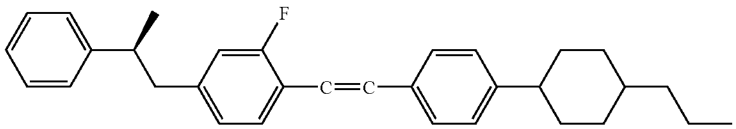
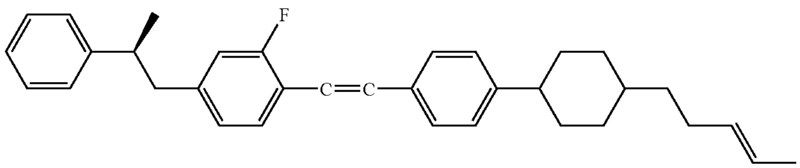
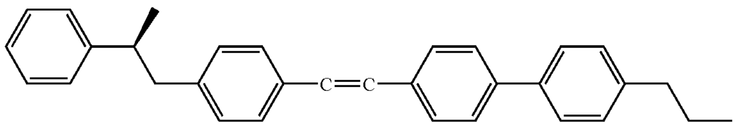
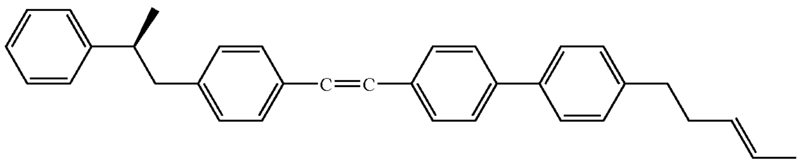
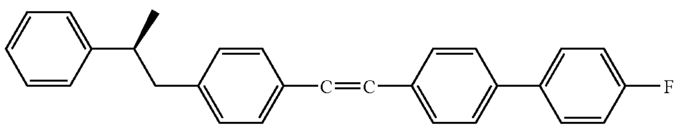
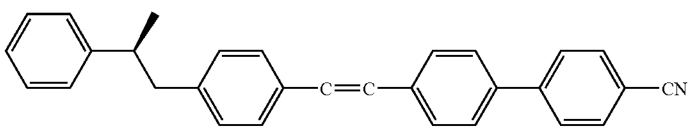
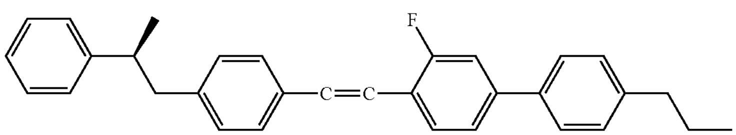
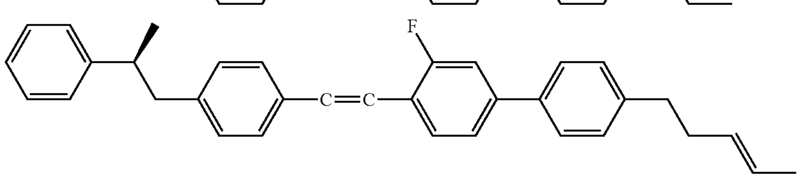
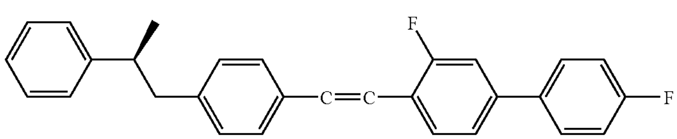
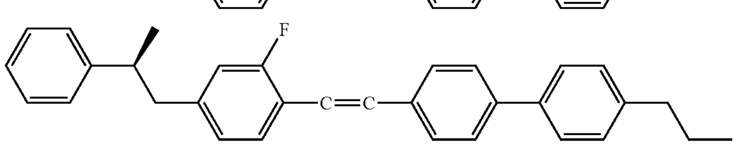
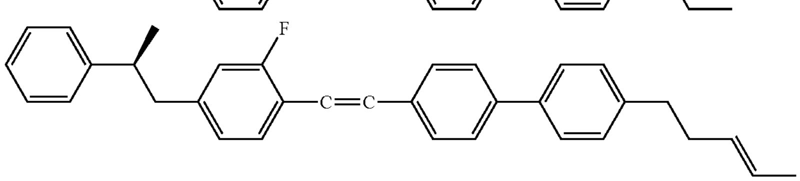
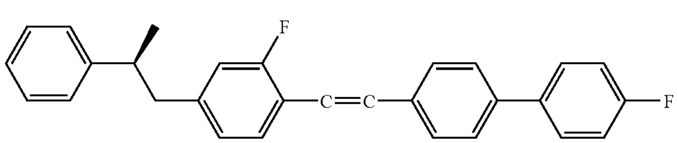

-continued
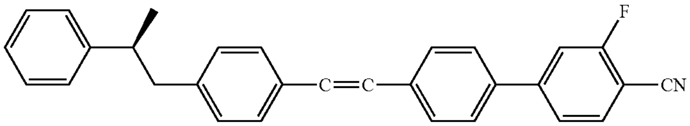
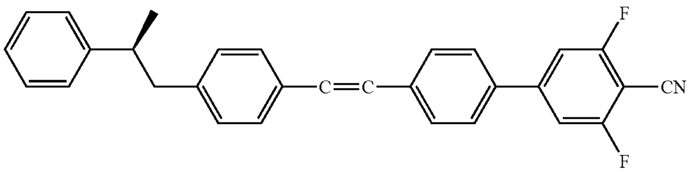
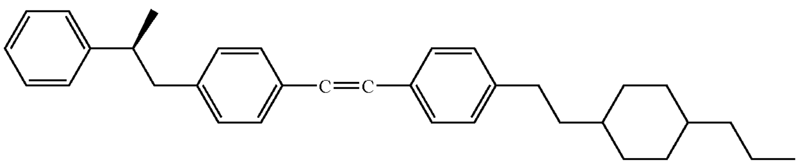
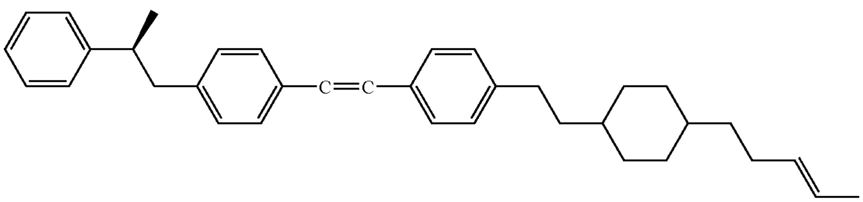
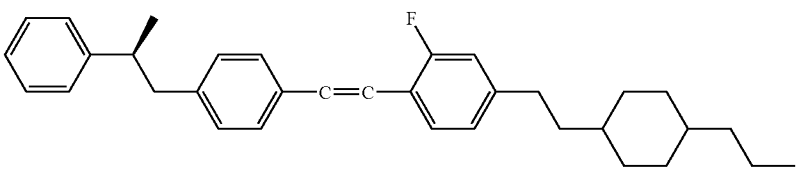
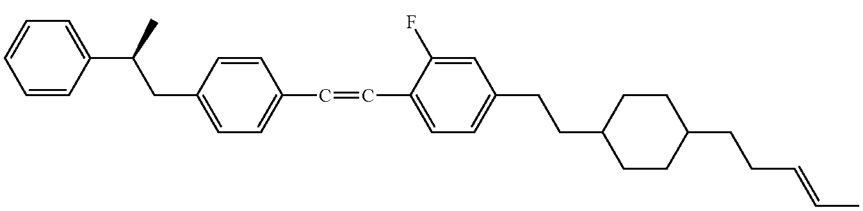
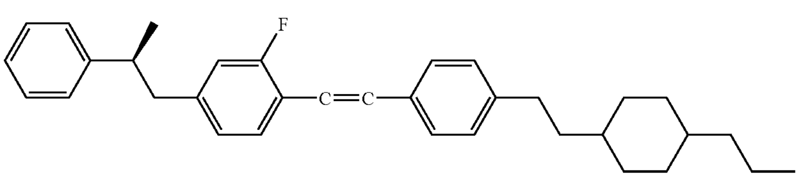
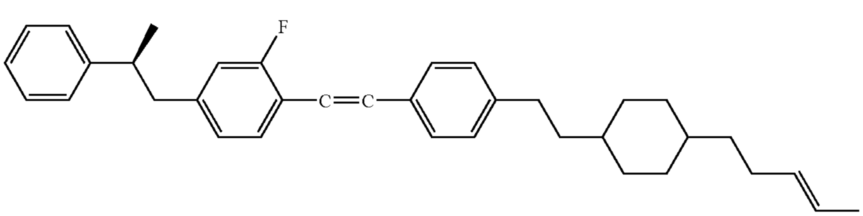
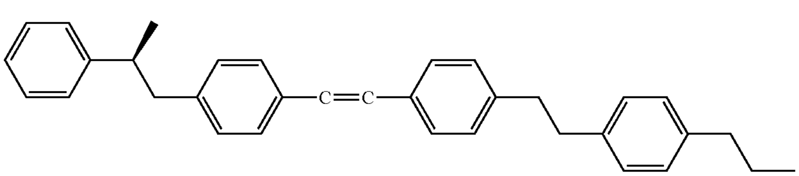

-continued
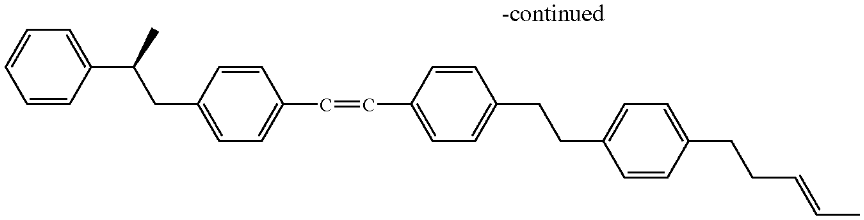
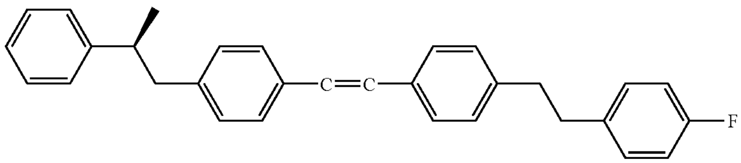
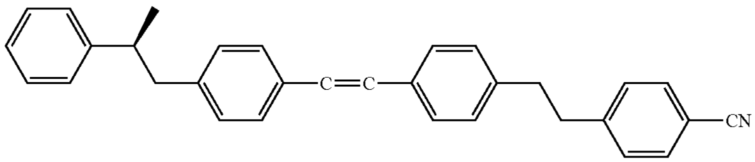
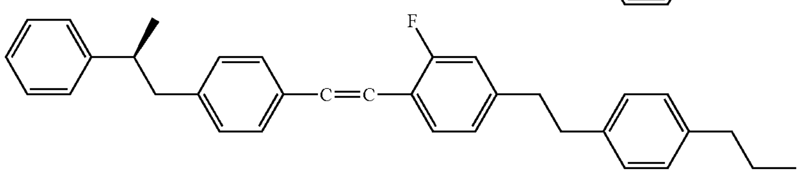
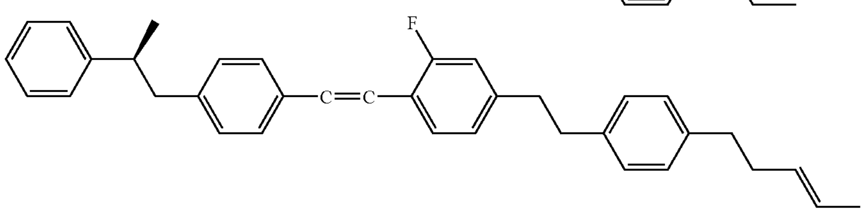
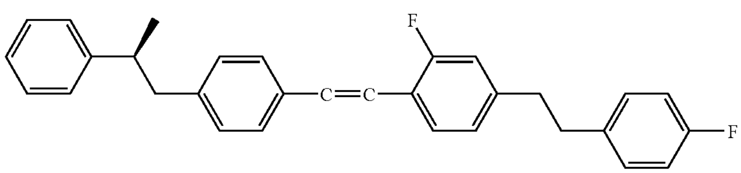
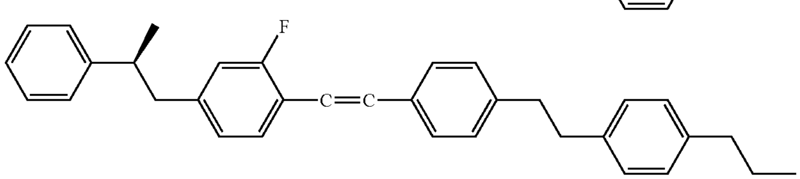
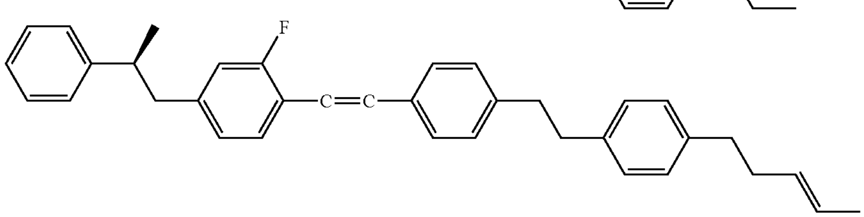
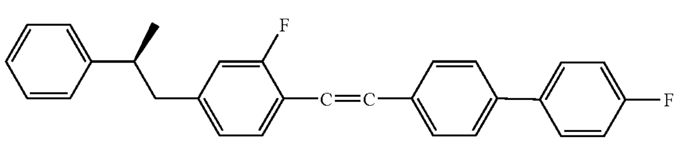
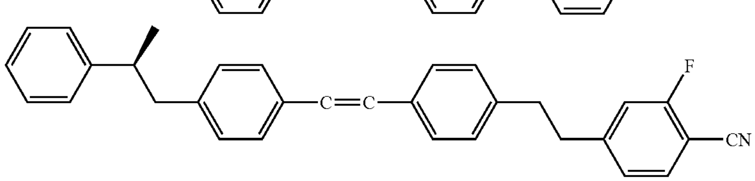

-continued
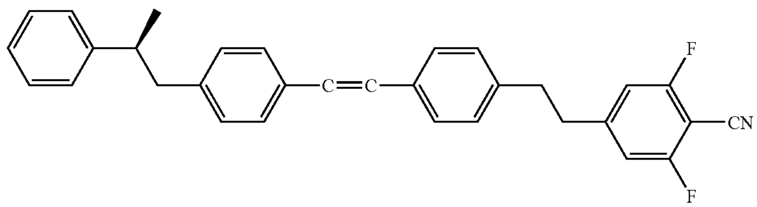
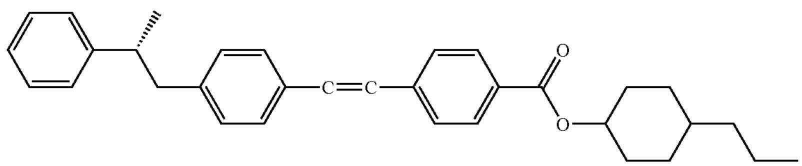
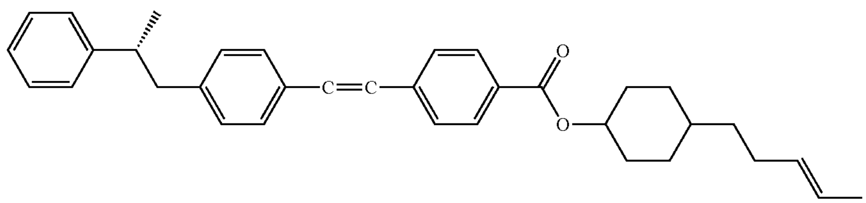
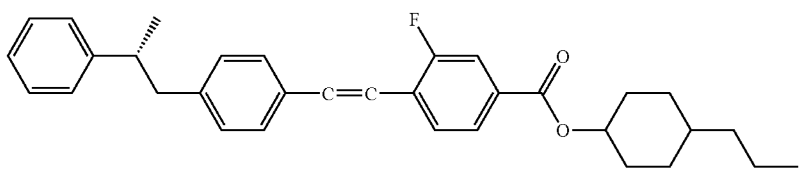
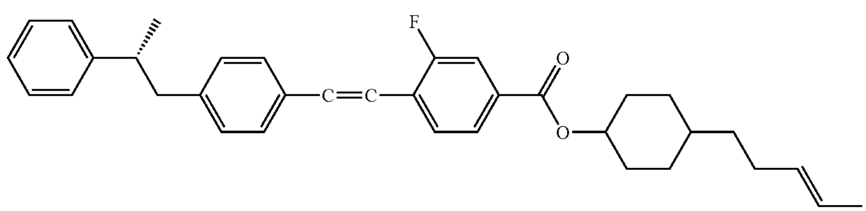
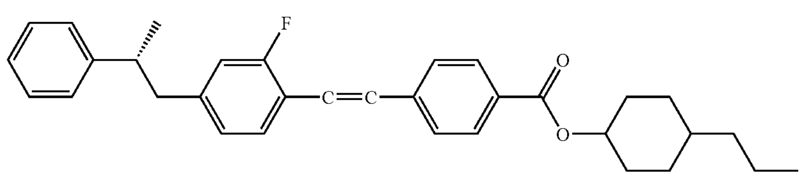
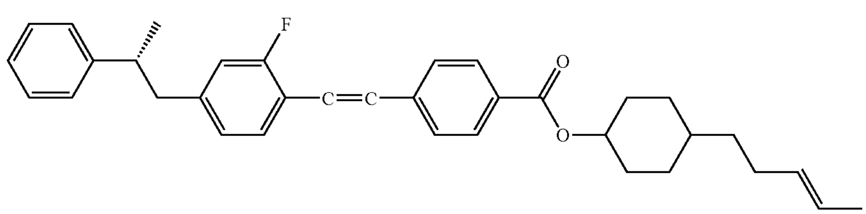
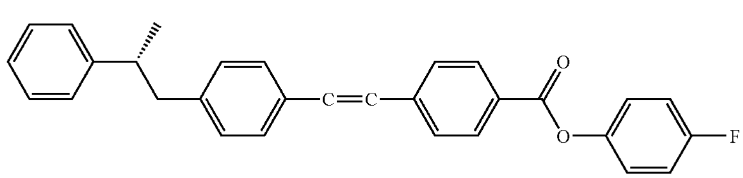
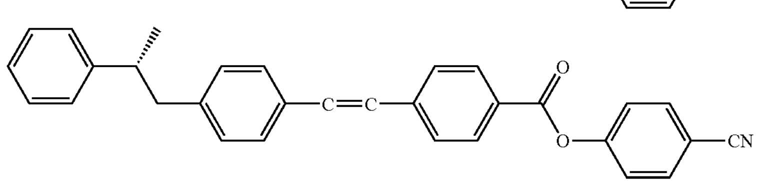

-continued
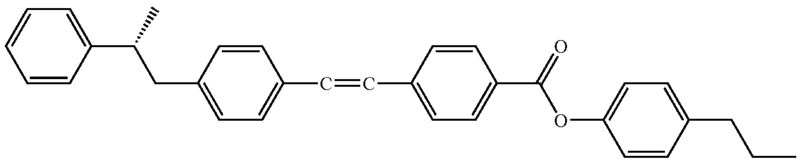
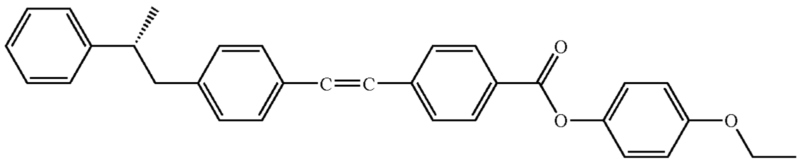
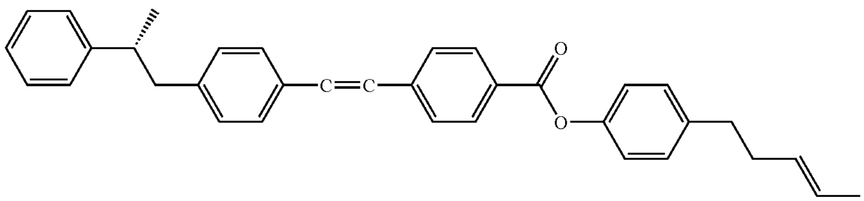
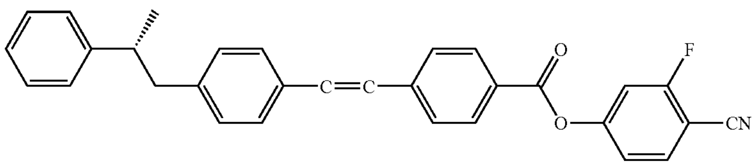
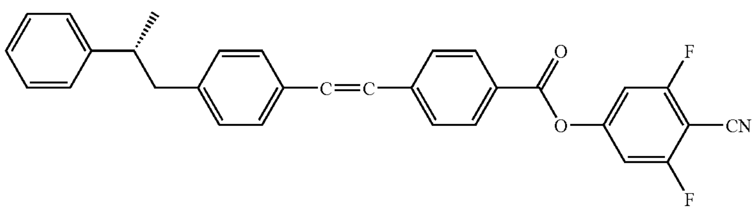
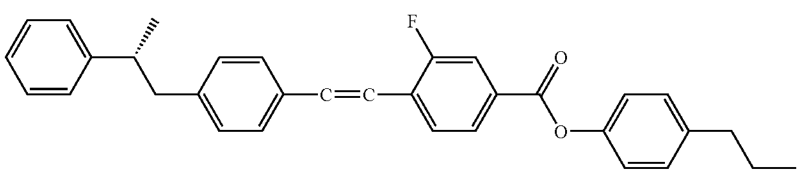
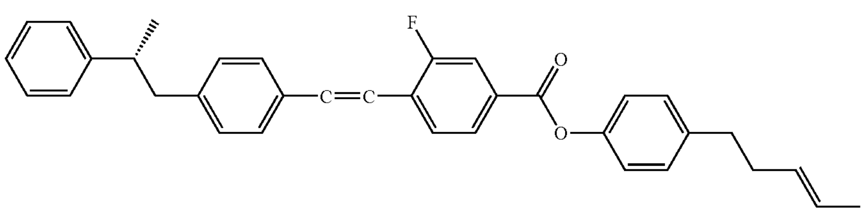
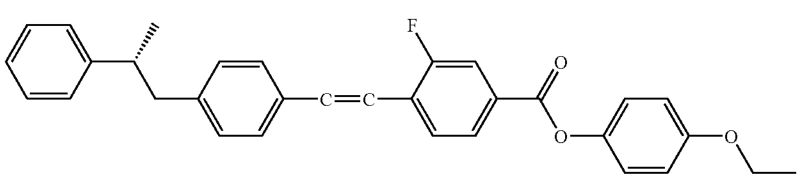
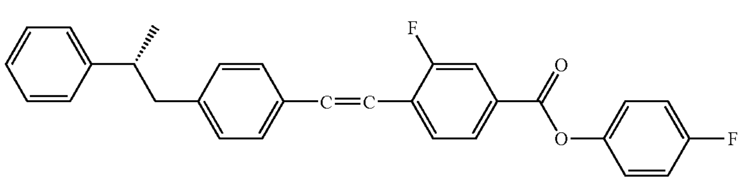

-continued
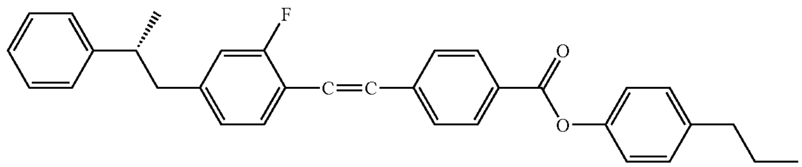
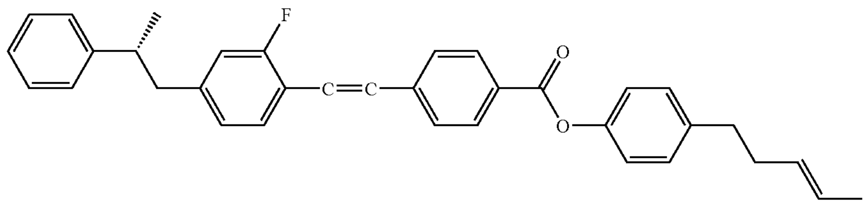
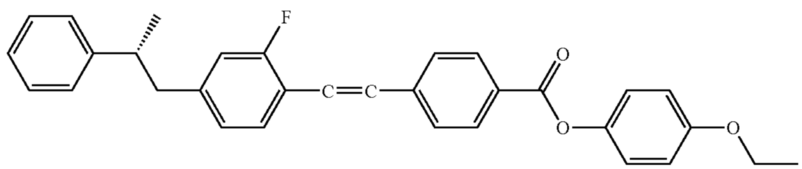
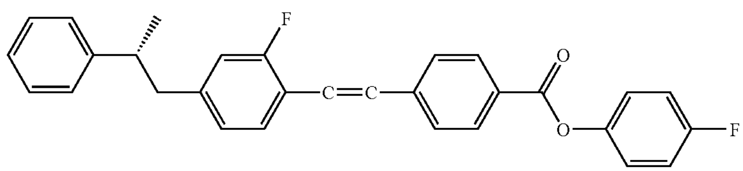
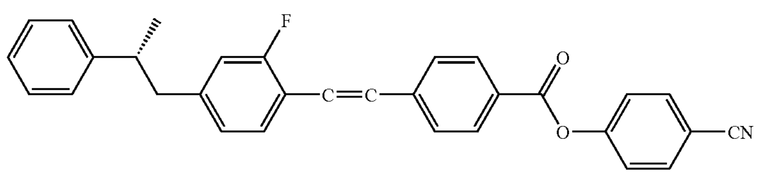
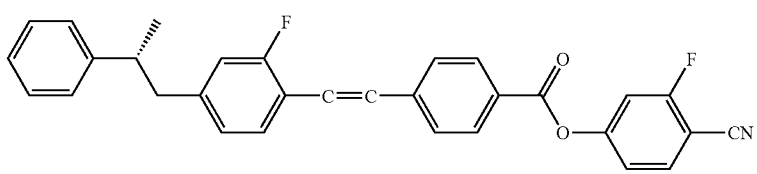
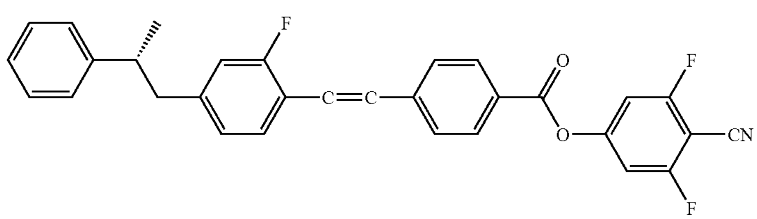
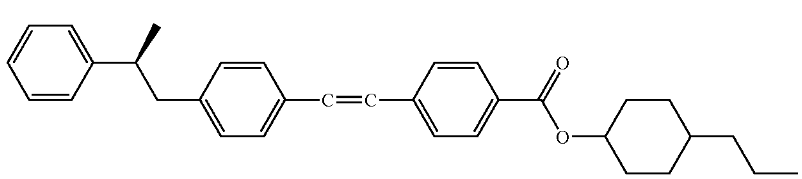
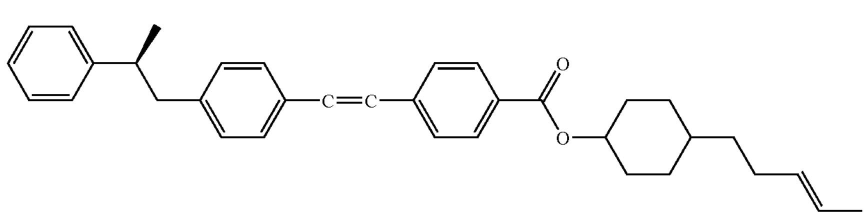

-continued
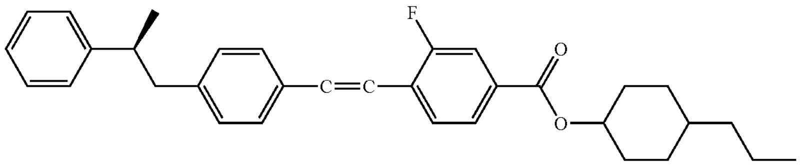
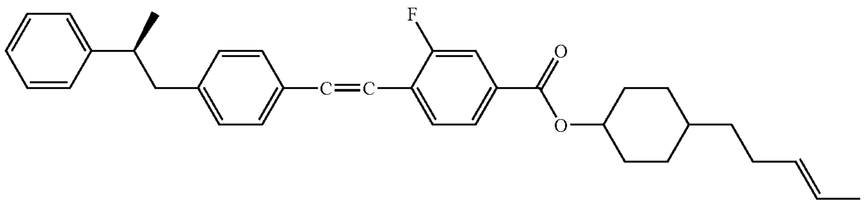
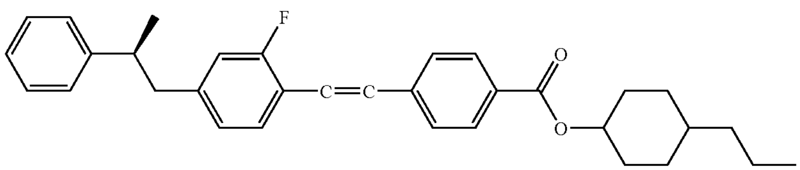
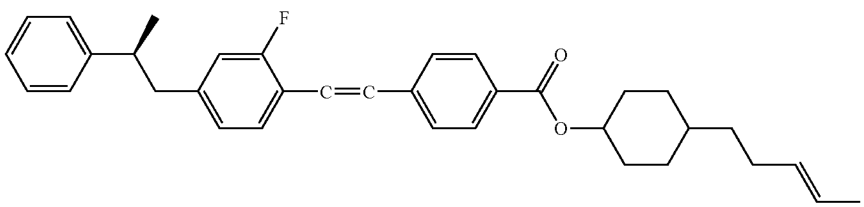
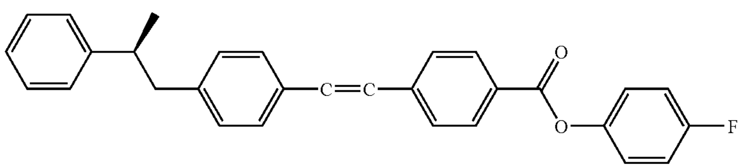
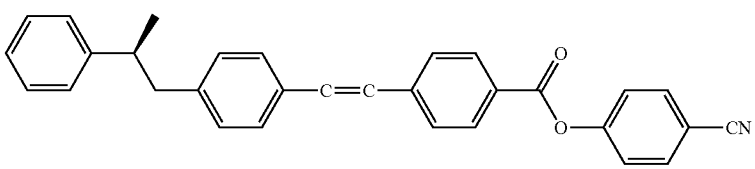
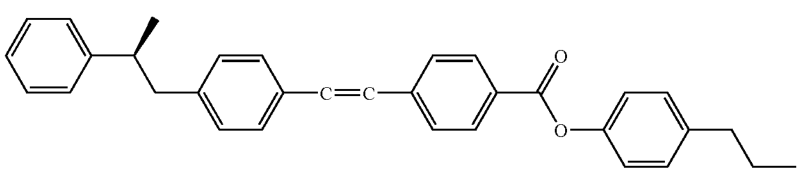
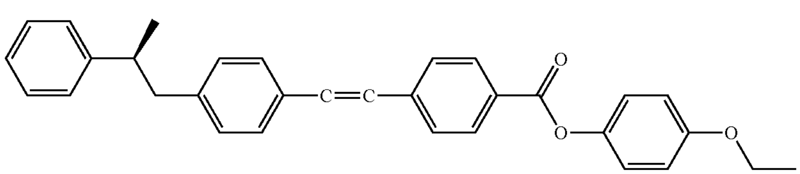
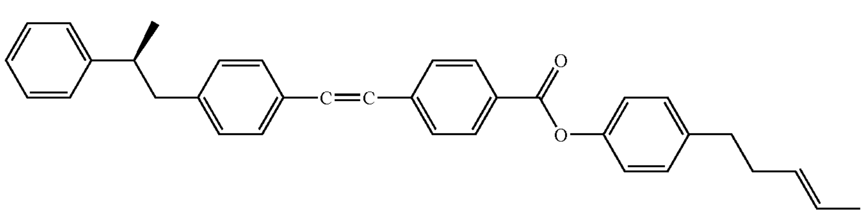

-continued
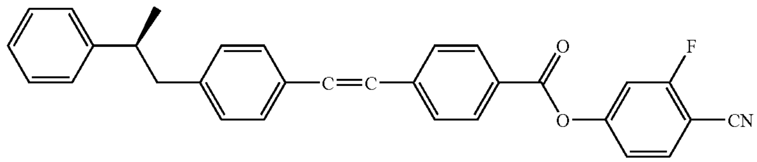
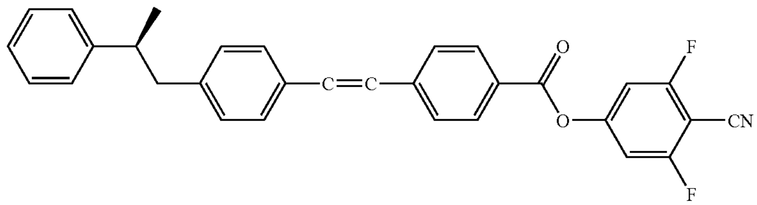
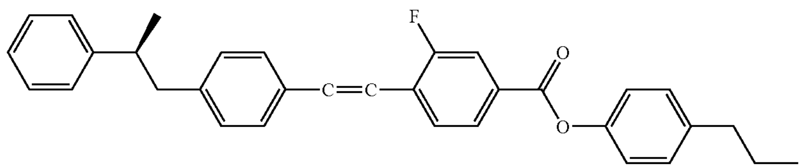
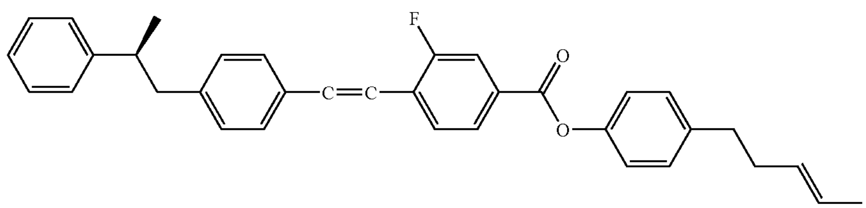
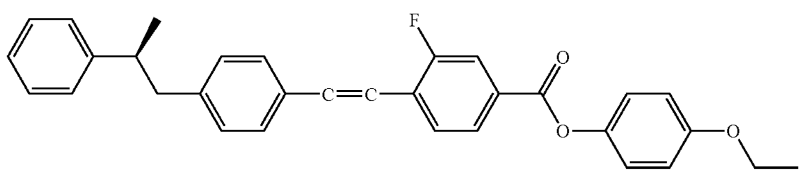
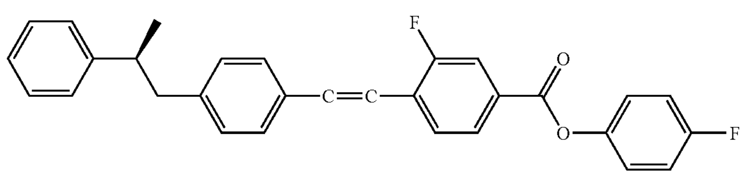
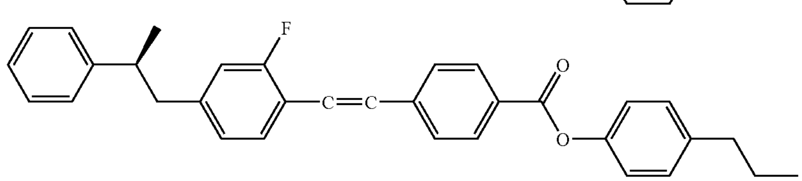
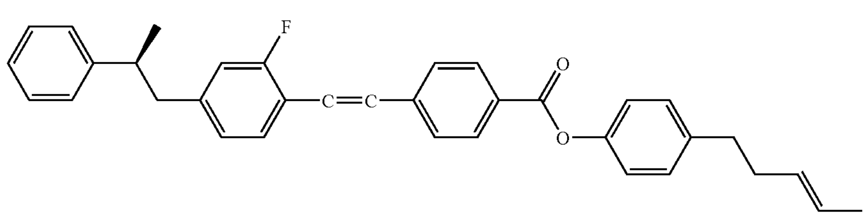
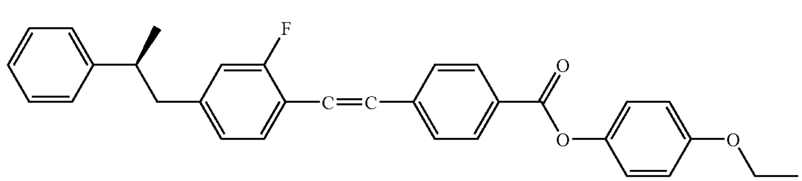

-continued
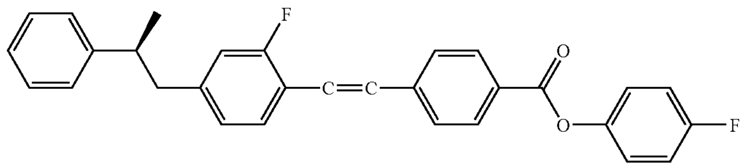
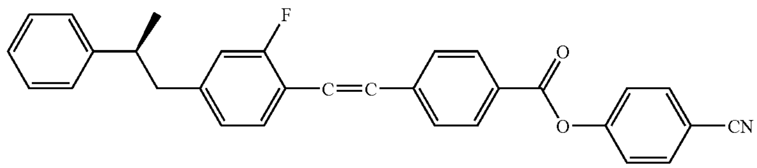
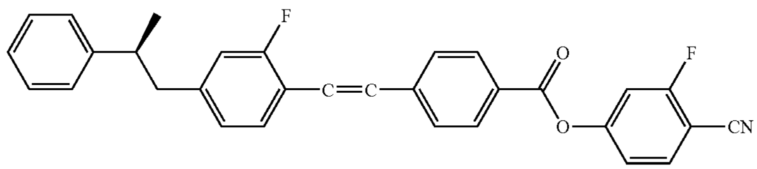
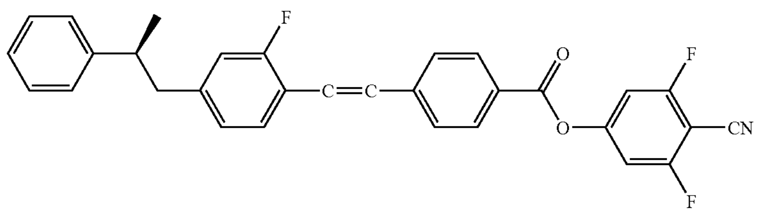
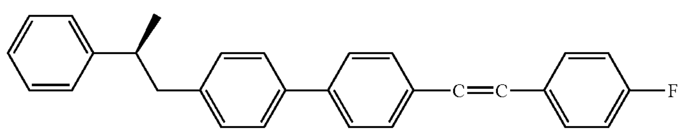
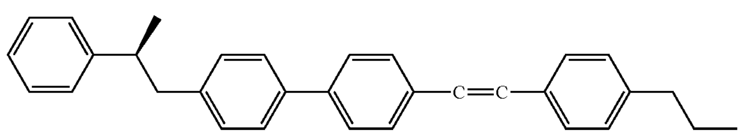
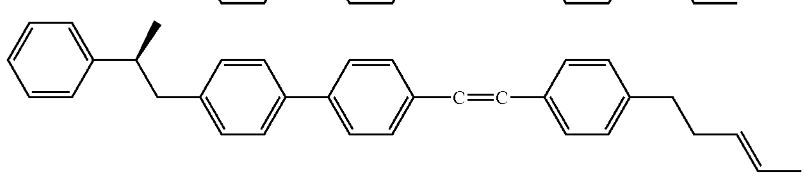
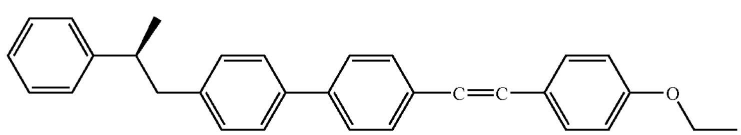
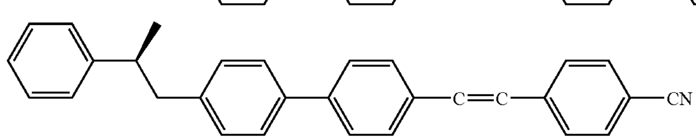
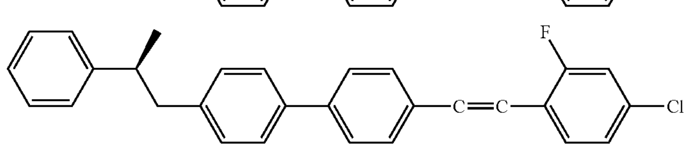
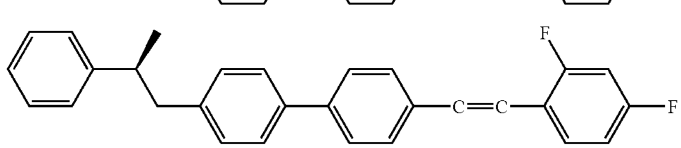

-continued
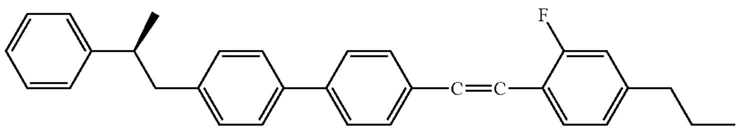
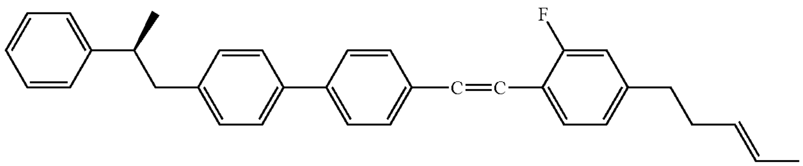
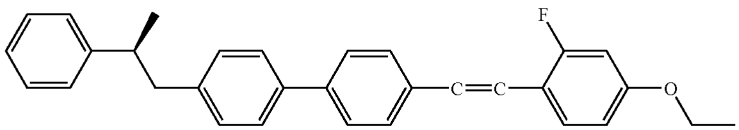
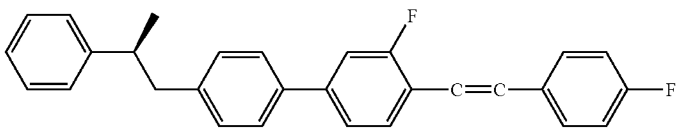
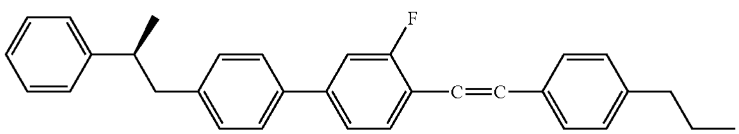
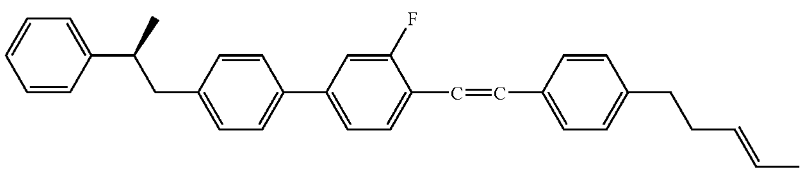
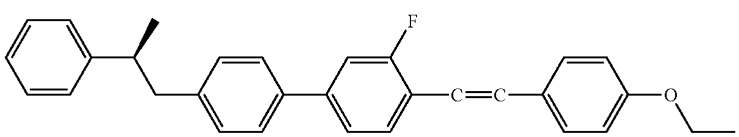
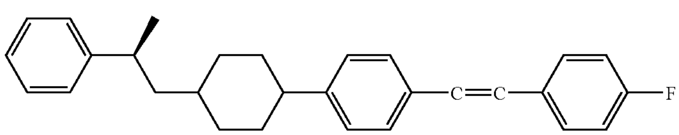
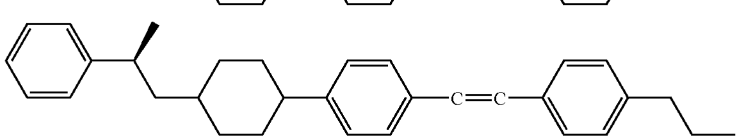
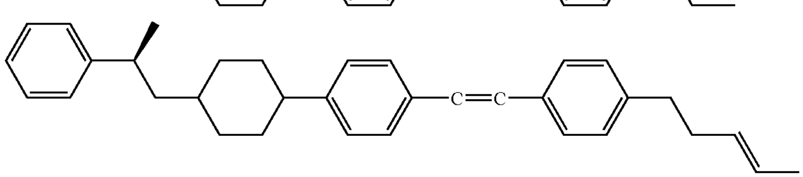
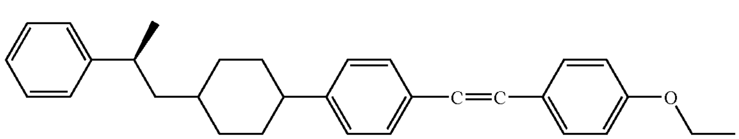
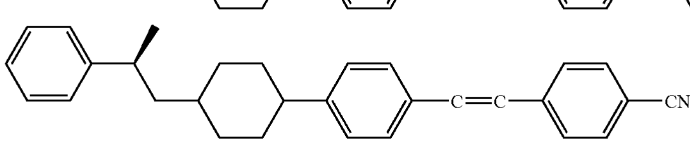

-continued
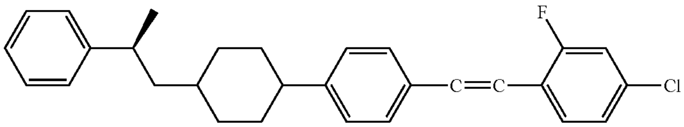
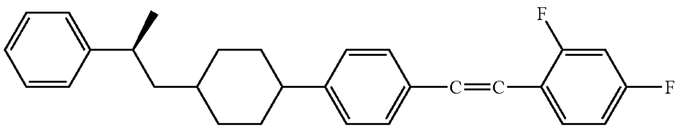
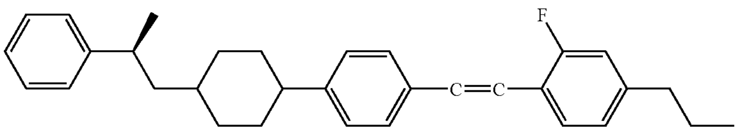
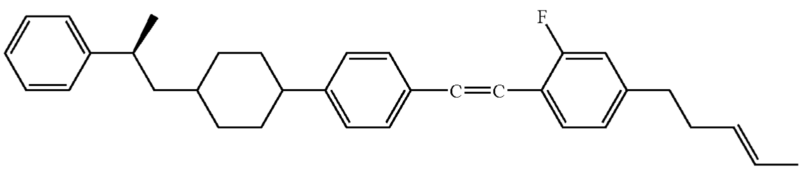
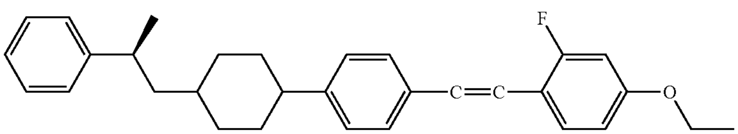
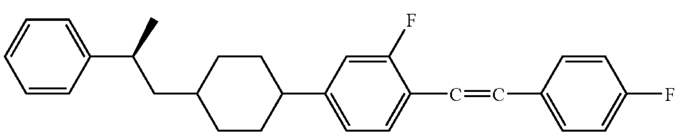
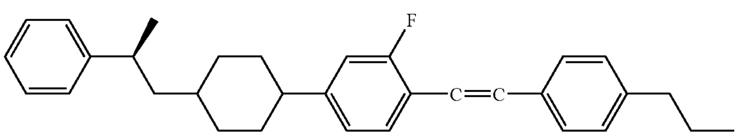
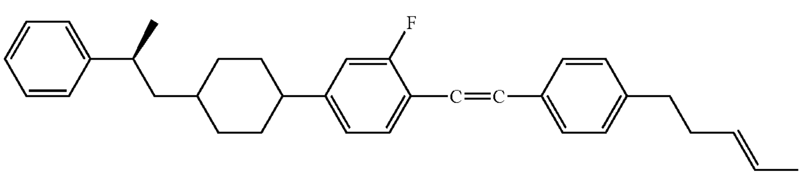
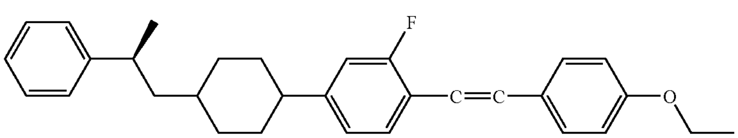
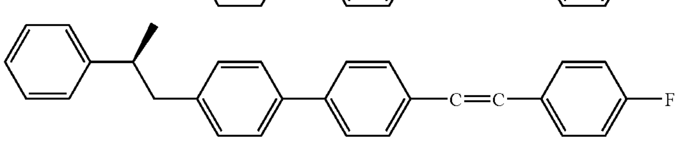
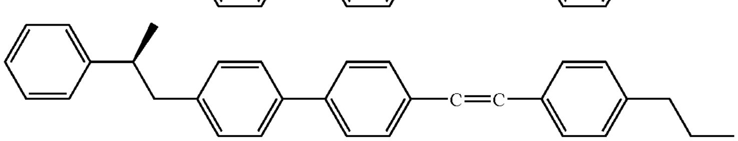
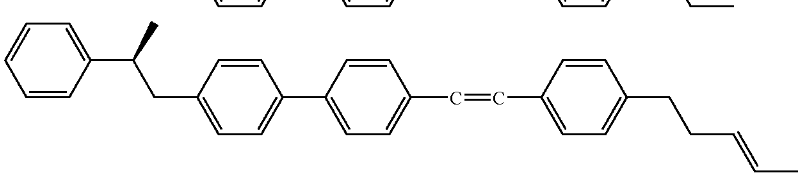

-continued
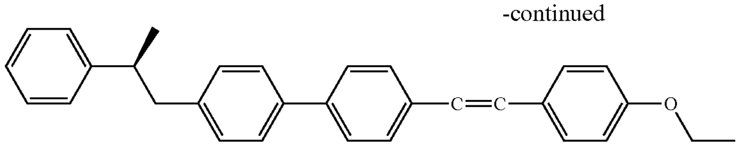
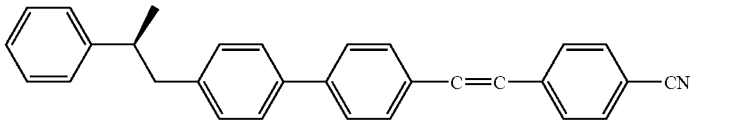
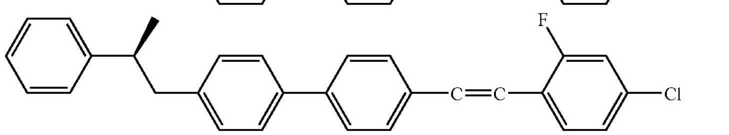
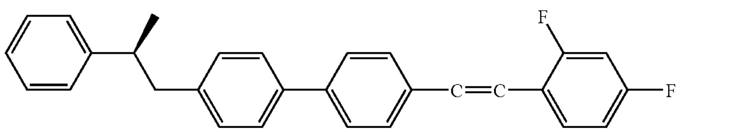
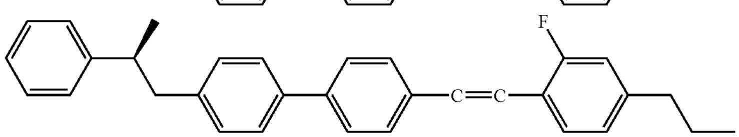
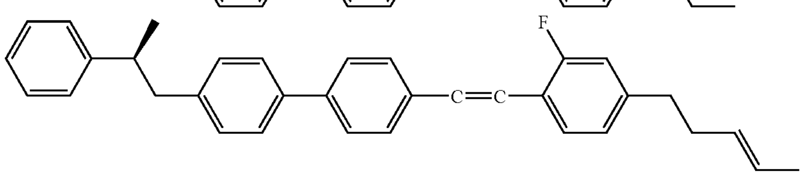
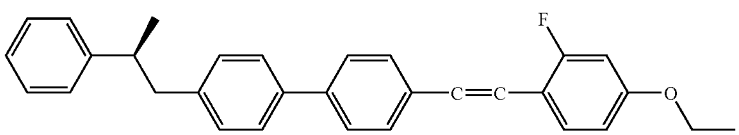
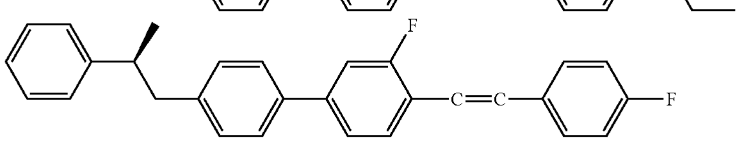
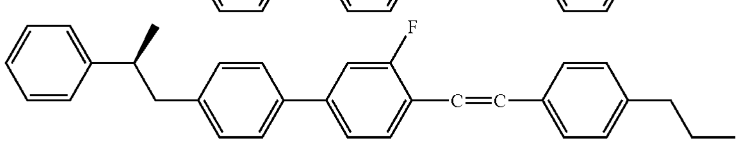
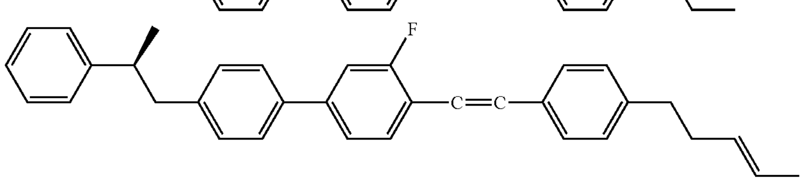
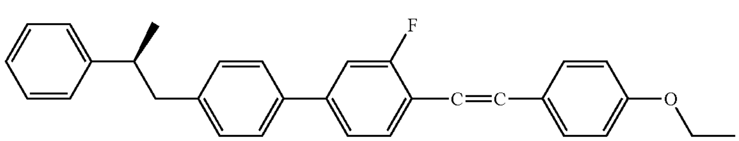
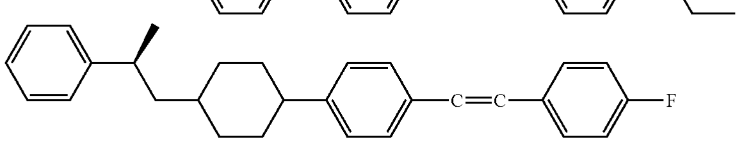
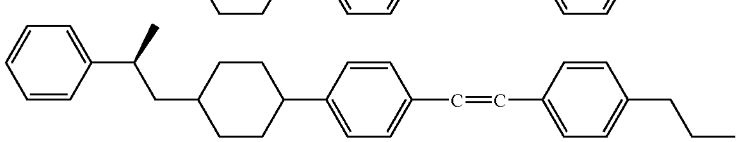

-continued
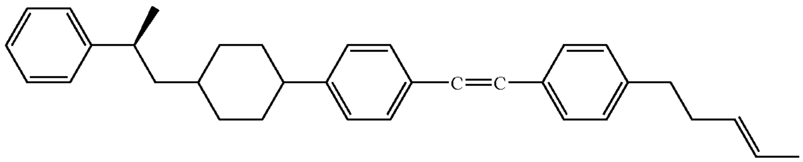
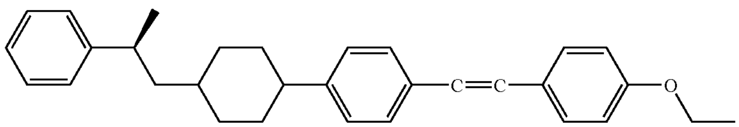
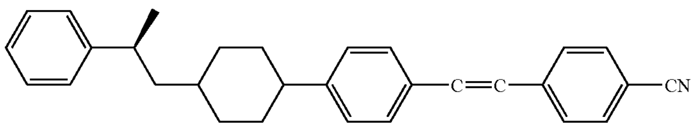
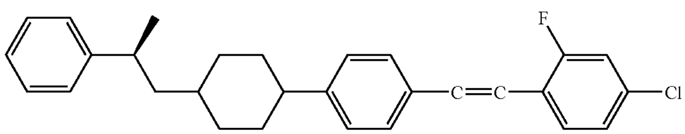
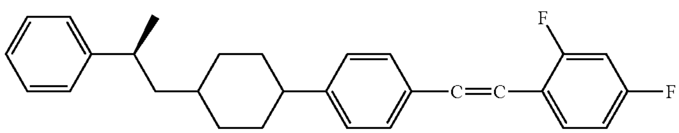
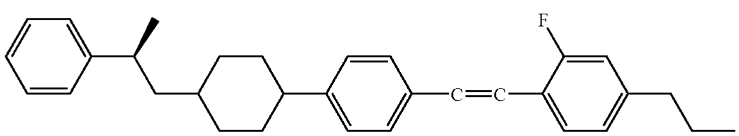
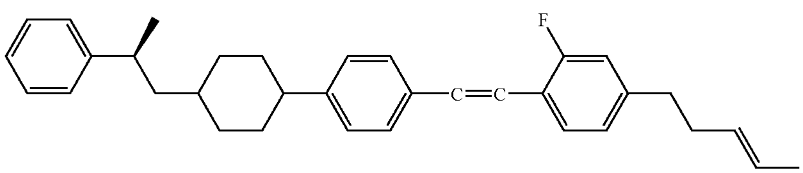
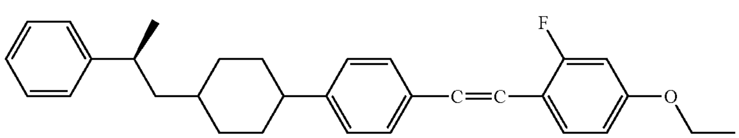
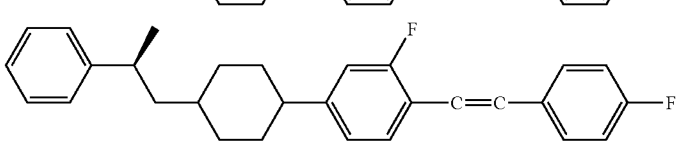
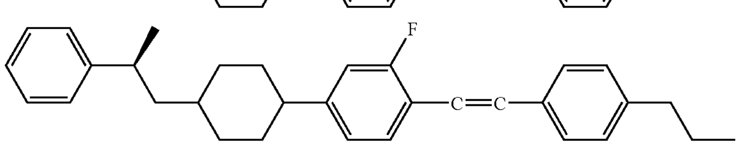
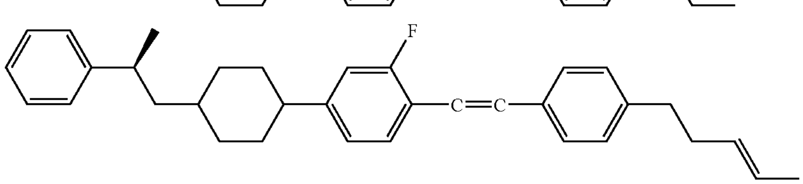
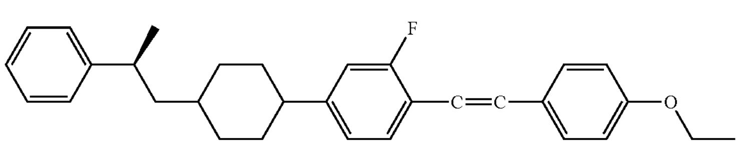

-continued
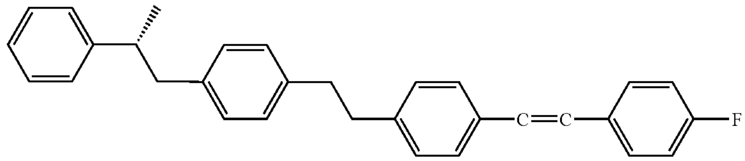
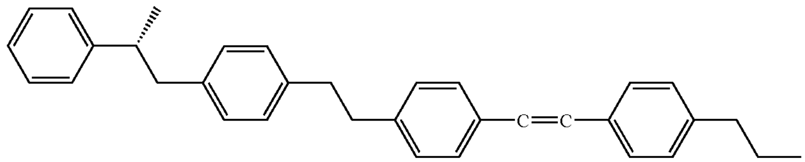
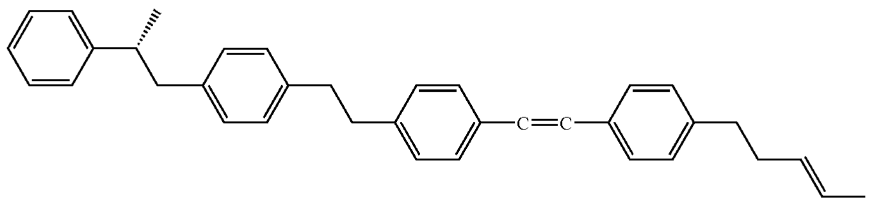
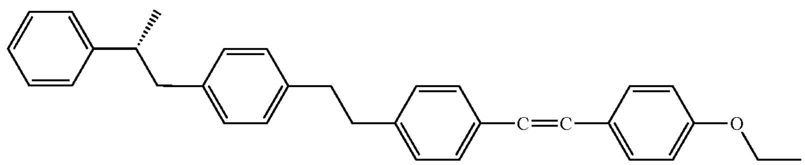
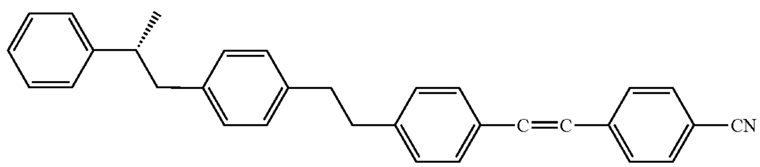
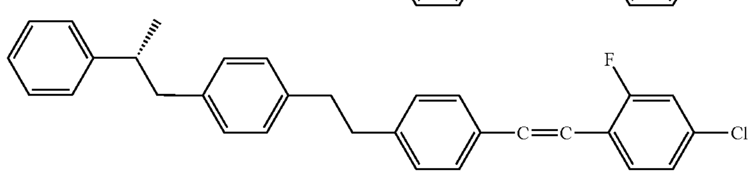
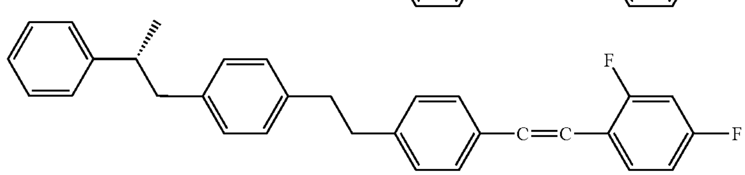
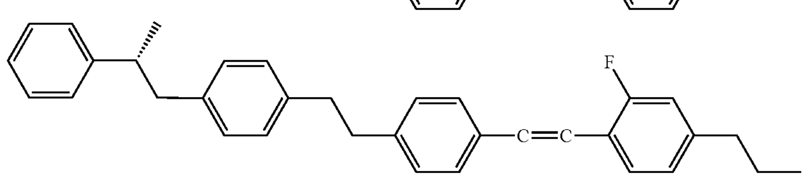
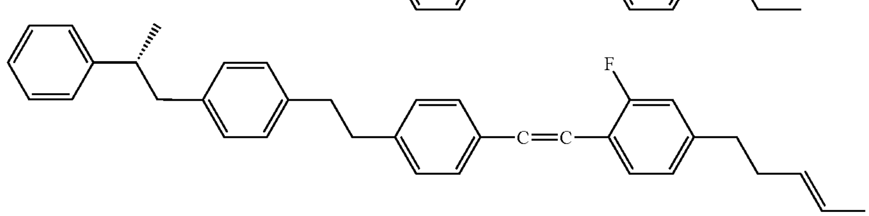
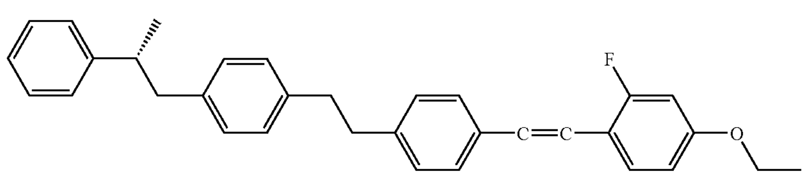

-continued
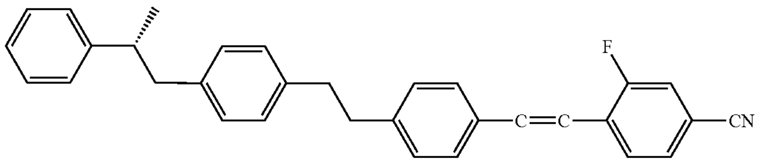
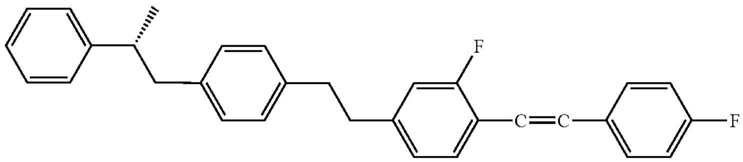
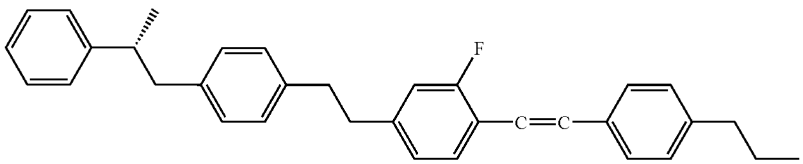
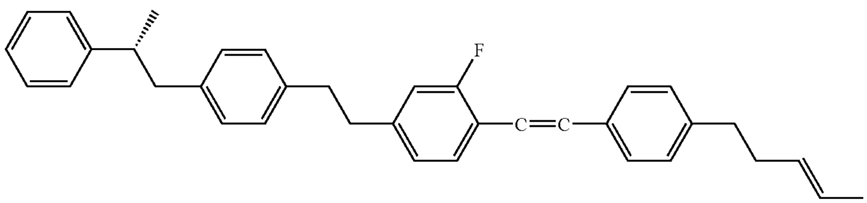
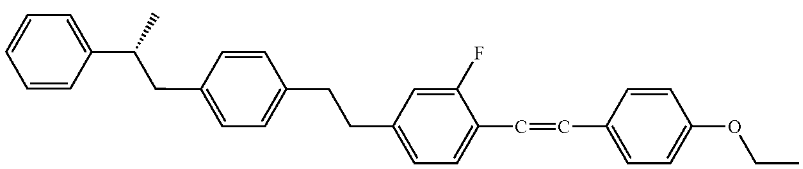
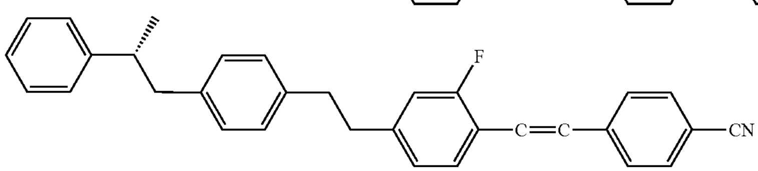
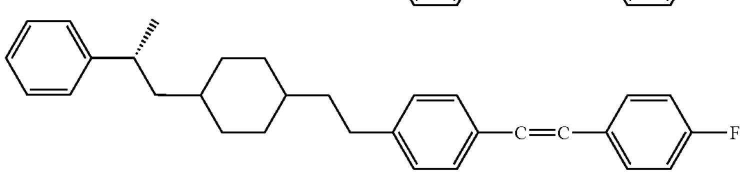
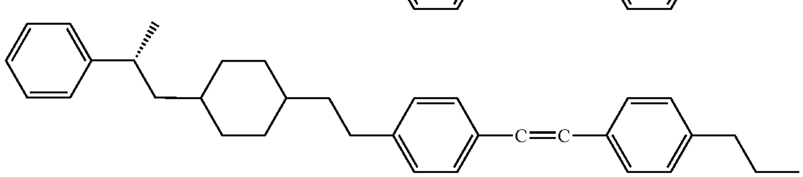
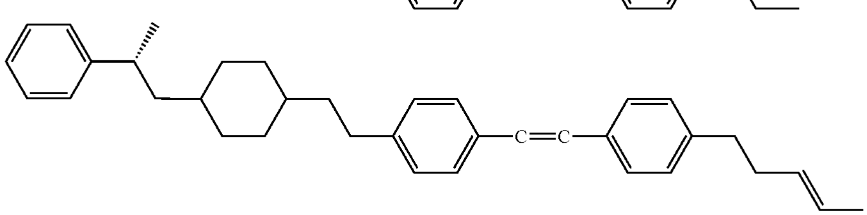
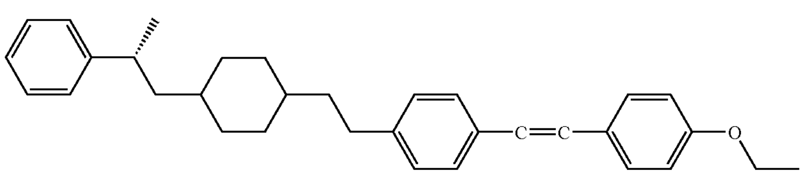

-continued
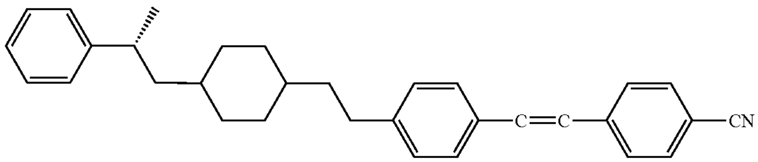
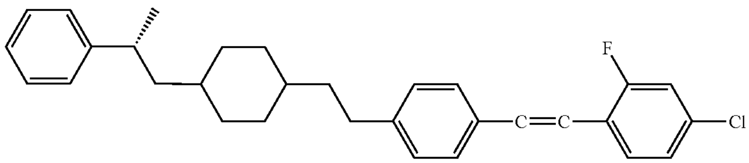
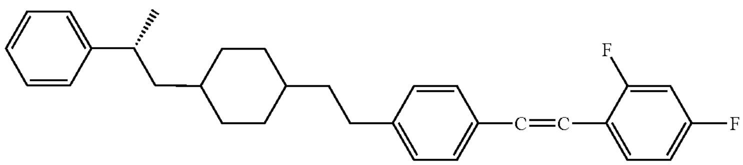
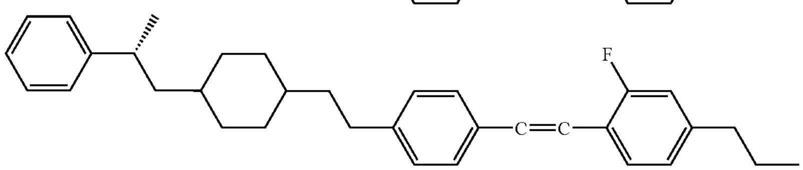
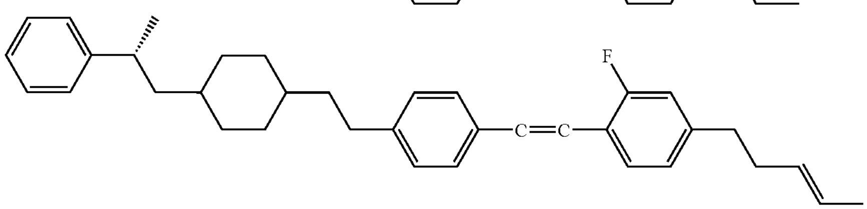
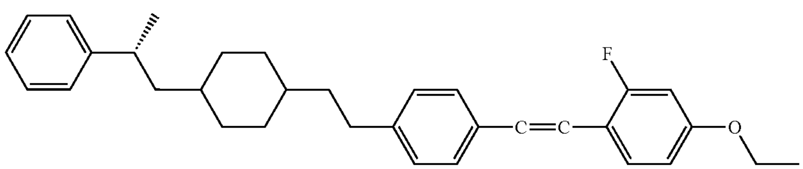
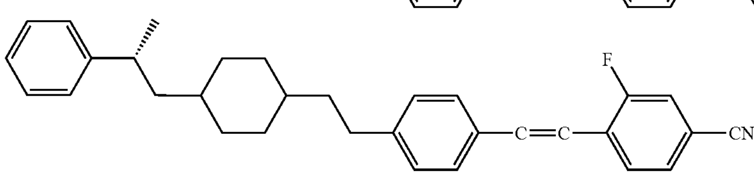
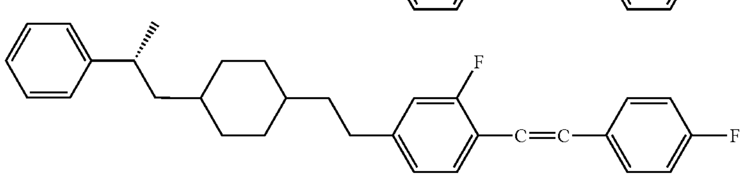
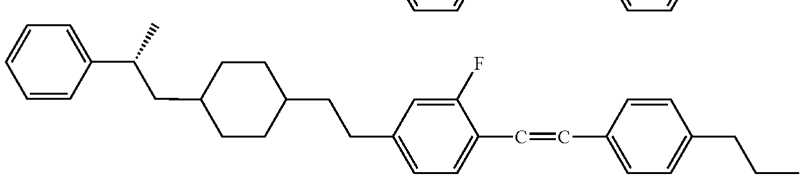
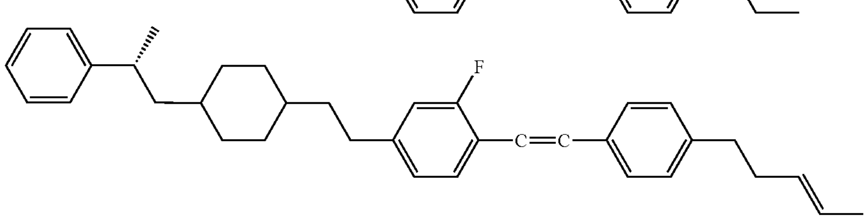

-continued
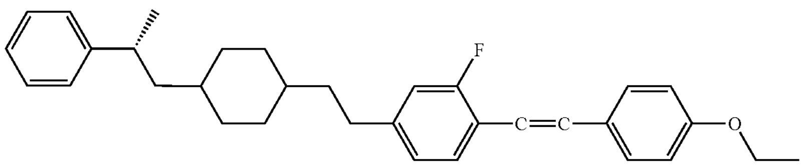
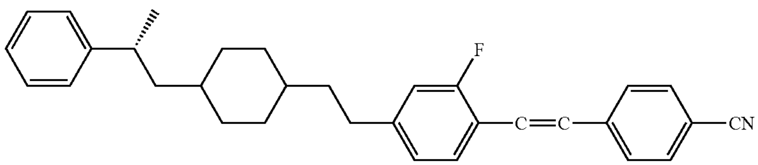
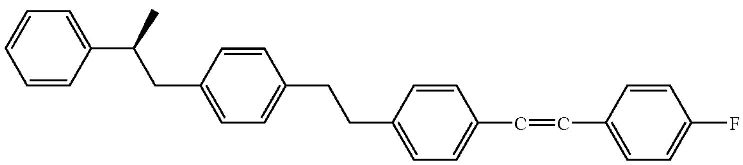
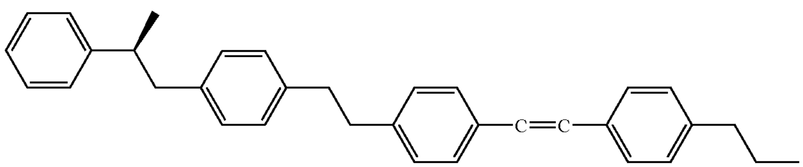
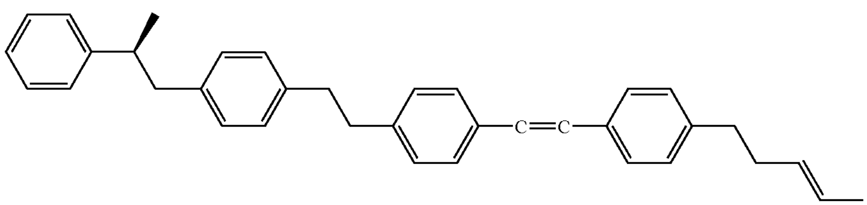
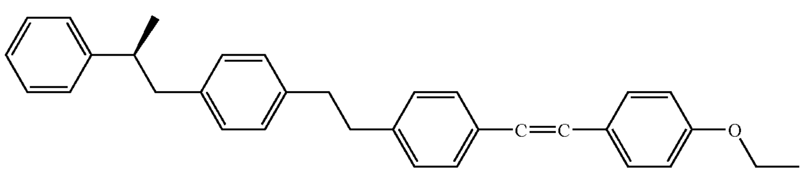
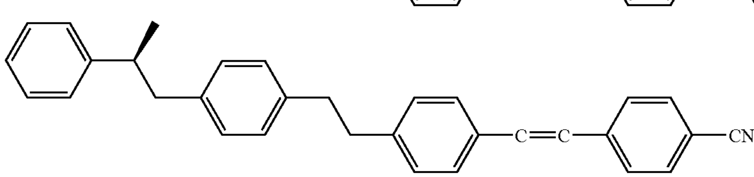
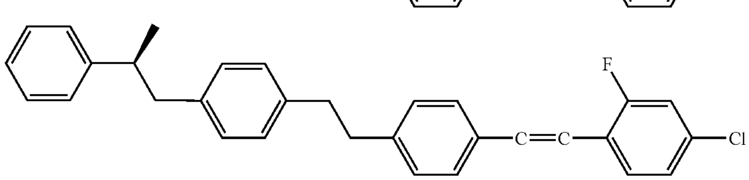
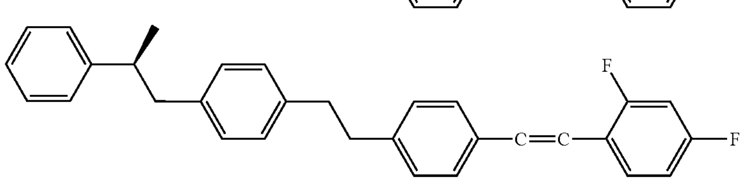
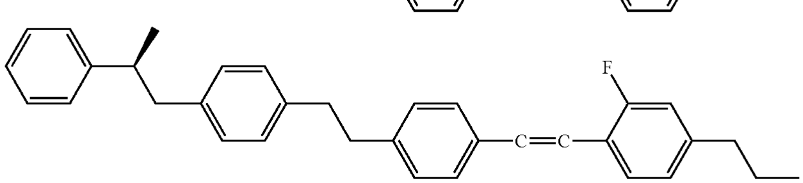

-continued
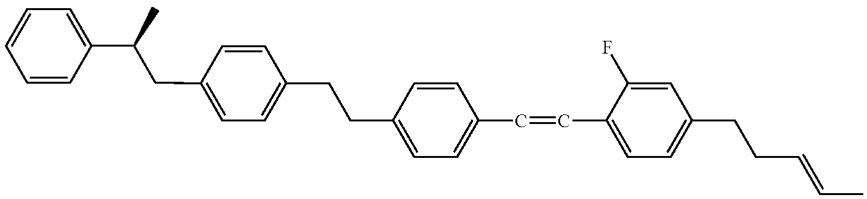
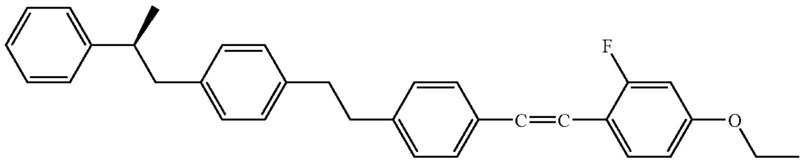
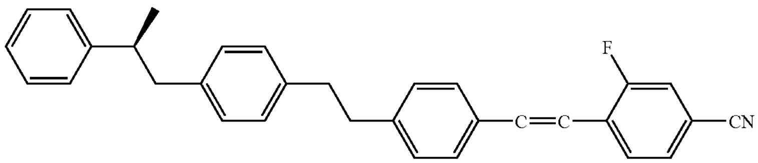
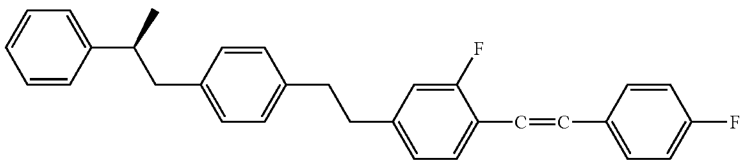
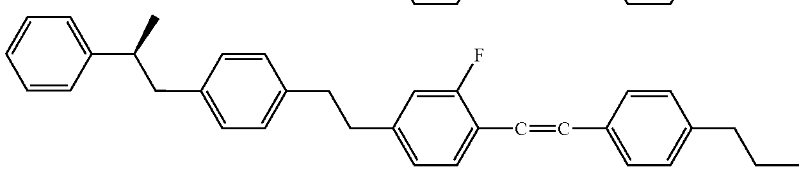
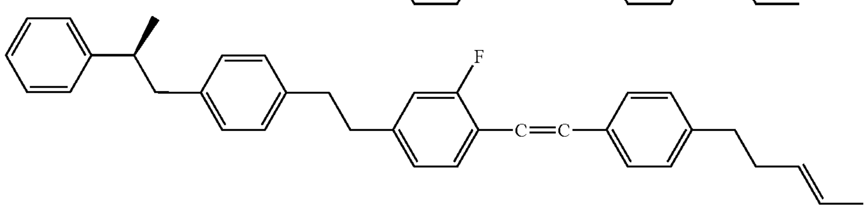
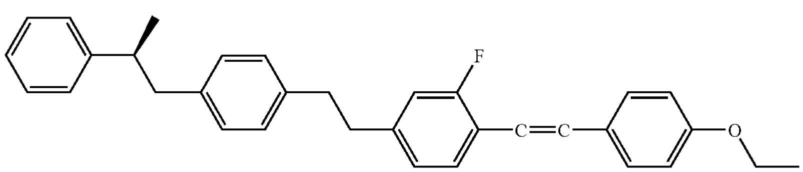
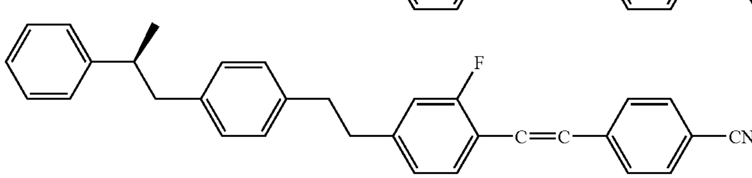
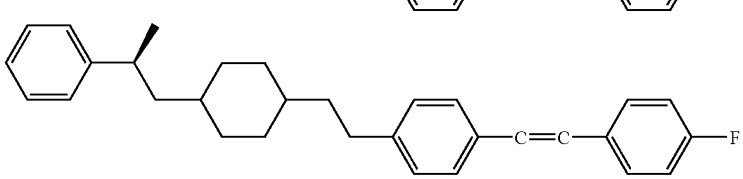
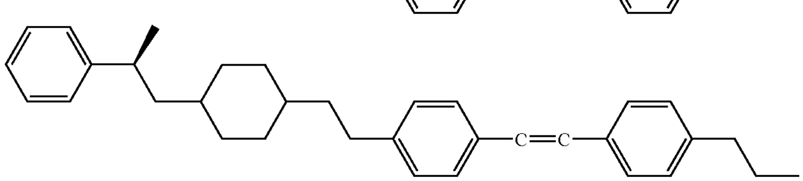

-continued
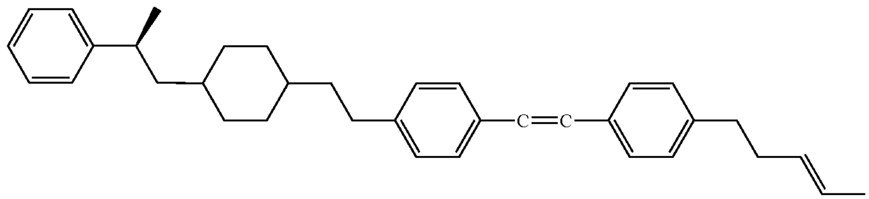
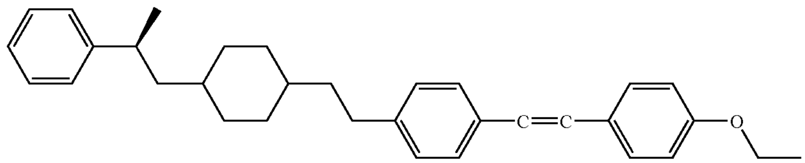
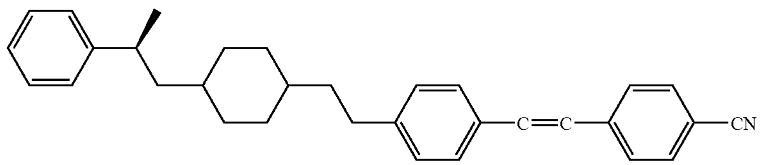
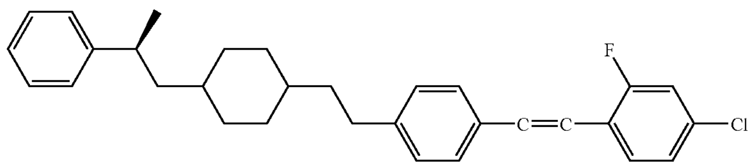
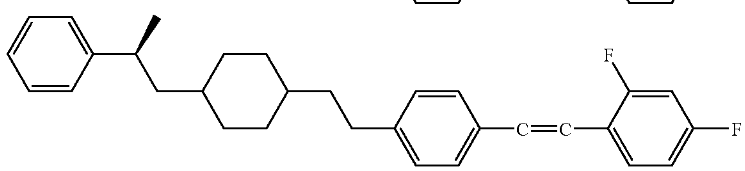
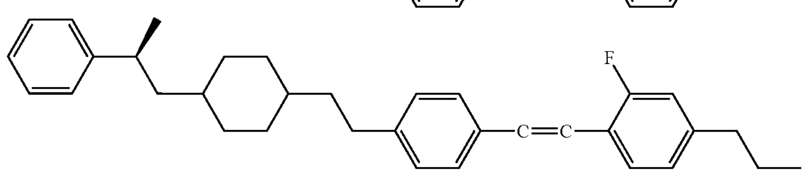
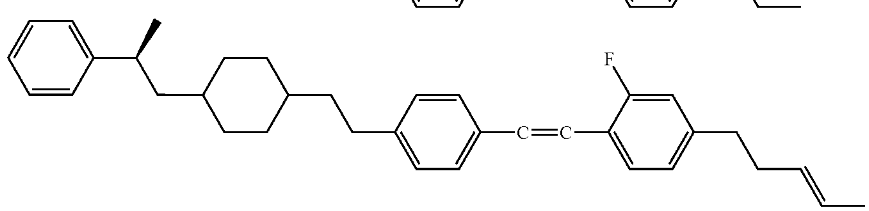
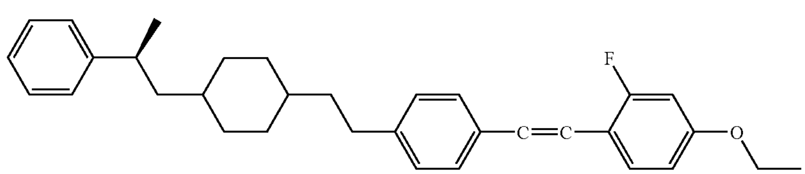
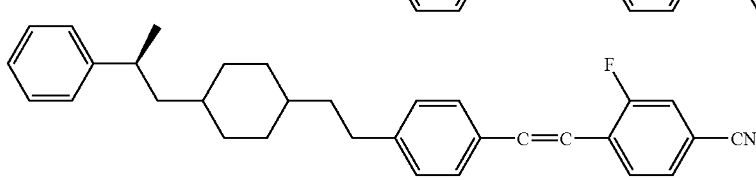
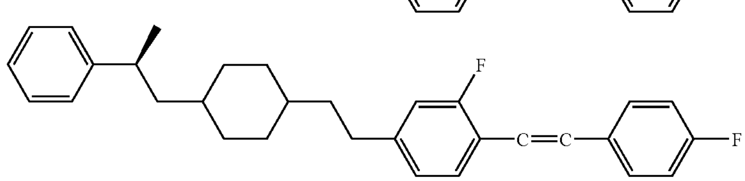

-continued
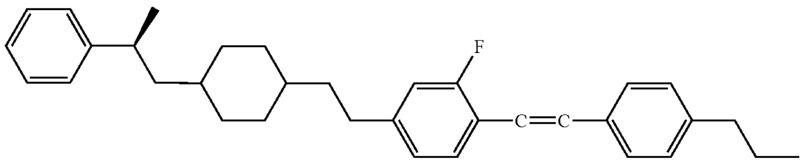
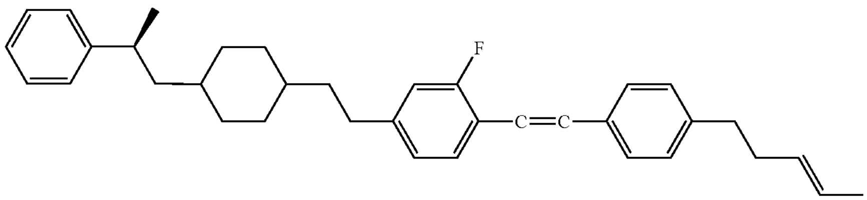
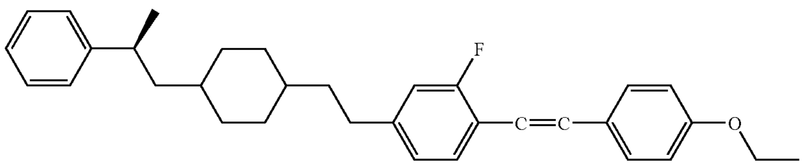
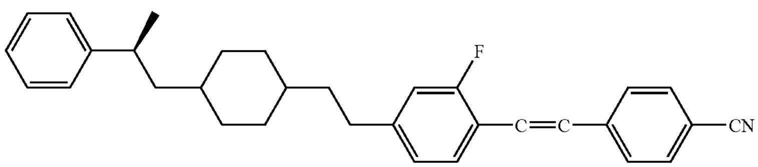
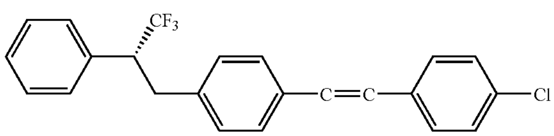
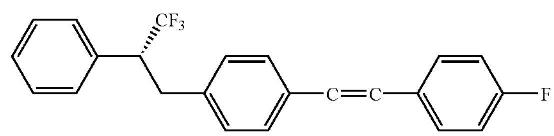
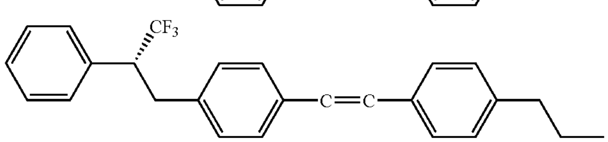
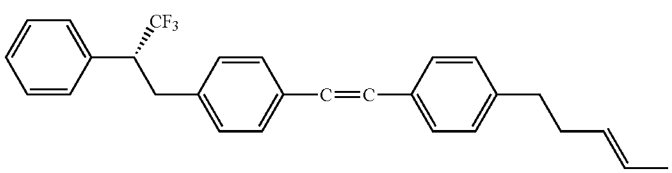
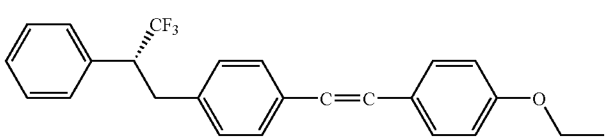
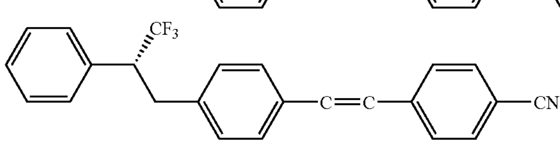
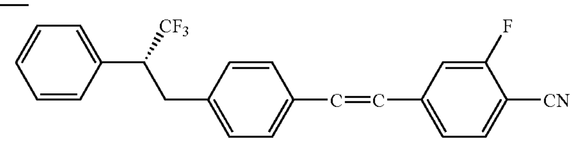
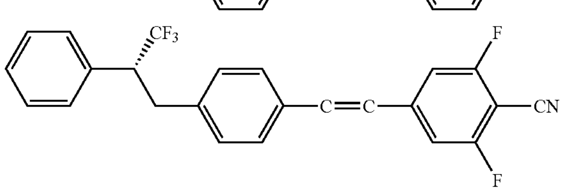
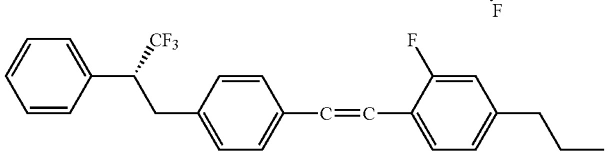

-continued
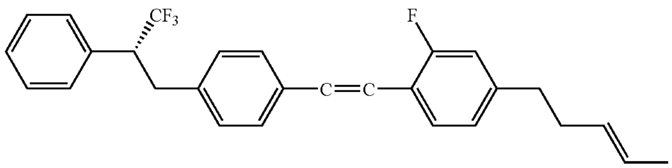
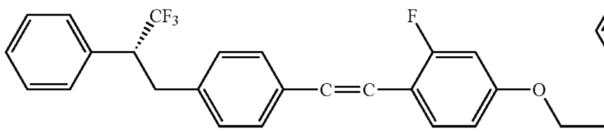
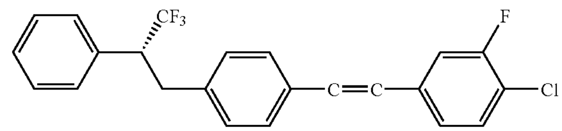
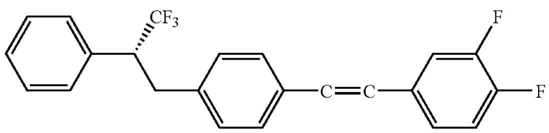
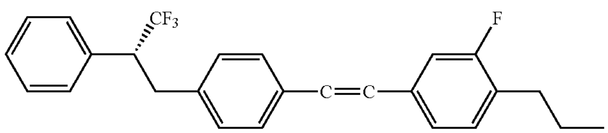
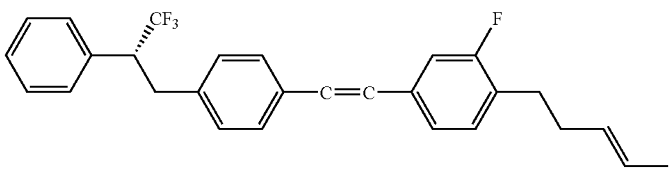
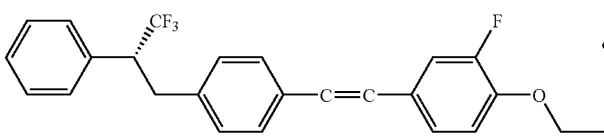
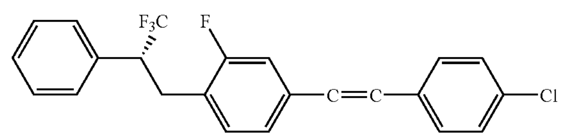
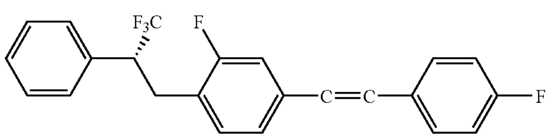
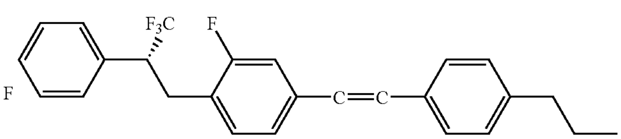
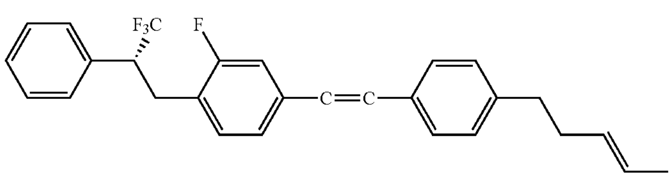
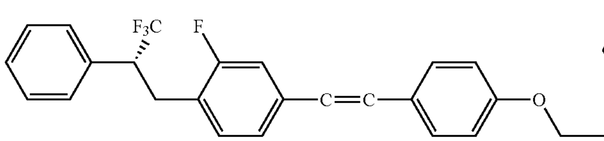
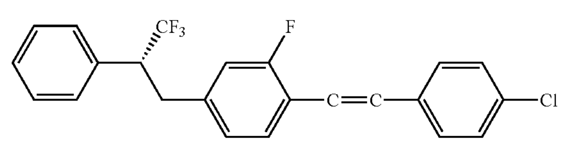
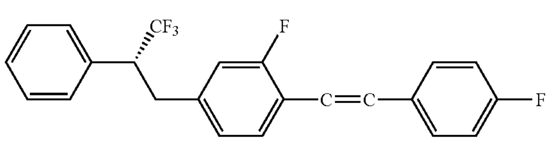
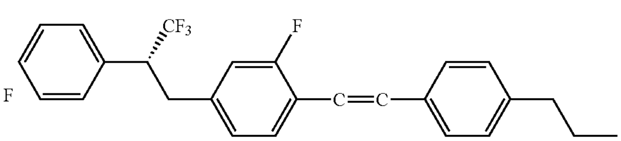
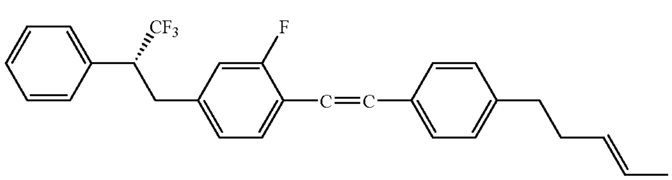

-continued
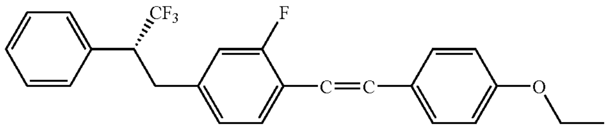
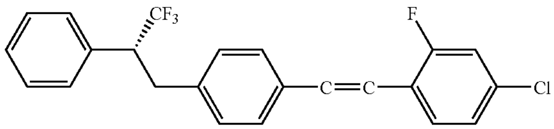
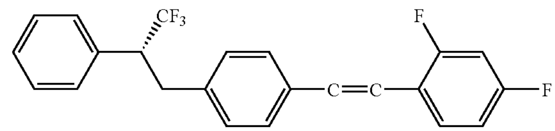
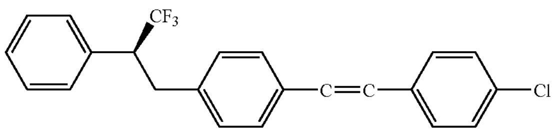
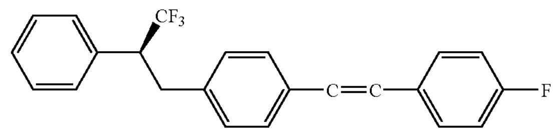
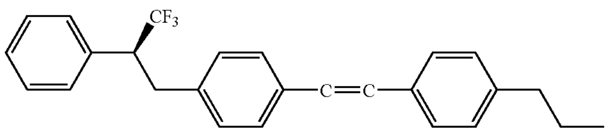
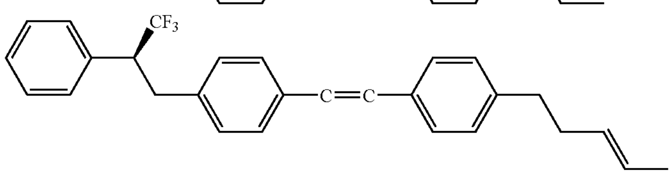
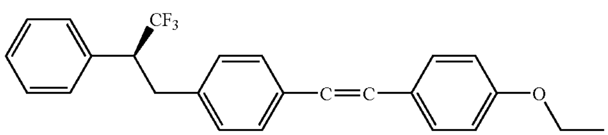
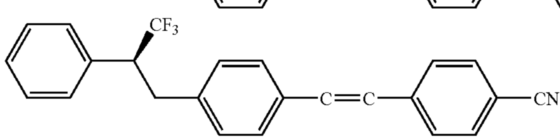
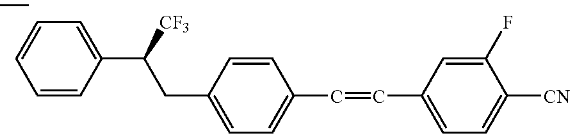
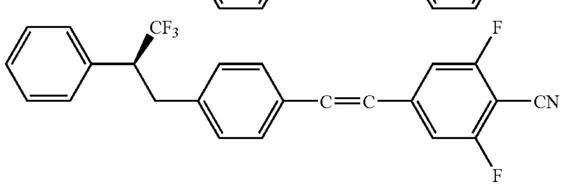
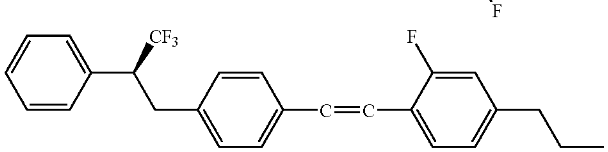
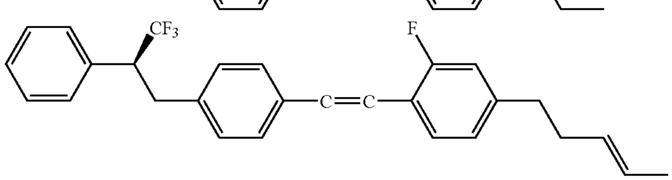
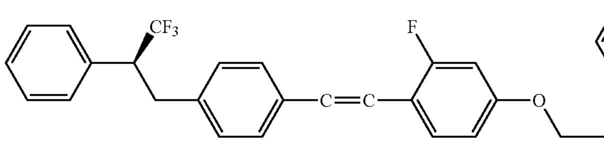
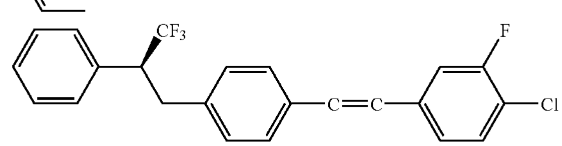
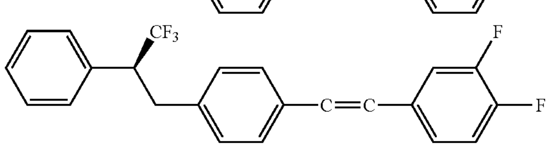

-continued
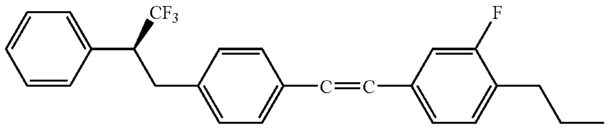
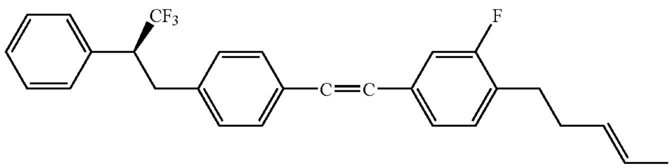
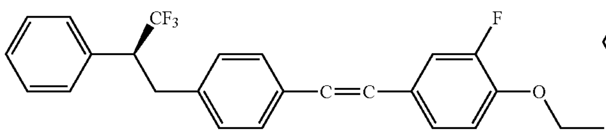
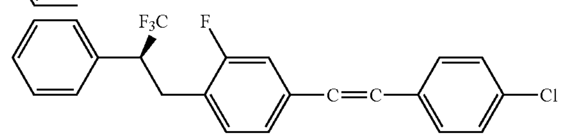
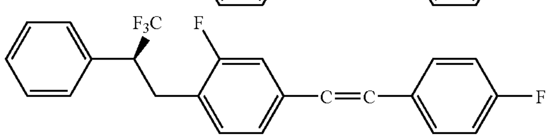
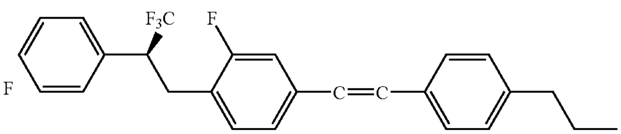
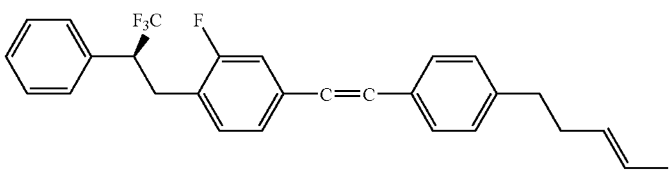
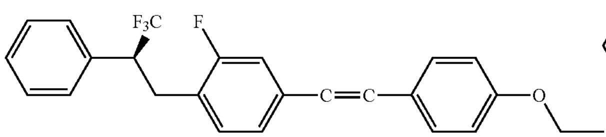
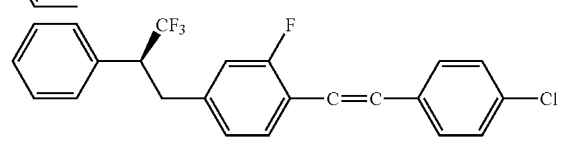
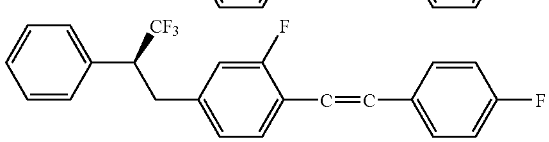
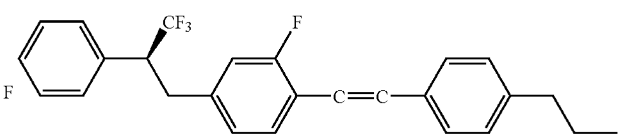
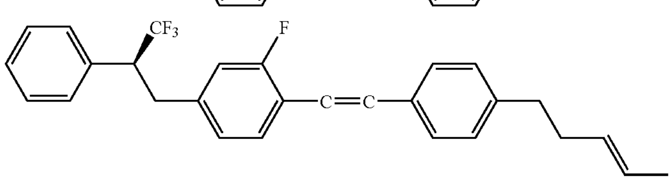
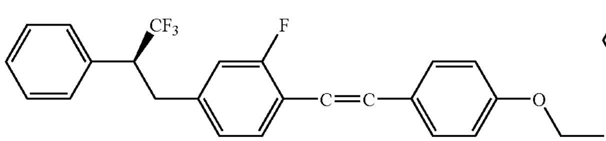
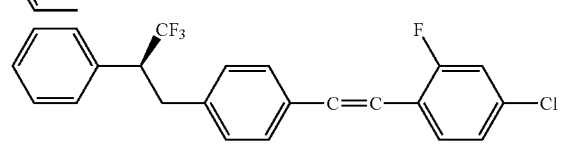
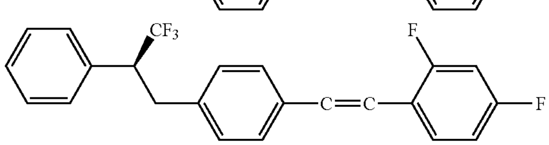
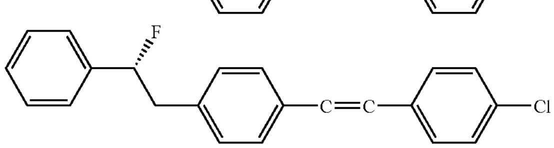
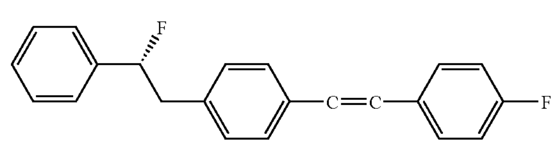
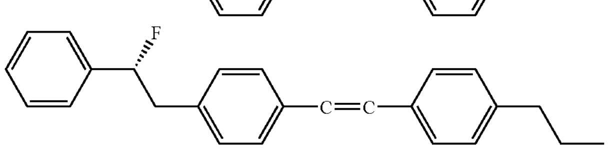

-continued
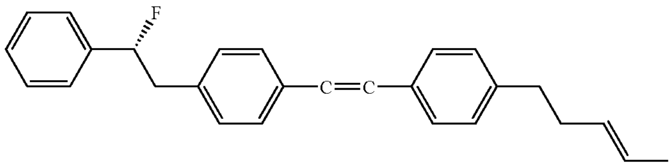
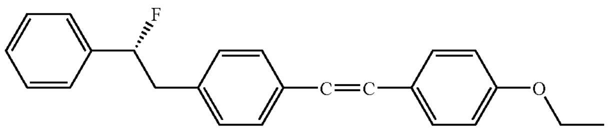
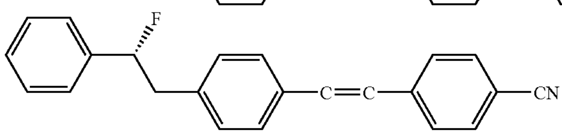
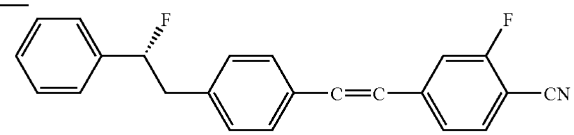
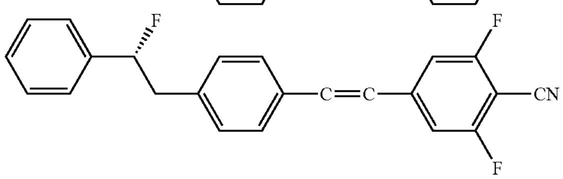
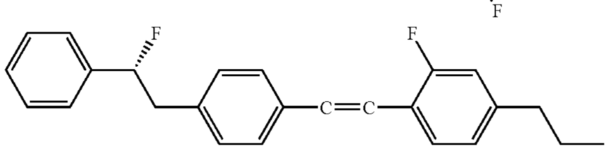
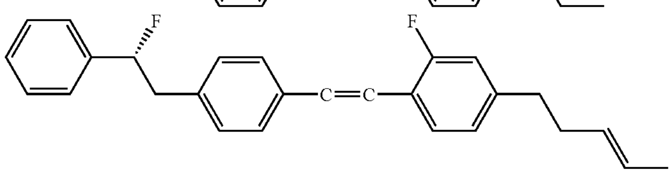
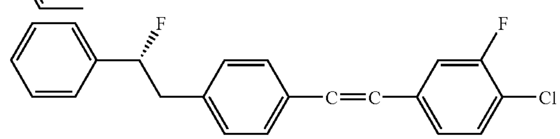
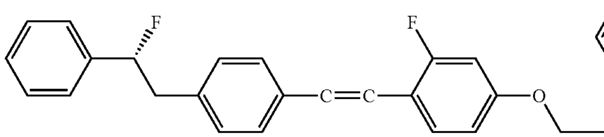
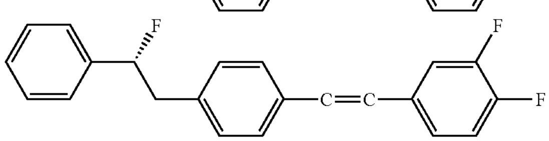
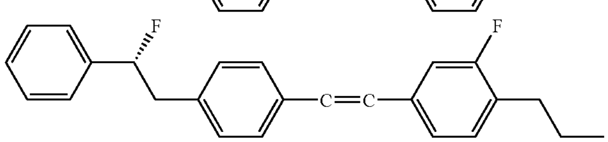
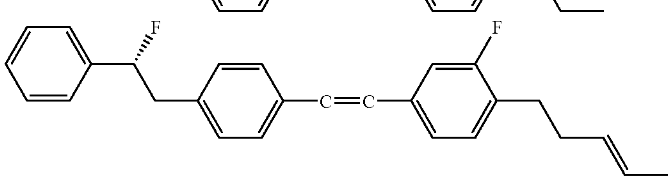
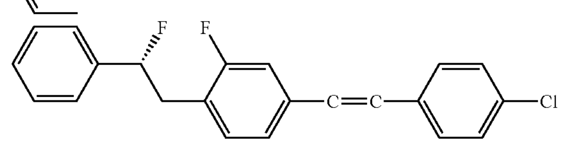
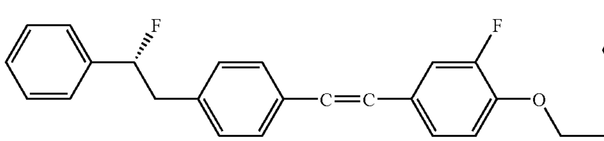
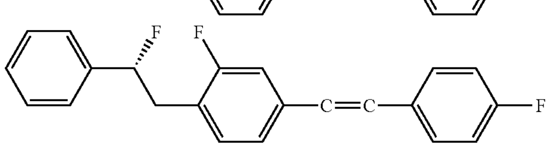
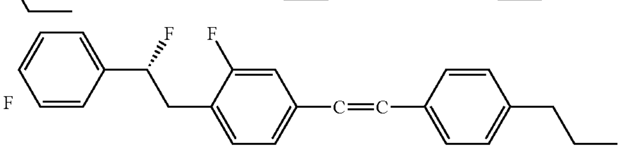

-continued
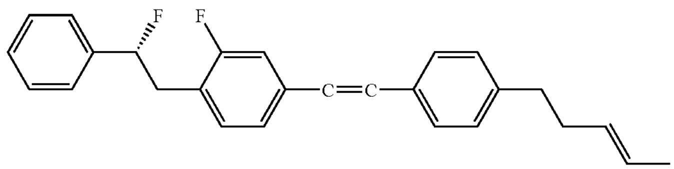
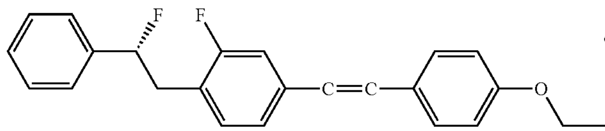
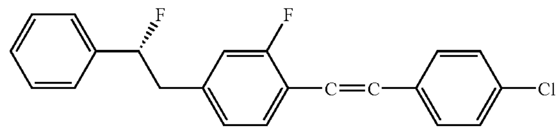
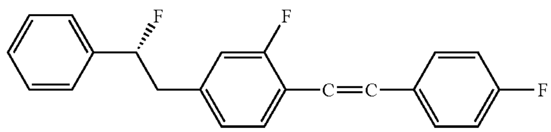
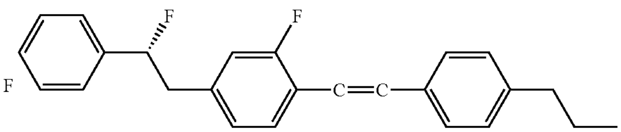
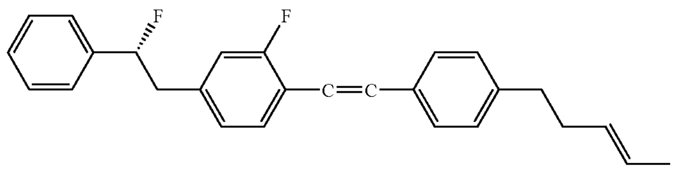
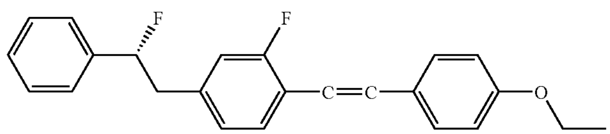
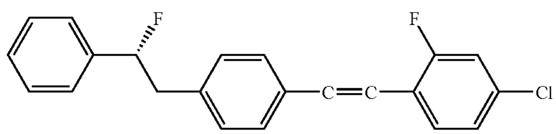
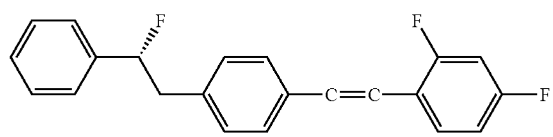
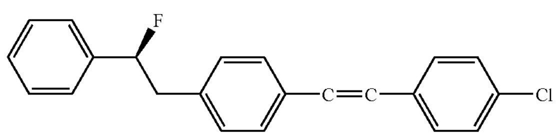
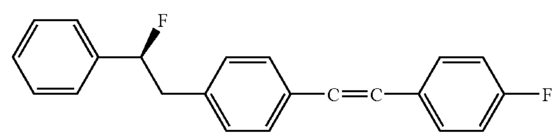
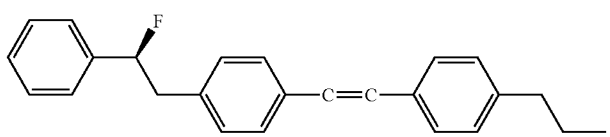
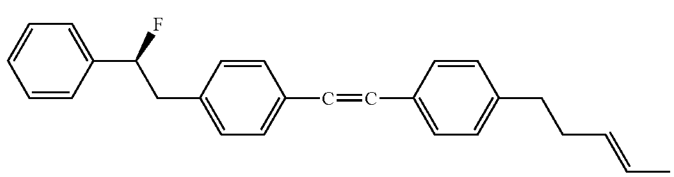
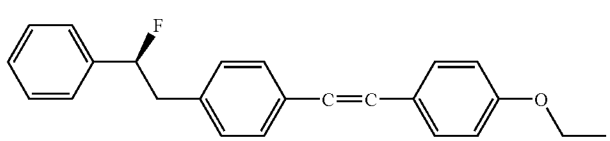
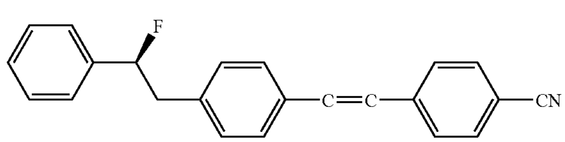
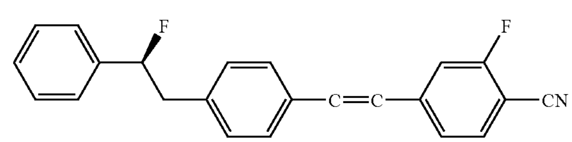

-continued
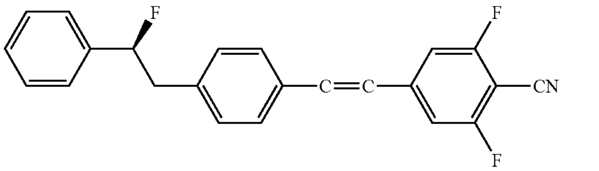
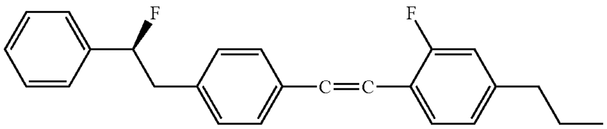
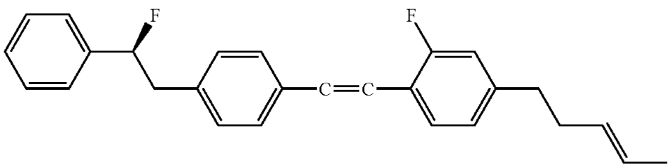
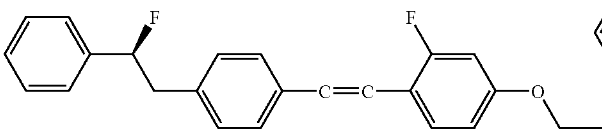
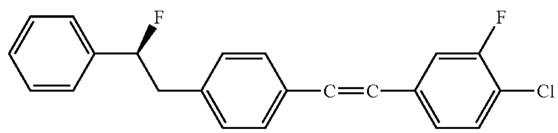
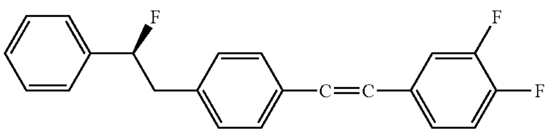
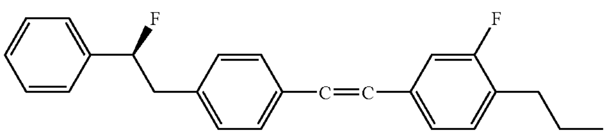
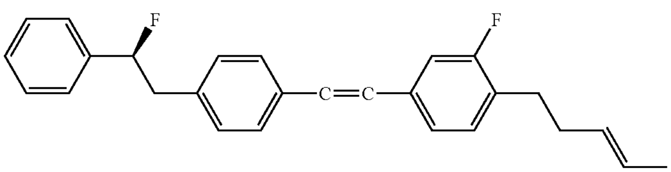
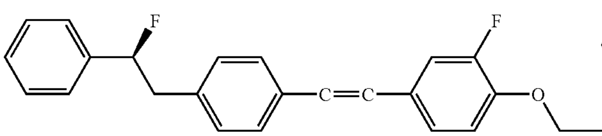
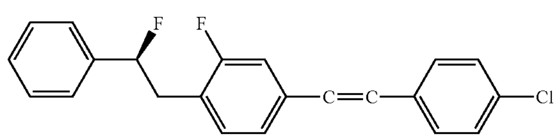
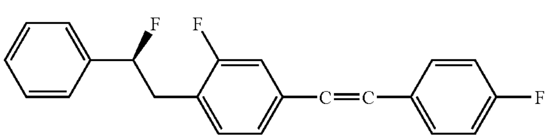
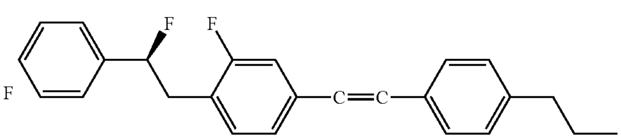
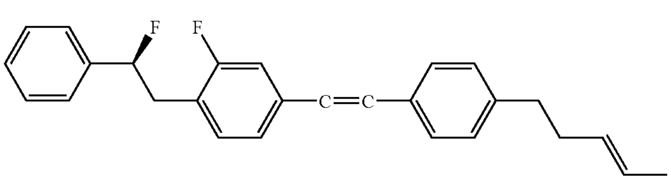
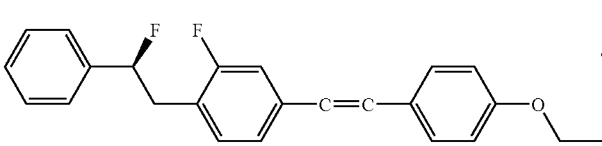
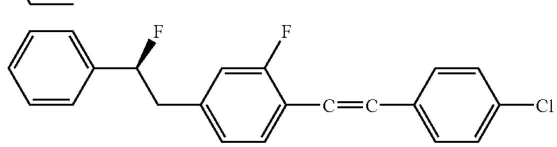

-continued
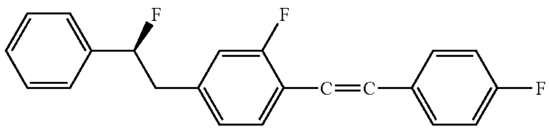
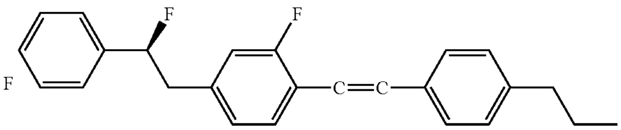
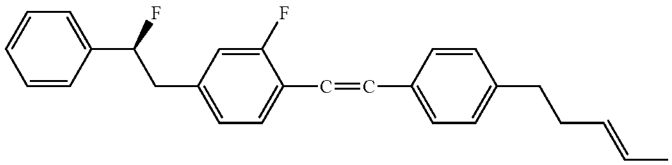
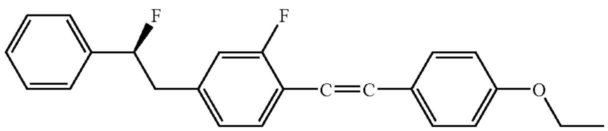
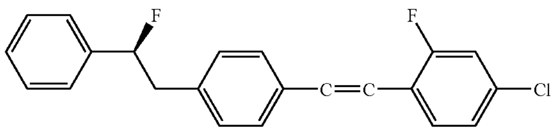
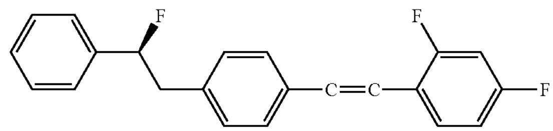
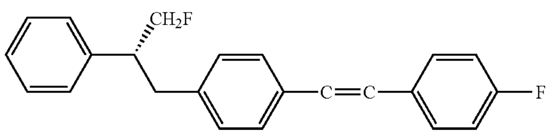
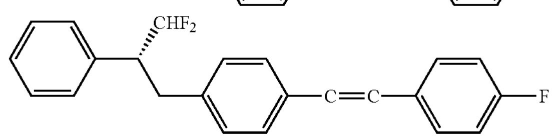
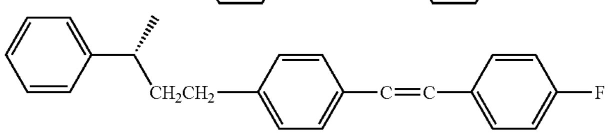
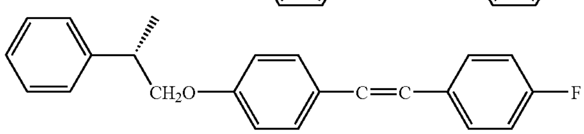
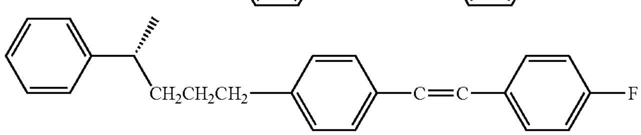
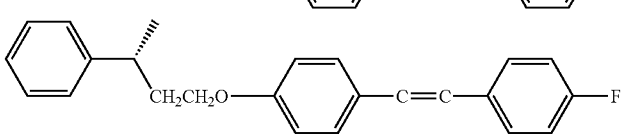
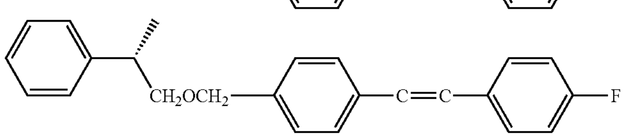
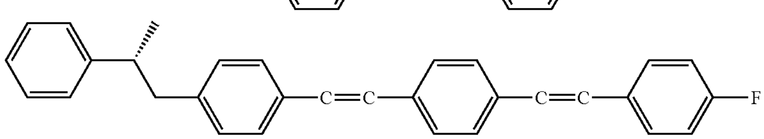
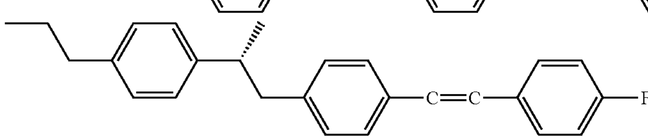
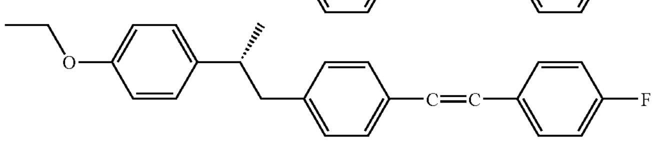

-continued
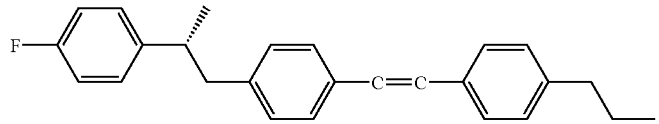
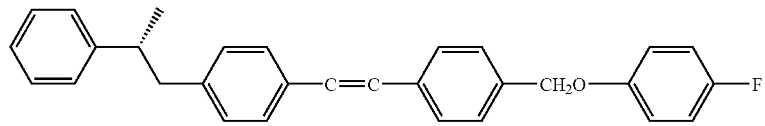
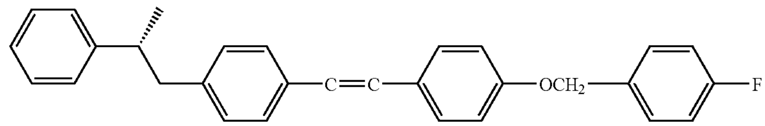
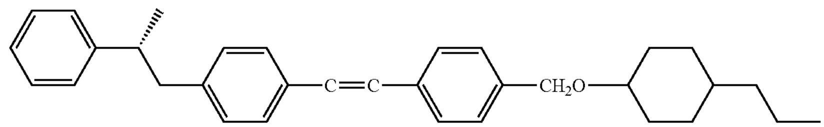
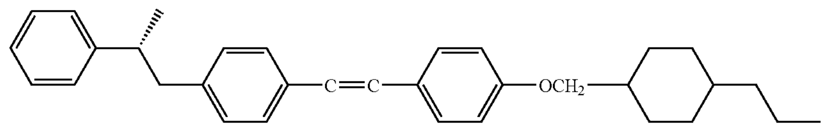
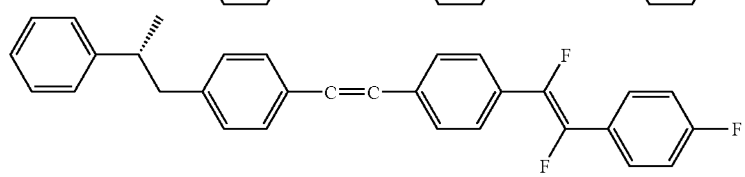
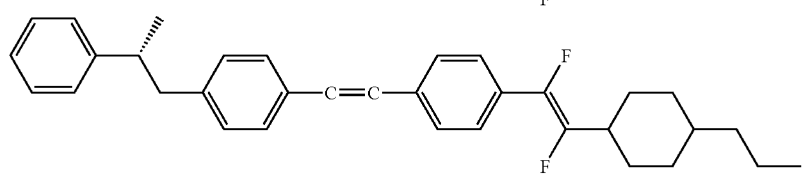
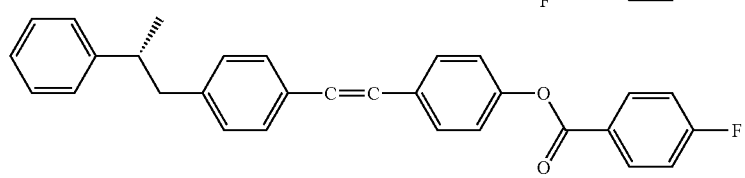
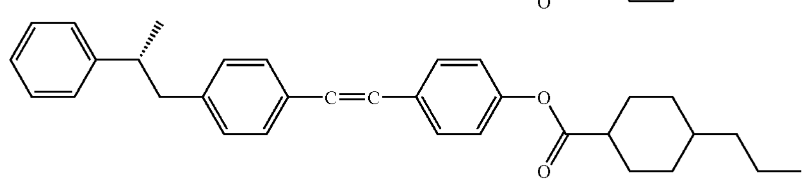
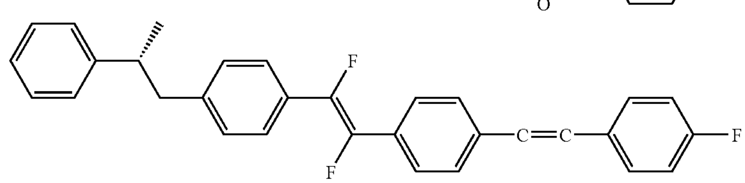
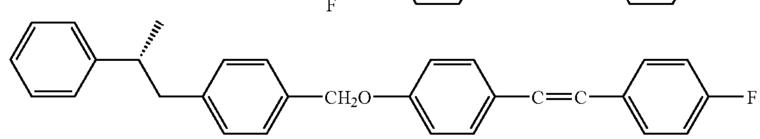
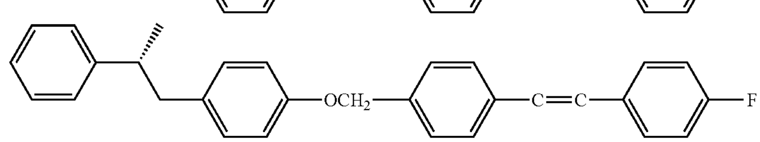

-continued
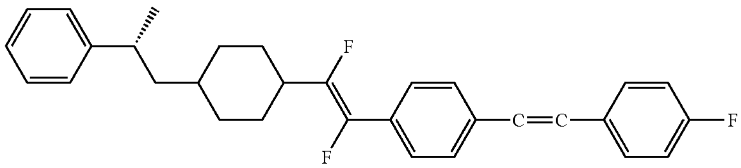
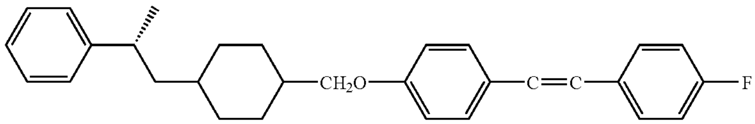
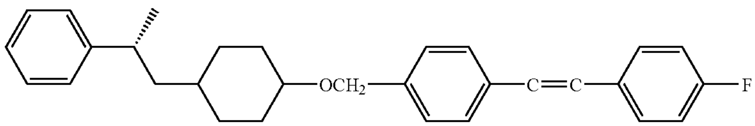
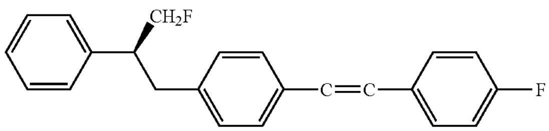
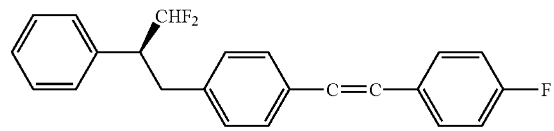
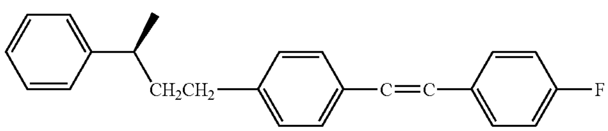
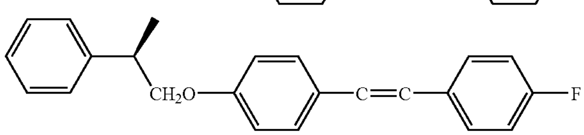
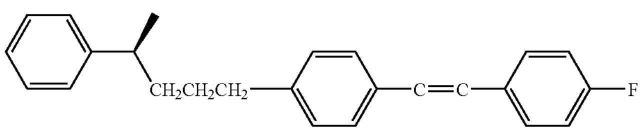
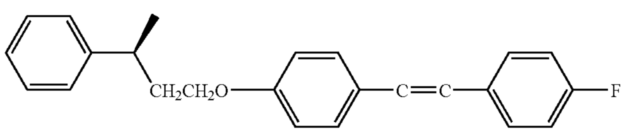
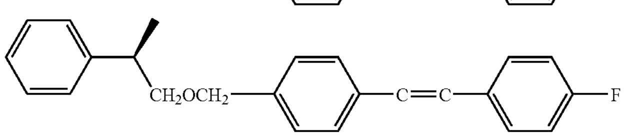
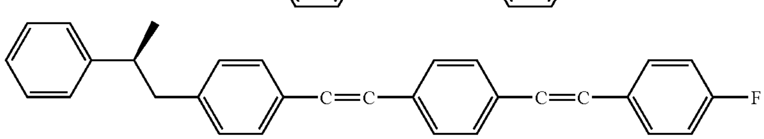
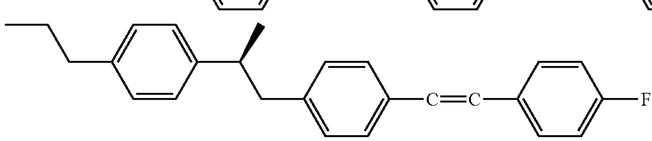
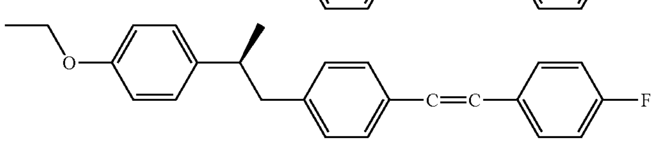
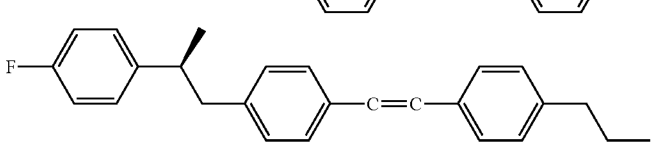

-continued
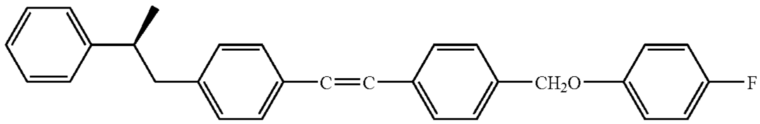
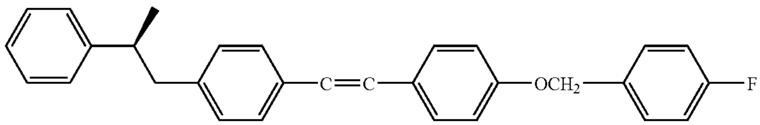
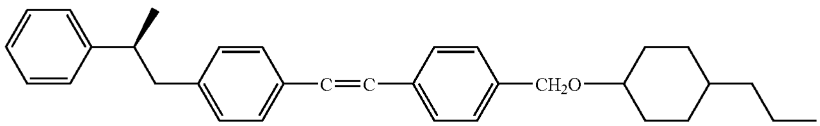
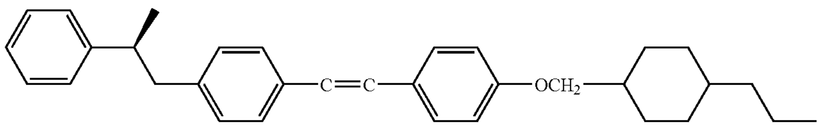
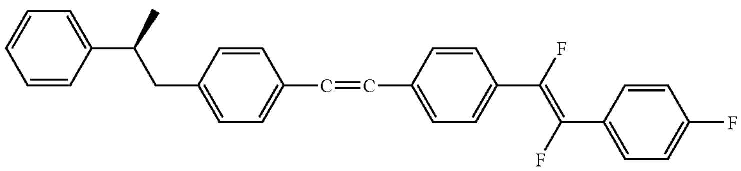
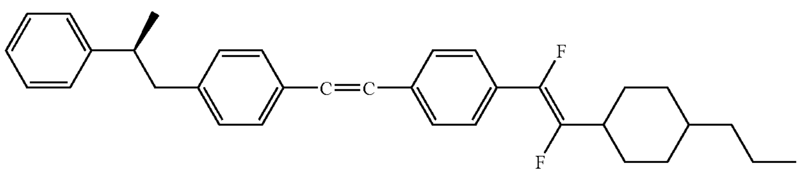
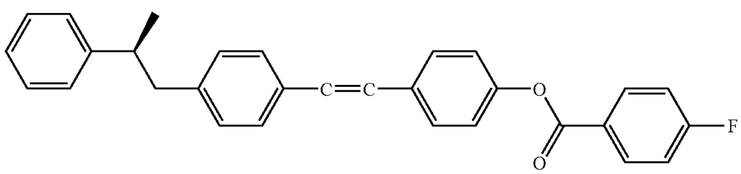
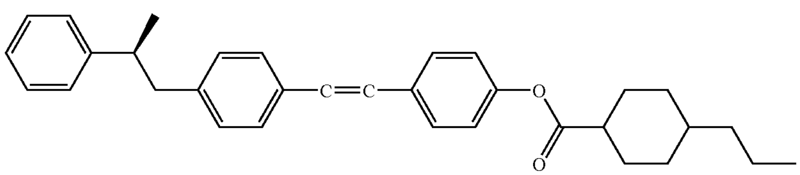
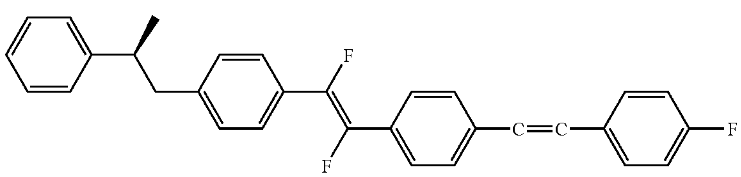
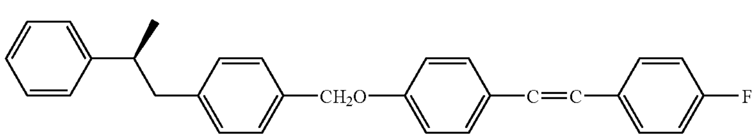
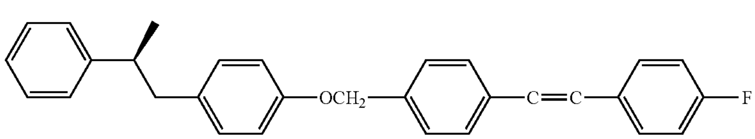

-continued
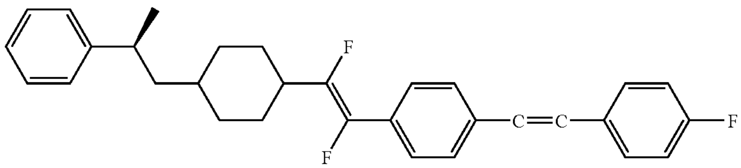
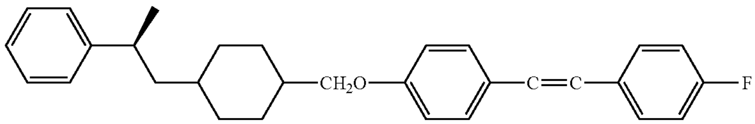
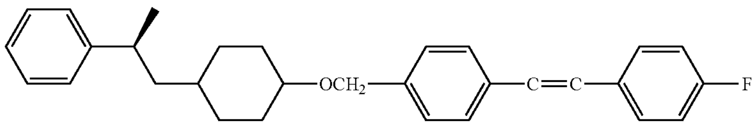
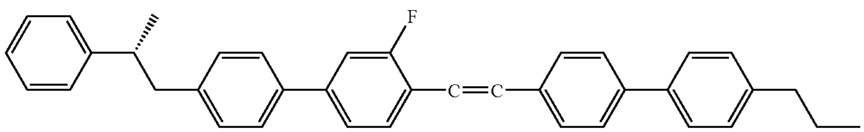
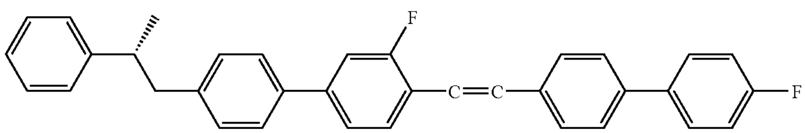
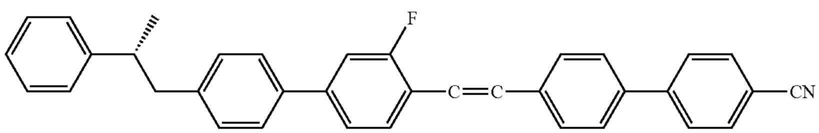
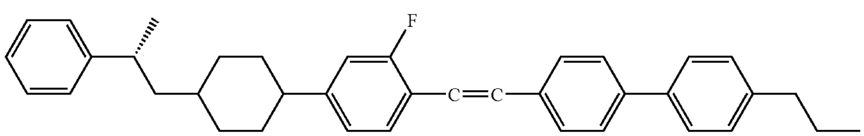
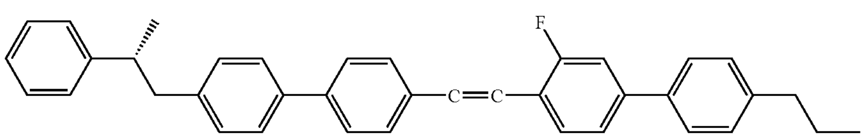
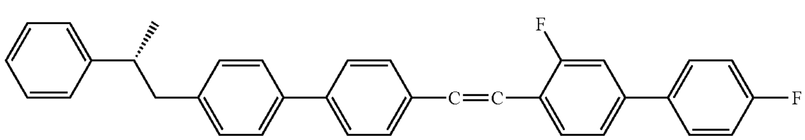
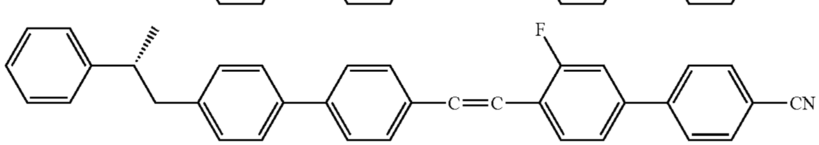
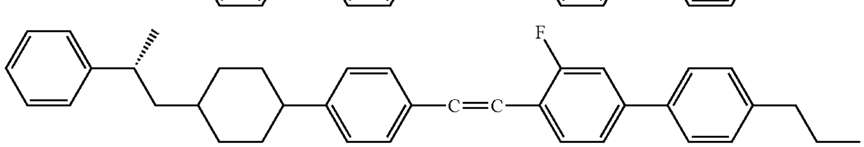
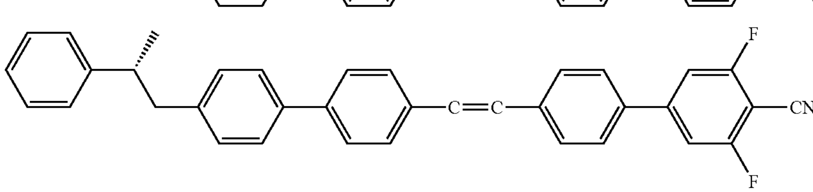

-continued
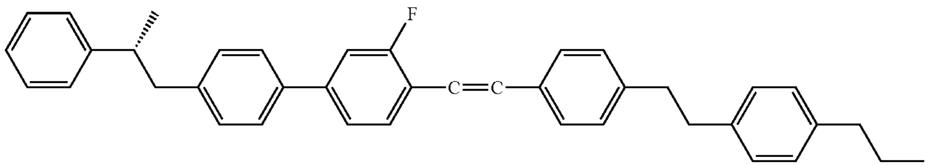
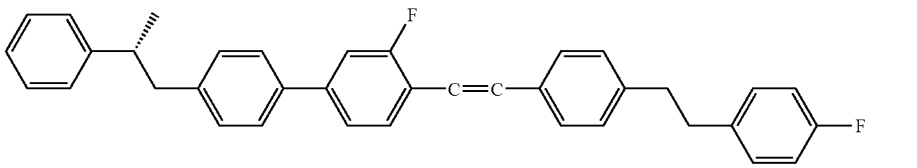
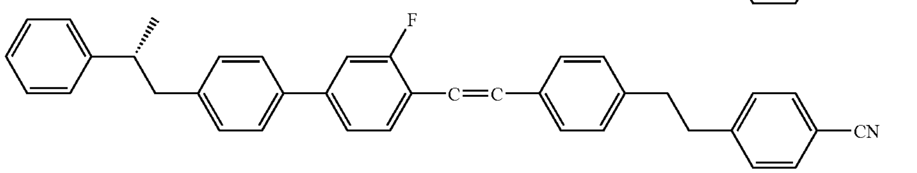
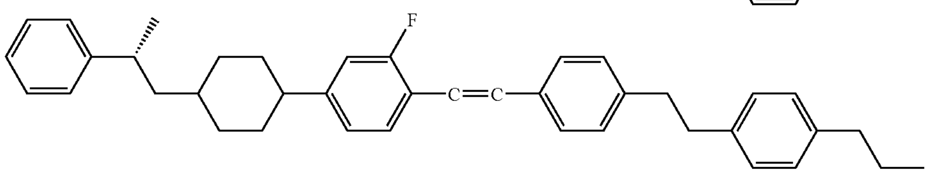
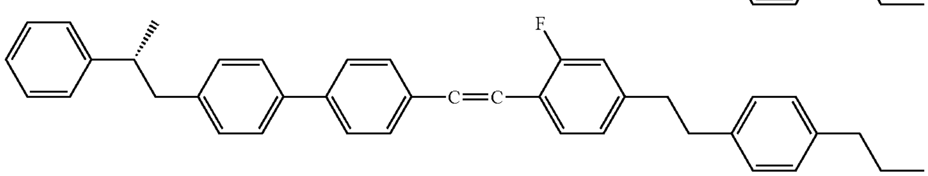
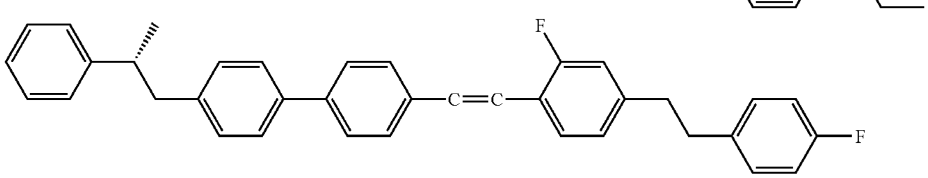
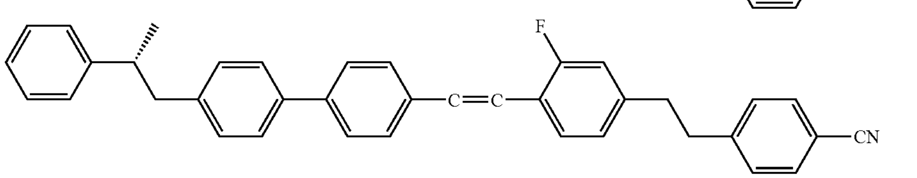
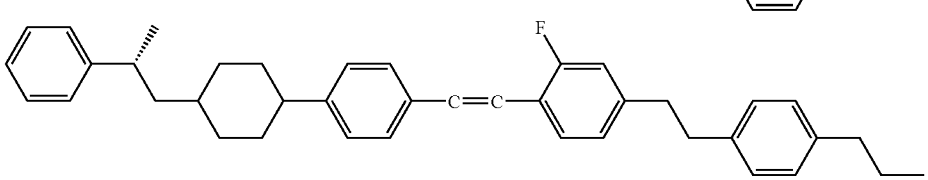
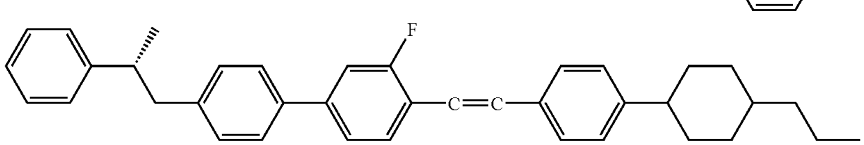
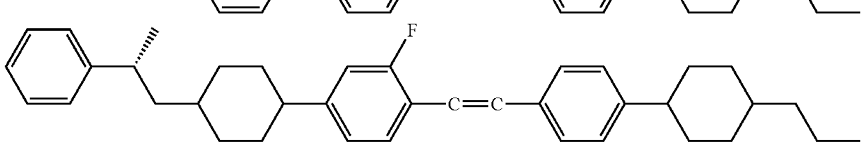
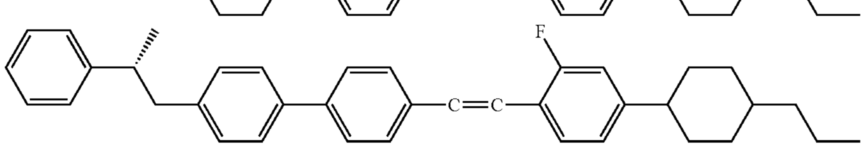

-continued
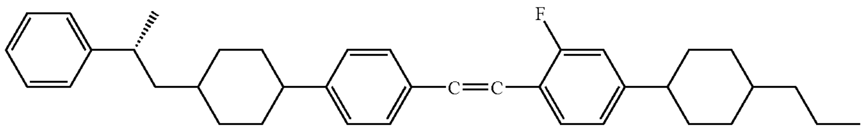
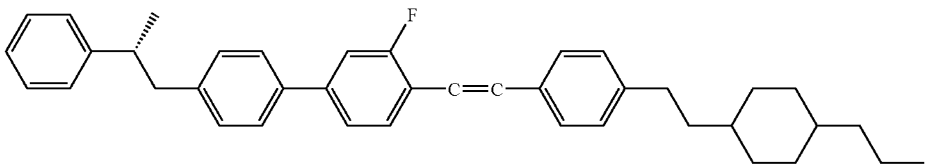
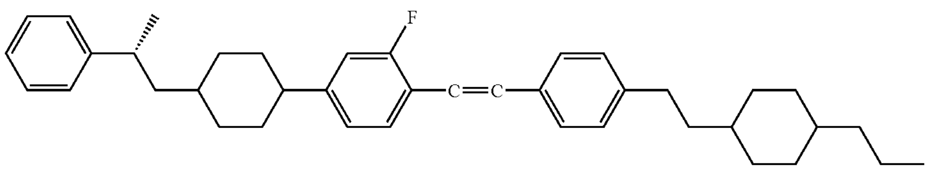
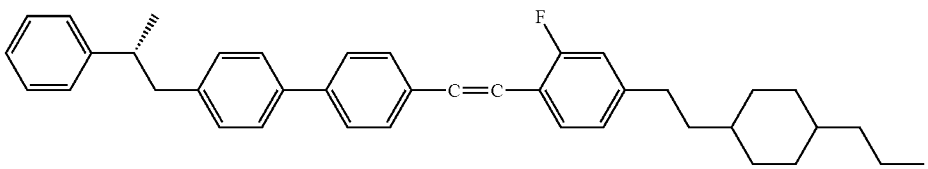
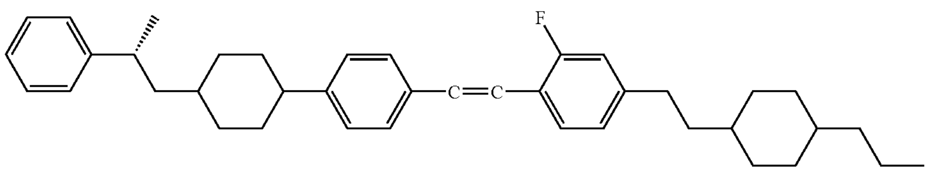
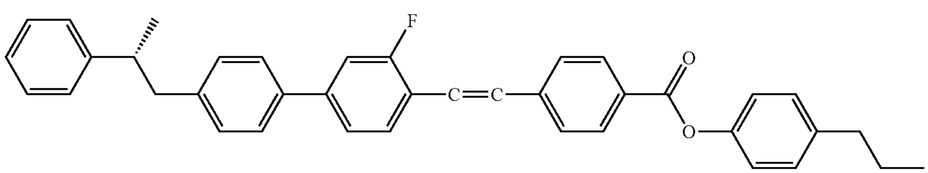
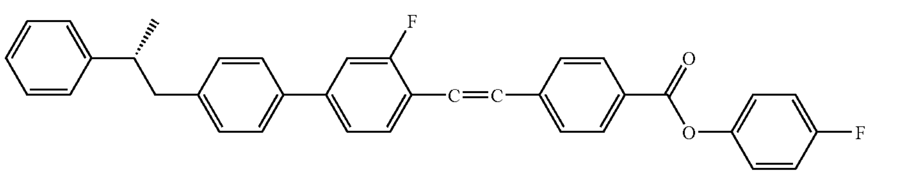
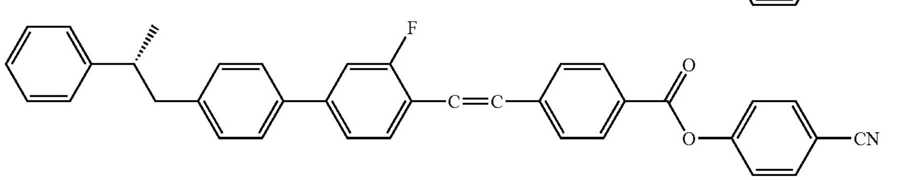
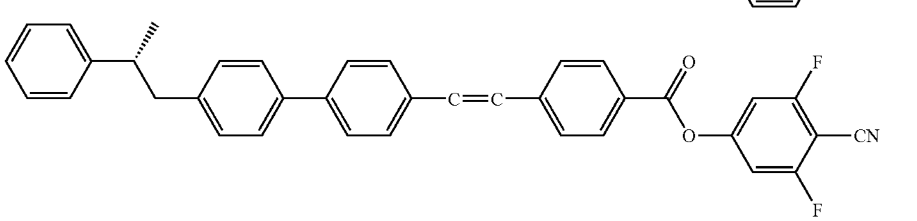
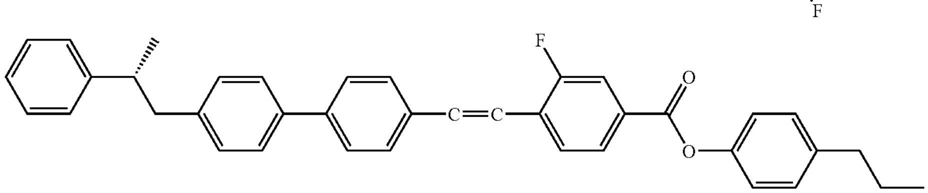

-continued
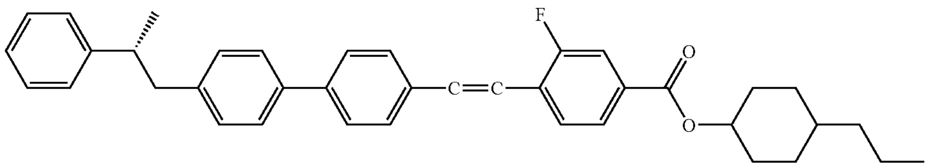
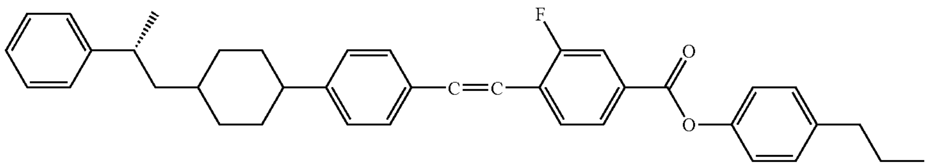
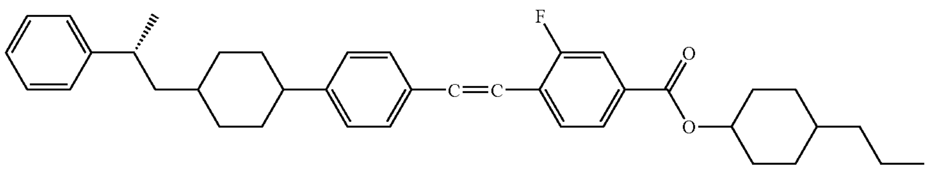
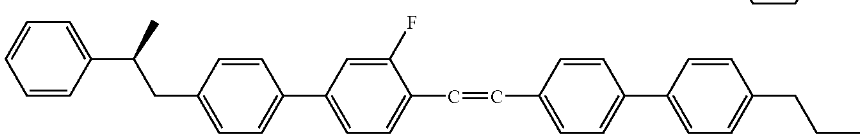
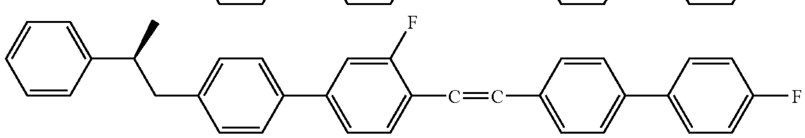
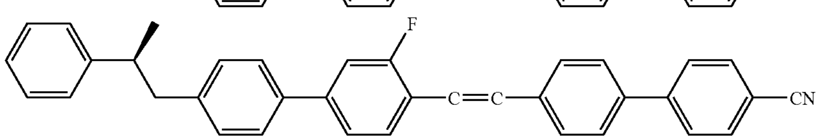
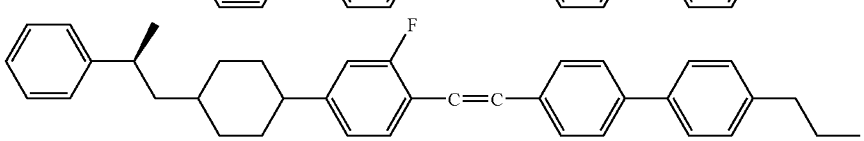
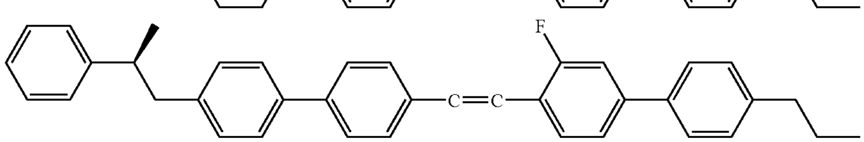
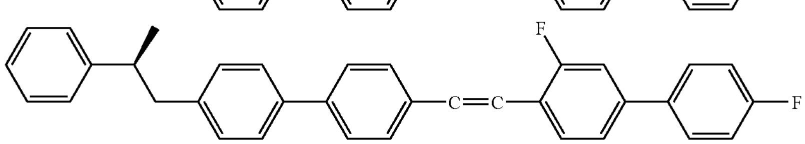
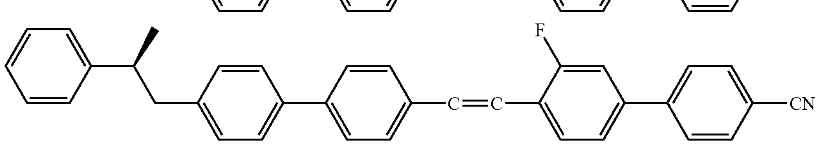
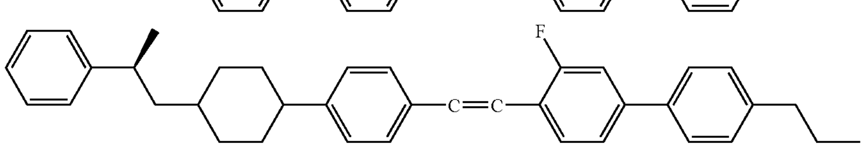
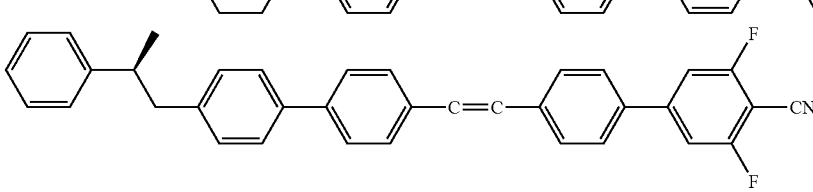

-continued
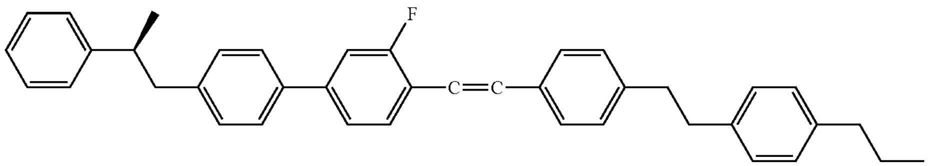
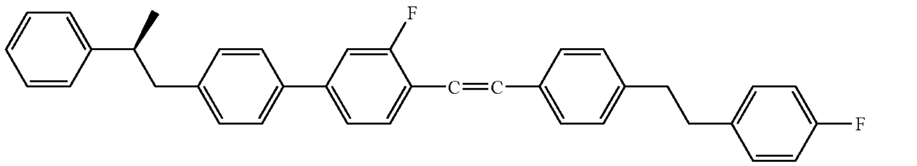
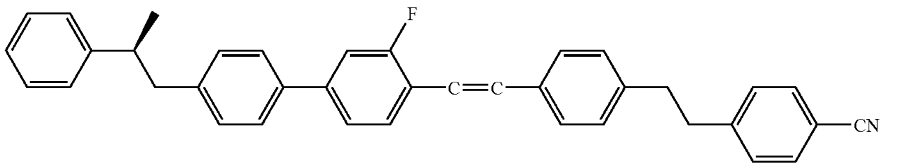
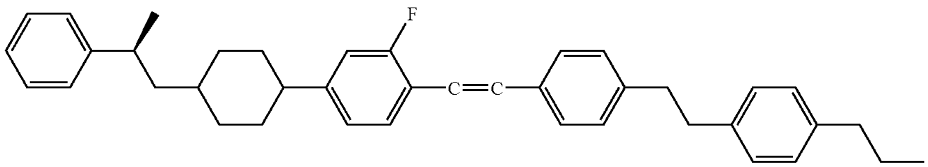
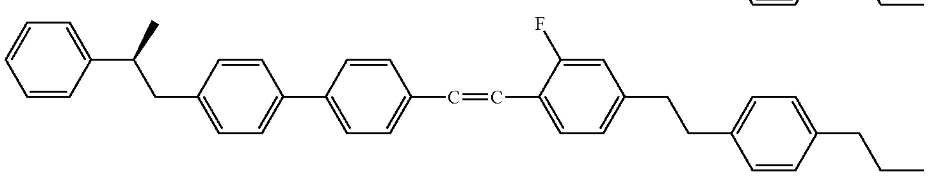
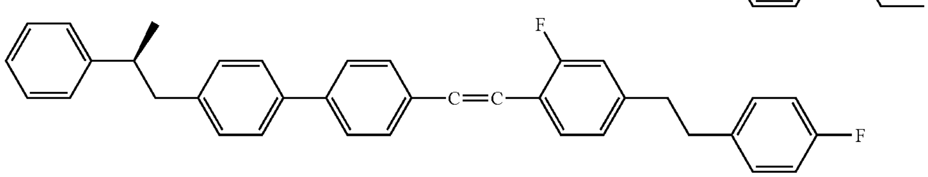
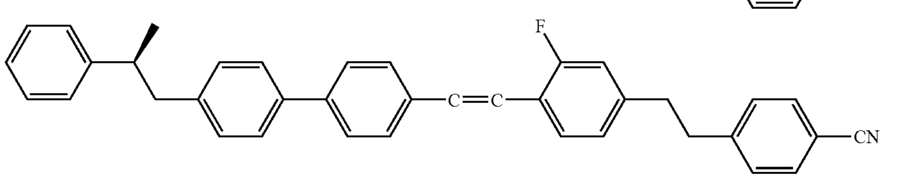
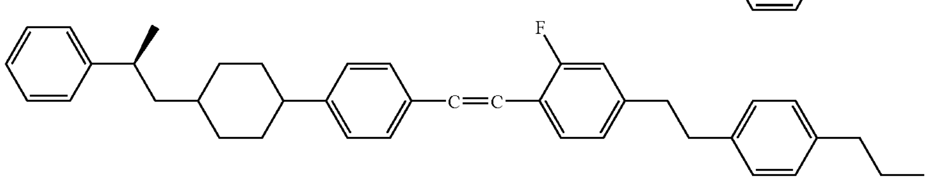
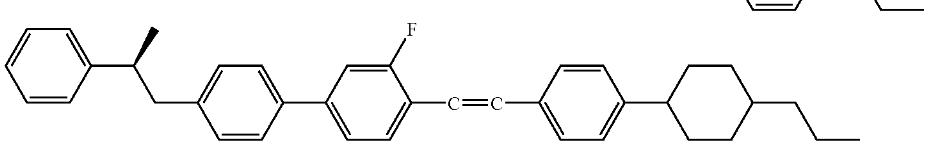
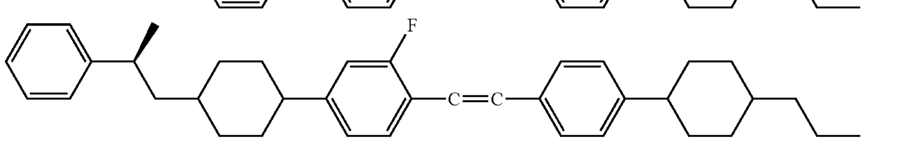
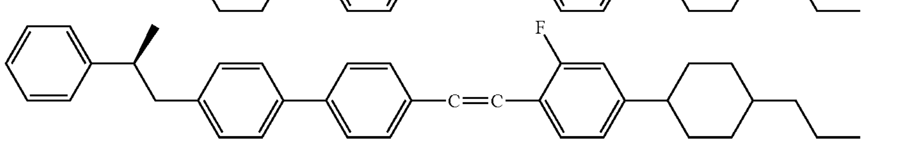

-continued
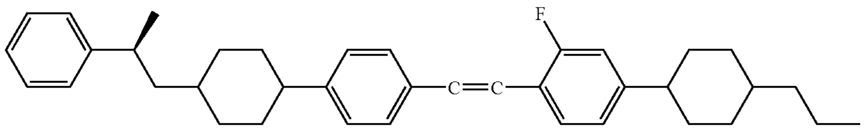
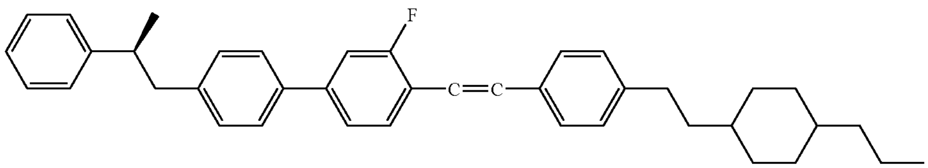
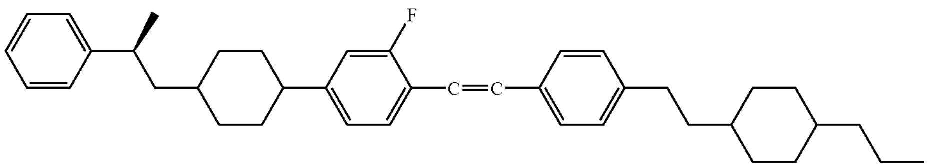
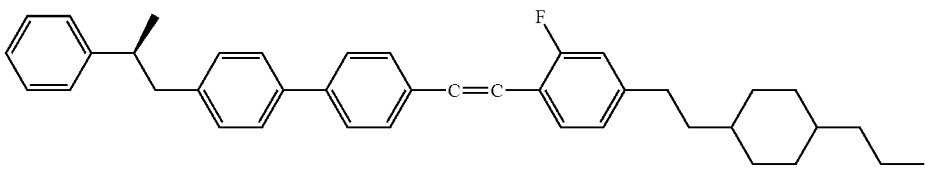
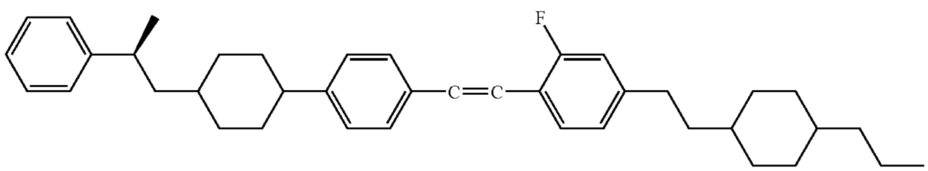
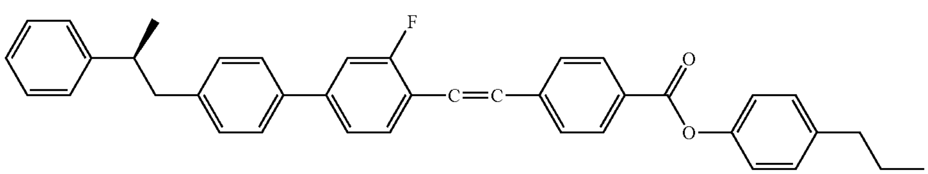
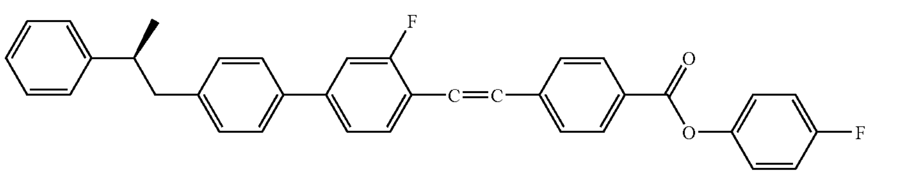
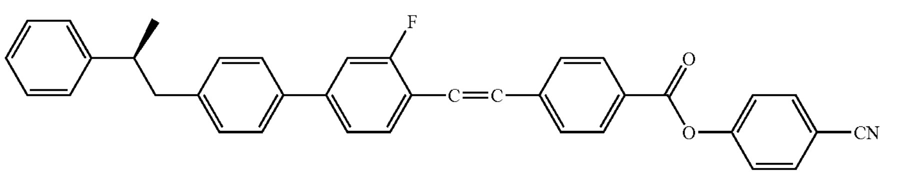
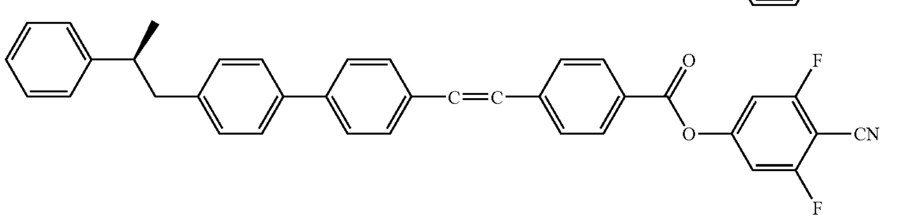
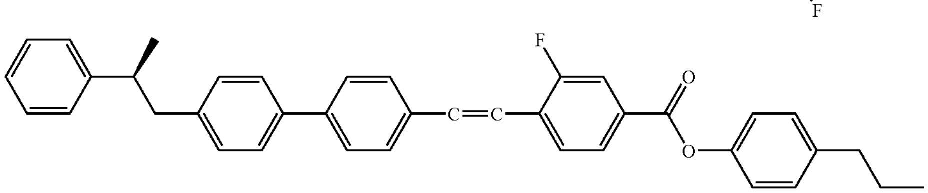

-continued

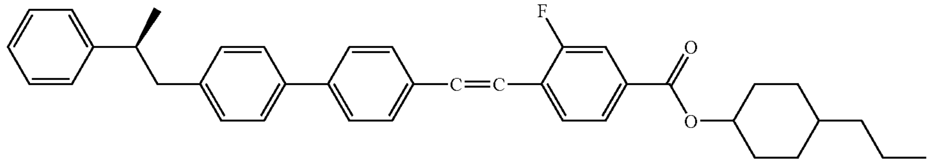

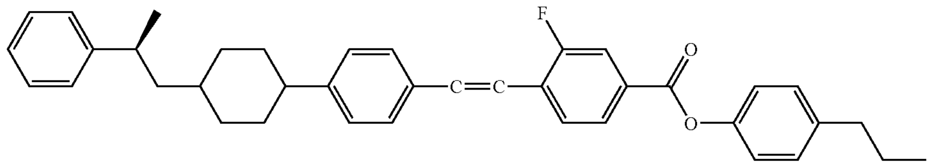

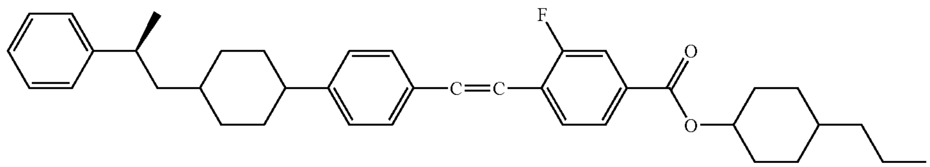

EXAMPLE 1-2

Of a liquid crystal composition obtained by adding 5 parts by mass of (R)-1-[4-[2-(4-chloro-2-fluorophenyl)ethenyl] phelyn]-2-phenylpropane (hereinafter referred to as compound A) to 95 parts by mass of a liquid crystal composition ZLI-1565 manufactured by Merck Ltd., the clear point (Tc, unit: ° C.) and the dynamic viscosity (η, 25° C., unit: cSt) were measured, and the results are shown in Table 1-1.

Of a liquid crystal composition obtained by adding 20 parts by mass of the compound A to 80 parts by mass of the liquid crystal composition ZLI-1565 manufactured by Merck Ltd., the refractive index ($n_0$) to ordinary ray and the refractive index ($n_e$) to extraordinary ray were measured by means of an Abbe refractometer, and the refractive index anisotropy (Δn, 589 nm, 25° C.) was calculated from the following formula. The result is shown in Table 1-1.

$$n_0=[(n_{\parallel}^2+n_{\perp}^2)/2]^{1/2}$$

$$n_e=n_{\perp}$$

$$\Delta n=n_{\parallel}-n_{\perp}$$

Of a liquid crystal composition obtained by adding 1 part by mass of the compound A to 100 parts by mass of the liquid crystal composition ZLI-1565 manufactured by Merck Ltd., the helical pitch length (P, 25° C., unit: μm) was measured. The result is shown in Table 1-1.

Here, the liquid crystal composition ZLI-1565 manufactured by Merck Ltd. had Tc of 86.0° C., Δn of 0.124 and η of 15.7 cSt.

EXAMPLE 1-3

The same operation as in Example 1-2 was carried out except that (R)-1-[4-[2-(3,4-difluorophenyl)ethenyl]phenyl]-2-phenylpropane was used instead of (R)-1-[4-[2-(4-chloro-2-fluorophenyl)ethenyl]phenyl]]-2-phenylpropane to obtain liquid crystal compositions, and of the respective liquid crystal compositions, the clear point (Tc, unit: ° C.), the dynamic viscosity (η, 25° C., unit: cSt), the refractive index anisotropy (Δn, 589 nm, 25° C.) and the helical pitch length (P, 25° C., unit: μm) were measured. The results are shown in Table 1-1.

COMPARATIVE EXAMPLE 1-1

The same operation as in Example 1-2 was carried out except that R-811 (the structure has already been described) was used instead of (R)-1-[4-[2-(4-chloro-2-fluorophenyl) ethenyl]phenyl]]-2-phenylpropane to obtain liquid crystal compositions, and of the respective liquid crystal compositions, the clear point (Tc, unit: ° C.), the dynamic viscosity (η, 25° C., unit: cSt), the refractive index anisotropy (Δn, 589 nm, 25° C.) and the helical pitch length (P, 25° C., unit: μm) were measured. The results are shown in Table 1-1.

TABLE 1-1

| Liquid crystal composition | Tc | Δn | η | P |
|---|---|---|---|---|
| Example 1-2 | 81.2 | 0.139 | 21.8 | 7.09 |
| Example 1-3 | 78.7 | 0.128 | 22.2 | 6.85 |
| Comparative Example | 79.5 | 0.115 | 22.2 | 10.40 |

EXAMPLE 2-1

Preparation of (R)-1-[4-[4-(trans-4-propylcyclohexyl)phenyl]phenyl]-2-phenylpropane

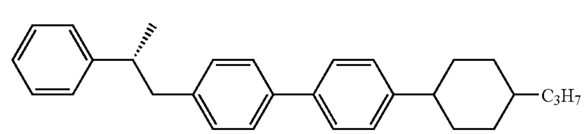

70 ml of tetrahydrofuran was added to 25.3 g (1.04 mol) of magnesium, and a solution having 9.45 g (0.087 mol) of ethyl bromide and 200 g (0.867 mol) of (R)-2-phenyl-1-(4-chlorophenyl)propane dissolved in 250 ml of tetrahydrofuran was dropwise added thereto over a period of 30 minutes at room temperature with stirring, followed by stirring for 6 hours under reflux. After the mixture was cooled to room temperature, 650 ml of tetrahydrofuran was added thereto. The above reaction liquid was dropwise added to a solution having 112 g (0.44 mol) of trimethoxyboron dissolved in 300 ml of tetrahydrofuran over a period of 1 hour at −20° C., followed by stirring for 1 hour. The temperature was raised to 0° C., 700 ml of 3M hydrochloric acid was dropwise added, followed by stirring for 1 hour at the same temperature. After extraction with toluene from the reaction liquid, washing with water and drying were carried out to distill off the solvent. To a 1,2-dimethoxyethane 800 ml solution of the obtained residue and 238 g (0.845 mol) of 1-bromo-4-(trans-4-propylcyclohexyl)benzene, 1160 ml of an aqueous solution of 19.5 g (16.9 mmol) of tetrakistriphenylphosphine palladium and 260 g (2.45 mol) of sodium carbonate was added, followed by stirring for 3 hours under reflux. The mixture was cooled to room temperature, toluene was added thereto for liquid separation, and the obtained organic layer was washed with water and dried, the solvent was distilled off, and recrystallization and purification by silica gel column chromatography were carried out to obtain 240 g of aimed (R)-1-[4-[4-(trans-4-propylcyclohexyl)phenyl]phenyl]-2-pheynylpropane. Melting point: 93.8° C., TSI: 130.8° C., MS m/e: 396 (M+)

EXAMPLE 2-2

Preparation of (S)-3,5-difluoro-4-cyanophenyl=2,6-difluoro-4-[4-(2-phenylpropyl)phenyl]benzoate

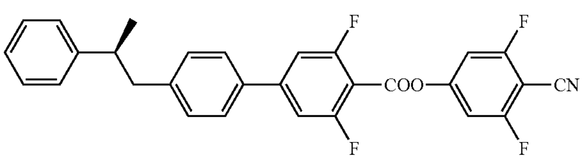

To a toluene 150 ml solution of 37.0 g (0.10 mol) of (S)-2,6-difluoro-4-[4-(2-phenylpropyl)phenyl]benzoylchloride and 15.5 g (0.10 mol) of 2,6-difluoro-4-hydroxybenzonitrile, 9.5 g (0.12 mol) of pyridine was dropwise added over a period of 1 hour at room temperature, followed by stirring at the same temperature overnight. 100 ml of 1M hydrochloric acid was dropwise added to the reaction liquid, followed by stirring for 1 hour at the same temperature. The solution was subjected to liquid separation, and the obtained organic liquid was washed with water and dried, the solvent was distilled off, and recrystallization and purification by silica gel column chromatography were carried out to obtain 40.1 g of aimed (S)-3,5-difluoro-4-cyanophenyl=2,6-difluoro-4-[4-(2-phenylpropyl)phenyl]benzoate. Melting point: 111.5° C., MS m/e: 489 (M+)

EXAMPLE 2-3

Preparation of (S)-1-[2,6-difluoro-4-[trans-4-(trans-4-propylcyclohexyl)cyclohexyl]phenyl]-2-phenylpropane

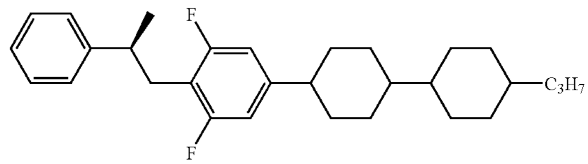

To a tetrahydrofuran 50 ml solution of 10 g (0.031 mol) of 1-[trans-4-(trans-4-propylcyclohexyl)cyclohexyl]-3,5-difluorobenzene, a n-butyllithium/hexane solution (1.6M, 0.041 mol) was dropwise added over a period of 1 hour at −60° C., followed by stirring for 2 hours at the same temperature. Then, a tetrahydrofuran 30 ml solution of 5.5 g (0.041 mol) of zinc chloride was dropwise added thereto over a period of 2 hours at −60° C., followed by stirring for 1 hour at room temperature. After 0.72 g (0.62 mmol) of tetrakis(triphenylphosphine)palladium was added thereto, a tetrahydrofuran 10 ml solution of 4.7 g (0.041 mol) of (R)-2-phenylpropionyl chloride was dropwise added thereto over a period of 1 hour at room temperature, followed by stirring at room temperature overnight. 43 ml of 1M hydrochloric acid was dropwise added to the reaction solution at room temperature, followed by stirring at the same temperature for 1 hour. After extraction with toluene from the solution, washing with water, drying, distillation of the solvent and recrystallization were carried out to obtain 4.1 g of (R)-1-[2,6-difluoro-4-[trans-4-(trans-4-propylcyclohexyl)cyclohexyl]phenyl]-2-phenyl-1-propanone.

Then, 5 ml of trifluoroacetic acid and 2.6 g (23 mmol) of triethylsilane were added to a 1,2-dichloroethane 8 ml solution of 4.1 g (9.1 mmol) of (R)-1-[2,6-difluoro-4-[trans-4-(trans-4-propylcyclohexyl)cyclohexyl]phenyl]-2-phenyl-1-propanone at room temperature, followed by stirring at 60° C. for 10 hours. This reaction liquid was poured into 200 ml of a 5% sodium hydroxide solution, and after extraction with toluene, washing with water, drying, distillation of the solvent, recrystallization and purification by silica gel column chromatography were carried out to obtain 2.5 g of aimed (S)-1-[2,6-difluoro-4-[trans-4-(trans-4-propylcyclohexyl)cyclohexyl]phenyl]-2-phenylpropane.

Melting point: 93.7° C., MS m/e: 438 (M+)

The following compounds were obtained by a similar process.

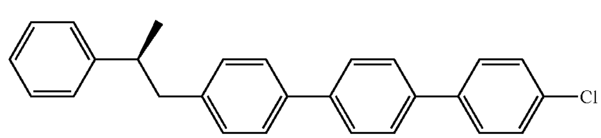

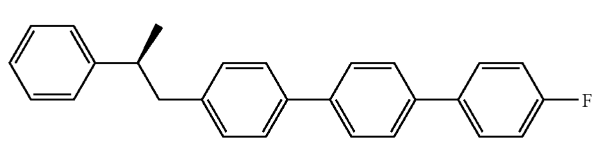

-continued
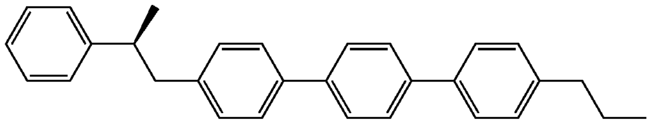
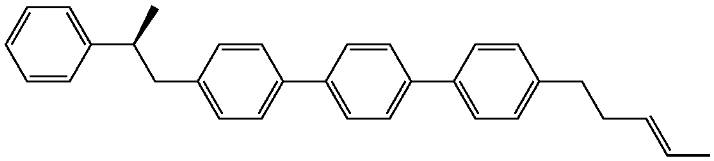
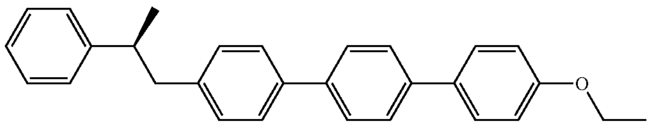
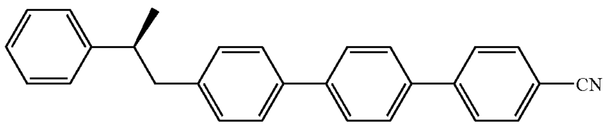
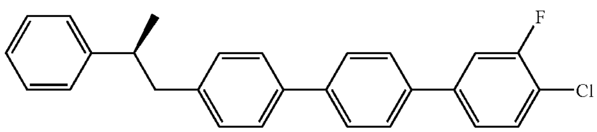
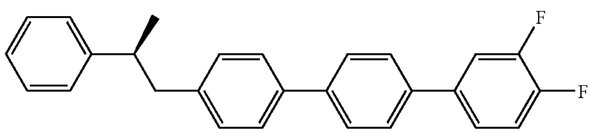
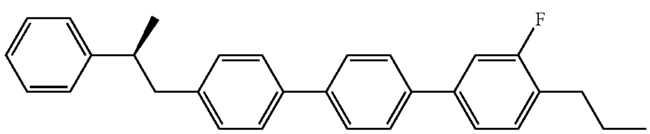
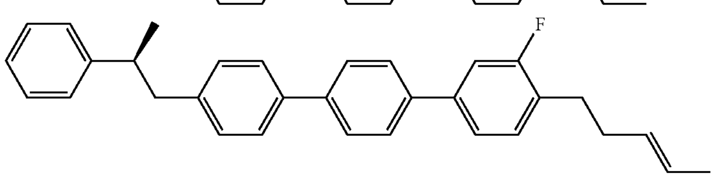
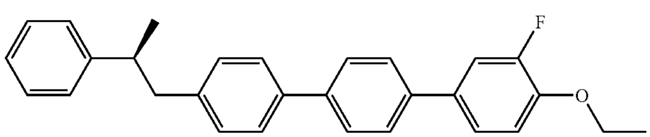
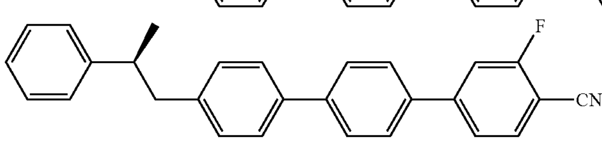
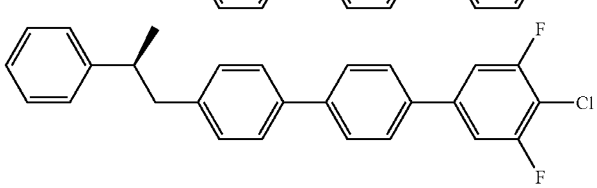
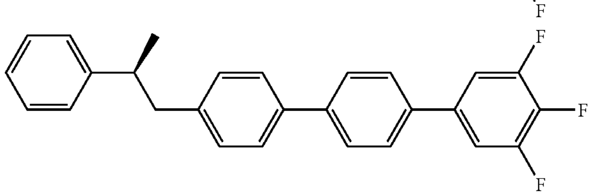

-continued
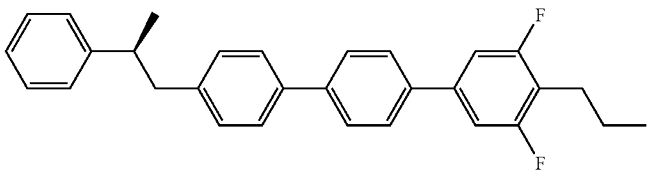
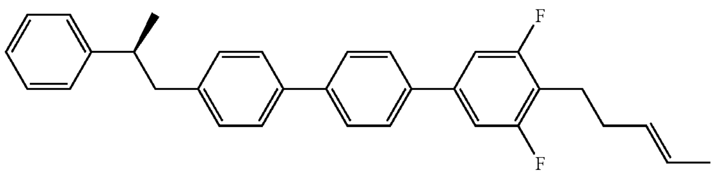
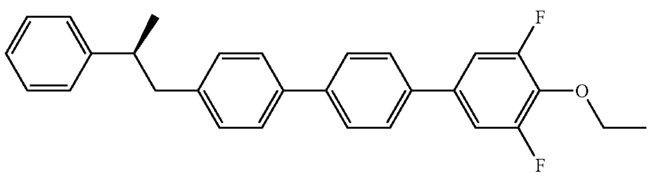
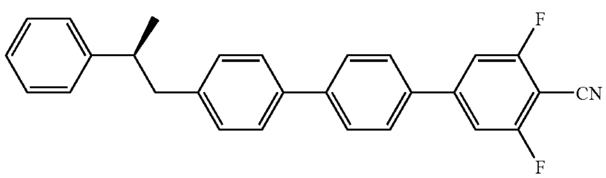
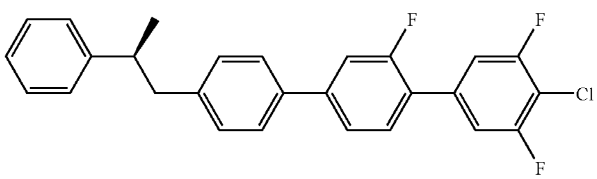
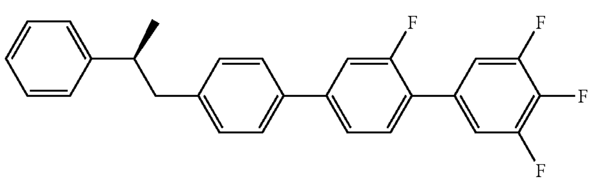
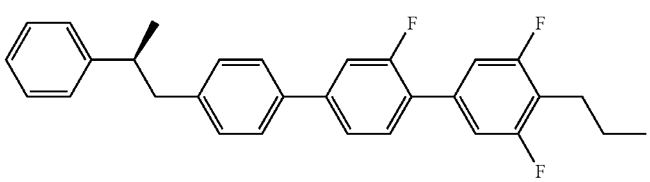
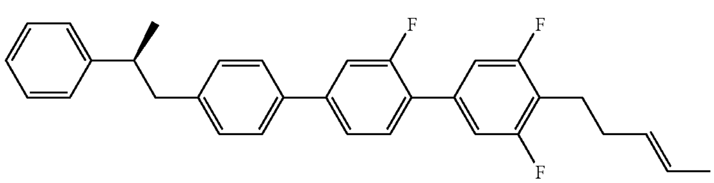
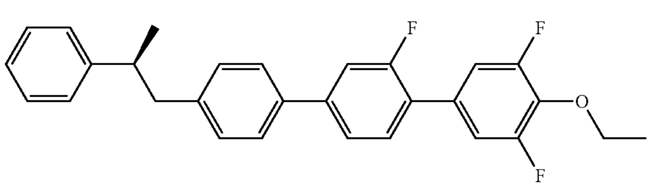

-continued
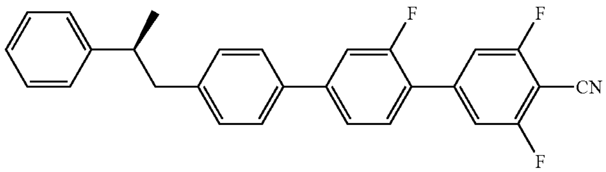
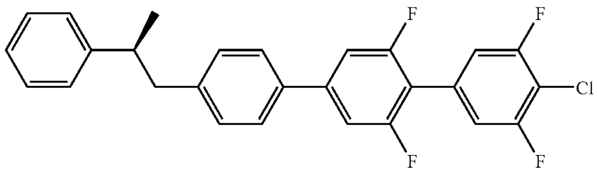
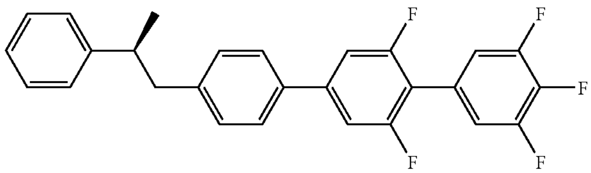
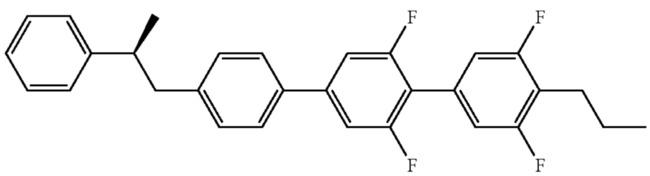
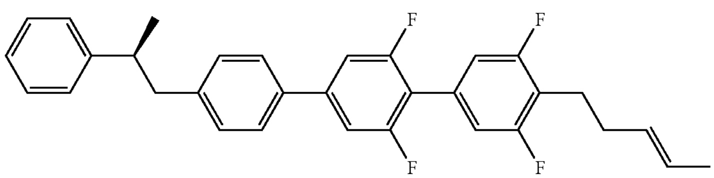
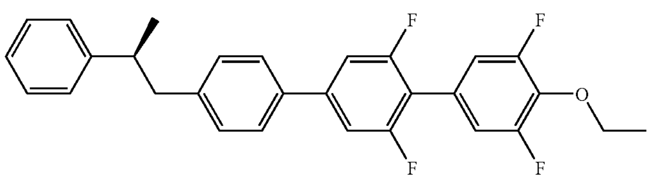
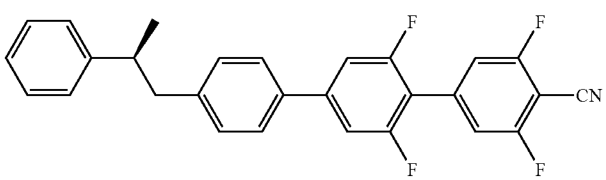
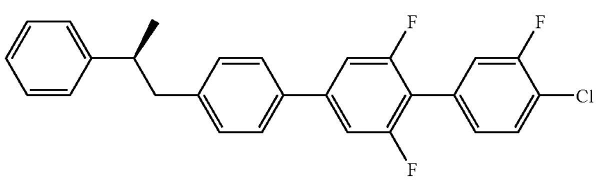
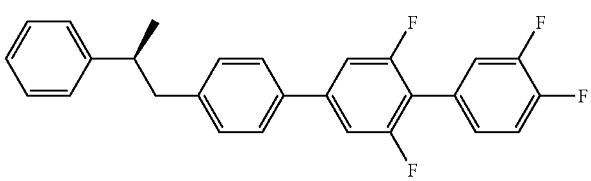

-continued
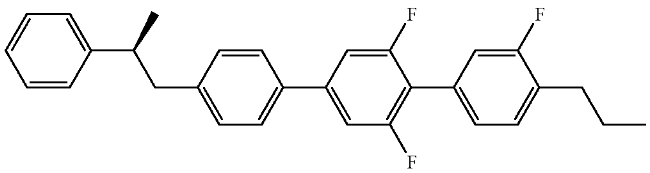
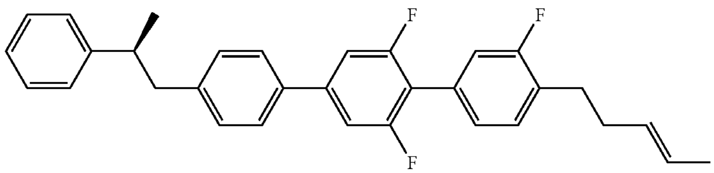
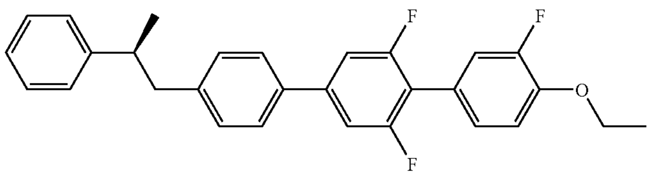
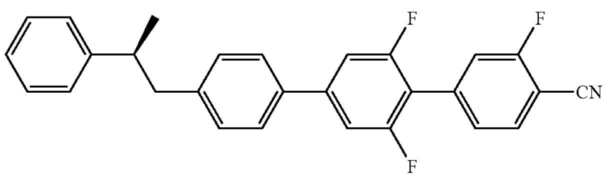
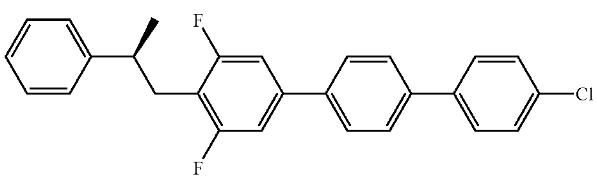
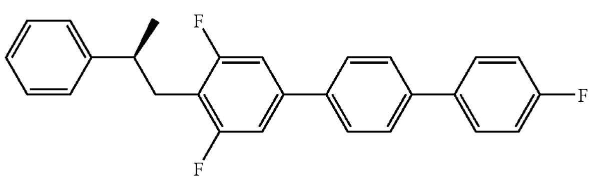
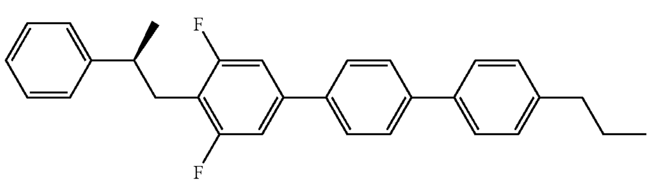
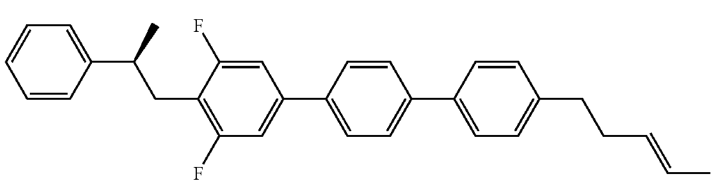
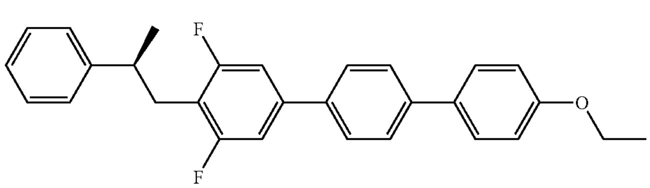

-continued
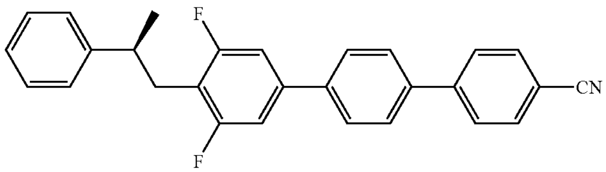
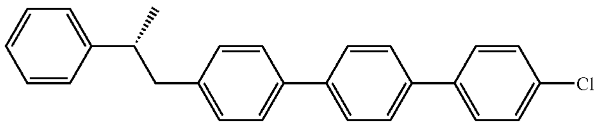
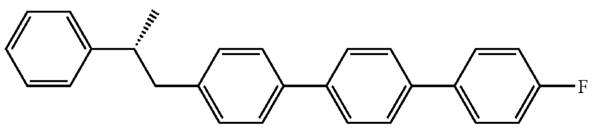
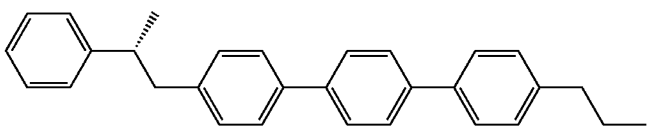
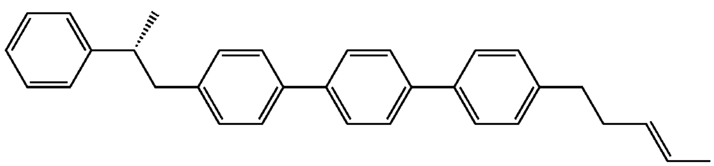
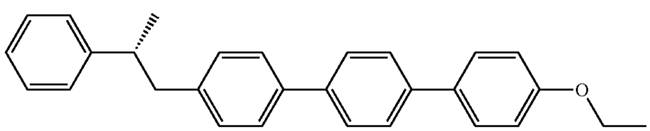
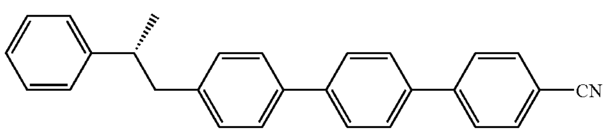
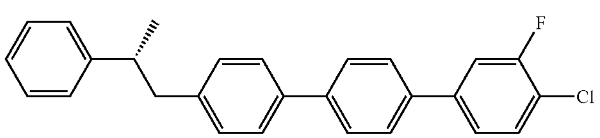
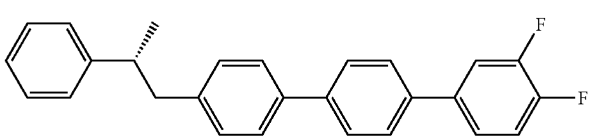
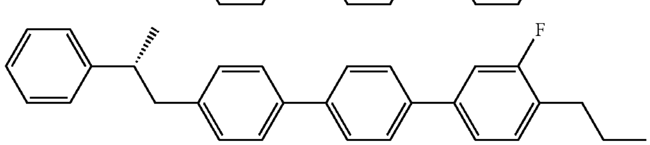
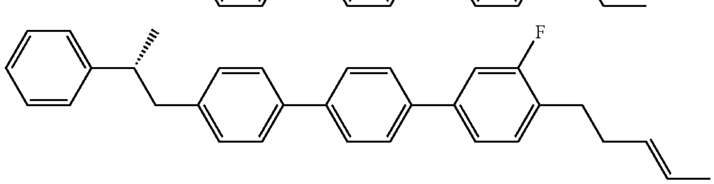
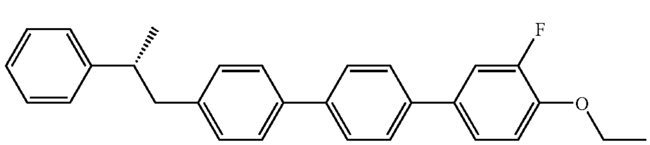

-continued
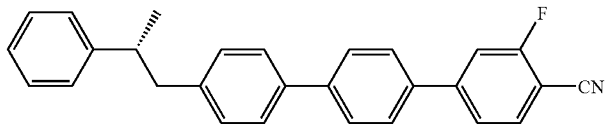
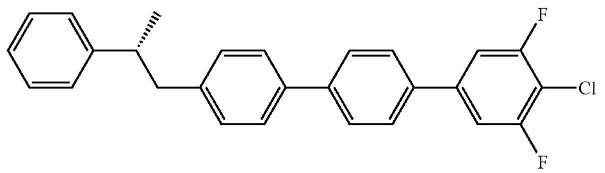
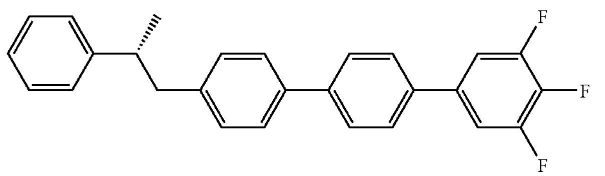
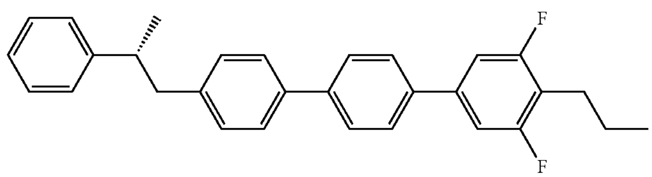
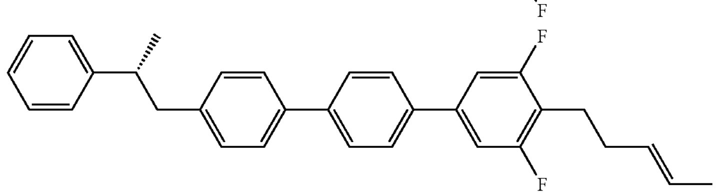
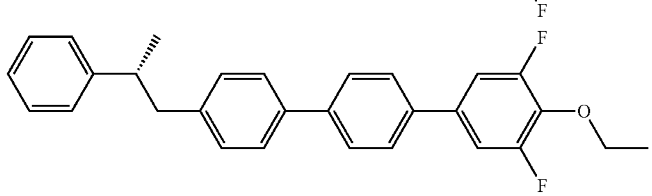
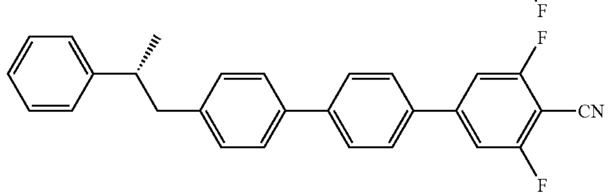
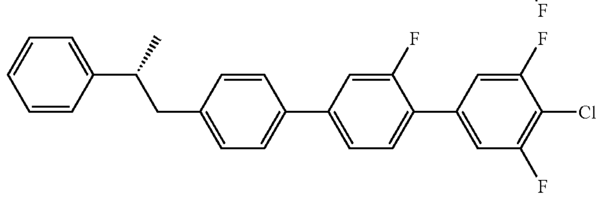
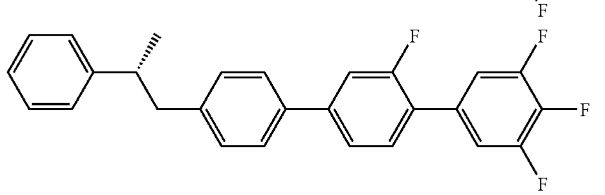
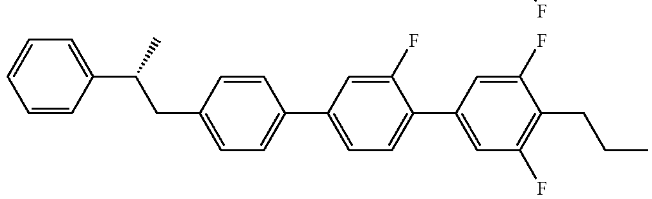

-continued
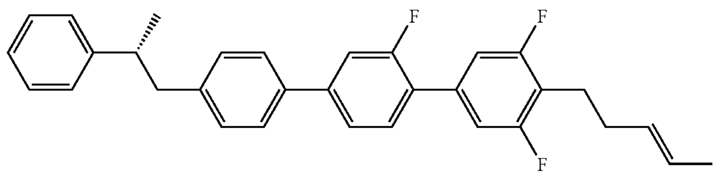
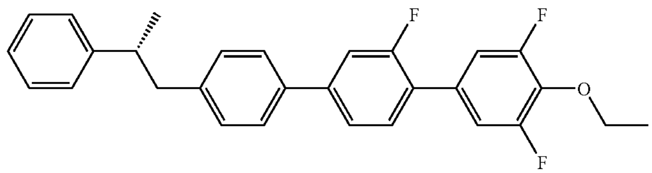
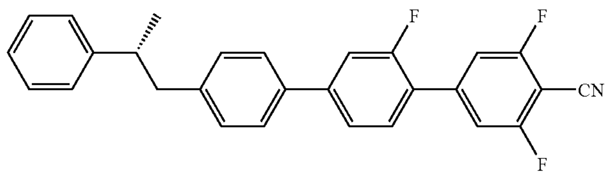
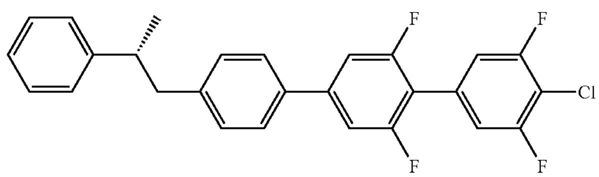
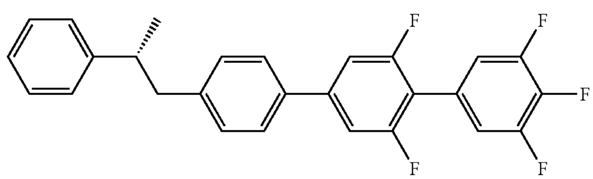
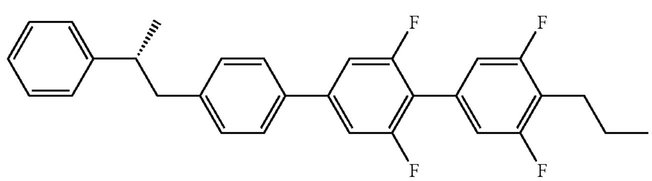
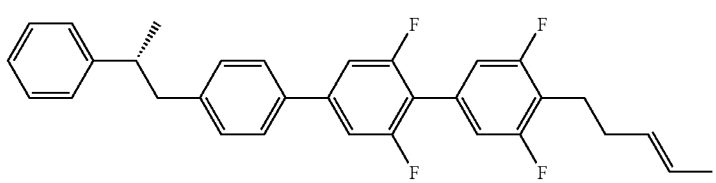
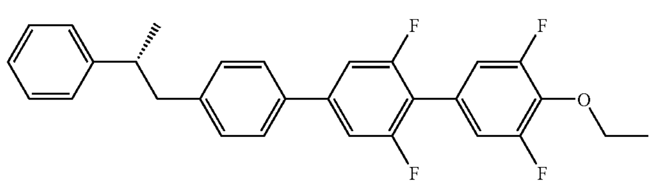
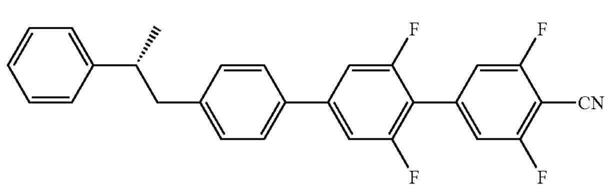

-continued
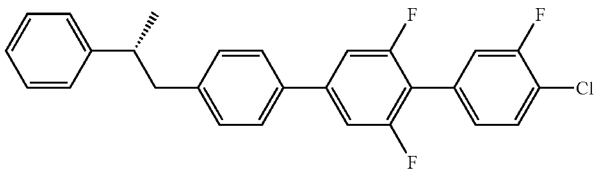
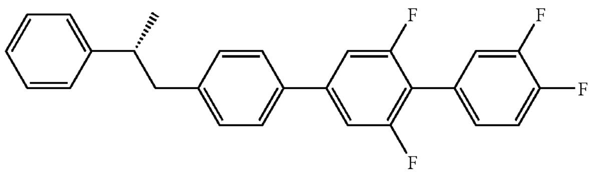
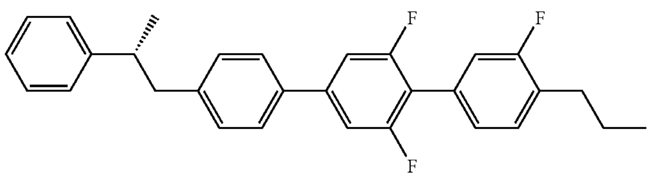
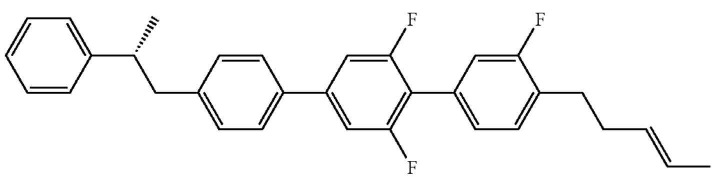
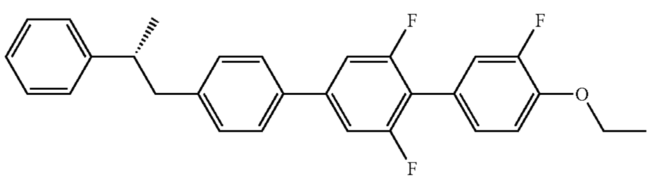
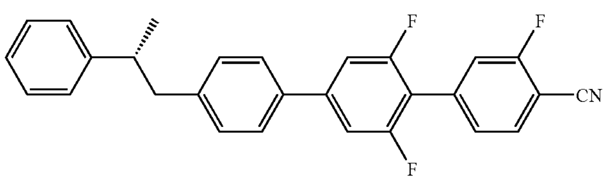
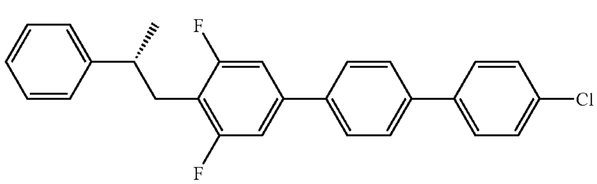
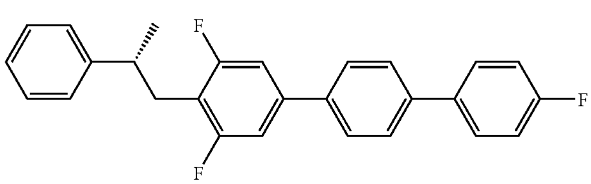
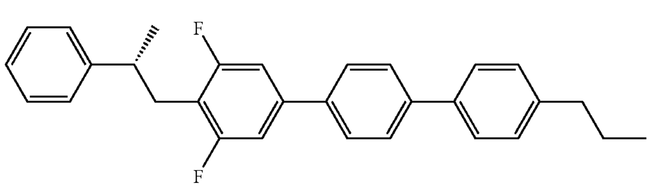

-continued
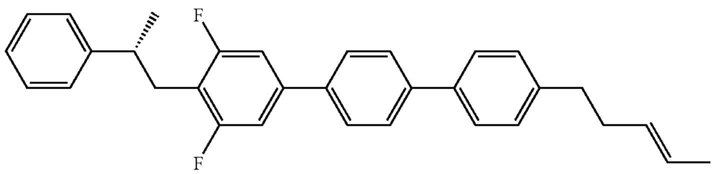
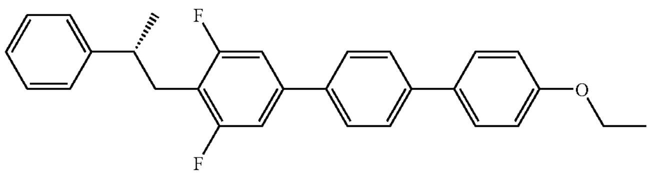
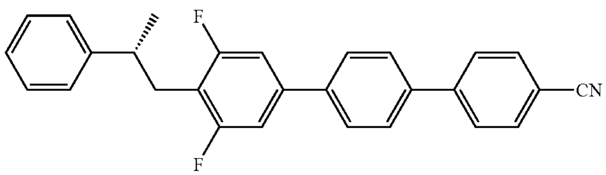
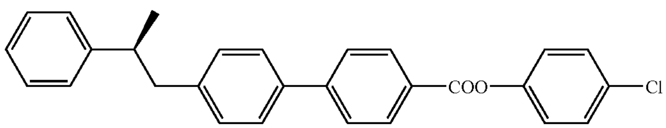
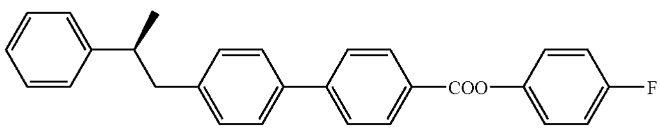
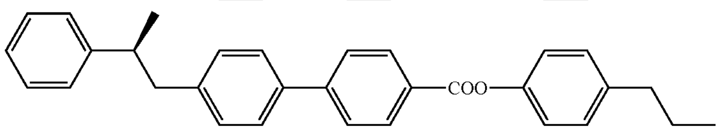
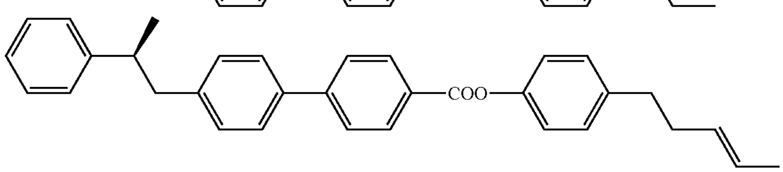
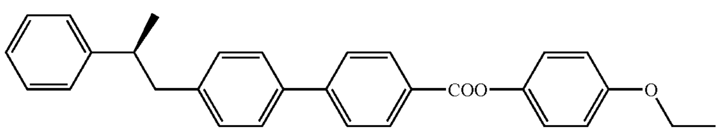
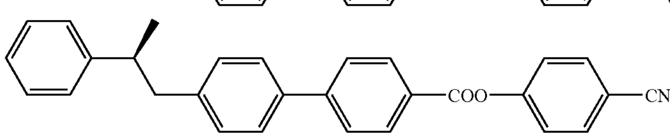
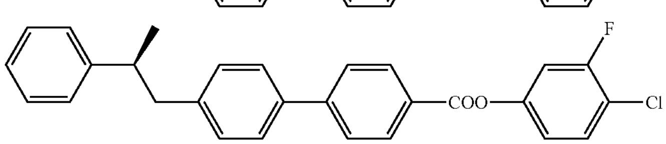
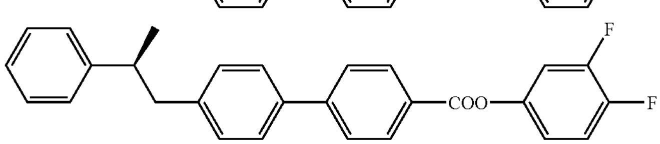
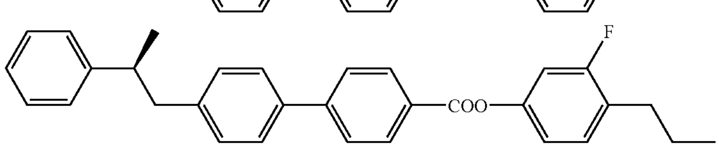

-continued
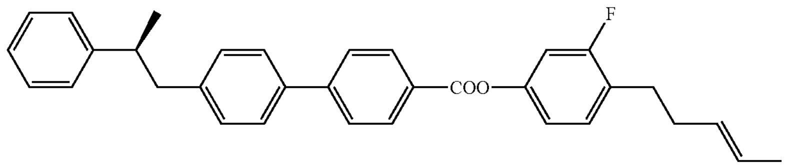
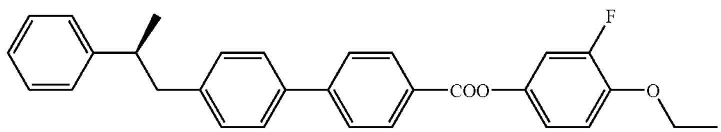
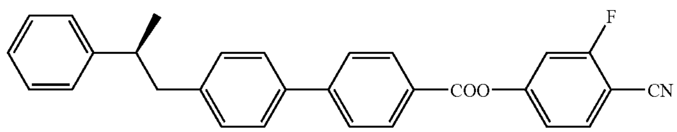
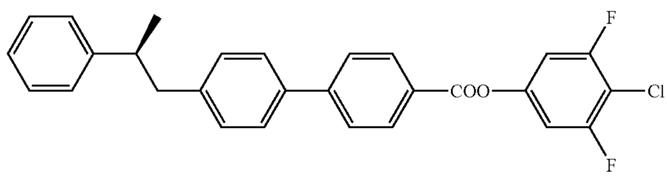
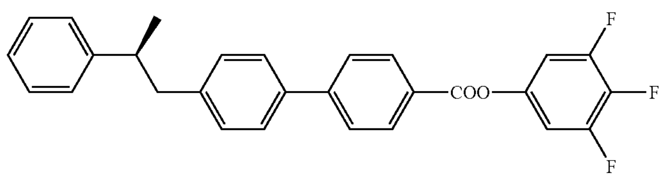
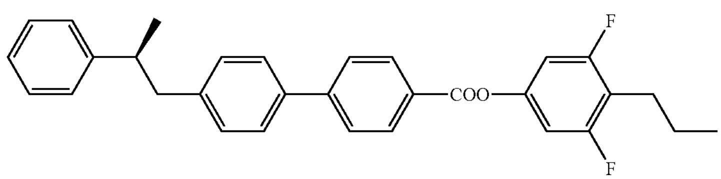
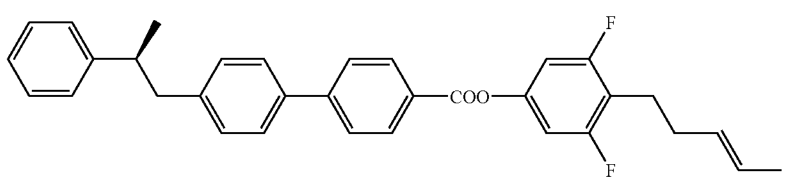
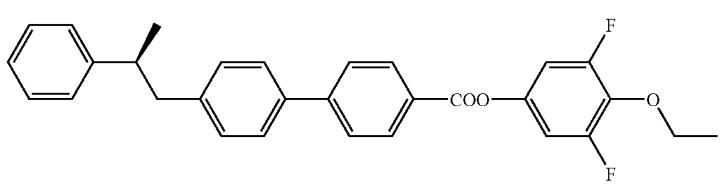
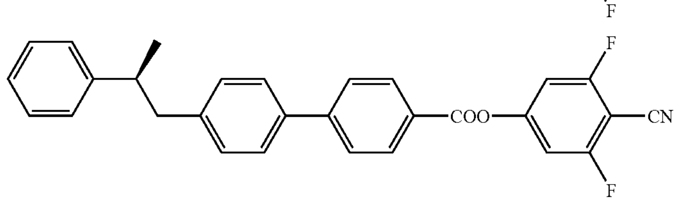
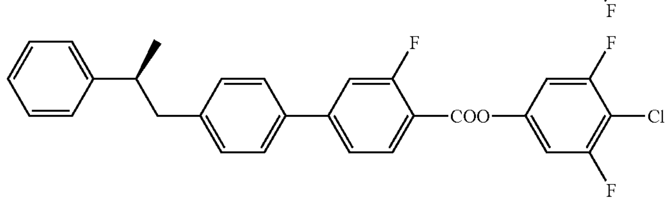

-continued
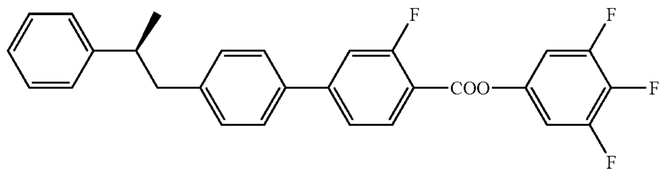
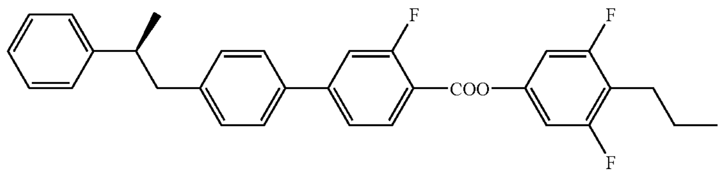
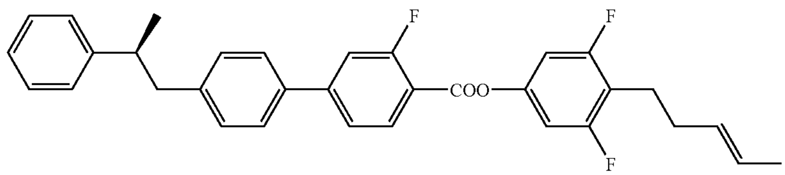
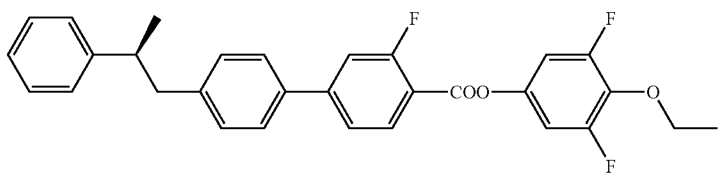
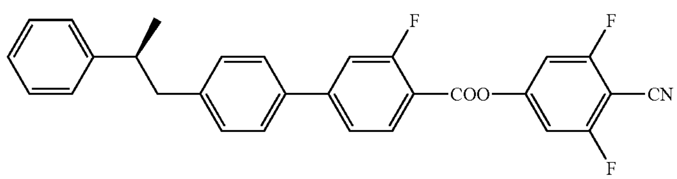
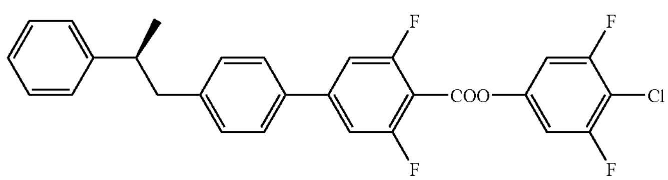
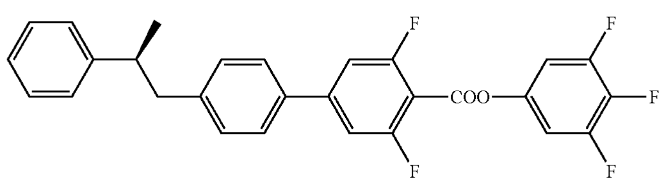
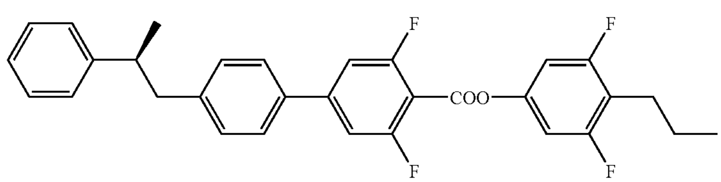
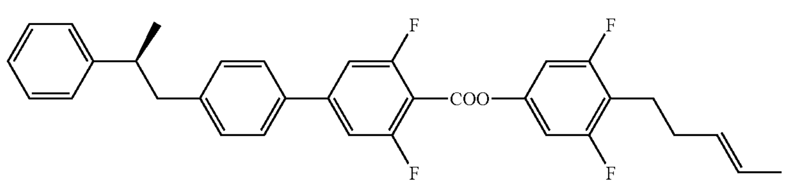

-continued
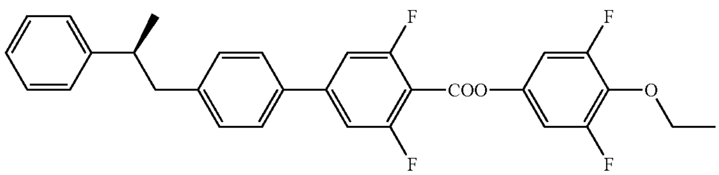
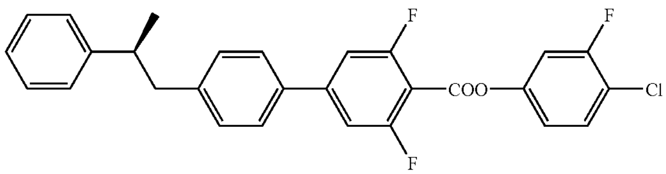
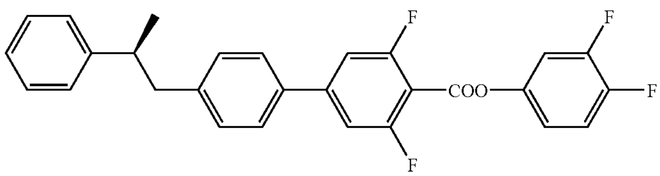
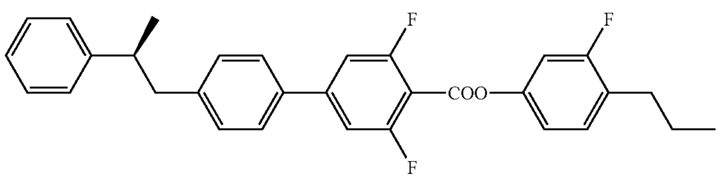
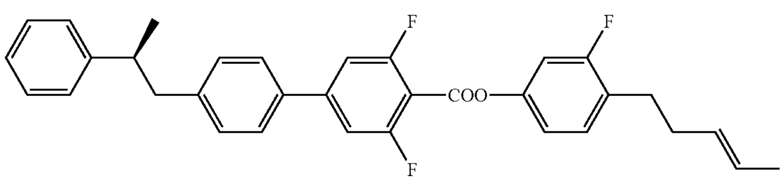
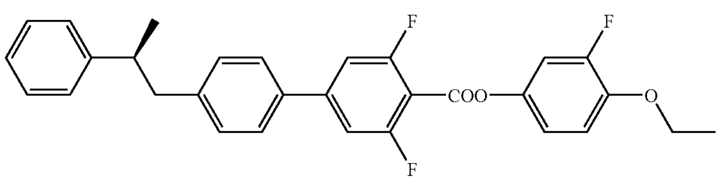
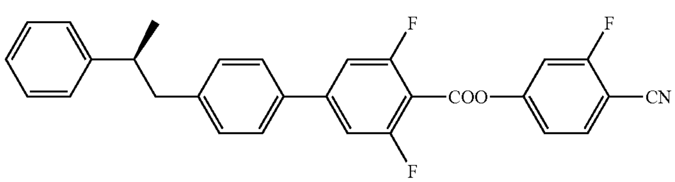
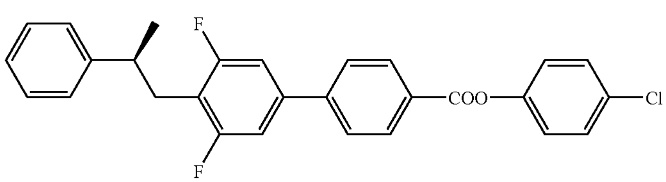
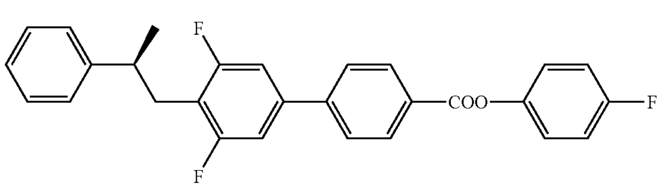

-continued
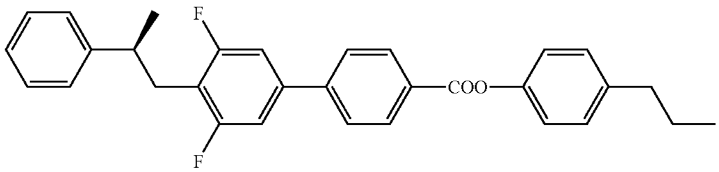
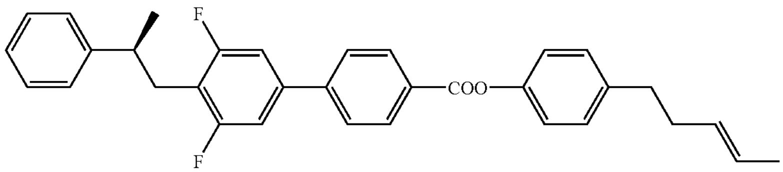
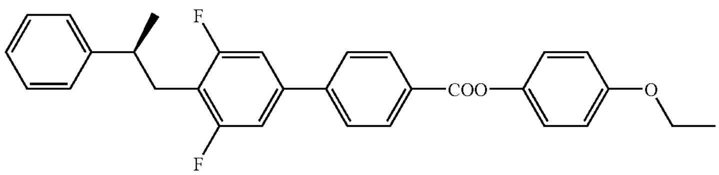
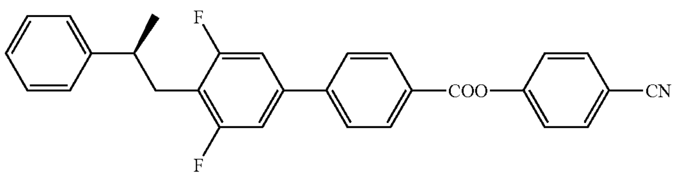
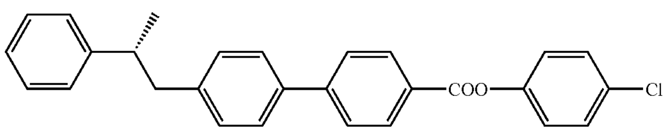
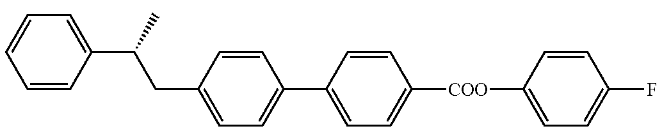
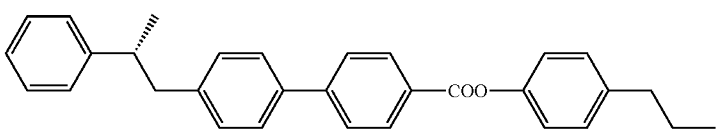
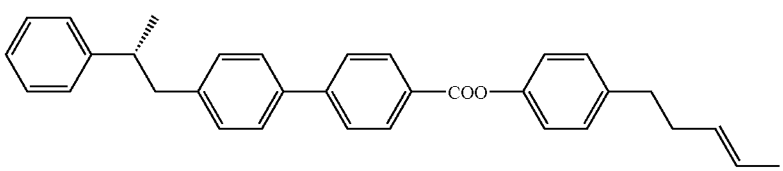
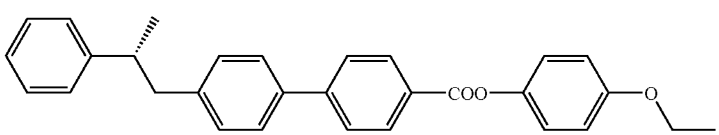
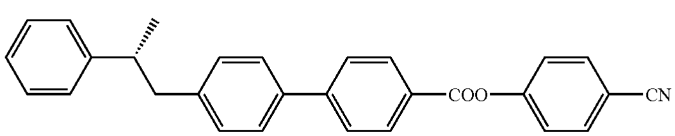
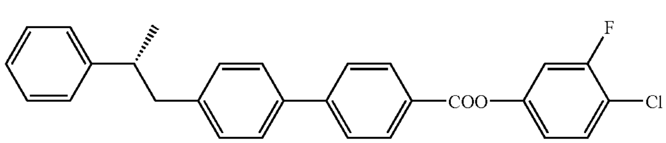

-continued
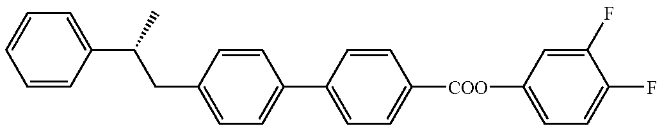
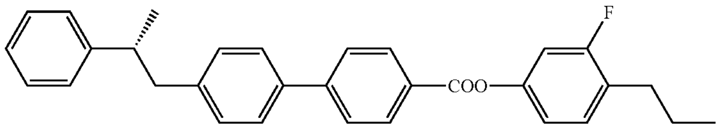
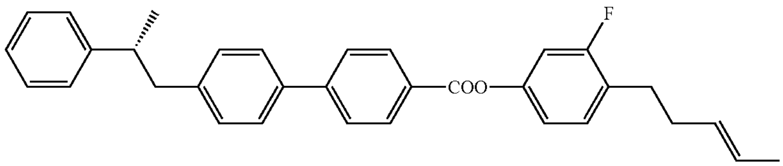
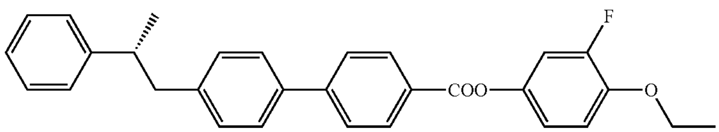
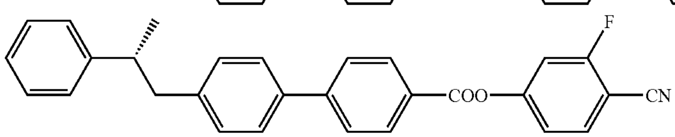
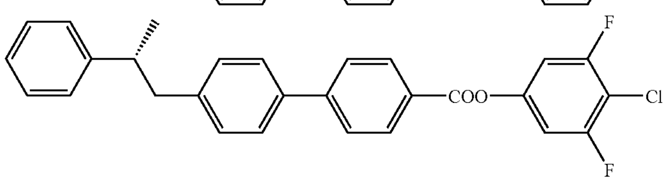
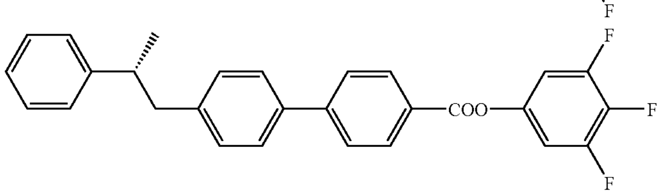
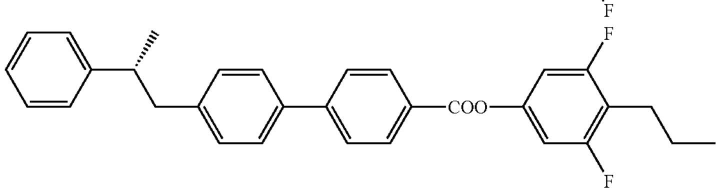
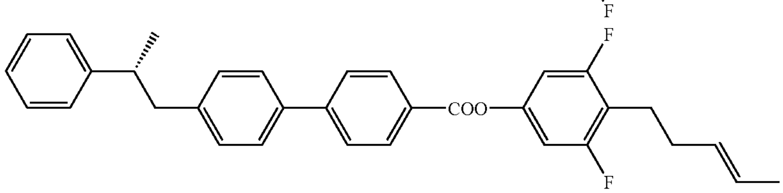
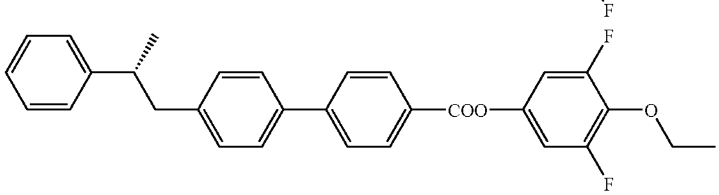
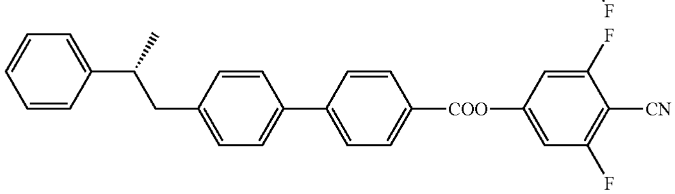

-continued
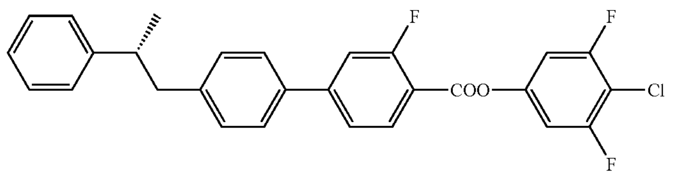
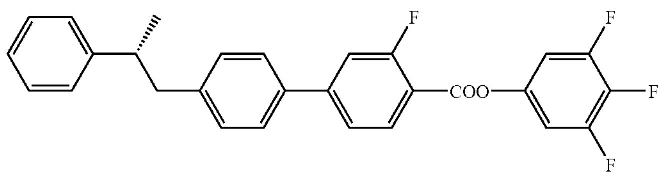
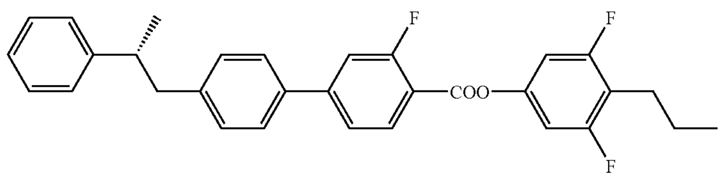
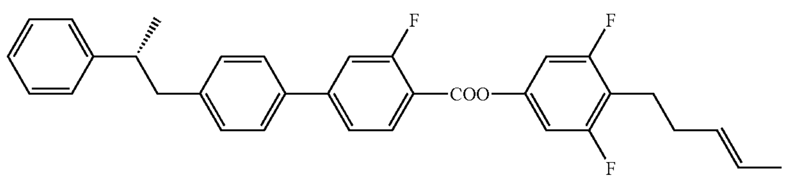
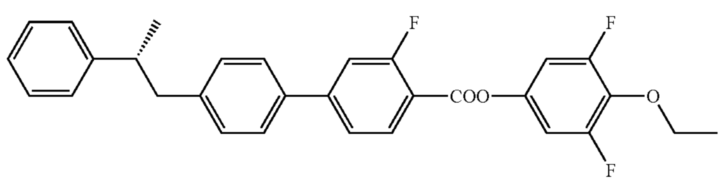
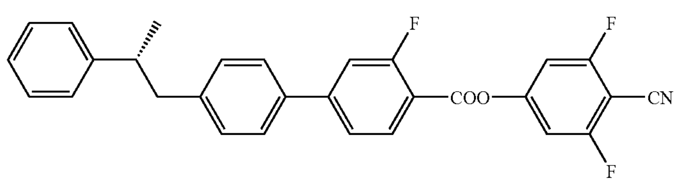
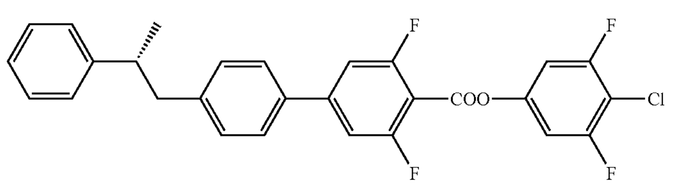
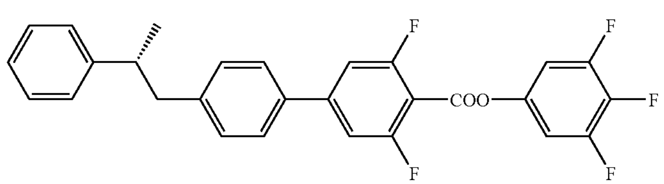
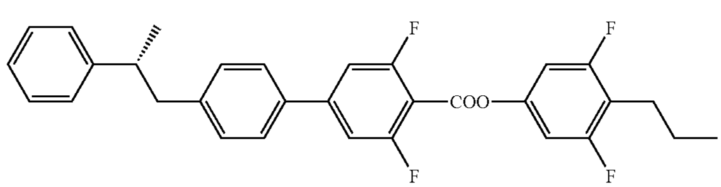

-continued
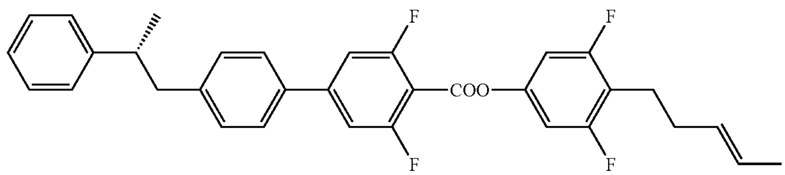
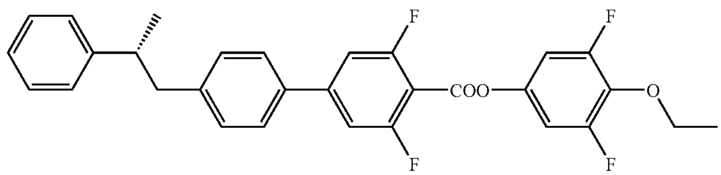
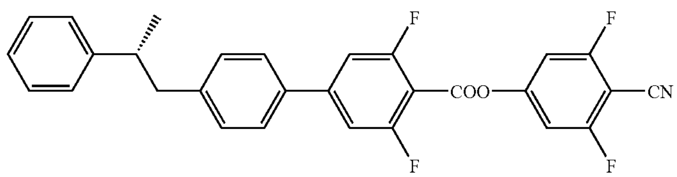
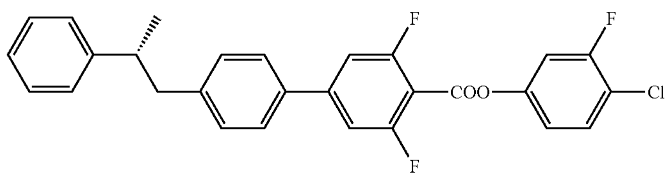
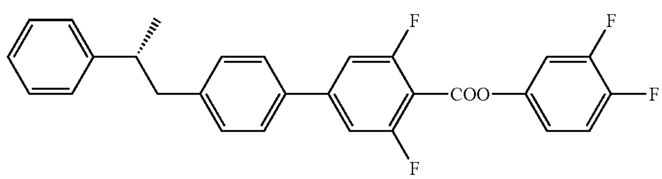
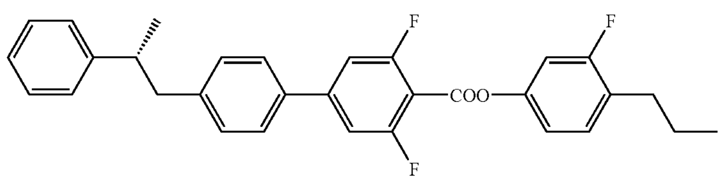
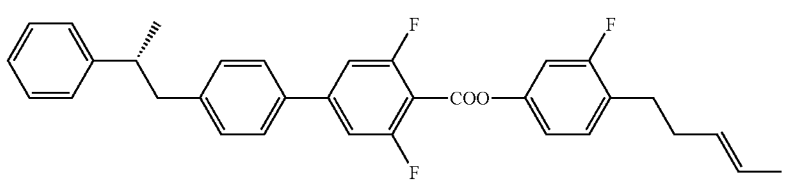
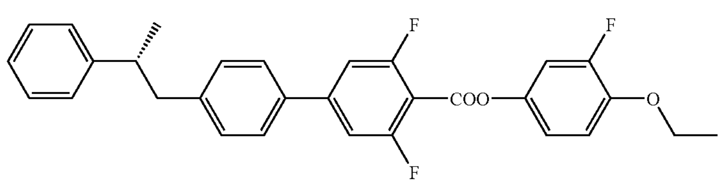
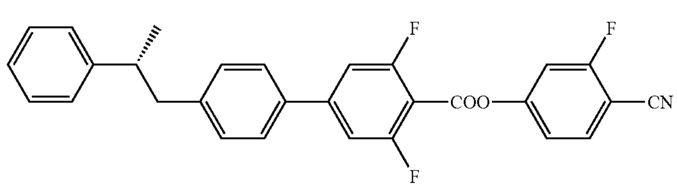

-continued
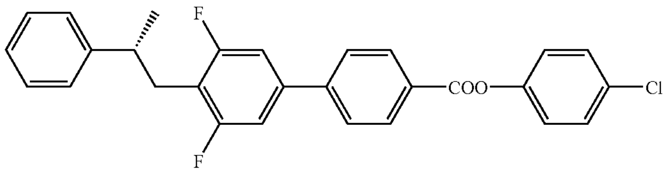
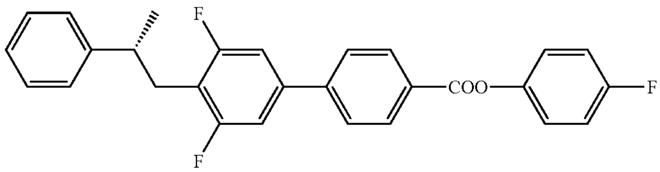
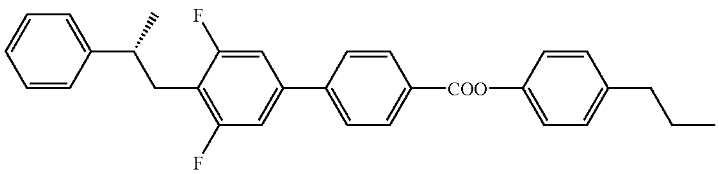
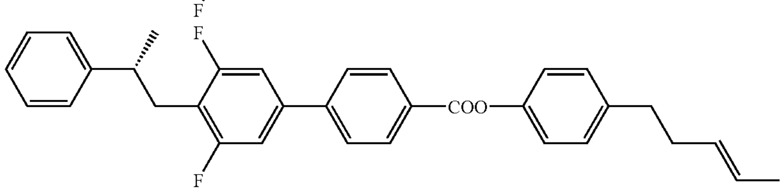
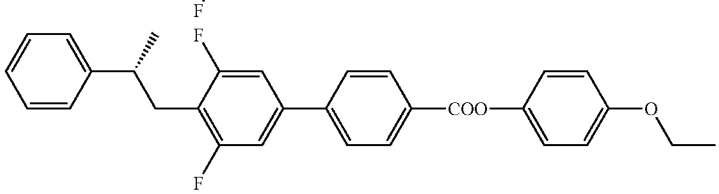
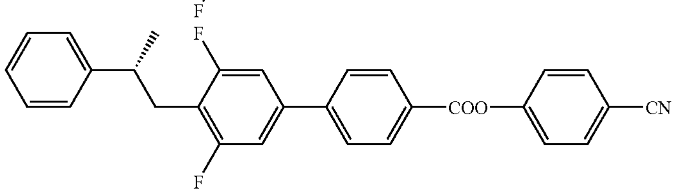
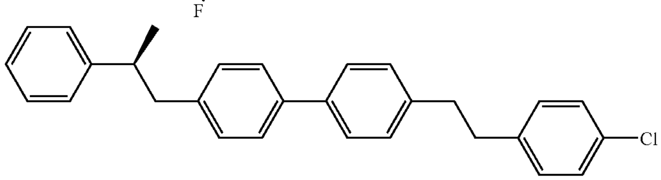
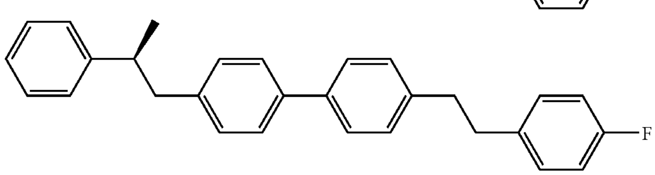
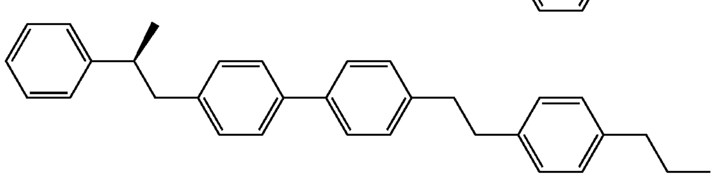
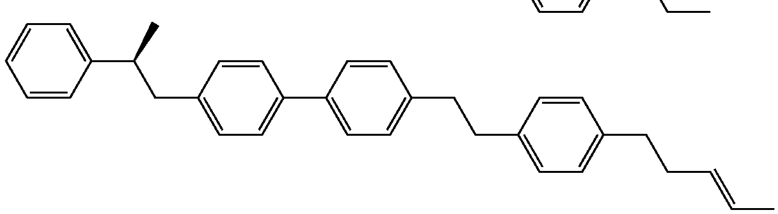

-continued
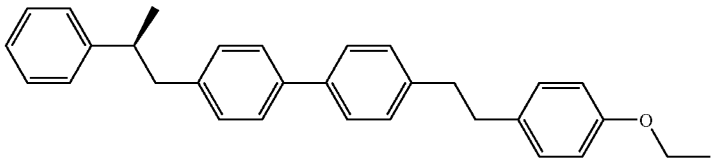
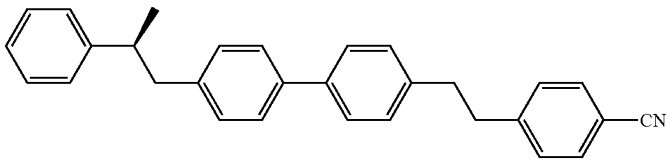
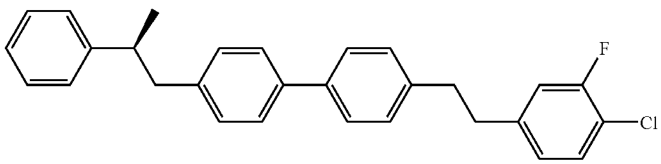
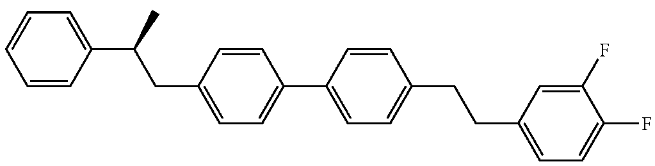
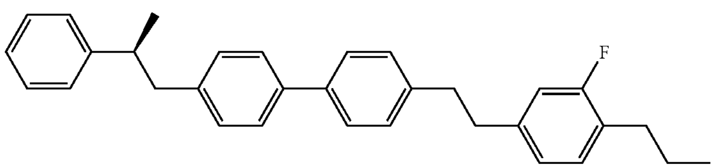
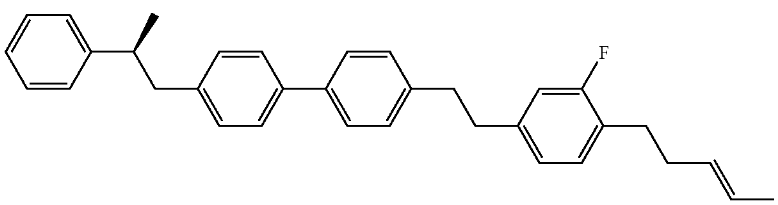
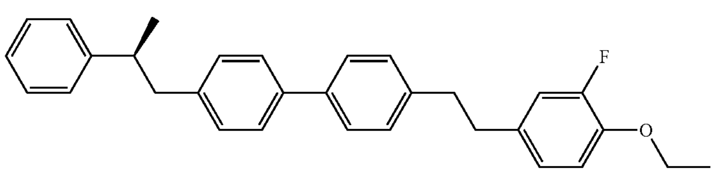
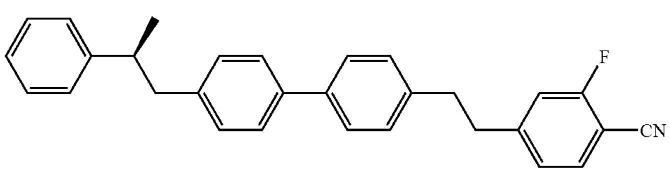
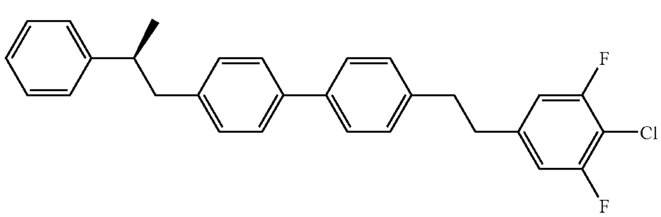

-continued
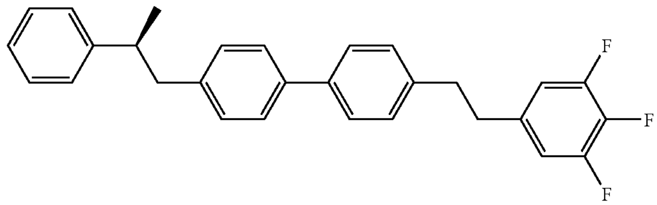
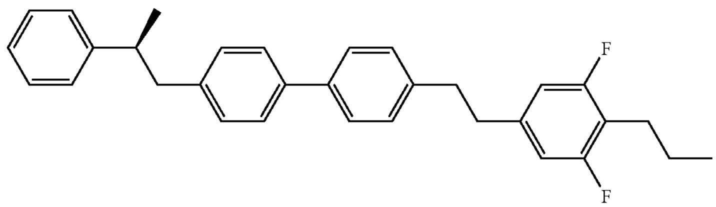
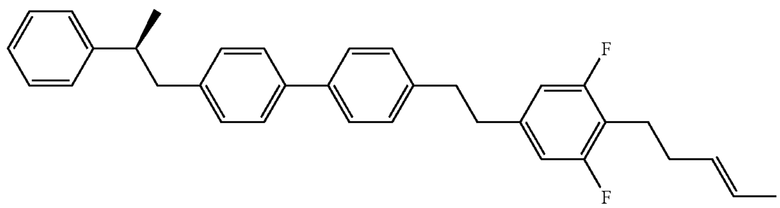
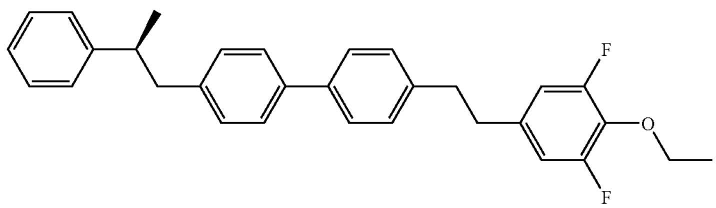
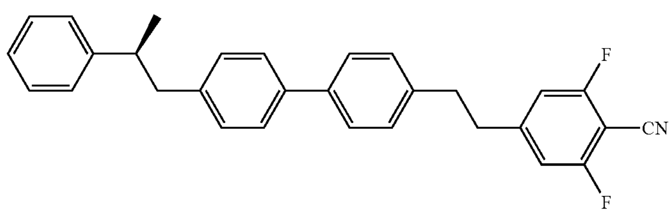
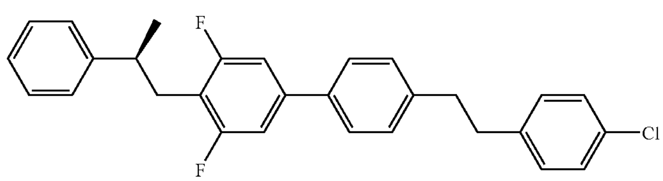
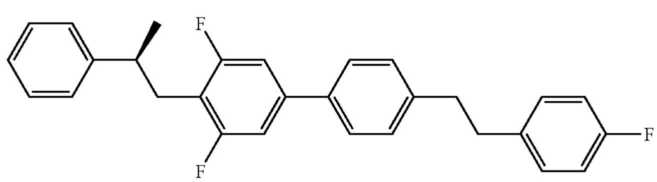
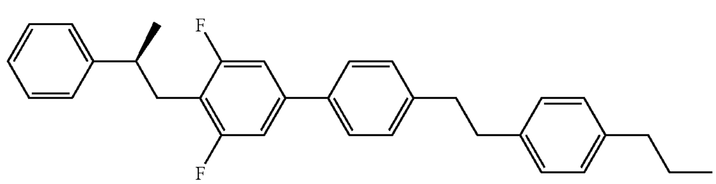

-continued
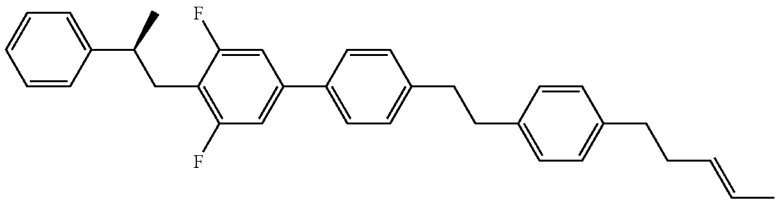
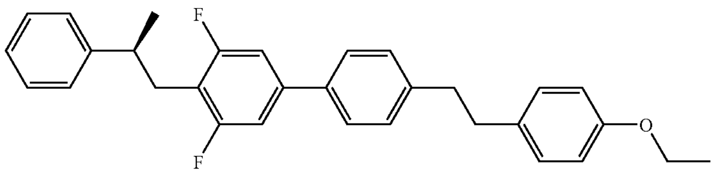
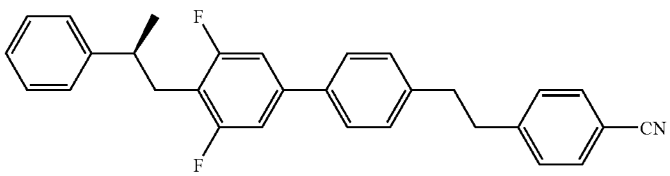
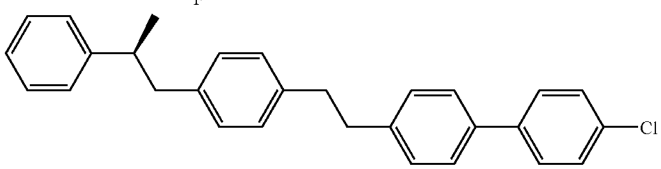
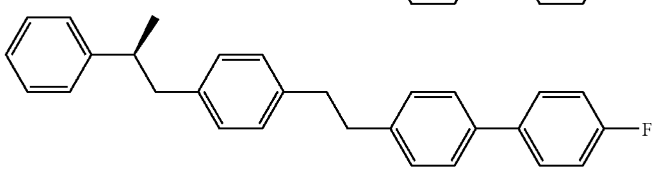
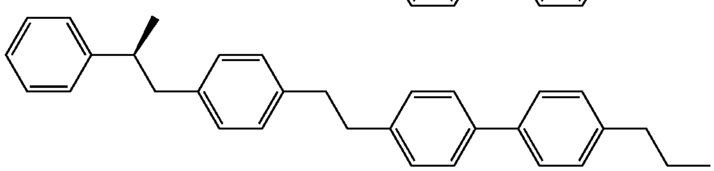
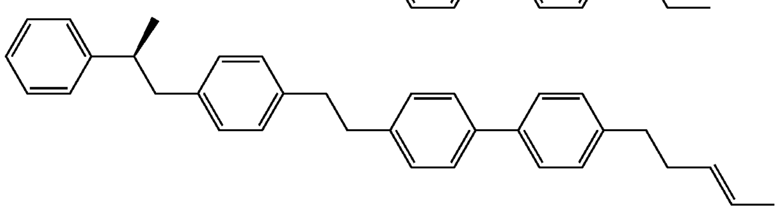
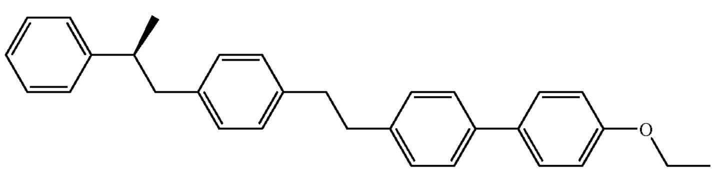
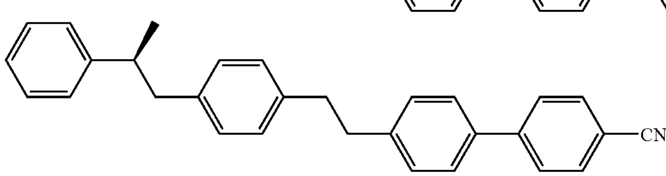
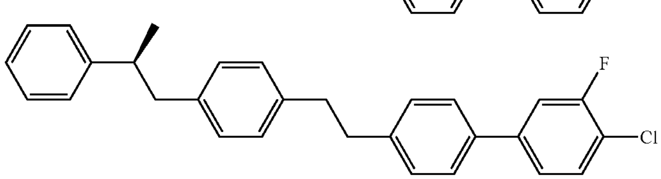

-continued
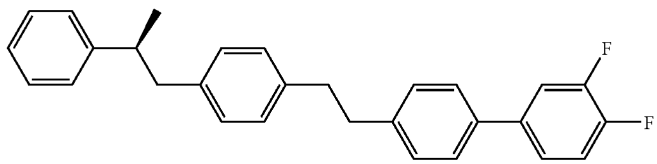
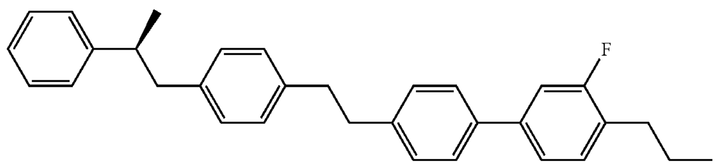
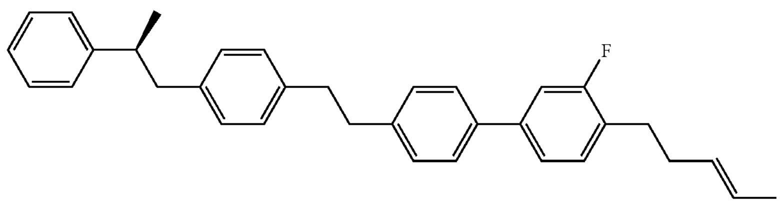
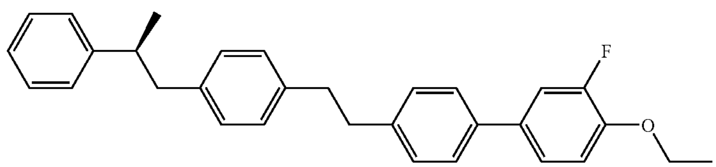
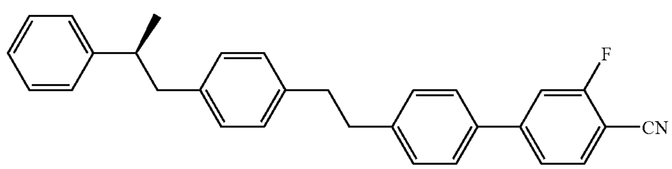
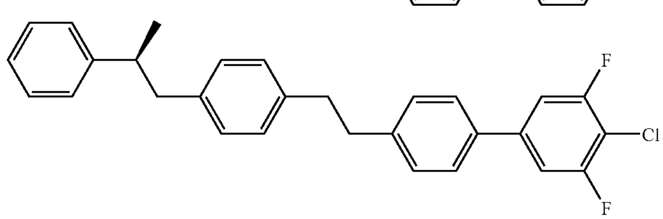
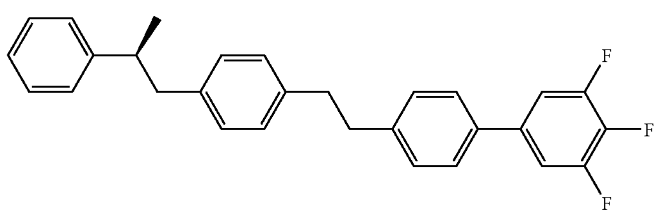
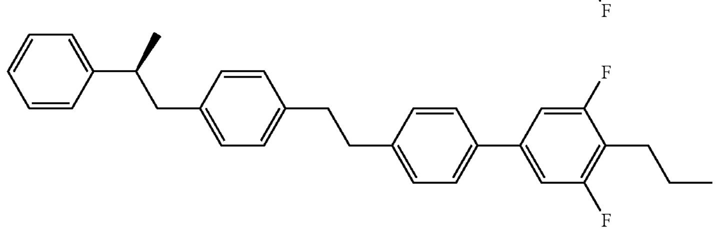
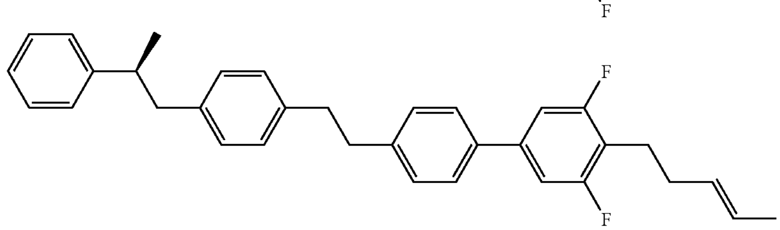

-continued
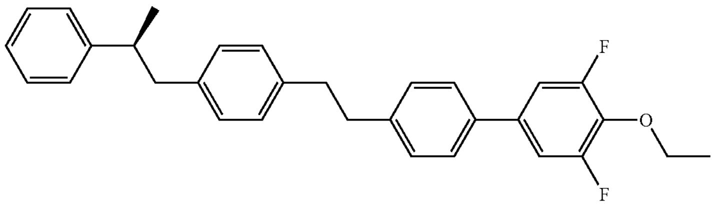
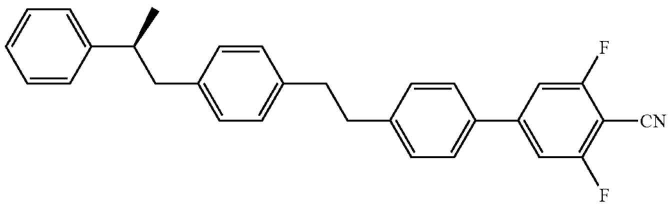
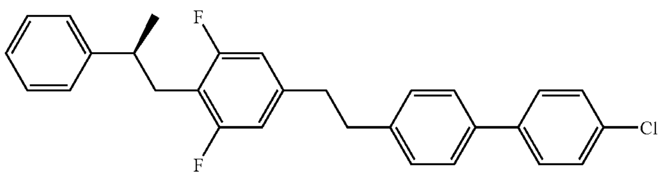
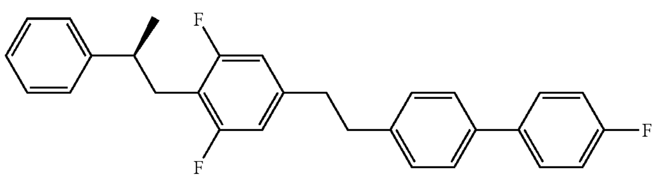
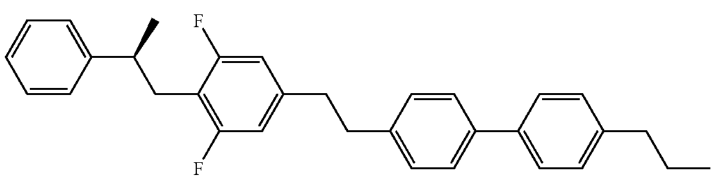
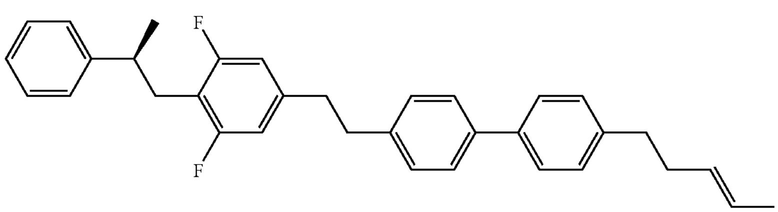
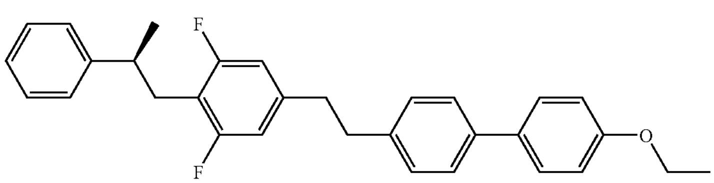
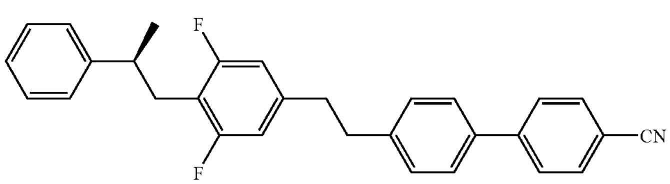
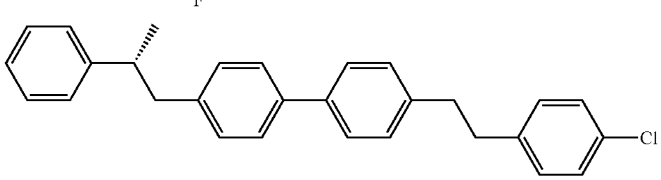

-continued
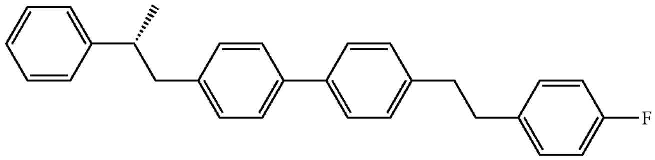
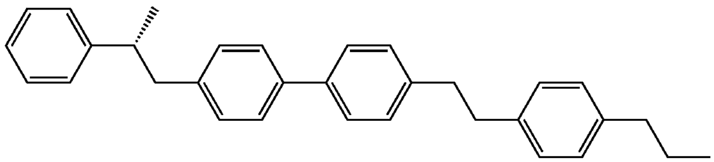
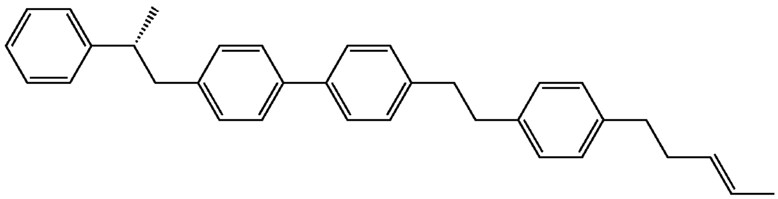
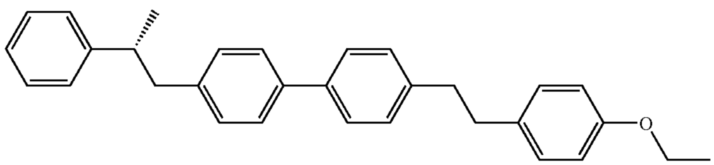
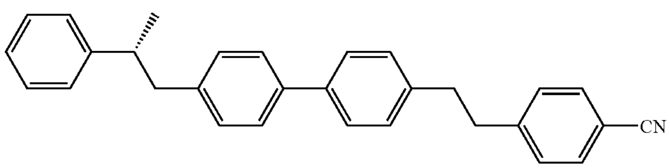
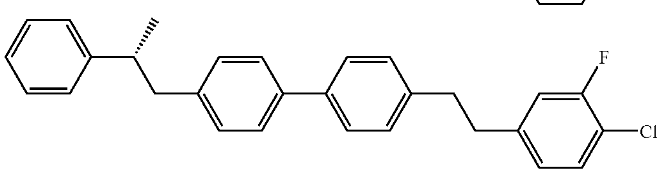
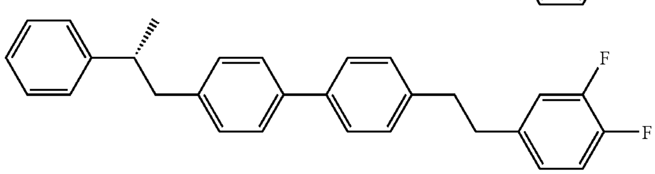
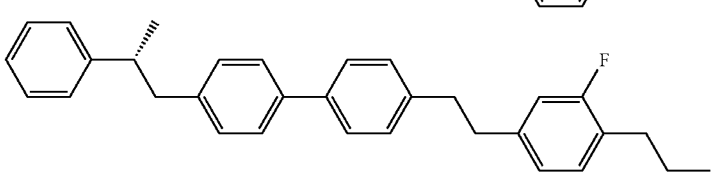
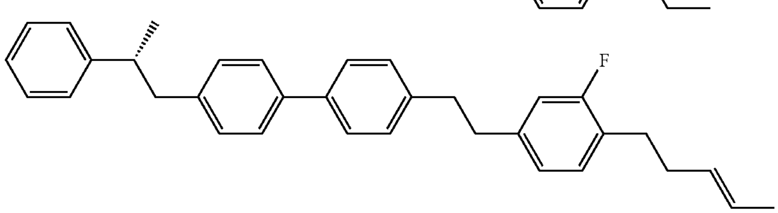
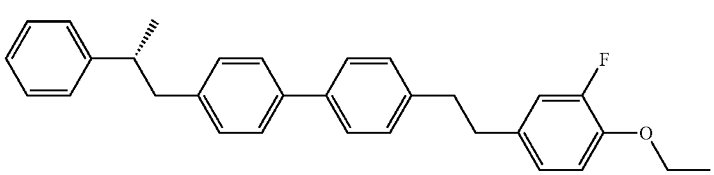

-continued
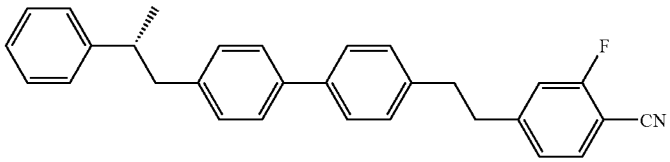
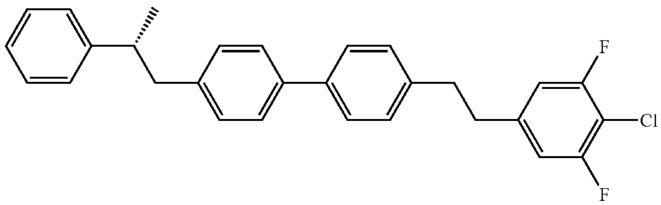
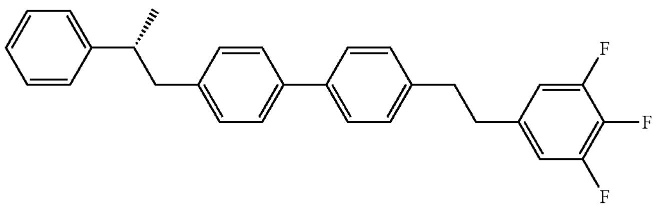
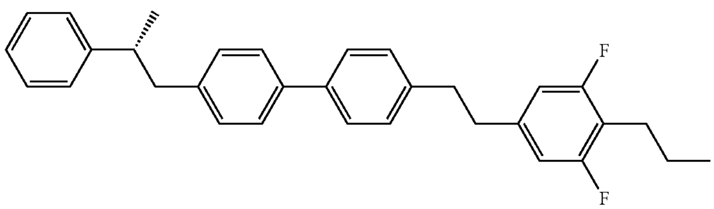
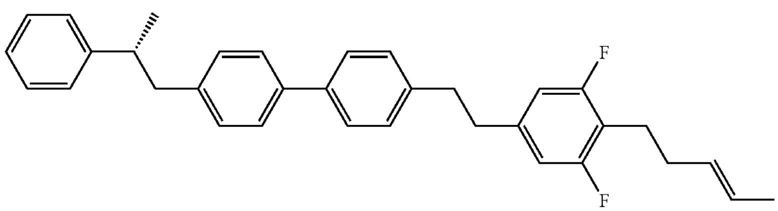
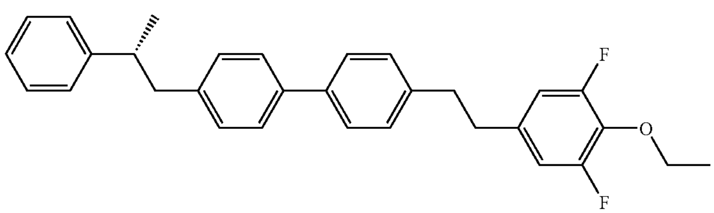
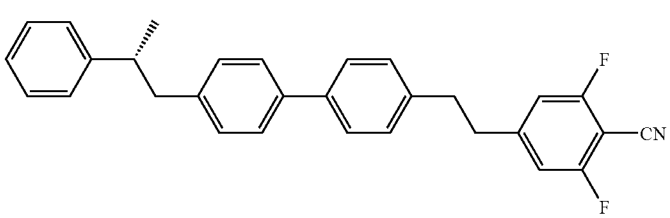
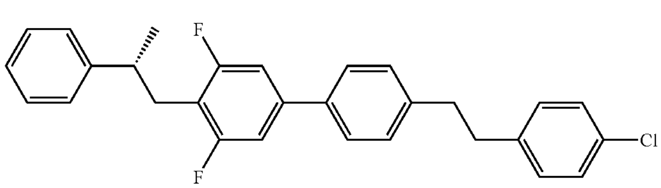

-continued
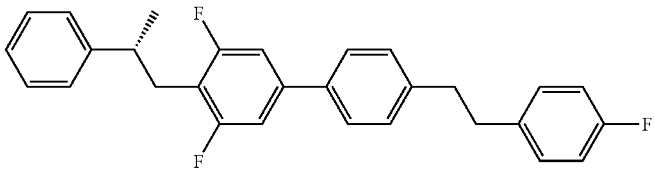
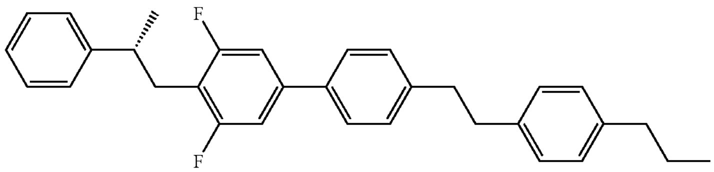
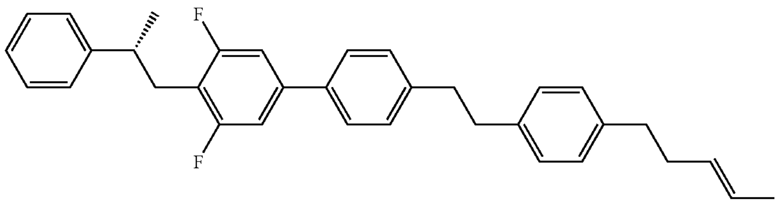
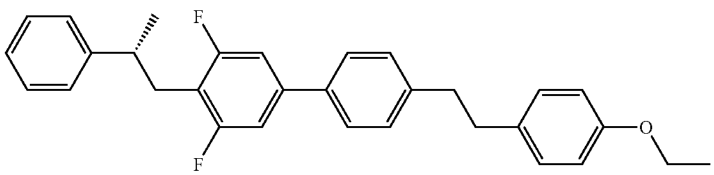
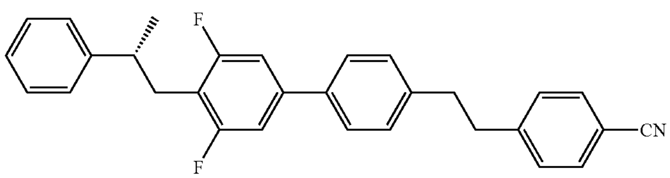
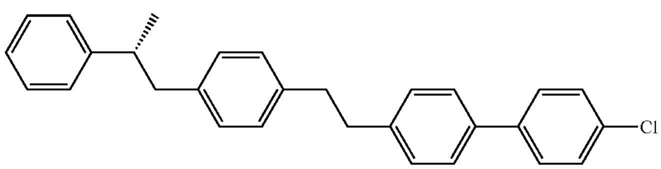
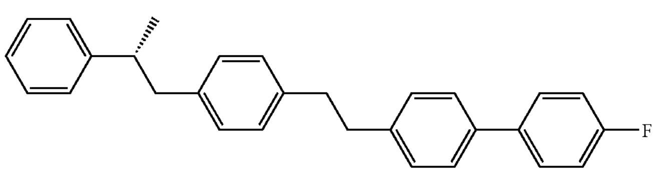
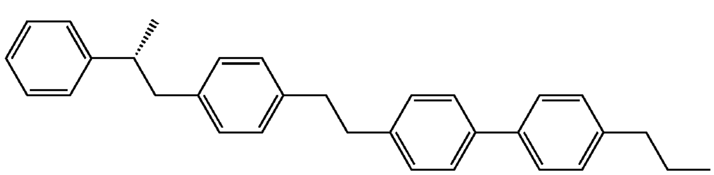
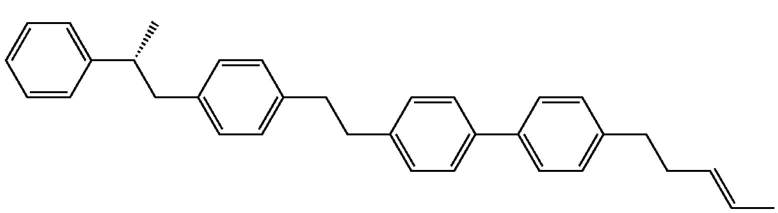

-continued
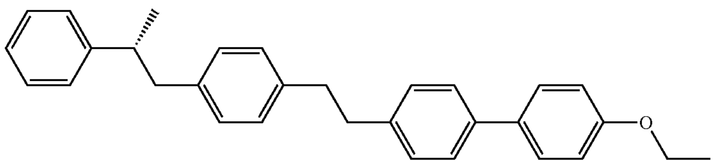
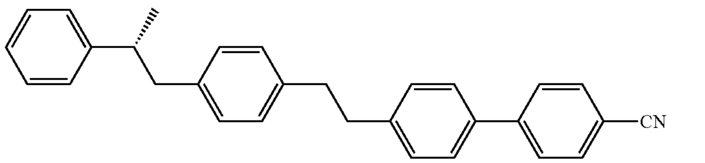
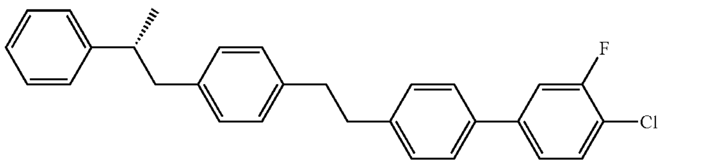
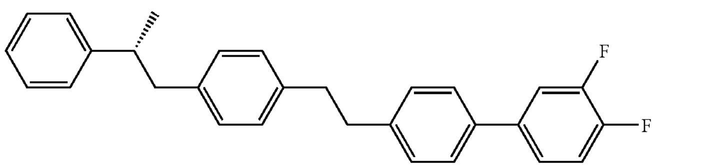
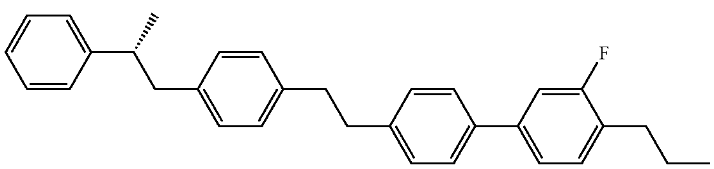
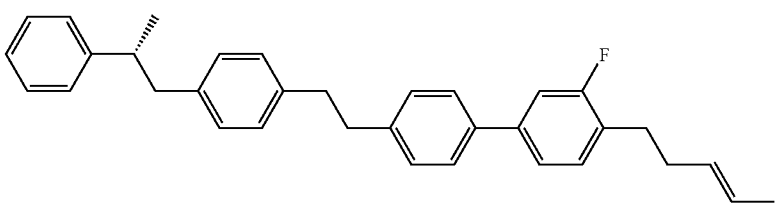
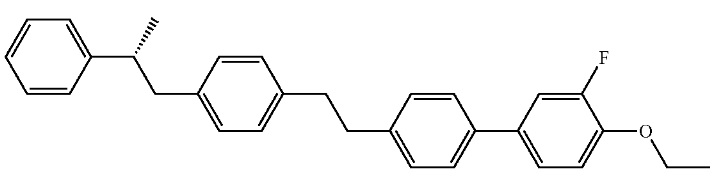
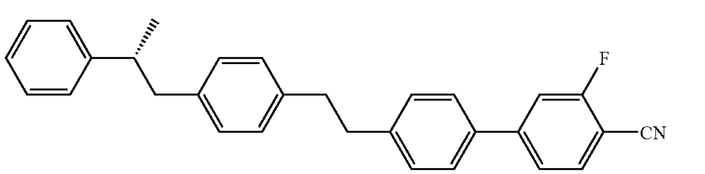
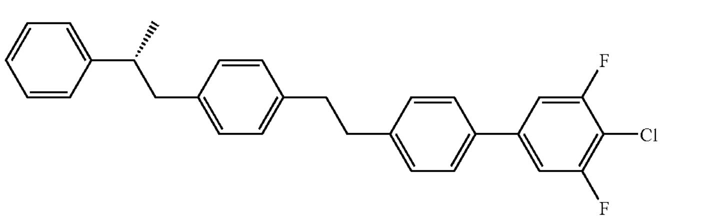

-continued
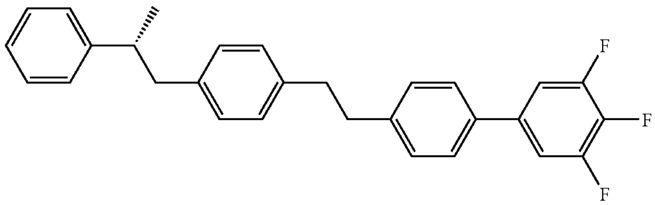
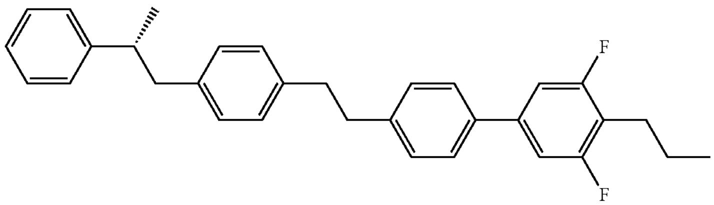
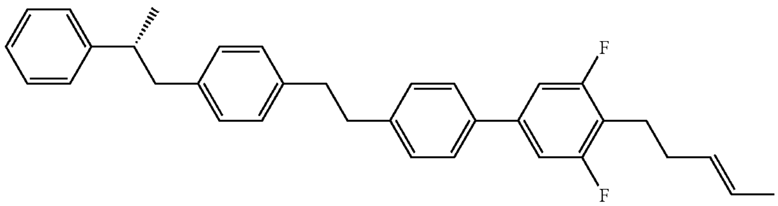
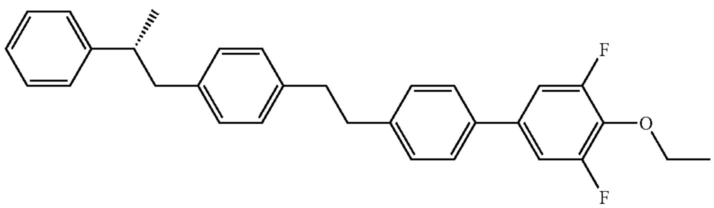
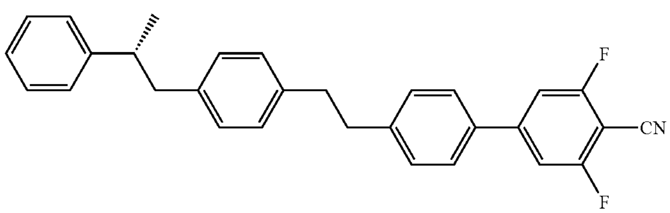
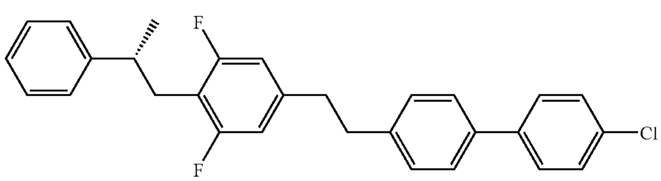
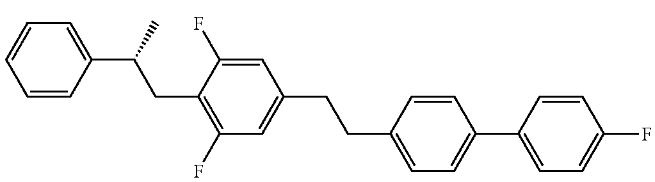
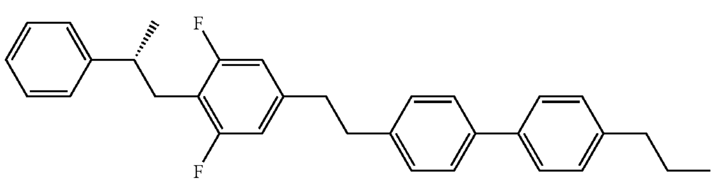

-continued
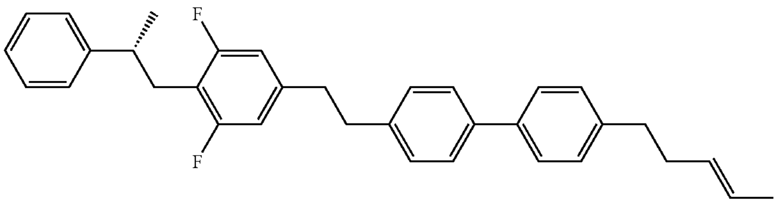
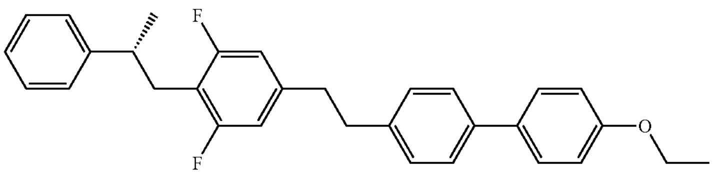
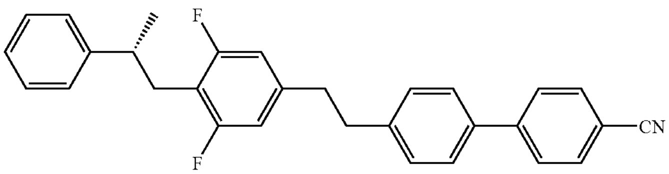
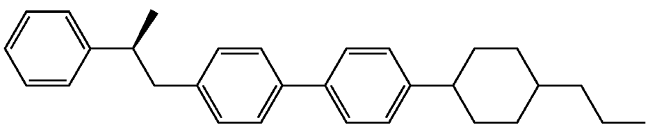
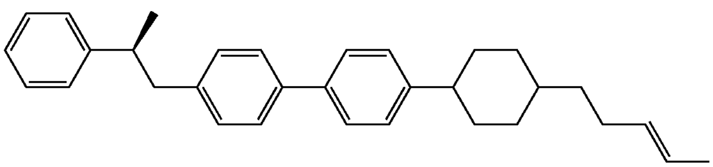
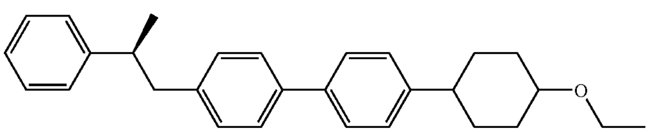
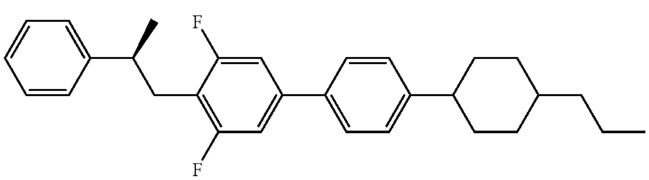
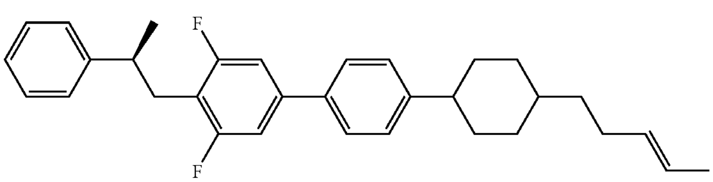
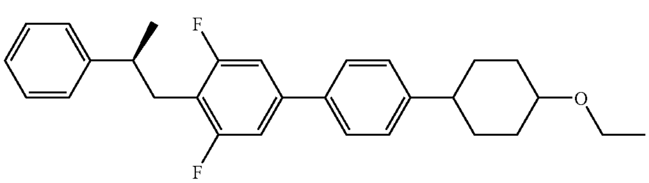
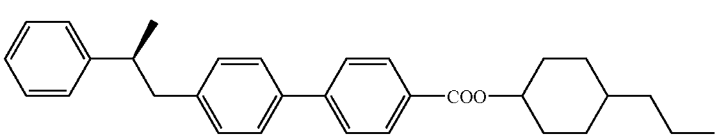

-continued
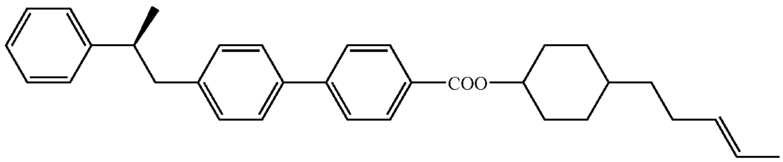
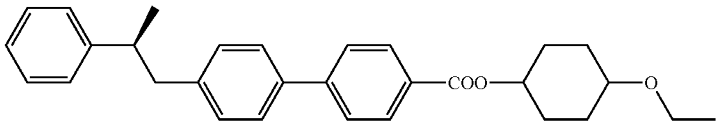
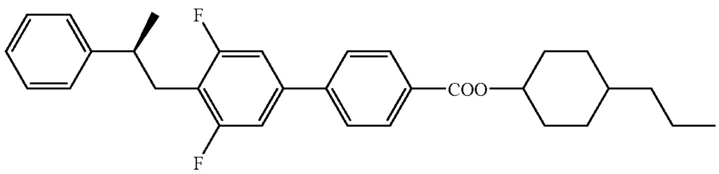
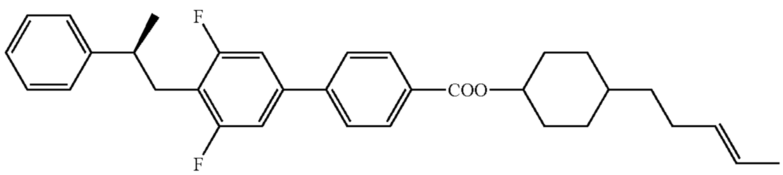
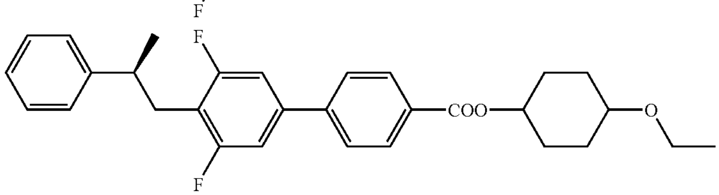
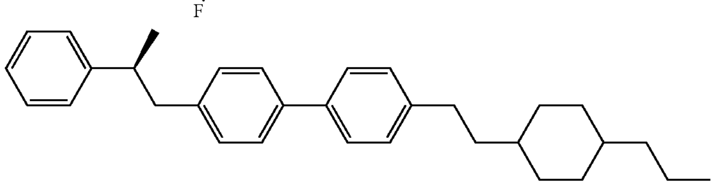
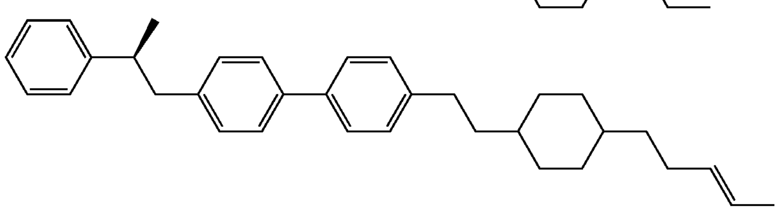
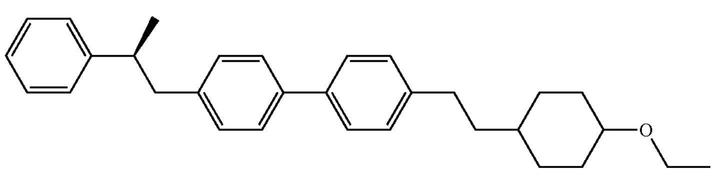
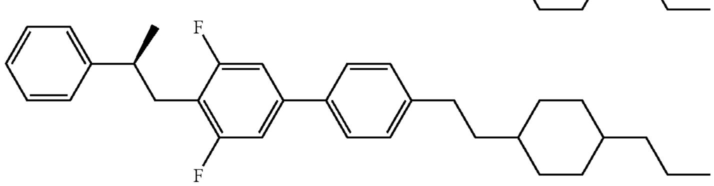
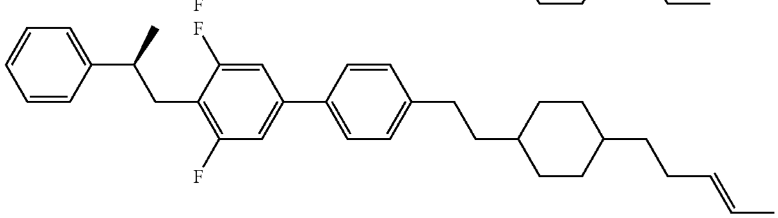

-continued
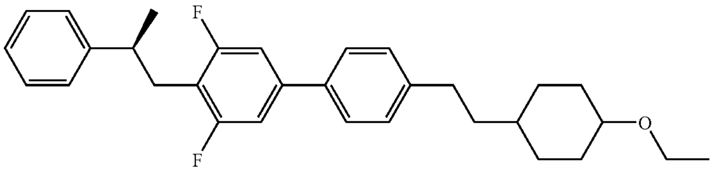
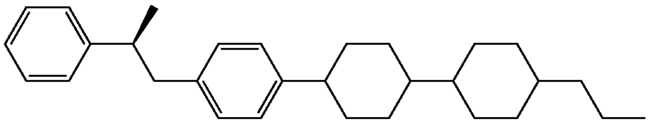
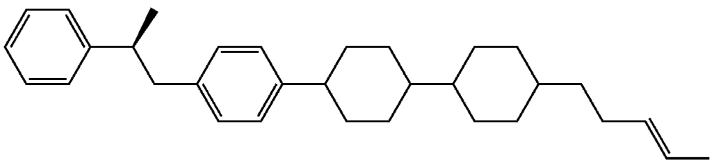
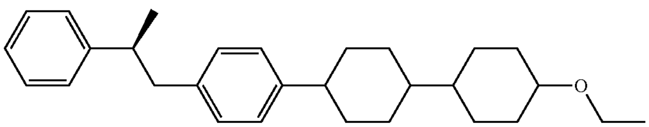
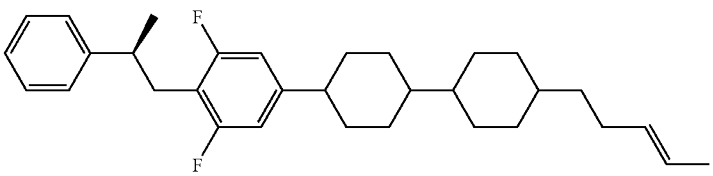
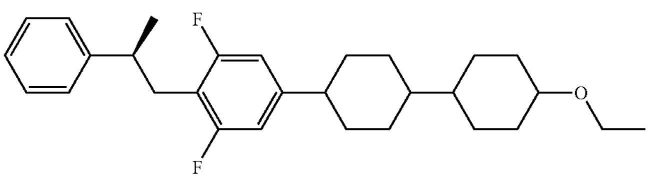
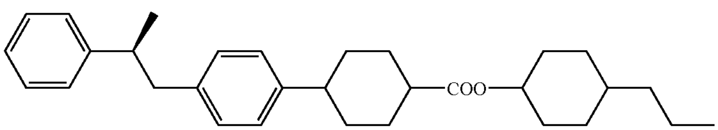
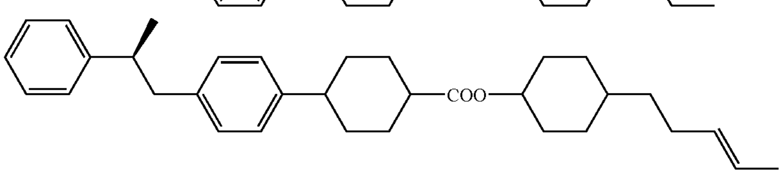
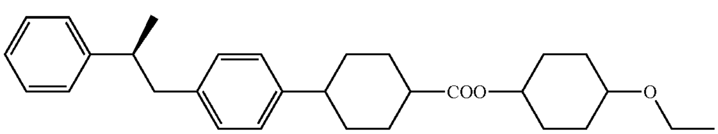
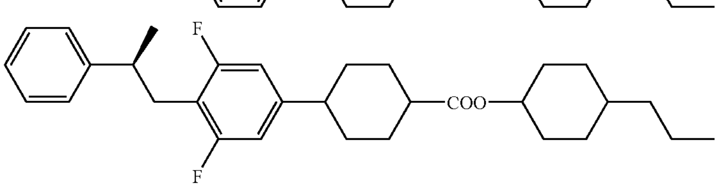
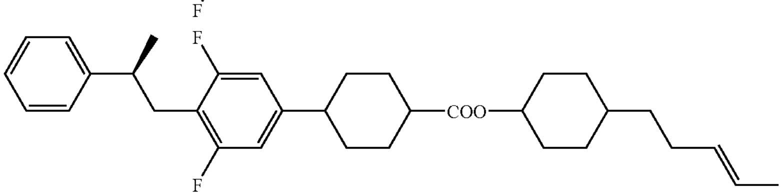

-continued
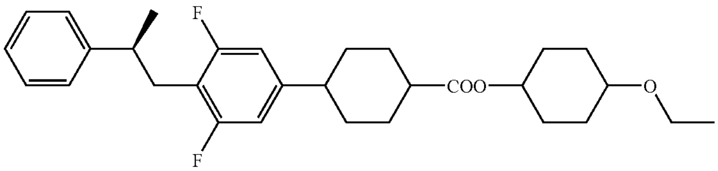
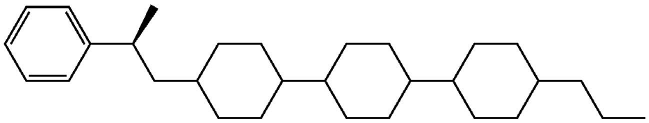
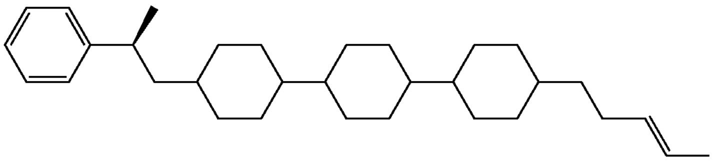
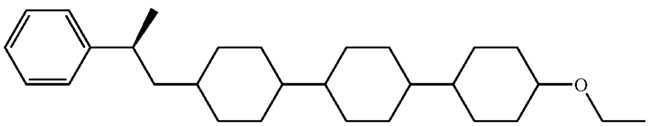
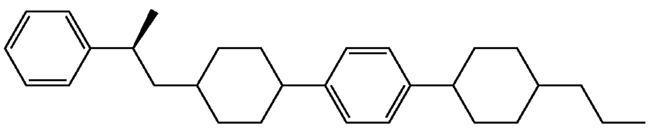
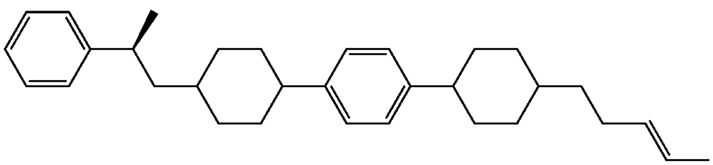
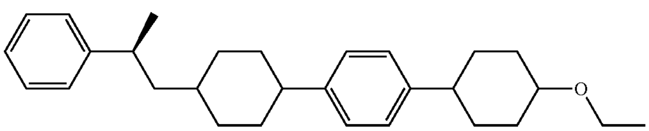
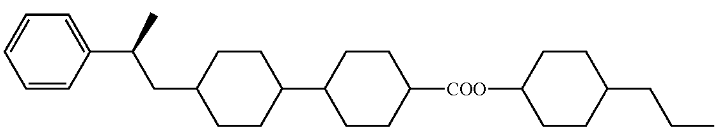
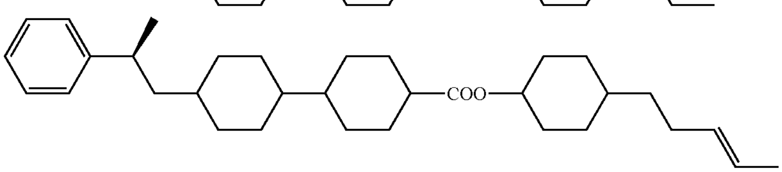
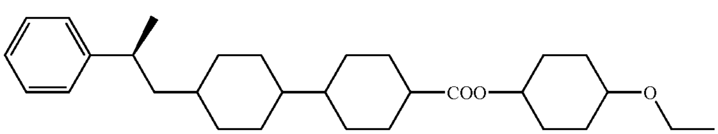
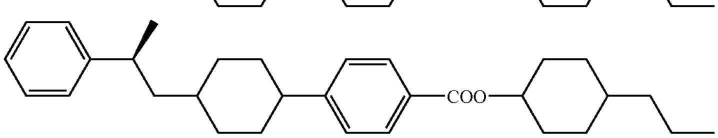
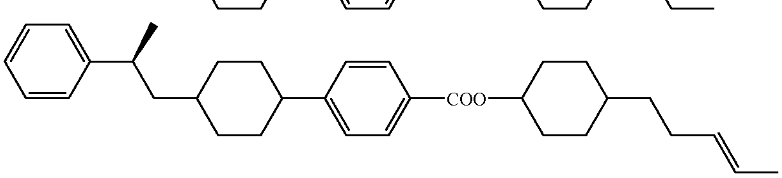

-continued
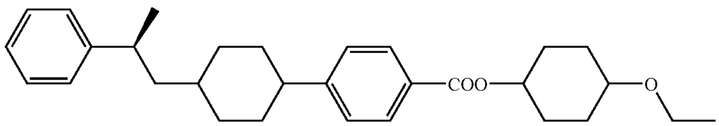
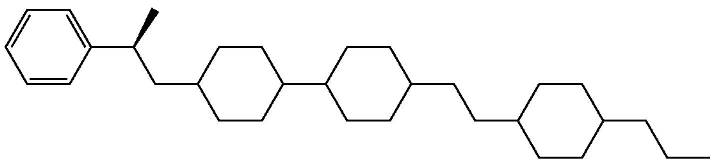
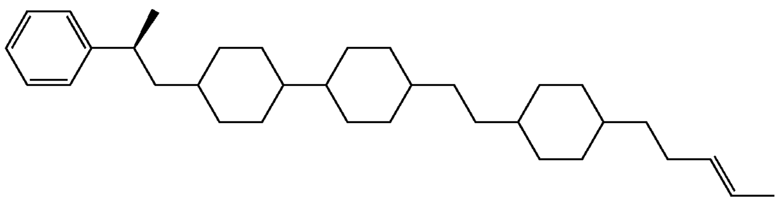
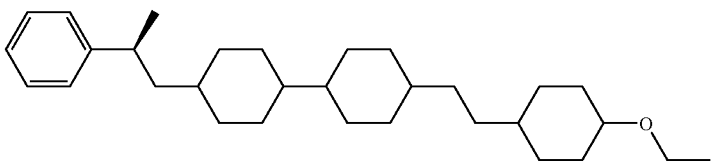
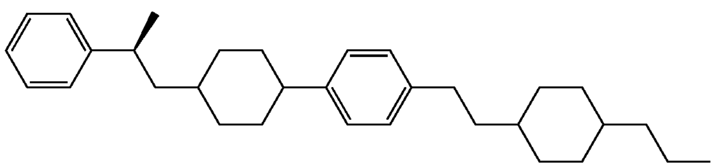
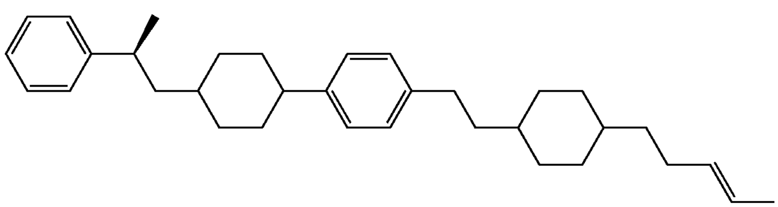
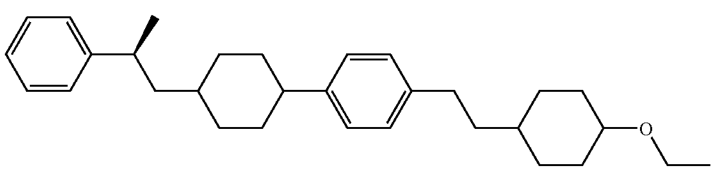
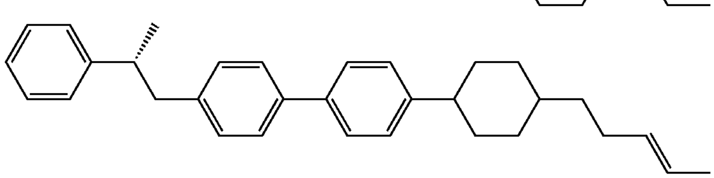
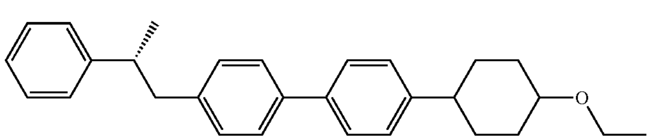
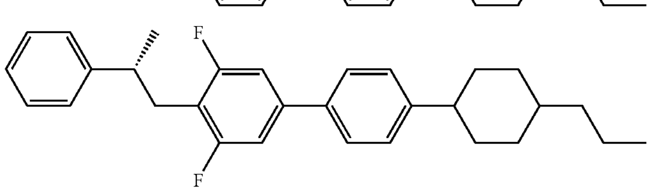

-continued
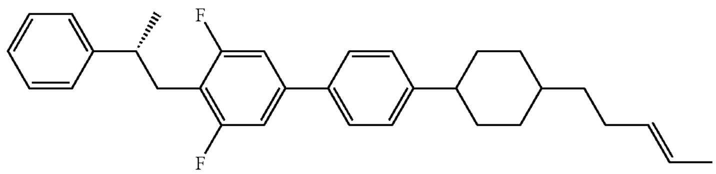
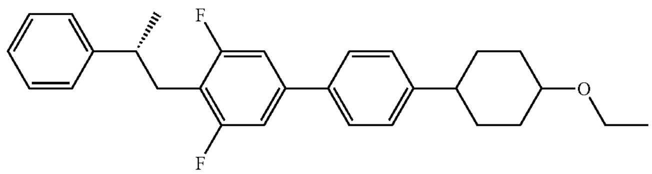
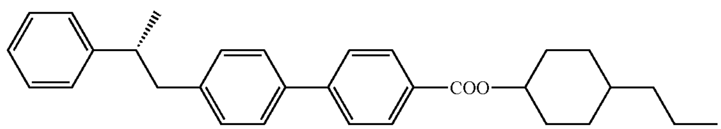
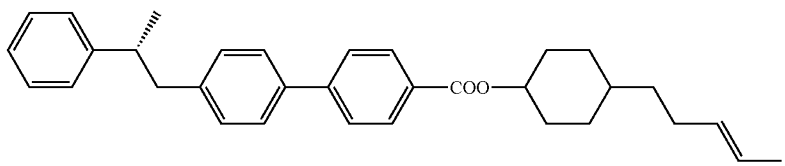
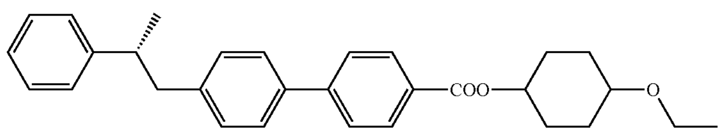
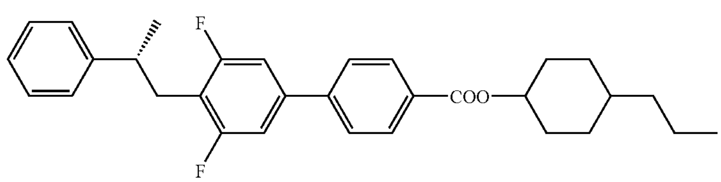
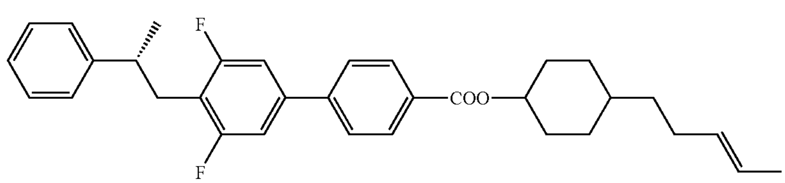
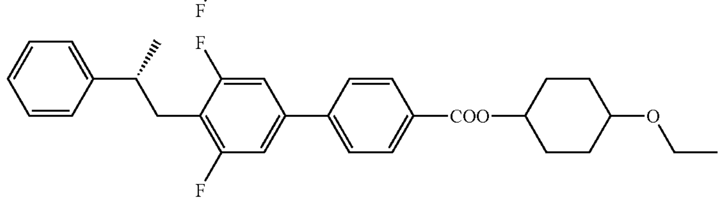
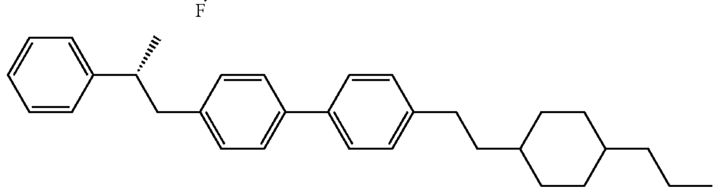
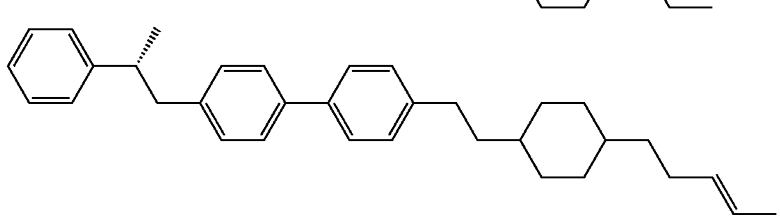

-continued
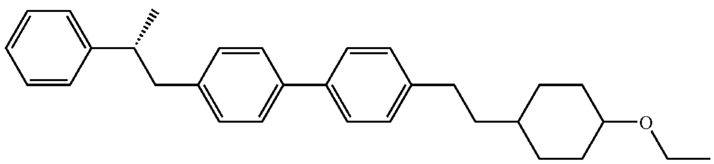
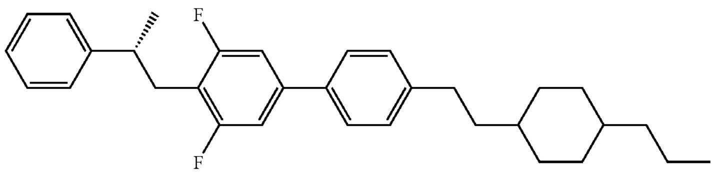
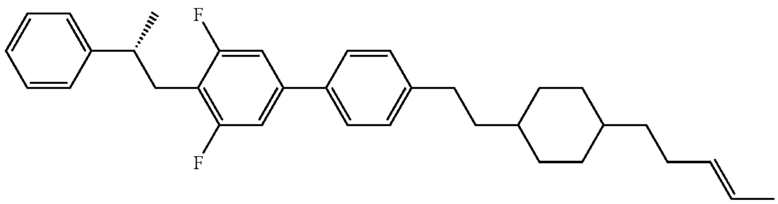
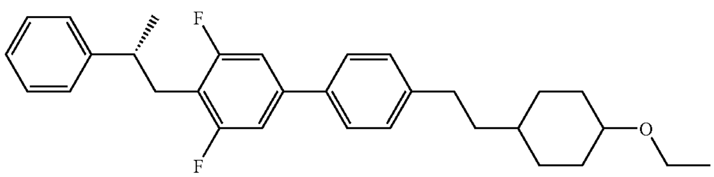
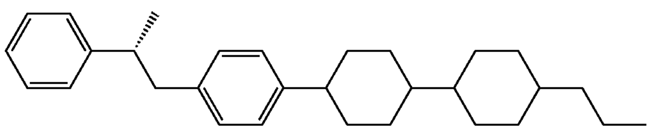
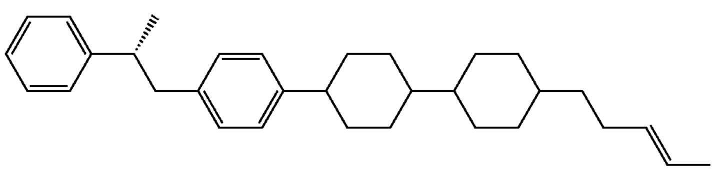
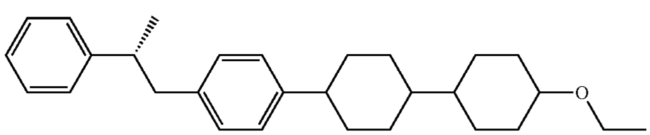
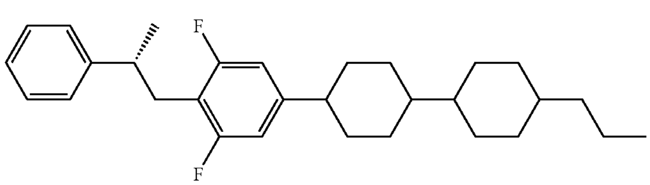
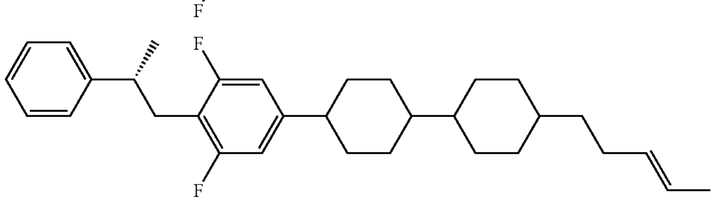
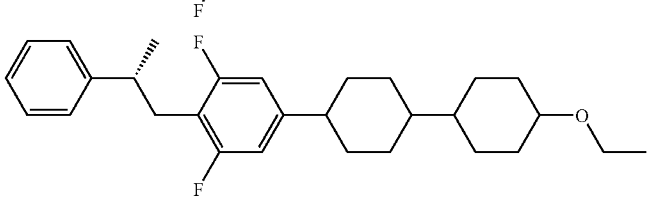

-continued
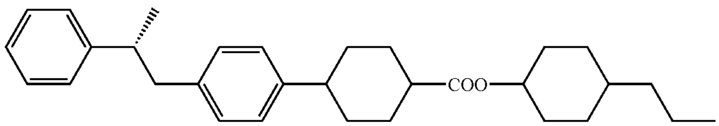
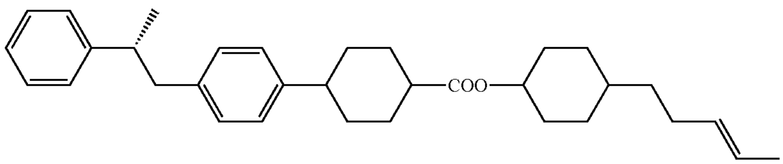
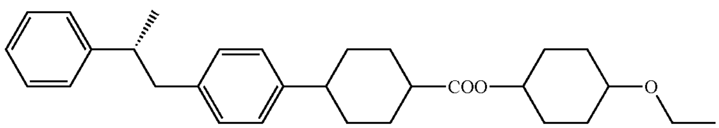
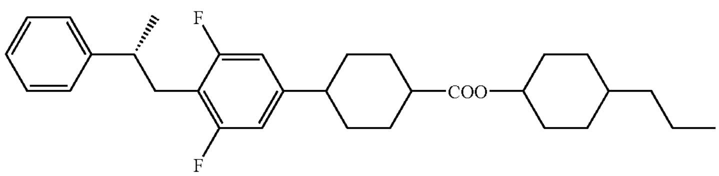
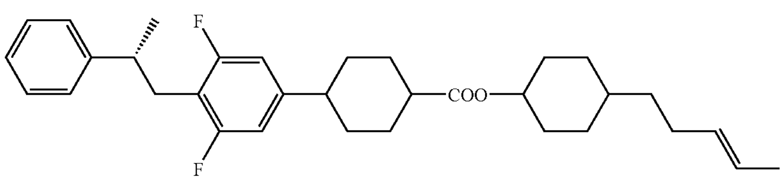
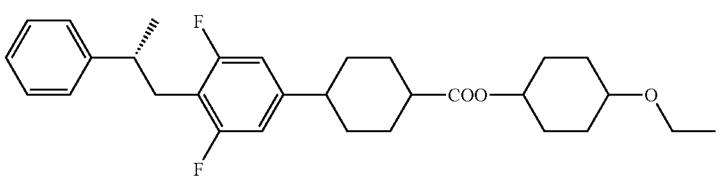
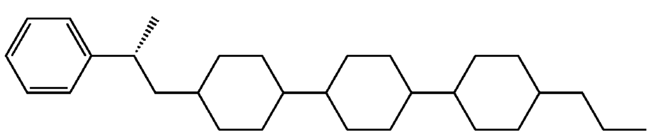
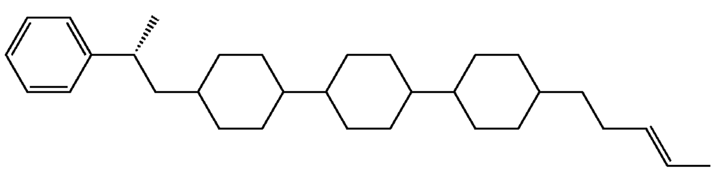
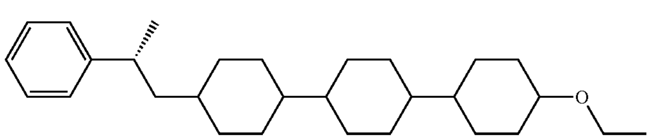
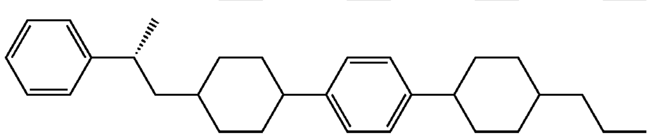
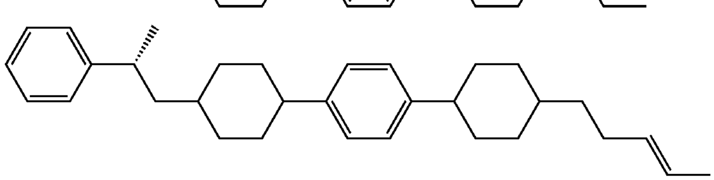

-continued
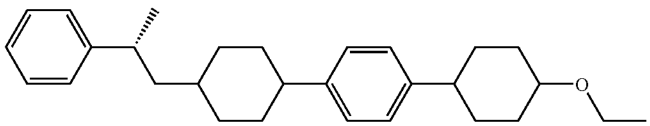
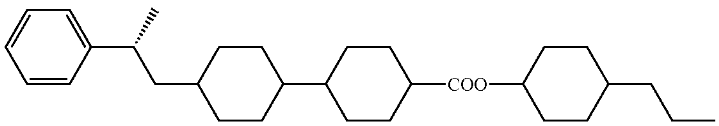
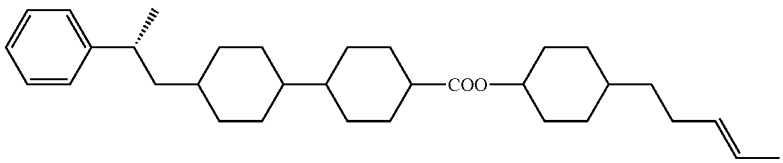
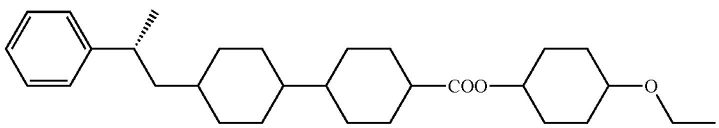
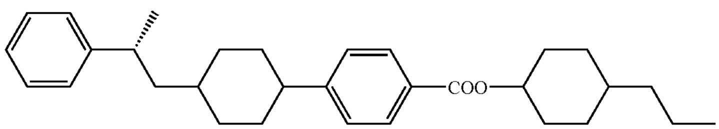
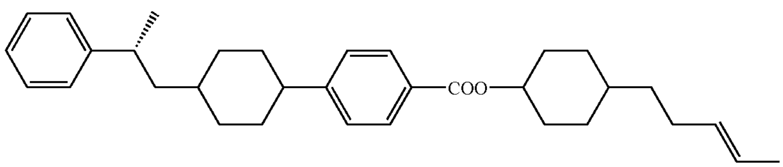
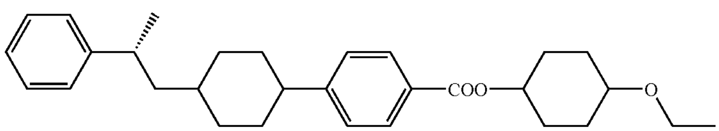
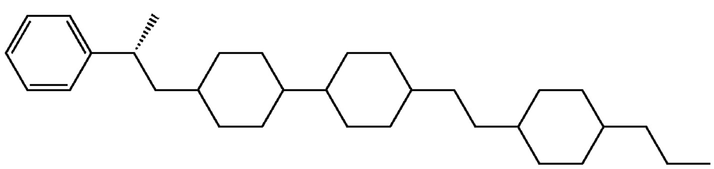
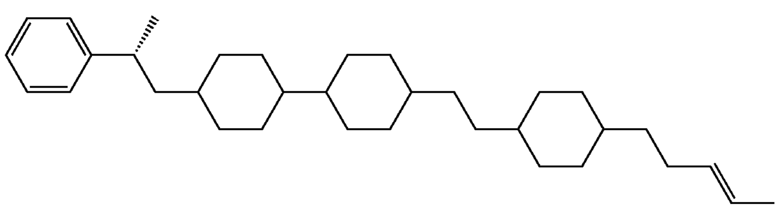
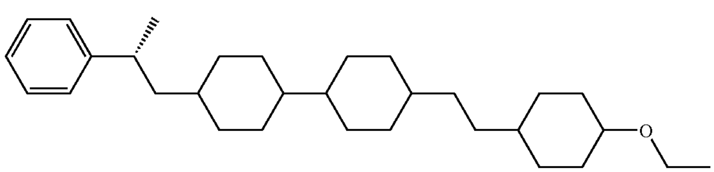
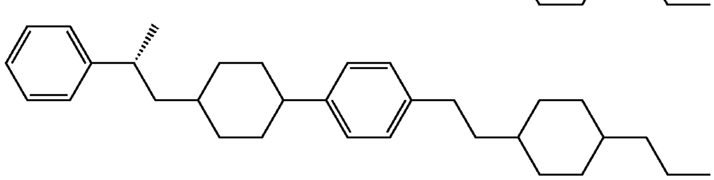

-continued
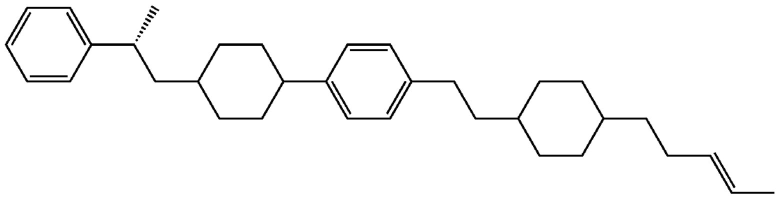
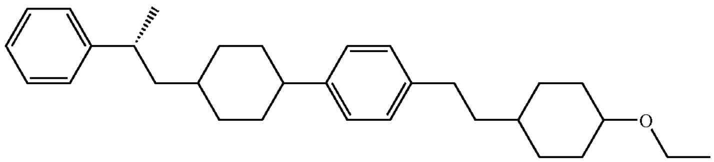
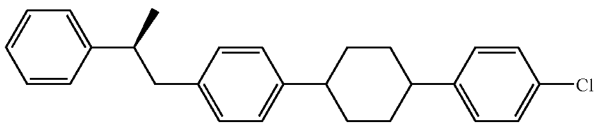
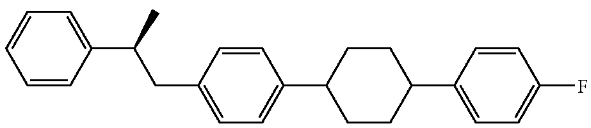
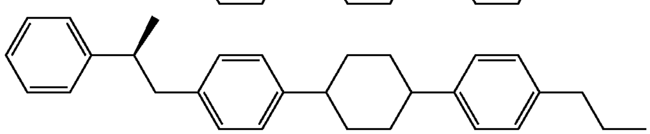
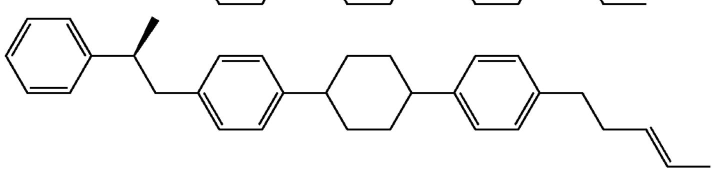
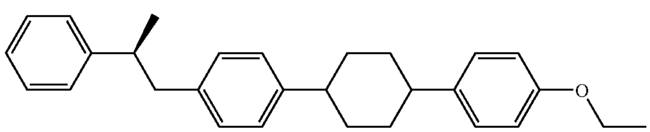
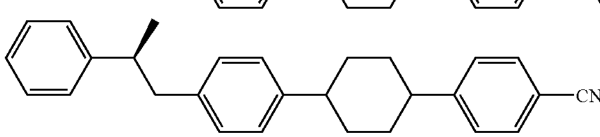
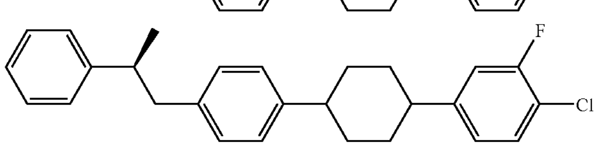
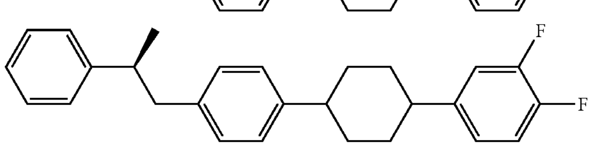
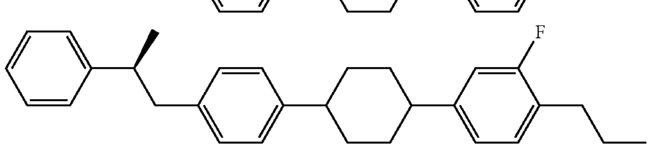
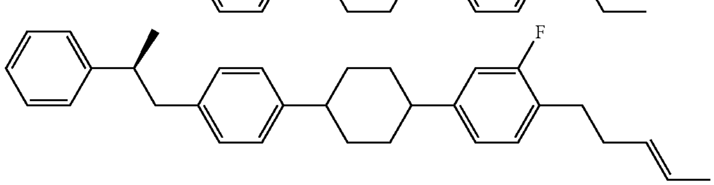

-continued
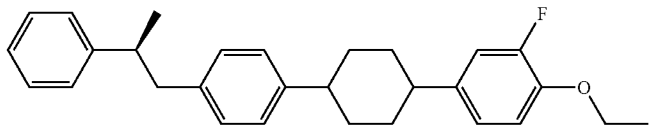
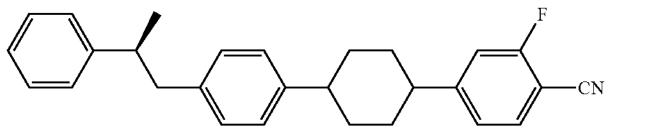
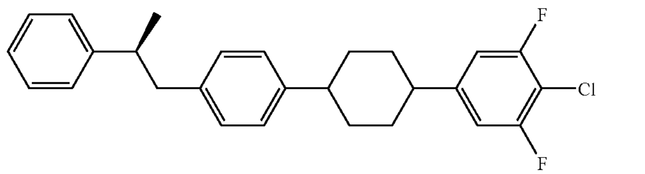
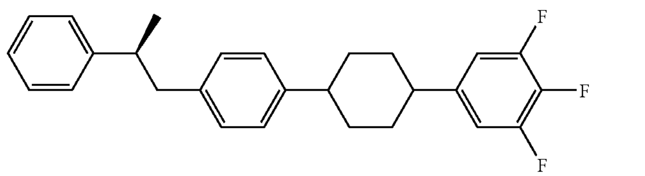
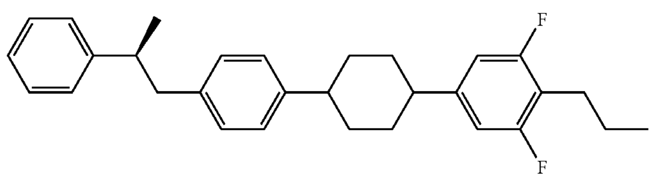
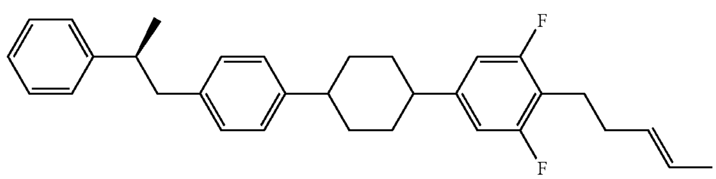
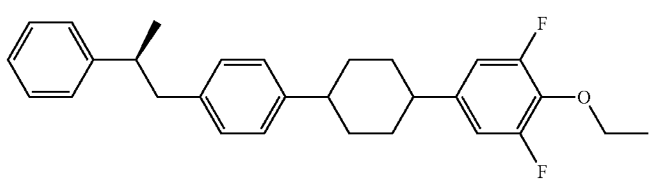
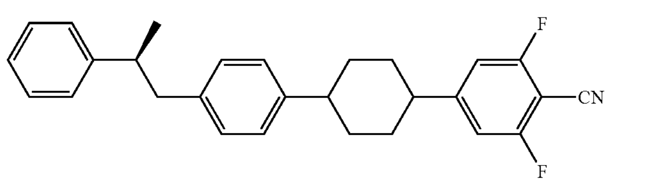
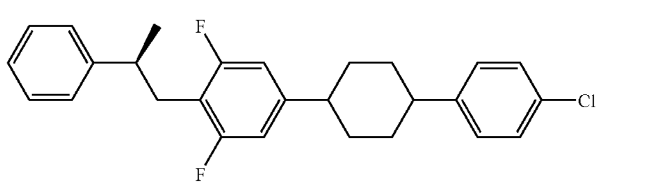
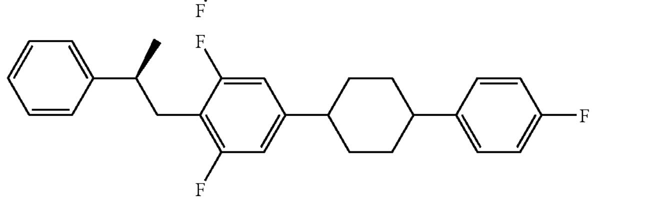

-continued
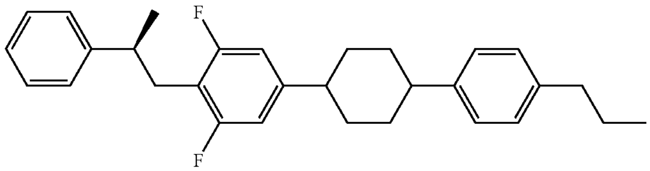
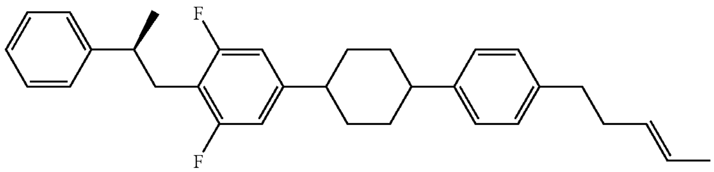
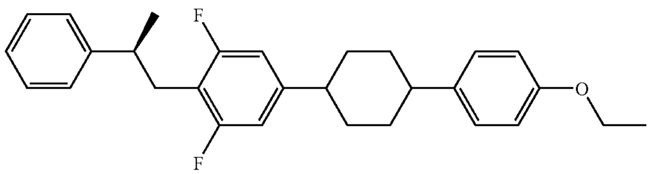
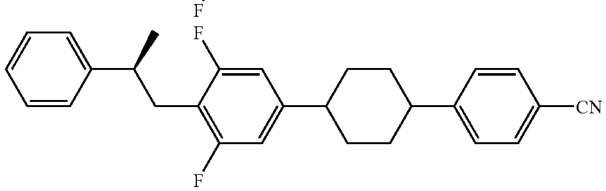
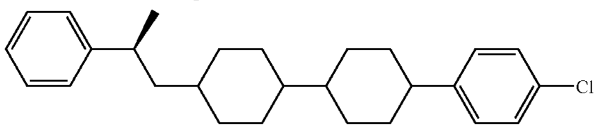
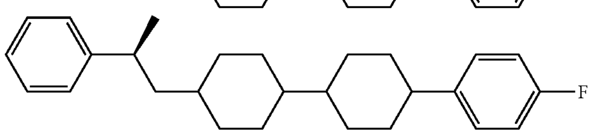
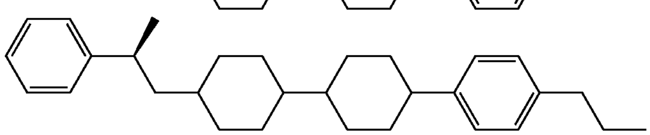
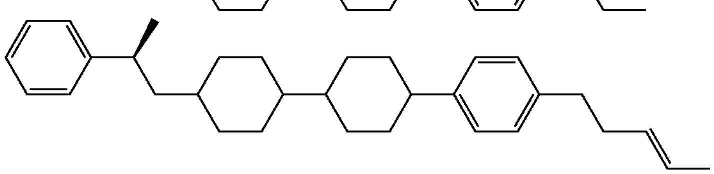
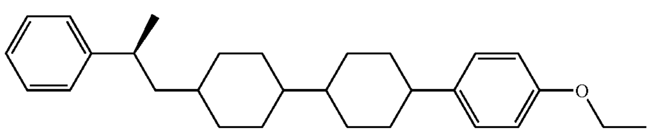
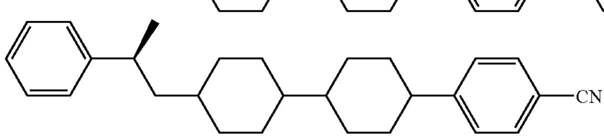
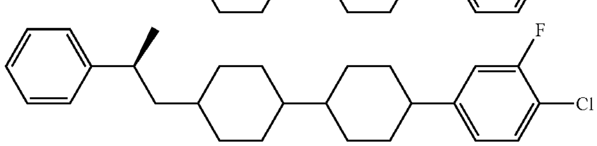
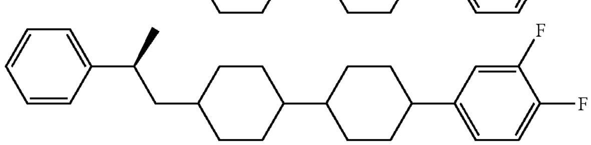

-continued
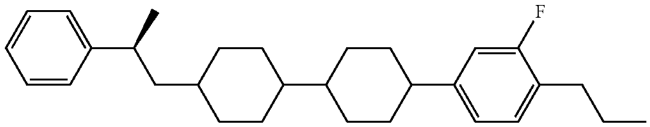
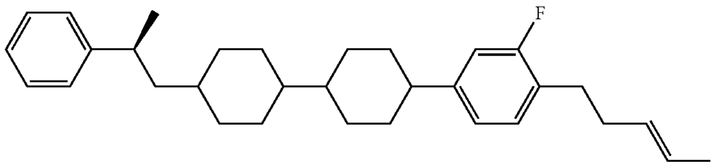
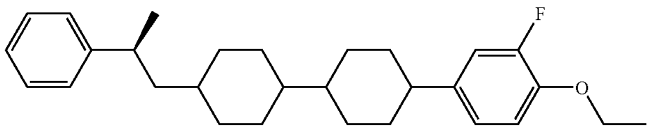
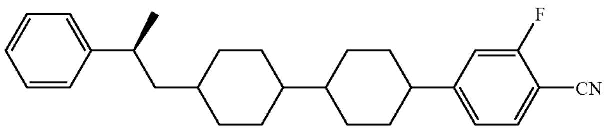
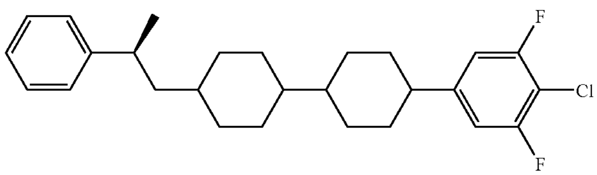
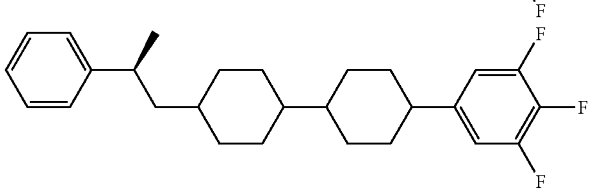
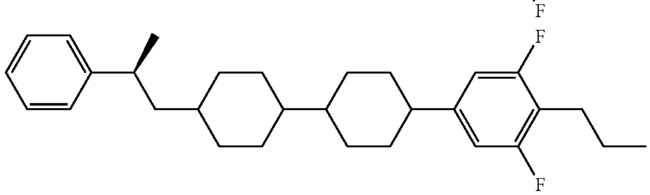
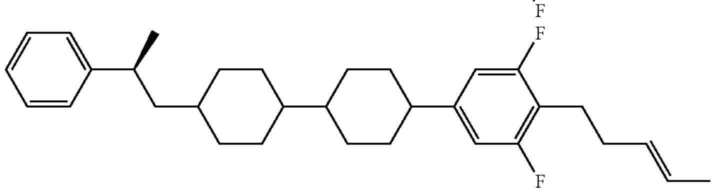
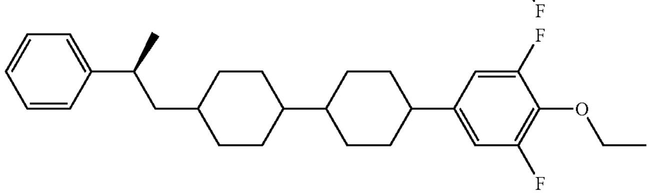
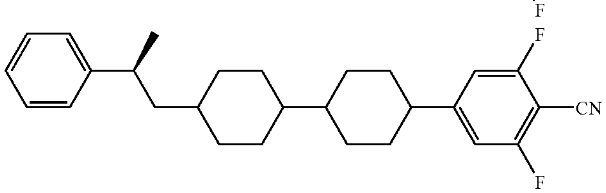
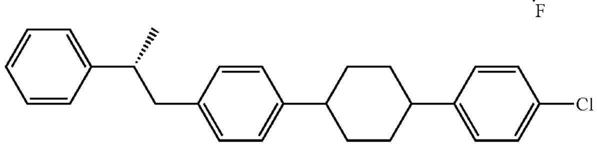

-continued
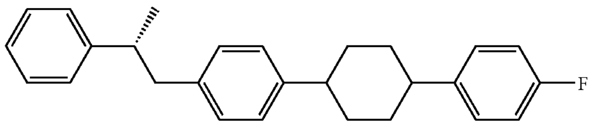
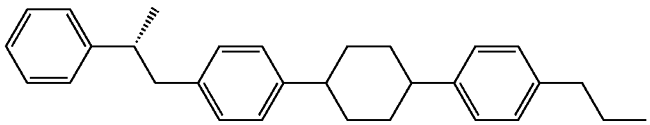
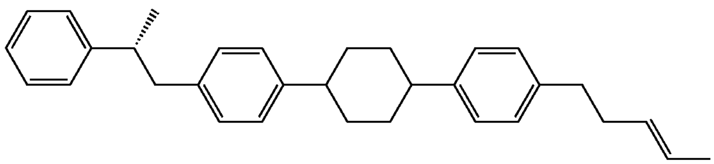
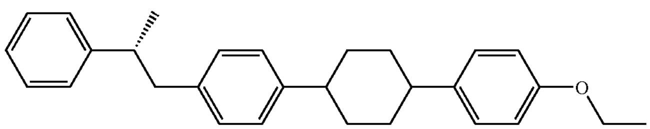
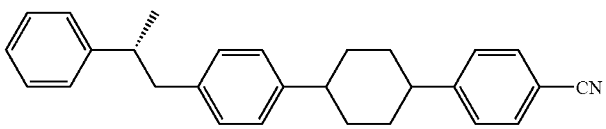
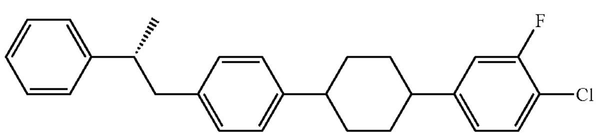
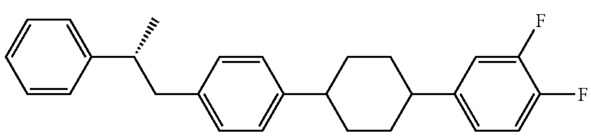
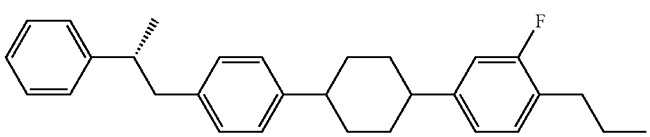
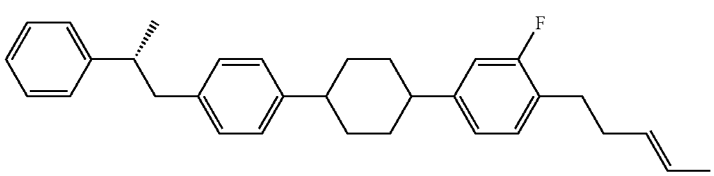
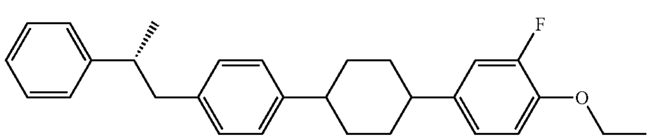
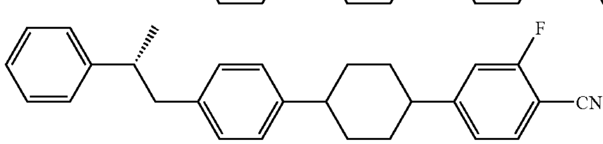
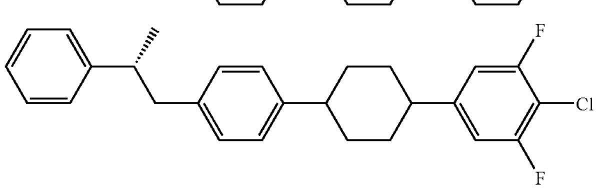

-continued
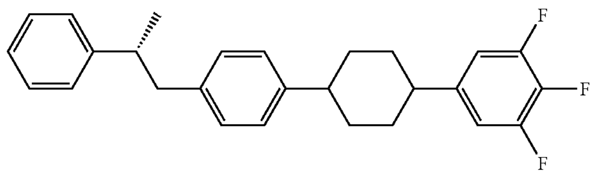
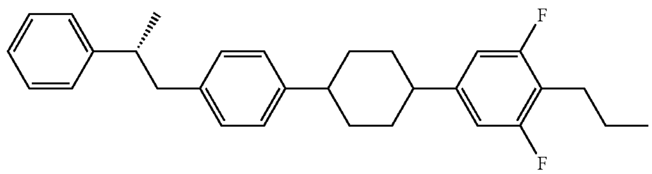
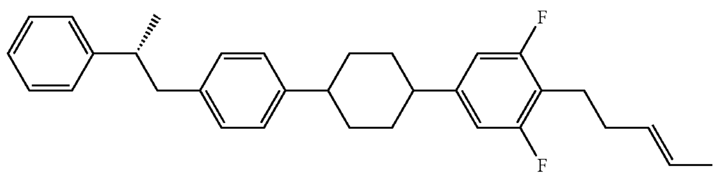
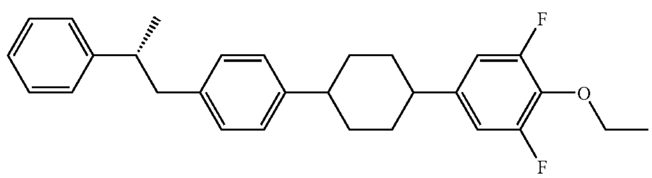
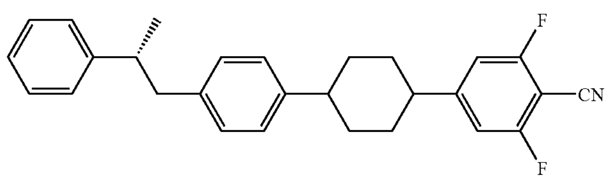
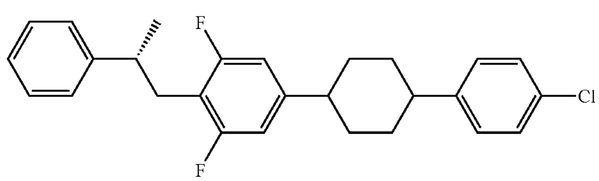
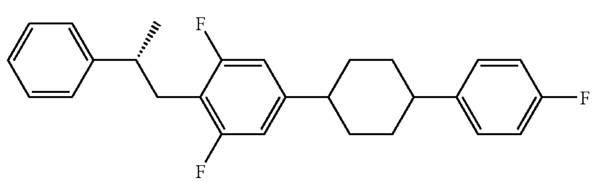
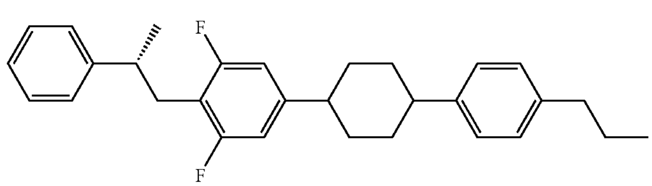
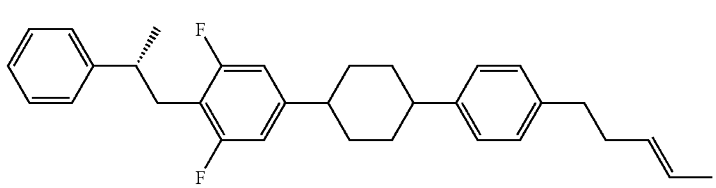

-continued
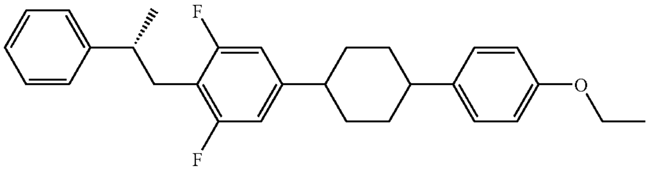
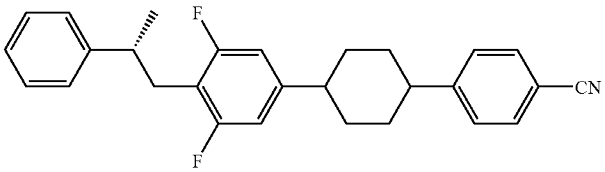
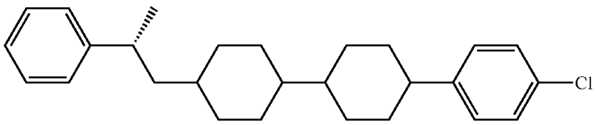
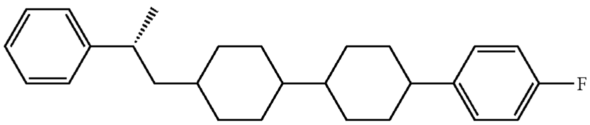
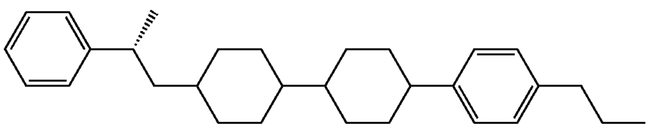
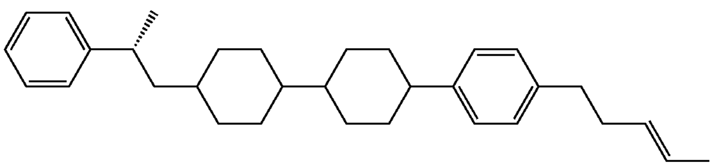
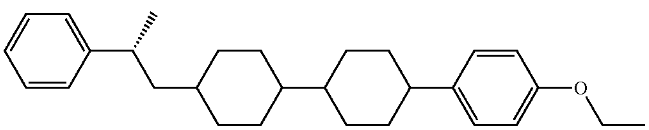
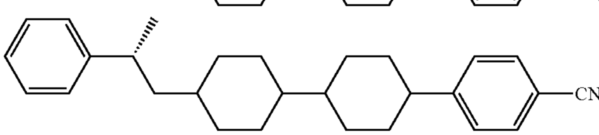
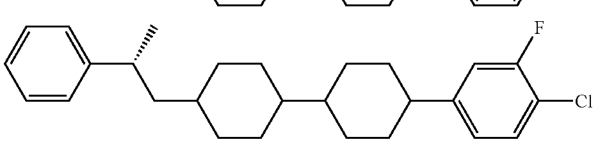
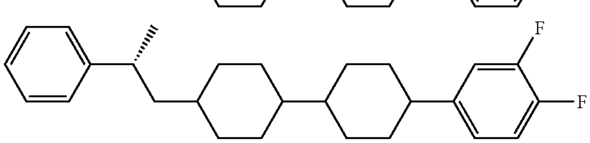
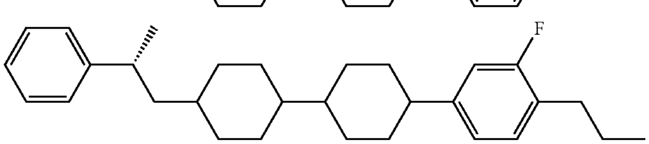
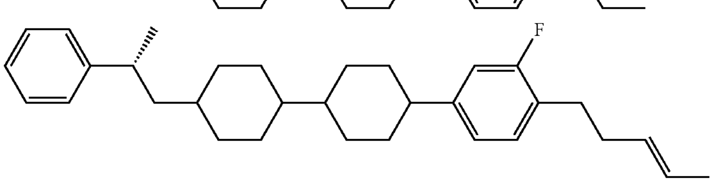

-continued
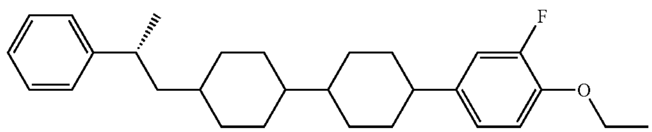
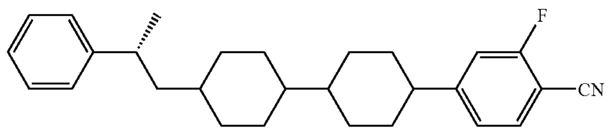
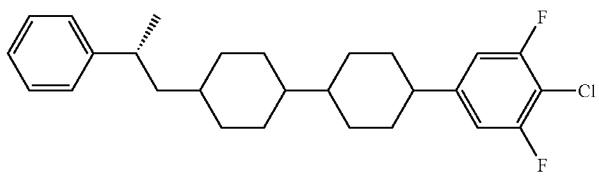
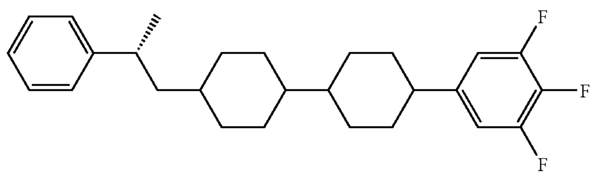
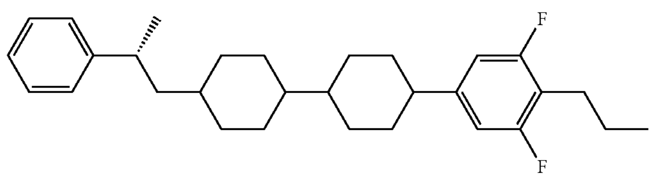
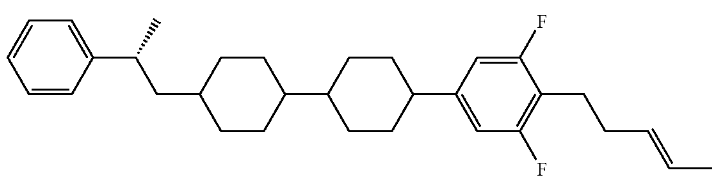
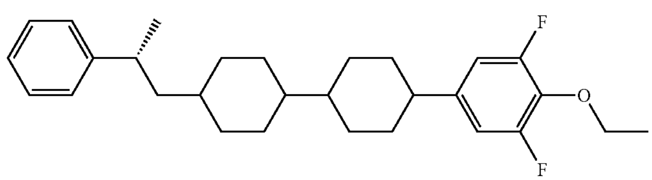
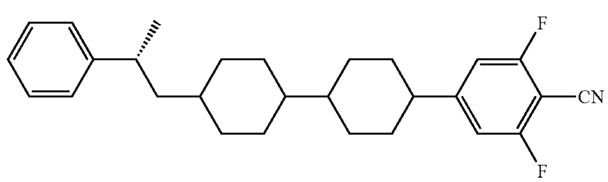
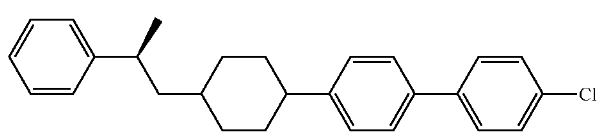
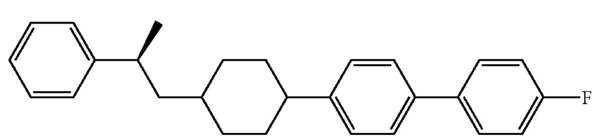

-continued
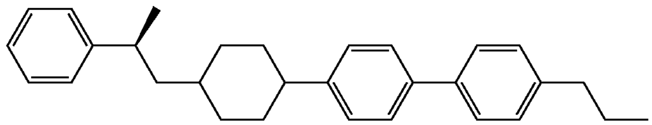
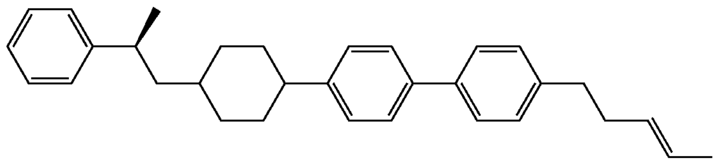
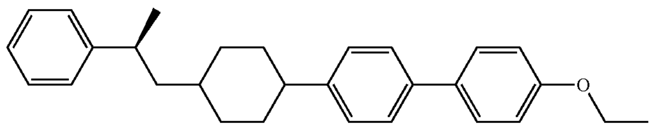
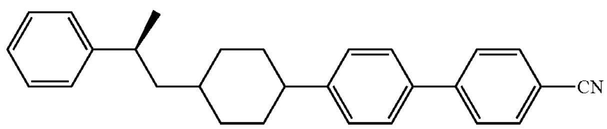
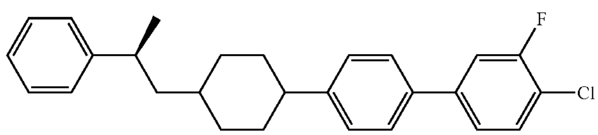
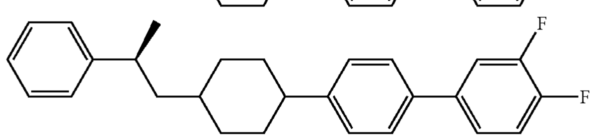
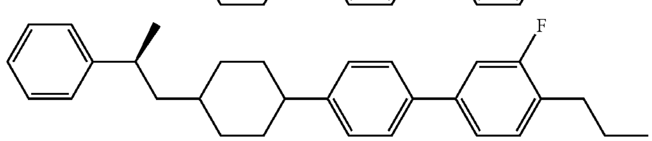
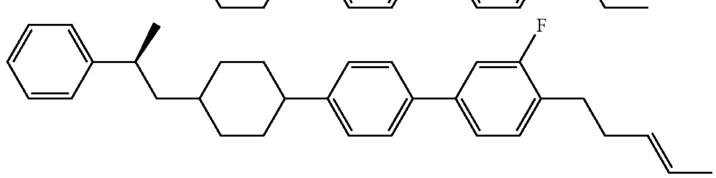
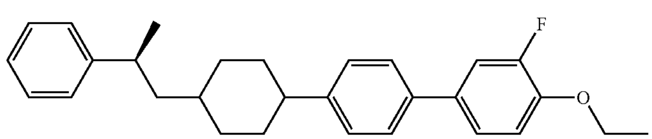
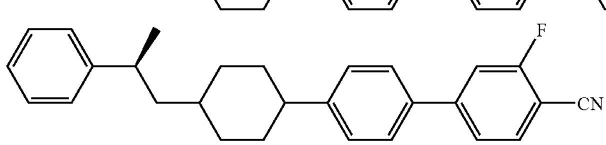
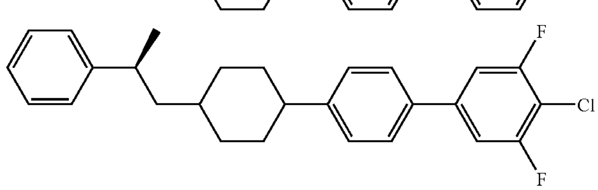
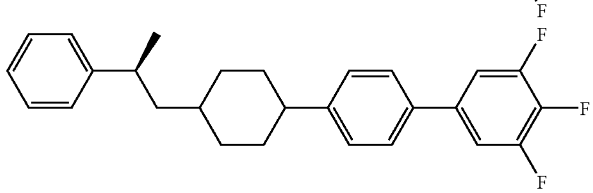

-continued
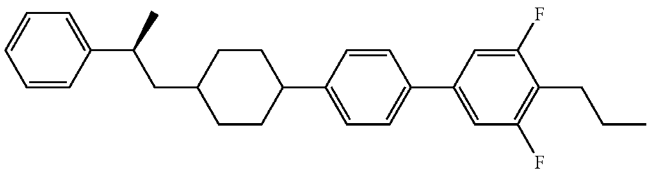
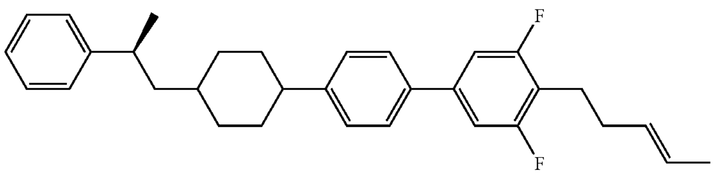
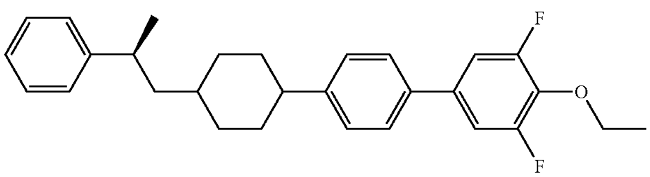
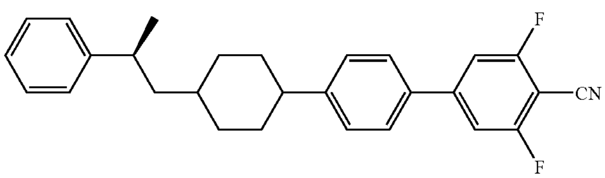
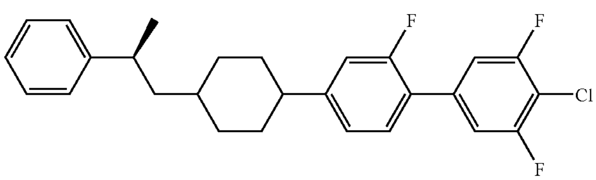
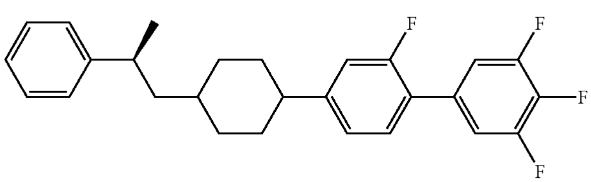
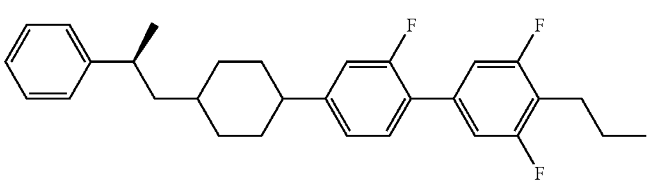
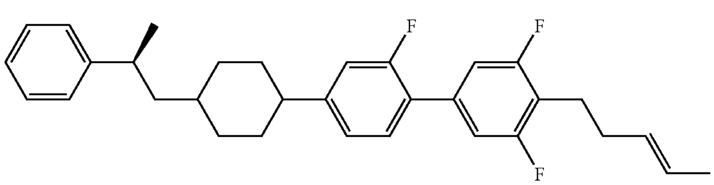
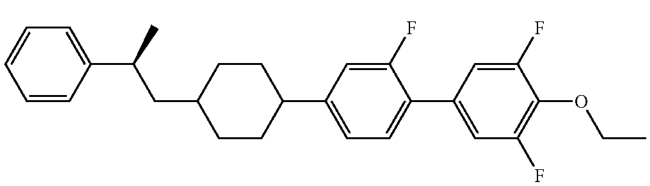

-continued
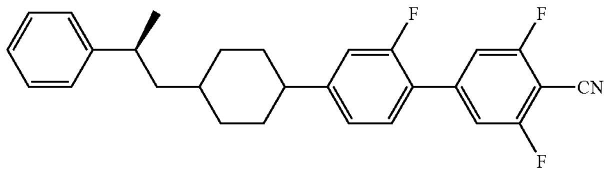
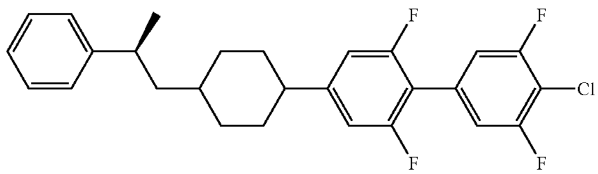
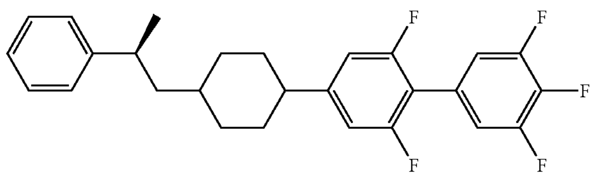
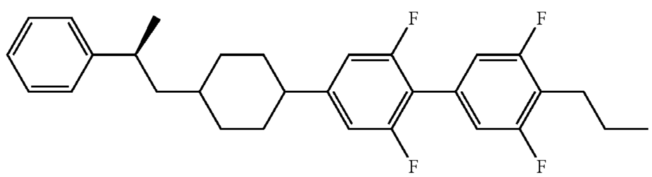
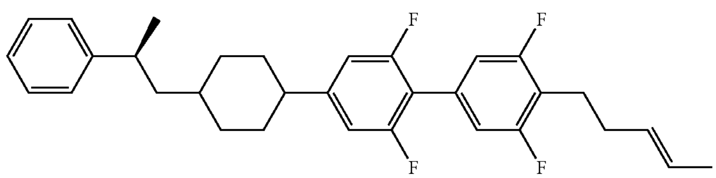
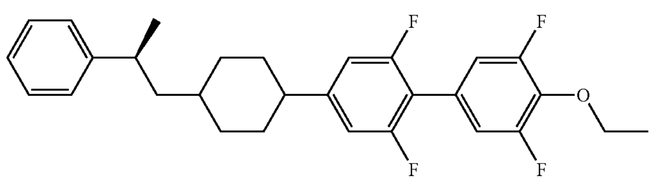
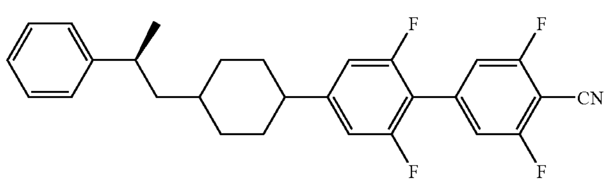
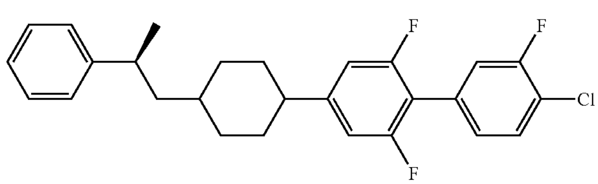
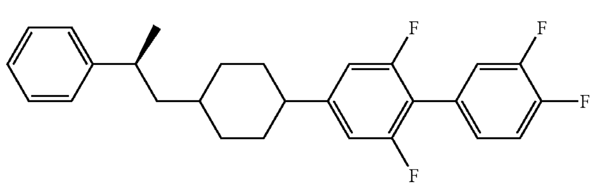

-continued
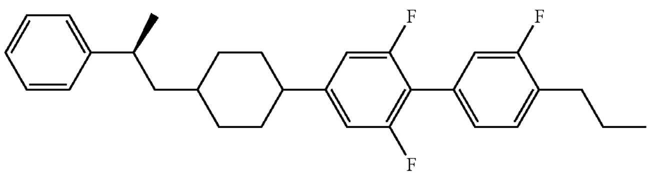
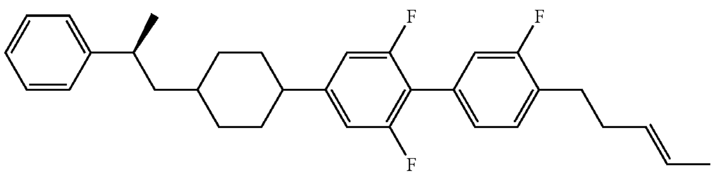
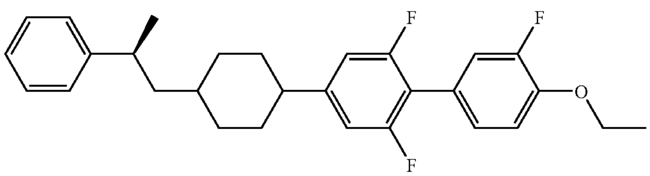
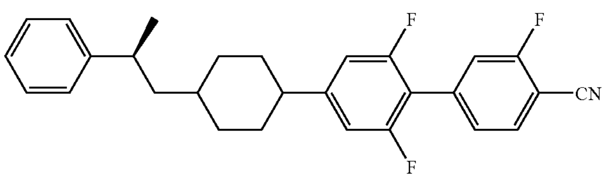
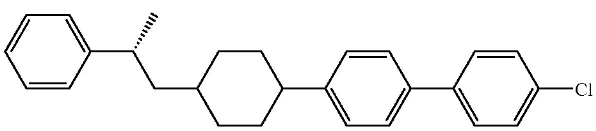
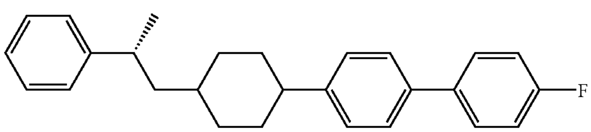
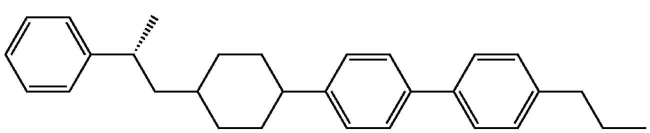
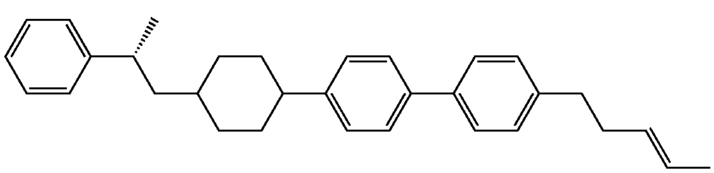
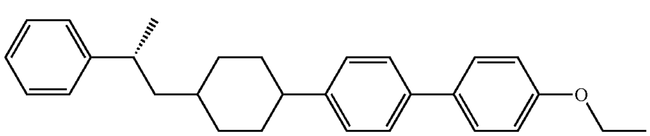
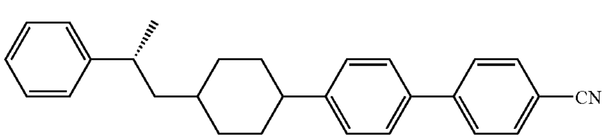
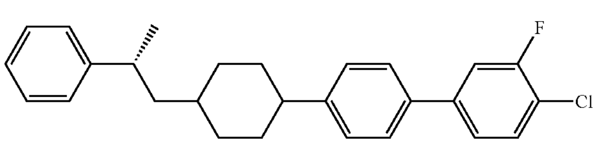

-continued
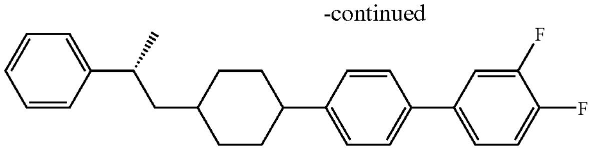
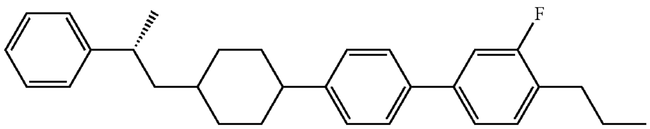
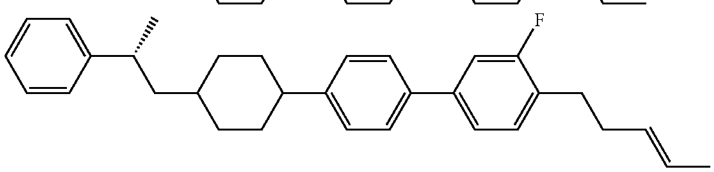
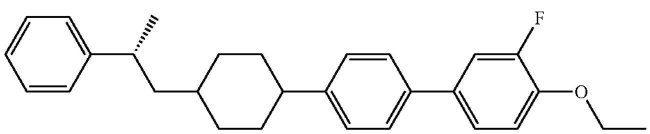
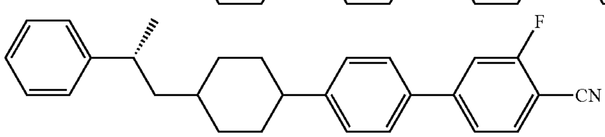
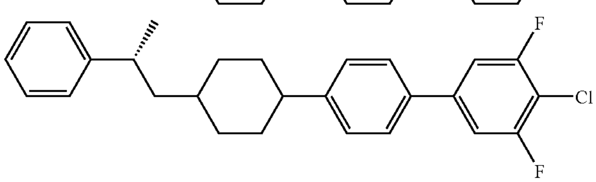
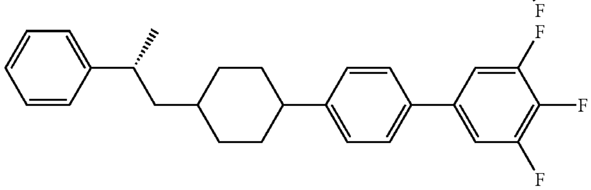
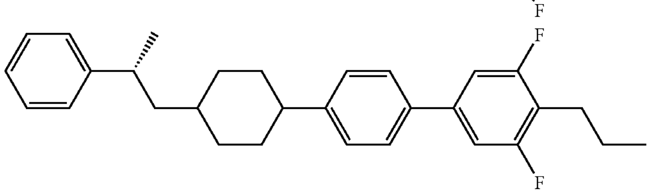
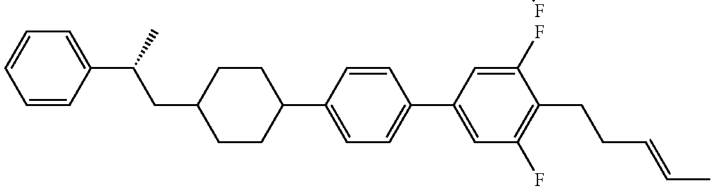
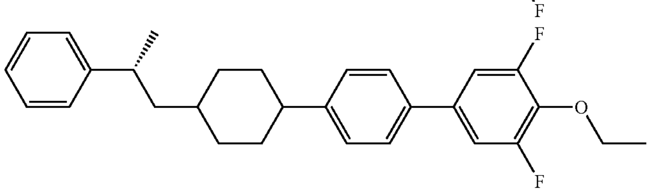
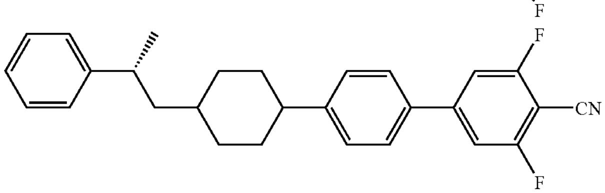

-continued
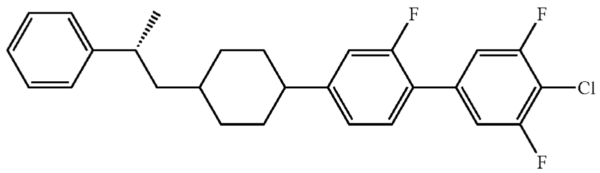
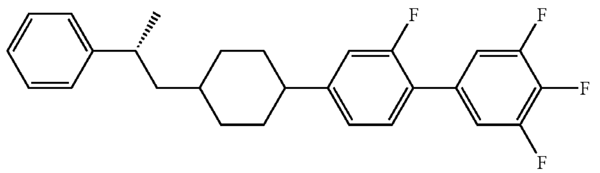
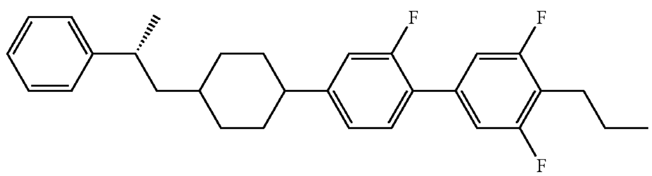
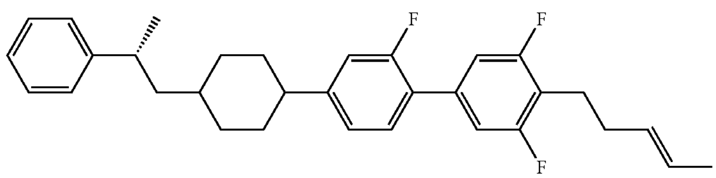
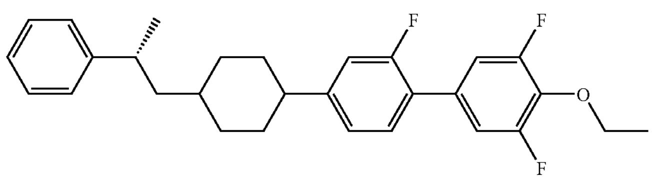
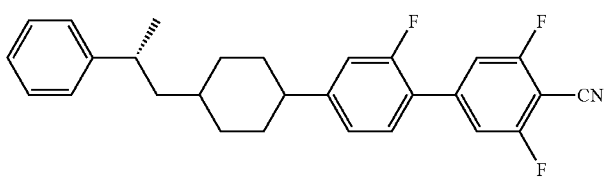
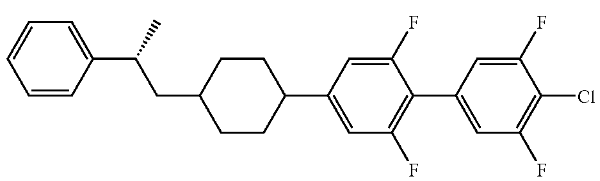
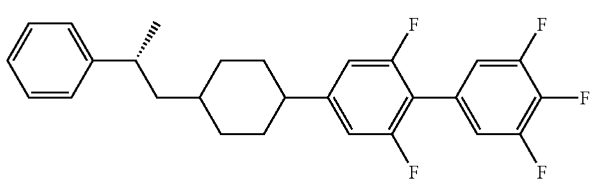
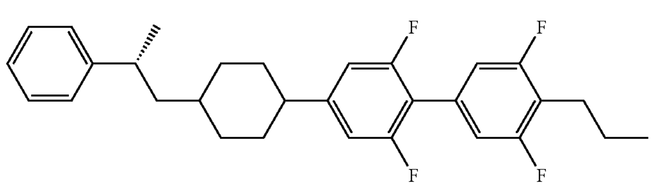

-continued
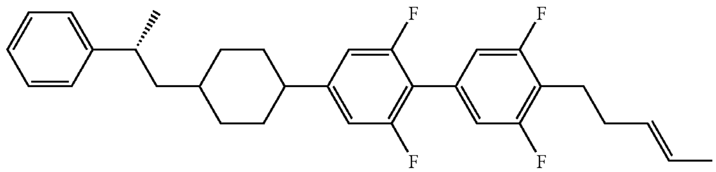
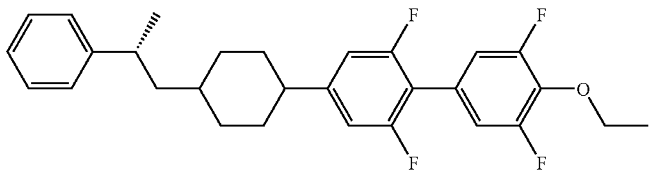
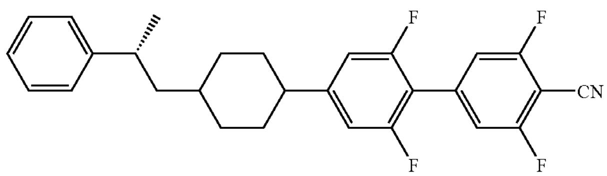
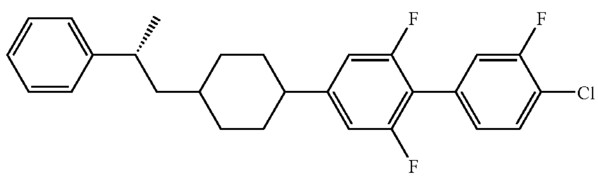
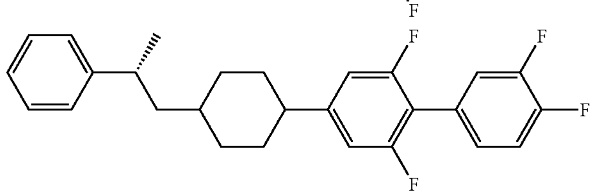
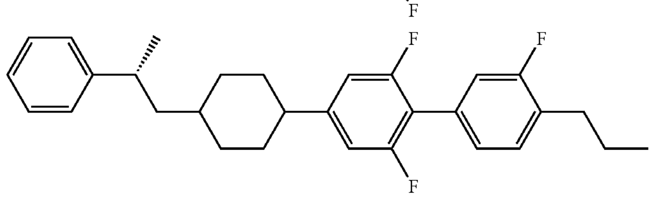
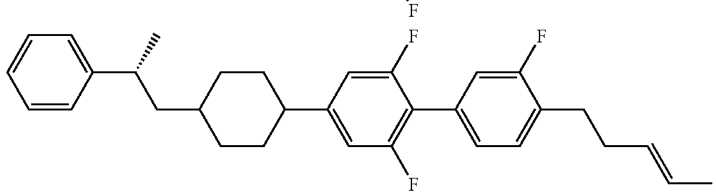
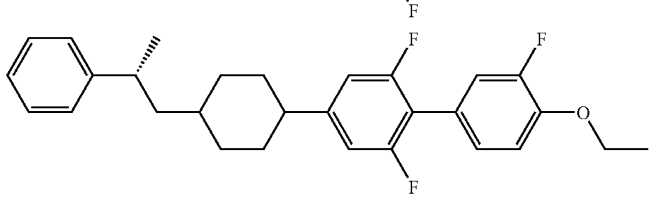
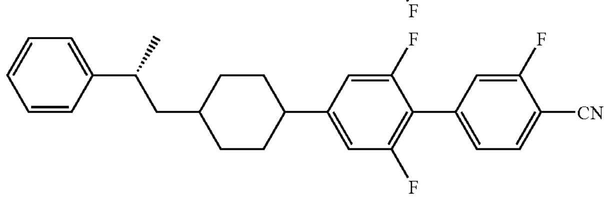
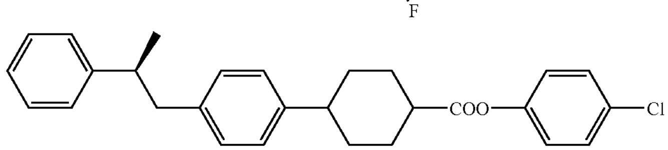

-continued
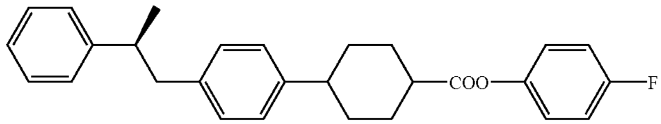
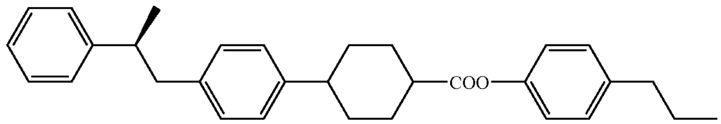
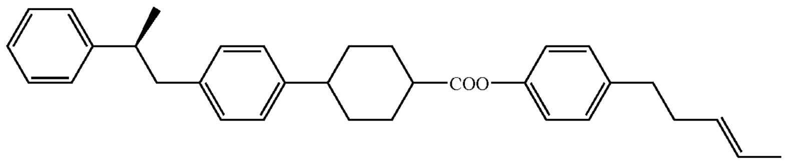
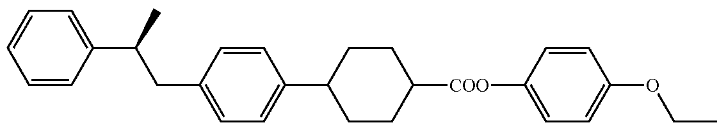
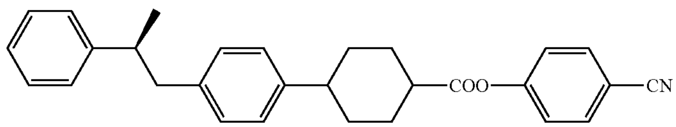
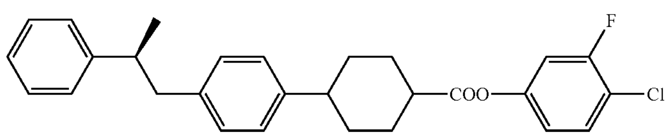
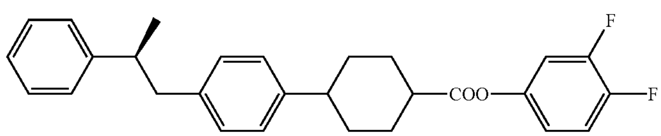
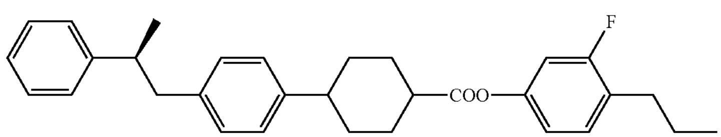
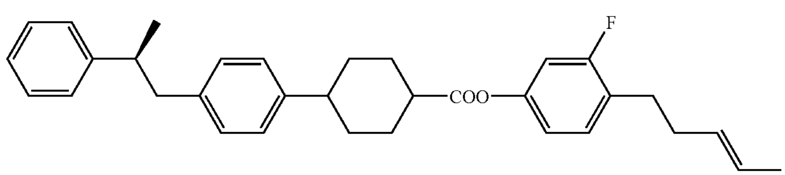
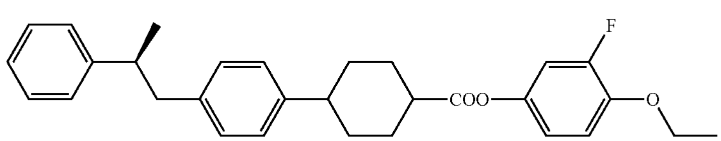
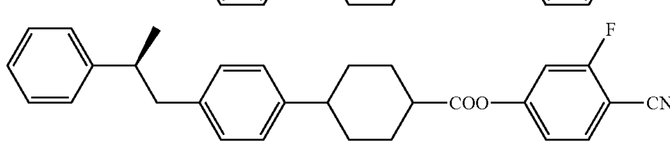
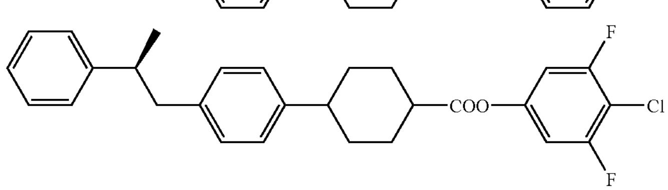

-continued
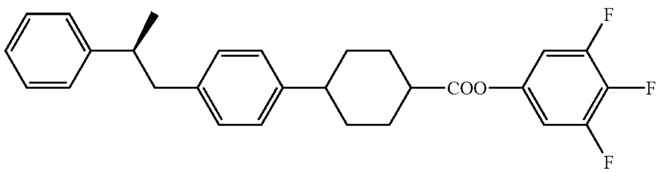
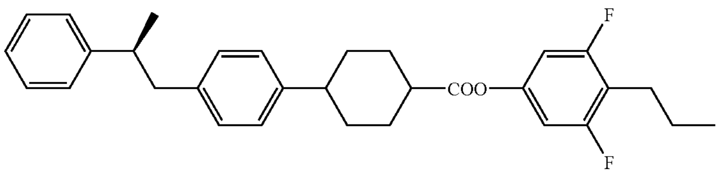
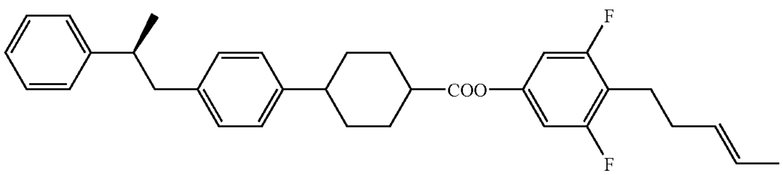
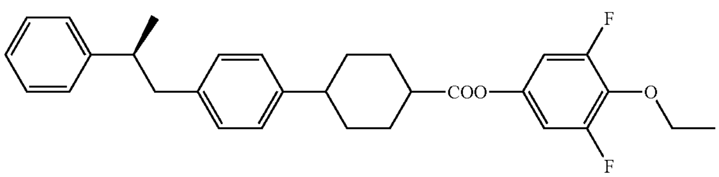
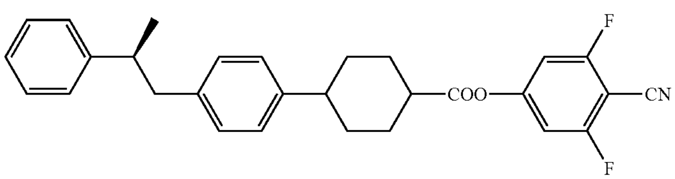
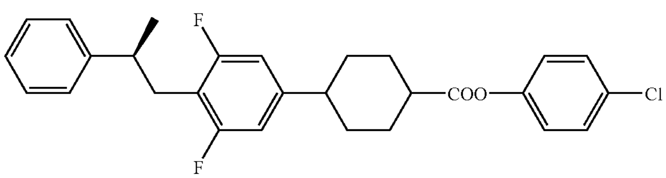
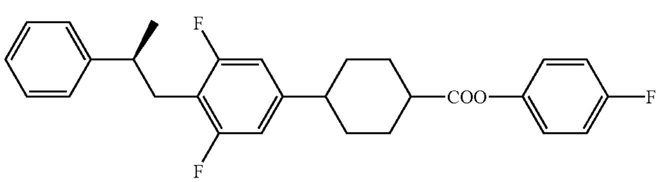
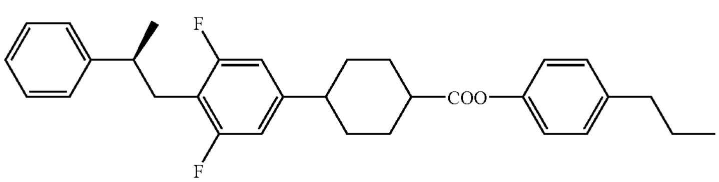
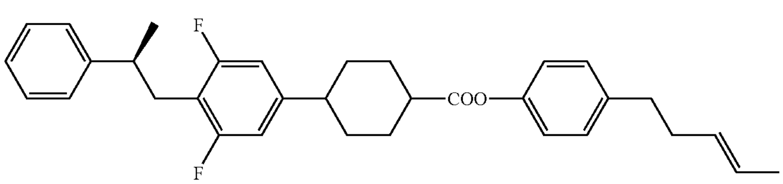

-continued
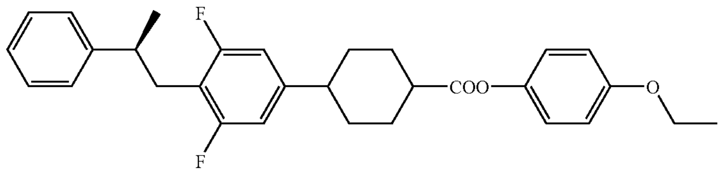
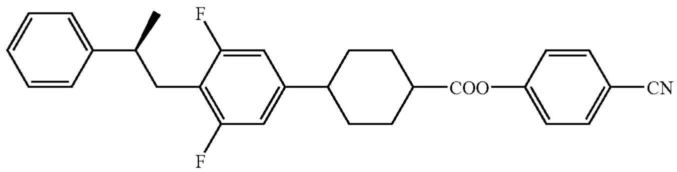
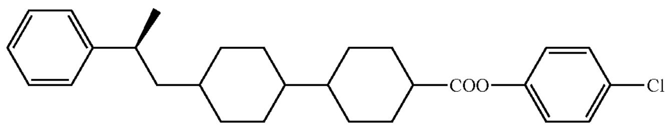
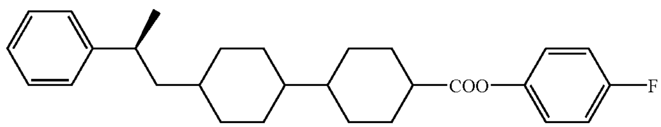
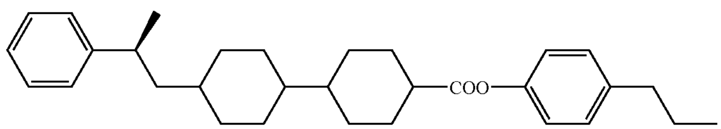
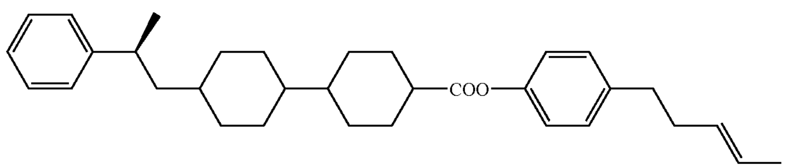
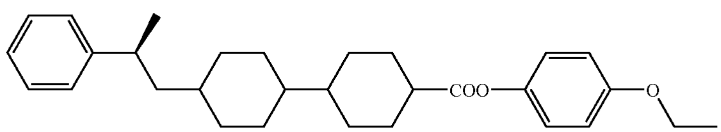
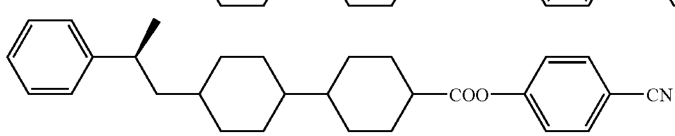
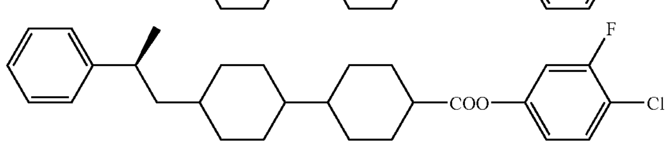
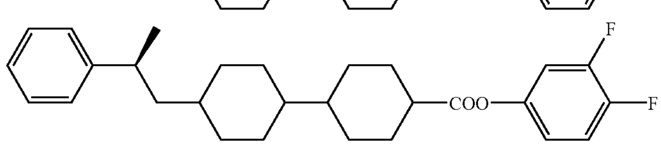
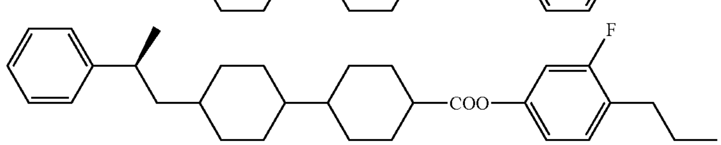
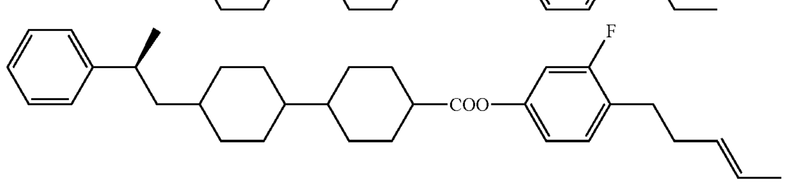

-continued
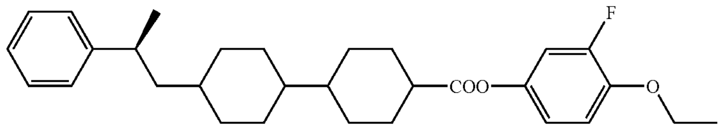
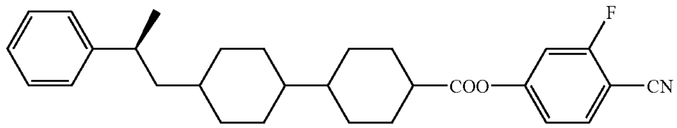
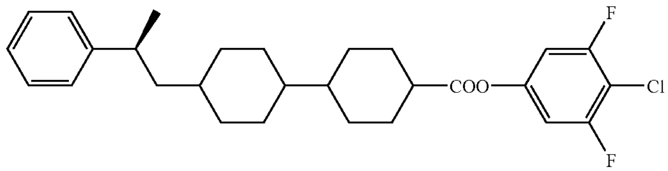
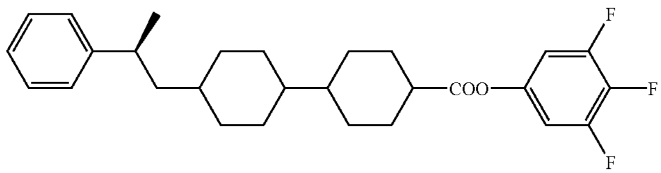
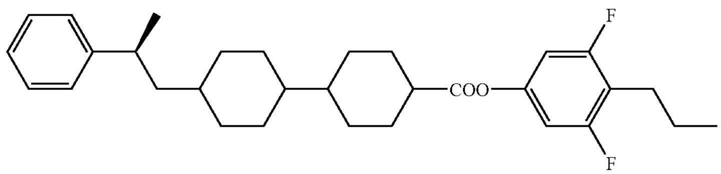
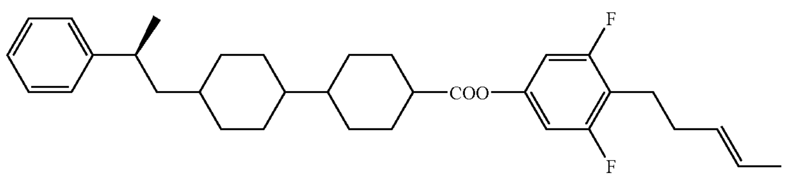
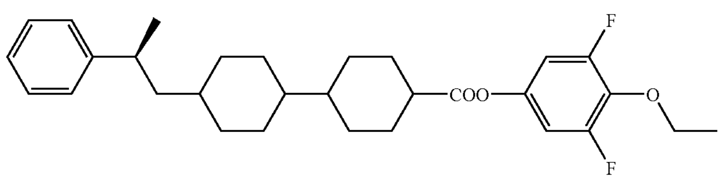
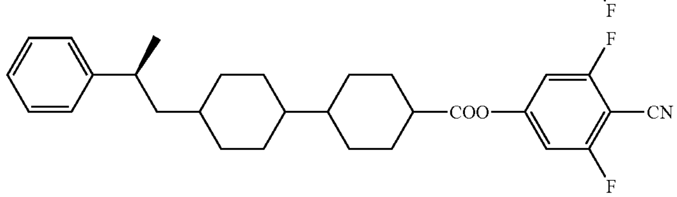
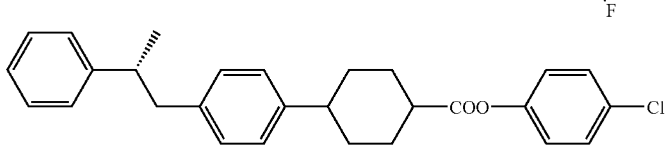
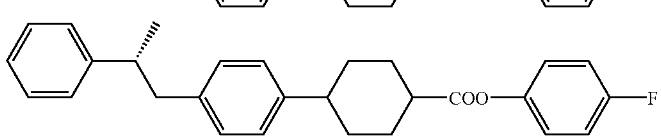
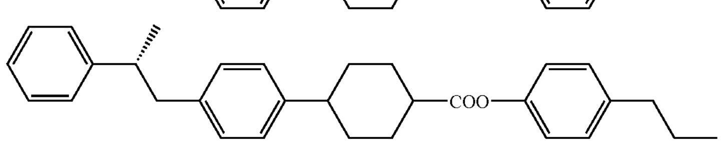

-continued
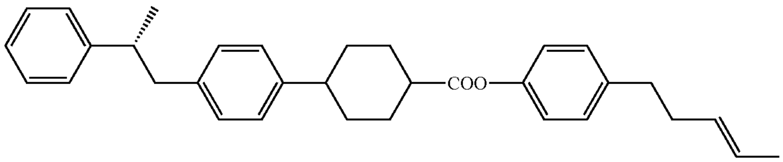
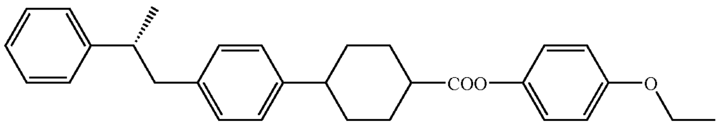
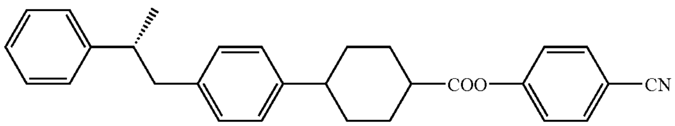
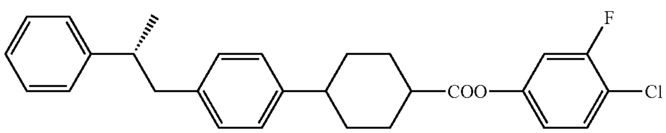
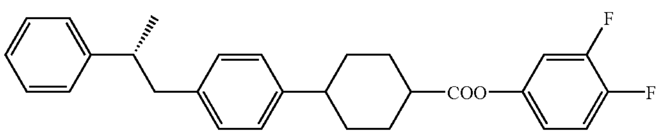
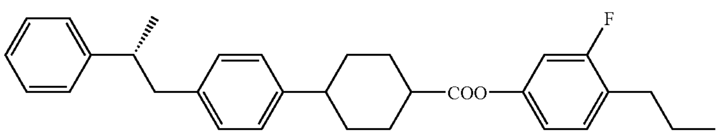
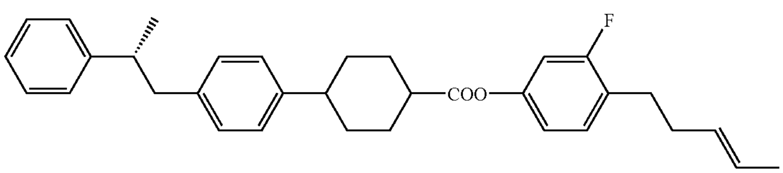
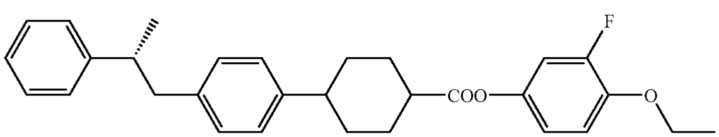
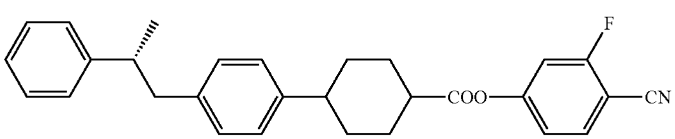
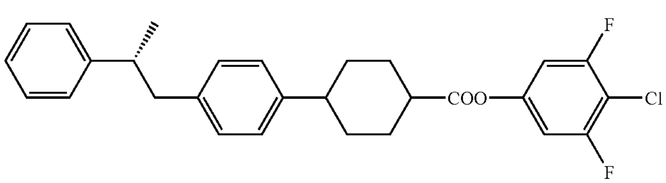
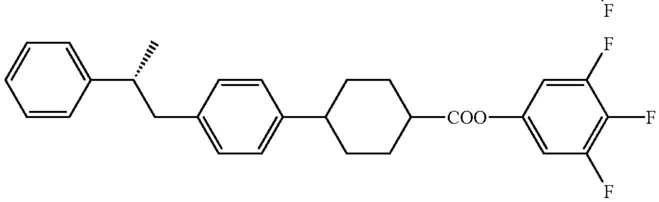

-continued
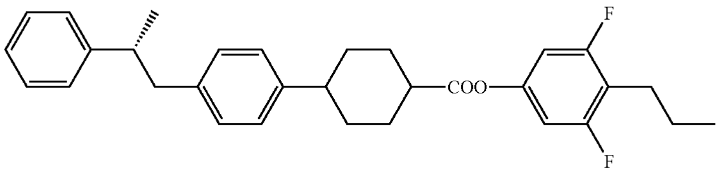
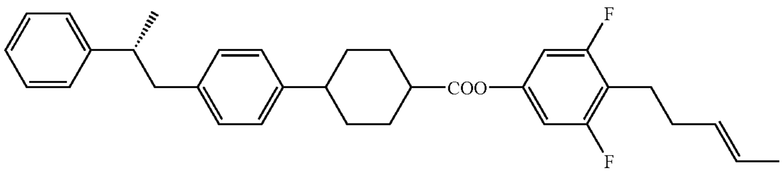
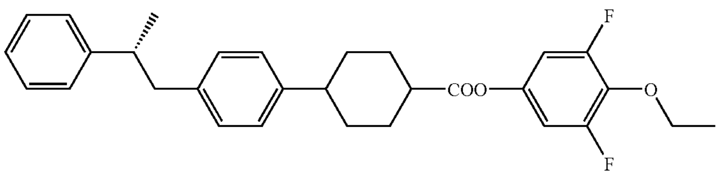
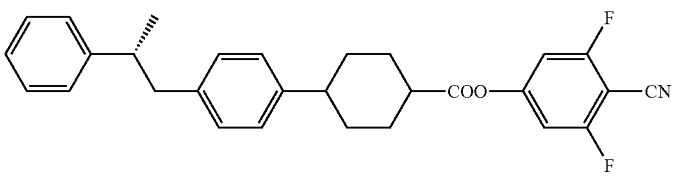
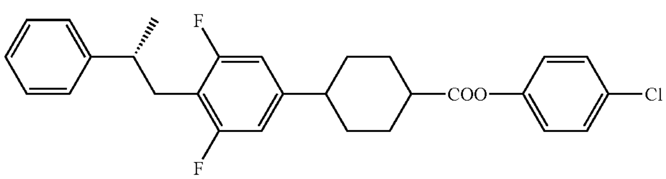
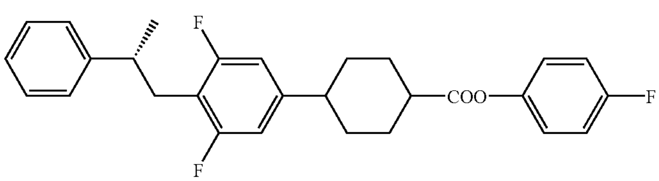
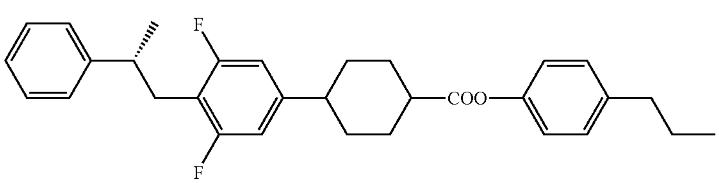
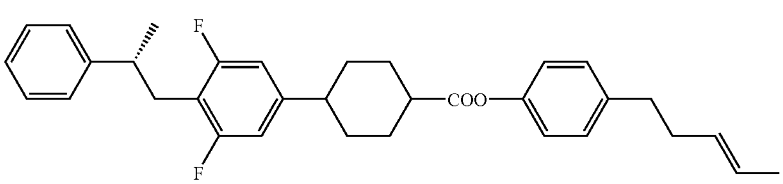
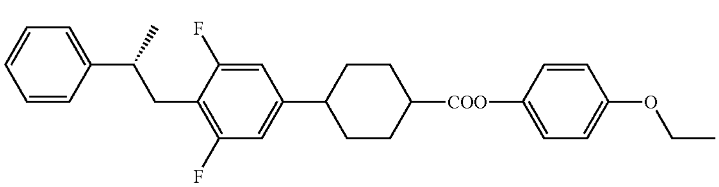

-continued
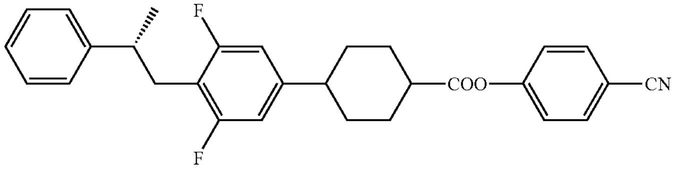
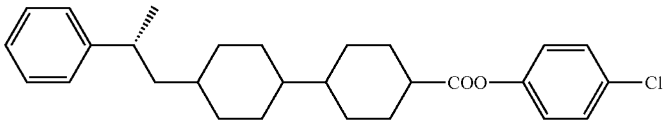
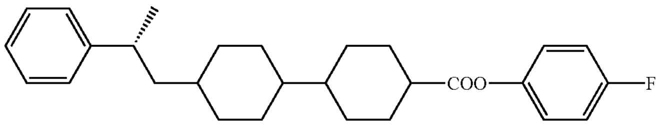
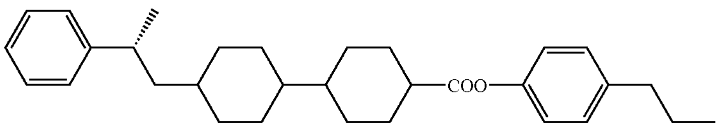
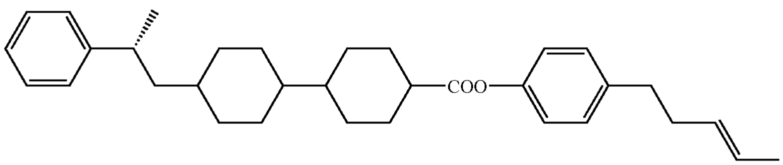
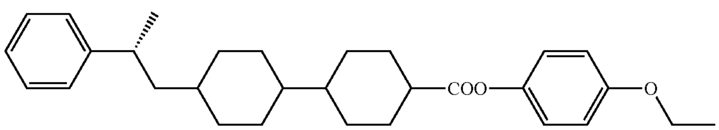
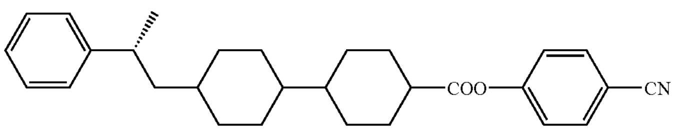
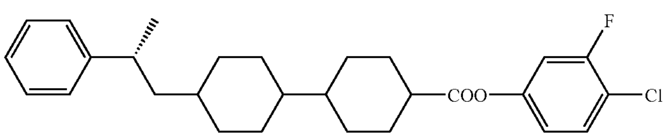
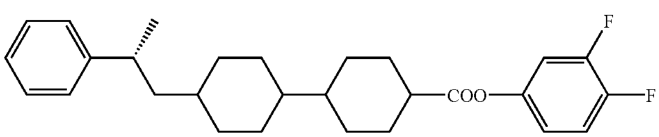
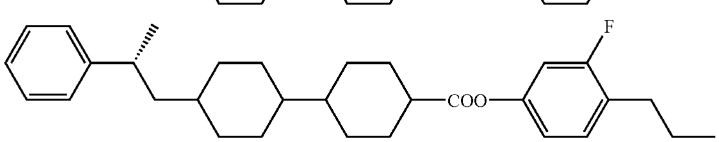
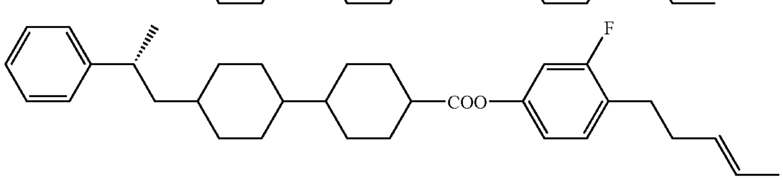
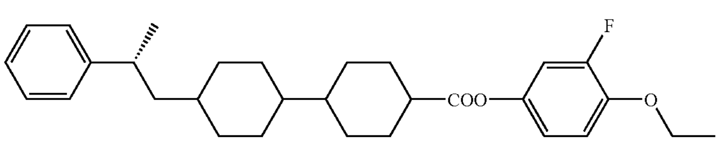

-continued
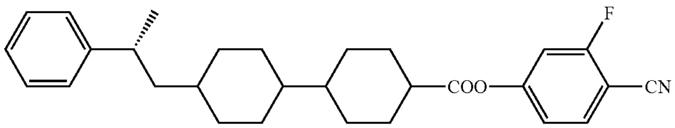
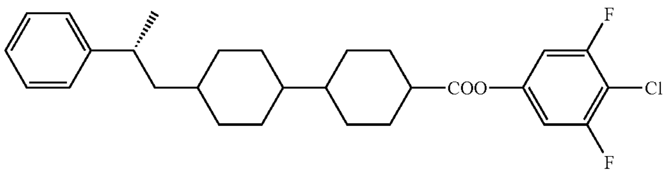
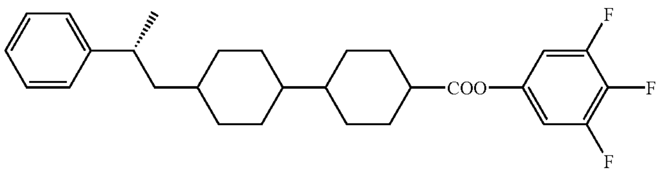
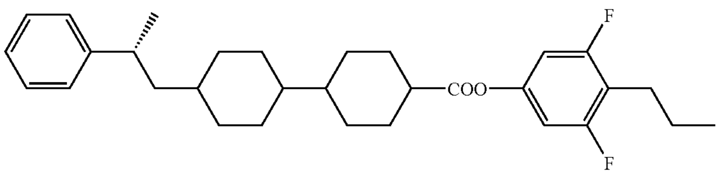
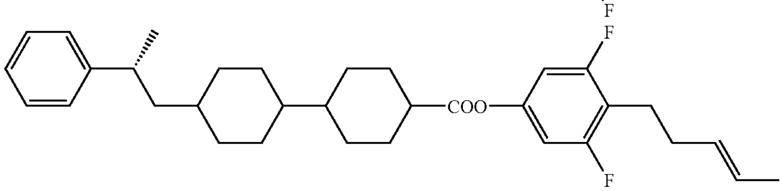
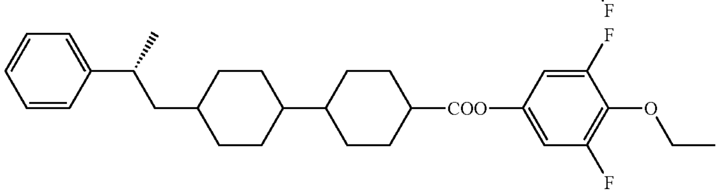
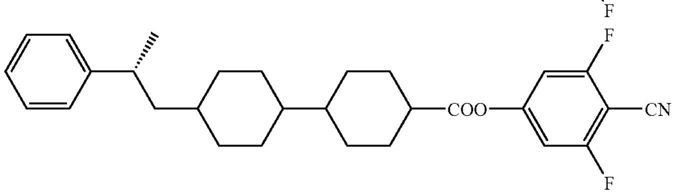
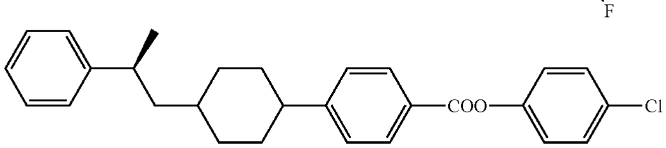
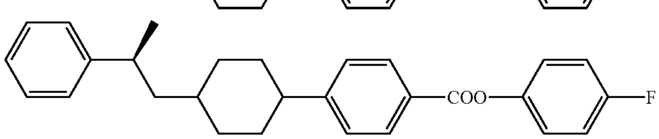
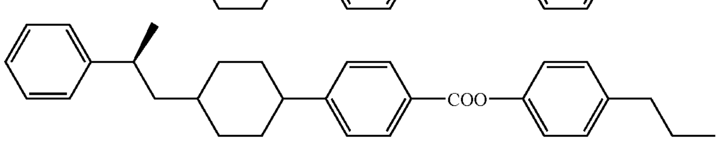
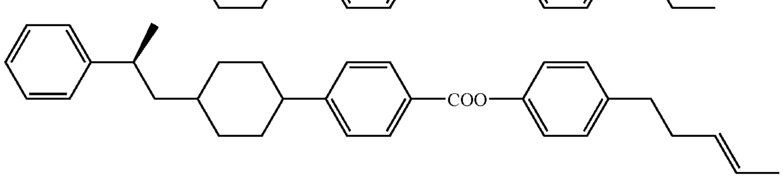

-continued
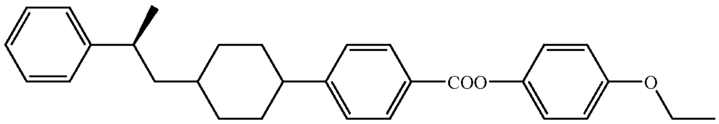
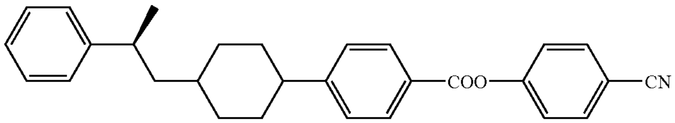
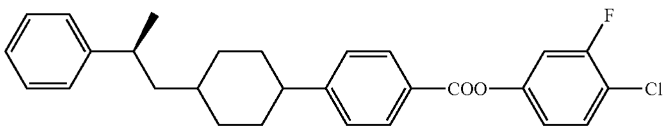
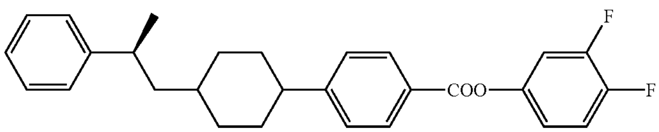
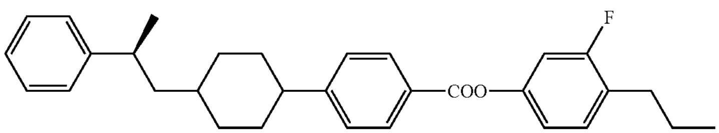
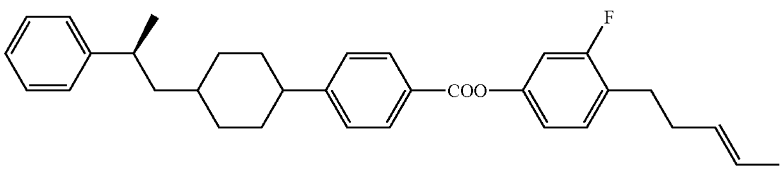
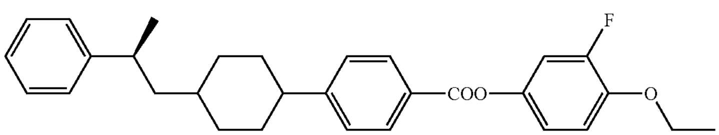
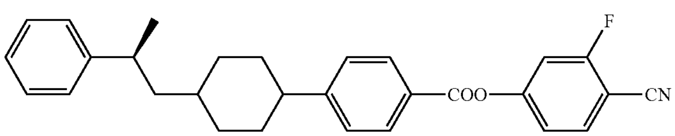
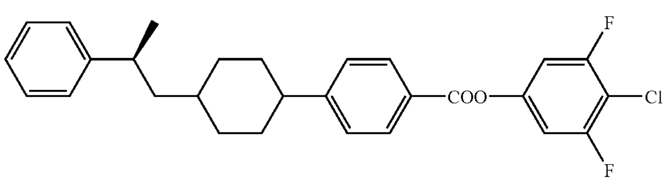
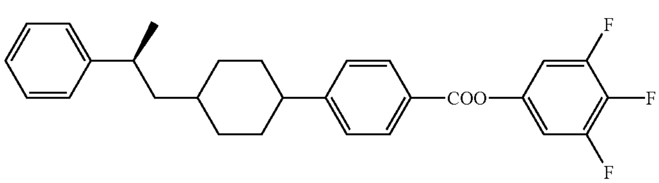
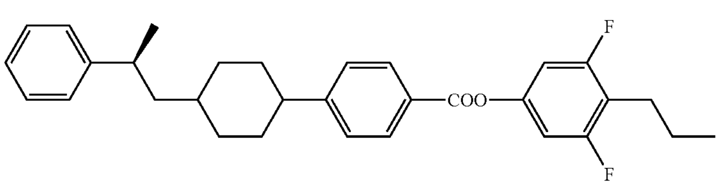

-continued
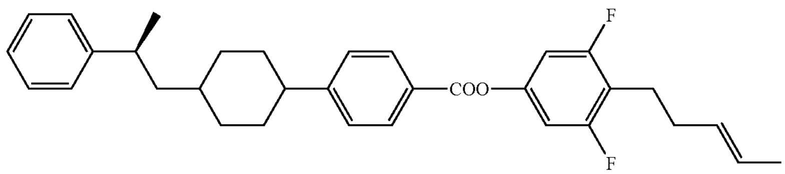
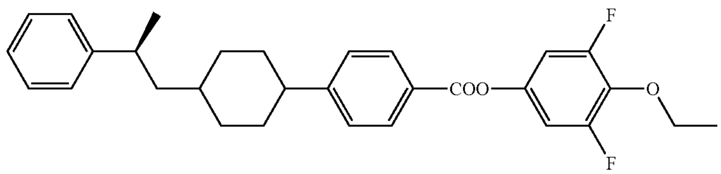
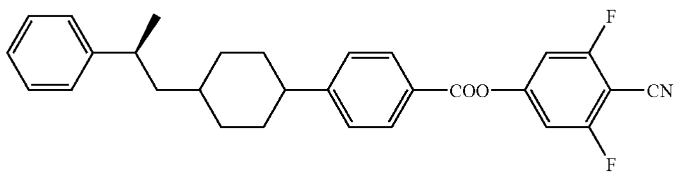
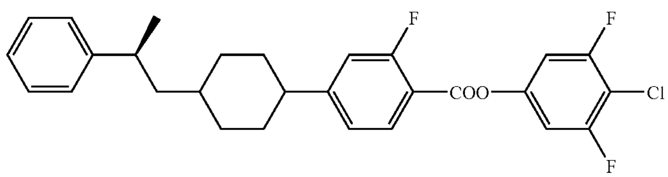
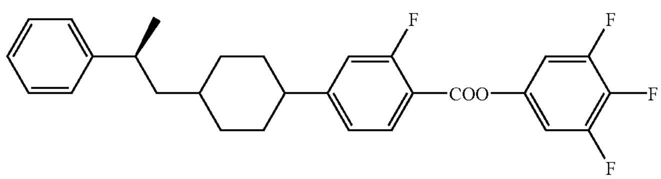
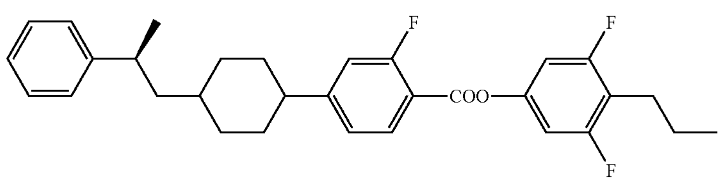
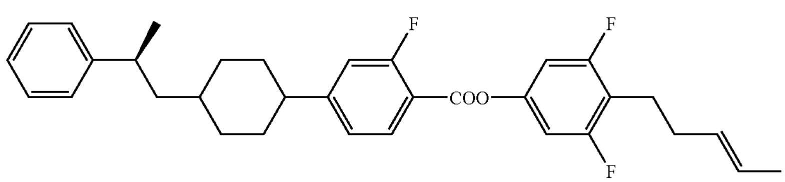
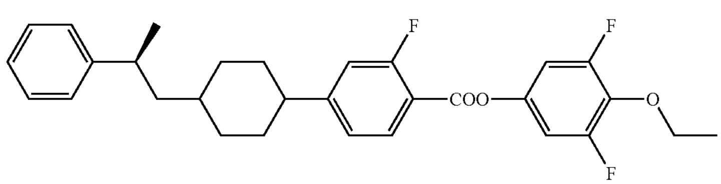
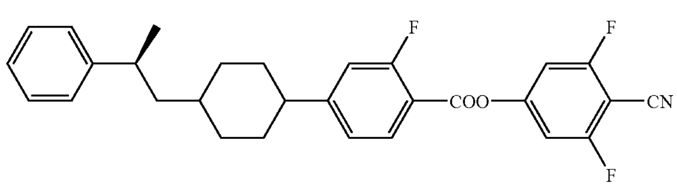

-continued
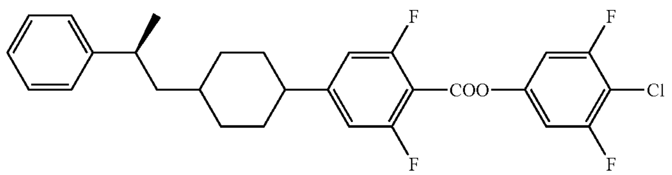
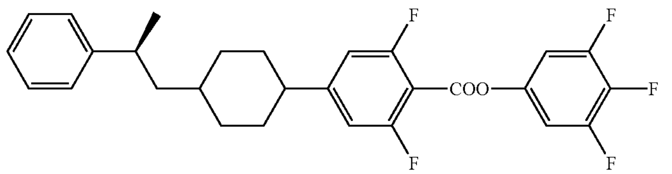
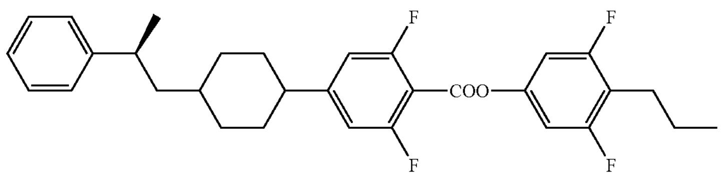
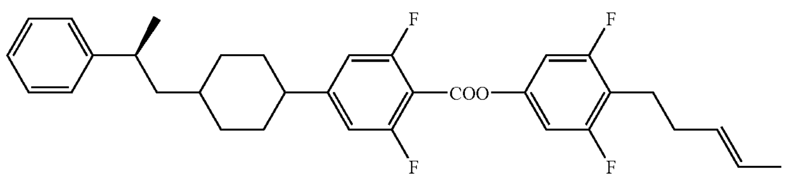
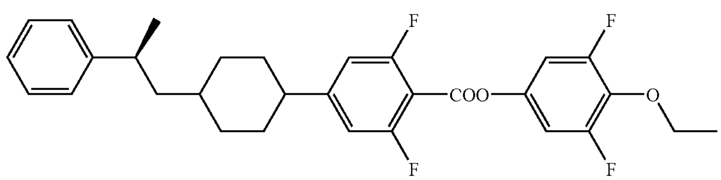
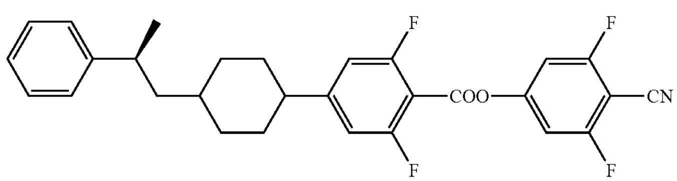
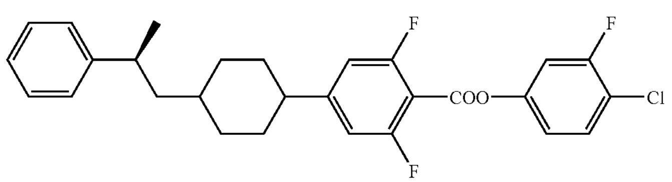
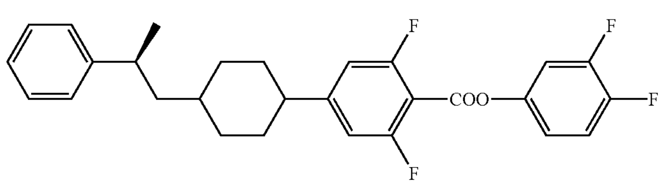
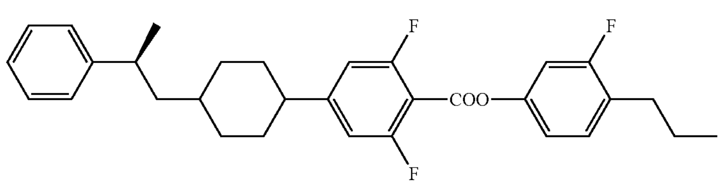

-continued
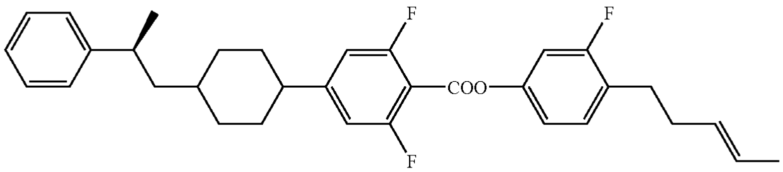
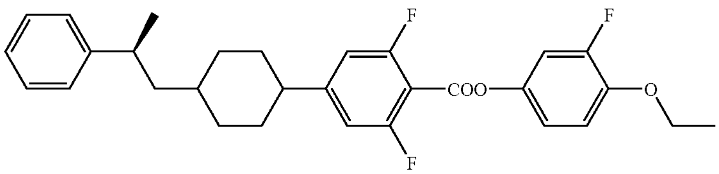
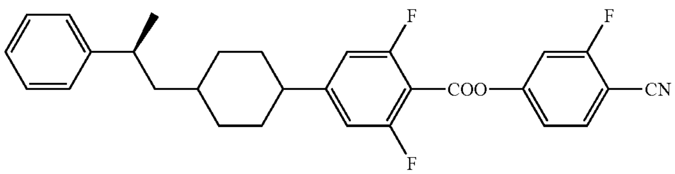
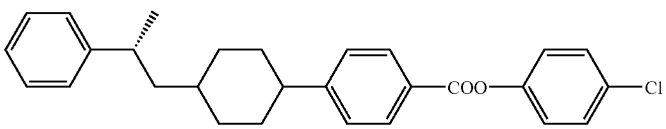
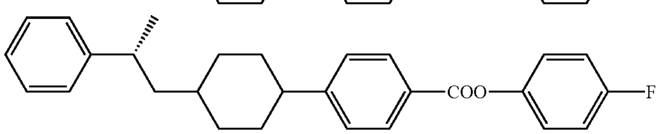
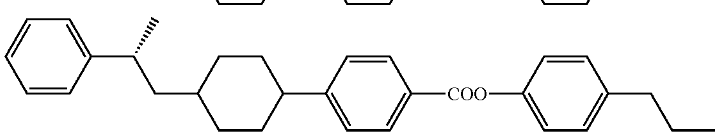
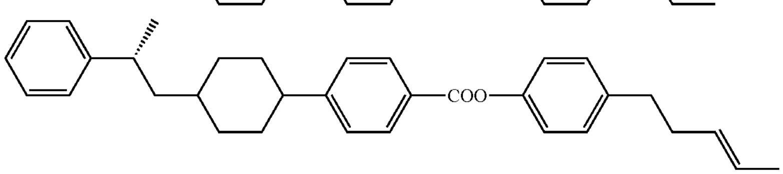
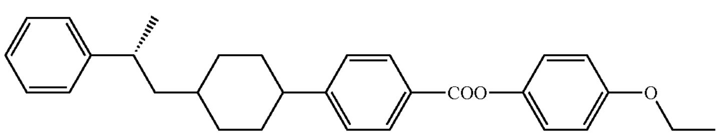
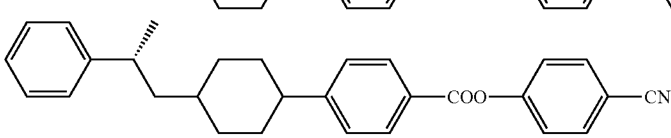
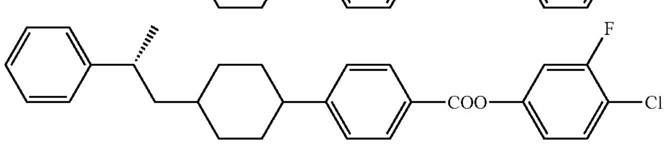
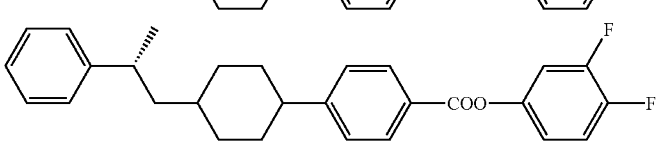
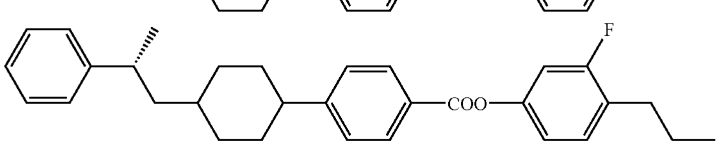

-continued
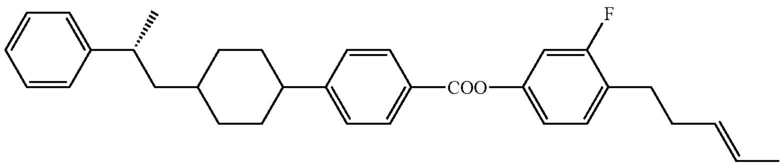
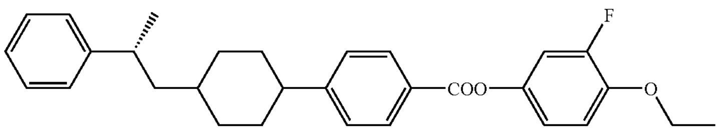
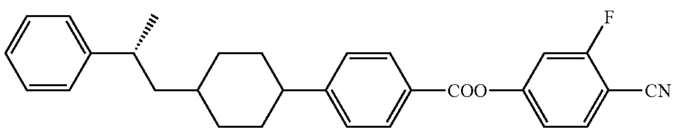
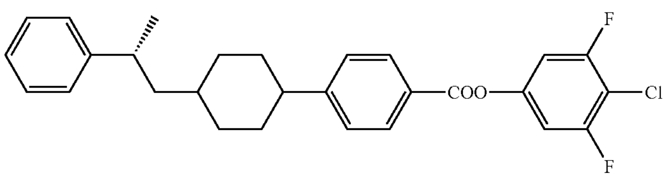
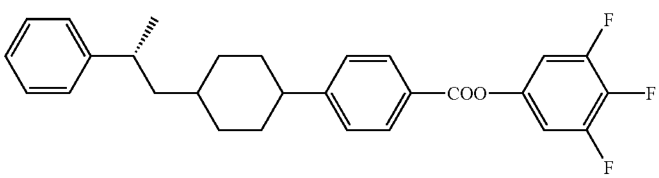
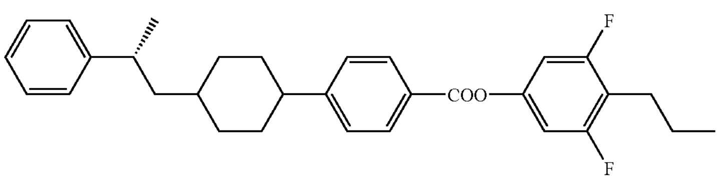
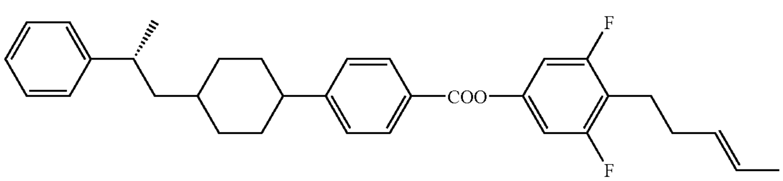
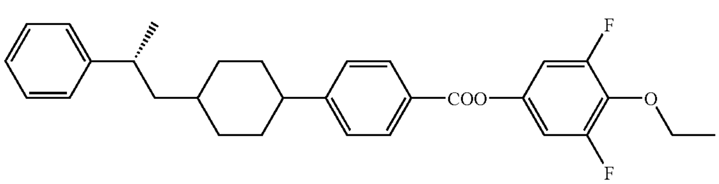
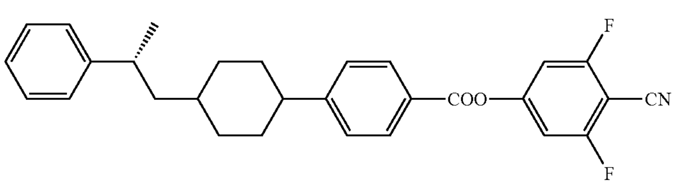
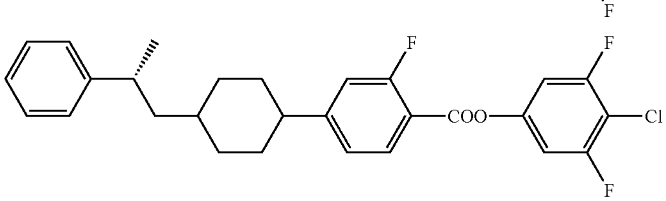

-continued
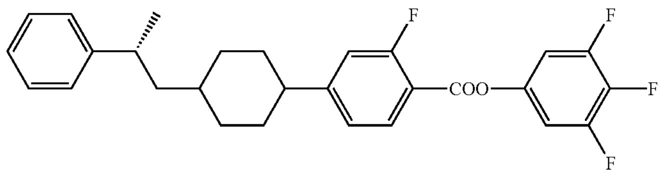
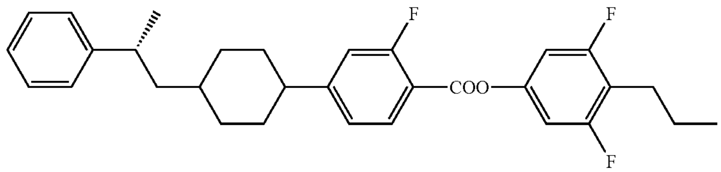
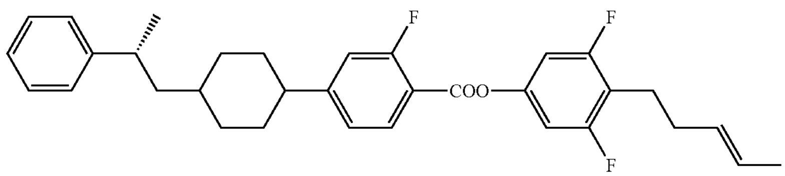
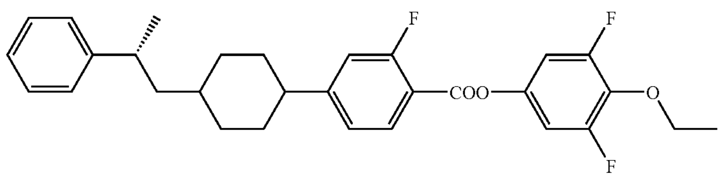
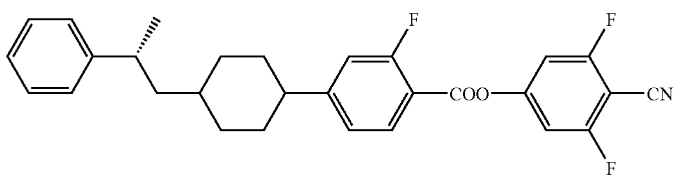
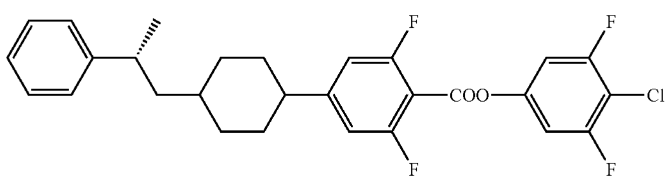
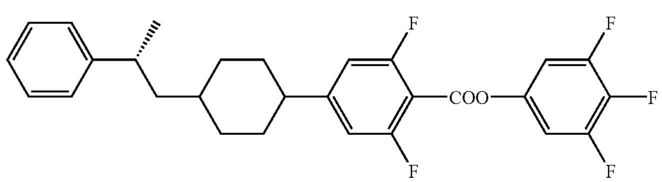
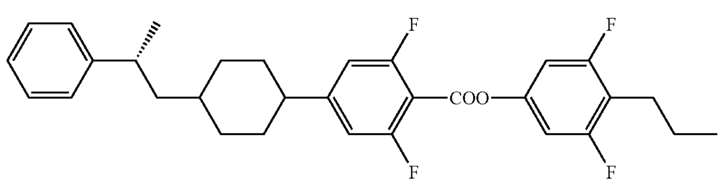
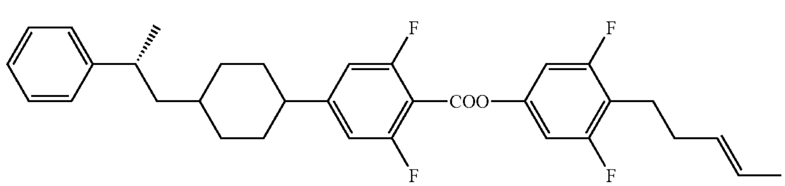

-continued
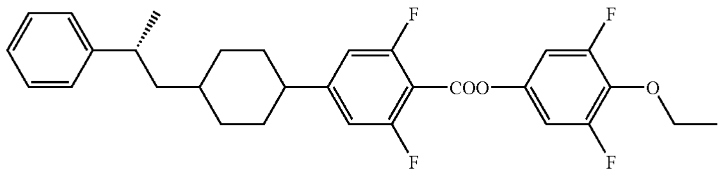
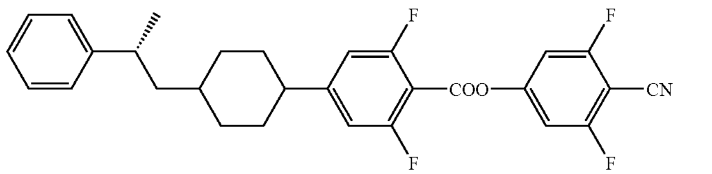
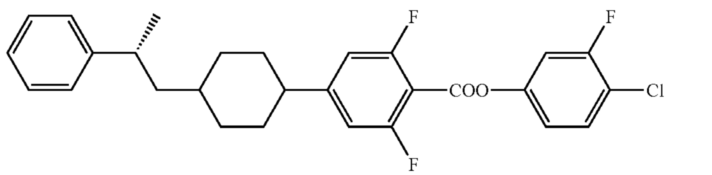
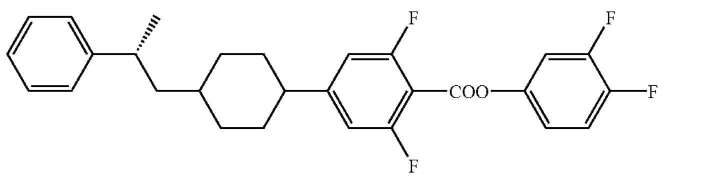
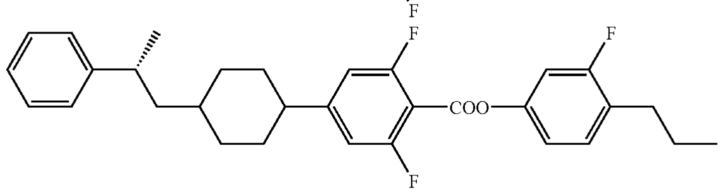
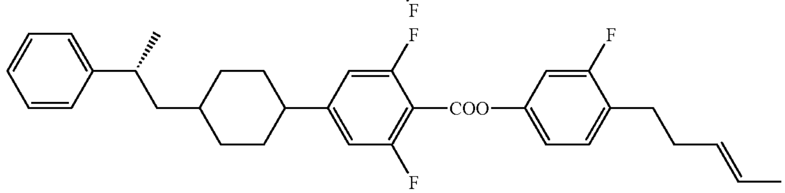
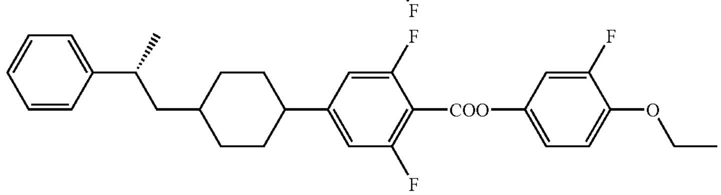
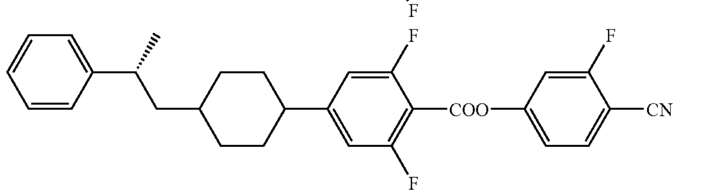
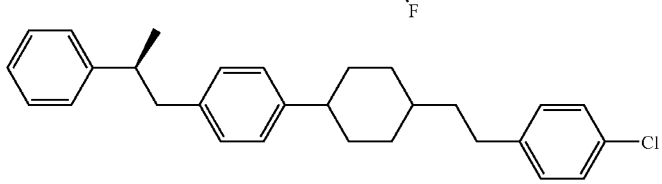
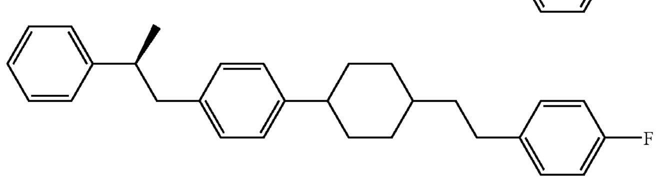

-continued
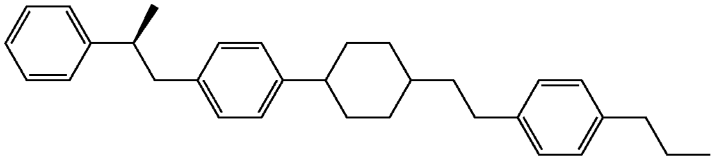
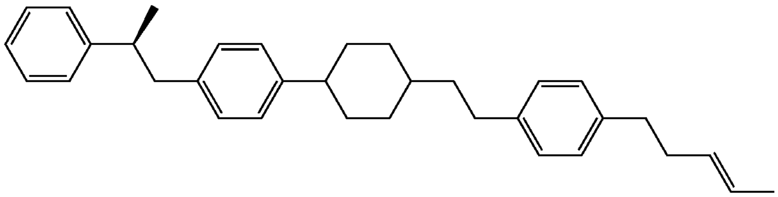
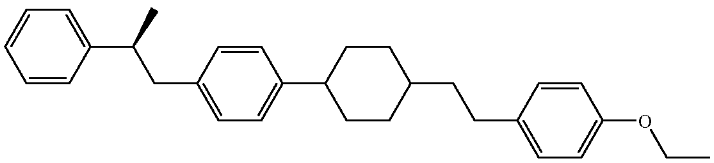
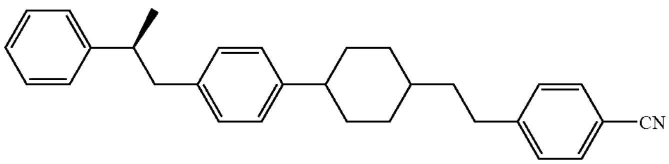
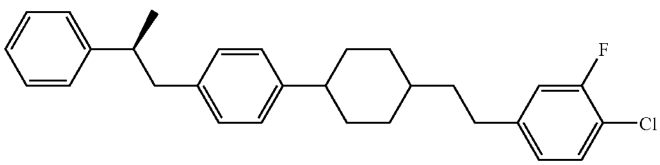
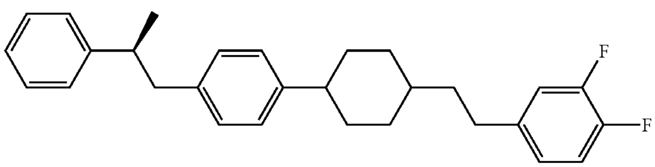
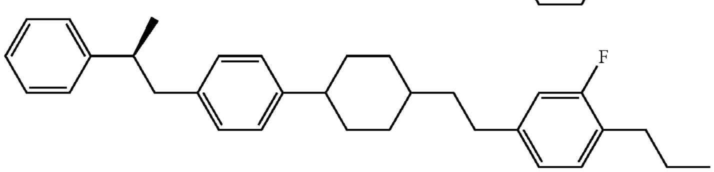
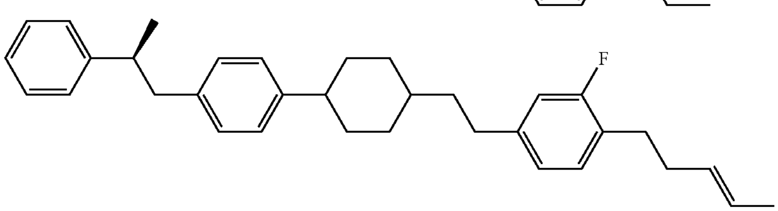
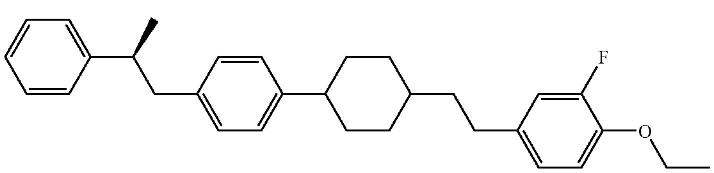
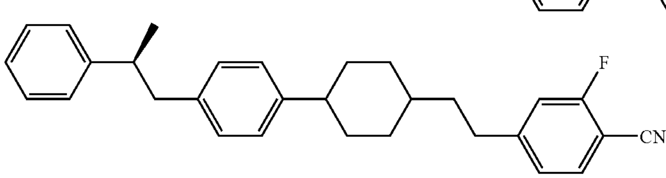

-continued
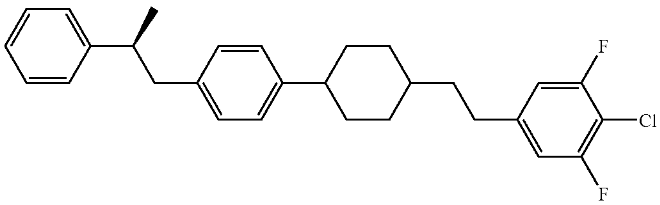
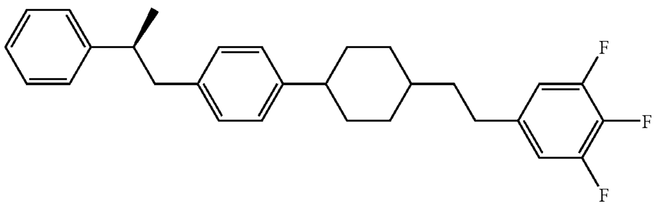
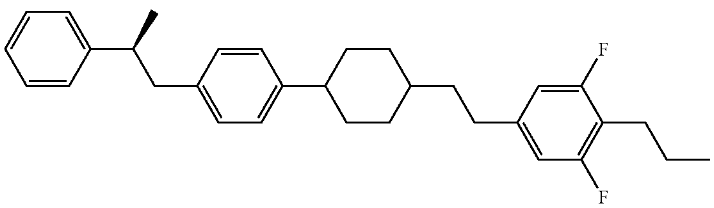
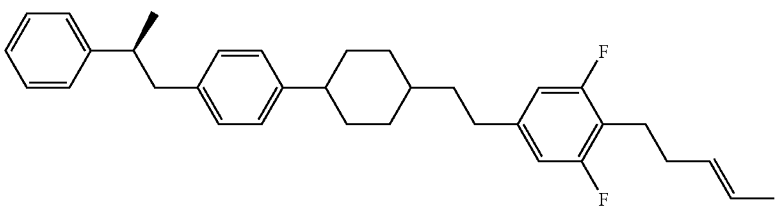
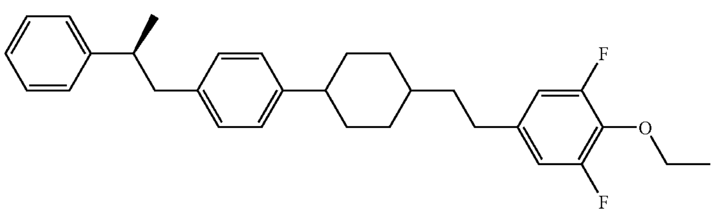
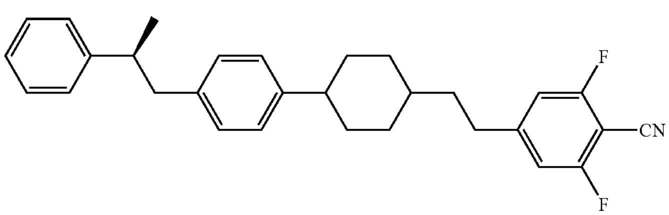
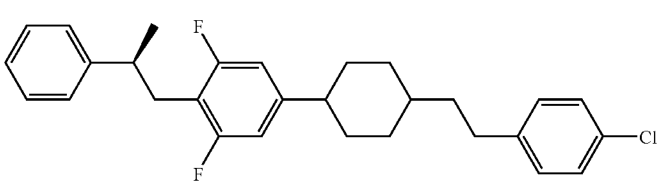
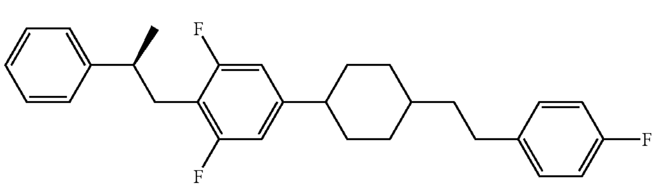

-continued
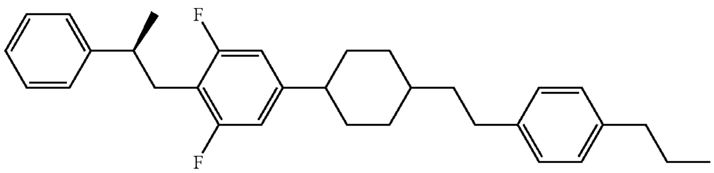
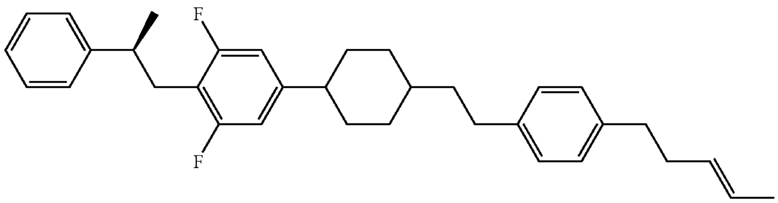
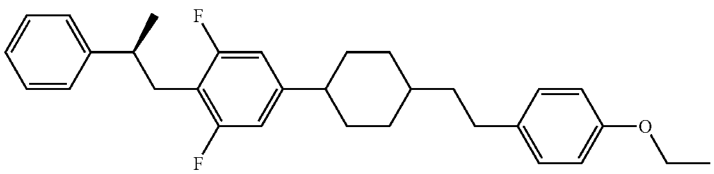
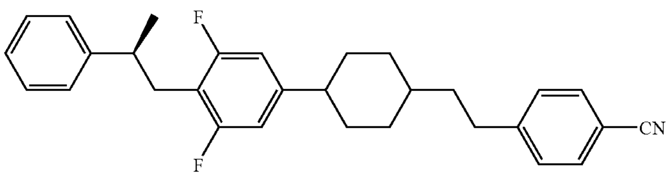
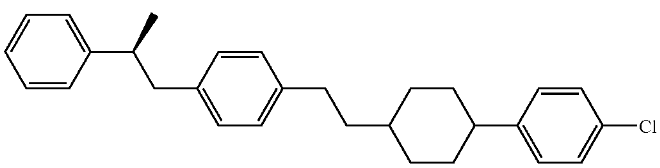
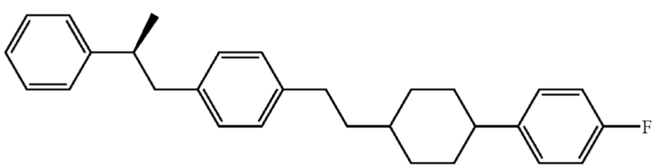
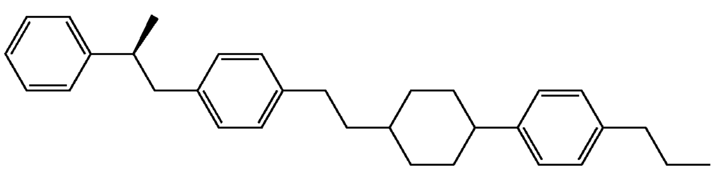
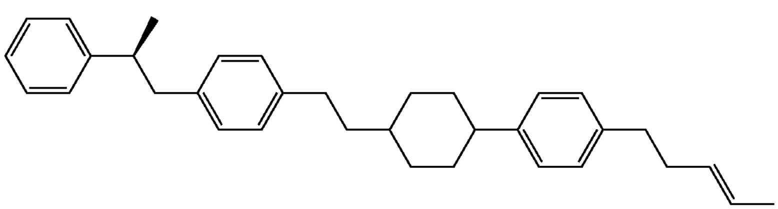
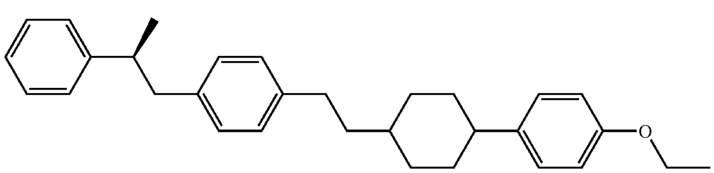

-continued
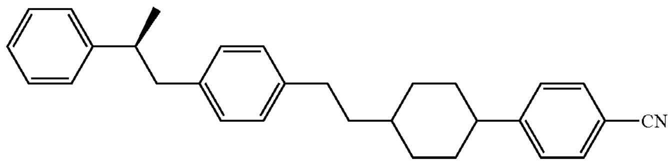
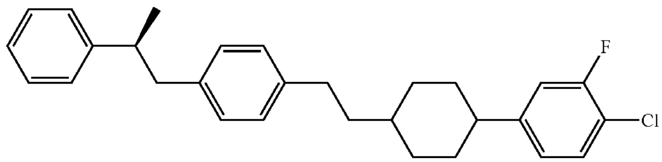
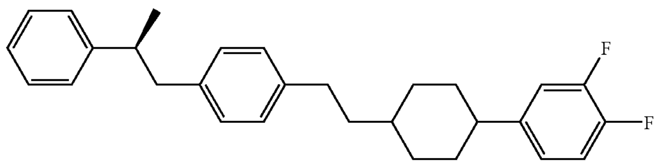
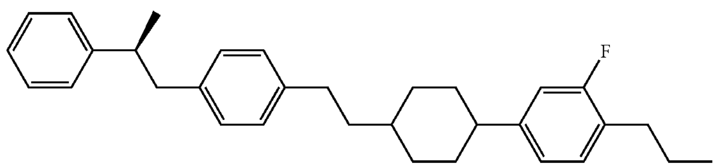
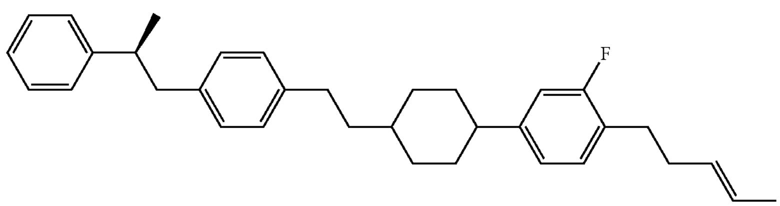
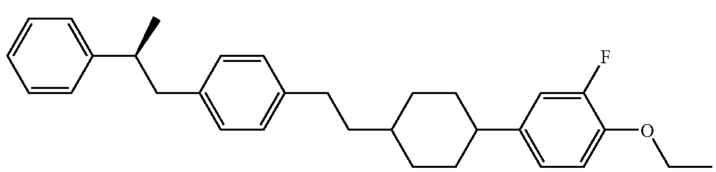
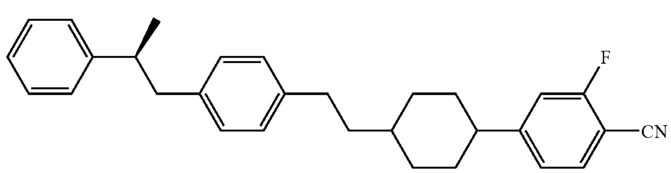
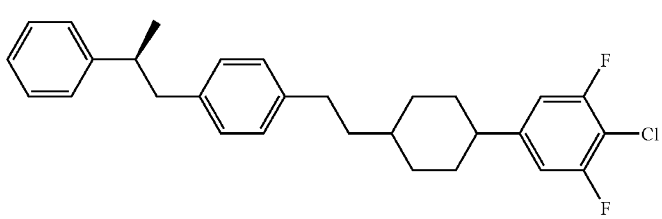
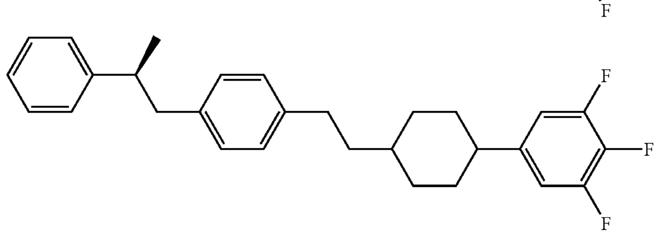

-continued
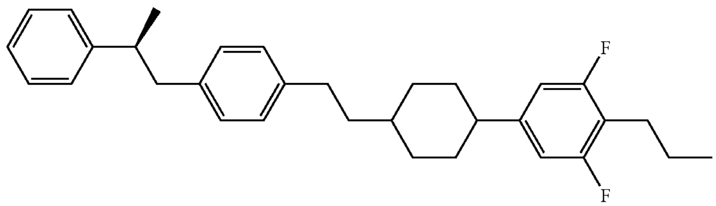
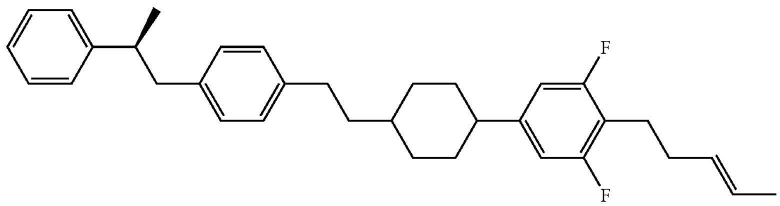
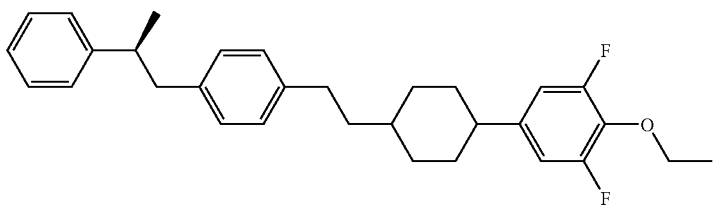
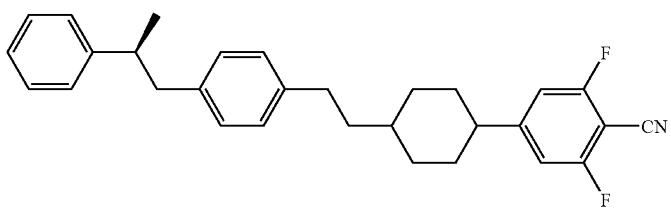
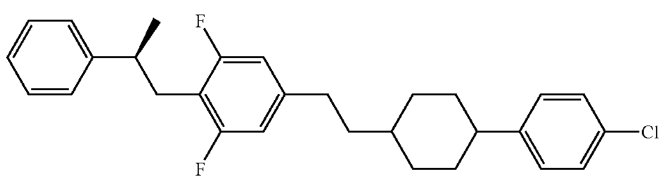
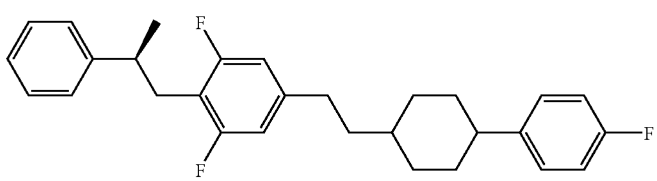
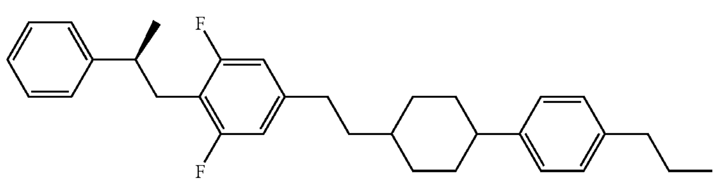
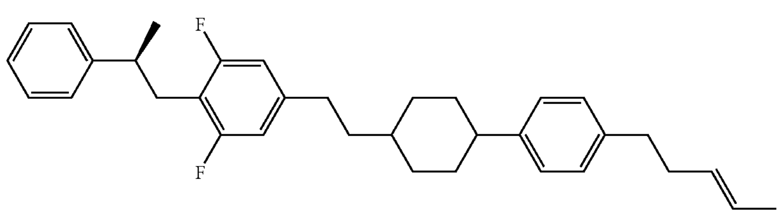

-continued
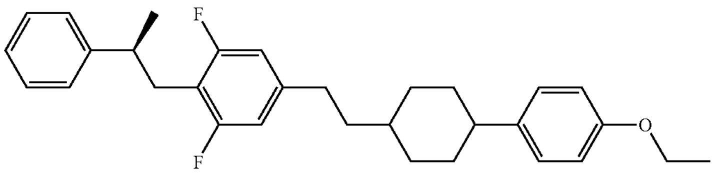
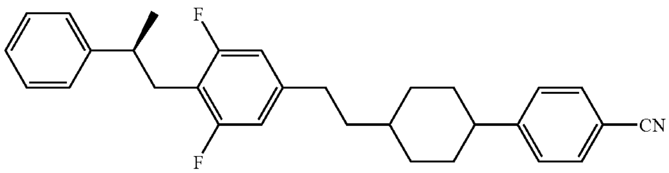
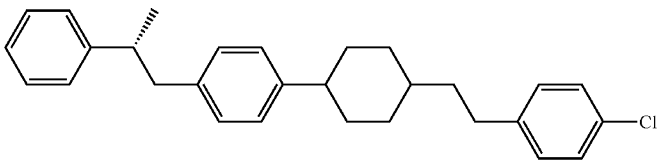
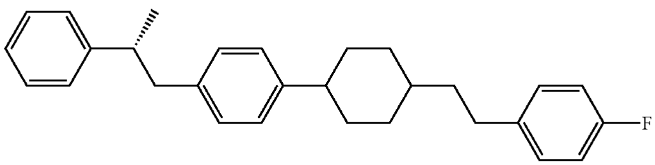
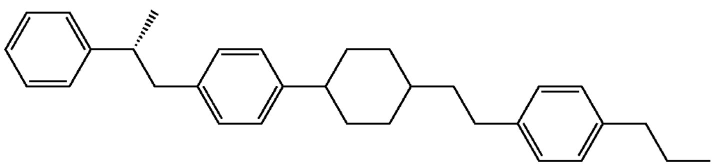
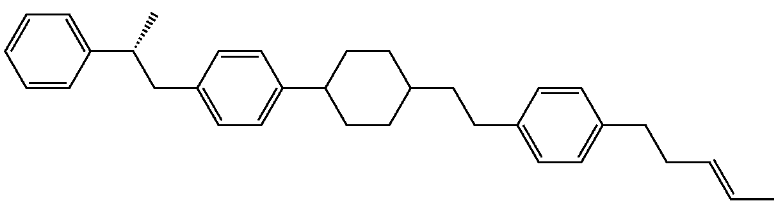
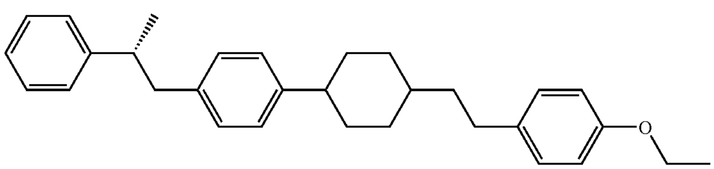
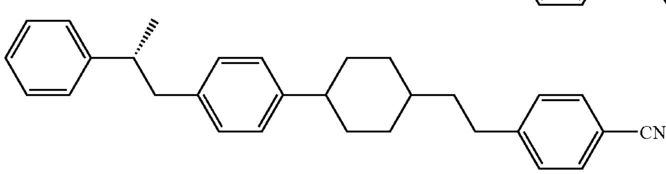
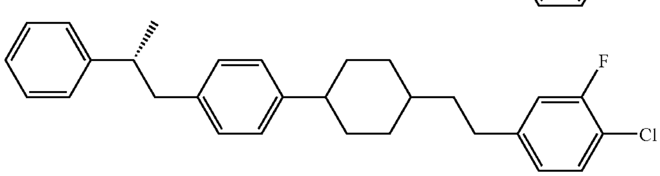
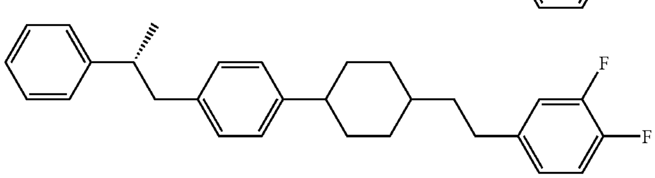

-continued
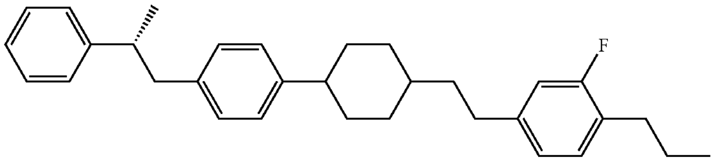
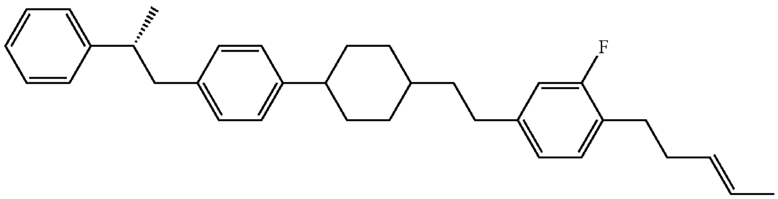
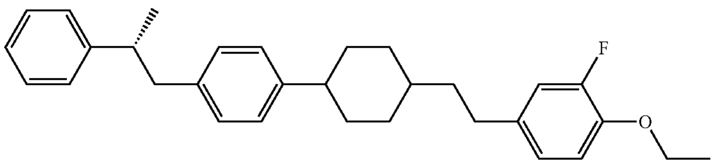
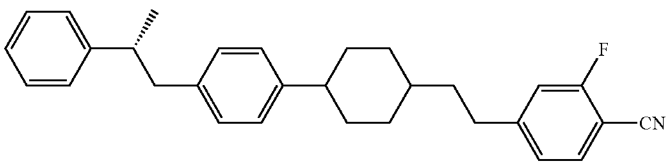
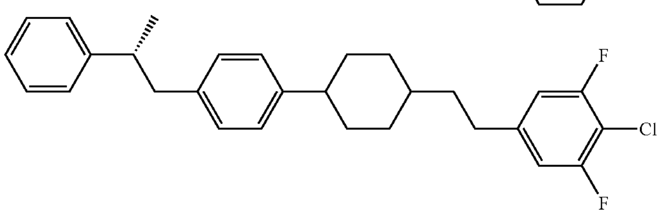
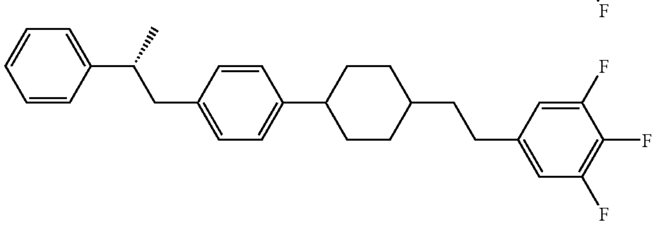
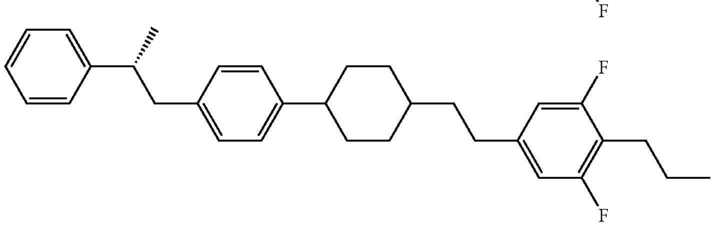
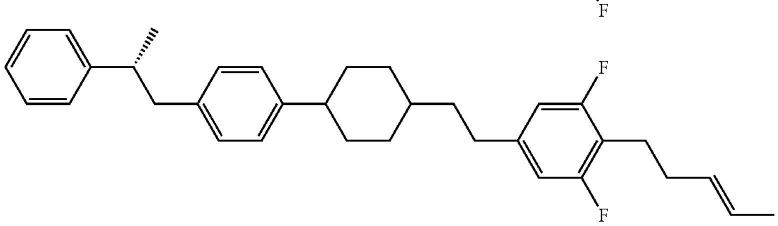
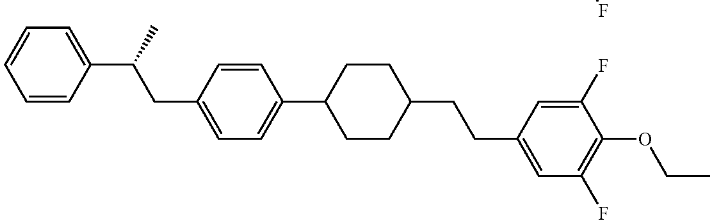

-continued
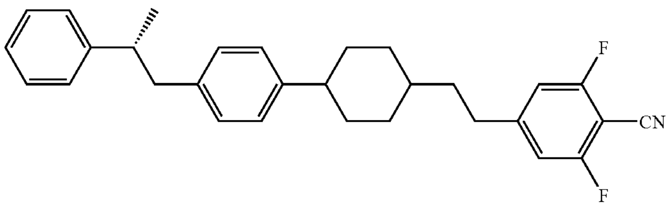
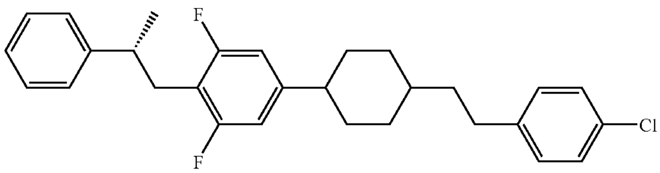
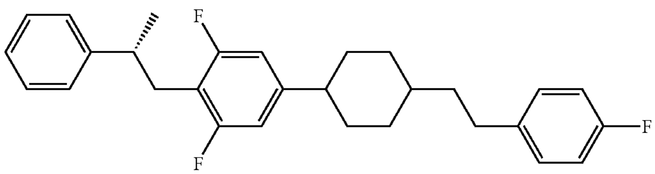
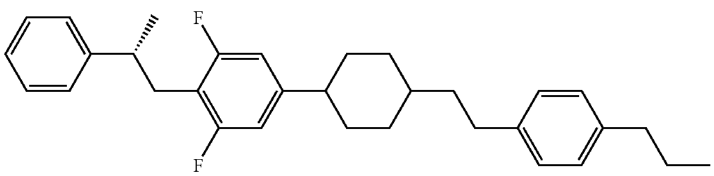
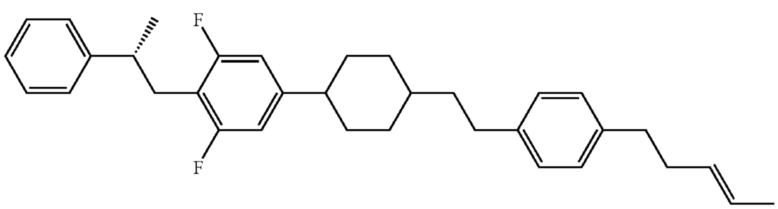
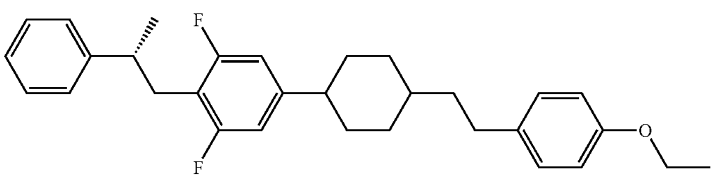
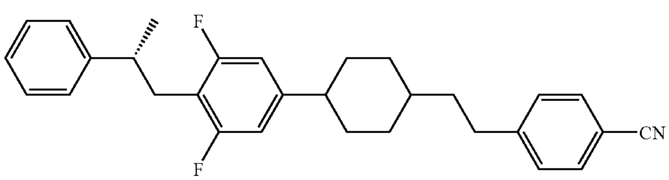
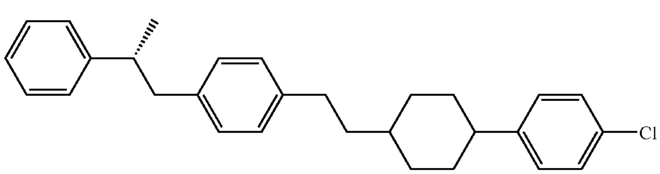
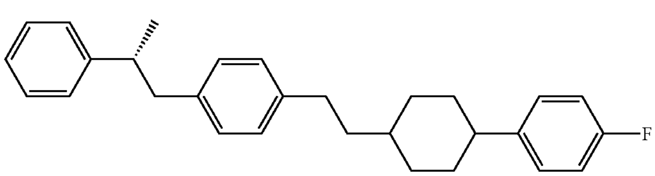

-continued
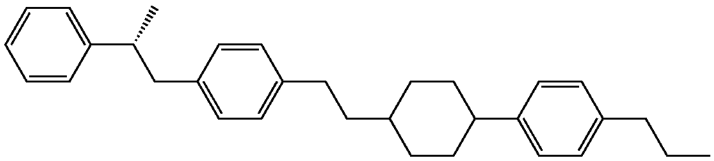
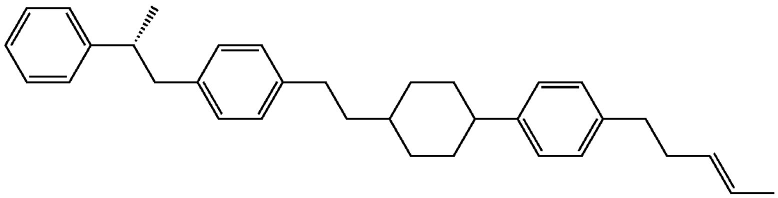
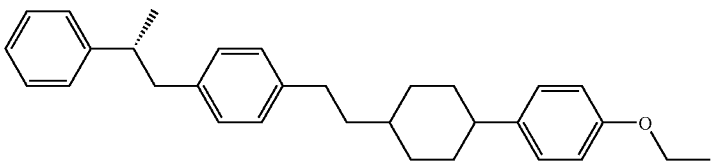
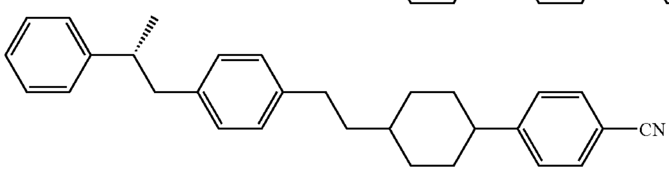
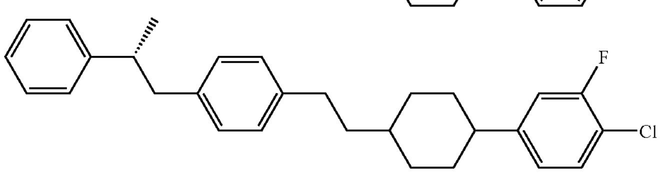
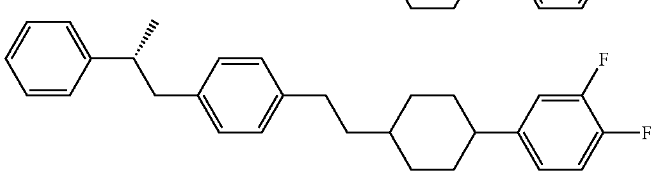
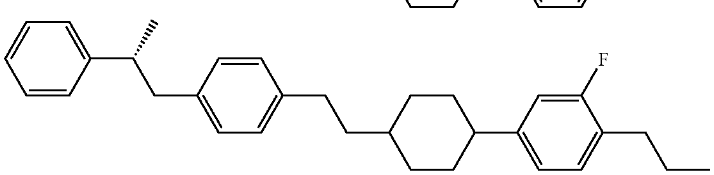
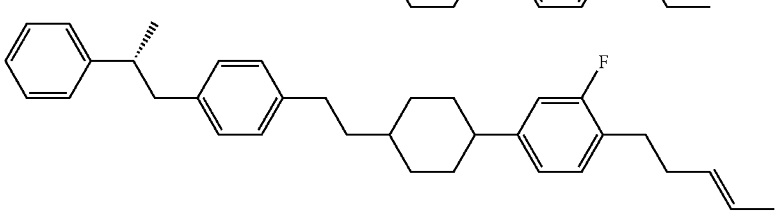
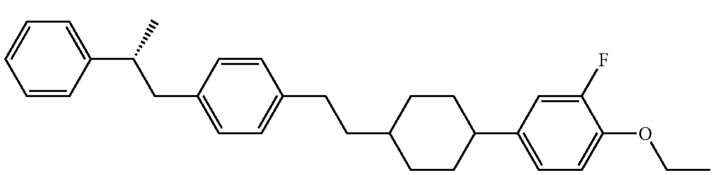
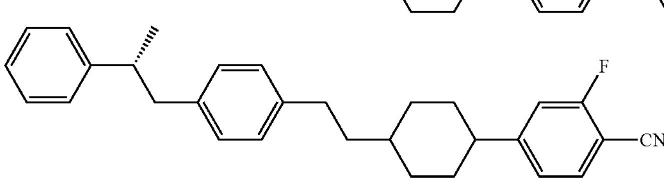

-continued
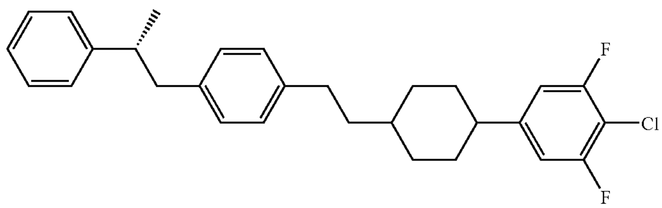
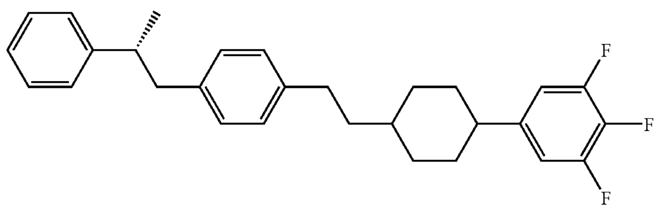
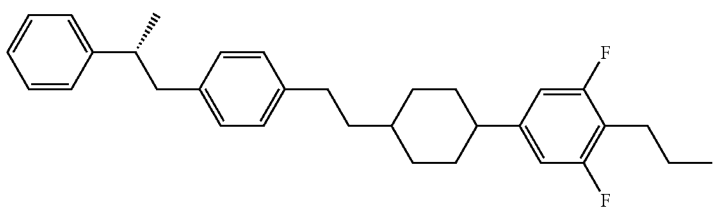
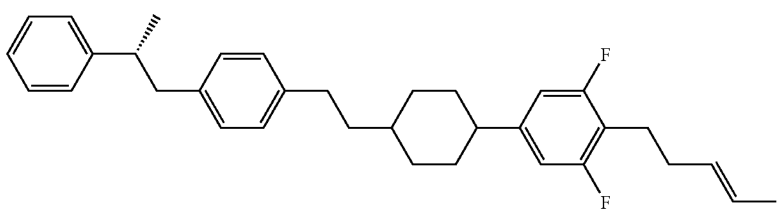
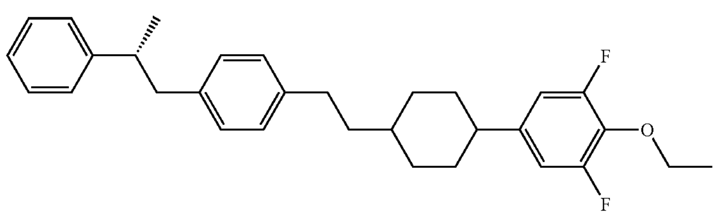
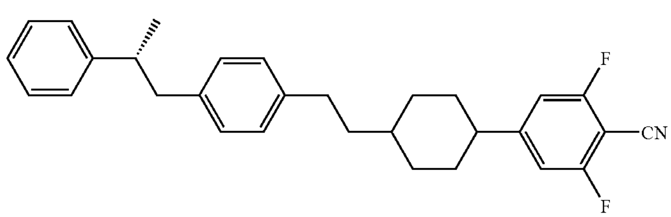
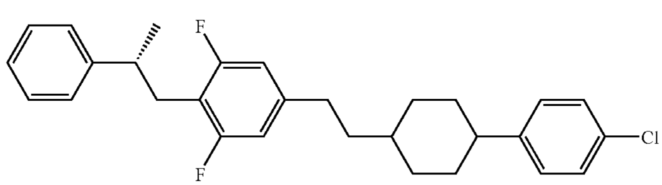
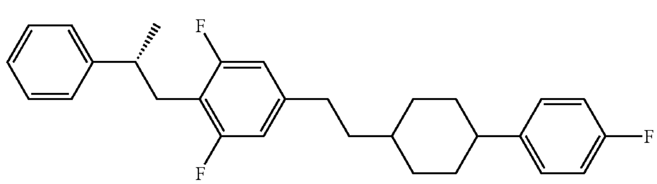

-continued
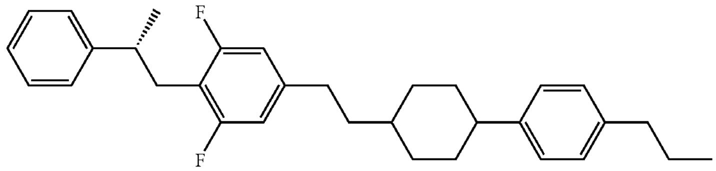
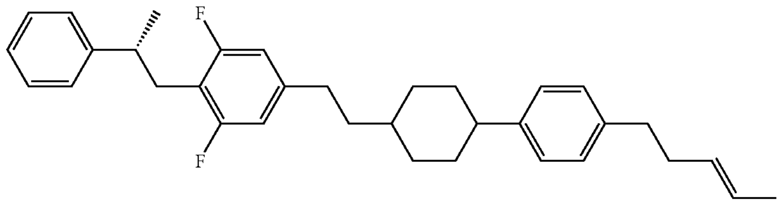
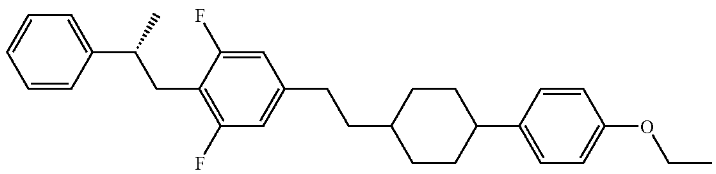
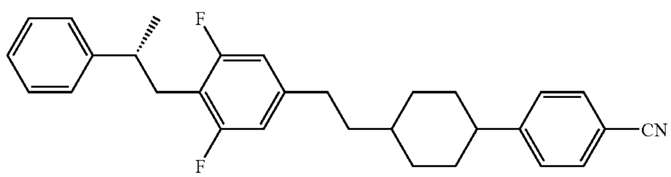
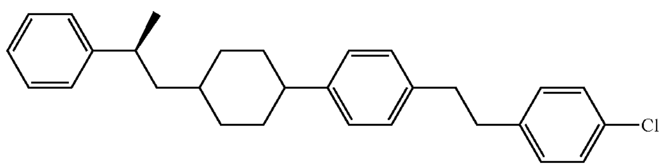
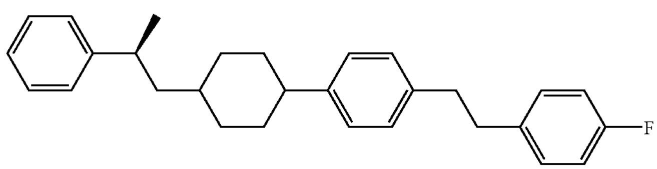
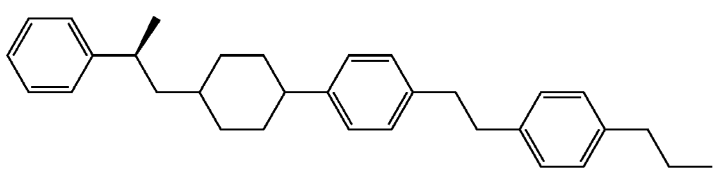
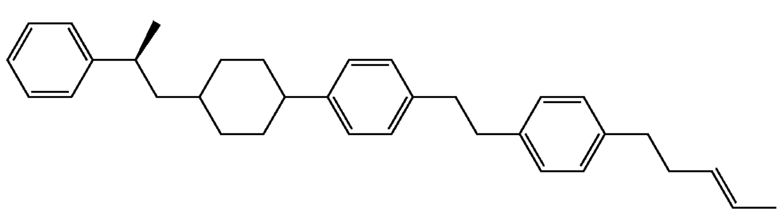
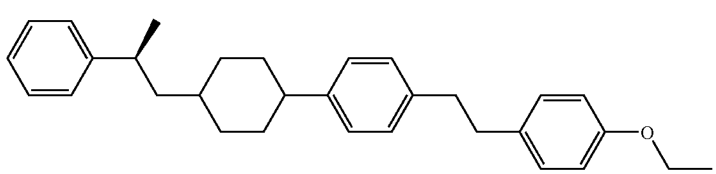

-continued
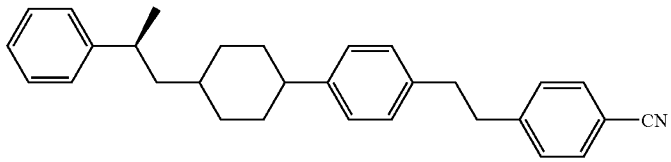
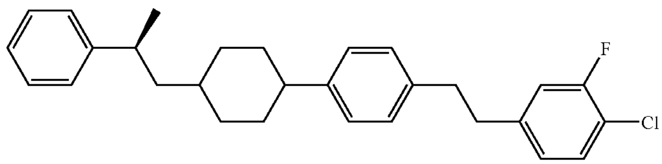
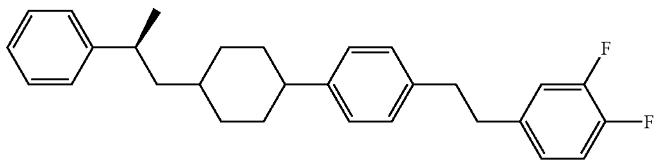
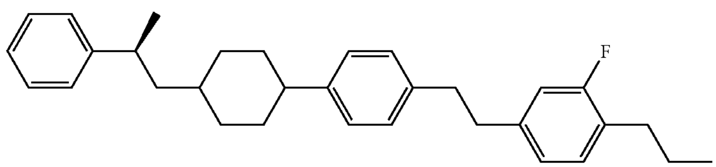
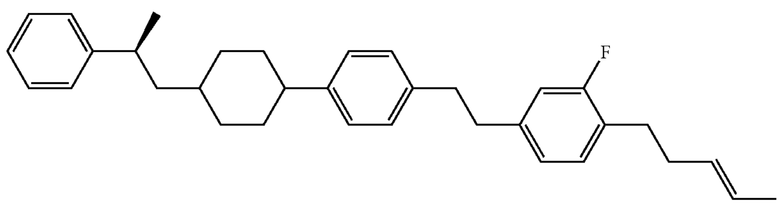
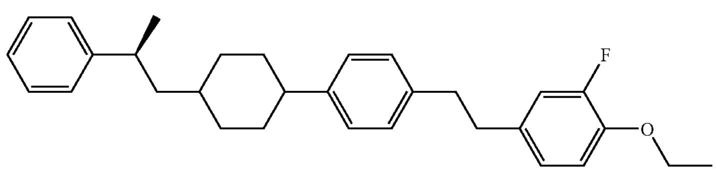
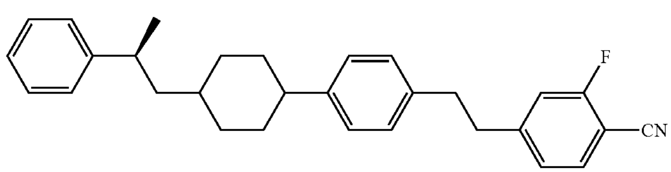
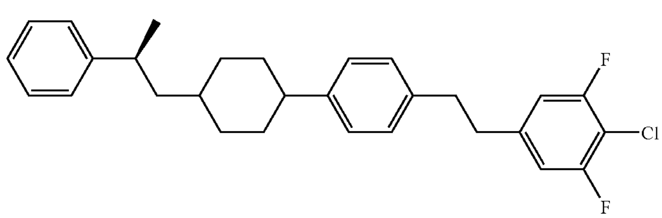
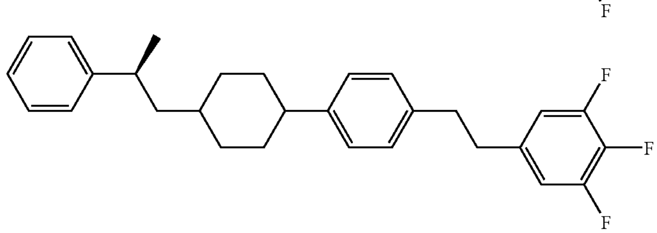

-continued
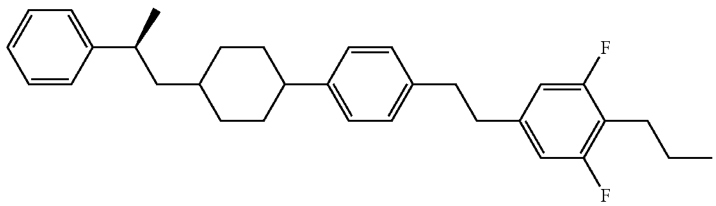
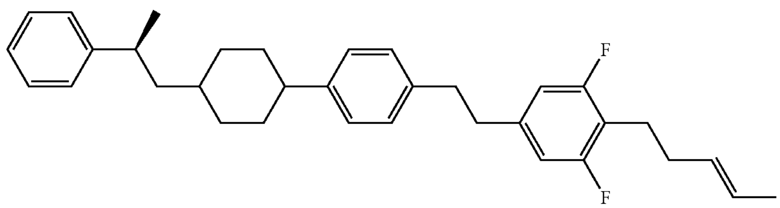
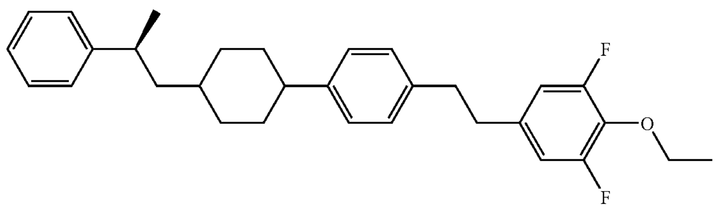
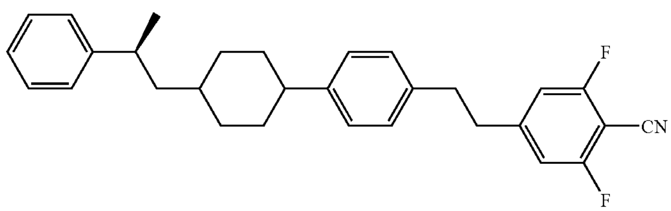
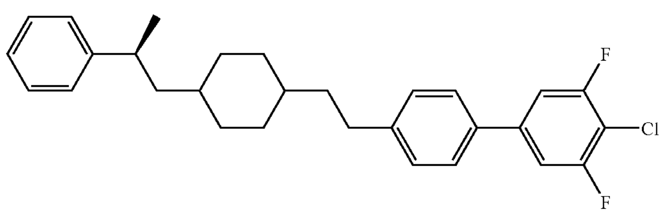
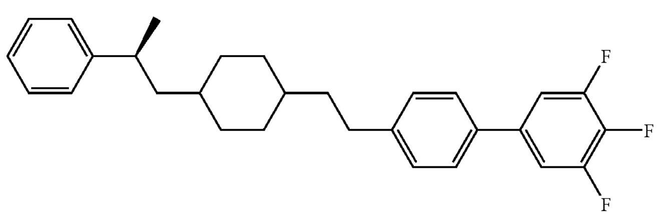
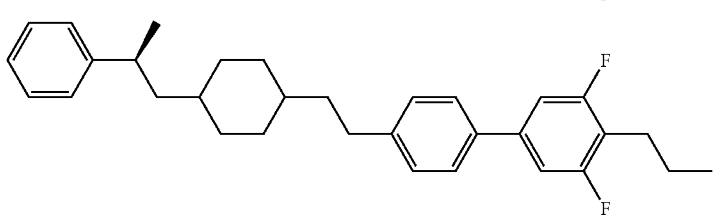
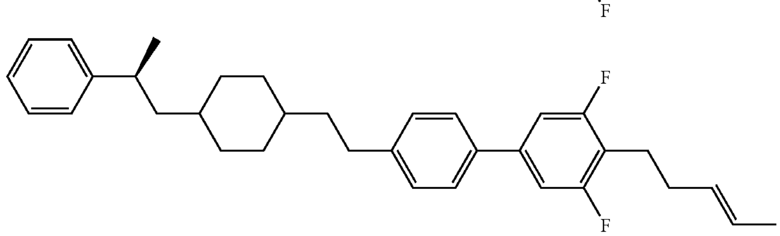

-continued
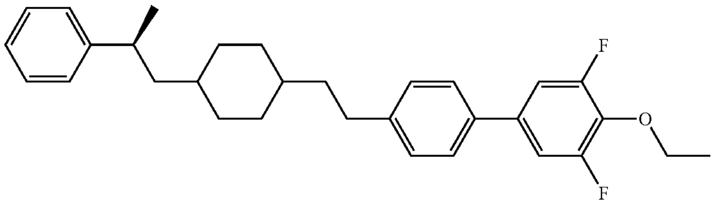
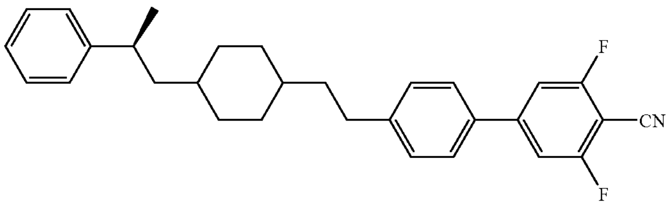
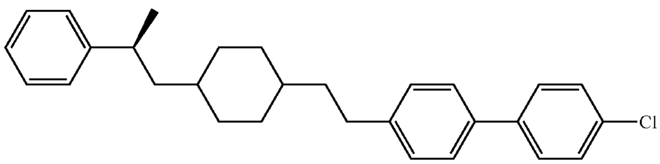
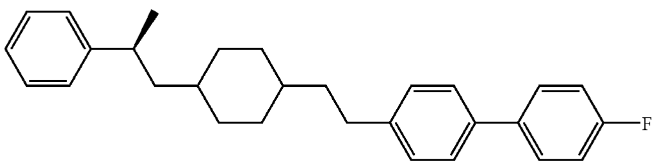
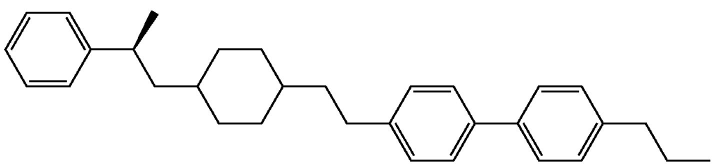
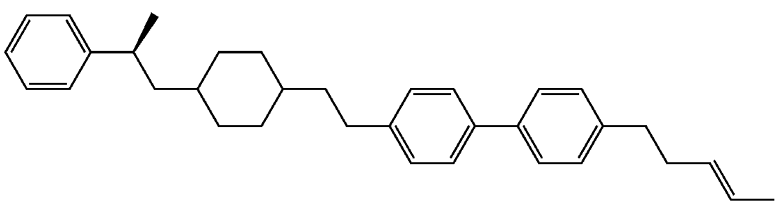
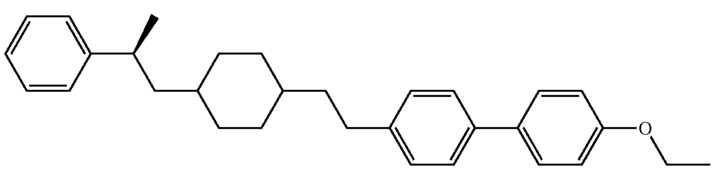
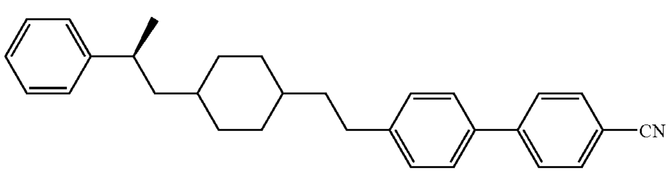
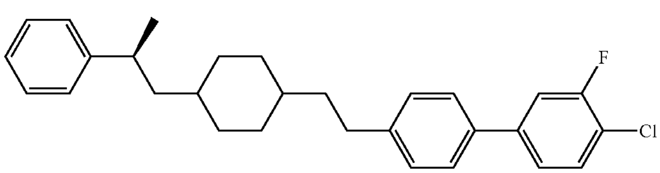

-continued
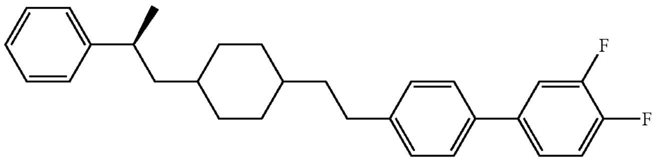
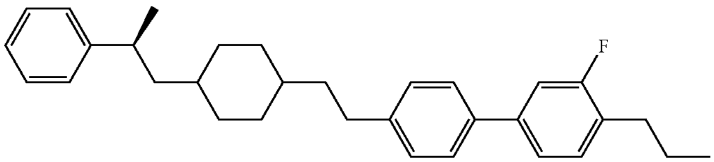
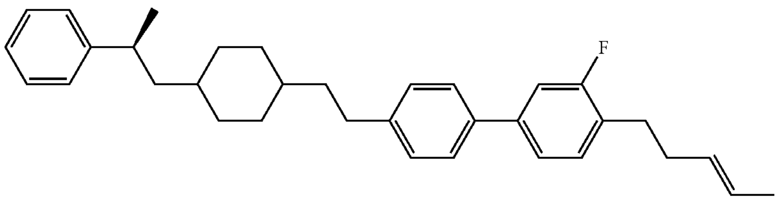
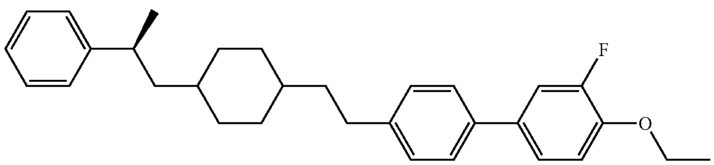
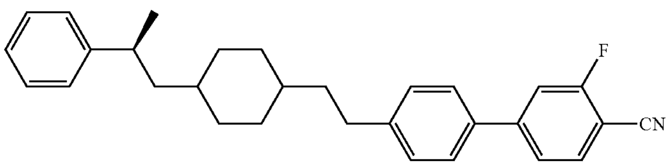
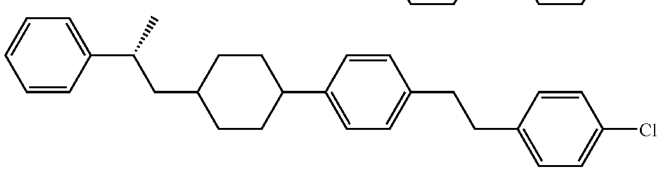
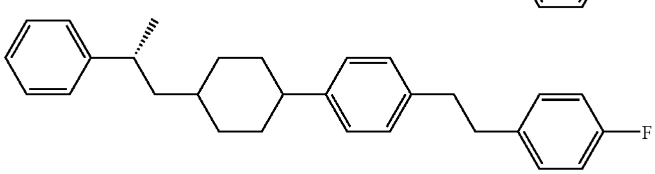
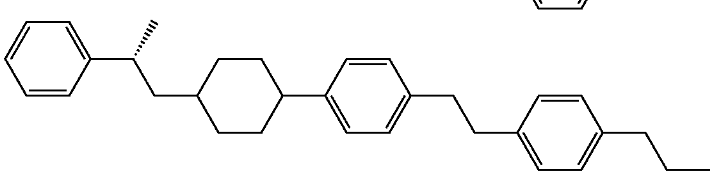
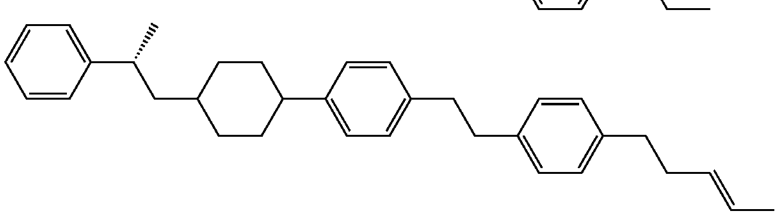
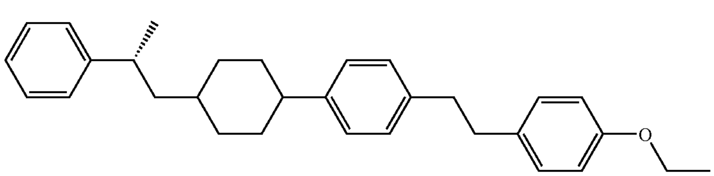

-continued
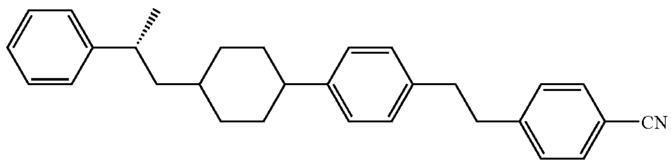
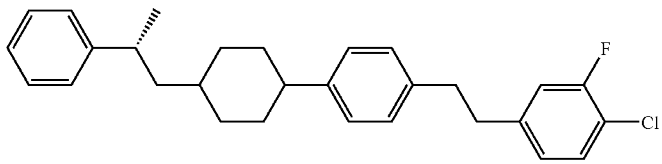
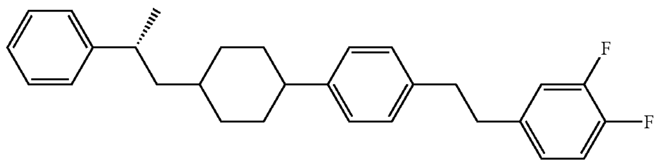
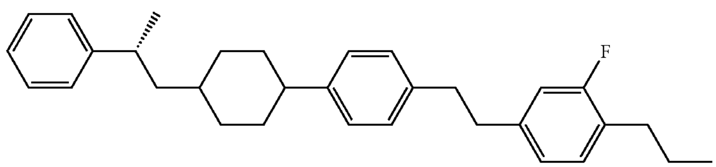
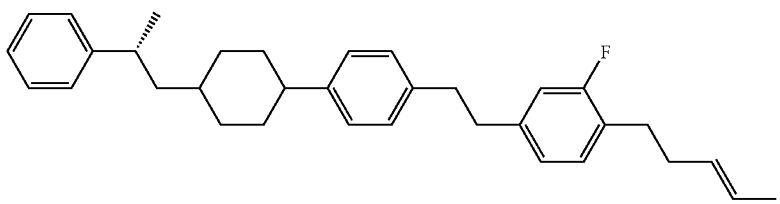
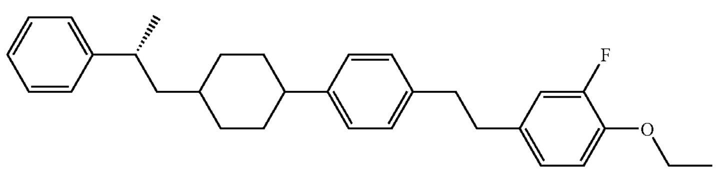
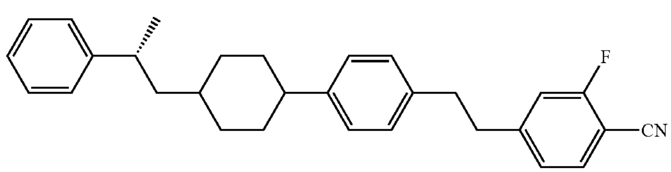
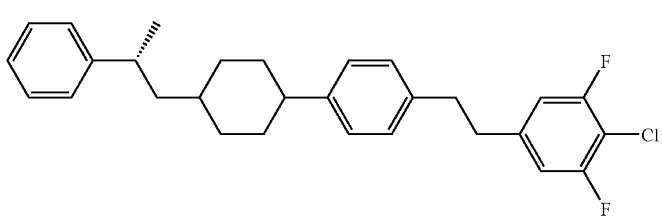
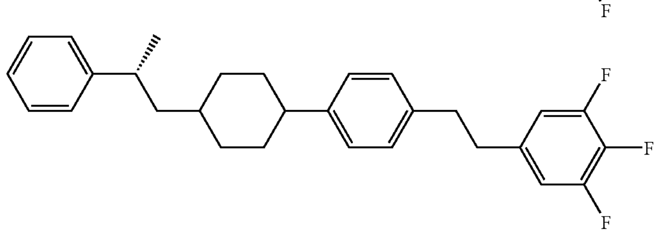

-continued
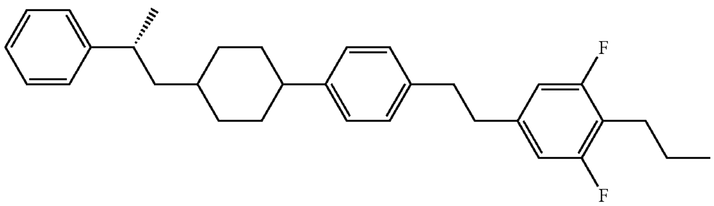
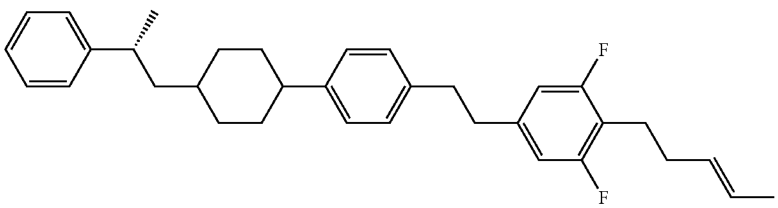
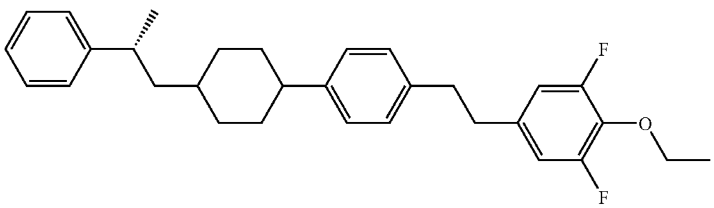
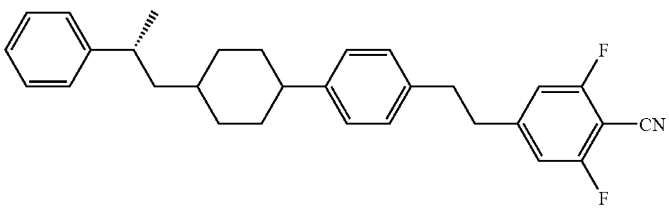
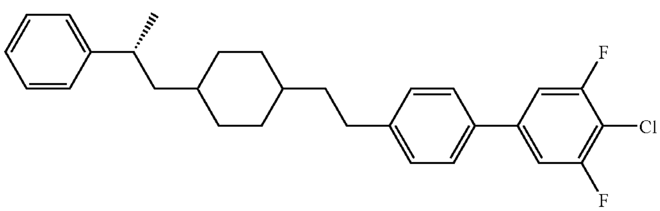
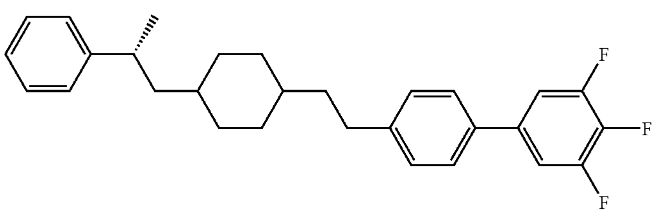
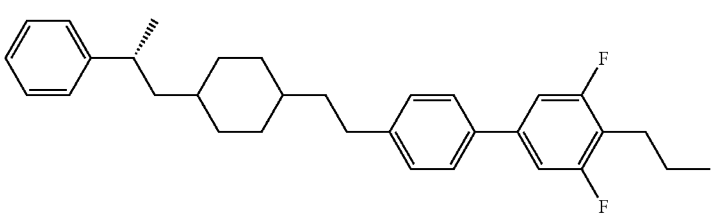
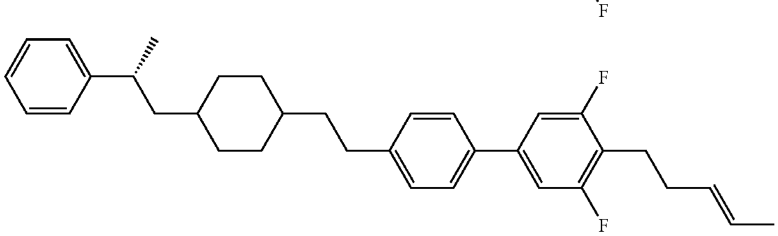

-continued
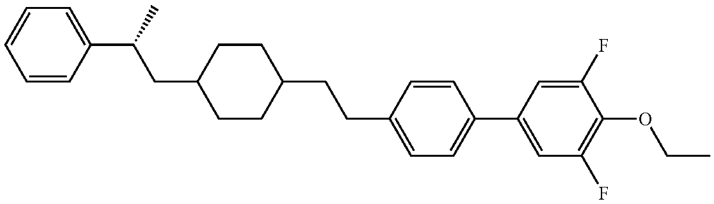
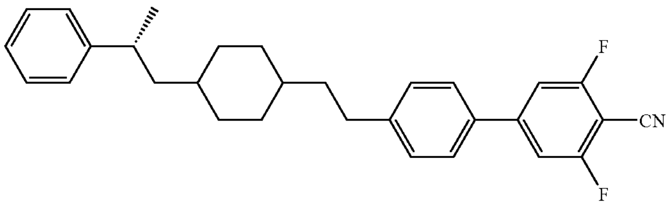
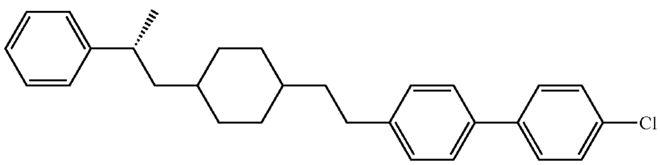
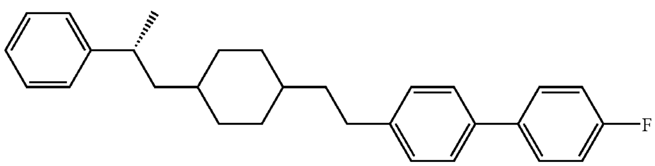
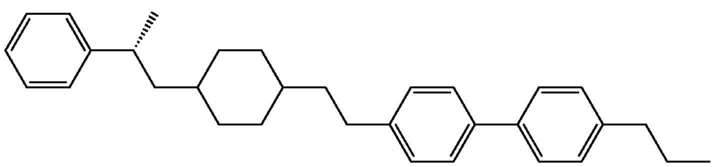
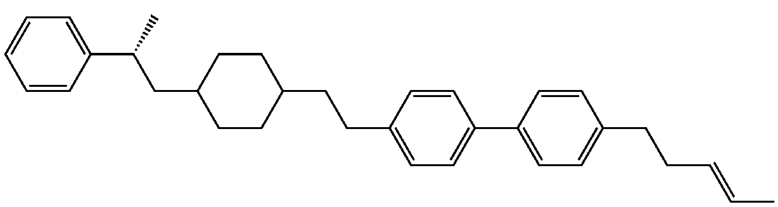
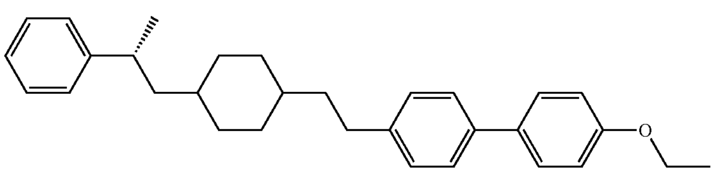
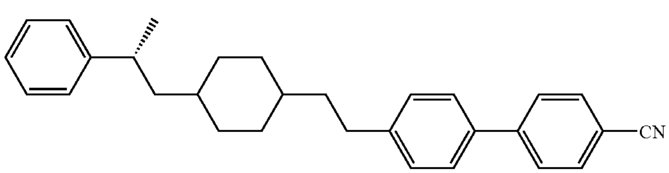
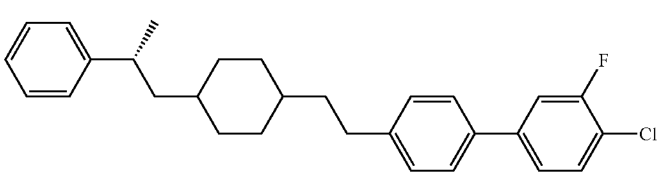

-continued
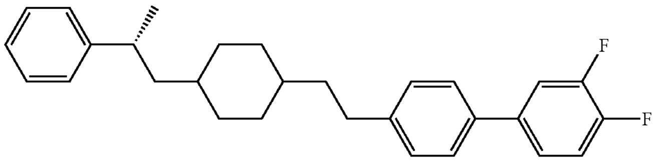
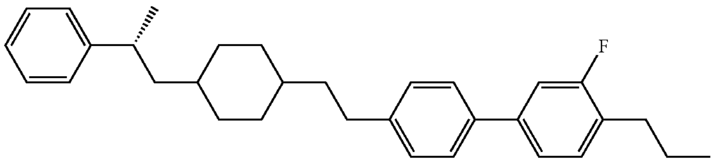
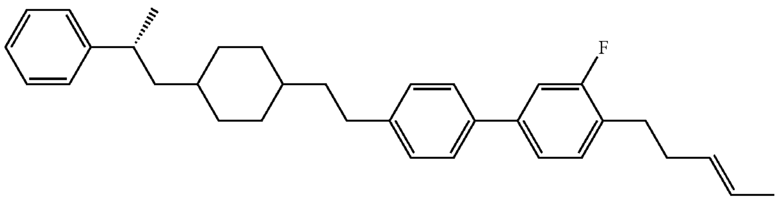
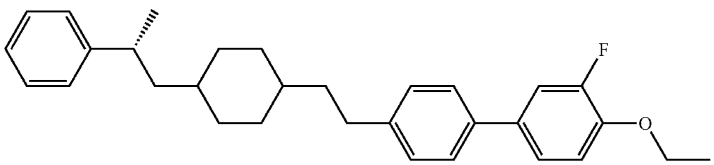
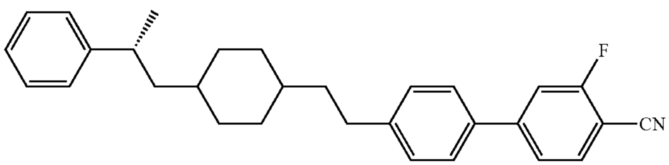
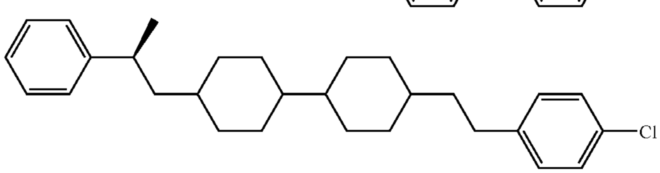
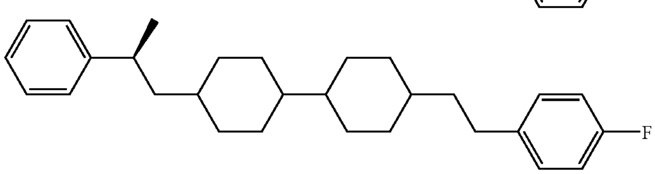
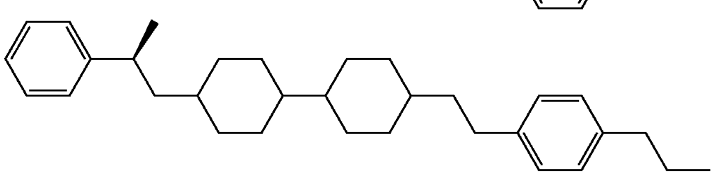
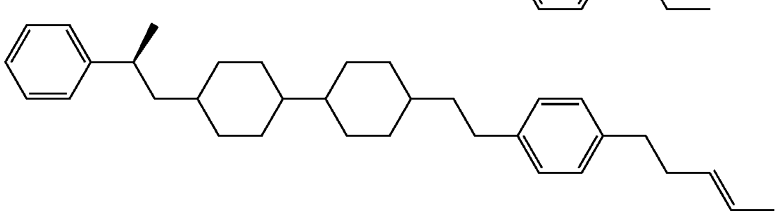
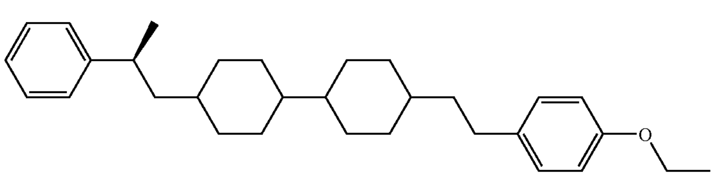

-continued
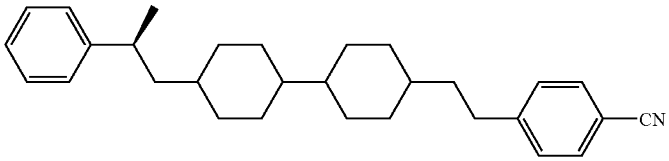
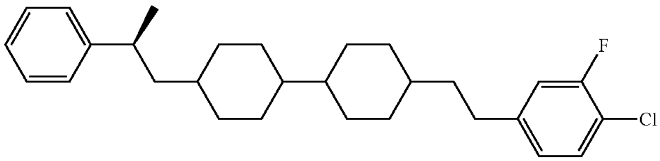
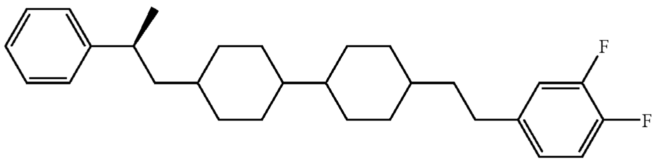
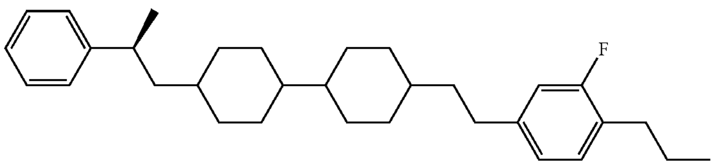
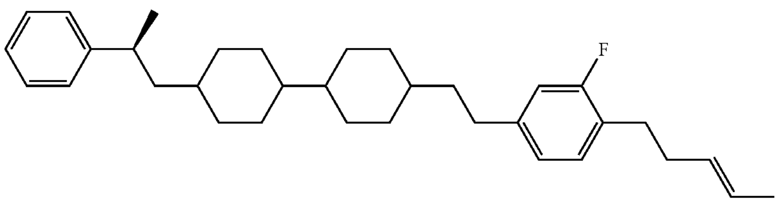
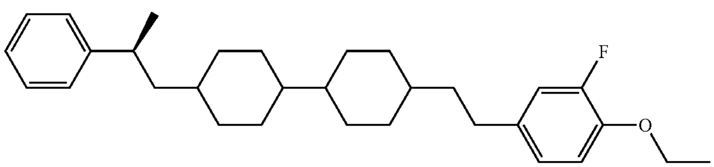
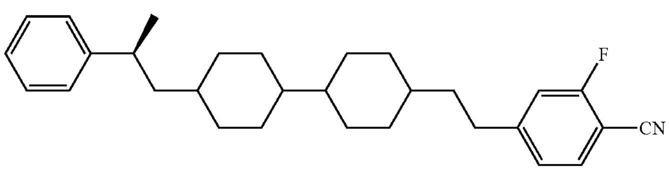
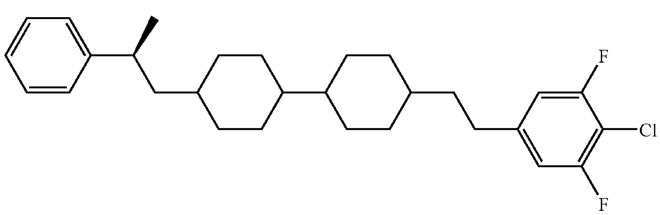
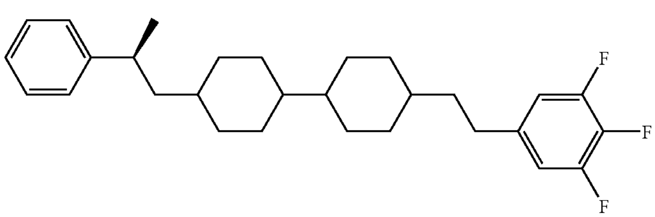

-continued
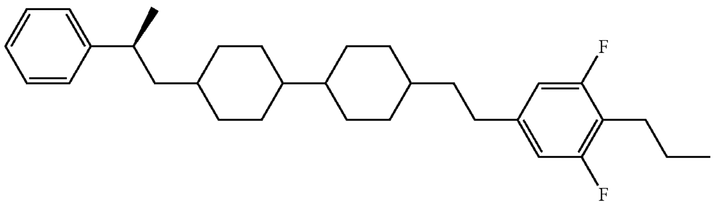
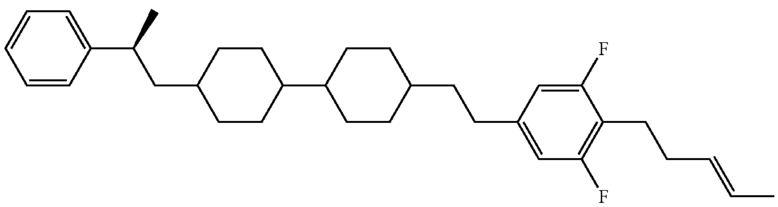
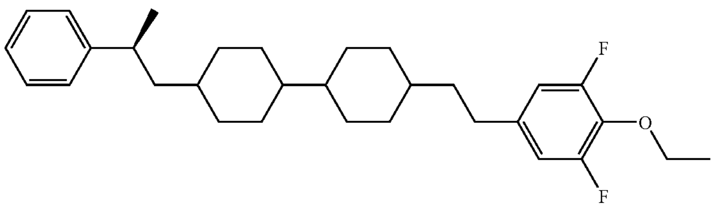
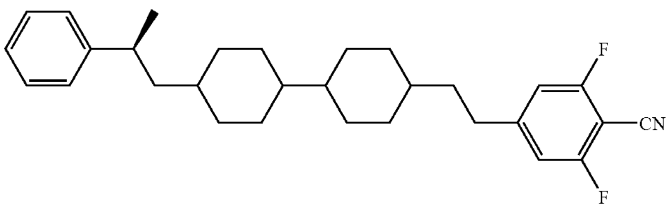
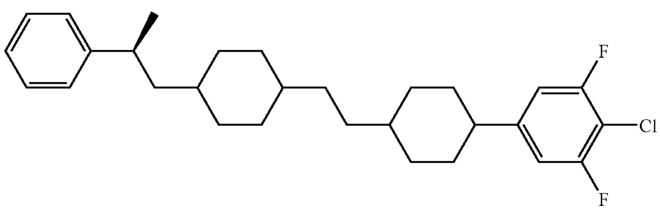
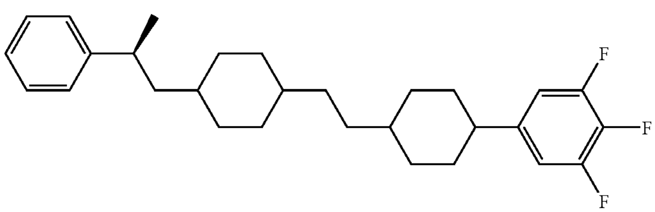
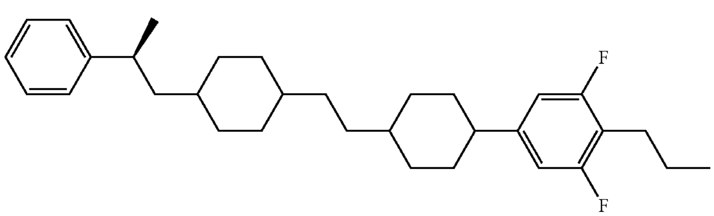
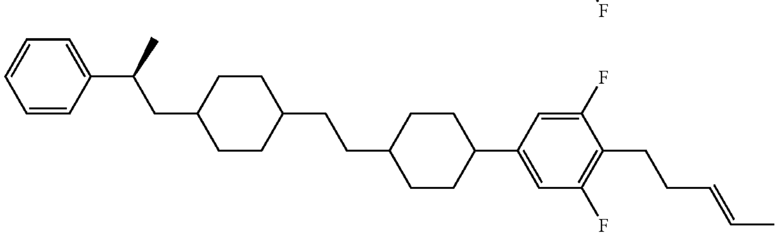

-continued
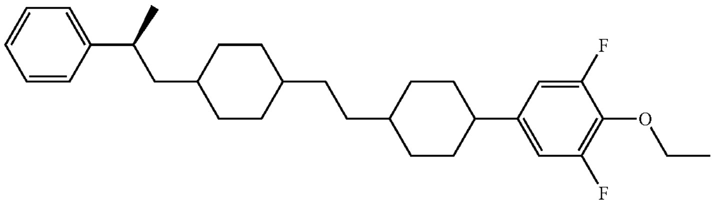
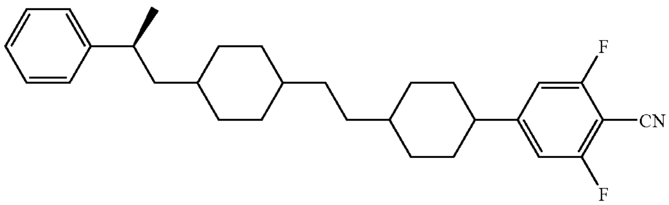
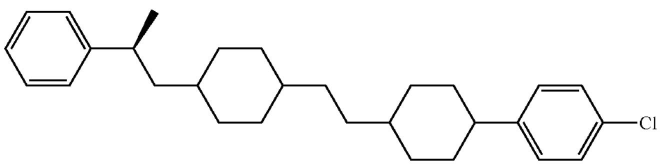
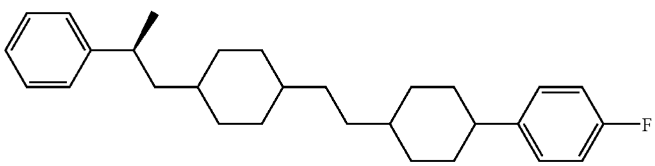
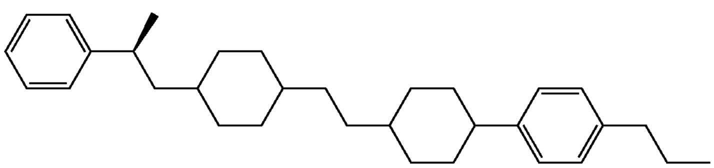
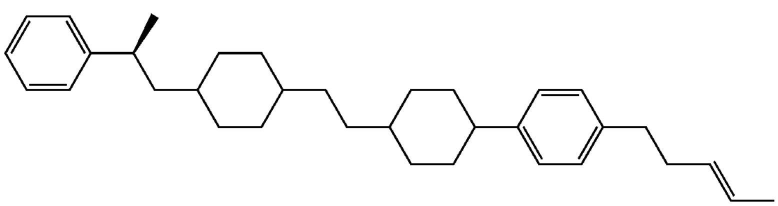
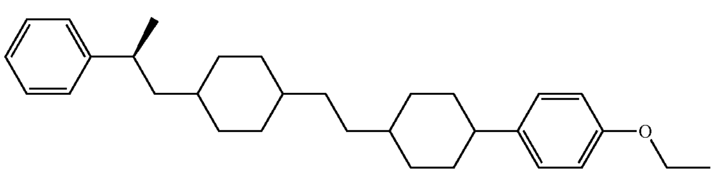
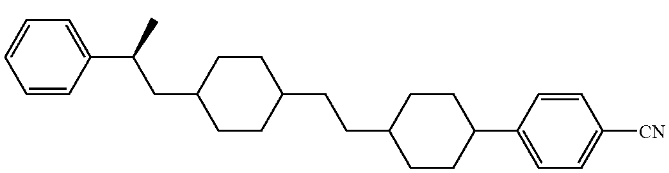
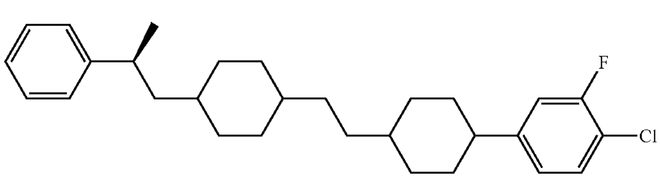

-continued
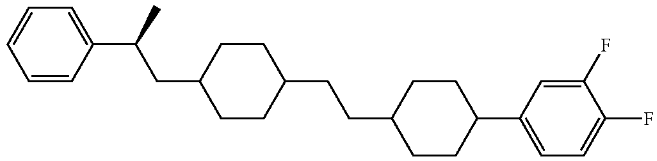
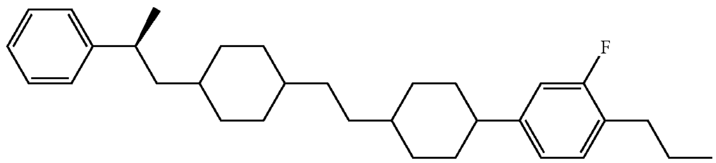
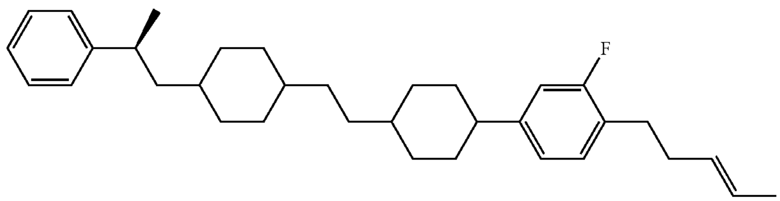
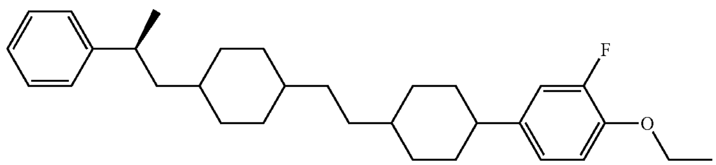
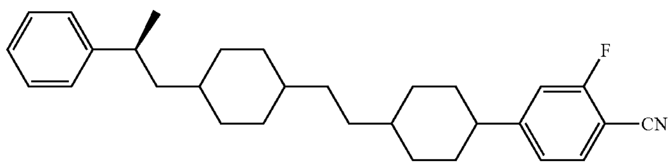
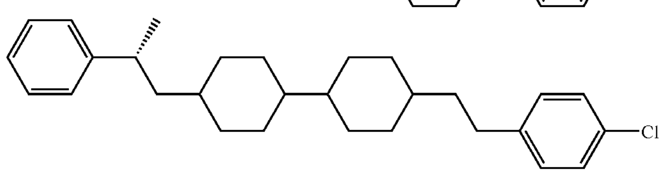
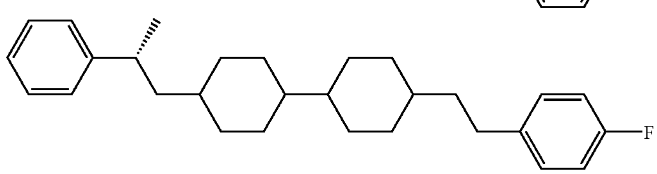
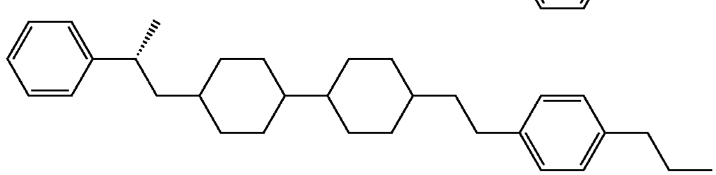
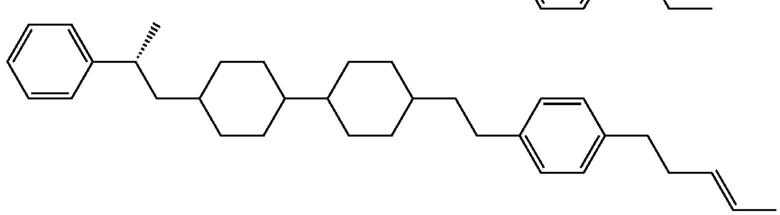
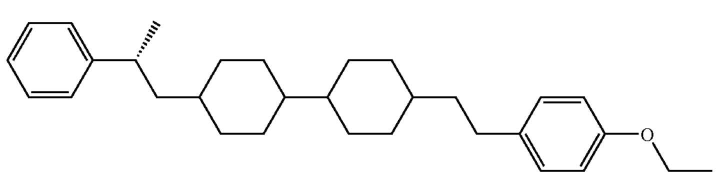

-continued
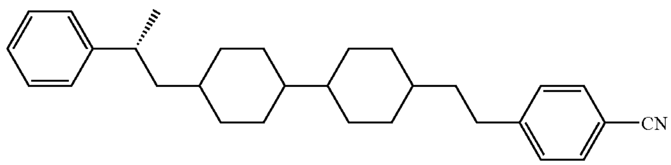
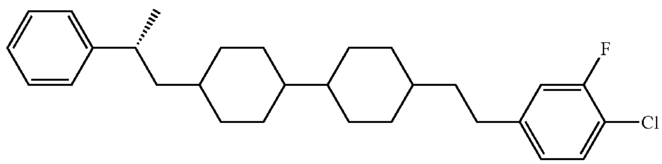
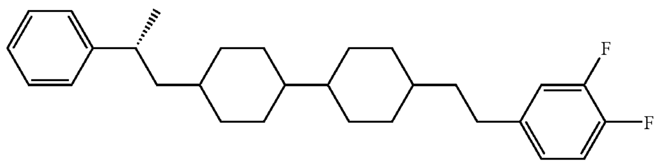
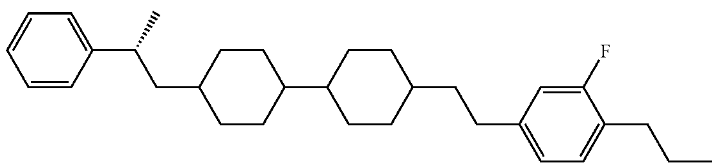
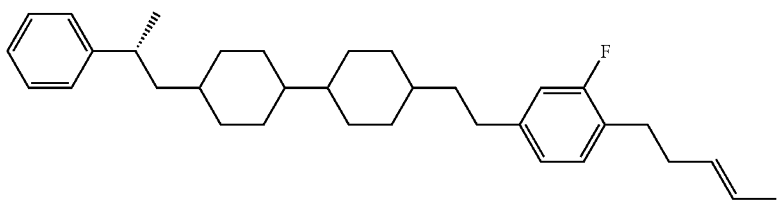
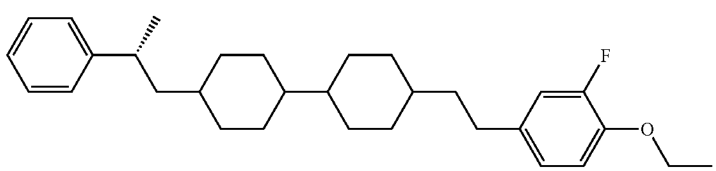
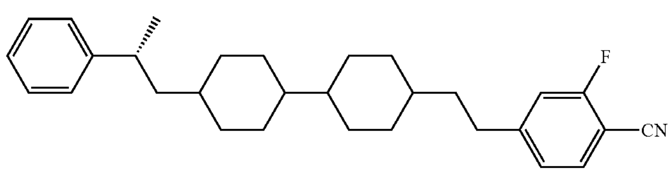
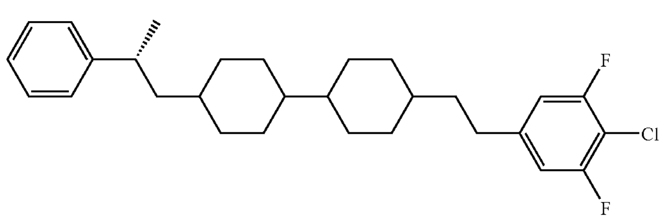
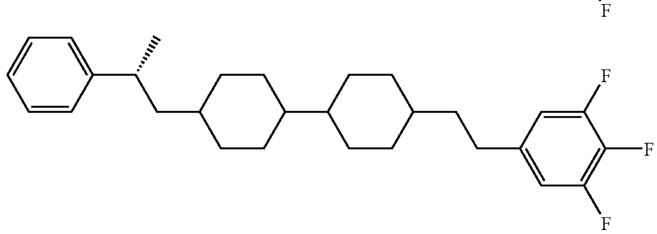

-continued
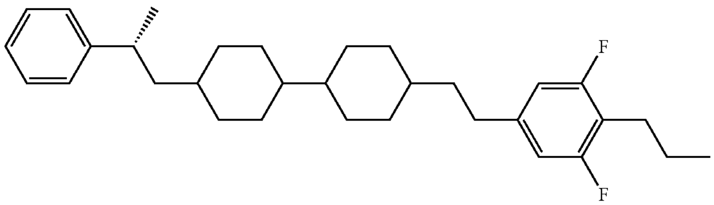
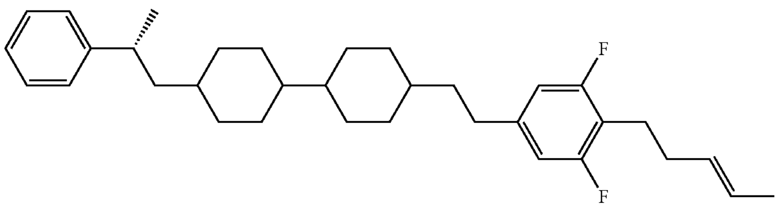
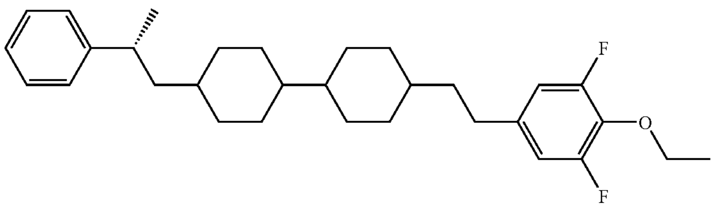
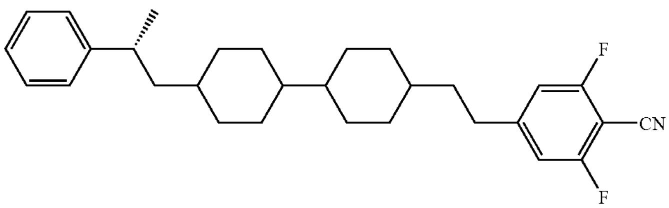
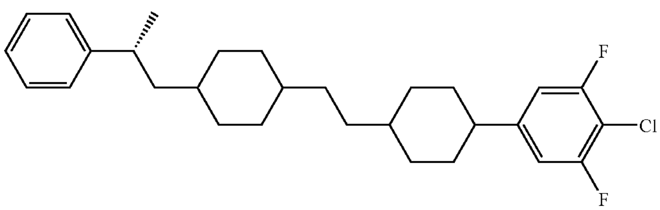
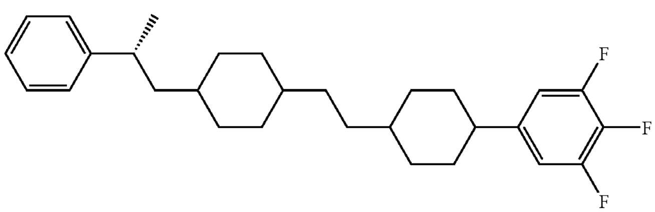
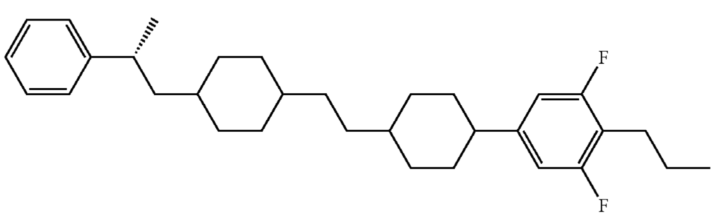
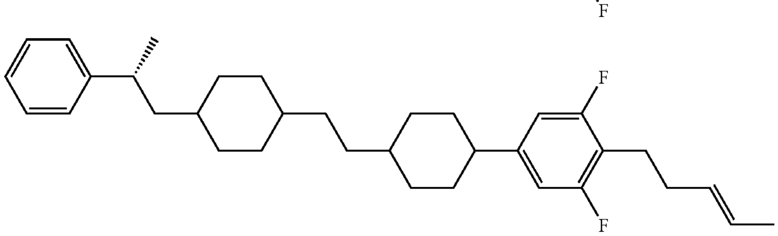

-continued
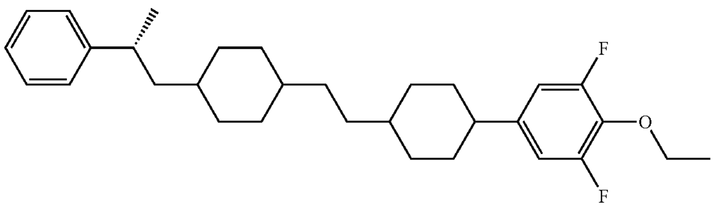
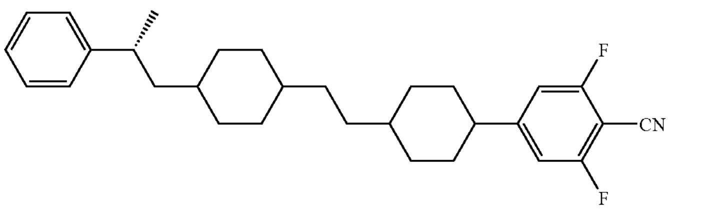
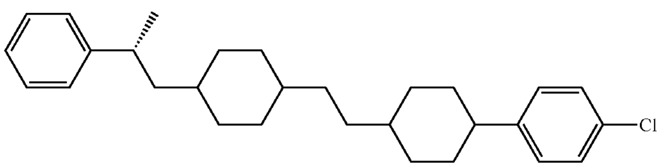
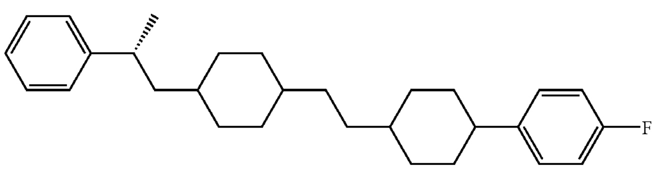
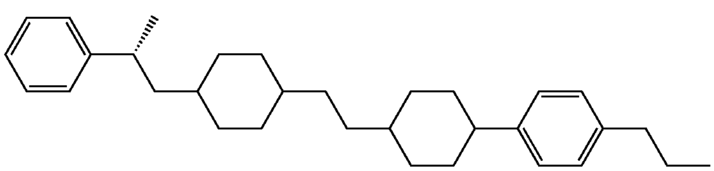
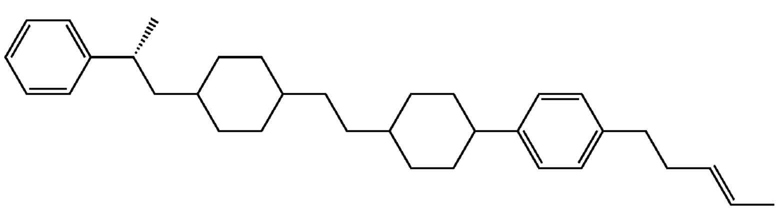
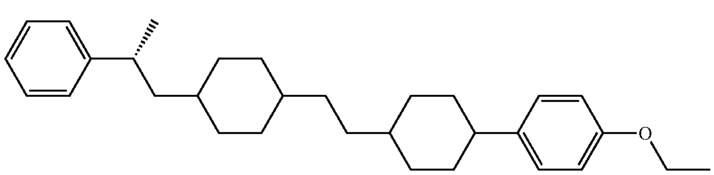
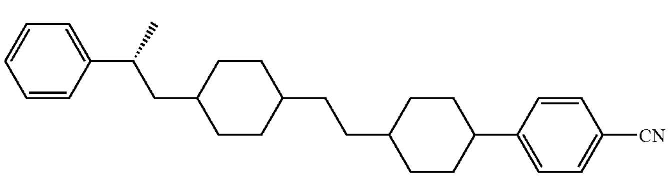
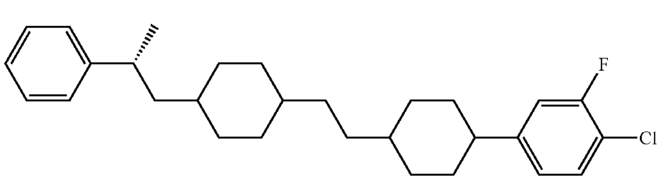

-continued

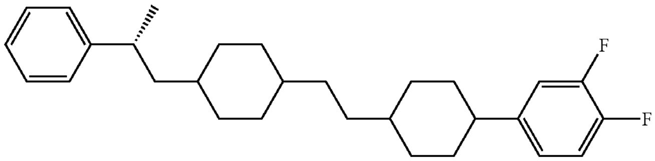

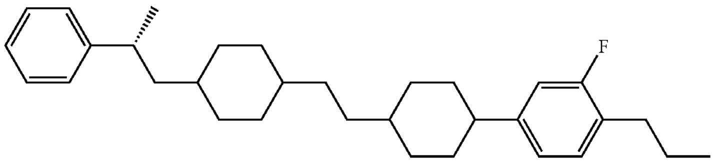

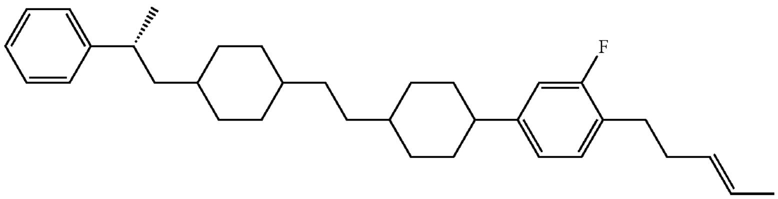

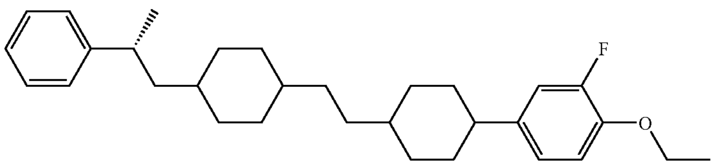

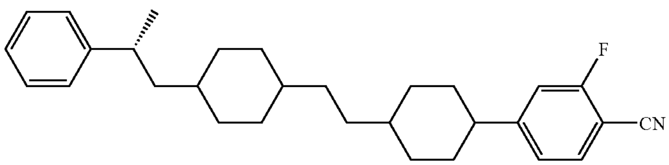

EXAMPLE 2-4

Of a liquid crystal composition obtained by adding 5 parts by mass of (S)-1-[2,6-difluoro-4-[trans-4-(trans-4-propylcyclohexyl)cyclohexyl]phenyl]-2-phenylpropane to 95 parts by mass of a liquid crystal composition ZLI-1565 manufactured by Merck Ltd., the clear point (Tc, unit: 20 C.) and the dynamic viscosity (η, 25° C., unit: cst) were measured. Further, of a liquid crystal composition obtained by adding 1 part by mass of (S)-1-[2,6-difluoro-4-[trans-4-(trans-4-propylcyclohexyl)cyclohexyl]phenyl]-2-phenylpropane to 100 parts by mass of the liquid crystal composition ZLI-1565 manufactured by Merck Ltd., the helical pitch length (P, 25° C., unit: μm) was measured. Similarly, with respect to (R)-1-[4-[4-(trans-4-propylcyclohexyl)phenyl]phenyl]-2-phenylpropane, Tc, η and P were measured. The results are shown in Table 2-1. Here, the liquid crystal composition ZLI-1565 manufactured by Merck Ltd. had Tc of 86.0° C. and η of 15.7 cst. As a Comparative Example, the results with respect to R-811 are shown in Table 2-1.

TABLE 2-1

| | Optically active compound | Tc (° C.) | η (cst) | P (μm) |
|---|---|---|---|---|
| Ex. | (R)-1-[4-[4-(trans-4-propylcyclohexyl)phenyl]phenyl]-2-phenylpropane | 155 | 22.2 | 6.9 |
| | (S)-1-[2,6-difluoro-4-[trans-4-(trans-4-propylcyclohexyl) cyclohexyl]phenyl]-2-phenylpropane | 102 | 21.0 | 9.0 |
| Comp. Ex. | R-811 | 79.5 | 22.2 | 10.4 |

EXAMPLE 3-1

Preparation of (R)-1-(4-[(4-((S)-1-methylheptyloxy))benzoyloxy]phenyl)-2-phenylpropane First Step Preparation of (S)-(+)-1-(4-methoxyphenyl)-2-phenylpropane-1-one Into a 500 ml eggplant-type flask, 30 g of (S)-(+)-2-phenylpropionic acid, 120 ml of tetrachloroethylene and 35.7 g of thionyl chloride were charged, several drops of N,N-dimethylaniline were added thereto, and a reaction was carried out at room temperature for 24 hours. Then, tetrachloroethylene and thionyl chloride were distilled off under reduced pressure to obtain an acid chloride.

To a separate 200 ml four-necked flask, 24.5 g of anisole, 26.64 g of aluminum chloride and 24 ml of 1,2-dichloroethane were charged and cooled to −20° C., and a 1,2-dichloroethane solution of the above obtained acid chloride was dropwise added thereto. After the temperature was raised to 0° C., reaction was carried out for 1 hour, and the reaction liquid was poured into ice water. After the organic phase was separated, the aqueous phase was extracted with toluene, the toluene layer and the organic phase were put together, washed with water and dried over anhydrous magnesium sulfate. The drying agent was removed, the solvent was distilled off under reduced pressure, and recrystallization from a mixed solvent of methanol/acetone was carried out to obtain 40.38 g of (S)-(+)-1-(4-methoxyphenyl)-2-phenylpropane-1-one [H-Ph-CH($CH_3$)C(O)-Ph-$OCH_3$] as a white solid (yield: 84%).

Second Step

Preparation of (R)-(−)-1-(4-methoxyphenyl)-2-phenylpropane

Employing a 2 L four-necked flask equipped with a condenser tube, 7.25 g of lithium aluminum hydride was stirred in 290 mL of diethyl ether for 5 minutes. Then, 25.48 g of aluminum chloride as a 280 mL of diethyl ether solution was dropwise added thereto while cooling with ice. After stirring for 5 minutes, 38.26 g of (S)-(+)-1-(4-methoxyphenyl)-2-phenylpropane-1-one as a 245 mL diethyl ether solution was dropwise added thereto. Then, reflux under heating was carried out for 3 hours. After cooling to 0° C., treatment with diluted hydrochloric acid was carried out, extraction with diethyl ether was carried out for liquid separation, and drying over anhydrous sodium sulfate was carried out overnight. After the solvent was distilled off, purification by column chromatography (developing solvent: hexane) was carried out to obtain 30.55 g of (R)-(−)-1-(4-methoxyphenyl)-2-phenylpropane [H-Ph-CH($CH_3$)—$CH_2$-Ph-$OCH_3$] (yield: 85%).

Third Step

Preparation of (R)-(−)-1-(4-hydroxyphenyl)-2-phenylpropane

Into a 1 L four-necked flask equipped with a condenser tube, 28.55 g of (R)-(−)-1-(4-methoxyphenyl)-2-phenylpropane, 570 mL of acetic acid and 59 mL of 48% hydrobromic acid were charged, and a reaction was carried out at 110° C. for 7 hours. After cooling, acetic acid was distilled off under reduced pressure, and 100 mL of water and 140 mL of toluene were added thereto. The organic phase was separated, the aqueous phase was extracted with toluene, the toluene layer and the organic phase were put together, the solvent was distilled off under reduced pressure, and the obtained crystals were recrystallized from methanol to obtain 26.65 g of (R)-(−)-1-(4-hydroxyphenyl)-2-phenylpropane [H-Ph-CH($CH_3$)—$CH_2$-Ph-OH] (yield: 99.5%).

Fourth Step

Preparation of (R)-1-(4-[(4-((S)-1-methylheptyloxy))benzoyloxy]phenyl)-2-phenylpropane Into a 300 mL eggplant-type flask, 15.24 g of (4-((S)-1-methylheptyloxy))benzoic acid, 10.7 g of thionyl chloride and 60 mL of tetrachloroethylene were charged, and several drops of N,N-dimethylaniline were added. After reaction at room temperature for 24 hours, the solvent was distilled off under reduced pressure. 13.0 g of (R)-(−)-1-(4-hydroxyphenyl)-2-phenylpropane obtained in fourth step, 6 mL of pyridine and 90 mL of toluene were added thereto, followed by reaction at room temperature for 48 hours. 54 mL of water was added thereto, the organic phase was separated, the aqueous phase was extracted with toluene, the toluene layer and the organic phase were put together, and the solvent was distilled off. Then, purification by silica gel column chromatography (developing solvent: hexane/toluene=1/1) and recrystallization from a mixed solvent of ethanol and acetone were carried out to obtain 11.1 g of (R)-1-(4-[(4-((S)-1-methylheptyloxy))benzoyloxy]phenyl)-2-phenylpropane [H-Ph-CH($CH_3$)—$CH_2$-Ph-OC(O)-Ph-O—CH($CH_3$)—$C_6H_{13}$] (yield: 40%). MS m/e: 444 ($M^+$)

The following compounds are obtained in the same manner as in Example 3-1.

(R)—H-Ph-CH($CH_3$)—$CH_2$-Ph-OC(O)-Ph-OCH($CH_3$)$C_4H_9$, (R)—H-Ph-CH($CH_3$)—$CH_2$-Ph-OC(O)-Ph-$CH_2$—CH($CH_3$)$C_2H_4$.

EXAMPLE 3-2

Preparation of (R)-1-[(trans-4-propylcyclohexylcarbonyloxy)phenyl]-2-phenylpropane A reaction was carried out in the same manner as in fourth step of Example 1 except that 10.3 g of trans-4-propylcyclohexylcarboxylic acid was employed instead of (4-((S)-1-methylheptyloxy))benzoic acid in fourth step of Example 3-1 to obtain (R)-1-[(trans-4-propylcyclohexylcarbonyloxy)phenyl]-2-phenylpropane [H-Ph-CH($CH_3$)—$CH_2$-Ph-OC(O)-Cy-$C_3H_7$] (yield: 78%).

MS m/e: 364 ($M^+$)

The following compounds are obtained in the same manner as in Example 3-2.

(R)—H-Ph-CH($CH_3$)—$CH_2$-Ph-OC(O)-Cy-$OC_6H_{13}$, (R)—H-Ph-CH($CH_3$)—$CH_2$-Ph-OC(O)-Cy-$C_5H_{11}$, (R)—H-Ph-CH($CH_3$)—$CH_2$-Ph-OC(O)-Cy-$CH_2OC_2H_5$, (R)—H-Ph-CH($CH_3$)—$CH_2$-Ph-OC(O)-Cy-$CH_2CH_2CH$═$CHCH_3$, (R)—H-Ph-CH($CH_3$)—$CH_2$-Ph-OC(O)-Cy-C≡$CCH_3$, (R)—H-Ph-CH($CH_3$)—$CH_2$-Ph-OC(O)-Cy-$CF_3$, (R)—H-Ph-CH($CH_3$)—$CH_2$-Ph-OC(O)-Cy-$OCF_3$, (R)—H-Ph-CH($CH_3$)—$CH_2$-Ph-OC(O)-Cy-$OCH_2CF_3$.

EXAMPLE 3-3

Preparation of (R)-1-[(trans-4-propylcyclohexyloxycarbonyl)phenyl]-2-phenylpropane First Step Preparation of (S)-1-(4-chlorophenyl)-2-phenylpropane-1-one Into a 10 L four-necked flask, 600 g (4.00 mol) of (S)-(+)-2-phenylpropionic acid, 2.4 L of tetrachloroethylene, 951 g (8.00 mol) of thionyl chloride and a small amount of dimethylaniline were added, followed by stirring at room temperature overnight, and excess of thionyl chloride and tetrachloroethylene were distilled off under reduced pressure to obtain 691 g of (S)-2-phenylpropionic chloride.

Into a 10 L four-necked flask (flask A), 102 g (4.20 mol) of pieces of magnesium, 200 mL of anhydrous tetrahydrofuran and a small amount of iodine powder were added, a small amount of a solution having 765 g (4.00 mol) of l-bromo-4-chlorobenzene dissolved in 7.8 L of anhydrous tetrahydrofuran was dropwise added thereto in an atmosphere of nitrogen, and assuming that the reaction started when the color of iodine disappeared, the rest of the solution was dropwise added thereto over a period of 3 hours while maintaining the reaction temperature to be at most 30° C., followed by stirring for 1 hour at room temperature after completion of the dropwise addition to prepare a Grignard reagent.

Into a 20 L four-necked flask (flask B), 691 g of (S)-2-phenylpropionic chloride and 4.4 L of toluene were put and cooled to −10° C. in an atmosphere of nitrogen, and 1.41 g (4.00 mmol) of iron(III) acetylacetonate was added thereto. While maintaining the reaction temperature to be at most −10° C., the Grignard reagent prepared in the flask A was dropwise added thereto over a period of 4 hours in an atmosphere of nitrogen, and the temperature was raised to room temperature after completion of the dropwise addition, followed by stirring overnight, and then the mixture was cooled to 10° C., and 4 L of diluted hydrochloric acid was added thereto. The organic phase was separated, the aqueous phase was extracted with toluene, the toluene layer and the organic phase were put together, washed with water and saturated salt solution and dried over anhydrous magnesium sulfate, and the solvent was distilled off to obtain a crude product. The crude product was purified by silica gel column chromatography (developing solvent: hexane/toluene=1/1), and recrystallization from ethanol was carried out to obtain 329 g (1.34 mol) of (S)-1-(4-chlorophenyl)-2-phenylpropane-1-one [H-Ph-CH($CH_3$)—C(O)-Ph-Cl] as white crystals (yield: 34%).

MS m/e: 244 ($M^+$)

Second Step

Into a 5 L four-necked flask, 320 g (1.31 mol) of (S)-1-(4-chlorophenyl)-2-phenylpropane-1-one obtained in first step and 1.49 kg (13.1 mol) of trifluoroacetic acid were added and cooled to 0° C., 380 g (3.27 mol) of triethylsilane was dropwise added thereto over a period of 1 hour while maintaining the reaction temperature to be at most 5° C., and after completion of the dropwise addition, the temperature was raised to room temperature, followed by stirring for 3 hours. 1 L of toluene was added thereto, trifluoroacetic acid was distilled off under reduced pressure, 1 L of toluene was added thereto, and washing with a 5% sodium hydrogen carbonate aqueous solution, water and saturated salt solution, drying over anhydrous magnesium sulfate and distillation of the solvent and by-products were carried out to obtain a crude product. The crude product was purified by silica gel column chromatography (developing solvent: hexane) to obtain 219 g (949 mmol) of (R)-1-(4-chlorophenyl)-2-phenylpropane [H-Ph-CH($CH_3$)—$CH_2$-Ph-Cl] as a colorless liquid (yield: 72%).

MS m/e: 230 ($M^+$)

Third Step

Into a 1 L four-necked flask, 11.1 g (455 mmol) of pieces of magnesium, 20 mL of anhydrous tetrahydrofuran and a small amount of iodine powder were added. A small amount of a solution having 23.6 g (217 mmol) of ethyl bromide dissolved in 124 mL of anhydrous tetrahydrofuran was dropwise added thereto in an atmosphere of nitrogen, and assuming that the reaction started when the color of iodine disappeared, the rest of the solution was dropwise added thereto over a period of 1 hour while maintaining the reaction temperature to be at most 25° C., and after completion of the dropwise addition, stirring was carried out at room temperature for 1 hour, and 50 g (217 mmol) of (R)-1-(4-chlorophenyl)-2-phenylpropane obtained in second step was added thereto, followed by stirring under reflux with heating for 6 hours. 290 mL of anhydrous tetrahydrofuran was added thereto, the mixture was cooled to −30° C., carbon dioxide gas was blown while maintaining the temperature to be at most −20° C., and after heat generation disappeared, the temperature was raised to room temperature while blowing of carbon dioxide gas was continued. The reaction solution was poured into diluted hydrochloric acid cooled with ice, unreacted magnesium was removed by filtration, the organic phase was separated, the aqueous phase was extracted with methyl-t-butyl ether, the ether layer and the organic phase were put together, washed with water and saturated salt solution and dried over anhydrous sodium sulfate, and the solvent and by-products were distilled off to obtain crystals of a crude product. The crystals were recrystallized from toluene to obtain 44.3 g (184 mmol) of (R)-4-(2-phenylpropyl)benzoic acid [H-Ph-CH($CH_3$)—$CH_2$-Ph-COOH] as white crystals (yield: 85%).

Fourth Step

Into a 200 mL eggplant-type flask, 20.0 g (83.2 mmol) of (R)-4-(2-phenylpropyl)benzoic acid obtained in third step, 80 mL of tetrachloroethylene and 19.8 g (166 mmol) of thionyl chloride were added, followed by stirring at 70° C. for 3 hours, and excess of thionyl chloride and tetrachloroethylene were distilled off under reduced pressure to obtain 22.0 g of (R)-4-(2-phenylpropyl)benzoyl chloride [H-Ph-CH($CH_3$)—$CH_2$-Ph-COCl]. Then, to a 200 mL four-necked flask, 22.0 g of (R)-4-(2-phenylpropyl)benzoyl chloride, 103 mL of toluene, 11.8 g (83.2 mmol) of trans-1-hydroxy-4-propylcyclohexane and 7.90 g (99.9 mmol) of pyridine were added, followed by stirring at room temperature overnight. Water was added to the reaction solution to separate the organic phase, the aqueous phase was extracted with toluene, and the toluene layer and the organic phase were put together and washed with diluted hydrochloric acid, a sodium hydrogen carbonate aqueous solution and saturated salt solution and dried over anhydrous magnesium sulfate, and the solvent was distilled off to obtain a crude product. The crude product was purified by silica gel column chromatography (developing solvent: hexane/toluene=3/1), and recrystallization from ethanol was carried out to obtain 22.7 g (62.4 mmol) of (R)-1-[(trans-4-propylcyclohexyloxycarbonyl)phenyl]- 2-phenylpropane [H-Ph-CH($CH_3$)—$CH_2$-Ph-C(O)O-Cy-$C_3H_7$] as white crystals (yield: 75%).

MS m/e: 364 (M+)

The following compounds are obtained in the same manner as in Example 3-3.

(R)—H-Ph-CH($CH_3$)—$CH_2$-Ph-C(O)O-Cy-$OC_6H_{13}$,
(R)—H-Ph-CH($CH_3$)—$CH_2$-Ph-C(O)O-Cy-$C_5H_{11}$,
(R)—H-Ph-CH($CH_3$)—$CH_2$-Ph-C(O)O-Cy-$CH_2OC_2H_5$,
(R)—H-Ph-CH($CH_3$)—$CH_2$-Ph-C(O)O-Cy-$CH_2CH_2CH$=$CHCH_3$,
(R)—H-Ph-CH($CH_3$)—$CH_2$-Ph-C(O)O-Cy-C≡$CCH_3$,
(R)—H-Ph-CH($CH_3$)—$CH_2$-Ph-C(O)O-Cy-$CF_3$,
(R)—H-Ph-CH($CH_3$)—$CH_2$-Ph-C(O)O-Cy-$OCF_3$,
(R)—H-Ph-CH($CH_3$)—$CH_2$-Ph-C(O)O-Cy-$OCH_2CF_3$.

EXAMPLE 3-4

5 parts by mass of the compound prepared in Example 1 was added to 95 parts by mass of a liquid crystal composition manufactured by Merck Ltd. (trade name: ZLI-1565) to obtain a liquid crystal composition SA.

Further, to 95 parts by mass of the liquid crystal composition manufactured by Merck Ltd. (trade name: ZLI-1565), 5 parts by mass of the above compound (formula CN) as a commercially available chiral agent was added to obtain a composition SB, and 5 parts by mass of the above compound (formula S-811) as a commercially available chiral agent was added to obtain a liquid crystal composition SC.

Of the obtained liquid crystal compositions SA, SB and SC., the dynamic viscosity in place of the viscosity was measured by using Ostwald viscometer, and the dynamic viscosity of each of the chiral agents was calculated from these values as a 100% extrapolated value. The results are shown in Table 3-1.

TABLE 3-1

| | Dynamic viscosity/25° C. (cSt) | Dynamic viscosity/0° C. (cSt) |
|---|---|---|
| SA | $1.75 \times 10^5$ | $1.19 \times 10^7$ |
| SB | $6.05 \times 10^4$ | $4.85 \times 10^5$ |
| SC | $7.16 \times 10^4$ | $2.09 \times 10^7$ |

EXAMPLE 3-5

1 part by mass of the compound prepared in Example 1 was added to 99 parts by mass of a liquid crystal composition manufactured by Merck Ltd. (trade name: ZLI-1565) to obtain a liquid crystal composition SD.

Further, to 99 parts by mass of the liquid crystal composition manufactured by Merck Ltd. (trade name: ZLI-1565), 1 part by mass of the above compound (formula CN) was added to the liquid crystal composition SE, and 1 part by mass of the above compound (formula S-811) was added to obtain a liquid crystal composition SF.

Of the obtained liquid crystal compositions SD, SE and SF, the helical pitch length at 25° C. was measured by Cano wedge method, and the PC value of each compound (the helical pitch length (μm·%) when 1 mass % is contained) was obtained. The results are shown in Table 3-2. The direction of the helical twist was measured by a contact method.

TABLE 3-2

| | PC value (μm · %) | Direction of helical twist |
|---|---|---|
| SD | 7.7 | right |
| SE | 21.6 | left |
| SF | 10.4 | left |

EXAMPLE 4-1

Preparation of (4-cyano-3,5-difluoro)phenyl (R)-4-(2-phenylpropyl)benzoate [H-Ph-CH($CH_3$)—$CH_2$-Ph-COO-$Ph^{FF}$-CN]

First Step

Into a 10 L four-necked flask, 600 g (4.00 mol) of (S)-2-phenylpropionic acid, 2.4 L of tetrachloroethylene, 951 g (8.00 mol) of thionyl chloride and a small amount of dimethyl aniline were added, followed by stirring at room temperature overnight, and excess of thionyl chloride and tetrachloroethylene were distilled off under reduced pressure to obtain 691 g of (S)-2-phenylpropionic chloride.

Into a 10 L four-necked flask (flask A), 102 g (4.20 mol) of pieces of magnesium, 200 mL of anhydrous tetrahydrofuran and a small amount of iodine powder were added, and a small amount of a solution having 765 g (4.00 mol) of 1-bromo-4-chlorobenzene dissolved in 7.8 L of anhydrous tetrahydrofuran was dropwise added thereto in an atmosphere of nitrogen, and assuming that the reaction started when the color of iodine disappeared, the rest of the solution was dropwise added thereto over a period of 3 hours while maintaining the reaction temperature to be at most 30° C., followed by stirring at room temperature for 1 hour after completion of the dropwise addition to prepare the Grignard reagent.

Into a 20 L four-necked flask (flask B), 691 g of (S)-2-phenylpropionic chloride and 4.4 L of toluene were put and cooled to −10° C. in an atmosphere of nitrogen, and 1.41 g (4.00 mmol) of iron(III) acetylacetonate was added thereto. While maintaining the reaction temperature to be at most −10° C., the Grignard reagent prepared in the flask A was dropwise added thereto over a period of 4 hours in an atmosphere of nitrogen, and the temperature was raised to room temperature after completion of dropwise addition, followed by stirring overnight, then the mixture was cooled to 10° C., and 4 L of diluted hydrochloric acid was added thereto.

Then, the organic layer was separated, the aqueous layer was extracted with toluene, the toluene layer and the organic layer were put together, washed with water and saturated salt solution and dried over anhydrous magnesium sulfate, and the solvent was distilled off to obtain a crude product. The crude product was purified by silica gel column chromatography (developing solvent: hexane, toluene) and recrystallized from ethanol to obtain 329 g (1.34 mol) of (S)-1-(4-chlorophenyl)-2-phenylpropane-1-one [H-Ph-CH($CH_3$)—CO-Ph-Cl] as white crystals (yield: 34%).

MS m/e: 244 ($M^+$)

Second Step

Into a 5 L four-necked flask, 320 g (1.31 mol) of (S)-1-(4-chlorophenyl)-2-phenylpropane-1-one [H-Ph-CH($CH_3$)—CO-Ph-Cl] obtained in first step and 1.49 kg (13.1 mol) of trifluoroacetic acid were added and cooled to 0° C., 380 g (3.27 mol) of triethylsilane was dropwise added thereto over a period of 1 hour while maintaining the reaction temperature to be at most 5° C., and the temperature was raised to room temperature after completion of the dropwise addition, followed by stirring for 3 hours.

Then, 1 L of toluene was added, trifluoroacetic acid was distilled off under reduced pressure, 1 L of toluene was added thereto, washing with a 5% sodium hydrogen carbonate aqueous solution, water and saturated salt solution and drying over anhydrous magnesium sulfate were carried out, and the solvent and by-products were distilled off to obtain a crude product. This was purified by silica gel column chromatography (developing solvent: hexane) to obtain 219 g (949 mmol) of (R)-1-(4-chlorophenyl)-2-phenylpropane [H-Ph-CH($CH_3$)—$CH_2$-Ph-Cl] as a colorless liquid (yield: 72%).

MS m/e: 230 ($M^+$)

Third Step

Into a 1 L four-necked flask, 11.1 g (455 mmol) of pieces of magnesium, 20 mL of anhydrous tetrahydrofuran and a small amount of iodine powder were added. A small amount of a solution having 23.6 g (217 mmol) of ethyl bromide dissolved in 124 mL of anhydrous tetrahydrofuran was dropwise added thereto in an atmosphere of nitrogen, and when the color of iodine disappeared, the rest of the solution was dropwise added thereto over a period of 1 hour while maintaining the reaction temperature to be at most 25° C., stirring was carried out at room temperature for 1 hour after completion of the dropwise addition, and 50 g (217 mmol) of (R)-1-(4-chlorophenyl)-2-phenylpropane [H-Ph-CH(CH$_3$)—CH$_2$-Ph-Cl] obtained in second step was added thereto, followed by stirring under reflux with heating for 6 hours.

Then, 290 mL of anhydrous tetrahydrofuran was added thereto, the mixture was cooled to −30° C., carbon dioxide gas was blown while maintaining the temperature to be at most −20° C., and after heat generation disappeared, the temperature was raised to room temperature while blowing of carbon dioxide gas was continued. The reaction solution was poured into diluted hydrochloric acid cooled with ice, unreacted magnesium was removed by filtration, the organic phase was separated, the aqueous phase was extracted with methyl-t-butyl ether, the ether layer and the organic phase were put together, washed with water and saturated salt solution and dried over anhydrous sodium sulfate, and the solvent and by-products were distilled off to obtain crystals of a crude product. The crystals were recrystallized from toluene to obtain 44.3 g (184 mmol) of (R)-4-(2-phenylpropyl)benzoic acid [H-Ph-CH(CH$_3$)—CH$_2$-Ph-COOH] as white crystals (yield: 85%).

Fourth Step

Into a 200 mL eggplant-type flask, 20.0 g (83.2 mmol) of (R)-4-(2-phenylpropyl)benzoic acid [H-Ph-CH(CH$_3$)—CH$_2$-Ph-COOH] obtained in third step, 80 mL of tetrachloroethylene and 19.8 g (166 mmol) of thionyl chloride were put, followed by stirring at 70° C. for 3 hours, and then excess of thionyl chloride and tetrachloroethylene were distilled off under reduced pressure to obtain 22.0 g of (R)-4-(2-phenylpropyl)benzoyl chloride [H-Ph-CH(CH$_3$)—CH$_2$-Ph-COCl].

Into a 200 mL four-necked flask, 22.0 g of (R)-4-(2-phenylpropyl)benzoyl chloride [H-Ph-CH(CH$_3$)—CH$_2$-Ph-COCl], 103 mL of toluene, 12.9 g (83.2 mmol) of 3,5-difluoro-4-cyanophenol and 7.90 g (99.9 mmol) of pyridine were put, followed by stirring at room temperature overnight. Water was added to the reaction solution to separate the organic layer, the aqueous layer was extracted with toluene, the toluene layer and the organic layer were put together, washed with diluted hydrochloric acid, a sodium hydrogen carbonate aqueous solution and saturated salt solution and dried over anhydrous magnesium sulfate, and the solvent was distilled off to obtain a crude product.

The above crude product was purified by silica gel column chromatography (developing solvent: hexane/toluene=3/1) and recrystallized from ethanol to obtain 23.6 g (62.4 mmol) of (4-cyano-3,5-difluoro)phenyl (R)-4-(2-phenylpropyl)benzoate [H-Ph-CH(CH$_3$)—CH$_2$-Ph-COO-Ph$^{FF}$-CN] as white crystals (yield: 75%).

Melting point: 65.3 to 66.1° C. MS m/e: 377 (M$^+$) $^1$H-NMR (CDCl$_3$) δ (ppm: from TMS): 1.29 (d, 3 H), 2.88–3.11 (m, 3H), 7.03 (d, 2H), 7.13–7.30 (m, 7H), 7.99 (d, 2H) $^{19}$F-NMR (CDCl$_3$) δ (ppm: from CFCl$_3$): −102.7 (d, $J_{F-H}$=6.1 Hz)

EXAMPLE 4-2

Preparation of (4-cyano-3-fluoro)phenyl (R)-4-(2-phenylpropyl)benzoate [H-Ph-CH(CH$_3$)—CH$_2$-Ph-COO-Ph$^F$CN]

A reaction was carried out in the same manner as in fourth step of Example 1 except that 11.4 g (83.2 mmol) of 3-fluoro-4-cyanophenol was employed instead of 3,5-difluoro-4-cyanophenol in fourth step of Example 4-1 to obtain 21.5 g (59.9 mmol) of (4-cyano-3-fluoro)phenyl (R)-4-(2-phenylpropyl)benzoate [H-Ph-CH(CH$_3$)—CH$_2$-Ph-COO-Ph$^F$-CN] as white crystals (yield: 72%).

H-Ph-CH(CH$_3$)—CH$_2$-Ph-COO-Ph$^F$-CN

Melting point: 77.9 to 79.1° C. MS m/e: 359 (M$^+$) $^1$H-NMR (CDCl$_3$) δ (ppm: from TMS): 1.30 (d, 3H), 2.89–3.09 (m, 3H), 7.14–7.30 (m, 9H), 7.67 (t, 1H), 8.01 (d, 2H) $^{19}$F-NMR (CDCl$_3$) δ (ppm: from CFCl$_3$): −103.9 (t, $J_{F-H}$=9.2 Hz)

EXAMPLE 4-3

Preparation of (R)-2,6-difluoro-4-(4-(2-phenylpropyl)phenyl)benzonitrile [H-Ph-CH(CH$_3$)—CH$_2$-Ph-Ph$^{FF}$CN]

First Step

Into a 1 L four-necked flask (flask A), 12.6 g (520 mmol) of pieces of magnesium, 30 mL of anhydrous tetrahydrofuran and a small amount of iodine powder were put. A small amount of a solution having 4.72 g (43.3 mmol) of ethyl bromide dissolved in 20 mL of anhydrous tetrahydrofuran was dropwise added thereto in an atmosphere of nitrogen.

When the color of iodine disappeared, the rest of the solution was dropwise added thereto while maintaining the reaction temperature to be at most 25° C., and after completion of the dropwise addition, a solution having 100 g (433 mmol) of (R)-1-(4-chlorophenyl)-2-phenylpropane [H-Ph-CH(CH$_3$)—CH$_2$-Ph-Cl] obtained in second step of Example 1 dissolved in 110 mL of anhydrous tetrahydrofuran was added thereto, followed by stirring under reflux with heating for 6 hours, the mixture was cooled to room temperature, and 320 mL of anhydrous tetrahydrofuran was added thereto to prepare a Grignard reagent.

Into a 1 L four-necked flask (flask B), 54.0 g (520 mmol) of trimethylborate and 108 mL of anhydrous tetrahydrofuran were put and cooled to −30° C., the Grignard reagent prepared in the flask A was dropwise added over a period of 30 minutes in an atmosphere of nitrogen while maintaining the temperature to be at most −30° C., and the temperature was raised to room temperature after completion of the dropwise addition, followed by stirring at room temperature overnight. Diluted hydrochloric acid was added to the reaction solution, followed by stirring at room temperature for 1 hour, and then the organic phase was separated, the aqueous phase was extracted with methyl-t-butyl ether, the ether layer and the organic phase were put together, washed with water and saturated salt solution and dried over anhydrous sodium sulfate, and the solvent was distilled off to obtain 92.6 g (386 mmol) of (R)-4-(2-phenylpropyl)phenylboric acid [H-Ph-CH(CH$_3$)—CH$_2$-Ph-B(OH)$_2$] (yield: 89%).

Second Step

Into a 1 L four-necked flask, 50.0 g (208 mmol) of (R)-4-(2-phenylpropyl)phenylboric acid [H-Ph-CH(CH$_3$)—CH$_2$-Ph-B(OH)$_2$] obtained in first step, 40.2 g (208 mmol) of 1-bromo-3,5-difluorobenzene, 12.0 g (10.4 mmol) of tetrakistriphenylphosphinepalladium [Pd(PPh$_3$)$_4$], 300 mL of a 2 mol/L sodium carbonate aqueous solution and 300 mL of 1,2-dimethoxyethane were put, followed by stirring under reflux with heating for 4 hours.

Then, the mixture was cooled to room temperature, toluene was added to the reaction solution to separate the organic layer, the aqueous layer was extracted with toluene, the toluene layer and the organic layer were put together, washed with water and saturated salt solution and dried over anhydrous magnesium sulfate, and the solvent was distilled off to obtain a crude product. The crude product was purified by silica gel column chromatography (developing solvent: hexane) and recrystallized from ethanol to obtain 35.3 g (115 mmol) of (R)-3,5-difluoro-1-(4-(2-phenylpropyl)phenyl) benzene [H-Ph-CH($CH_3$)—$CH_2$-Ph-$Ph^{FF}$-H] as white crystals (yield: 55%).

Melting point: 49.8 to 51.3° C. MS m/e: 308 ($M^+$) $^1$H-NMR ($CDCl_3$) δ (ppm: from TMS): 1.27 (d, 3H), 2.78–2.85 (m, 1H), 2.94–3.07 (m, 2H), 6.74 (t, 1H), 7.05–7.31 (m, 9H), 7.40 (d, 2H) $^{19}$F-NMR ($CDCl_3$) δ (ppm: from $CFCl_3$): −110.4 (t, $J_{F-H}$=7.6 Hz)

Third Step

Into a 500 mL four-necked flask, 35.0 g (114 mmol) of (R)-3,5-difluoro-1-(4-(2-phenylpropyl)phenyl)benzene [H-Ph-CH($CH_3$)—$CH_2$-Ph-$Ph^{FF}$-H] obtained in second step and 175 mL of anhydrous tetrahydrofuran were put and cooled to −70° C. in an atmosphere of nitrogen, and 90 mL (136 mmol) of a 1.52 mol/Ln-butyllithium hexane solution was dropwise added thereto over a period of 30 minutes while maintaining the reaction temperature to be at most −60° C., stirring was carried out at −70° C. for 2 hours after completion of the dropwise addition, carbon dioxide gas was blown while maintaining the temperature to be at most −60° C., and after heat generation disappeared, the temperature was raised to room temperature while blowing of carbon dioxide gas was continued.

Then, diluted hydrochloric acid was added to the reaction solution, the organic phase was separated, the aqueous phase was extracted with methyl-t-butyl ether, the ether layer and the organic phase were put together, washed with water and saturated salt solution, and dried over anhydrous sodium sulfate, and the solvent was distilled off to obtain crystals of a crude product. The crystals were recrystallized from toluene to obtain 31.2 g (88.5 mmol) of (R)-2,6-difluoro-4-(4-(2-phenylpropyl)phenyl)benzoic acid [H-Ph-CH($CH_3$)—$CH_2$-Ph-$Ph^{FF}$-COOH] as white crystals (yield: 78%).

Fourth Step

Into a 300 mL eggplant-type flask, 30.0 g (85.1 mmol) of (R)-2,6-difluoro-4-(4-(2-phenylpropyl)phenyl)benzoic acid [H-Ph-CH($CH_3$)—$CH_2$-Ph-$Ph^{FF}$-COOH] obtained in third step, 120 mmol of tetrachloroethylene and 20.3 g (170 mmol) of thionyl chloride were put, followed by stirring at 90° C. for 4 hours, and excess of thionyl chloride and tetrachloroethylene were distilled off under reduced pressure to obtain 32.5 g of (R)-2,6-difluoro-4-(4-(2-phenylpropyl) phenyl)benzoyl chloride [H-Ph-CH($CH_3$)—$CH_2$-Ph-$Ph^{FF}$-COCl].

Into a 500 mL four-necked flask, 73 mL of toluene and 26 mL of a 25% ammonium water were put and cooled to 10° C., a solution having 32.5 g of (R)-2,6-difluoro-4-(4-(2-phenylpropyl)phenyl)benzoyl chloride [H-Ph-CH($CH_3$)—$CH_2$-Ph-$Ph^{FF}$-COCl] dissolved in 133 mL of toluene was dropwise added thereto over a period of 30 minutes while maintaining the temperature to be at most 15° C., and stirring was carried out at room temperature for 1 hour after completion of the dropwise addition. The precipitated crystals of (R)-2,6-difluoro-4-(4-(2-phenylpropyl)phenyl)benzamide [H-Ph-CH($CH_3$)—$CH_2$-Ph-$Ph^{FF}$-$CONH_2$] were collected by filtration from the reaction solution, and the crystals were washed with water.

Into a 500 mL four-necked flask, crystals of (R)-2,6-difluoro-4-(4-(2-phenylpropyl)phenyl)benzamide [H-Ph-CH($CH_3$)—$CH_2$-Ph-$Ph^{FF}$-$CONH_2$] and 142 mL of toluene were put, azeotropic dehydration was carried out by using Dean-Stark under reflux with heating, and 24.3 g (128 mmol) of p-toluenesulfonic chloride and 20.2 g (255 mmol) of pyridine were added thereto, followed by stirring under reflux with heating for 20 hours.

Then, water was added to the reaction solution to separate the organic layer, the aqueous layer was extracted with toluene, the toluene layer and the organic layer were put together and washed with diluted hydrochloric acid, a 5% sodium hydroxide aqueous solution was added thereto, followed by stirring at room temperature overnight, and then the aqueous layer was separated, washed with saturated salt solution and dried over anhydrous magnesium sulfate, and the solvent was distilled off to obtain a crude product. The crude product was purified by silica gel column chromatography (developing solvent: hexane) and recrystallized from ethanol to obtain 18.7 g (56.2 mmol) of (R)-2,6-difluoro-4-(4-(2-phenylpropyl)phenyl)benzonitrile [H-Ph-CH($CH_3$)—$CH_2$-Ph-$Ph^{FF}$-CN] as white crystals (yield: 66%). H-Ph-CH($CH_3$)—$CH_2$-Ph-$Ph^{FF}$-CN)

Melting point: 60.7 to 62.2° C. MS m/e: 333 ($M^+$) $^1$H-NMR ($CDCl_3$) δ (ppm: from TMS): 1.28 (d, 3H), 2.82–2.91 (m, 1H), 2.95–3.07 (m, 2H), 7.16–7.31 (m, 9H), 7.42 (d, 2H) $^{19}$F-NMR ($CDCl_3$) δ (ppm: from $CFCl_3$): −104.3 (d, $J_{F-H}$=9.2 Hz)

EXAMPLE 4-4

Preparation of (R)-2-fluoro-4-(4-(2-phenylpropyl) phenyl)benzotrifluoride [H-Ph-CH($CH_3$)—$CH_2$-Ph-$Ph^F$-$CF_3$]

A reaction was carried out in the same manner as in second step of Example 3 except that 40.4 g (167 mmol) of 4-bromo-2-fluorobenzotrifluoride was used instead of 1-bromo-3,5-difluorobenzene in second step of Example 4-3 to obtain 34.6 g (96.6 mmol) of (R)-2-fluoro-4-(4-(2-phenylpropyl)phenyl)benzotrifluoride [H-Ph-CH($CH_3$)—$CH_2$-Ph-$Ph^F$-$CF_3$] (yield: 58%).

MS m/e: 358 ($M^+$)

EXAMPLE 4-5

Preparation of (R)-2,6-difluoro-4-(2,6-difluoro-4-(2-phenylpropyl)phenyl)benzonitrile [H-Ph-CH ($CH_3$)—$CH_2$-$Ph^{FF}$-$Ph^{FF}$-CN]

First Step

A reaction was carried out in the same manner as in first step of Example 4-1 except that 64.3 g (333 mmol) of 1-bromo-3,5-difluorobenzene was employed instead of 1-bromo-4-chlorobenzene in first step of Example 4-1 to obtain 31.2 g (127 mmol) of (S)-1-(3,5-difluorophenyl)-2-phenylpropane-1-one [H-Ph-CH($CH_3$)—CO-$Ph^{FF}$-H] (yield: 38%).

MS m/e: 246 ($M^+$)

Second Step

A reaction was carried out in the same manner as in first step of Example 4-1 except that 31.0 g (126 mmol) of (S)-1-(3,5-difluorophenyl)-2-phenylpropane-1-one [H-Ph-CH($CH_3$)—CO-$Ph^{FF}$-H] prepared in first step was employed instead of (S)-1-(4-chlorophenyl)-2-phenylpropane-1-one [H-Ph-CH($CH_3$)—CO-Ph-Cl] in second step of Example 4-1 to obtain 25.4 g (110 mmol) of (R)-1-(3,5-difluorophenyl)-2-phenylpropane [H-Ph-CH($CH_3$)—$CH_2$-$Ph^{FF}$-H] (yield: 87%)

MS m/e: 232 ($M^+$)

Third Step

Into a 300 mL four-necked flask, 15.0 g (64.6 mmol) of (R)-1-(3,5-difluorophenyl)-2-phenylpropane [H-Ph-CH($CH_3$)—$CH_2$-$Ph^{FF}$-H] obtained in second step and 75 mL of anhydrous tetrahydrofuran were put and cooled to −70° C. in an atmosphere of nitrogen, and 51 mL (77.5 mmol) of a 1.52 mol/Ln-butyllithium hexane solution was dropwise added thereto over a period of 30 minutes while maintaining the reaction temperature to be at most −60° C., stirring was carried out at −70° C. for 2 hours after completion of the dropwise addition, a solution having 8.72 g (140 mmol) of trimethylborate dissolved in 17.4 mL of anhydrous tetrahydrofuran was dropwise added thereto over a period of 30 minutes while maintaining the temperature to be at most −60° C., and the temperature was raised to room temperature after completion of the dropwise addition, followed by stirring at room temperature overnight.

Diluted hydrochloric acid was added to the reaction solution, followed by stirring at room temperature for 1 hour, and then an organic phase was separated, the aqueous phase was extracted with methyl-t-butyl ether, the ether layer and the organic phase were put together, washed with water and saturated salt solution, and dried over anhydrous sodium sulfate, and the solvent was distilled off to obtain 14.6 g (53.0 mmol) of (R)-2,6-difluoro-4-(2-phenylpropyl) phenylboric acid [H-Ph-CH($CH_3$)—$CH_2$-$Ph^{FF}$-$B(OH)_2$] (yield: 82%).

Fourth Step

A reaction was carried out in the same manner as in second step of Example 3 except that 10.0 g (36.2 mmol) of (R)-2,6-difluoro-4-(2-phenylpropyl)phenylboric acid [H-Ph-CH($CH_3$)—$CH_2$-$Ph^{FF}$-$B(OH)_2$] obtained in third step was employed instead of (R)-4-(2-phenylpropyl)phenylboric acid [H-Ph-CH($CH_3$)—$CH_2$-Ph-$B(OH)_2$] in second step of Example 4-3 to obtain 6.11 g (17.7 mmol) of (R)-3,5-difluoro-1-(2,6-difluoro-4-(2-phenylpropyl)phenyl) benzene [H-Ph-CH($CH_3$)—$CH_2$-$Ph^{FF}$-$Ph^{FF}$-H] (yield: 49%).

MS m/e: 344 ($M^+$)

Fifth Step

A reaction was carried out in the same manner as in third step of Example 4-3 except that 6.00 g (17.4 mmol) of (R)-3,5-difluoro-1-(2,6-difluoro-4-(2-phenylpropyl)phenyl) benzene [H-Ph-CH($CH_3$)—$CH_2$-$Ph^{FF}$-$Ph^{FF}$-H] obtained in fourth step was employed instead of (R)-3,5-difluoro-1-(4-(2-phenylpropyl)phenyl)benzene [H-Ph-CH($CH_3$)—$CH_2$-Ph-$Ph^{FF}$-H] in third step of Example 4-3 to obtain 5.48 g (14.1 mmol) of (R)-2,6-difluoro-4-(2,6-difluoro-4-(2-phenylpropyl)phenyl)benzoic acid [H-Ph-CH($CH_3$)—$CH_2$-$Ph^{FF}$-$Ph^{FF}$-COOH] (yield: 81%).

Sixth Step

A reaction was carried out in the same manner as in fourth step of Example 4-3 except that 5.48 g (14.1 mmol) of (R)-2,6-difluoro-4-(2,6-difluoro-4-(2-phenylpropyl)phenyl) benzoic acid [H-Ph-CH($CH_3$)—$CH_2$-$Ph^{FF}$-$Ph^{FF}$-COOH] obtained in fifth step was employed instead of (R)-2,6-difluoro-4-(4-(2-phenylpropyl)phenyl)benzoic acid [H-Ph-CH($CH_3$)—$CH_2$-Ph-$Ph^{FF}$-COOH] in fourth step of Example 4-3 to obtain 3.08 g (8.33 mmol) of (R)-2,6-difluoro-4-(2,6-difluoro-4-(2-phenylpropyl)phenyl)benzonitrile [H-Ph-CH($CH_3$)—$CH_2$-$Ph^{FF}$-$Ph^{FF}$-CN] (yield: 59%).

MS m/e: 369 ($M^+$)

EXAMPLE 4-6

Preparation of (R)-trans-1-(2,6-difluoro-4-(2-phenylpropyl)phenyl)-2-(3-fluoro-4-trifluoromethylphenyl)-1,2-difluoroethylene [H-Ph-CH($CH_3$)—$CH_2$-$Ph^{FF}$-CF═CF-$Ph^F$-$CF_3$]

Into a 200 mL four-necked flask, 10.0 g (43.1 mmol) of (R)-1-(3,5-difluorophenyl)-2-phenylpropane [H-Ph-CH($CH_3$)—$CH_2$-$Ph^{FF}$-H] obtained in second step of Example 5 and 50 mL of anhydrous tetrahydrofuran were put and cooled to −70° C. in an atmosphere of nitrogen, 34 mL (51.7 mmol) of a 1.52 mol/Ln-butyllithium hexane solution was dropwise added thereto over a period of 30 minutes while maintaining the reaction temperature to be at most −60° C., stirring was carried out at −70° C. for 2 hours after completion of the dropwise addition, the solution having 10.5 g (43.1 mmol) of 2-fluoro-4-(1,1,2-trifluorovinyl)benzotrifluoride [$CF_2$═CF-$Ph^F$-$CF_3$] dissolved in 31.5 mL of anhydrous tetrahydrofuran was dropwise added thereto over a period of 30 minutes while maintaining the temperature to be at most −60° C., and the temperature was raised to room temperature after completion of the dropwise addition, followed by stirring at room temperature for 3 hours.

Diluted hydrochloric acid was added to the reaction solution, the organic phase was separated, the aqueous phase was extracted with toluene, the toluene layer and the organic phase were put together, washed with water, a sodium hydrogen carbonate aqueous solution and saturated salt solution, and dried over anhydrous magnesium sulfate, and the solvent was distilled off to obtain a crude product. The crude product was purified by silica gel column chromatography (developing solvent: hexane) to obtain 2.95 g (6.46 mmol) of (R)-trans-1-(2,6-difluoro-4-(2-phenylpropyl)phenyl)-2-(3-fluoro-4-trifluoromethylphenyl)-1,2-difluoroethylene [H-Ph-CH($CH_3$)—$CH_2$-$Ph^{FF}$-CF═CF-$Ph^F$-$CF_3$] (yield: 15%).

MS m/e: 456 ($M^+$)

EXAMPLE 4-7

Preparation of (R)-4-(2,6-difluoro-4-(2-phenylpropyl)phenyl)phenyl sulfur pentafluoride [H-Ph-CH($CH_3$)—$CH_2$-$Ph^{FF}$-Ph-$SF_5$]

A reaction was carried out in the same manner as in second step of Example 4-3 except that 3.08 g (10.9 mmol) of 4-bromophenyl sulfur pentafluoride [Br-Ph-$SF_5$] was employed instead of 1-bromo-3,5-difluorobenzene in second step of Example 4-3 and 3.00 g (10.9 mmol) of (R)-2,6-difluoro-4-(2-phenylpropyl)phenylboric acid [H-Ph-CH($CH_3$)—$CH_2$-$Ph^{FF}$-$B(OH)_2$] obtained in third step of Example 4-5 was employed instead of (R)-4-(2-phenylpropyl)phenylboric acid [H-Ph-CH($CH_3$)—$CH_2$-Ph-$B(OH)_2$] to obtain 2.03 g (4.67 mmol) of (R)-4-(2,6-difluoro-4-(2-phenylpropyl)phenyl)phenyl sulfur pentafluoride [H-Ph-CH($CH_3$)—$CH_2$-$Ph^{FF}$-Ph-$SF_5$] (yield: 43%). MS m/e: 434($M^+$)

PREPARATION EXAMPLE 1 FOR LIQUID CRYSTAL COMPOSITION

To 100 parts by weight of a liquid crystal composition ZLI-1565 manufactured by Merck Ltd., 1 part by weight (C=0.01) of (4-cyano-3,5-difluoro)phenyl (R)-4-(2-phenylpropyl)benzoate [H-Ph-CH($CH_3$)—$CH_2$-Ph-COO-$Ph^{FF}$-CN] prepared in Example 4-1, 1 part by weight (C=0.01) of (4-cyano-3-fluoro)phenyl (R)-4-(2-phenylpropyl)benzoate

[H-Ph-CH($CH_3$)—$CH_2$-Ph-COO-$Ph^F$-CN] prepared in Example 4-2 and 1 part by weight (C=0.01) of (R)-2,6-difluoro-4-(4-(2-phenylpropyl)phenyl)benzonitrile [H-Ph-CH($CH_3$)—$CH_2$-Ph-$Ph^{FF}$-CN] prepared in Example 4-3 were added to obtain liquid crystal compositions (A), (B) and (C), respectively.

COMPARATIVE PREPARATION EXAMPLE 1 FOR LIQUID CRYSTAL COMPOSITION

1 Part by weight (C=0.01) of a commercially available optically active compound (CN) was added to 100 parts by weight of a liquid crystal composition ZLI-1565 manufactured by Merck Ltd. to obtain a liquid crystal composition (D), and 1 part by weight of a commercially available optically active compound (S-811) manufactured by Merck Ltd. was added to 100 parts by weight of ZLI-1565 to obtain a liquid crystal composition (E). The structures of the commercially available optically active compounds (CN) and (S-811) are shown in page 2.

Evaluation of Helical Twisting Power

Of each of the liquid crystal compositions (A), (B), (C), (D) and (E), the helical pitch length P (unit: μm) at 25° C. was measured by Cano wedge method. The helical twisting power HTP was calculated from the calculation formula 1. The direction of the helical twist was measured by a contact method. The results are shown in Table 4-1.

TABLE 4-1

| Composition | P (μm) | HTP ($\mu m^{-1}$) |
|---|---|---|
| (A) | 8.11 | 12.3 |
| (B) | 7.72 | 13.0 |
| (C) | 6.97 | 14.3 |
| (D) | 21.6 | 4.63 |
| (E) | 10.4 | 9.62 |

HTP = 1/(P · C)
calculation formula 1

The helical twisting powers of the compounds prepared in Examples 4-1, 4-2 and 4-3 of the present invention were extremely high as compared with those of commercially available optically active compounds.

PREPARATION EXAMPLE 2 FOR LIQUID CRYSTAL COMPOSOTION

To 95 parts by mol of a liquid crystal composition ZLI-1565 manufactured by Merck Ltd., 5 parts by mol of (4-cyano-3,5-difluoro)phenyl (R)-4-(2-phenylpropyl)benzoate [H-Ph-CH($CH_3$)—$CH_2$-Ph-COO-$Ph^{FF}$-CN] prepared in Example 4-1, 5 parts by mol of (4-cyano-3-fluoro)phenyl (R)-4-(2-phenylpropyl)benzoate [H-Ph-CH($CH_3$)—$CH_2$-Ph-COO-$Ph^F$-CN] prepared in Example 4-2 and 5 parts by mol of (R)-2,6-difluoro-4-(4-(2-phenylpropyl)phenyl)benzonitrile [H-Ph-CH($CH_3$)—$CH_2$-Ph-$Ph^{FF}$-CN] prepared in Example 4-3 were added to obtain liquid crystal compositions (F), (G) and (H), respectively.

COMPARATIVE PREPARATION EXAMPLE 2 FOR LIQUID CRYSTAL COMPOSITION 5 parts by mol of a commercially available optically active compound (CB-15) was added to 95 parts by mol of a liquid crystal composition ZLI-1565 manufactured by Merck Ltd. to obtain a liquid crystal composition (I). The structure of the commercially available optically active compound (CB-15) is shown in page 2.

Measurement of Dielectric Anisotropy (Δ∈)

Of the liquid crystal compositions (F), (G), (H) and (I), the N-I transition temperature Tc (K) was measured by using a polarization microscope. The results are shown in Table 4-2.

A liquid crystal cell having a cell gap D=8 μm was prepared by sandwiching each of the liquid crystal compositions (F), (G), (H) and (I) between substrates having a vertical alignment treatment applied to a base equipped with an ITO electrode. Of each of the cells, the dielectric constant $\in_{\parallel}$ in parallel with the molecular long axis at 1 kHz at 0.85 Tc (K) was measured by using a LCR meter (4263B, manufactured by Hewlett-Packard Company). Further, a liquid crystal cell having a cell gap D=8 μm was prepared by sandwiching each of the liquid crystal compositions (F), (G), (H) and (I) between substrates having a parallel alignment treatment applied similarly, and of each of the cells, the dielectric constant $\in_{\perp}$ vertical to the molecular long axis at 1 kHz at 0.85 Tc (K) was measured by using a LCR meter (4263B, manufactured by Hewlett-Packard Company). The dielectric anisotropy (Δ∈) was calculated from the calculation formula 2. The results are shown in Table 4-2.

TABLE 4-2

| Composition | Tc (K) | Δϵ |
|---|---|---|
| (F) | 348.5 | 9.1 |
| (G) | 351.3 | 8.1 |
| (H) | 348.4 | 8.0 |
| (I) | 354.5 | 6.9 |

Δϵ = ϵ''ϵ⊥
Calculation Formula 2

The dielectric anisotropy (Δ∈) of each of the liquid crystal compositions (F), (G) and (H) containing the compounds prepared in Examples 4-1, 4-2 and 4-3 of the present invention was high as compared with the liquid crystal composition (I) containing the commercially available optically active compound (CB-15). Namely, the compounds (2), (3) and (4) of the present invention showed a high dielectric anisotropy (Δ∈) as compared with the commercially available optically active compound (CB-15).

INDUSTRIAL APPLICABILITY

The liquid crystal composition containing the optically active compound of the present invention is a composition novel prior to filing of the present application, and is a liquid crystalline compound, and further, is useful as an optically active compound to be added to the above liquid crystal composition. Namely, it has a high helical twisting power, it provides a small helical pitch length induced, and at the same time, it has a low viscosity, and a liquid crystal element employing the liquid crystal composition of the present invention may have a high speed of response. Further, the liquid crystal composition employing the liquid crystal composition of the present invention has a high refractive index anisotropy (Δn), an extremely high transition temperature (Tc) from the liquid crystal phase to the isotropic phase, and has a low viscosity. Further, it is chemically stable, and is excellent in compatibility with another compound such as another liquid crystal or non-liquid crystal compound. Further, the liquid crystal composition employing the optically active compound of the present invention has such a characteristic that it has a high dielectric anisotropy (Δ∈), and may be driven at a low voltage.

Accordingly, the addition amount of such an optically active compound is small when it is added to a liquid crystal composition, and thus substantially no increase in the viscosity, decrease in the speed of response, increase in the driving voltage or reduction of the operating temperature range will be caused. At the same time, substantially no decrease in Tc of the liquid crystal composition will be caused, and accordingly a liquid crystal electro-optical element can be driven even at a high temperature range.

Particularly, such an optically active compound having the above characteristics is extremely effective even by addition of a small amount when used for a cholesteric liquid crystal composition to which addition of a large amount of an optically active compound is required, and which is usually considered to have a low speed of response and a high driving voltage, and a liquid crystal display element having brightness and a high contrast can be obtained.

Further, when the liquid crystal composition containing the optically active compound of the present invention is employed to obtain a TN or STN liquid crystal display element, uniform twist alignment can be achieved, and when it is used for a reflective cholesteric liquid crystal element, an aimed reflection wavelength will be obtained.

Further, the liquid crystal composition containing the optically active acetylene derivative compound of the present invention may also be used for various modes such as an active matrix element, a polymer dispersion liquid crystal element, a GH liquid crystal element employing a polychromatic colorant and a ferroelectric liquid crystal element. Further, it may also be used for applications other than for display, such as a dimmer element, a dimmer window, an optical shutter, a polarization exchange element, a varifocal lens, an optical color filter, a colored film, an optical recording element and a temperature indicator.

The invention claimed is:

1. A liquid crystal composition containing at least one type of an optically active compound selected from the group consisting of compounds of the following formulae (1), (2), (3) and (4) (in each formula, C* indicates an asymmetric carbon atom):

$$R^1\text{-}A^1\text{-}C^*HX^1\text{—}Y^1\text{-}A^2\text{-}(Z^1\text{-}A^3)_m\text{-}C{\equiv}C\text{-}A^4\text{-}(Z^2\text{-}A^5)_n\text{-}R^2 \qquad (1)$$

wherein $A^1$ is a non-substituted 1,4-phenylene group, a 1,4-phenylene group substituted with at least one halogen atom or a non-substituted 2,6-naphthylene group;

each of $A^2$, $A^3$, $A^4$ and $A^5$ which are independent of one another, is a non-substituted 1,4-phenylene group, a 1,4-phenylene group substituted with at least one halogen atom or a non-substituted trans- 1,4-cyclohexylene group;

$R^1$ is a $C_{1-10}$ aliphatic hydrocarbon group, a $C_{1-10}$ aliphatic hydrocarbon group substituted with at least one halogen atom, a hydrogen atom, a halogen atom or a cyano group, provided that in the case of a $C_{1-10}$ aliphatic hydrocarbon group or a $C_{1-10}$ aliphatic hydrocarbon group substituted with at least one halogen atom, an ethereal oxygen atom (—O—) and/or an ester linkage (—COO— and/or —OCO—) optionally is inserted in the carbon-carbon linkage in the group or the carbon-carbon linkage connecting the group and the ring;

$R^2$ is a $C_{1-10}$ aliphatic hydrocarbon group substituted with at least one halogen atom or $R^2$ is a halogen atom provided that in a case of a $C_{1-10}$ aliphatic hydrocarbon group substituted with at least one halogen atom, an ethereal oxygen atom (—O—) optionally is inserted in the carbon-carbon linkage in the group or the carbon-carbon linkage connecting the group and the ring;

$X^1$ is —F, —$CH_3$, —$CH_2F$, —$CHF_2$ or —$CF_3$;

$Y^1$ is —$CH_2$—, —CO—, —$CH_2CH_2$—, —$CH_2CO$—, —$COCH_2$—, —$CH_2O$—, —$CH_2CH_2CH_2$—, —$CH_2CH_2CO$—, —$CH_2COCH_2$—, —$COCH_2CH_2$—, —$CH_2CH_2O$— or —$CH_2OCH_2$—;

each of $Z^1$ and $Z^2$ which are independent of each other, is —COO—, —OCO—, —$CH_2O$—, —$OCH_2$—, —$CH_2CH_2$—, —C≡C—, —CF═CF— or a single bond; and each of m and n which are independent of each other, is 0 or 1:

$$R^1\text{-}A^1\text{-}C^*\,HX^1\text{—}Y^1\text{-}A^2\text{-}Z^1\text{-}A^3\text{-}Z^2\text{-}A^4\text{-}R^2 \qquad (2)$$

wherein $R^1$, $R^2$, $A^1$, $A^2$, $A^3$, $A^4$, $X^1$, $Y^1$, $Z^2$ and $Z^2$ are as defined for in formula (1), provided that when $A^2$ is a non-substituted 1,4-phenylene group or a 1,4-phenylene group having at least one halogen atom, both $A^3$ and $A^4$ are trans-1,4-cyclohexylene groups, and $Z^1$ is a single bond, and $Z^2$ is —COO—, —OCO—, —$CH_2O$—, —$OCH_2$—, —CF═CF— or a single bond:

$$R^5\text{-Pn-}C^*HX^2\text{—}CH_2\text{-}A^6\text{-}Y^2\text{-}A^7\text{-}R^6 \qquad (3)$$

wherein $R^5$ is a hydrogen atom, a $C_{1-10}$ alkyl group or a $C_{1-10}$ alkoxy group;

$R^6$ is a $C_{1-10}$ monovalent aliphatic hydrocarbon group in which an oxygen atom optionally may be inserted in a carbon-carbon linkage of the group, and of which at least one hydrogen atom is substituted with a fluorine atom, or $R^6$ is a halogen atom or a $C_{1-10}$ monovalent aliphatic hydrocarbon group in which an oxygen atom is inserted in a carbon-carbon linkage of the group;

Pn is a 1,4-phenylene group of which at least one hydrogen atom optionally is substituted with a halogen atom;

each of $A^6$ and $A^7$ which are independent of each other, is a non-substituted trans-1,4-cyclohexylene group or a 1,4-phenylene group of which at least one hydrogen atom optionally is substituted with a halogen atom;

$X^2$ is a fluorine atom, a methyl group or a trifluoromethyl group; and $Y^2$is a C(O)O group or a OC(O) group:

(4)

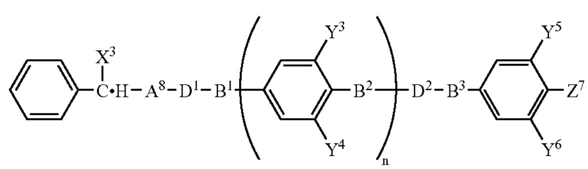

wherein $A^8$ is $CH_2$— or CO—, each of $B^1$, $B^2$ and $B^3$ which are independent of one another, is —COO—, —OCO—, —$CH_2CH_2$—, —$CH_2O$—, —$OCH_2$—, —CF═CF—, —$CF_2O$— or a single bond, each of $D^1$ and $D^2$ which are independent of each other, is a non-substituted 1,4-phenylene group, a non-substituted trans-1,4-cyclohexylene group or a single bond, $X^3$ is —$CH_3$, —$CHF_2$, —$CH_2F$, —$CF_3$ or a fluorine atom, each of $Y^3$, $Y^4$, $Y^5$ and $Y^6$ which are independent of one another, is a fluorine atom or a hydrogen atom, provided that one of $Y^3$, $Y^4$, $Y^5$ and $Y^6$ is a fluorine atom, $Z^7$ is —CN, —$CF_3$, —$OCF_3$, —$SF_5$ or a fluorine atom, and n is 0 or 1, wherein at least one of the following two structural conditions 1) and 2) prevail:

1) all of $A^8$, $D^1$, $D^2$, $X^3$, $Y^3$ to $Y^6$ and $Z^7$ are as defined with the proviso that when n is 1, at least one of $B^1$, $B^2$ and $B^3$ is —CF═CF— or —$CF_2O$—; and when n is 0, at least one of $B^1$ and $B^3$ is —CF═CF— or —$CF_2O$—;

2) all of the following provisos are satisfied:

i) when $D^1$ is a single bond, and $B^1$ is also a single bond; and at least one of the following conditions (1) and (2) is satisfied:

(1) n is 1 and (2) $D^2$ is a non-substituted 1,4-phenylene group or a non-substituted trans ii) 1,4-cyclohexylene group;

ii) when $A^8$ is $CH_2$, the following provisos are satisfied: when n is 0, $B^1$ and $B^3$ are not a single bond at the same time, and when n is 1, all of $B^1$, $B^2$ and $B^3$ are not a single bond at the same time;

iii) $Z^7$ is —$CF_3$—, —$OCF_3$, —$SF_5$ or —F.

2. The liquid crystal composition according to claim 1, wherein the halogen atom substituent of group $R^6$ is fluorine.

3. The liquid crystal composition according to claim 1, wherein, with respect to the compound of formula (1), $X^1$ is —F, —$CH_3$ or —$CF_3$, and $Y^1$ is —$CH_2$— or —CO—.

4. The liquid crystal composition according to claim 1, wherein, with respect to compound of the formula (1), when m=1, each of $A^3$ and $A^4$ which are independent of each other, is a non-substituted 1,4-phenylene group or a 1,4-phenylene group substituted with at least one halogen atom, and when m=0, each of $A^2$ and $A^4$ which are independent of each other, is a non-substituted 1,4-phenylene group or a 1,4-phenylene group substituted with at least one halogen atom.

5. The liquid crystal composition according to claim 1, wherein, with respect to compound of the formula (2), wherein $A^1$ is a non-substituted 1,4-phenylene group or a 1,4-phenylene group having one or two fluorine atom(s), $X^1$ is —$CH_3$, and $Y^1$ is —$CH_2$—.

6. The liquid crystal composition according to claim 5, wherein, with respect to compound of the formula (2) wherein each of $A^2$, $A^3$ and $A^4$, which are independent of one another, is a non-substituted 1,4-phenylene group, a 1,4-phenylene group having one or two fluorine atom(s) or a non-substituted trans-1,4-cyclohexylene group, $Z^1$ is a single bond, and is —COO— or a single bond.

7. The liquid crystal composition according to claim 6, wherein, with respect to compound of the formula (2), $A^4$ is a 1,4-phenylene group having one or two fluorine atom(s).

8. The liquid crystal composition according to claim 1, wherein the optically active compound of the formula (3) is a compound of any one of the following formulae 5 to 8:

$$R^5\text{-Pn-C*HX}^2\text{—CH}_2\text{-Pn}^1\text{-Y}^2\text{-Pn}^2\text{-R}^6 \quad (5)$$

$$R^5\text{-Pn-C*HX}^2\text{—CH}_2\text{-Pn}^1\text{-Y}^2\text{-Cy-R}^6 \quad (6)$$

$$R^5\text{-Pn-C*HX}^2\text{—CH}_2\text{-Cy-Y}^2\text{-Pn}^2\text{-R}^6 \quad (7)$$

$$R^5\text{-Pn-C*HX}^2\text{—CH}_2\text{-Cy-Y}^2\text{-Cy-R}^6 \quad (8)$$

wherein $R^5$, $R^6$, Pn, C*, $X^2$ and $Y^2$ are as defined in formula (3), each of $Pn^1$ and $Pn^2$ which are independent of each other, is a 1,4-phenylene group of which at least one hydrogen atom optionally is substituted with a halogen atom, and Cy is a non-substituted trans-1,4-cyclohexylene group.

9. The liquid crystal composition according to claim 1, wherein the compound of the formula (3) is an optically active compound of the following formula (9):

$$\text{H-Pn-C*H(CH}_3\text{)—CH}_2\text{-Pn}^1\text{-Y}^2\text{-Pn}^2\text{-R}^6 \quad (9)$$

wherein $R^6$, Pn, C* and $Y^2$ are as defined in formula (3), and each of $Pn^1$ and $Pn^2$, which are independent of each other, is a 1,4-phenylene group of which at least one hydrogen atom is optionally substituted with a halogen atom.

10. The liquid crystal composition according to claim 1, wherein the compound of the formula (3) is an optically active compound of the following formula (10):

$$\text{H-Pn-C*H(CH}_3\text{)—CH}_2\text{-Pn}^1\text{-Y}^2\text{-Cy-R}^6 \quad (10)$$

wherein $R^6$, Pn, C* and $Y^2$ are as defined for formula (3), $Pn^1$ is a 1,4-phenylene group of which at least one hydrogen atom is optionally substituted with a halogen atom, and Cy is a non-substituted trans-1,4-cyclohexylene group.

11. A liquid crystal electro-optical element, which comprises the liquid crystal composition as defined in claim 1 disposed between substrates having an electrode.

* * * * *